United States Patent [19]
Mayer et al.

[11] Patent Number: 5,619,682
[45] Date of Patent: Apr. 8, 1997

[54] EXECUTING NETWORK LAYERED COMMUNICATIONS OF A FIRST SYSTEM ON A SECOND SYSTEM USING A COMMUNICATION BRIDGE TRANSPARENT TO THE DIFFERENT COMMUNICATION LAYERS

[75] Inventors: Bruce D. Mayer, Arlington; Martin Berkowitz, Newton; Sudershan K. Sharma, Brookline, all of Mass.

[73] Assignee: Bull HN Information Systems Inc., Billerica, Mass.

[21] Appl. No.: 127,925

[22] Filed: Sep. 28, 1993

[51] Int. Cl.$^6$ .................................................. G06F 3/00
[52] U.S. Cl. .................... 395/500; 364/264.3; 364/280.9; 364/280; 364/DIG. 1
[58] Field of Search .................................. 395/500, 2.86, 395/700, 650, 882, 892

[56] References Cited

U.S. PATENT DOCUMENTS

| | | | |
|---|---|---|---|
| 4,727,480 | 2/1988 | Albright et al. | |
| 4,812,975 | 3/1989 | Adachi et al. | 395/500 |
| 5,136,709 | 8/1992 | Shirakake et al. | 395/700 |
| 5,179,666 | 1/1993 | Rimmer et al. | 395/882 |
| 5,210,832 | 5/1993 | Maier et al. | 395/375 |
| 5,265,252 | 11/1993 | Rawson, III et al. | 395/700 |
| 5,416,917 | 5/1995 | Adair et al. | 395/500 |

FOREIGN PATENT DOCUMENTS 01244935  8/1991  Japan.

OTHER PUBLICATIONS

"Bull repond a ses utilisateurs", 01 Informatique, Jun. 12, 1992.

"HP 3000 Emulation on HP Precision Architecture Computers", by Arndt B. Bergh, et al., Dec., 1987, Hewlett–Packard Journal, pp. 87–89.

Hartig et al, "Operating System(s) on Top of Persistent Object Systems—The Birlix Approach", Jan. 1992, pp. 790–799, IEEE.

*Primary Examiner*—Thomas C. Lee
*Assistant Examiner*—Sang Hui Kim
*Attorney, Agent, or Firm*—Gary D. Clapp; Faith F. Driscoll; John S. Solakian

[57] ABSTRACT

A layered communications bridge mechanism connected between an upper communications layer of a first communications layer mechanism executing in a user level process and a layered communication kernel process of a second system corresponding to the next lower layers of the first communications layer mechanism. The bridge includes an upper bridge mechanism operating to appear to the lowest layer or the layers of the first communications layer mechanism to be the next lower layer of the first layered communications mechanism and a lower bridge mechanism operating to appear to the upper communications layer of the second system kernel process to be the next higher layer of the communications layers of the second system and the upper and lower bridge mechanisms operate to map between the operations of the lower layer of the first communications layer mechanism and the upper layer of the layered communications layers of the second system. The upper bridge mechanism executes in the second system user process and the lower communications layer bridge mechanism executes in an emulator executive level.

7 Claims, 6 Drawing Sheets

SECOND SYSTEM 54

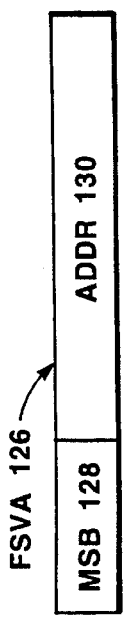
FIG. 6
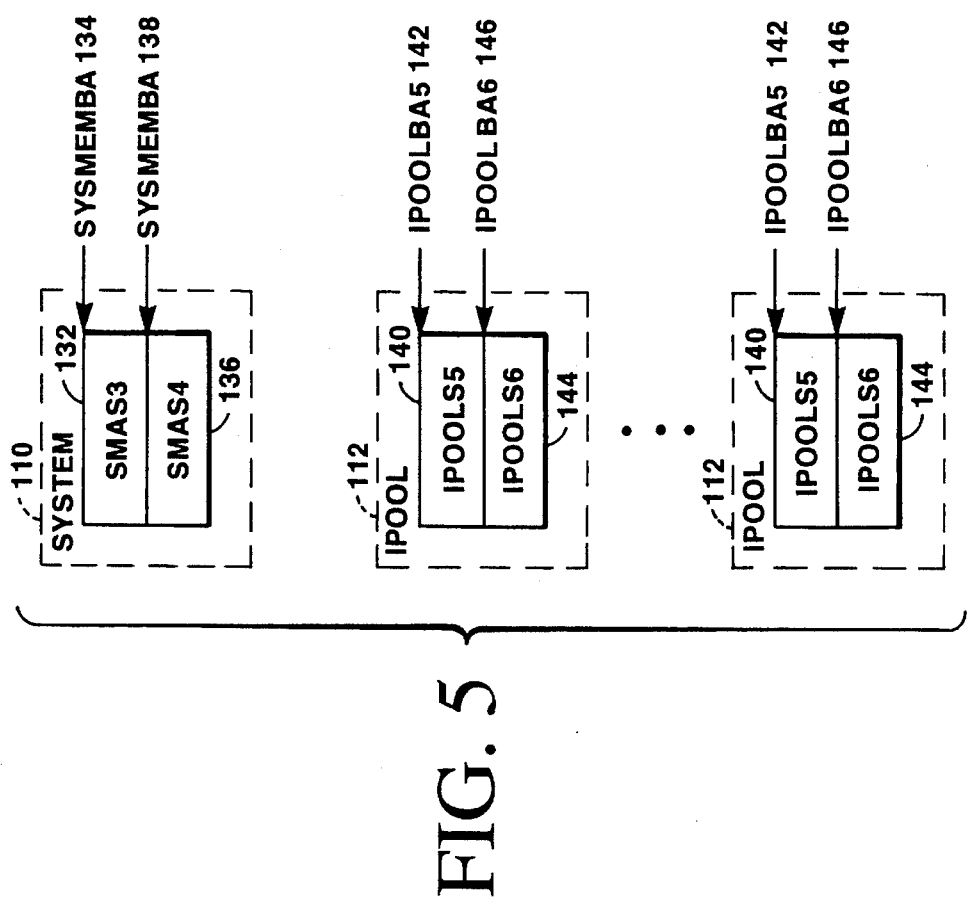
FIG. 7
FIG. 5

EXECUTING NETWORK LAYERED COMMUNICATIONS OF A FIRST SYSTEM ON A SECOND SYSTEM USING A COMMUNICATION BRIDGE TRANSPARENT TO THE DIFFERENT COMMUNICATION LAYERS

CROSS REFERENCES TO RELATED APPLICATIONS

The present patent application is related to:

U.S. patent application Ser. No. 08/128,456, filed Sep. 28, 1993, for Executing Programs Of A First System On A Second System by Richard S. Bianchi et al. pending;

U.S. patent application Ser. No. 08/127,397, filed Sep. 28, 1993, for Emulation of Disk Drivers of A Of A First System On A Second System by Richard S. Bianchi et al. now U.S. Pat. No. 5,373,984; and U.S. patent application Ser. No. 08/128,391, filed Sep. 28, 1993, for Emulation Of The Memory Functions Of A First System On A Second System by Marek Grynberg et al. which issued as U.S. Pat. No. 5,515,525.

FIELD OF THE INVENTION

The present invention relates to a method and apparatus for executing programs of a first system on a second system and, more particularly, to a method and apparatus for emulating a first operating system and hardware platform on a second operating system and hardware platform.

BACKGROUND OF THE INVENTION

A recurring problem in computer systems is that of executing, or running, programs written for a first computer system having a first hardware platform, that is, processor, memory and input/output devices, on a second computer system having a second and different hardware platform. The problem is compounded when the second computer system, as is frequently the case, uses a second operating system which may be substantially different from the operating system of the first system.

This problem usually occurs when a user or a manufacturer of computer systems is attempting to move application programs from a first system to a second system to upgrade or update the computer system while, at the same time, preserving the user's investment in application programs and data created through the application programs. This situation may arise, for example, when moving application programs from one proprietary system, that is, a system having an operating system and hardware platform which is particular to one manufacturer, to another proprietary system OR when moving application programs from a proprietary system to a "commodity" system, that is, a system having a hardware platform and operating system which is used by many manufacturers.

The problems arising from moving application programs from a first system to a second system arise from the fundamental functional structure of the systems and from the interactions and interrelationships of the functional elements of the systems.

Computer systems are constructed as layered levels of functionality wherein the three principal layers in any system are, from top to bottom, the user programs, the operating system and the hardware "platform". The user programs provide the primary interface to the users and provide the functions and operations to control the system in performing the specific operations desired by the user to perform the user's work, such as word processing, spread sheets, and so forth. The hardware is comprised of the central processing unit, the memory and the input/output devices, such as displays, printers, disk drives and communications devices, which actually perform the required operations at the detailed level.

The operating system is functionally located "between" the user programs and the hardware and is comprised of a set of programs and routines that control the overall operations of the system and a set of routines that control the detailed operations of the hardware as necessary to manage and execute the operations directed by the applications programs. In this regard, the operating system is frequently comprised of two functional layers. One layer, frequently referred to, for example, as the "executive" level, interfaces with the applications programs and is comprised of a set of programs and routines and data structures which create operations referred to as "processes" or "tasks" which execute, at a high level, the operations required by the user programs. The "executive" level also includes a set of programs, routines and data structures that are used to manage and execute the operations required by the application programs and which generate requests to the lower level of the operation system.

The lower level of the operating system, frequently referred to as the "kernel", interfaces with the hardware elements of the system and is comprised of a set of routines, frequently referred to as "drivers" or "servers", for detailed control of the operations of the system hardware. The kernel routines receive the requests for operations from the executive level and in turn direct the detailed operations of the system hardware elements.

The basic problem in moving an application program from a first system to a second system arises because, although the system is comprised of separate functional layers, the characteristics of each functional layer and of the functions and operations performed by each functional layer are affected by the characteristics and functions of at least the next lower layer. That is, the application programs are written to take maximum advantage of the characteristics and features of the executive level of the operating system. The executive level of the operating system, in turn, is designed to take maximum advantage of the characteristics and features of the kernel level of the operating system while the kernel level is similarly designed not only to carry out the operations and functions required by the executive level but is influenced by the characteristics and functional features of the system hardware devices.

It is apparent, therefore, that the characteristics of a system as viewed by an application program are influenced by features and functions of the system from the executive level of the operating system down to the actual hardware elements of the system. As a consequence, and even though systems are designed to maintain the maximum clear separation and independence between functional layers, a functional layer created for one system, such as an application program or an operating system, will rarely be compatible with or function with a functional layer from another system.

The two primary approaches taken in the prior art for moving an application program from a first system to a second system are the recompilation of the application program to run on the second system directly and the emulation of the first system on the second system so that the application program can be run unchanged on the second system. While it is very common for an application program to be recompiled to run on a second system, this approach frequently essentially requires the recreation or rewriting of the application program if the two systems are sufficiently dissimilar, which requires a very substantial investment in man-hours. In addition, many application programs cannot be successfully recompiled onto a second system because the second system simply cannot support the operations required by the application program.

The present invention is concerned, however, with the second approach to moving an application program from a first system to a second system, that is, the emulation of the functionality of the first system on the second system in such a manner as to allow the application program to run unchanged on the second system as if the second system were, in fact, the first system.

The systems of the prior art have in general taken two approaches to emulating a first system on a second system wherein the two approaches differ in the level of the system at which the emulation is performed, that is, the level of the second system at which the transition occurs between the functionality of the first system and the functionality of the second system.

In the first approach, a layer of interpretive programs are interposed between the application programs and the operating system of the second system, that is, between the application programs and the execute level of the second operating system. The interpretive programs operate to translate each call, command or instruction of an application program into an operation or series of operations of the second operating system which are the equivalent of the operations of the first operating system that would have been performed in response to the same calls, commands or instructions from the application program.

While this approach seems straightforward, it frequently results in severe performance penalties because all operations must now be performed through yet another layer of programs with the resulting increase in time required to perform each operation. In addition, many operations that would have been performed as a single operation in the first operation system may have to be performed by several operations in the second operating system, again resulting in a performance penalty.

In the second approach, the transition between the functionality of the first operating system and the functionality of the second operation system is made at a very low level in the second system by moving the executive level and the upper portions of the kernel level of the first operating system onto the second system and providing new kernel level routines to interface the hardware elements of the second system. This approach again frequently results in significant performance penalties because of the added layer of programs, this time at the interface between the first operating system kernel level and the second system hardware elements, and because operations that the first kernel may have performed as a single operation with respect to a first system hardware element may now have to be performed by many operations with respect to the second system hardware elements.

SUMMARY OF THE INVENTION

The present invention is directed to a method and a layered communications mechanism for executing the layered communications operations of a first system on a second system. The first system includes a user level, an executive level, an input/output level and a hardware platform and the user level includes at least one user program and at least one executive program for managing operations of the first data processing system while the hardware platform includes a layered communications device. The executive level includes at least one user task performing user level program operations and at least one executive task performing executive program operations and the user and executive tasks generate requests for first system layered communications operations. A layered communications mechanism of the first system is responsive to the requests for executing the layered communications operations of the first system, wherein the first layered communications mechanism includes hierarchically organized layers for performing communications layer operations. In the first system, the input/output level includes an input/output task responsive to the first layered communications mechanism for controlling the first system input/output device in performing layered communications operations.

The layered communications mechanism and method execute on the second system and a second system user level process executing in a user level of the second system, the user level process including the first system user level program, the first system executive program, the first system user and executive tasks, and at least one upper communications layer of the first communications layer mechanism. The second system also includes kernel level, which includes a layered communication kernel process executing layered communications layers of the second system corresponding to all layers of the layered communications mechanism below the at least one upper communications layer of the first communications layer mechanism executing in the user level process.

The present invention provides a layered communications bridge mechanism connected between the at least one upper communications layer of the first communications layer mechanism executing in the user level process and the layered communication kernel process. The layered communications bridge mechanism includes an upper communications layer bridge mechanism connected from the at least one upper communications layer of the first communications layer mechanism executing in the user level process and operating to appear to the lowest layer of the at least one upper communications layer of the first communications layer mechanism to be the next lower layer of the first layered communications mechanism. The bridge mechanism also incudes a lower communications layer bridge mechanism connected between the upper communications layer emulation mechanism and the layered communication kernel process and operating to appear to the upper layer of the layered communications layers of the second system executing in the communications kernel process to be the next higher layer of the layered communications layers of the second system.

The upper communications layer bridge mechanism and the lower communications layer bridge mechanism operate to map between the operations of the lowest layer of the at least one upper communications layer of the first communications layer mechanism and the upper layer of the layered communications layers of the second system executing in the communications kernel process. The second system layered communications input/output device is in turn responsive to the layered communication kernel process for executing the layered communications operations.

Further according to the present invention, the second system further includes an emulator level interposed between the second system user level process and the kernel level, wherein the upper communications layer bridge mechanism executes in the second system user process and the lower communications layer bridge mechanism executes in the emulator level.

The communications mechanism in the second system may also include a pseudo device driver executing in the emulation level between the upper communications layer bridge mechanism and the lower communications layer bridge mechanism for communicating layered communications operation requests between the upper communications layer bridge mechanism and the lower communications layer bridge mechanism.

Other features, objects and advantages of the present invention will be understood by those of ordinary skill in the art after reading the following descriptions of a present implementation of the present invention, and after examining the drawings, wherein:

BRIEF DESCRIPTION OF THE DRAWINGS

FIG. 5 represents the memory spaces of the first system as implemented on the emulating second system;

FIG. 6 represents a virtual address of the first system;

FIG. 7 represents the mapping of the memory spaces of the first system into the memory spaces of the second system; and, FIG. 8 is the address translation mechanism and memory space mapping mechanism of the emulation mechanism.

DETAILED DESCRIPTION

Figure 1:
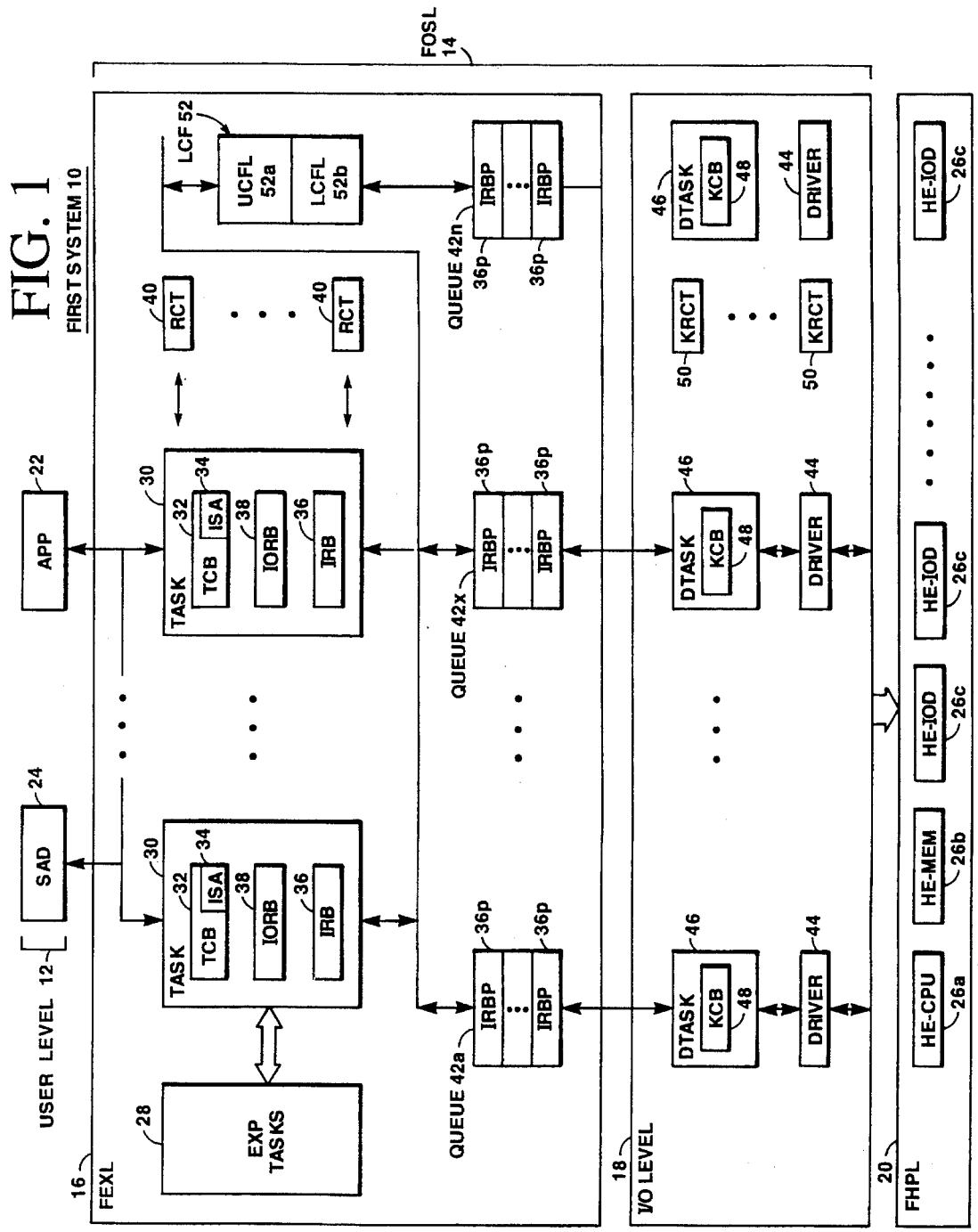
FIG. 1 is a block diagram of certain aspects of a first system which is to be emulated on a second system.

Referring to FIG. 1, therein are illustrated certain aspects of a first system which is to be emulated on a second system. The system represented in FIG. 1 and in the following discussions may be, for example, a DPS6 system running the GCOS6 operating system and the second system, upon which the first system is to be emulated, may be, for example, a DPX/20 system running the AIX* or BOS/X operating systems, which are derived from the UNIX operating system. The DPS6 system with GCOS6 and the DPX/20 with BOS/X are available as products from Bull HN Information Systems Inc. of Billerica, Mass. while AIX* is the International Business Machines Corporation version of the UNIX** operating system.

*AIX is a registered trademark of Internation Business Machines Corporation.
**UNIX is a registered trademark of X/Open Co. Ltd.

A. General Description Of A System To Be Emulated (FIG. 1)

As represented in FIG. 1, a First System 10 is a multi-layered mechanism comprised of a User Level 12, a First System Operating System Level (FOSL) 14 comprised of a First System Executive Level (FEXL) 16 and a First System Input/Output Level (I/O Level) 18, and a First System Hardware Platform Level (FHPL) 20. User Level 12 is comprised of the Application Programs (APPs) 22 and various user visible System Administrative (SADs) programs 24, such as the programs used to administer First System 10 by a system administrator and maintenance and fault isolation programs. It is well known to those of ordinary skill in the art that the System Administrative Programs (SADs) 24 are a part of the operating system and thus execute below the user programs and are not actually a part of User Level 12 indicated herein. System Administrative Programs (SAADs) 24 are grouped together with Application Programs (APPs) 22, that is with the user programs, for convenience in the present description and User Level 12 is used to generally represent all levels of the system above the First System Executive Level (FEXL) 16. First System Hardware Platform Level (FHPL) 20 is comprised of the system Hardware Elements (HE) 26, which include a Central Processing Unit (CPU) 26a, physical Memory 26b, and Input/Output Devices (IODs) 26c, such as displays, workstations, disk drives, printers and communications devices and links.

1. FIRST SYSTEM EXECUTIVE LEVEL (FEXL) 16

As indicated in FIG. 1, First System Executive Level (FEXL) 16 includes a plurality of Executive Program Tasks (EXP Tasks) 28 which operate to manage the operations of First System 10, including directing the overall operations of First System 10, scheduling and managing the operations executed by First System 10 on behalf of Application Programs (APPs) 22 and System Administrative Programs (SADs) 24 and managing the resources of First System 10, such as assigning memory space for operations and carrying out data and program protection functions.

The operations performed in First System 10 in execution of an Application Program (APP) 22 or a System Administrative Program (SAD) 24 are executed through a plurality of Tasks 30 and any program executing on First System 10 may spawn one or more Tasks 30. A Task 30 may be regarded as being analogous to a process, wherein a process is generally defined as a locus of control which moves through the programs and routines and data structures of a system to perform some specific operation or series of operations on behalf of a program. There is a Task Control Block (TCB) 32 associated with each Task 30 wherein the Task Control Block (TCB) 32 of a Task 30 is essentially a data structure containing information regarding and defining the state of execution of the associated Task 30. A Task Control Block (TCB) 32 may, for example, contain information regarding the state of execution of tasks or operations that the Task 30 has requested be performed and the information contained in a Task Control Block (TCB) 32 is available, for example, to the programs of Executive Program Tasks (EXP Tasks) 28 for use in managing the execution of the Task 30. Each Task 30 may also include an Interrupt Save Area (ISA) 34 which is used to store hardware parameters relevant to the Task 30.

Any Task 30 may issue requests for operations to be performed by First System 10 on behalf of the Task 30 to Executive Program Tasks (EXP Tasks) 28 and Executive Program Tasks (EXP Tasks) 28 will respond to each such request by issuing a corresponding Indirect Request Block (IRB) 36 wherein an Indirect Request Block (IRB) 36 is essentially a data structure containing the information necessary to define the operation requested by the Task 30 and will generally include pointers or other indicators identifying the corresponding Task 30 and its associated Task Control Block (TCB) 32. One form of request that can be issued by a Task 30 is a request for an input/output operation, that is, a transfer of data to or from an input/output device (IOD) 26c and a Task 30 will generate a request for an input/output operation in the form of an Input/Output Request Block (IORB) 38 wherein each Input/Output Request Block (IORB) 38 contains information defining the data to be transferred. In this instance, the corresponding Indirect Request Block (IRB) 36 will include a pointer or other indicator identifying the Input/Output Request Block (IORB) 38 which initiated the generation of the Indirect Request Block (IRB) 36.

In general, Task Control Blocks (TCBs) 32 are distinguished from Input/Output Request Blocks (IORBs) 38 in that Input/Output Request Blocks (IORBs) 38 are primarily concerned with input/output operations and may thus be passed to processes for subsequent handling, thereby effectively removing Input/Output Request Blocks (IORBs) 38 from the set of pending operations to be performed by the First System 10 tasks. Task Control Blocks (TCBs) 32 are primarily concerned with the internal or inter-task operations of First System 10 and generally must be handled by the First System 10 tasks and cannot be passed off. As such, Input/Output Request Blocks (IORBs) 38 are generally given a higher priority than Task Control Blocks (TCBs) 32, thus clearing First System 10's operations to handle Task Control Blocks (TCBs) 32. Exceptions may be made, however, for example, for clock and task inhibit Task Control Blocks (TCBs) 32, which must be given the highest priority. It is to be understood in the following descriptions of the present invention that the emulation of a First System 10 on a second system will include emulation of requests that are represented by Indirect Request Blocks (IRBs) 36 as the emulation of First System 10 operations and are not limited solely to system input/output requests, although system input/output requests are the primary form of emulation discussed in the following. All references in the following to Input/Output Request Block (IORB) operations or Indirect Request Block (IRB) operations are to be taken to refer interchangeably to both types of operations, that is, to both Indirect Request Block (IRB) requests and Input/Output Request Block (IORB) requests.

First System Executive Level (FEXL) 16 will further include a set of data structures referred to as Resource Control Tables (RCTs) 40 which are used to store information describing the resources of First System 10, such as Input/Output Devices (IODs) 26c, the allocation of Memory 26b space, and so forth. The internal structure of the Resource Control Tables (RCTs) 40 is generally flexible, except for having a defined header structure through which programs and routines executing in First System 10 may access the contents of the Resource Control Tables (RCTs) 40. A given Resource Control Table (RCT) 40 may contain information defining the characteristics of, for example, a communications link or processor or the characteristics of a disk drive while another Resource Control Table (RCT) 40 may also contain information regarding the tasks or requests being executed by a corresponding resource, such as a communications link, or pointers or addresses to other data structures containing such information.

Finally, First System Executive Level (FEXL) 16 will include a plurality of queue structures, indicated as Queues 42a through 42n, the function of which is to pass requests for operations on behalf of the Tasks 30 to I/O Level 18 and to receive back from I/O Level 18 the responses indicating the results of the operations of I/O Level 18 in response to the requests passed from First System Executive Level (FEXL) 16. Each Queue 42 corresponds to and is associated with a Driver 44 of First System 10's I/O Level 18 wherein there is at least one Driver 44 for and corresponding to each Hardware Element (HE) 26 of FHP 20 for controlling operations of the corresponding Hardware Element (HE) 26 and wherein each Queue 42 stores pending requests for operations by the corresponding Driver 44 and Hardware Element (HE) 26.

Requests may be enqueued in Queues 42 in the form of Indirect Request Block (IRB) 36 Pointers, wherein an Indirect Request Block Pointer (IRBP) 36p indicates the location in the system of the corresponding Indirect Request Block (IRB) 36. The requests, that is, the pointers, will be read from each Queue 42 by the corresponding server and driver routines of I/O Level 18, described further below, which will operate upon the requests. The responses from I/O Level 18 resulting from the operations performed in execution of the requests are Indirect Request Blocks (IRBs) 36 and are enqueued in the Queues 42, which will be described in further detail below, and the pointers may then be read from Queues 42 by Executive Program Tasks (EXP Tasks) 28 to locate the data structures containing the returned results of the operations.

It should be noted with regard to the above description of First System 10 that the interface by which requests and responses are passed between First System Executive Level (FEXL) 16 and I/O Level 18 may take many forms, depending upon the implementation chosen by the designer. For example, requests may be passed directly, as requests, to the hardware element servers and drivers of I/O Level 18 and the information used by the servers and drivers of I/O Level 18 in executing the requests may be stored in a Queue 42 to be read by the servers and drivers of I/O Level 18 as necessary. The First System Executive Level (FEXL) 16/ I/O Level 18 interface may be implemented in other ways, such as with a single Queue 42 with the drivers and server routines of I/O Level 18 reading requests from the single Queue 42 and passing the results of the request operations back to Tasks 30 through the single Queue 42 and a queue manager task for controlling the writing and reading of requests to and from the single Queue 42.

2. I/O Level 18

Referring now to I/O Level 18, as described above, I/O Level 18 includes a plurality of driver programs and routines, indicated generally in FIG. 1 as Drivers 44, wherein there are one or more Drivers 44 for each element of First System Hardware Platform Level (FHPL) 20 for controlling the operations of the elements of First System Hardware Platform Level (FHPL) 20.

As indicated in FIG. 1, requests to I/O Level 18 for an input/output operation by an element of I/O Level 18 are handled by a Driver Task (DTask) 46 corresponding to and associated with the Hardware Element (HE) 26 element identified by the request and each Driver Task (DTask) 46 includes a corresponding Kernel Control Block (KCB) 48 which is generally used in the execution of I/O Level 18 operations in a manner similar to the use of Tasks 30 and Task Control Blocks (TCBs) 32 in First System Executive Level (FEXL) 16. It should be noted that Driver Tasks (DTasks) 46 and Kernel Control Blocks (KCBs) 48 are structured to meet the needs of I/O Level 18 operations and thus generally are not and need not be similar in detail to Tasks 30 and Task Control Blocks (TCBs) 32 and, in certain implementations of I/O Level 18, these functions may be performed by other data and control structures. For example, Drivers 44 may have access to and make use of Task Control Blocks (TCBs) 32, Indirect Request Blocks (IRBs) 36 and Input/Output Request Blocks (IORBs) 38 for these purposes.

Finally, I/O Level 18 will include Kernel Resource Control Tables (KRCTs) 50 for storing device and system information used by Drivers 44 in executing requests from First System Executive Level (FEXL) 16. Again, while Kernel Resource Control Tables (KRCTs) 50 are similar in function to Resource Control Tables (RCTs) 40, Kernel Resource Control Tables (KRCTs) 50 are structured to meet the needs of I/O Level 18 operations and thus generally need not be identical in detail to Resource Control Tables (RCTs) 40 and, in certain implementations of I/O Level 18, these functions may be performed by other data and control structures. For example, Drivers 44 may instead have access to and make use of Resource Control Tables (RCTs) 40 for these purposes.

3. Layered Communications Facilities

Lastly, First System 10 may provide one or more layered communications facilities, such as the OSI/DSA networking and network terminal drivers and concentrators available from Bull HN Information Systems Inc. of Billerica, Mass. As is well known, many such communications facilities, represented in FIG. 1 by Layered Communications Facilities (LCF) 52 are essentially comprised of a plurality of well defined functional levels wherein the upper levels correspond to, or are implemented as, Tasks 30, and wherein the lower levels, which perform more detailed communications operations, correspond to Driver Tasks (DTask) 46 and control various communications drivers, such as certain of Hardware Element (HE)-Input/Output Devices (IODs) 26c. As indicated in FIG. 1, Layered Communications Facilities (LCF) 52 may be represented as being comprised of Upper Communications Facilities Layers (UCFLs) 52a which execute in First System Executive Level (FEXL) 16, or in User Level 12, and which communicate with Lower Communications Facilities Layers (LCFLs) 52b which execute in I/O Level 18 and which in turn control corresponding communications devices of Hardware Element (HE)-Input/Output Devices (IODs) 26c.

4. Alternate Systems and Division of Systems Into Functional Levels

Finally, it should be noted with regard to the above described separation of First System 10's operating levels into a First System Executive Level (FEXL) 16 level and an I/O Level 18 that not all First Systems 10 will have a formal separation of the functions of the system into distinctly defined levels and another First System 10 may in fact architecturally regard the various tasks as essentially peer tasks. In any system, however, even one in which all tasks are regarded as peers, certain tasks will be involved in higher level operations while other tasks will be involved in more detailed tasks and it will be possible to draw a boundary between the tasks separating the higher level tasks from the detail level tasks.

The above described separation of a First System 10 into a First System Executive Level (FEXL) 16 level and an I/O Level 18 should therefore not be regarded as an architectural requirement imposed on the First System 10, but instead as a recognition that certain tasks or processes perform operations at a more detailed level than others and that a boundary between the types of tasks may be drawn for the purposes of the present invention, even if not actually imposed by the architecture of the particular First System 10.

B. General Description, Emulation Of A First System On A Second System (FIG. 2)

1. Second System 54 Functional Levels

Figure 2:
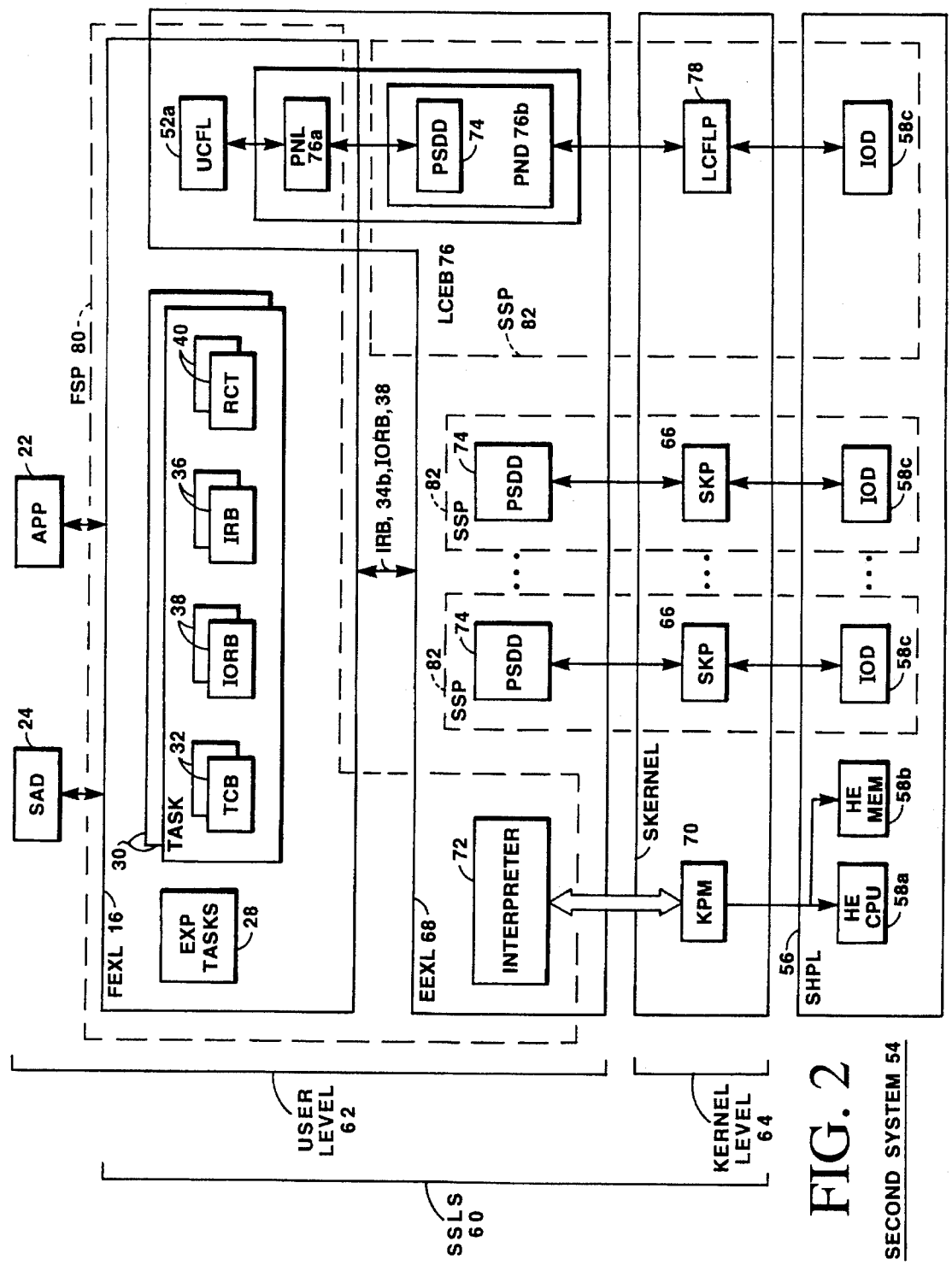
FIG. 2 is the emulation mechanism of the present invention as implemented on a second system.

FIG. 2 illustrates the layered mechanisms of a Second System 54 that is emulating a First System 10 according to the present invention.

As shown, Second System 54 includes the native Second System Hardware Platform (SHPL) 56 which is comprised of the native Hardware Elements (HEs) 58 of Second System 54. As in First System 10, Hardware Elements 58 of Second System 54 include a Central Processing Unit (CPU) 58a, a physical Memory 58b, and Input/Output Devices (IODs) 58c, such as displays, workstations, disk drives, printers and communications devices and links.

As has been described, Second System 54 is, in the present implementation of the invention, a UNIX based system and, as such and according to the usual conventions of UNIX based systems, the Second System Levels (SSLs) 60 executing on Second System Hardware Platform (SHPL) 56 are comprised of a User Level 62 and a Second System Kernel level (SKernel) 64. In the present invention, User Level 62 will include Application Programs (APPs) 22 and System Administrative Programs (SADs) 24, which were executing on First System 10, and First System Executive Level (FEXL) 16, which was executing on First System 10.

As has been described above, it is unlikely that First System Executive Level (FEXL) 16 and Second System Kernel Level (SKernel) 64 will be able to communicate or operate with each other to any useful degree.

The bridge and interface between First System Executive Level (FEXL) 16 and Second System Kernel Level (SKernel) 64, and therefore the bridge and interface between the functions and operations of First System 10 in emulation on Second System 54 and the functions and operations of Second System 54 which allow Application Programs (APPs) 22, System Administrative Programs (SADs) 24 and First System Executive Level (FEXL) 16 of First System 10 to execute on Second System 54, is provided through an Emulator Executive Level (EEXL) 68. Emulator Executive Level (EEXL) 68 resides and executes in Second System 54's User Level 62 between First System Executive Level (FEXL) 16 of First System 10 and Second System Kernel Level (SKernel) 64 of Second System 54.

As will be described in further detail in the following descriptions of Emulator Executive Level (EEXL) 68, Emulator Executive Level (EEXL) 68 does not comprise a new, separate layer or level of functionality in Second System Levels (SSLs) 60. Emulator Executive Level (EEXL) 68 is instead essentially comprised of certain elements of First System Executive Level (FEXL) 16 which have been transformed into new mechanisms which appear, to the remaining, unchanged elements of First System Executive Level (FEXL) 16, to operate in the same manner as the original, untransformed elements of First System Executive Level (FEXL) 16. At the same time, these new mechanisms of Emulator Executive Level (EEXL) 68 appear to the mechanisms of Second System Kernel Level (SKernel) 64 to be the native mechanisms of Second System 54's User Level 62 with which Second System Kernel Level (SKernel) 64 is accustomed to operate.

The following will initially describe the present invention from the functional viewpoint of First System 10, that is, will discuss the structure and operations of the emulation mechanisms of the present invention primarily from the viewpoint of First System 10's functions and operations. The following will then discuss the emulation of First System 10, including the First System 10 programs and tasks being executed on Second System 54 and the emulation mechanisms, from the structural and operational viewpoint of Second System 54, that is, as user programs and structures executing in Second System 54.

2. First System Executive Level (FEXL) 16 and Second System Kernel Level (SKernel) 64

Referring first to First System Executive Level (FEXL) 16, First System Executive Level (FEXL) 16 as executing on Second System 54 again includes Executive Program Tasks (EXP Tasks) 28, the Tasks 30 spawned by the programs of Executive Program Tasks (EXP Tasks) 28, Application Programs (APPs) 22 and System Administrative Programs (SADs) 24, the Task Control Blocks (TCBs) 32 associated with the Tasks 30, the Indirect Request Blocks (IRBs) 36 and Input/Output Request Blocks (IORBs) 38 created as a result of requests for operations by the programs of Executive Program Tasks (EXP TASKS) 28, Application Programs (APPs) 22 and System Administrative Programs (SADs) 24, and the Resource Control Tables (RCTs) 50 that these elements of First System Executive Level (FEXL) 16 are accustomed to operating with. These elements of First System Executive Level (FEXL) 16 will continue to operate in the same manner as in First System 10, thereby providing, at this level, the operating environment necessary for the execution of Application Programs (APPs) 22 and System Administrative Programs (SADs) 24 in their original forms. As will be described further below, the functions of Queues 42 and the First System Executive Level (FEXL) 16 interfaces to First System 10's Kernel 18 have been absorbed into the mechanisms of Emulator Executive Level (EEXL) 68.

The Second System Kernel Level (SKernel) 64 processes are represented in FIG. 2 by Second System Kernel Processes (SKPs) 66 and, for purposes of the present invention, Second System Kernel Level (SKernel) 64 will, as described further below, contain a Second System Kernel Process (SKP) 66 for each Driver Task (DTask) 46 and associated Driver 44 of First System 10 which is to be emulated in Second System 54. As also indicated, Second System Kernel Level (SKernel) 64 includes a Kernel Process Manager process (KPM) 70, which serves to manage Second System Kernel Processes (SKPs) 66.

Second System Kernel Level (SKernel) 64 is essentially comprised of Second System 54 mechanisms and functions which are generally analogous to those of First System 10's Kernel 18, but are in the forms which are native to Second System 54. For example, Second System 54 has been described as possibly being a UNIX based system and, in this instance, the functions and operations performed by Driver Tasks (DTasks) 46 and Drivers 44 of First System 10's I/O Level 18 will be performed by Second System 54 Second System Kernel Level (SKernel) 64 processes.

3. Emulator Executive Level (EEXL) 68

As represented in FIG. 2, Emulator Executive Level (EEXL) 68 includes an INTERPRETER 72 which interprets First System 10 instructions into equivalent Second System 54 instructions, thereby allowing Second System 54's CPU 56a, Memory 56b, and other elements of Second System 54 to emulate the operations of the corresponding elements of First System 10.

Emulator Executive Level (EEXL) 68 further includes a plurality of Pseudo Device Drivers (PSDDs) 74 wherein there is a Pseudo Device Driver (PSDD) 74 for each input/output device or type of input/output device or other functionality of First System 10 which appeared in First System Hardware Platform Level (FHPL) 20 and which is to be emulated in Second System 54. As such, Pseudo Device Drivers (PSDDs) 74 will include Pseudo Device Drivers (PSDDs) 74 for terminals, for disk drivers, for tape drivers, for displays, and for certain communication devices.

As indicated in FIG. 2, there will be a Second System Kernel Process (SKP) 66 for and corresponding to each Pseudo Device Driver (PSDD) 74. In this regard, it should be noted that the term Pseudo Device Driver as used with regard to FIG. 2 is a designation which reflects First System Executive Level (FEXL) 16's view of the functions and operations performed by these elements of Emulator Executive Level (EEXL) 68. That is, to First System Executive Level (FEXL) 16, and to Application Programs (APPs) 22, System Administrative Programs (SADs) 24 and Tasks 30, each Pseudo Device Driver (PSDD) 74 and associated Second System Kernel Process (SKP) 66 appears to Tasks 30 to function in a manner that is equivalent to Drivers 44 and Driver Tasks (DTasks) 46 of First System 10's I/O Level 18. As has been described briefly above, and as described further below, these same mechanisms of Emulator Executive Level (EEXL) 68 appear to Second System Kernel Level (SKernel) 64 to be native Second System 54 User Level 62 functions and mechanisms and there will be a Second System Kernel Process (SKP) 66 for and corresponding to each Pseudo Device Driver (PSDD) 74, that is, for each device or function of First System 10 which is to be emulated in Second System 54. The present invention does not require the modification of Second System Kernel 64 and does not require the creation of new drivers for the purposes of the present invention. The present invention spawns processes to execute existing Second System Kernel Processes (SKPs) 66.

6. Emulation of Communications Link Layers

The communications operations of First System 10 are emulated in Second System 54 in a manner corresponding to the emulation of First System 10 input/output devices, but with the specific form of emulation depending upon the specific type of communications operations. For example, in the present invention certain communications devices of First System 10 are emulated by porting the driver programs and routines from the native First System 10 code into native Second System 54 code, or alternatively by providing equivalent Second System 54 Second System Kernel Processes (SKP) 66, which are called by First System Executive Level (FEXL) 16 through a corresponding Pseudo Device Driver (PSDD) 74 and executed as native Second System 54 processes.

Layered network communications, such as OSI/DSA, may be executed through the usual layered communications mechanisms, but wherein certain of the higher communications layers reside in First System Executive Level (FEXL) 16 or in User Level 12 in Second System 54 in their native First System 10 form, that is, as originally implemented in First System 10, while the lower communications layers are implemented in Emulator Executive Level (EEXL) 68, that is, as native Second System 54 program layers, and use the Second System Kernel Processes (SKP) 66 provided by Second System Kernel Level (SKernel) 64 and Input/Output Devices (IODs) 58c provided in Second System Hardware Platform Level (SHPL) 56 in place of the drivers and devices provided in First System 10. This is illustrated in FIG. 2 wherein Layered Communications Facilities (LCF) 52 is shown as being emulated by Upper Communications Facilities Layers (UCFLs) 52a residing and executing in First System Executive Level (FEXL) 16 or User Level 12 as native First System 10 program layers and Lower Communications Facilities Layers (LCFLs) 52b residing and executing in Second System Kernel Level (SKernel) 64 as native Second System 54 processes, indentified in FIG. 2 as Lower Communications Facilities Layer Processes (LCFLP) 78.

As shown in FIG. 2, Upper Communications Facilities Layers (UCFLs) 52a and Lower Communications Facilities Layer Processes (LCFLP) 78 are functionally interconnected and communicate through a new layer, referred to as Layered Communications Emulation Bridge (LCEB) 76, which is comprised of two cooperative modules indicated in FIG. 2 as Pseudo Network Layer (PNL) 76a residing and executing in First System Executive Level (FEXL) 16 as a native First System 10 program module and Pseudo Network Driver (PND) 76b residing and executing in Second System Kernel (SKernel) 64 as a native Second System 54 program module.

According to the present invention, therefore, Upper Communications Facilities Layers (UCFLs) 52a, which are the layered communications levels with which Tasks 30 communicate directly in First System 10, are retained in Second System 54 and execute in Emulator Executive Level (EEXL) 68 or in User Level 12, so that Tasks 30 may execute layered communications operations as if they were executing in First System 10.

In turn, Lower Communications Facilities Layers (LCFLs) 52b are replaced by corresponding native Second System 54 communications layers referred to in FIG. 2 as Lower Communications Facilities Layer Processes (LCFLP) 78 which execute the functions and operations that were executed in First System 10 by the native Lower Communications Facilities Layers (LCFLs) 52b of First System 10. As shown, Lower Communications Facilities Layer Processes (LCFLP) 78 perform essentially the same functions as Lower Communications Facilities Layers (LCFLs) 52b and the functions and operations that were performed in First System 10 by the Driver Tasks (DTask) 46 and Drivers 44, including controlling the Second System 54 Hardware Element (HE)-Input/Output Devices (IODs) 58c which correspond to the layered communications devices Hardware Element (HE)-Input/Output Device (IOD) 26c of First System 10.

The bridge between Upper Communications Facilities Layers (UCFLs) 52a and Lower Communications Facilities Layer Processes (LCFLP) 78 is, as described above, provided by the new Layered Communications Emulation Bridge (LCEB) 76 comprised of cooperative modules Pseudo Network Layer (PNL) 76a executing in First System Executive Level (FEXL) 16, that is, in the First System 10 operating environment, and Pseudo Network Driver (PND) 76b in Emulator Executive Level (EEXL) 68, in the Second System 54 operating environment.

In the exemplary implementation of the present invention as described herein, Layered Communications Facilities (LCF) 52 are divided between layer 4, the transport layer, and level 3, the network layer, of the seven layer ISO model, so that layers 7 through 4 comprise Upper Communications Facilities Layers (UCFLs) 52a executing in First System Executive Level (FEXL) 16 while layers 3 through 1 comprise Lower Communications Facilities Layer Processes (LCFLP) 78 executing in Second System Kernel (SKernel) 64 and in Second System Hardware Platform Level (SHPL) 56.

According to the present invention, Pseudo Network Layer (PNL) 76a emulates and appears to Upper Communications Facilities Layers (UCFLs) 52a as the X.25 network layer of the seven layer OSI model and transforms requests from the transport layer into First System 10 input/output requests. Pseudo Network Driver (PND) 76b appears to Lower Communications Facilities Layer Processes (LCFLP) 78 as the transport layer of the seven layer OSI model and maps requests from Pseudo Network Layer (PNL) 76a into UNIX API requests that may be executed by Lower Communications Facilities Layer Processes (LCFLP) 78 and Hardware Element (HE)-Input/Output Devices (IODs) 58c executing layered communications operations in Second System 54.

Lastly, Pseudo Network Driver (PND) 76b includes the internal structure of a Pseudo Device Driver (PSDD) 74, which will be described fully in the following descriptions, and for these purposes the descriptions of Pseudo Device Drivers (PSDDs) 74 should be regarded as applying equally to Pseudo Network Driver (PND) 76b as regards the structures and operations of Pseudo Device Drivers (PSDDs) 74.

According to the present invention, therefore, a new communications bridge layer is interposed between an upper communications layer executing in the First System 10 environment and a next lower communications layer executing in the Second System 54 environment. The bridge layer is comprised of an upper module executing in the First System 10 environment and appearing to to the upper communications layer to be the next lower layer and a lower module executing in the Second System 54 environment and appearing to the next lower communications layer to be the upper communications layer. This invention may be implemented between any two layer communications layers having a hierarchical relationship and, because neither of the two bridge modules is responsible for peer to peer network protocols, the integrity of the layered communications facilities is preserved.

7. First System 10 and the Emulation Mechanism As Second System 54 Processes

As has been described previously, Second System 52 is a UNIX based system and, as is well known, UNIX based systems may generally be regarded as comprising two levels executing above the hardware platform level, generally referred to as the User Level and the Kernel Level, indicated in FIG. 2 as User Level 62 and Kernel Level 64. User Level 62 generally comprises the user accessible functions and operations of the system and Kernel Level 64 generally comprises the functions and operations that are "internal" to the system and are not usually accessible to the users. As is also well understood, all operations in a UNIX based system, whether in User Level 62 or in Kernel Level 64, are executed within UNIX processes.

According to the present invention, the Executive Program Tasks (EXP Tasks) 28 and Tasks 30 being executed on behalf of Application Programs (APPs) 22 and System Administrative Programs (SADs) 24, Upper Communications Facilities Layers (UFCLs) 52a with Pseudo Network Layer (PNL) 74a, and INTERPRETER 72 are to be executed in Second System 52 in a manner so as to appear to Second System 52 to be "native" to Second System 52. Accordingly, and as indicated in FIG. 2, Executive Program Tasks (EXP Tasks) 28 and Tasks 30 being executed on behalf of Application Programs (APPs) 22 and System Administrative Programs (SADs) 24, Upper Communications Facilities Layers (UCFLs) 52a with Pseudo Network Layer (PNL) 74a, and INTERPRETER 72 are executed in the Second System 52 of the present implementation in a First System Process (FSP) 80 wherein First System Process (FSP) 80 is one or more user processes according to the conventions of the UNIX based operating system executing on Second System 52.

It should be noted that, while FIG. 2 illustrates a single instance of a First System 10 being emulated on Second System 54, it is possible for multiple instances of a First System 10 to be concurrently emulated on Second System 54, or even for multiple instances of different First Systems 10 to be concurrently implemented on a Second System 54, so long as Second System 54 is a multi-tasking capable system. In such instances, each instance of a First System 10 will be executed in the Second System 54 as a different set of First System Processes (FSPs) 80 executing in the Second System 54.

In addition, each Pseudo Device Driver (PSDD) 74 with its associated Second System Kernel Process (SKP) 66 and Second System 54 hardware device or devices, such as a Hardware Element (HE)-Input/Output Device (IOD) 58c, comprises a Second System 54 process, which are indicated in FIG. 2 as Second System Processes (SSPs) 82. In a similar manner, each instance of a Pseudo Network Driver (PND) 74a with a Lower Communications Facilities Layer Process (LCFLP) 78 and one or more associated Hardware Element (HE)-Input/Output Devices (IODs) 58c is implemented as a Second System Process (SSP) 82.

Executive Program Tasks (EXP Tasks) 28, Tasks 30, Upper Communications Facilities Layers (UCFLs) 52a, and INTERPRETER 72 may therefore communicate among themselves and interoperate according to the conventions of First System 10, so that Executive Program Tasks (EXP Tasks) 28, Tasks 30, Upper Communications Facilities Layers (UCFLs) 52a, and INTERPRETER 72 appear to one another to be native First System 10 tasks and may therefore execute among themselves as if they were in fact executing on First System 10. In this regard, it must be remembered that INTERPRETER 72 emulates First System 10's central processing unit and memory and thus appears to Executive Program Tasks (EXP Tasks) 28, Tasks 30, and Upper Communications Facilities Layers (UCFLs) 52a to be First System 10's central processing unit and memory.

At the same time, First System Process (FSP) 80 may communicate and interoperate with the other processes executing in Second System 54, such as Second System Processes (SSPs) 82, according to the conventions of the UNIX based operating system executing in Second System 52 and thereby appear to Second System 52 to be native Second System 52 user processes.

As also indicated in FIG. 2, First System Process (FSP) 80, which includes Executive Program Tasks (EXP Tasks) 28 and Tasks 30 being executed on behalf of Application Programs (APPs) 22 and System Administrative Programs (SADs) 24, Upper Communications Facilities Layers (UFCLs) 52a with Pseudo Network Layer (PNL) 74a, and INTERPRETER 72, and Second System Processes (SSPs) 82 all execute within User Level 62 of Second System 54, so that First System Process (FSP) 80 and the Second System Processes (SSPs) 82 appear to Second System 54 to be Second System 54 user level processes. The interface between the First System 10 operations and functions that are being emulated on Second System 54 and the native operations and functions of Second System 54 which are used by the emulated elements of First System 10 thereby occurs at the boundary between Second System 54's User Level 62 and Second System 54's Kernel Level 64.

In summary, therefore, the present invention implements the emulated operations and functions of First System 10 in such a manner that the emulated operations and functions of First System 10 may interoperate among themselves in the same manner as in First System 10 and, therefore, effectively within the First System 10 native environment. At the same time, the processes in which the emulated First System 10 operations and functions are executing and the processes emulating First System 10 input/output operations are native Second System 54 processes, and thus may interoperate with one another and with other processes native to Second System 54 in a manner which is native to Second System 54.

In addition, the interface between the emulated First System 10 functions and operations and the native Second System 54 processes and functionality falls at the boundary between Second System 54's user level processes and kernel level processes and thus at a well defined interface so that the functional integrity of Second System 54's architecture is preserved.

As such, the method of emulation of the present invention retains unchanged the most significant aspects of the functionality of both the emulated and the emulating systems and places the interface between the emulated and emulating systems at a clearly defined and controlled boundary so that the interface between the emulated and emulating systems is substantially simplified and the functional and operational integrity of both systems is preserved.

C. Emulator Executive Level (EEXL) 68, Memory Queues, and the Memory Queue Interface (FIG. 3)

1. General Description of Emulator Executive Level (EEXL) 68 and Shared Memory Space Mechanisms Referring to FIG. 3, therein is presented a diagrammatic representation of the structures and mechanisms of Emulator Executive Level (EEXL) 68, a representative First System Process (FSP) 80 and Second System Kernel Level (SKernel) 64 with Second System Kernel Processes (SKPs) 66, concentrating upon the Emulator Executive Level (EEXL) 68 structures and mechanisms comprising the bridge and interface between First System Process (FSP) 80 and Second System Kernel Level (SKernel) 64 and, in particular, Pseudo Device Drivers (PSDDs) 74. The other data structures and mechanisms of First System Process (FSP) 80, Emulator Executive Level (EEXL) 68 and Second System Kernel Level (SKernel) 64 will be understood with reference to FIGS. 1 and 2. As described further in following descriptions of the present invention, Emulator Executive Level (EEXL) 68 resides in a UNIX Memory Space of Second System Hardware Platform Level (SHPL) 56's physical Memory 58b and is accessible to the mechanisms of Second System Kernel Level (SKernel) 63.

2. Memory Queue Interface and Queues

Figure 3:
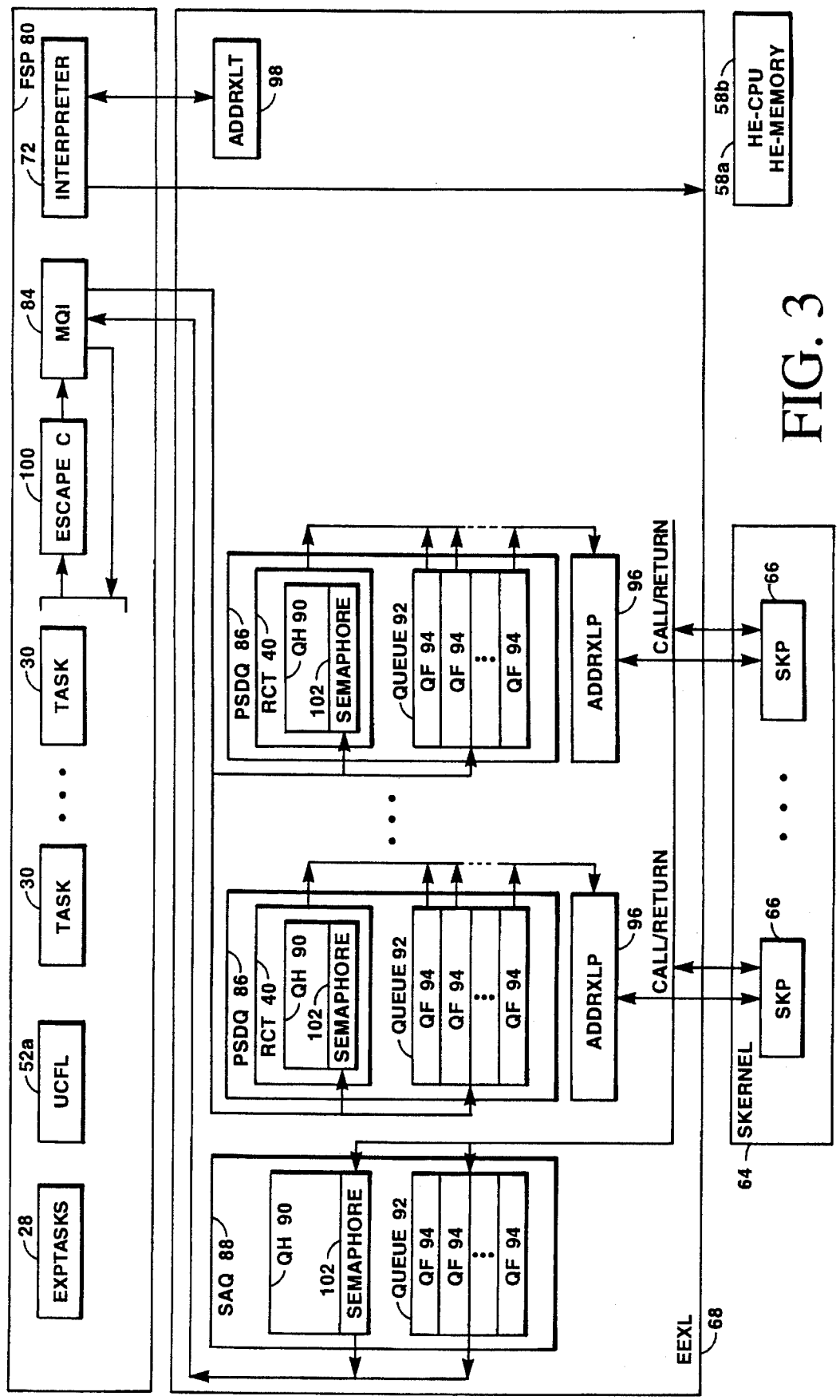
FIG. 3 presents details of the pseudo device driver mechanisms of the present invention.

As represented in FIG. 3, the bridge mechanisms and structures between First System Process (FSP) 80 and Emulator Executive Level (EEXL) 68 include a Memory Queue Interface (MQI) 84 residing in Emulator Executive Level (EEXL) 68 and executing in each First System Process (FSP) 80, and a plurality of Pseudo Device Queues (PSDQs) 86 and a single Software Active Queue (SAQ) 88, which together comprise the Pseudo Device Drivers (PSDDs) 74 shown in FIG. 2. Each Pseudo Device Driver (PSDD) 74 includes a corresponding Pseudo Device Queue (PSDQ) 86 and the Pseudo Device Drivers (PSDDs) 74 together share the single Software Active Queue (SAQ) 88 and Memory Queue Interface (MQI) 84. Although not represented explicitly in FIG. 3, the linked communication layer path will, as described, also include a queue mechanism comprised of a Pseudo Device Driver (PSDD) 74 in Pseudo Network Driver (PND) 76b wherein that Pseudo Device Driver (PSDD) 74 will also include a Pseudo Device Queue (PSDQ) 86 and a shared portion of Software Active Queue (SAQ) 88 and Memory Queue Interface (MQI) 84. The following will therefore discuss the structure and operations of Pseudo Device Drivers (PSDDs) 74 generically, with the understanding that the following discussion applies to all of the input/output paths emulated in Second System 54, including the layered communications facilities.

As previously described, each Pseudo Device Driver (PSDD) 74 in the path of linked communications layers represents and corresponds to a device or driver or communication link used by First System 10, that is, that existed in the First System Operating System Levels (FOSL) 14 and Hardware Platform Level (HPL) 20 of First System 10, and there is a Second System Kernel Process (SKP) 66 or a Lower Communications Facilities Layer Process (LCFLP) 78 in Second System Kernel Level (SKernel) 64 for and corresponding to each such device, driver or communication link. According to the present invention, each Pseudo Device Driver (PSDD) 74 or Lower Communications Facilities Layer Process (LCFLP) 78 is to operate in the same manner as the corresponding element that existed in First System 10.

That is, the Tasks 30 and Executive Program Tasks (EXP Tasks) 28 executing in First System Executive Level (FEXL) 16 will provide requests for operations to Emulator Executive Level (EEXL) 68, and thus to Second System Kernel Level (SKernel) 64 and Second System Hardware Platform Level (SHPL) 56, in the form of Indirect Request Block Pointers (IRBPs) 36p or Input/Output Request Block Pointers (IORBPs) 38p and will receive back the results of the operations. Emulator Executive Level (EEXL) 68 must therefore provide a path by which requests are passed to Second System Kernel Processes (SKPs) 66 and Lower Communications Facilities Layer Processes (LCFLPs) 78 and a path by which the results of the operations are passed back to the Tasks 30.

3. Implementation of Device Drivers and Link Layers

As described briefly above, each Pseudo Device Driver (PSDD) 74 utilizes a Pseudo Device Queue (PSDQ) 86 and shares the common Software Active Queue (SAQ) 88 with other Pseudo Device Drivers (PSDDs) 74 by executing the functions provided in Memory Queue Interface (MQI) 84 wherein Memory Queue Interface (MQI) 84 is a set of routines for accessing and managing the Pseudo Device Queues (PSDQs) 86 and the Software Active Queue (SAQ) 88.

The Pseudo Device Queue (PSDQ) 86 of each Pseudo Device Driver (PSDD) 74 forms the path by which requests for operations are passed to the appropriate Second System Kernel Processes (SKPs) 66 and Lower Communications Facilities Layer Processes (LCFLPs) 78 of Second System Kernel Level (SKernel) 64, wherein each Pseudo Device Queue (PSDQ) 86 is a path to a corresponding Second System Kernel Process (SKP) 66 or Lower Communications Facilities Layer Process (LCFLP) 78 and thus to a corresponding emulated device, driver or link layer. Software Active Queue (SAQ) 88, in turn, which is shared by each of the Pseudo Device Drivers (PSDDs) 74 and Lower Communications Facilities Layer Processes (LCFLPs) 78 and their corresponding Second System Kernel Processes (SKPs) 66, forms the path by which the results of Second System Kernel Process (SKP) 66 operations are passed back to the requesting tasks executing in First System Executive Level (FEXL) 16.

4. Internal Structure of Pseudo Device Queues (PSDQs) 88 and Software Active Queue (SAQ) 88

The Pseudo Device Queues (PSDQs) 86 are each comprised of a Header structure and a queue structure wherein the Header structure is embedded in a Resource Control Table (RCT) 40, as described above with reference to FIG. 1. Software Active Queue (SAQ) 88 is similarly comprised of a Header structure and a queue structure, wherein the Header structure resides in system memory space at a predetermined location. The general structure of the Queue Headers (QHs) 84 is the same for Software Active Queue (SAQ) 88 and for each of the Pseudo Device Queues (PSDQs) 86, but the information contained in the queue will depend upon the type of the particular queue, as will be described below.

Figure 4:
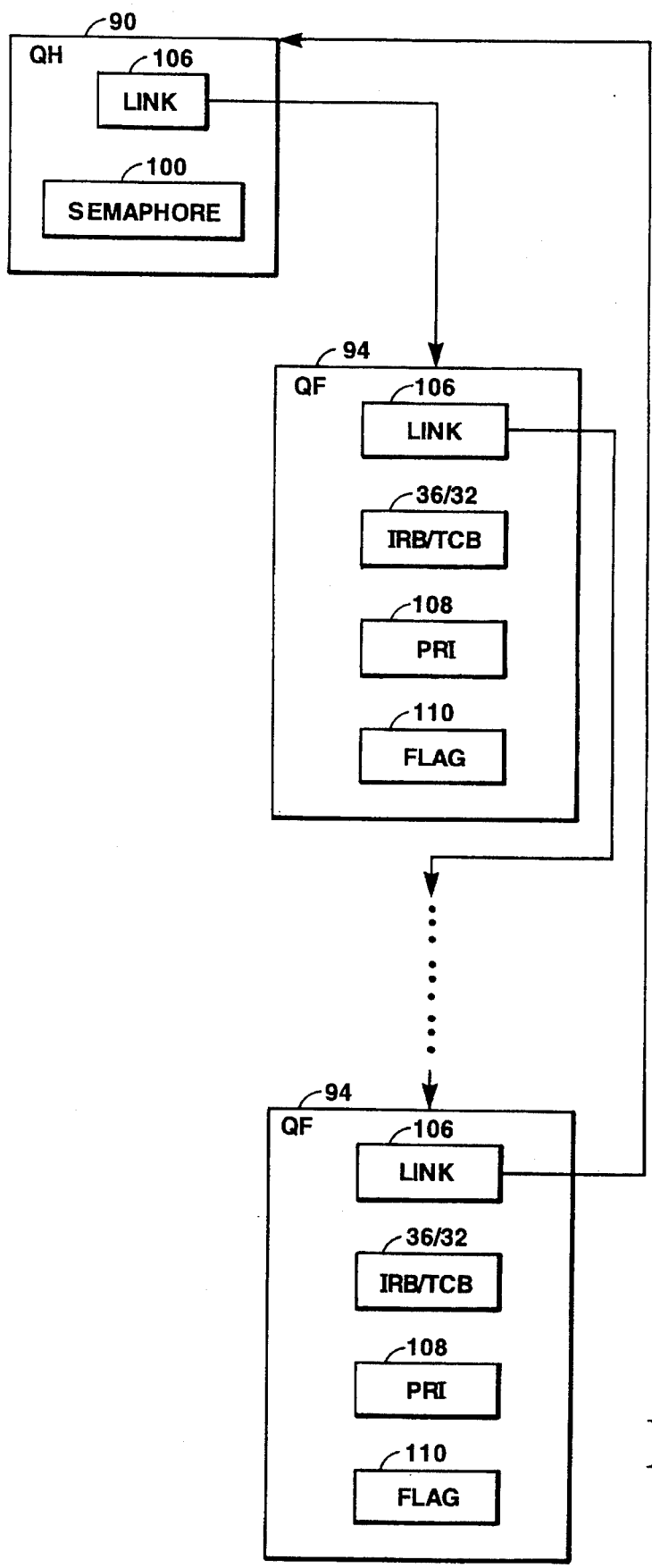
FIG. 4 presents the internal structure of the queues of the emulation mechanisms of the present invention.

As shown in FIG. 4, the queue structure associated with each Queue Header (QH) 90 is represented as a Queue 92 wherein each Queue 92 is a linked queue of Queue Frames (QFs) 94 wherein, as will be described in further detail in a following discussion and figure, each Queue Frame (QF) 94 may contain a Task Control Block (TCB) 32 or an Indirect Request Block Pointer (IRBP) 36p wherein each Task Control Block (TCB) 32 or Indirect Request Block Pointer (IRBP) 36p represents a request for an operation by a Task 30, as described above with reference to FIG. 1. The number of Queue Frames (QFs) 94 in any Queue 92 will depend upon the number of outstanding requests to the corresponding emulated device or, in the case of Software Active Queue (SAQ) 88, the number of completed requests, as described below.

The queue of each of Software Active Queue (SAQ) 88 and the Pseudo Device Queues (PSDQs) 86 comprises a structure referred to as a "linked queue with head node" wherein the Queue Header (QH) 90 comprises the head node and wherein the Queue Header (QH) 90 and the Indirect Request Blocks (IRBs) 34 in a Queue 92 are each linked to the following element in the queue.

5. Addresses and Address Translation

It will be noted, as described previously, that Software Active Queue (SAQ) 88, the Pseudo Device Queues (PSDQs) 86, and INTERPRETER 72 are provided to emulate the corresponding mechanisms of First System 10, that is, First System 10's input/output devices and central processing unit, as seen by Executive Program Tasks (EXP Tasks) 28 and Tasks 30. As such, Executive Program Tasks (EXP Tasks) 28 and Tasks 30 will provide memory addresses to the Pseudo Device Queues (PSDQs) 82 and INTERPRETER 72 according to the requirements of the native memory access and management mechanisms of First System 10 and will expect to receive memory addresses from Software Active Queue (SAQ) 88 and INTERPRETER 72 in the same form. Second System Kernel Processes (SKPs) 66, Lower Communications Facilities Layer Processes (LCFLPs) 78, the hardware elements of Second System 54 and other processes executing as native processes in Second System 54, however, operate according to the memory addressing mechanisms native to Second System 54. As such, address translation is required when passing requests and returning requests between Emulator Executive Level (EEXL) 68 and Second System Kernel Level (SKernel) 64.

As described, INTEPRETER 70 is provided to interpret First System 10 instructions into functionally equivalent Second Second 54 instructions, or sequences of instructions, including instructions pertaining to memory operations. As such, the address translation mechanism is also associated with INTERPRETER 72, or is implemented as a part of INTERPRETER 72, and is indicated in FIG. 3 as Address Translation (ADDRXLT) 98 and will be described in detail in a following discussion.

6. Operation of Memory Queue Interface (MQI) 84, Pseudo Device Queues (PSDQs) 86, and Software Active Queue (SAQ) 88

A task executing in First System Executive Level (FEXL) 16, that is, a Task 30 or one of Executive Program Tasks (EXP Tasks) 28 executing in First System Process (FSP) 80, may request the execution of an operation by a device emulated through Emulator Executive Level (EEXL) 68, Second System Kernel Level (SKernel) 64, and Second System Hardware Platform Level (SHPL) 56 by generating, or causing an Executive Program Task (EXP Task) 28 task to generate, an Indirect Request Block (IRB) 36 as in the normal, native operation of First System 10. The Task 30 or EXP Task 28 generating the Indirect Request Block (IRB) 36 will then, however, write the Indirect Request Block Pointer (IRBP) 36p into the Pseudo Device Queue (PSDQ) 86 corresponding to the appropriate device, driver or link layer by "escaping" to Emulator Executive Level (EEXL) 68 and issuing a call to Memory Queue Interface (MQI) 84. As shown in FIG. 3, this operation is performed through Escape/Call Mechanism (EscapeC) 100, which detects and traps input/output instructions and, in response to an input/output instruction, invokes Memory Queue Interface (MQI) 74 rather than, as in First System 10, passing the Indirect Request Block (IRB) 34 through one of the mechanisms described with reference to FIG. 1. Memory Queue Interface (MQI) 84 then writes the corresponding Indirect Request Block Pointer (IRBP) 36p into the corresponding Pseudo Device Queue (PSDQ) 86, which resides in the Emulator Executive Level (EEXL) 68 operating environment. Thereafter, and as described further below, communication and interoperation between the Pseudo Device Queues (PSDQs) 86, Software Active Queue (SAQ) 88, and the Second System Kernel Processes (SKPs) 66, all of which are Second System 52 structures and processes, will be by conventional process calls and returns.

Referring briefly to the discussion of First System 10 in FIG. 1 and, in particular, the mechanisms by which Tasks 30 pass Indirect Request Block (IRB) 36 requests to I/O Level 18, it will be apparent that, except for the request call accordingly being to Memory Queue Interface (MQI) 84 rather than to the corresponding First System 10 mechanisms and escape to native Second System 54 code, the operations within First System Process (FSP) 80 to invoke the emulation of an input/output operation are very similar to the native operations of First System 10. The emulation call mechanism of Escape/Call Mechanism (EscapeC) 100 and Memory Queue Interface (MQI) 84 therefore closely emulates the operation of First System 10 in this regard and the modifications to First System Executive Level (FEXL) 16 are relatively slight, primarily being the addition of Escape/Call Mechanism (EscapeC) 100 and Memory Queue Interface (MQI) 84.

Further in this regard, it should be noted that Memory Queue Interface (MQI) 84 must be implemented in the Second System 54 operating environment, that is, in Emulator Executive Level (EEXL) 68, as a routine available to a plurality of Second System 54 processes.

It should be further noted that Pseudo Device Queues (PSDQs) 86 and Software Active Queue (SAQ) 88 are data structures of a form that is similar to the data structures already in use by First System Executive Level (FEXL) 16, so that the implementation of Memory Queue Interface (MQI) 84 and Escape/Call Mechanism (EscapeC) 100 as Second System 54 programs is, as regards the interface between Escape/Call Mechanism (EscapeC) 100 and Memory Queue Interface (MQI) 84, a well understood process.

Returning to the discussion of the emulation of a requested input/output operation, upon being called by a First System Process (FSP) 80 task issuing a request for an operation by an emulated device, driver or link layer, Memory Queue Interface (MQI) 84 will enqueue the Indirect Request Block Pointer (IRBP) 36p of the request into the Queue 92 of the Pseudo Device Queue (PSDQ) 86 corresponding to the emulated device, driver or link layer and, in doing so, will set a Semaphore 102 in the Queue Header (QH) 90 of the Pseudo Device Queue (PSDQ) 86.

As has been described, the Second System 54 upon which First System 10 is emulated is, in the present example, a UNIX based system and the Semaphore 102 is correspondingly a UNIX semaphore which, as indicated in FIG. 3, operates to wake up the Second System Kernel Process (SKP) 66 or Lower Communications Facilities Layer Process (LCFLP) 78 which emulates the requested device, driver or link layer driver in the manner well known to those of skill in the an and familiar with UNIX based systems. It should be noted that the Semaphores 102 also operate to lock a queue that an entry is being written into so that another process will not attempt to write into or read from the queue while the queue is being modified by a first process, such as Memory Queue Interface (MQI) 84 or a Second System Kernel Process (SKP) 66.

The writing of an Indirect Request Block Pointer (IRBP) 36p into the Queue 92 of a Pseudo Device Queue (PSDQ) 86 will thereby cause a conventional UNIX call and return in which the Second System Kernel Process (SKP) 66 or Lower Communications Facilities Layer Process (LCFLP) 78 performs the requested operation. That is, and as indicated in FIG. 3, the setting of the Semaphore 102 in a Pseudo Device Queue (PSDQ) 86 results in a process call to the Second System Kernel Process (SKP) 66 or Lower Communications Facilities Layer Process (LCFLP) 78 which is emulating the corresponding device, driver or link layer driver to which the request was directed by the requesting task. The Second System Kernel Process (SKP) 66 or Lower Communications Facilities Layer Process (LCFLP) 78 will then access and read the Indirect Request Block Pointer (IRBP) 36p of the request and, operating through the Indirect Request Block (IRB) 36, will obtain the information necessary to execute the requested operation. The Second System Kernel Process (SKP) 66 or Lower Communications Facilities Layer Process (LCFLP) 78 will execute the requested operation through the corresponding hardware elements of Second System Hardware Platform Level (SHPL) 56 and, upon completing the operation, will return the results of the operation to Software Active Queue (SAQ) 88 and, when doing so, will set the Semaphore 102 in the Queue Header (QH) 90 of Software Active Queue (SAQ) 88.

It will therefore be apparent from the above that the design of such Second System Kernel Processes (SKPs) 66 and of Lower Communications Facilities Layer Processes (LCFLPs) 78 will be well familiar to those of skill in the art, so that a detailed description of the design of such Second System Kernel Processes (SKPs) 66 and Lower Communications Facilities Layer Processes (LCFLPs) 78 is not necessary for those of skill in the art to implement the present invention and, since the lower level details of such designs would differ for each First System 10 and Second System 54, would be superfluous to understanding the present invention.

7. Further Description of Queue Headers (QHs) 90 and Queues 92 (FIG. 4, Tables 1, 2, 3 and 4 and Appendix A)

Referring to FIG. 4, therein is represented the Queue Header (QH) 90 and Queue 92 of Software Active Queue (SAQ) 88 or a Pseudo Device Driver Queue (PSDQ) 86 in further detail. As indicated therein, and as described previously, each Queue Header (QH) 90 includes, in addition to a Semaphore 102, a Link 106 indicating the location of the first Queue Frame (QF) 94 in the associated Queue 92. Each Queue Frame (QF) 94, in turn, includes a Link 106 to the next Queue Frame (QF) 94 of the Queue 92, with the Link 106 of the last Queue Frame (QF) 94 containing a pointer back to the location of the Queue Header (QH) 90.

The Queue Frames (QFs) 94 of Software Active Queue (SAQ) 88 and Pseudo Device Driver Queues (PSDQs) 86 differ in detail and the following will describe the Queue Frames (QFs) 94 of both, noting where the frames differ. Each Queue Frame (QF) 94 further includes a Task Control Block Pointer (TCBP) or Input/Output Request Block Pointer (IORBP) 38p, as previously described, a Priority Field (Priority) 108 containing a value indicating the relative priority of the interrupt or request. The Queue Frames (QFs) 94 of Software Active Queue (SAQ) 88 include a Flag Field (Flag) 108 containing a flag which distinguishes whether the Queue Frame (QF) 94 contains a Task Control Block (TCB) 32 or an Indirect Request Block (IRB) 36. Input/Output Request Blocks (IORBs) through their IRBs are generally given a higher priority than Task Control Blocks (TCBs). Exceptions may be made, however, for example, for clock and task inhibit Task Control Blocks (TCBs) 32, which must be given the highest priority.

The structure and operation of Memory Queue Interface (MQI) 84, Software Active Queue (SAQ) 88, Pseudo Device Queues (PSDQs) 86, and Second System Kernel Processes (SKPs) 66 and Lower Communications Facilities Layer Processes (LCFLPs) 78 may be understood further by an examination of the further data stored in Queue Headers (QHs) 90, which comprises information used in the operations of Tasks 30, Executive Program Tasks (EXP Tasks) 28, Memory Queue Interface (MQI) 84, and Second System Kernel Processes (SKPs) 66 and Lower Communications Facilities Layer Processes (LCFLPs) 78, either directly or as pointers and addresses to other data structures which contain the necessary information.

The Queue Headers (QHs) 90 of the Pseudo Device Queues (PSDQs) 86 have a standardized format and structure and the Queue Headers (QHs) 90 of the various queues of Emulator Executive Level (EEXL) 68 essentially differ only with respect to the specific information stored in this standardized format and structure and the manner in which this information is used. As such, the following will first describe the basic structure and format of a Queue Header (QH) 90 and will then illustrate a specific example of the Queue Header (QH) 90 for the Pseudo Device Queue (PSDQ) 86 of an exemplary emulated device, such as a disk drive, and for an XTD/TTY device which does not use the Semaphore 84 for sleep/waken control.

As illustrated in Tables 1, 2, 3 and 4, a basic Queue Header (QH) 90 contains the following fields and information and the information in the fields is used as described in the following. It should be noted that not all of the fields are necessarily used in a given Queue Header 84 and that certain fields, not shown below, are reserved for future use.

TABLE 1

Basic Queue Header 90

| | |
|---|---|
| (MQI)→rqh.priority | Contains relative priority of request; appears in Indirect Request Block (IRB) but listed here for convenience. |
| (MQI)→rqh.fwd | Pointer to next queue element or to header if queue is empty. |

TABLE 1-continued

Basic Queue Header 90

| | |
|---|---|
| (MQI)→mcl_ctr | Frequency of monitor calls in session. |
| (MQI)→cxt_ctr | Frequency of context swaps in session; that is, frequency of switching between Tasks 30. |
| (MQI)→isem.sid | Semaphore to lock queue structure while referencing queue structure to access (IRB) or to write or delete (IRB); used to sleep/wake SKPs 66 or to generate signal to call certain SKPs 66 such as XTD devices. |
| (MQI)→isem.pid | Server process identification. |
| (MQI)→fdes | File descriptor. |
| (MQI)→active_servers | TRUE if corresponding server SKP 66 is active. |
| (MQI)→status | Current state of terminal. |
| (MQI)→usr_sid | User terminal semaphore identification. |
| (MQI)→req_cnt | Number of requests currently enqueued. |
| (MQI)→enq_cnt | Total enqueue operations to current time. |
| (MQI)→deq_cnt | Total dequeue operations to current time. |
| (MQI)→slp_cnt | Total sleep operations to current time. |
| (MQI)→wak_cnt | Total waken operations to current time. |
| (MQI)→func | Pointer to function SKP 66. |
| (MQI)→block | Shared memory address of strucure (Task, (TCB), (IORB). |
| (MQI)→pid | Process identification; depends upon specific queue. |
| (MQI)→cur_pri | Priority of queue frame (IRB) most recently dequeued. |
| (MQI)→lrn | Logical resource number (resource identifier) of emulated device. |
| (MQI)→brk-add | Location of temporary storage of SKP 66 during break processing. |
| (MQI)→trmname | Name of user terminal. |
| (MQI)→logname | Log-in name of user. |
| (MQI)→display | Display variable of user. |
| (MQI)→filename | File name of emulated device to be mounted. |

TABLE 2

Queue Header for Software Active Queue (SAQ) 88
Note: SAQ 88 Header is not an RCT 40 Header

| | |
|---|---|
| (SAQ)→rqh.priority | N/A (Not Applicable). |
| (SAQ)→rqh.fwd | Pointer to next queue element or to header if queue is empty. |
| (SAQ)→mcl_ctr | Frequency of monitor calls in session. |
| (SAQ)→cxt_ctr | Frequency of context swaps in session; that is, frequency of switching between Tasks 30. |
| (SAQ)→isem.sid | Semaphore to lock queue structure while referencing queue structure to access (IRB) or to write or delete (IRB); used to sleep/wake on when element added to queue. |
| (SAQ)→isem.pid | Server process identification (MQI). |
| (SAQ)→fdes | N/A |
| (SAQ)→active_servers | N/A |
| (SAQ)→status | N/A |
| (SAQ)→usr_sid | N/A |
| (SAQ)→req_cnt | Number of requests currently enqueued. |
| (SAQ)→enq_cnt | Total enqueue operations to current time. |
| (SAQ)→deq_cnt | Total dequeue operations to current time. |
| (SAQ)→slp_cnt | Total sleep operations to current time. |
| (SAQ)→wak_cnt | Total waken operations to current time. |
| (SAQ)→func | N/A |
| (SAQ)→block | N/A |
| (SAQ)→pid | Process identification; clock server process of FEXP 16. |
| (SAQ)→cur_pri | Priority of queue frame (TCB) most |

TABLE 2-continued

Queue Header for Software Active Queue (SAQ) 88
Note: SAQ 88 Header is not an RCT 40 Header

| | | |
|---|---|---|
| | | recently dequeued. |
| (SAQ)→lrn | N/A | |
| (SAQ)→brk-add | N/A | |
| (SAQ)→trmname | N/A | |
| (SAQ)→logname | N/A | |
| (SAQ)→display | N/A | |
| (SAQ)→filename | N/A | |

TABLE 3

Queue Header 90 for Disk/Diskette

| | |
|---|---|
| (RCT)→qaddr.rqh.priority | N/A |
| (RCT)→qaddr.rqh.fwd 94 | Pointer to next queue element or to header if queue is empty. |
| (RCT)→qaddr.mcl_ctr | N/A |
| (RCT)→qaddr.cxt_ctr | N/A |
| (RCT)→qaddr.isem.sid | Semaphore to lock queue structure while referencing queue structure to access (IRB) or to write or delete (IRB); used to sleep/wake on when element added to queue |
| (RCT)→qaddr.isem.pid | Server process identification SKP 66 of disk/diskette. |
| (RCT)→qaddr.fdes | File descriptor. |
| (RCT)→qaddr.active_servers | TRUE if corresponding server SKP 66 is active. |
| (RCT)→qaddr.status | N/A |
| (RCT)→qaddr.usr_sid | N/A |
| (RCT)→qaddr.req_cnt | Number of requests currently enqueued. |
| (RCT)→qaddr.enq_cnt | Total enqueue operations to current time. |
| (RCT)→qaddr.deq_cnt | Total dequeue operations to current time. |
| (RCT)→qaddr.slp_cnt | Total sleep operations to current time. |
| (RCT)→qaddr.wak_cnt | Total waken operations to current time. |
| (RCT)→qaddr.func | Pointer to function SKP 66. |
| (RCT)→qaddr.block | Shared memory address of structure (Task, (TCB), (IORB)). |
| (RCT)→qaddr.pid | N/A |
| (RCT)→qaddr.cur_pri | Priority of queue frame (IRB) most recently dequeued. |
| (RCT)→qaddr.lrn | Logical resource number (resource identifier) of emulated device. |
| (RCT)→qaddr.brk-add | N/A |
| (RCT)→qaddr.trmname | N/A |
| (RCT)→qaddr.logname | N/A |
| (RCT)→qaddr.display | N/A |
| (RCT)→qaddr.filename | File name of emulated device to be mounted. |

TABLE 4

Queue Header 90 for XTD/TTY Device

| | |
|---|---|
| xtd→rqh.priority | N/A |
| xtd→rqh.fwd | Pointer to next queue element or to header if queue is empty. |
| xtd→mcl_ctr | N/A |
| xtd→cxt_ctr | N/A |
| xtd→isem.sid | Semaphore to lock queue structure while referencing queue structure. |
| xtd→isem.pid | N/A |
| xtd→fdes | File descriptor for xtd socket. |
| xtd→active_servers | TRUE if corresponding server SKP 66 is active. |
| xtd→status | N/A |
| xtd→usr_sid | N/A |

TABLE 4-continued

Queue Header 90 for XTD/TTY Device

| | |
|---|---|
| xtd→req_cnt | N/A |
| xtd→enq_cnt | Total enqueue operations to current time. |
| xtd→deq_cnt | Total dequeue operations to current time. |
| xtd→slp_cnt | N/A |
| xtd→wak_cnt | N/A |
| xtd→func | Pointer to function (xtd_io). |
| xtd→block | N/A |
| xtd→pid | Process identification of the xtd_io process. |
| xtd→cur_pri | Priority of queue frame (IRB) most recently dequeued. |
| xtd→lrn 126 | N/A |
| xtd→brk-add | N/A |
| xtd→trmname | N/A |
| xtd→logname | N/A |
| xtd→display | N/A |
| xtd→filename | N/A |

D. Shared Memory, Memory Management and Memory Protection (FIGS. 5, 6, 7 and 8)

As described above with reference to FIGS. 2 and 3, the First System 10 tasks and programs executing on Second System 54, Second System 54's native processes and mechanisms and the Second System 54 mechanisms emulating First System 10 mechanisms share and cooperatively use Second System 54's memory space in Second System Memory 58b. As a consequence, it is necessary for Second System 54, the First System 10 tasks and programs executing on Second System 54, and the emulation mechanisms to share memory use, management, and protection functions in a manner that is compatible with both Second System 54's normal memory operations and with First System 10's emulated memory operations. The emulation of First System 10 memory operations in Second System 54 in turn requires emulation of First System 10's memory management unit, that is, First System 10's hardware and software elements involved in memory space allocation, virtual to physical address translation, and memory protection in Second System 54. As described below, this emulation is implemented through use of Second System 52's native memory management unit to avoid the performance penalties incurred through a complete software emulation of First System 10's memory management unit.

As is well known, most systems operate upon the basis of virtual addresses and perform virtual to physical address translations relative to a predetermined base address, that is, by adding a virtual address as an offset address to the base address to determine the corresponding address in physical address space of the system. While First System 10 and Second System 52 may both use such addressing schemes, the actual addressing mechanisms of the two system may differ substantially, as may the memory protection schemes.

1. First System 10 Native Memory Mechanisms (FIGS. 5 and 6)

The native memory mechanisms of First System 10 implement a ring type protection system wherein Executive Program Tasks (EXP Tasks) 28 and Tasks 30 normally operate with two types of memory area respectively designated as a system memory area and user memory areas. The system areas are used for system level operations, such as the execution of executive level programs and the storage of the related data structures, while each user task executes operations and stores data associated with the execution of the task in a user memory area.

Each task is assigned to a given ring and the access permissions of a given task to information contained in a given memory space are determined by the respective assigned rings of the task and the ownership of the memory space, that is, whether the memory space is in the system memory area or in the user task memory area or areas. For example, system executive level tasks and operations, such as operating system functions executed by an EXP Task 28 are executed in ring 0 while Tasks 30 executing user operations are executed in higher order rings, such as rings 1, 2 and 3. As such, an EXP Task 28 executing in ring 0 will have read and write access privileges to data residing in the system memory area and read and write access privileges to user task data residing in the user task areas. User Tasks 30 will have read and write access privileges to user task data residing in selected user task areas but will have only read access privilege, at most, to data residing in the system area.

2. Mapping of First System 10 System Memory Area (SYSMEM) 110 and Independent-Memory Pool (IPOOL) 112 Areas into Second System 54 Memory Space (FIG. 5)

As will be described in further detail below and as illustrated in FIG. 5, First System 10 memory space as implemented in Second System 54 is organized as two types of regions, respectively indicated in FIG. 5 as the System Memory (SYSMEM) 110 area and the Independent-Memory Pool (IPOOL) 112 areas, which are accessed by two classes of tasks, that is, the executive level or operating system tasks and the user tasks. The access privileges of each class of task, as determined through the task ring numbers and memory area ownership, depends upon the class of the task and the ownership of the memory area being accessed, with executive tasks having read and write privileges to both the Independent-Memory Pool (IPOOL) 112 areas and the System Memory (SYSMEM) 110 area and the user tasks having read and write privileges to Independent-Memory Pool (IPOOL) 112 areas and read only privileges to the System Memory (SYSMEM) 110 area. The mapping of task access privileges onto First System 10's memory space as implemented in Second System 54's memory space is therefore a two dimensional process wherein one dimension is represented by the type of memory area, that is, whether a given memory area is the System Memory (SYSMEM) 110 area or an Independent-Memory Pool (IPOOL) 112, and the other dimension is represented by the class of the task, that is, whether a given task is an executive task or a user task.

As also described, Second System 54 in the described implementation of the invention is a AIX* based system, wherein AIX* is the International Business Machines Corporation version of the UNIX** operating system and wherein memory space is organized as AIX* type memory segments. It is necessary to map the memory access functions performed by First System 10's memory mechanisms onto Second System 54's memory space to accomplish the emulation of First System 10 on Second System 54 so that the First System 10 programs and tasks executing on Second System 54 may execute as if they were executing in the native First System 10 environment.

As illustrated in FIG. 6, each First System Virtual Address (FSVA) 126 is comprised of a Most Significant Bits field (MSB) 128 and an Address field (ADDR) 130 wherein Most Significant Bits field (MSB) 128 contains a bit field whose value identifies whether the address is directed to an executive memory area, that is, a system memory area, or to a user task memory area. For example, the Most Sigificant Bits field (MSB) 128 may contain the value 0000 (0) when the request is directed to the system memory area and the value 0001 (1) when the request is directed to a user task memory area.

The mapping of First System 10's memory management functions onto Second System 54's memory space and management functions is a two dimensional representation of First System 10's memory access functions as illustrated in FIG. 7 wherein the horizontal axis represents the class of the tasks requesting memory access, that is, executive task or user task, and the vertical axis represents the type of memory area, that is, the System Memory (SYSMEM) 110 area or an Independent-Memory Pool (IPOOL) 112 area. Each square represented in the two by two array of FIG. 6 thereby represents a combination, in First System 10, of a memory area and a class of task having access privileges to that area. The upper left square represents the combination of executive tasks with System Memory (SYSMEM) 110 area, the upper right square represents the combination of user tasks with System Memory (SYSMEM) 110 area, the lower left square represents the combination of executive tasks with Independent-Memory Pools (IPOOLs) 112 and the lower right square represents the combination of user tasks with Independent-Memory Pools (IPOOLs) 112.

The entries within each square of the two by two array represent, first, the number of the Second System segment to which the corresponding combination of First System memory area and class of task is mapped and, second, the access privileges of each combination of a class of First System 10 task and the corresponding First System 10 memory area. Thus it may be seen that the upper left square represents Second System 54 memory segment 3 and that First System 10 executive tasks have read and write privileges to segment 3 while the upper right square represents Second System 54 memory segment 4 and that First System 10 user tasks have read only privileges to segment 4. Second System 54 memory segments 3 and 4 thereby correspond to First System 10's System Memory (SYSMEM) 110 area but organized as two segments distinguished by the respective access privileges of First System 10's executive tasks and user tasks, wherein executive tasks have both read and write privileges to segment 3 while user tasks have only read privileges to segment 4.

In a like manner, Second System 54's memory segments 5 and 6 correspond to Independent-Memory Pools (IPOOLs) 112 and the First System 10 executive tasks and user tasks both have read and write access to these segments, just as First System 10 executive tasks and user tasks both have read and write access to Independent-Memory Pools (IPOOLs) 112. It should be noted that while segments 3 and 4 are distinguished by the respective access privileges of First System 10 executive and user tasks, segments 5 and 6 are not so distinguished because both the executive tasks and the user tasks have both read and write privileges to both segments, just as to Independent-Memory Pools (IPOOLs) 112. The mapping of Independent-Memory Pools (IPOOLs) 112 into two segments, that is, segments 5 and 6, is performed, however, to preserve symmetry with the mapping of System Memory (SYSMEM) 110 into segments 3 and 4, thereby simplifying the mapping of First System 10's memory access and management functions into Second System 54 as described below.

As represented in FIG. 5, System Memory (SYSMEM) 110 area and Independent-Memory Pools (IPOOLs) 112, indicated by the dashed line enclosures, are implemented in Second System 54's Hardware Element-Memory (HE-MEM) 58*b* in Segments 3, 4, 5 and 6 of Hardware Element-Memory (HE-MEM) 58*b* wherein there is, for each instance of an FSP 80 in Second System 54, a single instance of System Memory (SYSMEM) 110 area implemented as a matching pair of memory areas in Segments 3 and 4 and a plurality of Independent-Memory Pools (IPOOLs) 112, each implemented as a matching pair of memory areas in Segments 5 and 6 wherein each Independent-Memory Pool (IPOOL) 112 corresponds to a task actively executing in the instance of First System Process (FSP) 80.

As indicated in FIG. 5, the pair of memory areas comprising System Memory (SYSMEM) 110 area in Segments 3 and 4 is comprised of a System Memory Area Segment 3 (SMAS3) 132 "attached" from a System Memory Area Base Address 3 (SYSMEMBA3) 134 and a System Memory Area Segment 4 (SMAS4) 136 "attached" from a System Memory Area Base Address 4 (SYSMEMBA4) 138. In a like manner, the pair of memory areas comprising each Independent-Memory Pool (IPOOL) 112 is comprised of an Independent-Memory Pool Area Segment 5 (IPOOLS5) 140 area "attached" from an Independent-Memory Pool Base Address 5 (IPOOLBA5) 142 and an Independent-Memory Pool Area Segment 6 (IPOOLS6) 144 area "attached" from an Independent-Memory Pool Base Address 6 (IPOOLBA6) 146. While System Memory Area Base Address 3 (SYSMEMBA3) 134 and System Memory Area Base Address 4 (SYSMEMBA4) 138 are the same for all tasks executing within an FSP 80, Independent-Memory Pool Base Address 5 (IPOOLBA5) 142 and Independent-Memory Pool Base Address 6 (IPOOLBA6) 146 are different for each task actively executing in the FSP 80.

In correspondence with the memory protection scheme of First System 10, System Memory Area Segment 4 (SMAS4) 136 is attached from System Memory Area Base Address 4 (SYSMEMBA4) 138 with read only privilege while System Memory Area Segment 3 (SMAS3) 132 is attached from System Memory Area Base Address 3 (SYSMEMBA3) 134 with read and write privileges. In a like manner, each Independent-Memory Pool Area Segment 5 (IPOOLS5) 140 is attached from Independent-Memory Pool Base Address 5 (IPOOLBA5) 142 with read and write privileges and each Independent-Memory Pool Area Segment 6 (IPOOLS6) 144 is attached from Independent-Memory Pool Base Address 6 (IPOOLBA6) 146 with read and write privileges.

It must be noted that Second System 54 memory space, as organized under the AIX* operating system, is actually structured into 16 segments, of which certain segments are reserved, for example, to contain the AIX* operating system and system functions. More than four segments, that is, more segments than segments 3, 4, 5 and 6, are available for use by user processes executing Second System 54, however, and the mapping of First System 10 memory areas onto Second System 54 memory space may make use of these additional, available segments by a second mapping process performed by Pseudo Device Drivers (PSDDs) 74.

3. Emulation of First System 10 Memory Operations (FIG. 8)

Figure 8:
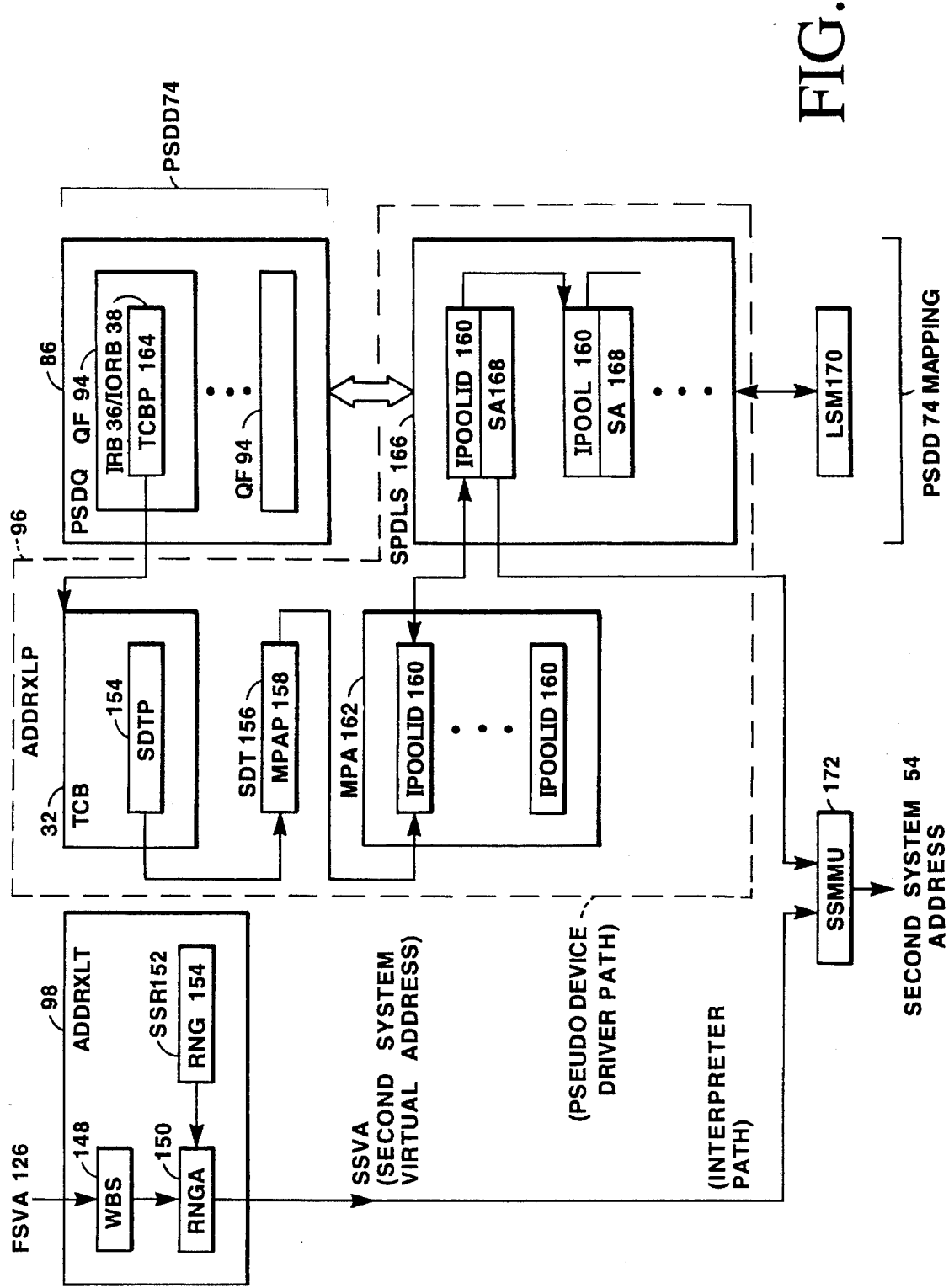

Referring to FIG. 8, and to FIGS. 2, 3, 5 and 6, therein is illustrated the mechanisms implemented on Second System 54 to emulate the memory access, protection, and management mechanisms of First System 10. It must be recognized in the following that the emulation of First System 10 memory operations on Second System 54 involves two different address conversion operations, one being the conversion of First System Virtual Addresses (FSVAs) 126 done by INTERPRETER 72 and the second being the conversion of First System Virtual Addresses (FSVAs) 126 done by Pseudo Device Drivers (PSDDs) 74. Each of these conversions is accomplished through translation and through mapping of First System 10 system and user memory areas into Second System 54 segments. The following will first describe the address translation operation performed by INTERPRETER 72, and then will describe the address translation operation performed by Pseudo Device Drivers (PSDDs) 74.

First considering the process of INTERPRETER 72 address translation, as has been described above, each First System Virtual Address (FSVA) 126 is comprised of a Most Significant Bits field (MSB) 128 and an Address field (ADDR) 130 wherein Most Sigificant Bits field (MSB) 128 contains a bit field whose value identifies whether the address is directed to an executive memory area, that is, System Memory (SYSMEM) 110 area, or to an Independent-Memory Pool (IPOOL) 112. For example, the Most Sigificant Bits field (MSB) 128 may contain the value 0000 (0) when the request is directed to the System Memory (SYSMEM) 110 area and the value 0001 (1) when the request is directed to an Independent-Memory Pool (IPOOL) 112 area.

As indicated in FIG. 8, the First System Virtual Address (FSVA) 126 of a request which includes a memory access is provided to Address Translation (ADDRXLT) 98. Address Translation (ADDRXLT) 98 includes a Word To Byte Shifter (WBS) 148 which performs an initial translation of the First System Virtual Address (FSVA) 126 from the First System 10 format, in which addresses are on a per word basis, to a Second System 54 virtual address, in which addresses are on a per byte basis. This translation is performed by a left shift of the First System Virtual Address (FSVA) 126 and, in the translation and as indicated in FIG. 7, the value in the Most Sigificant Bits field (MSB) 128 field of the First System Virtual Address (FSVA) 126 is transformed from 0000 (0) or 0001 (1) to 0000 (0) or 0010 (2), respectively.

Having performed the translation of a First System Virtual Address (FSVA) 126 into a per byte address, Address Translation (ADDRXLT) 98's Ring Adder (RNGA) 150 will read a System Status Register (SSR) 152 which, among other information, contains a Ring Number (RNG) 154 which contains a value indicating the First System 10 ring in which the task is executing, that is, a value of 0, 1, 2 or 3. As described, Ring 0 is reverved for system operations while Rings 1, 2 and 3 are used for user tasks. If the task is executing in Ring 0, that is, in system space, Ring Adder (RNGA) 150 will add 3 to the value (0 or 2) contained in Most Significant Bits field (MSB) 128 of the shifted First System Virtual Address (FSVA) 126. If the task is not executing in Ring 0, that is, is executing in Rings 1, 2, or 3 and thus in user task space, Ring Adder (RNGA) 150 will add 4 to the value (0 or 2) contained in Most Significant Bits field (MSB) 128 of the shifted First System Virtual Address (FSVA) 126. The final result will be a byte oriented First System Virtual Address (FSVA) 126 having a Most Significant Bits field (MSB) 128 which contains a value of 3, 4, 5 or 6, thereby indicating the Second System 54 memory space segment in which the address lies and an Address (ADDR) field 130 identifying a location within the segment.

Next considering the process of INTERPRETER 72 mapping of First System 10 system and user task memory areas into Second System 54 memory segments, it has been described that First System 10 operating system tasks and functions execute in a region referred to herein as System Memory (SYSMEM) 110 area while user tasks execute in regions referred to herein as Independent-Memory Pools (IPOOLs) 112 area and that these memory regions are mapped into Second System 54 memory segments. INTER- PRETER 72 segment mapping is performed when there is a change of the Task Control Blocks (TCBs) 32 whose code is being interpreted. A Task Control Block (TCB) 32 contains a Segment Descriptor Pointer (SDP) 154 to a Segment Descriptor Table (SDT) 156 associated with the task. Each Segment Descriptor Table (SDT) 156 in turn contains a Memory Pool Array Pointer (MPAP) 158 which in turn points to an Independent Memory Pool Identifier (MPID) 160 in a Memory Pool Array (MPA) 162. When the Independent Memory Pool Identifier (MPID) 160 of a new Task Control Block (TCB) 32 differs from the previous Independent Memory Pool Identifier (MPID) 160 of the previous Task Control Block (TCB) 32, the segments 5 and 6 are detached from INTERPRETER 72 and the new Independent Memory Pool Area is attached as segments 5 and 6.

The INTERPRETER 72 translation process always generates addresses in segments 5 and 6 for user task addresses, but because of dynamic detaching and attaching of Independent Memory Pools (IPOOLs) 112, the same addresses will refer to different Independent Memory Pools (IPOOLs) 112. The mapping of system memory areas remains the same, however, when switching from Task Control Block (TCB) 32 to Task Control Block (TCB) 32, so that the INTERPRETER 72 generated addresses in segments 3 and 4 always refer to the same locations.

The address conversion done by Pseudo Device Drivers (PSDDs) 74 differs from the address conversion done by INTERPRETER 72 in that it maps all the system memory address into segment 3 whereas user task addresses, depending on the Independent Memory Pool (IPOOL) 112 involved, could be mapped in any of segments 4 onwards.

Referring again to FIG. 8, therein is represented a Pseudo Device Driver Queue (PSDQ) 86 wherein each Pseudo Device Driver Queue (PSDQ) 86 is a part of a Pseudo Device Driver (PSDD) 74 and is associated with a corresponding Second System Kernel Process (SKP) 66 as described with reference to FIGS. 3 and 4. One of the Pseudo Device Driver Queues (PSDQs) 86 and its associated addressing structures and mechanisms is shown in partial detail for purposes of the following discussions. Further details of the structure and operations of Pseudo Device Drivers (PSDDs) 74 and Pseudo Device Driver Queues (PSDQs) 86 may be found in reference to the discussions regarding FIGS. 3 and 4.

As has been described, each Pseudo Device Driver Queue (PSDQ) 86 is associated with a corresponding Second System Kernel Process (SKP) 66 which executes the requests in the Pseudo Device Driver Queue (PSDQ) 86 and any Pseudo Device Driver Queue (PSDQ) 86 may contain requests from a plurality of tasks, each task in turn being associated with and executed in an Independent-Memory Pool (IPOOL) 112 area which is mapped into a Second System 54 memory segment by address translator (ADDRXLP) 96 which includes a Server Pool Descriptor Linked Set (SPDLS) associated with the Pseudo Device Driver Queue (PSDQ) 86, Task Control Block (TCB) 32, Segment Descriptor Table 156, and Memory Pool Array 162.

As described previously, each Pseudo Device Driver Queue (PSDQ) 86 contains Queue Frames (QFs) 94 which in turn contain the Indirect Request Blocks (IRBs) 36 passed from the First System tasks. Each Indirect Request Block (IRB) 36 in turn contains a Task Control Block Pointer (TCBP) 164 which points to the Task Control block (TCB) 32 associated with the task that generated the Indirect Request Block IRB 36.

As described, the Task Control Block (TCB) 32 contains a Segment Descriptor Pointer (SDP) 154 to a Segment Descriptor Table (SDT) 156 associated with the task. Each Segment Descriptor Table (SDT) 156 in turn contains a Memory Pool Array Pointer (MPAP) 158 which in turn points to an Independent-Memory Pool Identification entry (IPOOLID) 160 stored in the Memory Pool Array (MPA) 162. Each Pseudo Device Driver (PSDD) 74 maintains a Server Pool Descriptor Linked Set (SPDLS) 166 where the Independent Memory Pool Identification (IPOOLID) 160 is stored if currently attached by the Pseudo Device Driver (PSDD) 74.

In addition to the Independent Memory Pool Identification (IPOOLID) 160, the Server Pool Descriptor Linked Set (SPDLS) 166 also contains the Second System 54 Segment Address (SA) 168 where the Independent Memory Pool (IPOOL) 112 is attached. Unlike the instance of INTERPRETER 72, this Segment Address (SA) 168 may be anywhere from segment 4 onwards.

4. Management of Memory Space

As described above, in the present implementation of the emulation in Second System 54 each Second System Kernel Process (SKP) 66 of a Pseudo Device Driver 74 may have associated with it a plurality of Independent-Memory Pools (IPOOLs) 112, wherein the number of Independent-Memory Pools (IPOOLs) 112 associated with a Second System Kernel Process (SKP) 66 will be determined by the number of tasks for which the Second System Kernel Process (SKP) 66 has a request in its associated Pseudo Device Queue (PSDQ) 86.

As such, it is necessary to manage the Server Pool Descriptor Linked Set (SPDLS) 166 associated with each Second System Kernel Process (SKP) 66 to dynamically assign or reassign segments as required by the tasks having requests in the Pseudo Device Drivers (PSDDs) 74. For example, a Second System Kernel Process (SKP) 66 may be passed a request from a task whose Independent-Memory Pool (IPOOL) 112 is not among the set of Independent-Memory Pools (IPOOLs) 112 contained in the Server Pool Descriptor Linked Set (SPDLS) 166 associated with the Second System Kernel Process (SKP) 66, so that it is necessary to add the unattached Independent-Memory Pool (IPOOL) 112, corresponding to the task, to the Independent-Memory Pools (IPOOLs) 112 corresponding to the Pseudo Device Driver (PSDD) 74. In addition, it may be necessary to delete, or detach, one or more least recently used Independent-Memory Pools (IPOOLs) 112 from the Independent-Memory Pools (IPOOLs) 112 of the Server Pool Descriptor Linked Set (SPDLS) 166 in order to be able to attach a new Independent-Memory Pool (IPOOL) 112.

As indicated in FIG. 8, each Server Pool Descriptor Linked Set (SPDLS) 166 is managed by a Linked Set Manager (LSM) 168. A Pseudo Device Driver Queue (PSDQ) 86 receiving a request for a memory access will pass the identifier of its task to Linked Set Manager (LSM) 168. Linked Set Manager (LSM) 168 will determine whether an Independent-Memory Pool Identifier entry (IPOOLID) 160 corresponding to the task is in the Server Pool Descriptor Linked Set (SPDLS) 166 and, if it is, will reorder the linked set so that the Independent-Memory Pool Identifier entry (IPOOLID) 160 is at the head of the linked set by reordering the links connecting the Independent-Memory Pool Identifier entries (IPOOLIDs) 160, in the manner well known in the art. If the Server Pool Descriptor Linked Set (SPDLS) 166 does not contain an Independent-Memory Pool Identifier entry (IPOOLID) 160 corresponding to the task, Linked Set Manager (LSM) 168 will determine whether the Server Pool Descriptor Linked Set (SPDLS) 166 contains the maximum allowable number of Independent-Memory Pool Identifier entries (IPOOLIDs) 160 and, if the Server Pool Descriptor Linked Set (SPDLS) 160 does contain the maximum number of Independent-Memory Pool Identifier entries (IPOOLIDs) 160, will delete one or more least recently used Independent-Memory Pool Identifier entries (IPOOLID) 160 from the Server Pool Descriptor Linked Set (SPDLS) 166. Linked Set Manager (LSM) 168 will then construct a new Independent-Memory Pool Identifier entry (IPOOLID) 160 corresponding to the task and will enter the new Independent-Memory Pool Identifier entry (IPOOLID) 160 at the head of the linked set.

5. Summary of Memory Operations (FIG. 8)

It may be seen from the above descriptions, therefore, that, for any first system virtual address generated by a First System 10 task executing on Second System 54, INTERPRETER 72 will translate the First System 10 virtual address into a byte oriented virtual address containing a virtual address location within a segment and identifying a Segment 3, 4, 5 or 6 containing the location. The INTERPRETER 72 mapping of segments via ADDRXLT98 will in turn map each segment identified by an address translation into an Independent Memory Pool Identification (IPOOLID) 160 for the current task. The Segment/Independent Memory Pool mapping mechanism (i.e., ADDRXLP96) of the Pseudo Device Driver (PSDD) 74 executing the task request associated with the First System 10 virtual address will map the segment identified by the address translation mechanism to a current Independent Memory Pool (IPOOL) 112 location in System 54's memory by providing the base address corresponding to the Independent Memory Pool Identification (IPOOLID) 160.

E. Emulation of Disk Drives

As described, one of the types of First System 10 input/output operations emulated by the Pseudo Device Drivers (PSDDs) 74 of the present invention is the emulation of First System 10 disk input/output operations. It has been described that First System 10 performs disk input/output operations in response to a request from a task by creating an Indirect Request Block (IRB) 36 and a lower level task to execute the input/output operation, wherein the lower level task controls a disk Driver 44 to execute the operation, using information read from a resource control table describing the disk drive to control the operation.

The information contained in the resource control table, and the specific operations executed by the Driver 44 in executing the request, are determined by the type of disk drive involved in the operation. In the instance of an intelligent disk drive, for example a SCSI type drive, the resource control table essentially contains only information identifying the type of drive. The capacity of the drive is read from the drive itself and no further information is required because the drive itself contains the "intelligence" to perform the majority of operations necessary to read from or write to the drive. In the instance of an older or less "intelligent" drive, however, the resource control table must identify not only the type and capacity of the drive, but must provide information sufficient for the Driver 42 to perform detailed control of the drive.

The emulation mechanisms of the present invention thereby allow First System 10 to use virtually any type of input/output device so long as it is of a type suitable for the requested input/output operation, and in particular any type of disk drive. That is, a task need only issue a request for a disk input/output operation, wherein the request identifies the disk unit to be read from or written to and the information to be read or written. Thereafter, the corresponding Driver 44 will read the information describing the characteristics of the disk drive that are necessary to execute the operation from the corresponding resource control table and will read the "capacity" of the "drive" from the second system process emulating the drive and will execute the requested operation. The requesting task need not be aware of, or constrained by, the specific type of disk drive to which the operation was performed.

It is apparent from the above descriptions of the present invention for emulating a First System 10 on a Second System 54 that, because of the level at which the boundary between First System 10 operations and Second System 54 operations is drawn, the tasks executing "in" First System 10 are not aware of the detailed operation of the Second System 52 processes executed in performing disk input/output requests. As such, the present invention provides essentially complete freedom in the manner in which Second System 52 actually performs all input/output operations, including disk input/output operations.

According to the present invention, therefore, and because the emulation mechanisms of the present invention allow First System 10 to use virtually any type of disk drive, all disk drives for First System 10 tasks executing on Second System 52 in emulation of First System 10 are defined in the resource control tables of Emulator Executive Level (EEXL) 64 to be intelligent drives, such as SCSI drives. As such, the only information required from the resource control tables to perform an input/output operation is the identification of drive type, as a SCSI drive, and the "drive capacity" provided by the second system process emulating the disk drive. The Second System Kernel Processes (SKPs) 66 actually performing the emulated input/output operations are free to perform any operation that will result in a transfer of the requested data to or from the requesting First System 10 task executing in First System Process (FSP) 80.

In addition, and because the emulated drive is transparent to the requesting task, that is, the First System 10 tasks are not aware of the actual characteristics of the disk drive emulated by the corresponding Pseudo Device Driver (PSDD) 74, the emulated disk drive defined by the corresponding resource control table may be of any capacity and is not constrained either by the characteristics of the actual Second System 54 hardware device used to perform the operation or by the characteristics of the "native" First System disk drives.

Referring now to the Second System 54 processes emulating disk input/output operations, the Second System Kernel Processes (SKPs) 66 performing disk input/output operations are implemented as standard UNIX type file input/output processes, as are well known in the art, and the "capacity" of the "drive" as provided by the file input/output processes emulating a disk drive are, in fact, the capacity of the file to which the file input/output operation is performed. As a result, the actual Second System 54 operations performed in emulating First System 10 disk input/output operations are completely under the control of Second System 54. As a consequence, Second System 54 may use any of its native hardware devices to actually perform the emulated disk input/output operations without constraint from the tasks of First System 10. For example, Second System 54 may use any of its native disk drives for the operations, and need not use a disk drive at all but may use any other device capable of providing the desired result, such as a non-SCSI drive.

It should be noted with regard to the above that, in the "native" First System 10 environment, the information contained in a disk drive is contained in a "volume" wherein a "volume" can contain one or a plurality of files. In the emulation of disk drives on Second System 54, however, a First System 10 "volume" is treated as and is a Second System 54 file, in accordance with Second System 54's emulation of disk operations as file input/output operations.

In addition, it is known that SCSI type disk drives are conventionally fixed devices, that is, cannot be "mounted" to or "dismounted" from a system and a conventional SCSI drive is therefore essentially a fixed system resource. According to the present invention, however, the disk drives emulated by Second System 54 are presented to the tasks of First System 10 as SCSI drives but in fact are actually Second System 54 files, although the First System 10 tasks "see" the emulated disk input/output only as SCSI drives. As files are "mountable" units, the Second System 54 files and file input/output operations used to emulate First System 10 disk drives thereby appear to First System 10 to be "mountable" disk drives, effectively providing mountable "SCSI" disk drives.

F. Appendices

The structure and operation of the present invention are further described by reference to the following Appendices which contain program listings for Memory Queue Interface (MQI) 84 and Escape/Call Mechanism (EscapeC) 100, Pseudo Network Layer (PNL) 76a residing and executing in First System Executive Level (FEXL) 16 as a native First System 10 program module and Pseudo Network Driver (PND) 76b, INTERPRETER 72 and the address/segment translation and mapping functions.

All rights, including copyrights, in the subject matter in the Appendices are vested in and the property of Bull HN Information Systems Incorporated of Billerica, Mass., the assignee of the present patent application and any ensuing patent or patents and Bull HN Information Systems Incorporated retains and reserves all rights in the Appendices. Bull FIN Information Systems Incorporated, however, grants permission to reproduce the materials in the Appendices for the purposes of prosecution of and issuance of or reproduction of the present patent application and any ensuing patent or patents and for study as necessary for the understanding and teaching of the present invention, but for no other purposes.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

48A
APPENDICES

APPENDIX A - MQI            =    Pages A1-A20

APPENDIX B - PNET           =    Pages B1-B46

APPENDIX C - PNETX          =    Pages C1-C241

APPENDIX D - IPOOL MACROS
            AND ASSOCIATED
            ROUTINES        =    Pages D1-D7

APPENDIX A - MQI

A1

```

#   Name:       emu_loop.s
#   Purpose:    Interface between C-code (emu_main) and RISC (interpreter)
#   Input:
#   Output:

#include "aix_regs.h"
#include "mcl_head.h"

#define monitor_call(code,function) \
.extern .function;                  \
        cmpli   2,w0,code;          \
        bne     2,$+16;             \
        mr      3,rim;              \
        bl      .function;          \
        b       Mcl_exit
#define monitor_callx(code)         \
.extern .function;                  \
        cmpli   2,w0,code;          \
        bne     2,$+12;             \
        mr      iw,w0;              \
        b       Callx;
#define resource_call(code,function) \
.extern .function;                  \
        cmpli   2,z,code;           \
        bne     2,$+16;             \
        mr      3,rim;              \
        bl      .function;          \
        b       tracer
#define CIP_call(code,function)     \
.extern .function;                  \
        cmpli   2,iw,code;          \
        bne     2,$+16;             \
        mr      3,rim;              \
        bl      .function;          \
        b       cipout
#define ldr(tgt,src)                \
        lha     tgt,src(w0)
#define ldb(tgt,src)                \
        l       tgt,src(w0);        \
        sli     tgt,tgt,1;          \
        a       tgt,tgt,bs
#define REBASE(tgt)                 \
        l       dt,tgt;             \
        sf      dt,bs,dt;           \
        a       dt,w1,dt;           \
        st      dt,tgt .file   "emu_loop.s"
.globl  emu_loop[ds]
.csect  emu_loop[ds]
.long   .emu_loop[PR]
.globl  .emu_loop[PR]
.csect  .emu_loop[PR]
emu_loop:
        ai      sp,sp,-16       # get a little stack space
        mflr    z               # get return link
        st      z,4(sp)         # stack return link
        mr      rim,3           # get arg[rim_ptr]
        l       z,rim*4(rim)    # read rim value from rim array
        cmp     2,z,rim         # verify consistency of rim_ptr
        stm     4,cregs         # save C context for eventual return
.extern .panic;
        beq     2,$+8           # skip if OK
        b       .panic          # in case of fire, yell FIRE???
        lm      4,aregs         # get asm context
        l       z,_soi          # get virtual soi
        l       c3,c3*4(rim)    # get xe table ptr
        cmpl    0,z,w2          # test if trojan modified soi
        lil     z,0
        mtcrf   0x10,z          # clear CR3 field
        beq     0,_no_trji
        crorc   14,14,14        # set trojan active flag
        cror    12,13,14        # signal rupt
_no_trji:
```

A2

```
        l       w0,_sdtptr      # get segment descriptor table ptr
        l       w1,opt          # get option flags
        cmpi    2,w0,0          # test for valid segment desc pointer
        andil.  z,w1,VM         # test virtual pool option flag
        crnor   15,2,10         # no v pool if ((opt.VM == 0) || (SDTP == 0))
        l       w0,_fp_cns      # load ms 16 bits of highest FP reg
        lfd     FP_ZRO,0(w0)    # load fp reg with constant zero
        lfd     FP_MAX,8(w0)    # load fp reg with constant DPS6 FP max
        lfd     FP_MIN,16(w0)   # load fp reg with constant DPS6 FP max
        mtfsfi  7,0x01          # set rounding mode to -> 0
        l       w0,iv           # get IV (-> ISA)
        andil.  w1,w1,Boot      # test boot flag
        beq     0,go            # skip if standalone

# load R1-6, B1-7 and M1 from ISA passed to us

        ldr(r1,R1)
        ldr(r2,R2)
        ldr(r3,R3)
        ldr(r4,R4)
        ldr(r5,R5)
        ldr(r6,R6)
        ldr(ci,M1)
        andil.  ci,ci,0x00ff
        sli     ci,ci,8
        ldb(b1,B1)
        ldb(b2,B2)
        ldb(b3,B3)
        ldb(b4,B4)
        ldb(b5,B5)
        ldb(b6,B6)
        ldb(b7,B7)
go:
        lha     iw,0(p)         # fetch first instruction word
        b       pre_soi         # enter interpreter
.extern pre_soi
.globl  Quit
Quit:
        lm      4,aregs         # get asm context
        cmpi    2,iw,1          # MCL?
        bne     2,Hlt           # skip unless MCL
        mr      3,r2            # standalone TRMRQ
        b       Back            # join returning flow
Hlt:
        l       3,ph            # retrieve PH
        sf      3,bs,3          # debase
        sri     3,3,1           # descale for error report
Back:
        lm      4,cregs         # restore C context
        l       z,4(sp)         # retrieve return link
        ai      sp,sp,16        # relinquish stack frame
        mtlr    z               # put link where it will help
        br                      # return to main
# return (temporary or permanent) from interpreter
.globl  Crtn
Crtn:
        l       w1,opt          # get option flags
        st      rim,0(sp)       # save rim in stack
        andil.  w1,w1,Boot      # test boot flag
        l       w2,_soi         # get virtual soi
        stm     4,aregs         # save asm context
        stfd    1,cip_1op0      # save fp context
        stfd    2,cip_1op2      # save fp context
        stfd    3,cip_2op0      # save fp context
        l       w2,bs_ptr       # get pointer to base
        st      bs,0(w2)        # send current base to C
        liu     dt,0xdead       # prepare to change
        oril    dt,dt,0xdead    #       preempt flag
        l       w1,baser0       # get pointer to hdm
        beq     0,Rqst          # detour if standalone
        st      dt,RR_LIVE(w1)  # store preempt flag
Rqst:
        cmpi    2,iw,MCL        # MCL?
        beq     2,Mcl           # skip if MCL
# macro calls to identify request:
        CIP_call(MAT, L6X_mat)
        CIP_call(AME, L6X_ame)
```

A3

```
        CIP_call(DME, L6X_dme)
.extern _sip_save
Callx:                              # start for resource-like MCL's
        l       ea,iv
        rlinm   ea,ea,0,4,31        # debase iv
        st      ea,_pre_iv
        stm     w2,cip_3op0         # save work registers
        l       w2,baser0
        a       ea,w2,ea
        l       z,2(ea)             # get ISM1 & ISM2
        rlinm.  z,z,0,22,22
        cal     ea,SI(ea)
        beq     0,tr_no_sip
        bl      _sip_save
tr_no_sip:
        lm      w2,cip_3op0         # restore work registers
        rlinm   z,iw,0,16,31
        resource_call(REQ, iw_req)
        resource_call(WAIT, iw_wait)
        resource_call(TSK, iw_tsk)
        resource_call(0, iw_lev)
        resource_call(RTDC, iw_rtdc)
        resource_call(UCUMUL, iw_ucumul)
        resource_call(RTCN, iw_rtcn)
        resource_call(RTCF, iw_rtcf)
        resource_call(WDTN, iw_wdtn)
        resource_call(WDTF, iw_wdtf)
        resource_call(MCLACCPT, mcl_accept)
        resource_call(MCLRCVFM, mcl_recvfrom)
        resource_call(MCLRCVMS, mcl_recvmsg)
        resource_call(MCLRECV, mcl_recv)
        resource_call(MCLSEND, mcl_send)
        resource_call(MCLSNDTO, mcl_sendto)
        resource_call(MCLSNDMS, mcl_sendmsg)
        cmpi    2,iw,0x7fff         # test for iw > 16 bits
        ble     2,$+16              # skip if not
        mr      3,rim               # SWFLT, save regs
        bl      .iw_lev             #   and call the dumper
        b       tracer              # resume (if you can)
        andil.  z,z,OPMSK           # eliminate AS from iw for LEV
        resource_call(LEV, iw_lev)
.extern .res_unk
        st      w0,r1*4(rim)        # res_unk will print r1 from memory
        mr      3,rim
        bl      .res_unk
.extern _sip_restore
.globl  tracer
tracer:
        bl      Back2I              # prepare to return to Interpreter
        l       ea,iv
        rlinm   ea,ea,0,4,31        # debase new iv
        l       z,_pre_iv
        cmp     2,z,ea
        beq     2,trace2
        stm     w2,cip_3op0         # save work registers
        l       w2,baser0
        a       ea,ea,w2
        l       z,2(ea)             # get ISM1 & ISM2
        rlinm.  z,z,0,22,22
        cal     ea,SI(ea)
        beq     0,$+8
        bl      _sip_restore
        lm      w2,cip_3op0         # restore work registers
        b       trace2
Mcl:                                # test for resource-like MCL's first
        monitor_callx(MCLACCPT)
        monitor_callx(MCLRCVFM)
        monitor_callx(MCLRCVMS)
        monitor_callx(MCLRECV)
        monitor_callx(MCLSEND)
        monitor_callx(MCLSNDTO)
        monitor_callx(MCLSNDMS)

l       w1,baser0           # access HDM
        l       z,0x00fc(w1)        # get TVC1 thp
        andil.  z,z,0x0001          # test oddness of THP01
```

A4

```
        l      z,baser0       # get ring0 base
        cmp    2,bs,z         # already ring0?
        st     bs,workbs      # save working base
        st     z,0(w2)        # save ring0 base
        beq    0,Mcl_rdy      # skip if not inward call
        beq    2,Mcl_rdy      # skip if no change needed
        REBASE(rim_p)
        REBASE(rim_b1)
        REBASE(rim_b2)
        REBASE(rim_b3)
        REBASE(rim_b4)
        REBASE(rim_b5)
        REBASE(rim_b6)
        REBASE(rim_b7)
        REBASE(iv)
        REBASE(t)
        REBASE(rdbr)
Mcl_rdy:
        monitor_call(MCL_DQSA, mcl_dqsa)
        monitor_call(MCL_CTIME, mcl_time)
        monitor_call(MCL_ITIME, mcl_time)
        monitor_call(MCL_TROJAN, mcl_trojan)
        monitor_call(MCL_POST_CLM_VM, mcl_pclm)
        monitor_call(MCL_POOL_ADDR, mcl_taddr)
        monitor_call(MCL_DEVID, mcl_devid)
        monitor_call(MCL_DELCH, mcl_delch)
        monitor_call(MCL_STAT, mcl_stat)
        monitor_call(MCL_LINCH, mcl_linch)
        monitor_call(MCLWKNAM,ZQNY08__return_workstation_name)
        monitor_call(MCLWKCMP,ZQNY09__return_workstation_components)
        monitor_call(MCLWKRLA,ZQNY18__return_loc_addr)
        monitor_call(MCLDDVST,ZQNY20__device_driver_status)
        monitor_call(MCLRDIOT,ZQNY21__return_device_timeout)
        monitor_call(MCLUDIOT,ZQNY22__update_device_timeout)
        monitor_call(MCLWKPRR,ZQNY41__replace_profile_with_named_profile)
        monitor_call(MCLWKUPA,ZQNY42__update_workstation_parms)
        monitor_call(MCLWKRPA,ZQNY44__return_workstation_parms)
        monitor_call(MCLDVRPA,ZQNY45__return_device_parms)
        monitor_call(MCLMLXUP,ZQNY50__update_mlx_conn_parms)
        monitor_call(MCLLANUP,ZQNY60__update_lan_conn_parms)
        monitor_call(MCLLANGP,ZQNY61__return_lan_conn_parms)
        monitor_call(MCL_GDTM, mcl_gdtm)
        monitor_call(MCL_SUSPN, mcl_suspn)
        monitor_call(MCL_EXTDT, mcl_extdt)
        monitor_call(MCL_EXTET, mcl_extet)
        monitor_call(MCL_USOUT, mcl_usout)
        monitor_call(MCL_USIN, mcl_usin)
        monitor_call(MCL_USERS, mcl_users)
        monitor_call(MCL_VERBOSE, mcl_verbose)
        monitor_call(MCL_SetDate, mcl_setdate)
        monitor_call(MCL_STOP_HVX, mcl_stop_hvx)
        monitor_call(MCL_CPX_LRN, mcl_cpx_lrn)
        monitor_call(MCL_LINK_LRN, mcl_link_lrn)
        monitor_call(MCL_DUMP, mcl_dump)
        monitor_call(MCL_NOP, mcl_nop)
        monitor_call(MCL_TRMRQ, mcl_trmrq)
        monitor_call(MCL_SDT_SZE,mcl_sdt_sze)
        monitor_call(MCL_INIT_SDT,mcl_init_sdt)
        monitor_call(MCL_GET_SDT,mcl_get_sdt)
        monitor_call(MCL_INV_TADDR,mcl_inv_taddr)
        monitor_call(MCL_GET_SUBSDT,mcl_get_subsdt)
        monitor_call(MCL_ACT_SEG,mcl_act_seg)
        monitor_call(MCL_DEACT_SEG,mcl_deact_seg)
        monitor_call(MCL_INV_SDTE_1,mcl_inv_sdte_1)
        monitor_call(MCL_INV_SDTE_2,mcl_inv_sdte_2)
        monitor_call(MCL_GET_VPO,mcl_get_vpo)
        monitor_call(MCL_BUILD_RMTS,mcl_build_rmts)
        monitor_call(MCL_INV_RMTS,mcl_inv_rmts)
        monitor_call(MCL_ENT_R2,mcl_ent_r2)
        monitor_call(MCL_XIT_R2,mcl_xit_r2)
        monitor_call(MCL_GET_SWO,mcl_get_swo)
        monitor_call(MCL_GET_SWVA,mcl_get_swva)
        monitor_call(MCLSOCKT, mcl_socket)
        monitor_call(MCLBIND, mcl_bind)
        monitor_call(MCLCNNCT, mcl_connect)
        monitor_call(MCLGTPNM, mcl_getpeername)
        monitor_call(MCLGTSNM, mcl_getsockname)
```

A5

```
        monitor_call(MCLGTSOP, mcl_getsockopt)
        monitor_call(MCLLISTN, mcl_listen)
        monitor_call(MCLSHUTD, mcl_shutdown)
        monitor_call(MCLSSKOP, mcl_setsockopt)
        monitor_call(MCLCLOSE, mcl_sclose)
        monitor_call(MCLSCKPR, mcl_socketpair)
        monitor_call(MCLIOCTL, mcl_socketioctl)
.extern .mcl_unk
        st      w0,r1*4(rim)    # mcl_unk will print r1 from memory
        mr      3,rim
        bl      .mcl_unk
Mcl_exit:
        l       rim,0(sp)       # unstack rim ptr
        l       w2,bs_ptr       # retrieve pointer to base
        l       w1,workbs       # retrieve temporary base
        l       bs,0(w2)        # retrieve caller's base
        cmp     2,bs,w1         # was there a ring change?
        beq     2,trace1        # skip if not
        REBASE(rim_p)
        REBASE(rim_b1)
        REBASE(rim_b2)
        REBASE(rim_b3)
        REBASE(rim_b4)
        REBASE(rim_b5)
        REBASE(rim_b6)
        REBASE(rim_b7)
        REBASE(iv)
        REBASE(t)
        REBASE(rdbr)
        b       trace1
.extern trap
.globl cipout
cipout:
        bl      Back2I          # prepare to return to Interpreter
        l       w1,q1           # fetch C return bits for cip traps
        rlinm.  w1,w1,9,0,4     # left justify & check trap bits
        beq     0,trace2        # no trap bits set - return to interpreter
        ai      p,p,-2          # reset p before entering common trap handler
        cntlz   w1,w1           # count leading zeros to trap bit
        lil     w0,0x40-29      # set trap handler to #29
        a       w0,w1,w0        # adjust to correct trap handler
        b       trap            # common trap exit

# prepare to re-enter interpreter:

trace1:
        bl      Back2I          # prepare to return to Interpreter
trace2:
        mtctr   w2
        lha     iw,0(p)         # fetch instruction word
        bctr                    # re-enter interpreter @ virtual soi

# Routine to prepare to re-enter interpreter:

Back2I:
        l       rim,0(sp)       # unstack rim ptr
        l       w1,_sdtptr      # get segment descriptor table ptr
        l       w0,_C_soi       # get ptr -> C_soi
        cmpi    2,w1,0          # test for valid segment desc pointer
        l       w2,_soi         # get ptr -> virtual soi
        l       w1,opt          # get option flags
        lfd     1,cip_1op0      # restore fp context (SA1)
        andil.  z,w1,VM         # test virtual pool option flag
        lfd     2,cip_1op2      # restore fp context (SA2)
        lfd     3,cip_2op0      # restore fp context (SA3)
        crnor   15,2,10         # no v pool if ((opt.VM == 0) || (SDTP == 0))
        cmp     2,w2,w0         # is trojan (still) active?
        andil.  z,w1,Boot       # test option flag
        l       c3,c3*4(rim)    # get xe table ptr
        lm      4,aregs         # get asm context, r4-r31
        cror    14,8,9          # trojan inactive iff w2 = &(soi)
        cror    12,13,14        # if trojan active, set cr12 also
        l       w0,_fp_cns      # get ptr to fp constants
        lfd     FP_ZRO,0(w0)    #
        lfd     FP_MAX,8(w0)    #
        lfd     FP_MIN,16(w0)   # restore fp constants
```

5

A6

```
        beqr    0                      # return if standalone execution
        l       iw,baser0              # get pointer to hdm
        liu     dt,0xable              # prepare to change
        oril    dt,dt,0xable           #       preempt flag
        st      dt,RR_LIVE(iw)         # change preempt flag
        br                             # return

# trojan options entry point

.globl  troj
troj:
        l       w1,opt                 # get option flags
        st      rim,0(sp)              # save rim in stack
        andil.  w1,w1,Boot             # test boot flag
        l       w2,_soi                # get virtual soi
        stm     4,aregs                # save asm context
        liu     dt,0xdead              # prepare to change
        oril    dt,dt,0xdead           #       preempt flag
        beq     0,standalone           # detour if standalone
        l       w2,baser0              # get pointer to hdm
        st      dt,RR_LIVE(w2)         # store preempt flag
        l       w2,bs_ptr              # get pointer to base
        st      bs,0(w2)               # send current base to C
standalone:
        mr      3,rim
.extern .troj_bp
        bl      .troj_bp               # enter "C" trojan code
        l       rim,0(sp)              # unstack rim ptr
        l       w0,_C_soi              # get ptr -> C_soi
        l       w1,opt                 # get option flags
        l       w2,w2*4(rim)           # get new w2 value
        l       bs,bs*4(rim)           # reestablish memory addressability
        cmp     2,w2,w0                # is trojan (still) active?
        andil.  w1,w1,Boot             # test option flag
        liu     dt,0xable              # prepare to change
        oril    dt,dt,0xable           #       preempt flag
        cror    14,8,9                 # trojan inactive iff w2 = &(soi)
        cror    12,13,14               # if trojan active, set cr12 also
        beq     0,$+12                 # skip if standalone
        l       iw,baser0              # get pointer to hdm
        st      dt,RR_LIVE(iw)         # change preempt flag
        lm      4,aregs                # get asm context
        mtctr   w2                     # set TID
        l       c3,c3*4(rim)           # get ptr to XE table
.extern .Phist
        b       Phist                  # re-enter interpreter
```

A7

```
/*
 *  Name:        emu_mqi.c
 *  Purpose:     queuing functions
 *  Functions in this module:
 */
void             init_mqi();
void             mqi_qot();
void             mqi_qoh();
struct MQI_LINKS *mqi_dqh();
void             mqi_qot_nolock();
int              mqi_cancel();
int              mqi_find_exact_nolock();
int              mqi_find();
void             mqi_insert();
void             mqi_qoh_nolock();
struct MQI_LINKS *mqi_dqh_nolock();
void             mqi_insert_nowake();

#include "sys_head.h"
include "emu_head.h"
#include "macro.h"
#include "mqi_head.h"
#include "z3hdm.h"

extern char            *base;        /* -> HVX hardware dedicated memory */
extern struct EMU_OPTS opt;          /* run-time options */
extern struct MQI      *saq;         /* -> software active queue */
extern struct SCB      *scb;         /* -> system control block */
static union MATH      math;

/***********
 * init_mqi * initialize q, get and leave unlocked q semaphore
 **********/
void
init_mqi(qh, n)
struct MQI      *qh;                 /* queue structure to be initialized */
int             n;                   /* 1 to associate semaphore with queue, 0
                                      * if none */
{
    if (n)
        get_sem(&qh->isem.sid);
    qh->active_servers = 1;
    math.ptr = (char *) &qh->rqh;
    PUT4(qh->rqh.fwd, math.adrs);
    qh->rqh.priority = 0;
    qh->enq_cnt = 0;
    qh->deq_cnt = 0;
    qh->req_cnt = 0;
    qh->wak_cnt = 0;
    qh->pid = 0;
    qh->fdes = 0;
}                                    /* init_mqi */

/**********
 * mqi_qot *         q on tail by priority
 **********/
void
mqi_qot(qh, nb)
struct MQI       *qh;                /* head queue structure */
struct MQI_LINKS *nb;                /* new block queue structure */
{
    struct MQI_LINKS *hptr;
    struct MQI_LINKS *tptr;
    int              qpos, qtop;

lock(qh->isem.sid);
    qpos = mqi_find(qh, nb, &hptr, &tptr);
    if (qpos != -1)
    {
        mqi_insert(qh, nb, tptr);
    }
    else
    {
        unlock(qh->isem.sid);
    }                                /* else (i.e. duplicate) */
```

1

```
        if (qh != saq)
            return;
        lock(saq->isem.sid);
        GET4(math.adrs, saq->rqh.fwd);
        qtop = (int) *(math.ptr + 1);
        if (math.adrs == (ulong) saq)
        {
            unlock(saq->isem.sid);
            return;                         /* SAQ empty */
        }
        if ((qtop > CLK_LVL) && (qtop < TCB_DELTA))
        {
            unlock(saq->isem.sid);
            return;                         /* IRB */
        }
        if (qtop > TCB_DELTA)
            qtop -= TCB_DELTA;
        if ((qtop < saq->Cur_Pri)          /* top entry beats current */
           || (qpos == -1))                /* duplicate entry not queued */
        {
            kill(saq->isem.pid, SIGFPE);   /* rupt interpreter at EOI */
        }
        unlock(saq->isem.sid);
}                                           /* mqi_qot */
/**********
 * mqi_qoh *
 **********/           q on head by priority
void
mqi_qoh(qh, nb)
struct MQI      *qh;                        /* head queue structure */
struct MQI_LINKS *nb;                       /* new block queue structure */
{
    struct MQI_LINKS *hptr;
    struct MQI_LINKS *tptr;
    int              qpos, qtop;

lock(qh->isem.sid);
    qpos = mqi_find(qh, nb, &hptr, &tptr);
    if (qpos != -1)
    {
        mqi_insert(qh, nb, hptr);
    }
    else
    {
        unlock(qh->isem.sid);
    }
    if (qh != saq)
        return;
    lock(saq->isem.sid);
    GET4(math.adrs, saq->rqh.fwd);
    qtop = (int) *(math.ptr + 1);
    if (math.adrs == (ulong) saq)
    {
        unlock(saq->isem.sid);
        return;                             /* SAQ empty */
    }
    if ((qtop > CLK_LVL) && (qtop < TCB_DELTA))
    {
        unlock(saq->isem.sid);
        return;                             /* IRB */
    }
    if (qtop > TCB_DELTA)
        qtop -= TCB_DELTA;
    if ((qtop < saq->Cur_Pri)              /* top entry beats current */
       || (qpos == -1))                    /* duplicate entry not queued */
    {
        kill(saq->isem.pid, SIGFPE);       /* rupt interpreter at EOI */
    }
    unlock(saq->isem.sid);
}                                           /* mqi_qoh */
/**********
 * mqi_dgh *
 **********/     dequeue highest priority
struct MQI_LINKS *
```

A9

```c
mqi_dqh(qh)
struct MQI      *qh;                    /* head queue structure */
{
    struct MQI_LINKS *ob;                /* block to be dequeued */
    struct HDM       *hdm_base;          /* -> hardware dedicated memory */ lock(qh->isem.sid);
    GET4(math.adrs, qh->rqh.fwd);
    if (math.adrs == (unsigned long) qh)
    {
        /* queue is empty */
        qh->active_servers--;
        qh->slp_cnt++;
        unlock_sleep(qh->isem.sid);
        lock(qh->isem.sid);
    }
    GET4(math.adrs, qh->rqh.fwd);        /* q is empty */
    ob = (struct MQI_LINKS *) math.adrs;
    /* document the priority of the task just dequeued from SAQ (dispatched)
     * for HVS slicer benefit, recording the priority in HVS offset 15 (which
     * native hardware uses for real time clock purposes) */
    if (qh == saq && ob->priority >= TCB_DELTA)
    {
        hdm_base = (struct HDM *) base;
        hdm_base->h_rtcc = ob->priority - TCB_DELTA;
    }
    GET4(math.adrs, ob->fwd);
    PUT4(qh->rqh.fwd, math.adrs);        /* remove ob from chain */
    qh->req_cnt--;
    qh->deq_cnt++;
    unlock(qh->isem.sid);
    return (ob);
}                                        /* mqi_dqh */

/*****************
 * mqi_qot_nolock *
 *****************/                       q on tail by priority - lock by user
void
mqi_qot_nolock(qh, nb)
struct MQI      *qh;                     /* head queue structure */
struct MQI_LINKS *nb;                    /* new block queue structure */
{
    struct MQI_LINKS *hptr;
    struct MQI_LINKS *tptr;
    int             qpos, qtop;

qpos = mqi_find(qh, nb, &hptr, &tptr);
    if (qpos != -1)
    {
        mqi_insert_nowake(qh, nb, tptr);
    }
    else
    {
/*      syslog(LOG_DEBUG, "mqi QOT rejecting duplicate entry."); */
    }                                    /* else (i.e, duplicate) */
    if (qh != saq)
        return;
    GET4(math.adrs, saq->rqh.fwd);
    qtop = (int) *(math.ptr + 1);
    if ((math.adrs != (ulong) saq) &&    /* SAQ not empty */
        (((qtop <= CLK_LVL) &&
          (qtop < saq->Cur_Pri)) ||      /* top entry is a TCB */
         ((qtop > TCB_DELTA) &&
          (qtop < saq->Cur_Pri + TCB_DELTA))))  /* which beats current */
    {
/*      kill(saq->isem.pid, SIGFPE);     /* rupt interpreter at EOI */
    }
}                                        /* mqi_qot_nolock */

/*************
 * mqi_cancel *
 *************/
int
mqi_cancel(qh, nb)
struct MQI      *qh;                     /* head queue structure */
```

A10

```
    struct MQI      *nb;            /* new block queue structure */
{
    struct MQI_LINKS *hptr;
    struct MQI_LINKS *tptr;
    signed int      status;

if ((status = mqi_find_exact_n0lock(qh, nb, &hptr, &tptr)) == -1)
    {
        memcpy(hptr->fwd, tptr->fwd, sizeof(tptr->fwd));    /* reestablish link */
    }
    else
    {
/*      syslog(LOG_DEBUG,
            " Frame at %x not in queue at %x: nothing to remove",
            nb, qh); */
    }
    return (status);
}                                   /* mqi_cancel */
/************************
* mqi_find_exact_nolock * search mqi chain for nb ptr, user must lock
************************/
int
mqi_find_exact_nolock(qh, nb, hptr, tptr)
struct MQI      *qh;
struct MQI_LINKS *nb, **hptr, **tptr;

/*
* starting at q_frame, qh, scan queue looking for
*       -> frame at given 'nb' (returned in *tptr)
*       -> frame before 'nb' (returned in *hptr)
* return -1 if 'nb' frame found, 0 if queue was empty, else count frames
*/
{
    ushort          i, pri;
    struct MQI_LINKS *nxt, *tmp;

pri = nb->priority;         /* new block priority */
    tmp = (struct MQI_LINKS *) qh;
    GET4(math.adrs, qh->rqh.fwd);
    nxt = (struct MQI_LINKS *) math.adrs;       /* fwd ptr from q-hdr */
    for (i = 0, *hptr = tmp, *tptr = tmp;; i++)
    {
        GET4(math.adrs, (*tptr)->fwd);
        nxt = (struct MQI_LINKS *) math.adrs;   /* advance lookahead ptr */
        *tptr = nxt;                            /* bring output ptr forward */
        if (nxt == nb)
        {
            return (-1);         /* found match for new block */
        }
        if (nxt->priority > pri)
        {
            return (i);          /* passed all equal priority blocks */
        }
        *hptr = *tptr;
        GET4(math.adrs, nxt->fwd);
        if ((struct MQI *) math.adrs == qh)
        {
            return (i);          /* exhausted queue */
        }
    }                            /* for */
}                                /* mqi_find_exact_nolock */
/***********
* mqi_find * search mqi chain for nb ptr and/or priority
***********/
int
mqi_find(qh, nb, hptr, tptr)
struct MQI      *qh;
struct MQI_LINKS *nb, **hptr, **tptr;

/*
* starting at q_frame, qh, scan queue looking for
*       -> frame before first frame of priority = pri (returned in *hptr)
*       -> frame before first frame of priority > pri (returned in *tptr)
* OR
```

4

```
 *              -> frame at given 'nb' (returned in *tptr)
 * return -1 if 'nb' frame found, 0 if queue was empty, else count frames
 */
{
    ushort            i, pri;
    struct MQI_LINKS *nxt, *tmp;

pri = nb->priority;              /* new block priority */
    tmp = (struct MQI_LINKS *) qh;
    GET4(math.adrs, qh->rqh.fwd);
    nxt = (struct MQI_LINKS *) math.adrs;    /* fwd ptr from q-hdr */
    for (i = 0, *hptr = tmp, *tptr = tmp;; i++)
    {
        GET4(math.adrs, (*tptr)->fwd);
        nxt = (struct MQI_LINKS *) math.adrs;   /* advance lookahead ptr */
        if (nxt == nb)
        {
            return (-1);             /* found match for new block */
        }
        if (nxt->priority > pri)
        {
            return (i);              /* passed all equal priority blocks */
        }
        *tptr = nxt;                 /* bring output ptr forward */
        if ((*tptr)->priority < pri)
        {
            *hptr = *tptr;
        }
        GET4(math.adrs, nxt->fwd);
        if ((struct MQI *) math.adrs == qh)
        {
            return (i);              /* exhausted queue */
        }
    }                                /* for */
}                                    /* mqi_find */

/************
 * mqi_insert * insert in queue
 ************/
void
mqi_insert(qh, nb, pos)
struct MQI       *qh;
struct MQI_LINKS *nb;
struct MQI_LINKS *pos;
{
    int              j;

GET4(math.adrs, pos->fwd);
    PUT4(nb->fwd, math.adrs);        /* address from pos->fwd to new block fwd */
    math.ptr = (char *) nb;
    PUT4(pos->fwd, math.adrs);       /* address of nb to pos fwd */
    qh->req_cnt++;
    qh->enq_cnt++;

j = qh->active_servers;
    if (j == 0)
    {
        qh->wak_cnt++;
        qh->active_servers++;
        unlock_waken(qh->isem.sid);
    }
    else
    {
        unlock(qh->isem.sid);
    }
}                                    /* mqi_insert */

/*****************
 * mqi_qoh_nolock *  q on head by priority, user must lock
 *****************/
void
mqi_qoh_nolock(qh, nb)
struct MQI       *qh;                /* head queue structure */
struct MQI_LINKS *nb;                /* new block queue structure */
{
    struct MQI_LINKS *hptr;
```

A12

```
    struct MQI_LINKS *tptr;
    int             qpos, qtop;

qpos = mqi_find(qh, nb, &hptr, &tptr);
    if (qpos != -1)
    {
        mqi_insert_nowake(qh, nb, hptr);
    }
    else
    {
/*      syslog(LOG_DEBUG, " QOH rejecting duplicate entry."); */
    }
    if (qh != saq)
        return;
    GET4(math.adrs, saq->rqh.fwd);
    qtop = (int) *(math.ptr + 1);
    if ((math.adrs != (ulong) saq) &&    /* SAQ not empty */
        (((qtop <= CLK_LVL) &&
          (qtop < saq->Cur_Pri)) ||/* top entry is a TCB */
         ((qtop > TCB_DELTA) &&
          (qtop < saq->Cur_Pri + TCB_DELTA))))  /* which beats current */
    {
/*      kill(saq->isem.pid, SIGFPE);        /* rupt interpreter at EOI */
    }
}                                   /* mqi_qoh_nolock */

/*****************
 * mqi_dqh_nolock * dequeue highest priority, user must lock, frame must exist
 *****************/
struct MQI_LINKS *
mqi_dqh_nolock(qh)
struct MQI      *qh;                /* head queue structure */

{
    struct MQI_LINKS *ob;           /* block to be dequeued */
    struct HDM       *hdm_base;     /* -> hardware dedicated memory */

GET4(math.adrs, qh->rqh.fwd);
    if (math.adrs == (unsigned long) qh)
    {
        /* queue is empty */
        syslog(LOG_ERR, "E077: Logic error - mqi_dqh_nolock with no frame");
    }                               /* q is empty */
    GET4(math.adrs, qh->rqh.fwd);
    ob = (struct MQI_LINKS *) math.adrs;
    /* document the priority of the task just dequeued from SAQ (dispatched)
     * for HVS slicer benefit, recording the priority in HVS offset 15 (which
     * native hardware uses for real time clock purposes) */
    if (qh == saq && ob->priority >= TCB_DELTA)
    {
        hdm_base = (struct HDM *) base;
        hdm_base->h_rtcc = ob->priority - TCB_DELTA;
    }
    GET4(math.adrs, ob->fwd);       /* remove ob from chain */
    PUT4(qh->rqh.fwd, math.adrs);
    return (ob);
}                                   /* mqi_dqh_nolock */

/********************
 * mqi_insert_nowake * insert in queue, do not waken server
 ********************/
void
mqi_insert_nowake(qh, nb, pos)
struct MQI       *qh;
struct MQI_LINKS *nb;
struct MQI_LINKS *pos;
{
    GET4(math.adrs, pos->fwd);
    PUT4(nb->fwd, math.adrs);       /* address from pos->fwd to new block fwd */
    math.ptr = (char *) nb;
    PUT4(pos->fwd, math.adrs);      /* address of nb to pos fwd */
}                                   /* mqi_insert_nowake */
```

A13

```c
/*
 *
 * Name:       emu_sked.c
 * Purpose:    HVX scheduing functions
 * Functions in this module:
 */
void            iw_req();
void            iw_tsk();
void            iw_wait();
void            iw_enbl();
void            iw_dqsa();
void            poster();
void            wake_tcb();
void            dps_qoh();
void            sav_regs();
long            sign_ext();
void            rst_regs();
void            preempt_hvx();

#include "sys_head.h"
include "emu_head.h"
#include "macro.h"
#include "id_head.h"
#include "err_head.h"
#include "mqi_head.h"
#include "z3scb.h"
#include "z3rct.h"
#include "z3tcb.h"
#include "z3gcb.h"
#include "z3mpx.h"
#include "z3irb.h"
#include "z3hdm.h"
#include "z_rb.h"
#include "vm.h"
#define CPROG
#include "aix_regs.h"
define IDLE_PRI 64 extern char     *base;              /* ptr to HVX hardware dedicated memory */
extern char     *sys_r0, *sys_r3;   /* VM base offsets for ring #0, #3 */
extern int      virt_view;          /* specifies single or multiple virt. view */
extern int      dps6_uvah;          /* high order half of minimum DPS6 user va */
char            *srvr_base();       /* returns base of I-pool in Server's
                                     * address space */
extern int      process;            /* indicates server or not, used by
                                     * VAR_RISC_ADDR   */
extern char     *usr_r0;
extern char     *vpool_inv_base;
extern ulong    *ssdt_ptr;          /* pointer to subsdt */
extern WORD     *rmt_ptr;           /* pointer to reverse map table */
extern struct EMU_OPTS opt;         /* run-time options */
extern struct MQI *saq, *xtd;
extern struct SCB *scb;             /* ptr to SCB */
int             count = 0;          /* temporary met */
static union MATH math;

/*
 * structure for DPS queue element header
 */
typedef struct DPSQ
{                                   /* structure for DPS queue head */
    WORD        lock;               /* lock word */
    ADDR        headp[2];           /* -> head of queue (first element) */
    ADDR        tailp[2];           /* -> tail of queue (last element) */
} DPSQ;

/*********
 * iw_req *   request UNIX io server execution (IO 8052)
 *********/
/*
 * on entry:    b1 = irb, b2 = rct, r5 = priority for queueing
 */
void
iw_req(rr)
struct RISC_REGS *rr;               /* risc regs containing DPS6 regs */
{
```

A14

```
        struct IRB      *irb;       /* -> IRB of request being placed */
        struct RCT      *rct;       /* -> RCT of device being requested */
        struct TRCT     *trct;      /* -> RCT of device being requested */
        struct RB       *iorb;
        int             i;
/*
 * retrieve IRB, RCT and priority from DPS6 registers
 */
        irb = (struct IRB *) rr->b1;
        irb->rqh.priority = rr->r5;
        rct = (struct RCT *) ((char *) rr->b2);
        rct = (struct RCT *) ((char *) rct - OFF_RCT);
        PUT4(irb->i_xtnd, (unsigned long) rct);
/*
 * write IRB pointer to appropriate pipe (or enqueue IRB on the specified
 * RCT at the specified priority)
 */
        if (rct->qaddr.internal_id == TTY_ID)
        {
            trct = (struct TRCT *) ((char *) rr->b2);
            trct = (struct TRCT *) ((char *) trct - OFF_RCT);
            RISC_ADDR(iorb, (struct RB *), irb->i_rb);
            iorb = (struct RB *) ((char *) iorb - OFF_RB);
            if ((iorb->rb_ct2 & 0x000f) == READ_FUNCTION)
            {
                mqi_qot(&trct->qaddi, irb);
            }
            else
            {
                mqi_qot(&trct->qaddr, irb);
            }
        }                               /* qaddr.internal_id == TTY_ID */
        else
            if ((rct->qaddr.internal_id == NTD_ID)
                || (rct->qaddr.internal_id == LAN_ID))
            {
/*
 * write IRB pointer to pipe
 */
                do
                    i = write(rct->qaddr.fdes, &irb, sizeof(irb));
                while ((i == -1) && (errno == EINTR));
                if (i == -1)
                {
                    syslog(LOG_ERR, "E445: write(rct->qaddr.fdes = %x): %m",
                        rct->qaddr.fdes);
                    hvx_clnp(0);
                }
            }                           /* qaddr.internal_id == NTD_ID */
            else
            if (rct->qaddr.internal_id == X25_ID)
            {
                mqi_qot(&rct->qaddr, irb);
                kill(rct->qaddr.isem.pid, SIGUSR1);
            }
            else
            {
                if ((opt.pipe) && (rct->qaddr.internal_id != LNK_ID))
                {
/* write IRB pointer to pipe */
                    do
                        i = write(rct->qaddr.fildes[1], &irb, sizeof(irb));
                    while ((i == -1) && (errno == EINTR));
                    if (i == -1)
                    {
                        syslog(LOG_ERR, "E107: write(rct->qaddr.fildes[1] = %x): %m",
                            rct->qaddr.fildes[1]);
                        hvx_clnp();
                    }
                }                       /* pipe and not link */
                else
                    mqi_qot(&rct->qaddr, irb);  /* disk/diskette */
            }                                   /* not X.25 and not ??? */
}                                               /* iw_req */
/*********
 * iw_tsk *   schedule HVX task execution (IO 8051)
```

A15

```
*********/
/*
* on entry: b3 = tcb (requested task)
*/
void
iw_tsk(rr)
struct RISC_REGS *rr;          /* risc regs containing DPS6 regs */
{
    struct TCB      *tcb;      /* -> TCB to schedule */
/* retrieve TCB from DPS6 registers enqueue TCB on the SAQ at the tasks
    * native priority */
    tcb = (struct TCB *) ((char *) rr->b3 - OFF_TCB);
    if (tcb->t_lvl <= CLK_LVL)
        tcb->t_qfrm = tcb->t_lvl;
    else
        tcb->t_qfrm = tcb->t_lvl + TCB_DELTA;
    mqi_qot(saq, &tcb->t_qfrm);
}                              /* iw_tsk */

/**********
* iw_wait * suspend execution of the running HVX task
*         * (IO 8053 - in lieu of lev suspend)
**********/
/*
* on entry: iv = tcb of running task
*/
void
iw_wait(rr)
struct RISC_REGS *rr;          /* risc regs containing DPS6 regs */
{
    struct TCB      *tcb;      /* -> HVX TCB */
    struct IRB      *irb;      /* -> IRB to post */
    struct HDM      *hdm_base; /* -> hardware dedicated memory */
    int             level;
/* generate pointer to running task's TCB/ISA save context of the running
    * task in it's ISA and set the priority of the currently executing task
    * to 0x3f (noone) */
    tcb = (struct TCB *) ((rr->iv & 0x0fffffff) + sys_r0 - OFF_TCB);
    sav_regs(rr, tcb);
    hdm_base = (struct HDM *) sys_r0;
    if ((level = tcb->t_lvl & 0x003f) > CLK_LVL)
        hdm_base->h_iv[level] = NULL;
    saq->Cur_Pri = IDLE_PRI + TCB_DELTA;
/*
* save priority of running task (no one) in HVS memory for HVS slicer use,
* using a field (location 15) dedicated to clock use by DSP6 hardware
*/
    hdm_base->h_rtcc = IDLE_PRI;
/* DQ next element from SAQ (IRB to post or highest priority TCB) */
    while (irb = (struct IRB *) mqi_dqh(saq),
           irb->rqh.priority < TCB_DELTA &&
           irb->rqh.priority > CLK_LVL)
    {
        poster(irb);           /* post all IRBs found on the SAQ */
    }
/* if found a TCB on the SAQ, generate ptr to top of TCB restore context
    * of next HVX task to run, return to interpreter */
    tcb = (struct TCB *) ((ulong) irb + (tcb->t_rful - &tcb->t_qfrm) * 2);
    tcb->t_qfrm = tcb->t_lvl;
    if (virt_view != SINGLE_VIEW)
        task_addr(tcb);        /* establish task's addr space */
    rst_regs(rr, tcb);
    saq->Cur_Pri = tcb->t_lvl;
}                              /* iw_wait */

/**********
* iw_enbl * switch context from running HVX task to the highest priority
*         * HVX task currently on the SAQ
*         * (from interpreter lev enable (control word = 803f))
**********/
/*
* on entry: iv = tcb of running task
*/
void
iw_enbl(rr)
struct RISC_REGS *rr;
{
```

A16

```
    struct TCB      *tcb;           /* -> HVX TCB */
    struct IRB      *irb;           /* -> IRB which needs to be posted */
    struct HDM      *hdm_base;      /* -> hardware dedicated memory */
    int             level;

/*
 * generate ptr to running task's TCB/ISA
 * put the running task back on the SAQ
 * save context of the running task in its ISA
 */
    tcb = (struct TCB *) ((rr->iv & 0x0fffffff) + sys_r0 - OFF_TCB);
    sav_regs(rr, tcb);
    base = sys_r0;
    rr->bs = sys_r0;
    if ((level = tcb->t_lvl) <= CLK_LVL)
        tcb->t_qfrm = level;
    else
    {
        tcb->t_qfrm = level + TCB_DELTA;
        if (saq->rqh.priority > CLK_LVL)
        {
            hdm_base = (struct HDM *) sys_r0;
            hdm_base->h_iv[level] = NULL;
        }
    }                                /* t_lvl > CLK_LVL */
    mqi_qoh(saq, &tcb->t_qfrm);
/* DQ next element from SAQ (struct IRB to post or highest priority TCB) */
    while (irb = (struct IRB *) mqi_dqh(saq),
           irb->rqh.priority < TCB_DELTA &&
           irb->rqh.priority > CLK_LVL)
    {
        poster(irb);                 /* post all IRBs found on the SAQ */
    }
/* if found a TCB on the SAQ, generate ptr to top of TCB restore context
 * of next HVX task to run and return to interpreter */
    tcb = (struct TCB *) ((ulong) irb + (tcb->t_rful - &tcb->t_qfrm) * 2);
    tcb->t_qfrm = tcb->t_lvl;
    if (virt_view != SINGLE_VIEW)
        task_addr(tcb);              /* establish addr space of new TCB */
    rst_regs(rr, tcb);
    saq->Cur_Pri = tcb->t_lvl;
}                                    /* iw_enbl */

/**********
 * mcl_dqsa *  dequeue tcb from saq (mcl 3701 in lieu of code in ZXDLGQ)
 **********/
/*
 * on entry: b2 = tcb (target task)
 */
void
mcl_dqsa(rr)
struct RISC_REGS *rr;                /* risc regs containing DPS6 regs */
{
    struct HDM      *hdm_base;
    struct SCB      *scb;
    struct TCB      *tcb;            /* -> TCB to dequeue */
    int             n;

if (opt.slice)
        return;
    hdm_base = (struct HDM *) sys_r0;
    RISC_ADDR(scb, (struct SCB *), hdm_base->h_scb);
    if (MCLng(rr))
        return;
    if (rr->p >= scb->s_ssz)
    {
        rr->r1 = ARG_NG;
        return;
    }
/* retrieve TCB from DPS6 registers dequeue TCB from SAQ */
    tcb = (struct TCB *) ((char *) rr->b2 - OFF_TCB);
    tcb->t_qfrm = tcb->t_lvl + TCB_DELTA;
    n = 0;
    lock(saq->isem.sid);
    if (mqi_cancel(saq, &tcb->t_qfrm) != -1)
    {
        n = 0x082E;                  /* return code from MCL if TCB not found */
```

A17

```
        }
        unlock(saq->isem.sid);
        tcb->t_qfrm = tcb->t_lvl;
        rr->r1 = n;
}                                       /* mcl_dqsa */
/*********
 * poster *  schedule HVX task to post an IO request.
 *********/
void
poster(irbp)
struct IRB      *irbp;                  /* -> IRB to be posted */
{
    struct TCB     *tcbp;               /* -> TCB to awaken to do post */
    struct TCB     *itcbp;              /* -> TCB that issued the request */
    struct GCB     *gcbp;               /* -> GCB that issued the request */
    struct MPX     *mpxp;               /* -> MPD of the pool of the requestor */
    struct RB      *iorbp;              /* -> IORB to post */

/* mark IRB as postponed post and move status from IORB to IRB */
    irbp->i_ind |= mi_ppr;
    RISC_ADDR(iorbp, (struct RB *), irbp->i_rb);
    iorbp = (struct RB *) ((char *) iorbp - OFF_RB);    /* get ptr to IORB */
    irbp->i_rst = 0;                    /* good status */
    if ((iorbp->rb_ct1 >> 8) != 0)
    {
        irbp->i_rst = (iorbp->rb_ct1 >> 8) | 0x0100;    /* move status to IRB */
    }
    RISC_ADDR(itcbp, (struct TCB *), irbp->i_tcb);
    itcbp = (struct TCB *) ((char *) itcbp - OFF_TCB);  /* issuer's TCB */
/* unwire segments if vpool request other than clock or semaphore */
    if (((irbp->i_ind & (mi_clq + mi_smq)) == 0) && (itcbp->t_ind2 & mt_sgm))
        vm_unwire(irbp, itcbp);
/* if synchronous request, put waiting TCB in critical region
 * awaken the waiting task to complete the post */
    if (irbp->i_ind & mi_wip)
    {
        RISC_ADDR(tcbp, (struct TCB *), irbp->i_wtcb);
        tcbp = (struct TCB *) ((char *) tcbp - OFF_TCB);
        tcbp->t_ccnt -= 1;
        wake_tcb(tcbp);
    }
    else
    {                                   /* asynchronous request */
        if (itcbp->t_ind2 & mt_sgm)     /* vpool task */
        {
            RISC_ADDR(gcbp, (struct GCB *), itcbp->t_gcb);
            RISC_ADDR(mpxp, (struct MPX *), gcbp->g_mpd);   /* MPD of the V-pool */
            RISC_ADDR(tcbp, (struct TCB *), mpxp->p_swt);   /* swapper task */
            tcbp = (struct TCB *) ((char *) tcbp - OFF_TCB);
        }
        else
            tcbp = (struct TCB *) (sym_addr("ZXSTCB") - OFF_TCB);
/* enqueue the IRB in the posting agent task's request queue */
        dps_qoh((DPSQ *) & tcbp->t_rbql,
                (struct MQI_LINKS *) irbp,
                -(tcbp->t_lvl));
/* if target task is dormant, awaken it now mark the task as actively
 * working on a request awaken the task to process the request */
        if (!(tcbp->t_ind & mt_act))
        {
            tcbp->t_ind |= mt_act;
            wake_tcb(tcbp);
        }
    }
}                                       /* i_ind & mi_wip */
                                        /* poster */
/***********
 * wake_tcb *  awaken the specified HVX task.
 ***********/
void
wake_tcb(tcbp)
struct TCB      *tcbp;                  /* -> TCB to awaken */
{
    tcbp->t_ind &= ~mt_wt;              /* indicate task is no longer waiting */
/* if task not suspended, schedule task execution mark task as being
 * enqueued on its level schedule task execution */
```

A18

```c
    if (!(tcbp->t_ind & mt_ssc))
    {
        tcbp->t_ind3 |= mt_lvq;
        if (tcbp->t_lvl <= CLK_LVL)
            tcbp->t_qfrm = tcbp->t_lvl;
        else
            tcbp->t_qfrm = tcbp->t_lvl + TCB_DELTA;
        mqi_qot(saq, &tcbp->t_qfrm);
    }
}                                       /* wake_tcb */

/**********
 * dps_qoh *   enqueue item on head of specified DPS Q (ala DPS6 instruction)
 **********/
void
dps_qoh(qh, nb, priority)
DPSQ            *qh;                    /* -> dps q header (lock word) */
struct MQI_LINKS *nb;                   /* -> item to enqueue */
WORD            priority;               /* priority at which to enqueue the item */
{
    struct MQI_LINKS *hptr;             /* -> previous q element */
    struct MQI_LINKS *tptr;             /* -> current q element */
    unsigned long   work;               /* work field for extracting 'next' ptr */

/* store priority in the new item to enqueue initialize current element
 *  ptr to first q element and previous element ptr to lock word of q
 * header */
    nb->priority = priority;
    hptr = (struct MQI_LINKS *) qh;/* -> the q header */
    RISC_ADDR(tptr, (struct MQI_LINKS *), qh->headp);   /* -> first element */
/* search the Q for the first element with priority equal to or greater
 * than the specified priority */
    while ((tptr != (struct MQI_LINKS *) qh) &&
           (tptr->priority < nb->priority))
    {
        hptr = tptr;
        RISC_ADDR(tptr, (struct MQI_LINKS *), hptr->fwd);
    }                                   /* while */
/* insert the new element after the one found above if none found, add
 * the new element to the end of the queue */
    GET4(math.adrs, hptr->fwd);         /* get forward ptr from previous item */
    PUT4(nb->fwd, math.adrs);           /* store as forward ptr in new item */
    work = math.adrs;                   /* save forward ptr of new item */
    math.ptr = (char *) nb;
    DPS6_ADDR(hptr->fwd, math.adrs);    /* -> new item in fwd -> of prev */
/* if new item went on end of q, update tail pointer in q header */
    if (work == (((ulong) qh - (ulong) base) / 2))
    {
        DPS6_ADDR(qh->tailp, math.adrs);        /* new tail pointer */
    }
}                                       /* dps_qoh */

/***********
 * sav_regs *
 ***********/
void
sav_regs(rr, tcb)
struct RISC_REGS *rr;
struct TCB      *tcb;
{
    TRANSL_DPS6_ADDR(tcb->pos.t_p, rr->p, rmt_ptr);
    tcb->pos.t_s = (WORD) (rr->s);
    if (tcb->pos.t_isml != 0)
    {
        TRANSL_DPS6_ADDR(tcb->pos.t_b7, rr->b7, rmt_ptr);
        TRANSL_DPS6_ADDR(tcb->pos.t_b6, rr->b6, rmt_ptr);
        TRANSL_DPS6_ADDR(tcb->pos.t_b5, rr->b5, rmt_ptr);
        TRANSL_DPS6_ADDR(tcb->pos.t_b4, rr->b4, rmt_ptr);
        TRANSL_DPS6_ADDR(tcb->pos.t_b3, rr->b3, rmt_ptr);
        TRANSL_DPS6_ADDR(tcb->pos.t_b2, rr->b2, rmt_ptr);
        TRANSL_DPS6_ADDR(tcb->pos.t_b1, rr->b1, rmt_ptr);
        tcb->pos.t_i  = (WORD) (rr->i & 0xffff);
        tcb->pos.t_r7 = (WORD) (rr->r7);
        tcb->pos.t_r6 = (WORD) (rr->r6);
        tcb->pos.t_r5 = (WORD) (rr->r5);
        tcb->pos.t_r4 = (WORD) (rr->r4);
        tcb->pos.t_r3 = (WORD) (rr->r3);
```

A19

```
        tcb->pos.t_r2  = (WORD) (rr->r2);
        tcb->pos.t_r1  = (WORD) (rr->r1);
        tcb->pos.t_m1  = (WORD) ((rr->ci >> 8)  | 0xff00);
        tcb->pos.t_m2  = (WORD) ((rr->ci >> 16) | 0xff00);
        tcb->pos.t_m3  = (WORD) ((rr->ci >> 24) | 0xff00);
        tcb->pos.t_m4  = (WORD) (rr->m | 0xff00);
        tcb->pos.t_m5  = (WORD) ((rr->m >> 8)  | 0xff00);
        tcb->pos.t_m6  = (WORD) ((rr->m >> 16) | 0xff00);
        tcb->pos.t_m7  = (WORD) ((rr->m >> 24) | 0xff00);
        TRANSL_DPS6_ADDR(tcb->pos.t_t, rr->t, rmt_ptr);
        tcb->pos.t_ci  = (WORD) (rr->ci & 0x00ff);
        TRANSL_DPS6_ADDR(tcb->pos.t_rdbr, rr->rdbr, rmt_ptr);
        PUT4(tcb->pos.t_k7, rr->k7);
        PUT4(tcb->pos.t_k6, rr->k6);
        PUT4(tcb->pos.t_k5, rr->k5);
        PUT4(tcb->pos.t_k4, rr->k4);
        PUT4(tcb->pos.t_k3, rr->k3);
        PUT4(tcb->pos.t_k2, rr->k2);
        PUT4(tcb->pos.t_k1, rr->k1);
    }                                           /* ISM not zero */
    saq->cxt_ctr++;
}                                               /* sav_regs */

/**********
 * sign_ext *
 **********/
long
sign_ext(reg_id)
WORD            reg_id;
{
    long            temp;

temp = (long) reg_id;
    if (reg_id & 0x8000)
    {
        temp |= 0xffff0000;
    }
    return (temp);
}                                               /* sign_ext */

/**********
 * rst_regs *
 **********/
void
rst_regs(rr, tcb)
struct RISC_REGS *rr;
struct TCB       *tcb;
{
    int             lvl;
    ulong           *ivptr, devwd;
    struct HDM      *hdm_base;

hdm_base = (struct HDM *) sys_r0;
    hdm_base->h_iv[tcb->t_lvl] = (((ulong) tcb & 0x0fffffff) + OFF_TCB) / 2;
    rr->s &= 0xffff0000;
    rr->s |= (tcb->pos.t_s) & 0xffc0;
    rr->s |= (tcb->t_lvl) & 0x003f;
    tcb->pos.t_s = (WORD) (rr->s);  /* keep ISA current */
/* set up new running task with proper ISA and in proper ring */
    if ((rr->s & 0x6000) == 0x6000)
        base = (char *) sys_r0;
    else
        base = (char *) sys_r3;
    rr->bs = base;
    rr->iv = (ulong) tcb + OFF_TCB + (base - sys_r0);
    TRANSL_RISC_ADDR(rr->p, (long), tcb->pos.t_p, ssdt_ptr);
    if (tcb->pos.t_ism1 != 0)
    {
        TRANSL_RISC_ADDR(rr->b7, (long), tcb->pos.t_b7, ssdt_ptr);
        TRANSL_RISC_ADDR(rr->b6, (long), tcb->pos.t_b6, ssdt_ptr);
        TRANSL_RISC_ADDR(rr->b5, (long), tcb->pos.t_b5, ssdt_ptr);
        TRANSL_RISC_ADDR(rr->b4, (long), tcb->pos.t_b4, ssdt_ptr);
        TRANSL_RISC_ADDR(rr->b3, (long), tcb->pos.t_b3, ssdt_ptr);
        TRANSL_RISC_ADDR(rr->b2, (long), tcb->pos.t_b2, ssdt_ptr);
        TRANSL_RISC_ADDR(rr->b1, (long), tcb->pos.t_b1, ssdt_ptr);
        rr->r7 = sign_ext(tcb->pos.t_r7);
        rr->r6 = sign_ext(tcb->pos.t_r6);
```

A20

```
        rr->r5 = sign_ext(tcb->pos.t_r5);
        rr->r4 = sign_ext(tcb->pos.t_r4);
        rr->r3 = sign_ext(tcb->pos.t_r3);
        rr->r2 = sign_ext(tcb->pos.t_r2);
        rr->r1 = sign_ext(tcb->pos.t_r1);
        rr->ci = ((tcb->pos.t_m3 & 0x00ff) << 24)
               | ((tcb->pos.t_m2 & 0x00ff) << 16)
               | ((tcb->pos.t_m1 & 0x00ff) << 8)
               | (tcb->pos.t_ci & 0x00ff);
        rr->m = ((tcb->pos.t_m7 & 0x00ff) << 24)
              | ((tcb->pos.t_m6 & 0x00ff) << 16)
              | ((tcb->pos.t_m5 & 0x00ff) << 8)
              | (tcb->pos.t_m4 & 0x00ff);
        rr->i = tcb->pos.t_i;
        TRANSL_RISC_ADDR(rr->t, (long), tcb->pos.t_t, ssdt_ptr);
        TRANSL_RISC_ADDR(rr->rdbr, (long), tcb->pos.t_rdbr, ssdt_ptr);
        GET4(rr->k7, tcb->pos.t_k7);
        GET4(rr->k6, tcb->pos.t_k6);
        GET4(rr->k5, tcb->pos.t_k5);
        GET4(rr->k4, tcb->pos.t_k4);
        GET4(rr->k3, tcb->pos.t_k3);
        GET4(rr->k2, tcb->pos.t_k2);
        GET4(rr->k1, tcb->pos.t_k1);
    }                                         /* ISM not zero */
}                                             /* rst_regs */
```

APPENDIX B - PNET

B1

```
/* ZNVDPN                    PNET DIRECTIVE HANDLER

Description:

This module processes the following configuration directives for
   the HVX Pseudo Network layer (PNet).

HVX
   HVX25
   RHVX25

*/ include <fm_mcl.h>
include <mr_mcl.h>
#include "hi_c.h"
#include "$xnp.h"
#include "hvx.h"
#include "hvx_snsap.h"
#include "$gater.h"
#include "gate_mgr.h"
#include "$lme.h"
#include "$dserr.h"
#include "hvx_rqb.h"

$MODULE_ID (ZNVDPN, 4.1, 0);
/**/
#undef VARYING
#define VARYING 20
#include "$handler.h"
#undef VARYING
define VARYING 1 define BUFLEN 256
struct err_msg_str {
    int  buf_size;
    char err_text[BUFLEN];
} err_msg;
```

B2

```
/**/
/* HVX                    Process HVX directive
   This routine processes the HVX directive.
***********************************************************************/
HVX (argc, arg_list, envptr)

unsigned int argc;                /* number of entries in arg_list */
register ARGVAL *arg_list[];      /* array of pointers to  ARGVALs */
ENVIRN *envptr;                   /* pointer to context, diag structure */

{ /* process_hvx */

ARGVAL *aval_ptr;
    register struct hvx *hvx_ptr;
    unsigned int arg_nbr, abt_flg;
    int *ZNVARB__alloc_req_blocks();
    struct mcl_psb mclregs;
    int status;

/* Allocate memory for HVX table. */ hvx_ptr = su_get_perm (sizeof (struct hvx));
    *(unsigned short *)hvx_ptr->hv_id = *(unsigned short *)HV_ID;

memset (hvx_ptr->hv_x25dev, (int)' ', 12);

arg_nbr = 0;
    abt_flg = 0;
    aval_ptr = *arg_list++;                    /* directive name */

/* Process X.25 pseudo device name. */ arg_nbr++;
    if ((aval_ptr = *arg_list++) != NULL)
    {
        memcpy (hvx_ptr->hv_x25dev, aval_ptr->av_value, aval_ptr->av_count);
        if (ZNVFLR__find_lrn (hvx_ptr->hv_x25dev, &hvx_ptr->hv_x25lrn) != 0)
        {
            /* On error return, hv_x25lrn contains M4 error code */
            mclregs.reg_r3 = 0;
            mclregs.reg_r6 = 0;
            mclregs.reg_r7 = hvx_ptr->hv_x25lrn; /* error number */
            mclregs.reg_r4 = 0x8400; /* msg into buffer, no slew byte */
            mclregs.reg_b2 = (int *)NULL;
            err_msg.buf_size = BUFLEN;
            mclregs.reg_b3 = (int *)(err_msg.err_text);
            status = mcl (MCL$RPMSG, &mclregs);
            su_rpt_error (0, arg_nbr, err_msg.err_text);
            abt_flg = 1;
        }
    }
    else
    {
        su_rpt_error (DS_CE, arg_nbr);
        abt_flg = 1;
    } if (abt_flg != 0)
    {
        return (-1);
    }

/* Allocate request blocks for VC Receive Events. */ hvx_ptr->hv_rcvrb = ZNVARB__alloc_req_blocks (envptr, RCV_HIGH);

/* Save pointer to HVX table in OSI/DSA root vector. */

*(struct hvx **)$XNP_LOC (YNVHVX) = hvx_ptr;

return (0);

} /*process_hvx */
```

B3

```
/**/
/* HVX25                    Process HVX25 directive

This routine processes the HVX25 directive.
***************************************************************************/
HVX25 (argc, arg_list, envptr)

unsigned int argc;
register ARGVAL *arg_list[];    /* number of entries in arg_list */
ENVIRN *envptr;                 /* array of pointers to ARGVALs */
                                /* pointer to context, diag structure */
{ /* process_hvx25 */

ARGVAL *aval_ptr;
    register struct hvx_snsap *snsap_ptr;
    struct hvx_snsap *sn_ptr;
    struct hvx_snsap **s_ptr;
    unsigned int count;
    unsigned int i;
    unsigned int arg_nbr, abt_flg;
    int ZNVDC1__dir_clean_up();

/* Allocate memory for HVX SNSAP table. */ snsap_ptr = su_get_perm (sizeof (struct hvx_snsap));
    snsap_ptr->sn_id = *(unsigned short *)SN_ID;

snsap_ptr->sn_venu[0] = 'P';
    snsap_ptr->sn_venu[1] = 'R';                    /* venue - proper */ memcpy (&snsap_ptr->sn_type[0], (unsigned char *)"X25 ", 4);

for (i=1; i <= 8; i++)
    {
        snsap_ptr->sn_name[i] = ' ';
        snsap_ptr->sn_lsap[i] = ' ';
    }

/* Setup layer and instance for PNet and connection layer.*/ snsap_ptr->sn_mylv = gt_nwc;
    snsap_ptr->sn_myin = gt_x25;
    snsap_ptr->sn_olv = gt_nwc;
    snsap_ptr->sn_oin = gt_xcm;

arg_nbr = 0;
    abt_flg = 0;
    aval_ptr = *arg_list++;                         /* directive name */

/* Process HVX25 name (-NAME). */ arg_nbr++;
    aval_ptr = *arg_list++;
    if (aval_ptr != NULL)
    {
        count = aval_ptr->av_count;
        snsap_ptr->sn_name[0] = count;
        memcpy (&snsap_ptr->sn_name[1], &aval_ptr->av_value[0], count);
        if (ZNVCSN__check_sap_name (&snsap_ptr->sn_name[0]) == 0)
        {
            su_rpt_error (DS_D6, arg_nbr);
            abt_flg = 1;
        }
    }
    else
    {
        su_rpt_error (DS_CE, arg_nbr);
        abt_flg = 1;
    }

/* Process name of X.25 Coprocessor/2 port. */ arg_nbr++;
    aval_ptr = *arg_list++;
    if (aval_ptr != NULL)
```

B4

```
{
    count = aval_ptr->av_count;
    snsap_ptr->sn_lsap[0] = count;
    memcpy (&snsap_ptr->sn_lsap[1], &aval_ptr->av_value[0], count);
}

/* Process initial dsac state (-STATE). */ arg_nbr++;
aval_ptr = *arg_list++;
snsap_ptr->sn_dsac = *(long *)aval_ptr->av_value;

/* Process address extension length (-PORT_LEN). */ arg_nbr++;
if ((aval_ptr = *arg_list++) != NULL)
{
    snsap_ptr->sn_portl = *(long *)aval_ptr->av_value;
}

/* Process max number of virtual circuits (-MAXVC). */ arg_nbr++;
if ((aval_ptr = *arg_list++) != NULL)
{
    snsap_ptr->sn_maxvc = *(long *)aval_ptr->av_value;
}
else
{
    su_rpt_error (DS_CE, arg_nbr);
    abt_flg = 1;
} if (abt_flg != 0)
{
    return (-1);
}

/* Link HVX SNSAP table on chain of HVX SNSAP tables. */ sn_ptr = $XNP_PTR (YNVLSN);

if (sn_ptr != NULL)
{
    for (;sn_ptr->sn_nxt != NULL; sn_ptr = sn_ptr->sn_nxt) {}
    sn_ptr->sn_nxt = snsap_ptr;
}
else
{
    s_ptr = SXNP_LOC (YNVLSN);
    *s_ptr = snsap_ptr;
}

/* Set bound unit load argument for startup. */ su_set_BU_load ("ZNVPNL");

/* Set cleanup routine argument for startup. */ su_set_clean_up (ZNVDC1__dir_clean_up);

return (0);
} /* process_hvx25 */
```

4

B5

```
/**/
/* RHVX25                    Process RHVX25 directive

This routine processes the RHVX25 directive.
*****************************************************************************/
RHVX25 (argc, arg_list, envptr)

unsigned int argc;              /* number of entries in arg_list */
register ARGVAL *arg_list[];    /* array of pointers to ARGVALs */
ENVIRN *envptr;                 /* pointer to context, diag structure */

{ /* process_rhvx25 */
    ARGVAL *aval_ptr;
    register struct hvx_snsap *rsap_ptr;
    unsigned int count;
    struct hvx_snsap *sn_ptr;
    struct hvx_snsap **s_ptr;
    unsigned int arg_nbr, abt_flg;
    unsigned int i;

/* Allocate memory for remote HVX SNSAP table. */ rsap_ptr = su_get_perm (sizeof (struct hvx_snsap));
    rsap_ptr->sn_id = *(unsigned short *)SN_ID;
    arg_nbr = 0;
    abt_flg = 0;
    aval_ptr = *arg_list++;                         /* directive name */ rsap_ptr->sn_venu[0] = 'I';                     /* venue - image */
    rsap_ptr->sn_venu[1] = 'M';
    rsap_ptr->sn_rem = 1;

memcpy (&rsap_ptr->sn_type[0], (unsigned char *)"X25 ", 4);

for (i=1; i <= 8; i++)
    {
        rsap_ptr->sn_name[i] = ' ';
    }

/* Process RHVX25 name (-NAME). */ arg_nbr++;
    aval_ptr = *arg_list++;
    if (aval_ptr != NULL)
    {
        count = aval_ptr->av_count;
        rsap_ptr->sn_name[0] = count;
        memcpy (&rsap_ptr->sn_name[1], &aval_ptr->av_value[0], count);
        if (ZNVCSN__check_sap_name (&rsap_ptr->sn_name[0]) == 0)
        {
            su_rpt_error (DS_D6, arg_nbr);
            abt_flg = 1;
        }
    }
    else
    {
        su_rpt_error (DS_CE, arg_nbr);
        abt_flg = 1;
    }

/* Process remote subscription address (-CALL) */ arg_nbr++;
    aval_ptr = *arg_list++;
    if (aval_ptr != NULL)
    {
        count = aval_ptr->av_count;
        rsap_ptr->sn_addr[0] = count;
        count = (count + 1)/2;
        memcpy (&rsap_ptr->sn_addr[1], &aval_ptr->av_value[0], count);
        if (ZNVCRA__check_remote_addr (&rsap_ptr->sn_addr[0]) == 0)
        {
            su_rpt_error (DS_DB, arg_nbr);
            abt_flg = 1;
```

B6

```
        }
    }

/* Process initial dsac state (-STATE). */ arg_nbr++;
    aval_ptr = *arg_list++;
    rsap_ptr->sn_dsac = *(long *)aval_ptr->av_value;

if (abt_flg != 0)
    {
        return (-1);
    }

/* Link HVX SNSAP table on chain of HVX SNSAP tables. */ sn_ptr = $XNP_PTR (YNVLSN);

if (sn_ptr != NULL)
    {
        for (;sn_ptr->sn_nxt != NULL; sn_ptr = sn_ptr->sn_nxt) {}
        sn_ptr->sn_nxt = rsap_ptr;
    }
    else
    {
        s_ptr = $XNP_LOC (YNVLSN);
        *s_ptr = rsap_ptr;
    } return (0);
} /* process_rhvx25 */
```

B7

```
/**/
/* ZNVDC1__dir_clean_up        PNeT Directive Cleanup - Part 1

This routine performs the cleanup functions for the HVX Pseudo
    Network layer (PNet).
*********************************************************************************/
ZNVDC1__dir_clean_up (envptr)

ENVIRN *envptr;

{ /* dir_clean_up */ int ZNVDC2__dir_clean_up();

/* Setup cleanup routine argument for second cleanup. */ su_set_clean_up (ZNVDC2__dir_clean_up);

return (0);

} /* dir_clean_up */
```

B8

```
/**/
/* ZNVDC2__dir_clean_up        PNet Directive Cleanup - Part 2

This routine performs initialization functions for the HVX
    Pseudo Network layer (PNet).

This routine issues an empty information gater to the HVX
    Pseudo Network layer. Upon receipt of this gater PNet will
    issue a Boot Event i/o request to the Unix Network User
    Layer (PNetX) to complete initialization.

This routine is called after all bound units have been loaded
    and their associated initializations (overlay 1) have been
    executed.

***************************************************************************/

ZNVDC2__dir_clean_up (envptr)

ENVIRN *envptr;

{ /* dir_clean_up */ struct $gater ZNVGAT;

/* Setup fields in fixed part of gater. */

ZNVGAT.gt_pri = 0;
    ZNVGAT.gt_nxt = NULL;
    *(long *)ZNVGAT.gt_mkr = *(long *)"GT01";
    ZNVGAT.gt_slr = gt_nwc;
    ZNVGAT.gt_sin = gt_x25;
    ZNVGAT.gt_dlr = gt_nwc;
    ZNVGAT.gt_din = gt_x25;
    ZNVGAT.gt_fnc = gtfinf;
    ZNVGAT.gt_sce = NULL;
    ZNVGAT.gt_dst = NULL;
    ZNVGAT.gt_dta = NULL;
    ZNVGAT.gt_dis = 0;
    ZNVGAT.gt_crn = 0;
    ZNVGAT.gt_cre = 0;
    *(unsigned *)&ZNVGAT.gt_flg = 0;
    ZNVGAT.gt_vln = 0;

/* Issue gate request. */ return (ZNGTCL__gate_call (&ZNVGAT));

} /* dir_clean_up */
```

B9

```
/**/
/* ZNVCSN__check_sap_name      Check SAP Name

This routine scans the chain of HVX SNSAP tables for a match between
    the sap name and the name passed in the argument list.
******************************************************************************/
ZNVCSN__check_sap_name (sap_ptr)

unsigned char *sap_ptr;

{ /* check_sap_name */ register struct hvx_snsap *sn_ptr;

sn_ptr = $XNP_PTR (YNVLSN);
    for (;sn_ptr != NULL; sn_ptr = sn_ptr->sn_nxt)
    {
        if (memcmp (&sap_ptr[1], &sn_ptr->sn_name[1], 8) == 0)
        {
            return (0);
        }
    } /*endloop */ return (1);

} /* check_sap_name */
```

B10

```
/**/
/* ZNVCRA__check_remote_addr   Check Remote Network Address

This routine scans the chain of HVX SNSAP tables for a match between
   the network address of a remote sap and the network address
   passed in the argument list.

************************************************************************/

ZNVCRA__check_remote_addr (net_adr)

unsigned char *net_adr;

{ /* check_remote_addr */ register struct hvx_snsap *sn_ptr;
     unsigned int s_len;

sn_ptr = $XNP_PTR (YNVLSN);
     s_len = (net_adr[0] + 1)/2;

for (;sn_ptr != NULL; sn_ptr = sn_ptr->sn_nxt)
     {
          if (sn_ptr->sn_rem &&
          sn_ptr->sn_addr[0] != 0 &&
          sn_ptr->sn_addr[0] == net_adr[0])
          {
               if (memcmp (&net_adr[1], &sn_ptr->sn_addr[1], s_len) == 0)
               {
                    return (0);
               }
          }
     } /*endloop */ return (1);

} /*check_remote_addr */
```

B11

```
/**/
/* ZNVFLR__find_lrn          Find LRN for Pseudo Device

This routine finds and validates the LRN for a specified pseudo device.
****************************************************************************/

ZNVFLR__find_lrn (devname, lrn_ptr)

unsigned char *devname;
unsigned int  *lrn_ptr;

{ /* find_lrn */ unsigned char filename[58];
    struct gipsb filinfo;
    struct mcl_psb mclregs;
    int status;

/* Get pseudo device LRN via Get File Info ($GIFIL). */ memset (filename, (int)' ', 58);
    filename[0] = '!';
    memcpy (&filename[1], devname, 12);

filinfo.gipsb_lfn = 0x2020;
    filinfo.gipsb_pthp = (int *)filename;
    filinfo.gipsb_fabp = NULL;
    filinfo.gipsb_kdp = NULL;

mclregs.reg_b4 = &filinfo;
    status = mcl (MCL$GIFIL, &mclregs);
    if (status == 0)
    {
        *lrn_ptr = filinfo.gipsb_lrn;
        return (0);
    }
    else
    {
        *lrn_ptr = status;
        return (-1);
    }

} /*find_lrn */
```

B12

```
/**/
/* ZNVARB__alloc_req_blocks   Allocate Request Blocks

This routine allocates a specified number of blocks of permanent
   memory used for communication with the Unix Network User layer
   (PNetX). Each block is allocated with sufficient memory to contain
   a task request block (trb), i/o request block (iorb) and a gater.
*************************************************************************/ int *ZNVARB__alloc_req_blocks (envptr, count)

ENVIRN *envptr;
unsigned int count;

{ /* alloc_req_blocks */ struct hvx_rqb *rqb_ptr;
    struct hvx_rqb **rqb_nxt;
    unsigned int i;

rqb_ptr = NULL;
    rqb_nxt = &rqb_ptr;

for (i=0; i < count; i++)
    {
        *rqb_nxt = su_get_perm (sizeof (struct hvx_rqb));
        rqb_nxt = &((*rqb_nxt)->rq_nxt);
    } return (rqb_ptr);

} /* alloc_req_blocks */

/**/
/* ZNVSNI         HVX25 Information                                       */

/* This routine provides information about a local X.25 network
   subscription (HVX25, or SNSAP structure).

This routine must be called by a cleanup routine from another
   directive handler.  (Called by XCM)                                    */
/*************************************************************************/

ZNVSNI__snsap_info (argc, arg_list)

int argc;                   /* number of entries in arg_list */
ARGVAL *arg_list[];         /* array of pointers to  ARGVALs */

{ /* snsap_info */

ARGVAL *aval_ptr;
    register struct hvx_snsap *snsap_ptr;
    unsigned int s_len;
    INT *ZNVFSN__find_snsap();

aval_ptr = *arg_list++;                    /* routine name */

/* Find snsap table. */ aval_ptr = *arg_list++;
    if ((snsap_ptr = ZNVFSN__find_snsap (aval_ptr->av_value)) != NULL)
    {

/* Return network subscription address. */ aval_ptr = *arg_list++;
        aval_ptr->av_count = snsap_ptr->sn_addr[0];
        s_len = (snsap_ptr->sn_addr[0] + 1)/2;
        memcpy (&aval_ptr->av_value[0], &snsap_ptr->sn_addr[1], s_len);

/* Return maximum number of virtual circuits. */ aval_ptr = *arg_list++;
        *(int *)aval_ptr->av_value = snsap_ptr->sn_maxvc;
```

B13

```
        /* Return address extension (port) length */ aval_ptr = *arg_list++;
        *(int *)aval_ptr->av_value = snsap_ptr->sn_portl;

return (0);
    } /* endif */ return (-1);

} /* END (snsap_info) */
```

B14

```
/**/
/* ZNVFSN          Find SNSAP Table                                          */
/* This routine scans the chain of snsap tables for a match on the
   snsap name. If a match is found, the address of the snsap table
   is returned to the caller.                                                */
/****************************************************************************/ int *ZNVFSN__find_snsap (s_nam)

unsigned char *s_nam;

{ /* find_snsap */ register struct hvx_snsap *sn_ptr;

sn_ptr = $XNP_PTR (YNVLSN);
    for (; sn_ptr != NULL; sn_ptr = sn_ptr->sn_nxt)
    {
        if ((memcmp (s_nam, &sn_ptr->sn_name[1], 8) == 0) &&
            (!sn_ptr->sn_rem))
        {
            return (sn_ptr);
        } /* ENDIF */
    } /* ENDLOOP */ return (NULL);

} /* END find_snsap */
```

B15

```
/* ZNVGTR                    HVX X.25 GATER INTERFACE

Description:

This module processes gaters received by the HVX Pseudo
  Network Layer (PNet).

This module contains the following routines:

ZNVGTR__process_gater
             ZNVCRQ__process_con_req
             ZNVCRP__process_con_rsp
             ZNVDTR__process_data_req
             ZNVDRQ__process_dis_req
             ZNVGTP__process_user_gater
             ZNVIBE__issue_boot_event
             ZNVIGE__issue_gater_event
             ZNVIDX__issue_dis_ind
             ZNVIRL__issue_rel_sdu
             ZNVERR__report_error
             ZNVAVX__alloc_vc_index
             ZNVDVX__dealloc_vc_index
*/
include <ts_mcl.h>
include <rq_mcl.h>
#include "hi_c.h"
#include "hvx.h"
#include "hvx_err.h"
#include "$gater.h"
#include "$xnp.h"
#include "$phd.h"
#include "gate_mgr.h"
#include "$lme.h"

$MODULE_ID (ZNVGTR, 4.1, 0);
```

1

B16

```
/**/
const char zldate[] = "mm/dd/hhmm";

struct $gater ZNVGAT;
/**/
/* ZNVGTR__process_gater      Process Gater

This module processes gaters received by the HVX X.25 Pseudo Network
    Layer (PNet).

**************************************************************************/ void ZNVGTR__process_gater (gater_ptr)

register struct $gater *gater_ptr;

{ /* process_gater */ switch (gater_ptr->gt_fnc)
    {
    case gtfcrq:                                /* connect request */
        ZNVCRQ__process_con_req (gater_ptr);
        break;

case gtfcrp:                                /* connect response */
        ZNVCRP__process_con_rsp (gater_ptr);
        break;

case gtfdrq:                                /* disconnect request */
        ZNVDRQ__process_dis_req (gater_ptr);
        break;

case gtfdtr:                                /* data request */
    case gtfexr:                                /* expedited data request */
        ZNVDTR__process_data_req (gater_ptr);
        break;

case gtfinf:                                /* information */
        ZNVIBE__issue_boot_event (gater_ptr);
        break;

default:
        ZNVGTP__process_user_gater (gater_ptr);
        break;

} /* endswitch */ return;

} /* process_gater */
```

B17

```
/**/
/* ZNVCRQ__process_con_req          Process Connect Request
/* This routine processes the receipt of a connect request gater.
*****************************************************************************/
void ZNVCRQ__process_con_req (gater_ptr)
struct $gater *gater_ptr;
{ /* process_con_req */ struct hvx *hvx_ptr;
    unsigned int index_id;

hvx_ptr = $XNP_PTR (YNVHVX);

/* Allocate virtual circuit index id. */ index_id = ZNVAVX__alloc_vc_index ();

/* Issue Gater Event to Unix Network Layer (PNetX). */ if (ZNVIGE__issue_gater_event (gater_ptr, index_id) != 0)
    {
        ZNVIDX__issue_dis_ind (gater_ptr);
        if (gater_ptr->gt_dta != NULL)
        {
            ZNGRTB__return_buffer (gater_ptr->gt_dta);
        }
        ZNVDVX__dealloc_vc_index (index_id);
        ZNGTRB__gate_return_block (gater_ptr);
    } return;

} /* process_con_req */
```

B18

```
/**/
/* ZNVCRP__process_con_rsp        Process Connect Response
/* This routine processes the receipt of a connect response gater.
*******************************************************************************/
void ZNVCRP__process_con_rsp (gater_ptr)
struct $gater *gater_ptr;
{ /* process_con_rsp */
    struct hvx *hvx_ptr;
    unsigned int index_id;

hvx_ptr = $XNP_PTR (YNVHVX);

/* Allocate virtual circuit index id. */ index_id = ZNVAVX__alloc_vc_index ();

/* Issue Gater Event to Unix Network Layer (PNetX). */ if (ZNVIGE__issue_gater_event (gater_ptr, index_id) != 0)
    {
        if (gater_ptr->gt_dta != NULL)
        {
            ZNGRTB__return_buffer (gater_ptr->gt_dta);
        }
        ZNVDVX__dealloc_vc_index (index_id);
        ZNGTRB__gate_return_block (gater_ptr);
    } return;

} /* process_con_rsp */
```

4

B19

```
/**/
/* ZNVDTR__process_data_request    Process Data Request
/* This routine processes a data request or expedited data request
   gater.
*******************************************************************************/
void ZNVDTR__process_data_req (gater_ptr)
struct $gater *gater_ptr;
{ /* process_data_req */ struct hvx *hvx_ptr;

hvx_ptr = $XNP_PTR (YNVHVX);

if (gater_ptr->gt_dta == NULL)
    {
        ZNVERR__report_error (hv25_nph, 0);
        ZNGTRB__gate_return_block (gater_ptr);
        return;
    }

ZNGOPT__old_phd_pointers (gater_ptr->gt_dta);

/* Issue Gater Event to Unix Network Layer (PNetX) */ if (ZNVIGE__issue_gater_event (gater_ptr, 0) != 0)
    {
        ZNVIRL__issue_rel_sdu (gater_ptr);
        ZNGTRB__gate_return_block (gater_ptr);
    } return;

} /* process_data_req */
```

B20

```
/**/
/* ZNVDRQ__process_dis_req         Process Disconnect Request
/* This routine processes the receipt of a disconnect request gater.
*************************************************************************/
void ZNVDRQ__process_dis_req (gater_ptr)
struct $gater *gater_ptr;
{ /* process_dis_req */ struct hvx *hvx_ptr;
    unsigned int index_id;

hvx_ptr = $XNP_PTR (YNVHVX);

index_id = 0;

/* Allocate virtual circuit index id (refused connect). */ if (gater_ptr->gt_sce == NULL)
    {
        index_id = ZNVAVX__alloc_vc_index ();
    }

/* Issue Gater Event to Unix Network Layer (PNetX). */ if (ZNVIGE__issue_gater_event (gater_ptr, index_id) != 0)
    {
        if (gater_ptr->gt_dta != NULL)
        {
            ZNGRTB__return_buffer (gater_ptr->gt_dta);
        } if (gater_ptr->gt_sce == NULL)
        {
            ZNVDVX__dealloc_vc_index (index_id);
        }

ZNGTRB__gate_return_block (gater_ptr);
    } return;

} /* process_dis_req */
```

B21

```
/**/
/* ZNVGTP__process_user_gater         Process User Gater
/* This routine processes the receipt of a gater from the user layer.
***************************************************************************/
void ZNVGTP__process_user_gater (gater_ptr)
struct $gater *gater_ptr;
{ /* process_user_gater */
    struct hvx *hvx_ptr;

hvx_ptr = $XNP_PTR (YNVHVX);

/* Issue Gater Event to Unix Network User Layer (PNetX). */
    if (ZNVIGE__issue_gater_event (gater_ptr, 0) != 0)
    {
        ZNGTRB__gate_return_block (gater_ptr);
    }
    return;
} /* process_user_gater */
```

B22

```
/**/
/* ZNVIBE__issue_boot_event      Issue Boot Event

/* This routine issues a boot event request to the Unix Network
    User Layer (PNetX).
******************************************************************************/
void ZNVIBE__issue_boot_event (gater_ptr)

struct $gater *gater_ptr;

{ /* issue_boot_event */ struct hvx *hvx_ptr;
    unsigned int status;

hvx_ptr = $XNP_PTR (YNVHVX);

/* Issue Boot Event to Unix Network User Layer (PNetX). */ if ((status = ZNVBEV__boot_event()) != 0)
    {
        ZNVERR__report_error (hv25_bev, status);
    }
    else
    {
        hvx_ptr->hv_bevp += 1;
    }

ZNGTRB__gate_return_block (gater_ptr);

return;

} /* issue_boot_event */
```

B23

```
/**/
/* ZNVIGE__issue_gater_event      Issue Gater Event

/* This routine allocates memory for a trb/iorb and issues a
   gater event request to the Unix Network Layer (PNetX).
 ****************************************************************************/

ZNVIGE__issue_gater_event (gater_ptr, dvs_word)

struct $gater *gater_ptr;
unsigned int dvs_word;

{ /* issue_gater_event */ struct hvx *hvx_ptr;
    ETRB *etrb_ptr;
    unsigned int status;

hvx_ptr = $XNP_PTR (YNVHVX);

/* Allocate memory for trb and iorb. */ if (ZNGGTB__get_buffer (((sizeof (ETRB) + 1)/2) +
    ((sizeof (struct elrn_iorb) + 1)/2), &etrb_ptr) != 0)
    {
        ZNVERR__report_error (hv25_mem, 0);
        return (1);
    }

/* Issue Gater Event to Unix Network User Layer (PNetX). */ if ((status = ZNVGEV__gater_event (etrb_ptr, gater_ptr, dvs_word)) != 0)
    {
        ZNVERR__report_error (hv25_gev, status);
        ZNGRTB__return_buffer (etrb_ptr);
        return (1);
    } hvx_ptr->hv_gevc += 1;

return (0);

} /* issue_gater_event */
```

B24

```
/**/
/* ZNVIDX__issue_dis_ind      Issue Disconnect Indication

This routine builds a disconnect indication gater and issues a gate
   request to the connection layer.

This routine is used during the processing of a connect request to
   indicate an unsuccessful connect. The input argument to this routine
   is a pointer to the connect request gater which does not result in
   a successful connection. The source connection id must always be
   null when reporting an unsuccessful connect.

****************************************************************************/

ZNVIDX__issue_dis_ind (gater_ptr)

register struct $gater *gater_ptr;

{ /* issue_dis_ind */ extern struct $gater ZNVGAT;

ZNVGAT.gt_pri = 0;
    ZNVGAT.gt_nxt = NULL;
    *(long *)ZNVGAT.gt_mkr = *(long *)"GT01";
    ZNVGAT.gt_slr = gater_ptr->gt_dlr;
    ZNVGAT.gt_sin = gater_ptr->gt_din;
    ZNVGAT.gt_dlr = gt_nwc;
    ZNVGAT.gt_din = gt_xcm;
    ZNVGAT.gt_fnc = gtfdin;
    ZNVGAT.gt_sce = NULL;
    ZNVGAT.gt_dst = gater_ptr->gt_sce;
    ZNVGAT.gt_dta = NULL;
    ZNVGAT.gt_dis = 0;
    ZNVGAT.gt_crn = 0;
    ZNVGAT.gt_cre = 0;
    *(unsigned *)&ZNVGAT.gt_flg = 0;
    ZNVGAT.gt_vln = 0;

/* Issue gate request */

ZNGTCL__gate_call (&ZNVGAT);

return (0);

} /* issue_dis_ind */
```

B25

```
/**/
/* ZNVIRL__issue_rel_sdu      Issue Release SDU

This routine builds a release sdu gater and issues a gate
    request to the user layer.

This routine is used during the processing of a data request or
    expedited data request when an attempt to issue a gater event
    request to the Unix Network layer (PNetX) is unsuccessful.
*****************************************************************************/

ZNVIRL__issue_rel_sdu (gater_ptr)

register struct $gater *gater_ptr;

{ /* issue_rel_sdu */ extern struct $gater ZNVGAT;

ZNVGAT.gt_pri = 0;
    ZNVGAT.gt_nxt = NULL;
    *(long *)ZNVGAT.gt_mkr = *(long *)"GT01";
    ZNVGAT.gt_slr = gater_ptr->gt_dlr;
    ZNVGAT.gt_sin = gater_ptr->gt_din;
    ZNVGAT.gt_dlr = gater_ptr->gt_slr;
    ZNVGAT.gt_din = gater_ptr->gt_sin;
    ZNVGAT.gt_fnc = gtfdai;
    ZNVGAT.gt_sce = gater_ptr->gt_dst;
    ZNVGAT.gt_dst = gater_ptr->gt_sce;
    ZNVGAT.gt_dta = gater_ptr->gt_dta;
    ZNVGAT.gt_dis = 0;
    ZNVGAT.gt_crn = 0;
    ZNVGAT.gt_cre = 0;
    *(unsigned *)&ZNVGAT.gt_flg = 0;
    ZNVGAT.gt_vln = 0;

/* Issue gate request */

ZNGTCL__gate_call (&ZNVGAT);

return (0);

} /* issue_rel_sdu */
```

B26

```
/**/
/* ZNVERR__report_error        Report Error

This routine is the error reporter for the Pseudo Network Layer.

PNeT generated errors are reported as pseudo network subscription
   errors with a fixed network subscription name of HVX.

*****************************************************************************/ void ZNVERR__report_error (rsn_code, other_code)

unsigned int rsn_code;
unsigned int other_code;

{ /* report_error */ register unsigned char *var_ptr;
    register unsigned char *aptr;
    unsigned int funct, class;
    extern struct $gater ZNVGAT;

/* Setup fixed part of unsolicited message gater. */

ZNVGAT.gt_pri = 0;
    ZNVGAT.gt_nxt = NULL;
    *(long *)ZNVGAT.gt_mkr = *(long *)"GT01";
    ZNVGAT.gt_slr = gt_nwc;
    ZNVGAT.gt_sin = gt_x25;
    ZNVGAT.gt_dlr = gt_apl;
    ZNVGAT.gt_din = gt_nad;
    ZNVGAT.gt_fnc = gtfaum;
    ZNVGAT.gt_sce = NULL;
    ZNVGAT.gt_dst = NULL;
    ZNVGAT.gt_dta = NULL;
    ZNVGAT.gt_dis = 0;
    ZNVGAT.gt_crn = 0;
    ZNVGAT.gt_cre = 0;
    *(unsigned *)&ZNVGAT.gt_flg = 0;
    ZNVGAT.gt_vln = 0;

/* Setup variable part of network subscription error gater. */ var_ptr = &ZNVGAT.gt_var[0];

*var_ptr++ = gtfunc;                        /* function */
    *var_ptr++ = 2;
    funct = gterrr;
    aptr = (unsigned char *)&funct;
    *var_ptr++ = *aptr++;
    *var_ptr++ = *aptr++;
    ZNVGAT.gt_vln += 4;

*var_ptr++ = gtobjc;                        /* object class */
    *var_ptr++ = 2;
    class = gtclns;
    aptr = (unsigned char *)&class;
    *var_ptr++ = *aptr++;
    *var_ptr++ = *aptr++;
    ZNVGAT.gt_vln += 4;

*var_ptr++ = gtrsp1;                        /* NS name */
    *var_ptr++ = 8;
    memcpy (var_ptr, (unsigned char *)"HVX     ", 8);
    var_ptr += 8;
    ZNVGAT.gt_vln += 10;

*var_ptr++ = gtrsp3;                        /* reason code */
    *var_ptr++ = 2;
    aptr = (unsigned char *)&rsn_code;
    *var_ptr++ = *aptr++;
    *var_ptr++ = *aptr++;
    ZNVGAT.gt_vln += 4;

if (other_code != 0)
    {
        *var_ptr++ = gtrsp4;                    /* VAN reason code */
```

12

B27

```
        *var_ptr++ = 4;
        *var_ptr++ = 16;                        /* field type (hex) */
        *var_ptr++ = 4;                         /* field size (hex digits) */
        aptr = (unsigned char *)&other_code;
        *var_ptr++ = *aptr++;
        *var_ptr++ = *aptr++;
        ZNVGAT.gt_vln += 6;
    }

/* Issue gate request. */

ZNGTCL__gate_call (&ZNVGAT);

return;

} /* report_error */
```

B28

```
/**/
/* ZNVAVX__alloc_vc_index      Allocate VC index

This routine allocates a virtual circuit index id.
**********************************************************************/

ZNVAVX__alloc_vc_index ()

{ /* alloc_vc_index */ struct hvx *hvx_ptr;
    unsigned int status;
    $REGS;

hvx_ptr = $XNP_PTR (YNVHVX);

/* Allocate virtual circuit index id. */

$regs.$r2 = gtclvc;
    CALL_XNP (YNBAID);

return (status);

} /* alloc_vc_index */
```

B29

```
/**/
/* ZNVDVX__dealloc_vc_index      Deallocate VC index

This routine deallocates a virtual circuit index id.

*************************************************************************/ void ZNVDVX__dealloc_vc_index (index_id)

unsigned int index_id;

{ /* dealloc_vc_index */ struct hvx *hvx_ptr;
     unsigned int status;
     $REGS;

hvx_ptr = $XNP_PTR (YNVHVX);

/* Deallocate virtual circuit index id. */

$regs.$r1 = index_id;
     $regs.$r2 = gtclvc;
     CALL_XNP (YNBDID);

return;

} /* dealloc_vc_index */
```

B30

```
/* ZNVIOR                       HVX X.25 I/O REQUESTOR

Description:

This module builds iorbs and issues i/o requests to the Unix Network
  User Layer (PNetX) for the following functions:

Boot Event            (write)
  Gater Event           (write)
  VC Receive            (read)
  PHB Allocation        (write)

This module contains the following routines:

ZNVBEV__boot_event
            ZNVBEP__boot_event_posted
            ZNVGEV__gater_event
            ZNVGEP__gater_event_posted
            ZNVRCV__vc_receive
            ZNVRCP__vc_receive_posted
            ZNVPHB__phb_alloc
            ZNVPHP__phb_alloc_posted
            ZNVIRC__issue_vc_receive
            ZNVIPH__issue_phb_alloc
            ZNVPHR__replenish_phb
            ZNVPHE__phb_alloc_error
            ZNVGEE__gater_event_error
*/ include <ts_mcl.h>
include <rq_mcl.h>
#include "hi_c.h"
#include "$gater.h"
#include "$xnp.h"
#include "$phd.h"
#include "gate_mgr.h"
#include "$lme.h"
#include "hvx.h"
#include "hvx_rqb.h"
#include "hvx_err.h"

$MODULE_ID (ZNVIOR, 4.1, 0);
```

B31

```
/**/
/* ZNVBEV__boot_event    Boot Event

This routine builds a Boot Event (write) IORB and issues an
    i/o request to the Unix Network User Layer.
***************************************************************************/

ZNVBEV__boot_event ()

{ /* boot_event */ struct hvx * hvx_ptr;
    unsigned int status;
    TRB *trb_ptr;
    ETRB *etrb_ptr;
    struct iorb *iorb_ptr;
    struct elrn_iorb *eiorb_ptr;
    void ZNVIOP__io_req_posted ();
    void ZNVBEP__boot_event_posted();
    $REGS;

hvx_ptr = $XNP_PTR (YNVHVX);

etrb_ptr = &((struct hvx_rqb *)hvx_ptr->hv_rcvrb)->rq_etrb;

trb_ptr = ((TRB *)(etrb_ptr + 1)) - 1;
    eiorb_ptr = etrb_ptr + 1;
    iorb_ptr = ((struct iorb *)(eiorb_ptr + 1)) - 1;
    trb_ptr->trb_lnk = 0;
    trb_ptr->trb_status = 0;
    trb_ptr->trb_bits = 0x40;              /* no wait */
    trb_ptr->trb_lrn = 0xFD;               /* extended lrn */
    trb_ptr->trb_zeros = 0;
    trb_ptr->trb_adr = ZNVIOP__io_req_posted;
    *((unsigned **)&trb_ptr->trb_prm) = ZNVBEP__boot_event_posted;

etrb_ptr->e_lrn = $XNP_INT (YNMLRN);   /* mc2 lrn */ iorb_ptr->iorb_rsu = 0;
    iorb_ptr->iorb_ct1 = 0x0045;           /* no wait - sched back */
    iorb_ptr->iorb_lrn = 0xFD;             /* extended lrn */
    iorb_ptr->iorb_func = 1;               /* Boot Event (write) */
    iorb_ptr->iorb_adr = $XNP_PTR (YNVLSN); /* snsap table queue */
    iorb_ptr->iorb_dvs = 0;

*((TRB **)&eiorb_ptr->sys_use[0]) = trb_ptr;
    eiorb_ptr->e_lrn = hvx_ptr->hv_x25lrn;  /* pnetx lrn */

/* Issue i/o request to Unix Network User Layer (PNetX) */

$regs.$b4 = iorb_ptr;
    CALL_XNP (YIOREQ);

return (status);

} /* boot_event */
```

B32

```
/**/
/* ZNVBEP__boot_event_posted      Boot Event Posted

This module processes the post back of a Boot Event iorb.

The schedule back trb has been dequeued and posted prior to entry.
*******************************************************************************/
void ZNVBEP__boot_event_posted (trb_ptr)

TRB *trb_ptr;

{ /* boot_event_posted */

ETRB *etrb_ptr;
    struct iorb *iorb_ptr;
    struct elrn_iorb *eiorb_ptr;
    struct hvx *hvx_ptr;
    struct hvx_rqb *rq_ptr;
    unsigned int status;

hvx_ptr = $XNP_PTR (YNVHVX);

hvx_ptr->hv_bevp -= 1;

etrb_ptr = ((ETRB *)(trb_ptr + 1)) - 1;
    eiorb_ptr = trb_ptr + 1;
    iorb_ptr = ((struct iorb *)(eiorb_ptr + 1)) - 1;

status = *(unsigned int *)&iorb_ptr->iorb_rsu;

if (status != 0)
    {
        ZNVERR__report_error (hv25_bev, status);
        return;
    }

/* Allocate Packet Header Blocks for PNetX. */

ZNVIPH__issue_phb_alloc ();

/* Issue VC Receives to PNetX. */ for (rq_ptr = hvx_ptr->hv_rcvrb; rq_ptr != NULL; rq_ptr = rq_ptr->rq_nxt)
    {
        ZNVIRC__issue_vc_receive (&rq_ptr->rq_etrb);
    } return;

} /* boot_event_posted */
```

B33

```
/**/
/* ZNVGEV__gater_event    Gater Event

This routine builds a Gater Event (write) IORB and issues an
    i/o request to the Unix Network User Layer.
********************************************************************************/
ZNVGEV__gater_event (etrb_ptr, gater_ptr, dvs_word)

ETRB *etrb_ptr;
struct $gater *gater_ptr;
unsigned int dvs_word;

{ /* gater_event */ struct hvx * hvx_ptr;
    unsigned int status;
    TRB *trb_ptr;
    struct iorb *iorb_ptr;
    struct elrn_iorb *eiorb_ptr;
    void ZNVIOP__io_req_posted ();
    void ZNVGEP__gater_event_posted();
    $REGS;

hvx_ptr = $XNP_PTR (YNVHVX);

trb_ptr = ((TRB *)(etrb_ptr + 1)) - 1;
    eiorb_ptr = etrb_ptr + 1;
    iorb_ptr = ((struct iorb *)(eiorb_ptr + 1)) - 1;

trb_ptr->trb_lnk = 0;
    trb_ptr->trb_status = 0;
    trb_ptr->trb_bits = 0x40;              /* no wait */
    trb_ptr->trb_lrn = 0xFD;               /* extended lrn */
    trb_ptr->trb_zeros = 0;
    trb_ptr->trb_adr = ZNVIOP__io_req_posted;
    *((unsigned **)&trb_ptr->trb_prm) = ZNVGEP__gater_event_posted;

etrb_ptr->e_lrn = $XNP_INT (YNMLRN);   /* mc2 lrn */ iorb_ptr->iorb_rsu = 0;
    iorb_ptr->iorb_ct1 = 0x0045;           /* no wait - sched back */
    iorb_ptr->iorb_lrn = 0xFD;             /* extended lrn */
    iorb_ptr->iorb_func = 2;               /* gater event (write) */
    iorb_ptr->iorb_adr = gater_ptr;
    iorb_ptr->iorb_dvs = dvs_word;

*((TRB **)&eiorb_ptr->sys_use[0]) = trb_ptr;
    eiorb_ptr->e_lrn = hvx_ptr->hv_x25lrn; /* pnetx lrn */

/* Issue i/o request to Unix Network User Layer (PNetX) */

$regs.$b4 = iorb_ptr;

CALL_XNP (YIOREQ);

return (status);

} /* gater_event */
```

B34

```
/**/
/* ZNVGEP__gater_event_posted      Gater Event Posted

This module processes the post back of a Gater Event iorb.

The schedule back trb has been dequeued and posted prior to entry.
***************************************************************************/
void ZNVGEP__gater_event_posted (trb_ptr)

TRB *trb_ptr;

{ /* gater_event_posted */ struct hvx *hvx_ptr;
    ETRB *etrb_ptr;
    struct iorb *iorb_ptr;
    struct elrn_iorb *eiorb_ptr;
    struct $gater *gater_ptr;
    unsigned int status;

hvx_ptr = $XNP_PTR (YNVHVX);

etrb_ptr = ((ETRB *)(trb_ptr + 1)) - 1;
    eiorb_ptr = trb_ptr + 1;
    iorb_ptr = ((struct iorb *)(eiorb_ptr + 1)) - 1;
    gater_ptr = iorb_ptr->iorb_adr;

hvx_ptr->hv_gevc -= 1;

status = *(unsigned int *)&iorb_ptr->iorb_rsu;

switch (gater_ptr->gt_fnc)
    {
    case gtfcrq:                            /* connect request */
    case gtfcrp:                            /* connect response */
        if (gater_ptr->gt_dta != NULL)
        {
            ZNGRTB__return_buffer (gater_ptr->gt_dta);
        }
        break;

case gtfdrq:                            /* disconnect request */
        if (gater_ptr->gt_dta != NULL)
        {
            ZNGRTB__return_buffer (gater_ptr->gt_dta);
        }
        if (gater_ptr->gt_sce == NULL)
        {
            ZNVDVX__dealloc_vc_index (iorb_ptr->iorb_dvs);
        }
        break;

} /* endswitch */ if (status != 0)
    {
        ZNVGEE__gater_event_error (etrb_ptr, status);
    }

/* Return gater to gate manager. */

ZNGTRB__gate_return_block (gater_ptr);

/* Return memory for trb and iorb. */

ZNGRTB__return_buffer (etrb_ptr);

return;

} /* gater_event_posted */
```

B35

```
/**/
/* ZNVRCV__vc_receive            VC Receive

This routine builds a VC Receive (read) IORB and issues an
    i/o request to the Unix Network User Layer.
***************************************************************************/

ZNVRCV__vc_receive (etrb_ptr)

ETRB *etrb_ptr;

{ /* vc_receive */ struct hvx * hvx_ptr;
    struct $gater *gater_ptr;
    unsigned int status;
    TRB *trb_ptr;
    struct iorb *iorb_ptr;
    struct elrn_iorb *eiorb_ptr;
    void ZNVIOP__io_req_posted ();
    void ZNVRCP__vc_receive_posted();
    $REGS;

hvx_ptr = $XNP_PTR (YNVHVX);

trb_ptr = ((TRB *)(etrb_ptr + 1)) - 1;
    eiorb_ptr = etrb_ptr + 1;
    iorb_ptr = ((struct iorb *)(eiorb_ptr + 1)) - 1;
    gater_ptr = iorb_ptr + 1;

trb_ptr->trb_lnk = 0;
    trb_ptr->trb_status = 0;
    trb_ptr->trb_bits = 0x40;            /* no wait */
    trb_ptr->trb_lrn = 0xFD;             /* extended lrn */
    trb_ptr->trb_zeros = 0;
    trb_ptr->trb_adr = ZNVIOP__io_req_posted;
    *((unsigned **)&trb_ptr->trb_prm) = ZNVRCP__vc_receive_posted;

etrb_ptr->e_lrn = $XNP_INT (YNMLRN);    /* mc2 lrn */ iorb_ptr->iorb_rsu = 0;
    iorb_ptr->iorb_ct1 = 0x0045;            /* no wait - sched back */
    iorb_ptr->iorb_lrn = 0xFD;              /* extended lrn */
    iorb_ptr->iorb_func = 4;                /* vc receive (read) */
    iorb_ptr->iorb_adr = gater_ptr;
    iorb_ptr->iorb_dvs = 0;

*((TRB **)&eiorb_ptr->sys_use[0]) = trb_ptr;
    eiorb_ptr->e_lrn = hvx_ptr->hv_x25lrn;  /* pnetx lrn */

/* Issue i/o request to Unix Network User Layer (PNetX) */

$regs.$b4 = iorb_ptr;
    CALL_XNP (YIOREQ);

return (status);

} /* vc_receive */
```

B36

```
/**/
/* ZNVRCP__vc_receive_posted      VC Receive Posted

This module processes the post back of a VC Receive iorb.

The schedule back trb has been dequeued and posted prior to entry.
************************************************************************/
void ZNVRCP__vc_receive_posted (trb_ptr)

TRB *trb_ptr;

{ /* vc_receive_posted */ struct hvx *hvx_ptr;
    ETRB *etrb_ptr;
    struct iorb *iorb_ptr;
    struct elrn_iorb *eiorb_ptr;
    struct $gater *gater_ptr;
    unsigned int status;

hvx_ptr = $XNP_PTR (YNVHVX);

hvx_ptr->hv_vcrcv -= 1;

etrb_ptr = ((ETRB *)(trb_ptr + 1)) - 1;
    eiorb_ptr = trb_ptr + 1;
    iorb_ptr = ((struct iorb *)(eiorb_ptr + 1)) - 1;
    gater_ptr = iorb_ptr->iorb_adr;

status = *(unsigned int *)&iorb_ptr->iorb_rsu;

if (status != 0)
    {
        ZNVERR__report_error (hv25_rcv, status);
        return;
    }

/* Replenish Packet Header Blocks used by PNetX. */

ZNVPHR__replenish_phb (gater_ptr);

switch (gater_ptr->gt_fnc)
    {
    case gtfdin:                             /* disconnect indication */
    case gtfdcf:                             /* disconnect confirm */
        ZNVDVX__dealloc_vc_index (iorb_ptr->iorb_dvs);
        break;

} /*endswitch */

/* Pass PNetX generated gater to user layer. */

ZNGTCL__gate_call (gater_ptr);

/* Reissue VC Receive to PNetX. */

ZNVIRC__issue_vc_receive (etrb_ptr);

return;

} /* vc_receive_posted */
```

B37

```
/**/
/* ZNVPHB__phb_alloc        PHB Allocation Event

This routine builds a PHB Allocation Event (write) IORB and issues
   an i/o request to the Unix Network User Layer.
***************************************************************************/

ZNVPHB__phb_alloc (etrb_ptr, phb_ptr)

ETRB *etrb_ptr;
struct $phd *phb_ptr;

{ /* phb_alloc */ struct hvx * hvx_ptr;
    unsigned int status;
    TRB *trb_ptr;
    struct iorb *iorb_ptr;
    struct elrn_iorb *eiorb_ptr;
    void ZNVIOP__io_req_posted ();
    void ZNVPHP__phb_alloc_posted();
    $REGS;

hvx_ptr = $XNP_PTR (YNVHVX);

trb_ptr = ((TRB *)(etrb_ptr + 1)) - 1;
    eiorb_ptr = etrb_ptr + 1;
    iorb_ptr = ((struct iorb *)(eiorb_ptr + 1)) - 1;

trb_ptr->trb_lnk = 0;
    trb_ptr->trb_status = 0;
    trb_ptr->trb_bits = 0x40;            /* no wait */
    trb_ptr->trb_lrn = 0xFD;             /* extended lrn */
    trb_ptr->trb_zeros = 0;
    trb_ptr->trb_adr = ZNVIOP__io_req_posted;
    *((unsigned **)&trb_ptr->trb_prm) = ZNVPHP__phb_alloc_posted;

etrb_ptr->e_lrn = $XNP_INT (YNMLRN);   /* mc2 lrn */ iorb_ptr->iorb_rsu = 0;
    iorb_ptr->iorb_ct1 = 0x0045;         /* no wait - sched back */
    iorb_ptr->iorb_lrn = 0xFD;           /* extended lrn */
    iorb_ptr->iorb_func = 5;             /* PHB Allocation (write) */
    iorb_ptr->iorb_adr = phb_ptr;
    iorb_ptr->iorb_dvs = 0;

*((TRB **)&eiorb_ptr->sys_use[0]) = trb_ptr;
    eiorb_ptr->e_lrn = hvx_ptr->hv_x25lrn;  /* pnetx lrn */

/* Issue i/o request to Unix Network User Layer (PNetX) */

$regs.$b4 = iorb_ptr;
    CALL_XNP (YIOREQ);

return (status);

} /* phb_alloc */
```

B38

```
/**/
/* ZNVPHP__phb_alloc_posted    PHB Allocation Event Posted

This module processes the post back of a PHB Allocation Event iorb.

The schedule back trb has been dequeued and posted prior to entry.
***************************************************************************/
void ZNVPHP__phb_alloc_posted (trb_ptr)
TRB *trb_ptr;
{ /* phb_alloc_posted */ struct hvx *hvx_ptr;
    ETRB *etrb_ptr;
    struct iorb *iorb_ptr;
    struct elrn_iorb *eiorb_ptr;
    unsigned int status;

hvx_ptr = $XNP_PTR (YNVHVX);

hvx_ptr->hv_phbc -= 1;

etrb_ptr = ((ETRB *)(trb_ptr + 1)) - 1;
    eiorb_ptr = trb_ptr + 1;
    iorb_ptr = ((struct iorb *)(eiorb_ptr + 1)) - 1;

status = *(unsigned int *)&iorb_ptr->iorb_rsu;

if (status != 0)
    {
        ZNVPHE__phb_alloc_error (etrb_ptr, status);
    }

/* Return memory for trb and iorb. */

ZNGRTB__return_buffer (etrb_ptr);

return;

} /* phb_alloc_posted */
```

B39

```
/**/
/* ZNVIRC__issue_vc_receive       Issue VC Receive

This routine initializes a empty gater buffer and issues a
    VC Receive to the Unix Network User Layer (PNetX).

******************************************************************************/

ZNVIRC__issue_vc_receive (etrb_ptr)

ETRB *etrb_ptr;

{ /* issue_vc_receive */ struct hvx *hvx_ptr;
    struct elrn_iorb *eiorb_ptr;
    struct $gater *gater_ptr;
    unsigned int status;

hvx_ptr = $XNP_PTR (YNVHVX);

eiorb_ptr = etrb_ptr + 1;
    gater_ptr = eiorb_ptr + 1;

/* Issue VC Receive to PNetX. */ memset (gater_ptr, (int)0, sizeof(struct $gater));

if ((status = ZNVRCV__vc_receive (etrb_ptr)) != 0)
    {
        ZNVERR__report_error (hv25_rcv, status);
        return (1);
    } hvx_ptr->hv_vcrcv += 1;

return (0);

} /* issue_vc_receive */
```

10

B40

```
/**/
/* ZNVIPH__issue_phb_alloc        Issue PHB Allocation Event

This routine allocates memory for packet header blocks and issues a
    PHB Allocation Event to the Unix Network User Layer (PNetX).
***************************************************************************/
ZNVIPH__issue_phb_alloc ()
{ /* issue_phb_alloc */ struct hvx *hvx_ptr;
    struct $phd *phb_ptr;
    struct $phd **phb_nxt;
    ETRB *etrb_ptr;
    unsigned int status;

hvx_ptr = $XNP_PTR (YNVHVX);

if (hvx_ptr->hv_phbx > PHB_LOW)
    {
        return (0);
    } phb_ptr = NULL;
    phb_nxt = &phb_ptr;

/* Allocate memory for trb and iorb. */ if (ZNGGTB__get_buffer (((sizeof (ETRB) + 1)/2) +
    ((sizeof (struct elrn_iorb) + 1)/2), &etrb_ptr) != 0)
    {
        ZNVERR__report_error (hv25_mem, 0);
        return (1);
    }

/* Allocate memory for Packet Header Blocks. */ while (hvx_ptr->hv_phbx < PHB_HIGH)
    {
        if ((*phb_nxt = ZNGGPH__get_packet_header ()) != NULL)
        {
            phb_nxt = &((*phb_nxt)->ph_lnk);
            hvx_ptr->hv_phbx += 1;
        }
        else
        {
            ZNVERR__report_error (hv25_mem);
            break;
        }
    } /* endloop */ if (phb_ptr == NULL)
    {
        ZNGRTB__return_buffer (etrb_ptr);
        return (1);
    }

/* Issue PHB Allocation Event to PNetX. */ if ((status = ZNVPHB__phb_alloc (etrb_ptr, phb_ptr)) != 0)
    {
        ZNVPHE__phb_alloc_error (etrb_ptr, status);
        ZNGRTB__return_buffer (etrb_ptr);
        return (1);
    } hvx_ptr->hv_phbc += 1;

return (0);
} /* issue_phb_alloc */
```

B41

```
/**/
/* ZNVPHR__replenish_phb         Replenish PHBs

This routine computes the number of Packet Header Blocks used by
   PNetX and allocates replacement Packet Header Blocks.
********************************************************************************/
void ZNVPHR__replenish_phb (gater_ptr)
struct $gater *gater_ptr;

{ /* replenish_phb */ struct hvx *hvx_ptr;
    struct $phd *phb_ptr;

hvx_ptr = $XNP_PTR (YNVHVX);

switch (gater_ptr->gt_fnc)
    {
    case gtfccf:                            /* connect confirm */
    case gtfdin:                            /* disconnect indication */
    case gtfcin:                            /* connect indication */
        if (gater_ptr->gt_dta != NULL)
        {
            hvx_ptr->hv_phbx -= 1;
            ZNVIPH__issue_phb_alloc ();
        }
        break;

case gtfdti:                            /* data indication */
    case gtfexi:                            /* expedited data ind */
        for (phb_ptr = gater_ptr->gt_dta; phb_ptr != NULL;
        phb_ptr = phb_ptr->ph_lnk)
        {
            hvx_ptr->hv_phbx -= 1;
        }
        ZNVIPH__issue_phb_alloc ();
        break;

} /* endswitch */ return;

} /* replenish_phb */
```

B42

```
/**/
/* ZNVPHE__phb_alloc_error        PHB Allocation Error

This routine performs the error processing for a PHB Allocation Event
   issued to the Unix Network User Layer (PNetX).

This routine may be invoked from the requesting routine or from the
   post back routine for PHB Allocation Events.

*******************************************************************************/ void ZNVPHE__phb_alloc_error (etrb_ptr, status)

ETRB *etrb_ptr;
unsigned int status;

{ /* phb_alloc_error */ struct hvx *hvx_ptr;
    struct elrn_iorb *eiorb_ptr;
    struct iorb *iorb_ptr;
    struct $phd *phb_ptr;

hvx_ptr = $XNP_PTR (YNVHVX);

eiorb_ptr = etrb_ptr + 1;
    iorb_ptr = ((struct iorb *)(eiorb_ptr + 1)) - 1;

ZNVERR__report_error (hv25_phb, status);

while (iorb_ptr->iorb_adr != NULL)
    {
        phb_ptr = iorb_ptr->iorb_adr;
        iorb_ptr->iorb_adr = phb_ptr->ph_lnk;
        ZNGRPH__return_packet_header (phb_ptr);
        hvx_ptr->hv_phbx -= 1;
    } return;

} /* phb_alloc_error */
```

B43

```
/**/
/* ZNVGEE__gater_event_error        Gater Event Error

This routine performs the error processing for a Gater Event issued
    to the Unix Network User Layer (PNetX).

This routine is called from the post back routine for Gater Events.
************************************************************************/
void ZNVGEE__gater_event_error (etrb_ptr, status)

ETRB *etrb_ptr;
unsigned int status;

{ /* gater_event_error */ struct hvx *hvx_ptr;
    struct iorb *iorb_ptr;
    struct elrn_iorb *eiorb_ptr;
    struct $gater *gater_ptr;

hvx_ptr = $XNP_PTR (YNVHVX);

eiorb_ptr = etrb_ptr + 1;
    iorb_ptr = ((struct iorb *)(eiorb_ptr + 1)) - 1;
    gater_ptr = iorb_ptr->iorb_adr;

ZNVERR__report_error (hv25_gev, status);

switch (gater_ptr->gt_fnc)
    {
    case gtfcrq:                                /* connect request */
        ZNVIDX__issue_dis_ind (gater_ptr);
        ZNVDVX__dealloc_vc_index (iorb_ptr->iorb_dvs);
        break;

case gtfcrp:                                /* connect response */
        ZNVDVX__dealloc_vc_index (iorb_ptr->iorb_dvs);
        break;

case gtfdtr:                                /* data request */
    case gtfexr:                                /* expedited data request */
        ZNVIRL__issue_rel_sdu (gater_ptr);
        break;

} /* endswitch */ return;

} /* gater_event_error */
```

B44

```
          TITLE    ZNVENT,   HVX PNet Entry Point Routines
          libm     dsa_lib
          libm     os_lib
*
*         Bull Confidential and Proprietary
*
          TEXT     'ZNVENT'
          dc       z'4100'              Release 4.1, Revision 0
*
*  Description:
*
*  This module contains assembly language routines for gate manager
*  wakeup and for PNetX Event completion.
*
*  These routines create the stack and work area for the C language
*  environment.
*
/
          $xequ    ,,,xnp
          nlst
          z3tcb
          z3rb
          list
/
          $gmgr
/
          $gate
/
*
*         Xdefs.
*
          xdef     znvgdh              gate descriptor
          xdef     znvpch              patch area
          xdef     znviop              PNetX event completion
*
*         Xlocs.
*
          xloc     znvgtr              gate request entry
/
*
*         HVX Pseudo Network Layer gate descriptor.
*
znvgdh    $gate    nwc,x25,X25,znvgtr,drm,rqt,cc,0,znvent
/
*
*         HVX Pseudo Network Layer Gate Manager Task Entry.
*         Allocate C work area and stack within MC2 stack.
*         Dispatch to gate manager task prologue.
*
znvent    equ      $
          ldb      $b6,<null+x'18'     scb
          ldb      xnp,$b6.xroot       osi/dsa root
          ldb      $b7,xnp.ynbmc2      mc2 stack
          ldr      $r1,$b7.1           mc2 stack size ldb      $b1,nil             setup C work area
          stb      $b1,-$b7            $lcomw
          stb      $b1,-$b7            cwa
          stb      $b1,-$b7            prev stack area
          stb      $b1,-$b7            next stack area
*
          adv      $r1,-11             setup C stack
          str      $r1,-$b7            max stack size
          cl       -$b7                current stack size
          ldt      $b7                 load t register
*
          ldv      $r7,2               frame size (2 words)
          acq      $b7,$r7             acquire stack (frame 1)
          stb      $b5,$b7             return address
*
*         Setup argument list for zngtmg.
*         Dispatch to gate manager task prologue.
*
          ldv      $r7,3               frame size (3 words)
          acq      $b7,$r7             acquire stack (frame 2)
          lab      $b4,$b7.3
          cl       -$b4
```

B45

```
            lab     $b5,znvgdh          gate descriptor
            stb     $b5,-$b4
            ldv     $r6,1               argument count
            lnj     $b5,zngtmg          gate manager task prologue
    *
            rlq     $b7                 relinquish stack (frame 2)
            lab     $b1,<null
            ldt     $b1                 clear t register
    *
            ldr     $r1,=$r7            return status
            ldb     $b5,$b7             return to caller
            jmp     $b5
    /
    *
    *       PNetX Event Completion.
    *       Allocate C work area and stack within MC2 stack.
    *       Dispatch to specified PNeT post back routine.
    *
    *       $B4 = request block
    *
    znviop  equ     $
            ldb     $b6,<null+x'18'     scb
            ldb     xnp,$b6.xroot       osi/dsa root
            ldb     $b7,xnp.ynbmc2      mc2 stack
            ldr     $r1,$b7.1           mc2 stack size
            stb     $b5,-$b7            return address
    *
            str     $r1,-$b7            mc2 stack size
            lnj     $b5,*xnp.yxdq       dequeue irb
            ldv     $r2,0               return status
            lnj     $b5,*xnp.yxpost     post request
            ldr     $r1,+$b7            mc2 stack size
    *
            ldb     $b1,nil             setup C work area
            stb     $b1,-$b7            $lcomw
            stb     $b1,-$b7            cwa
            stb     $b1,-$b7            prev stack area
            stb     $b1,-$b7            next stack area
    *
            adv     $r1,-13             setup C stack
            str     $r1,-$b7            max stack size
            cl      -$b7                current stack size
            lbt     $iv.t_ism2,=z'0303' t register bit in save mask
            ldt     $b7                 load t register
    *
            ldv     $r7,0               frame size (0 length)
            acq     $b7,$r7             acquire stack
    *
            ldv     $r7,3               frame size (3 words)
            acq     $b7,$r7             acquire stack
            stb     $b4,$b7             trb pointer
            cl      $b7.2
            ldb     $b5,$b4.rb_prm      post back routine address
            lab     $b4,$b7             argument list
            ldv     $r6,1               argument count
            lnj     $b5,$b5             call post back routine
    *
            rlq     $b7                 relinquish stack frame
            lab     $b7,$b7.10          stack header + C work area
            lab     $b1,<null
            ldt     $b1                 clear t register
            ldb     $b5,+$b7            return to caller
            jmp     $b5
    /
    *
    *       Patch area.
    *
    znvpch  resv    100,0
            end     znvent
```

2

B46

```
         TITLE    ZNVINI,   HVX PNET INITIALIZATION
         libm     dsa_lib
*
*        Bull Confidential and Proprietary
*
         TEXT     'ZNVINI'
         dc       z'4100'              Release 4.1, Revision 0
*
* Description:
*
* This module performs initialization functions for the HVX Pseudo
* Network Layer.
*
/
         $xequ    ,,,xnp
/
         $gate
/
*
*        Xdefs.
*
         xdef     znvini
*
*        Xlocs.
*
         xloc     znvgdh              gate descriptor
*
*        Xvals.
*
         xval     yngtat              attach gate
         xval     yngx2c              gate manager assembly to C
         xval     ynmlrn              mc2 lrn
/
*
*        HVX Pseudo Network Layer Initialization.
*        Setup wakeup task lrn in gate descriptor.
*        Attach gate descriptor.
*
znvini   stb      $b5,-$b7
         lab      $b4,<znvgdh         gate descriptor
         ldr      $r1,xnp.ynmlrn      mc2 lrn
         str      $r1,$b4.ga_wkv      wakeup value
         ldr      $r1,=yngtat         attach gate
         lnj      $b5,*xnp.yngx2c
         ldr      $r2,=$r1            return status
         ldb      $b5,+$b7
         jmp      $b5
/
*
*        Patch area.
*
         resv     50,0
         end      znvini,znvini
```

1

APPENDIX C - PNETX

C1

```
/*
 *  Name:       emu_x25.c
 *  Purpose:    io server for x25
 *  Functions in this module:
 *       (see pnx_func.h for prototype declarations)

void            pnx_io()        - main driver
    void            pnx_handler()   - signal handler
*/

/* general header files: */
#include "sys_head.h"
include "emu_head.h"
#include "mqi_head.h"
#include "z3rct.h"
#include "z_rb.h"
#include "z3irb.h"
#include <sys/wait.h>

/* PNetX specifics: */
#include <x25sdefs.h>
include "pnx_head.h"
include "pnx_vccb.h"

extern char         *base;
extern void         sigsak();
extern struct EMU_OPTS opt;
extern int          argc_sv;
extern char         **argv_sv;
extern char         **envp_sv;
extern unsigned int verbose;

/* Global fields specific to PNetX */ struct pnx_global   *PnetXGlobal;
int                 TraceShmid;

sigset_t            pnx_sigs;       /* to catch (or block) SIGCHLD, SIGUSR1,
                                     * SIGUSR2, SIGALRM */
struct sigaction    pnx_actions;

int                 pnx_internal_sig_recvd;
int                 pnx_clock_running;

/*********
 * pnx_io *
 *********/

/* This module is the initial entry point for the PNetX (X.25) driver.  It
 * is called once, by emu_mnt, when the 'x25' directive is encountered in
 * the CLM_HVX file.  After initialization, it simply remains in a forever
 * loop, waiting for a SIGUSR1 (indicating an incoming I/O request from
 * PNet), a SIGCHLD (indicating the termination of the vc_clear process), or
 * an incoming X.25 event. */ void
pnx_io()

{ int             status;
    int             signo;
    int             CounterId;  /* currentX25 counter ID */
    int             i;
    struct vccb     *VCCB;
    sigset_t        zeromask;
    struct passwd   *pwent;
    char            *username;

#ifdef PNXDEBUG
    syslog(LOG_DEBUG, "Entered pnx_io");
endif close_fd();
```

C2

```
    PnetXGlobal = NULL;
    pnx_internal_sig_recvd = 0;
    pnx_clock_running = 0;

/* SIGUSR1 & SIGALRM must be blocked while any signal is being handled. */
    sigemptyset(&zeromask);
    sigemptyset(&pnx_sigs);
    sigaddset(&pnx_sigs, SIGUSR1);
    sigaddset(&pnx_sigs, SIGALRM);

pnx_actions.sa_handler = pnx_handler;
    pnx_actions.sa_mask = pnx_sigs;
    pnx_actions.sa_flags = 0;
    /* use pnx_handler for signals, ignoring any we don't care about. */
    for (signo = 0; signo < NSIG; signo++)
    {
        switch (signo)
        {
        case SIGUSR1:
        case SIGUSR2:
        case SIGALRM:
            sigaction(signo, &pnx_actions, NULL);
            break;
        case SIGCHLD:
        case SIGABRT:
            sigaction(signo, SIG_DFL, NULL);
            break;
        case SIGSOUND:
            if (opt.rusage)
            {
                init_rusage("X25");
            }
            else
            {
                sigaction(signo, SIG_IGN, NULL);
            }
            break;
        case SIGSAK:
            sigset(SIGSAK, sigsak);
        default:
            sigaction(signo, SIG_IGN, NULL);
            break;
        }                               /* end switch */
    }                                   /* end for */
    pnx_initialize();

for (;;)
    {
        /* here, we want signals unblocked */
        sigprocmask(SIG_UNBLOCK, &pnx_sigs, NULL);

pnx_internal_sig_recvd = 0;

if ((!PnetXGlobal->num_ctrs)
            ||
            (!PnetXGlobal->num_vcrcv)
            ||
            (!PnetXGlobal->num_phb))
        {
            /* if no active x25 counters to wait on, or no read requests
             * available from PNet, or no PHBs available, wait for signal
             * from PNet */
#ifdef PNXDEBUG
            syslog(LOG_DEBUG, "pnx_io - sigsuspend(): num_ctrs = %d num_vcrcv = %d num_phb = %d
                PnetXGlobal->num_ctrs,
                PnetXGlobal->num_vcrcv,
                PnetXGlobal->num_phb);
endif /* sigsuspend always returns -1.  Check errno */
            sigsuspend(&zeromask);

if (errno != EINTR)
            {
```

C3

```
                    /* error case */
#ifdef PNXDEBUG
            pnx_ERR__report_error(JUST_HVX, LOG_DEBUG,
                                 (EMUX25 + 3), NULL, PNX_SYS_ERR);
#endif                           /* PNXDEBUG */
                }
                continue;
            }
            /* END OF sigsuspend() PROCESSING */

/* START x25_ctr_wait() PROCESSING */ ifdef PNXDEBUG
        syslog(LOG_DEBUG, "pnx_io - x25_ctr_wait(), %d ctrs",
                PnetXGlobal->num_ctrs);
#endif
        status = x25_ctr_wait(PnetXGlobal->num_ctrs,
                              PnetXGlobal->counters->x25_ctrs);

/* block signals while processing */
        sigprocmask(SIG_BLOCK, &pnx_sigs, NULL);
#ifdef PNXDEBUG
        syslog(LOG_DEBUG, "pnx_io - after wait - sts = %d", status);
endif if (status < 0)
        {
            if (pnx_internal_sig_recvd)
            {
                /* This flag only means that SIGCHLD or SIGUSR1 was received
                 * sometime since last pass through loop.  It doesn't mean
                 * that the negative return status is because of SIGCHLD or
                 * SIGUSR1 - what do we do? */
                pnx_internal_sig_recvd = 0;
                continue;           /* we already handled the signal */
            }
            else
            {
                /* error case - will require more handling */
#ifdef PNXDEBUG
                pnx_ERR__report_error(JUST_HVX, LOG_DEBUG,
                                     (EMUX25 + 1), NULL, PNX_API);
#endif                           /* PNXDEBUG */
            }
            continue;               /* forever loop */
        }

/* By now, we know by non-negative status that the x25_ctr_wait
         * returned with an X.25 event */ if (status = pnx_x25_wakeup(status) != 0)
        {
            pnx_ERR__report_error(JUST_HVX, LOG_ERR, (EMUX25 + 2),
                                 NULL, PNX_ERROR);
        }
    }                               /* forever loop */
}                                   /* pnx_io */

/**************
 * pnx_handler *
 **************/

/* This function handles those signals that PNetX is specifically interested
 * in - SIGUSR1, indicating an inbound IORB from PNet, and SIGCHLD,
 * indicating that a VC Clear process has completed. */
void
pnx_handler(int sigtype)
{
    pnx_internal_sig_recvd = 1;
#ifdef PNXDEBUG
    syslog(LOG_DEBUG, "PNetX sig handler - %d", sigtype);
#endif
    switch (sigtype)
```

C4

```
{
case SIGCHLD:
    /* death of child */
    if (!PnetXGlobal->x25_initing)
    {
        pnx_vc_clear_complete();
    }
    break;

case SIGUSR1:
    /* PNet event.  NOTE - no events are posted here.  They will be
     * posted by mqi_input(), since we may handle more than one IORB */
    mqi_input();
    break;

case SIGUSR2:
    /* SIGUSR2 received from emu_main. Clean up all the resources and
     * exit */
    pnx_cleanup();
    break;

case SIGALRM:
    /* This is our clock tick.  Used to tell us when to retry an X.25
     * link (since the link layer isn't letting us know when it is
     * available, as in HVS) */
    pnx_clock_tick();
    if (pnx_clock_running)
    {
        alarm(5);
    }
    break;
}                               /* end switch */
#ifdef PNXDEBUG
    syslog(LOG_DEBUG, "exit PNetX sig handler");
#endif
}                               /* end pnx_handler */
```

C5

```
/*
 * Name:       pnx_gtin.c
 * Purpose:    PNet to PNetX interface - GATERs sent to PNetX
 *             NOTE - AIX ONLY
 * Functions in this module:
 *        (see pnx_func.h for prototype declarations)
   int         pnx_UCR__process_con_req()
   int         pnx_CRQ__process_con_req()
   int         pnx_SVC__svc_con_req()
   int         pnx_PVC__pvc_con_req()
   int         pnx_UCP__process_con_resp()
   int         pnx_UDR__process_dis_req()
   int         pnx_UDT__process_data_req()
   int         pnx_URS__process_reset_req()
   int         pnx_ACM__admin_command()

*/ include "sys_head.h"
include "emu_head.h"
#include "macro.h"
#include "mqi_head.h"

#include <x25sdefs.h>
include "pnx_head.h"
include "pnx_vccb.h"
#include "hvx_phd.h"
#include "pnx_snsap.h"
#include "hvx_gater.h"
#include "hvx_lme.h"
#include "x25fac.h"
#include "x25dia.h"
#include "x25vce.h"
#include "x25sta.h"
#include "x25nse.h"

extern char      *base;

extern struct pnx_global *PnetXGlobal;

/***************************
 * pnx_UCR__process_con_req *
 ***************************/

/* Process Connect Request
 *
 * his routine processes a connect request gater.
 *
 * The parameters passed in the connect request gater are used to create a
 * virtual circuit control block (VCCB) and to initialize relevant X.25 API
 * data structures.
 *
 * he user gate id, user connection id, and user receive credit are passed in
 * the fixed part of the gater and are used to update the VCCB.
 *
 * A local SAP name or local X.121 address is passed in the variable part of
 * the gater and is used to locate the local SNSAP table. A remote SAP name
 * may also be passed in the variable part of the gater and will be used to
 * locate the remote SNSAP table. In those cases where the remote node is
 * not configured, the remote X.121 address may be passed in the variable
 * part of the gater.
 *
 * Optional user facilities which may be sent in the cb_call struct are also
 * passed in the variable part of the gater.
 *
 * A pointer to the call user data to be sent in the call request is passed in
 * the gt_dta field of the gater.
 *
 * To connect to a permanent virtual circuit the logical channel number
 * assigned to the permanent virtual circuit is passed in the variable part
 * of the gater in addition to the local SAP name. */ int
pnx_UCR__process_con_req(struct GATER * gater_ptr,
```

C6

```
                      ushort nad_index)
{ unsigned int      i, lcn_flg;
    unsigned int      cga_flg, cga_ndx;
    unsigned int      ext_flg;
    struct snsap      *snsap_ptr;
    unsigned char     l_sap[9];
#ifdef PNXDEBUG
    syslog(LOG_DEBUG, "pnx_UCR");
#endif
    cga_flg = 0;
    lcn_flg = 0;
    ext_flg = 0;
    snsap_ptr = NULL;
    l_sap[0] = 0;

for (i = 1; i <= 8; i++)
    {
        l_sap[i] = ' ';
    }                              /* end loop */

/* Locate SNSAP table for local SAP. */ for (i = 0; i < gater_ptr->gt_vln; i += gater_ptr->gt_var[i + 1] + 2)
    {
        switch (gater_ptr->gt_var[i])
        {
        case gpccla:                   /* calling (local) sap    */
            if (gater_ptr->gt_var[i + 1] > 8)
            {
                pnx_NSN__ns_error2(NULL, st25_ISL);
                return (-1);
            }                          /* end if */ l_sap[0] = gater_ptr->gt_var[i + 1];
            memcpy(&l_sap[1], &gater_ptr->gt_var[i + 2], l_sap[0]);
            if (pnx_GSN__get_snsap(&l_sap[0], &snsap_ptr) != 0)
            {
                pnx_NSN__ns_error2(&gater_ptr->gt_var[i + 1], st25_SNF);
                return (-1);
            }                          /* end if */
            break;

case x25cga:                   /* Calling X.121 address  */
            cga_ndx = i;
            cga_flg = 1;
            break;

case x25lcn:                   /* Logical channel number */
            lcn_flg = 1;
            break;

case x25cgn:                   /* Calling addr extension  */
        case x25cdn:                   /* Called address extension */
            ext_flg = 1;
            break;

}                              /* end switch */
    }                                  /* end loop */ if (snsap_ptr == NULL)
    {
        if (cga_flg != 0)
        {
            if (pnx_LSN__locate_snsap(gater_ptr, cga_ndx, &snsap_ptr)
                != 0)
            {
                pnx_NSN__ns_error2(NULL, st25_ANF);
                return (-1);
            }                          /* end if */
        }
        else
        {
            pnx_SSN__select_snsap(&snsap_ptr);
            if (snsap_ptr == NULL)
            {
```

2

```
                    pnx_NSN__ns_error2(NULL, st25_NSA);
                    return (-1);
            }                           /* end if */
        }                               /* end if */
    }                                   /* end if */

/* Validate dsac state of network subscription. */ if (snsap_ptr->sn_dsac == gtdown ||
        snsap_ptr->sn_dsac == gtlock ||
        snsap_ptr->sn_dsac == gttest ||
        snsap_ptr->sn_dsac == gtshut)
    {
        pnx_NSE__ns_error(snsap_ptr, NSE_LSU);
        return (-1);
    }                                   /* end if */

/* Validate request parameters. */ if (lcn_flg == 0)                   /* its SVC   */
    {
        if (snsap_ptr->sn_ocb)
        {
            pnx_NSE__ns_error(snsap_ptr, NSE_OCB);
            return (-1);
        }                               /* end if */
        if (snsap_ptr->sn_numvc >= snsap_ptr->sn_maxvc)
        {
            pnx_NSE__ns_error(snsap_ptr, NSE_MVC);
            return (-1);
        }                               /* end if */
        if (ext_flg != 0 &&
            snsap_ptr->sn_ver != SN_V84)
        {
            pnx_NSE__ns_error(snsap_ptr, NSE_EXT);
            return (-1);
        }                               /* end if */
    }                                   /* end if */
#ifdef PNXDEBUG
    syslog(LOG_DEBUG, "exit pnx_UCR");
endif return (pnx_CRQ__process_con_req(snsap_ptr, gater_ptr, nad_index));
}                                       /* end pnx_UCR__process_con_req */

/****************************
 * pnx_CRQ__process_con_req *
 ****************************/

/* Process Connect Request
 *
 * This routine continues processing of a connect request.
 *
 * This routine is called after the local SNSAP table has been located.   */
int
pnx_CRQ__process_con_req(struct snsap * snsap_ptr,
                         struct GATER * gater_ptr,
                         ushort nad_index)
{
    unsigned int    i, lcn_flg;
    unsigned int    lcgn, lcn;
    unsigned char   *cga_ptr;
#ifdef PNXDEBUG
    syslog(LOG_DEBUG, "pnx_CRQ");
endif cga_ptr = NULL;
    lcn_flg = 0;
    /* Find X.121 address or PVC logical channel number. */ for (i = 0; i < gater_ptr->gt_vln; i += gater_ptr->gt_var[i + 1] + 2)
```

C8

```
        {
            switch (gater_ptr->gt_var[i])
            { case x25cga:                /* Calling X.121 address   */
                cga_ptr = &gater_ptr->gt_var[i + 2];
                break;

case x25lcn:                /* Logical channel number  */
                lcgn = gater_ptr->gt_var[i + 2];
                lcn = gater_ptr->gt_var[i + 3];
                lcn_flg = 1;
                break;

}                           /* end switch */
        }                               /* end loop */
#ifdef PNXDEBUG
        syslog(LOG_DEBUG, "exit pnx_CRQ");
#endif
        if (lcn_flg == 0)
        {
            if (cga_ptr == NULL)
            {
                cga_ptr = &snsap_ptr->sn_addr[0];
            }                           /* end if */
            return (pnx_SVC__svc_con_req(snsap_ptr, gater_ptr, cga_ptr, nad_index));
        }
        else
        {
            return (pnx_PVC__pvc_con_req(snsap_ptr, gater_ptr, lcgn, lcn, nad_index));
        }                               /* end if */
    }                                   /* pnx_CRQ__process_con_req */

/***********************
 * pnx_SVC__svc_con_req *
 ***********************/

/* Process SVC Connect Request
 *
 * This routine processes a connect request gater which specifies creation of a
 * switched virtual circuit.
 *
 * The parameters passed in the connect request gater are used to create a
 * virtual circuit control block (VCCB) and initialize the X.25 API
 * data-structures related to SVC Call.
 *
 * The user gate id, user connection id, and user receive credit are passed in
 * the fixed part of the gater and are used to update the VCCB.
 *
 * Optional user facilities which may be sent in the cb_call struct are passed
 * in the variable part of the gater.
 *
 */
int
pnx_SVC__svc_con_req(struct snsap * snsap_ptr,
                     struct GATER * gater_ptr,
                     unsigned char *cga_ptr,
                     ushort nad_index)
{
    struct vccb     *vccb_ptr;
#ifdef PNXDEBUG
    syslog(LOG_DEBUG, "pnx_SVC - NAD index is %d", nad_index);
#endif
    /* Create VCCB for switched virtual circuit. */ if (pnx_MVC__make_vccb(&vccb_ptr, snsap_ptr) != 0)
    {
        return (-1);
    }                                   /* end if */
```

C9

```
    vccb_ptr->vc_snsap = snsap_ptr;
    vccb_ptr->vc_olv = gater_ptr->gt_slr;
    vccb_ptr->vc_oin = gater_ptr->gt_sin;
    GET4(vccb_ptr->vc_ucxid, gater_ptr->gt_sce);
    vccb_ptr->vc_urcvc = gater_ptr->gt_crn;
    vccb_ptr->vc_xrcvc = gater_ptr->gt_cre;
    vccb_ptr->vc_xsndc = vccb_ptr->vc_xrcvc;
    vccb_ptr->vc_ndxid = nad_index;

/* Set init_or_acceptor field to initiator (IN). */ vccb_ptr->vc_in_ac = *(short *) "IN";
    vccb_ptr->vc_init = 1;

/* Calling X.121 address */ vccb_ptr->vc_cgna[0] = *cga_ptr++;
    if (vccb_ptr->vc_cgna[0] != 0)
    {
        pnx_MNA__move_net_addr(cga_ptr, 0, &vccb_ptr->vc_cgna[1], 0,
                          vccb_ptr->vc_cgna[0]);
    }                     /* end if */

/* Increment vc count and set dsac state to used for local network
     * subscription. */ snsap_ptr->sn_numvc += 1;
    snsap_ptr->sn_dsac = gtused;

/* Initialize API cb_call structure and  Send call request */ if (pnx_SCR__send_call_req(vccb_ptr, gater_ptr) != 0)
    {
        pnx_CVC__close_vc(vccb_ptr);
        pnx_RVC__release_vccb(vccb_ptr);
        return (-1);
    }
#ifdef PNXDEBUG                 /* end if */
    syslog(LOG_DEBUG, "exit pnx_SVC");
#endif
    return (0);

}                           /* pnx_SVC__svc_connect_req */

/***************************
 * pnx_UCP__process_con_resp *
 ***************************/

/* Process Connect Response
 *
 * This routine processes a connect response gater.
 *
 * The parameters passed in the connect response gater are used to update the
 * VCCB and load the X.25 API data structures used to send the Call Accepted
 * packet to the remote station.
 *
 * The user gate id, user connection id, and user receive credit are passed in
 * the fixed part of the gater and are used to update the VCCB.
 *
 * Optional user facilities which may be sent in the Call Accepted packet are
 * passed in the variable part of the gater.
 *
 * A pointer to the call user data to be sent in the Call Accepted packet is
 * passed in the data field of the gater (NOTE it is NOT a kPacket Header
 * Block). */
int
pnx_UCP__process_con_resp(struct vccb * vccb_ptr, struct GATER * gater_ptr)
{
    unsigned int    i;
    struct snsap    *snsap_ptr;
    unsigned char   *udf_buf;
    short           rc;
#ifdef PNXDEBUG
    syslog(LOG_DEBUG, "pnx_UCP, VC=%lX", vccb_ptr);
```

C10

```
#endif
    snsap_ptr = vccb_ptr->vc_snsap;

if (vccb_ptr->vc_wfcr == 0)    /* waiting for conn resp gater */
    {
        return (0);
    }                              /* end if */
    vccb_ptr->vc_wfcr = 0;

if (vccb_ptr->vc_state == VC_P5 &&   /* call collision state */
        !(snsap_ptr->sn_dce))            /* (not)DTE acting as DCE */
    {
        return (0);
    }                              /* end if */

/* Process fields in fixed part of gater. */ vccb_ptr->vc_olv = gater_ptr->gt_slr;    /* source layer/instance */
    vccb_ptr->vc_oin = gater_ptr->gt_sin;
    GET4(vccb_ptr->vc_ucxid, gater_ptr->gt_sce);
    vccb_ptr->vc_urcvc = gater_ptr->gt_crn;

/* Clear call if fast select - restricted response. */
    RISC_ADDR(udf_buf, (unsigned char *), gater_ptr->gt_dta);
    if (udf_buf == base)
    {
        udf_buf = NULL;
    } if (vccb_ptr->vc_icf.vc_fslri)
    {
        pnx_OPN__vc_open(vccb_ptr);
        pnx_SDR__send_clear_req(vccb_ptr, 0, 0, udf_buf);
        pnx_VHR__vc_hist_rprt(vccb_ptr);
        pnx_CLS__vc_close(vccb_ptr, VCC_NML);
        pnx_IDI__issue_dis_ind(vccb_ptr, vccb_ptr, gtdnrm);
        vccb_ptr->vc_wfdr = 1;
        return (0);
    }                              /* end if */

/* Setup expedited send and receive credit. */ if (vccb_ptr->vc_ednf &&
        vccb_ptr->vc_xrcvc == 0 &&
        gater_ptr->gt_cre == 1)
    {
        vccb_ptr->vc_diag = d_scr_xx;
        return (-1);
    }
    else
    {
        vccb_ptr->vc_xrcvc = gater_ptr->gt_cre;
        vccb_ptr->vc_xsndc = vccb_ptr->vc_xrcvc;
    }                              /* end if */

/* Process fields in variable part of gater. */
    for (i = 0; i < gater_ptr->gt_vln; i += gater_ptr->gt_var[i + 1] + 2)
    {
        switch (gater_ptr->gt_var[i])
        {
        case x25thr:                   /* Throughput class */
            if (!(snsap_ptr->sn_thrng))
            {
                vccb_ptr->vc_diag = d_dte_tc;
                return (-1);
            }                      /* end if */
            break;

case x25psz:                   /* Packet size */
            if (!(snsap_ptr->sn_flcng))
            {
                vccb_ptr->vc_diag = d_dte_fc;
                return (-1);
            }                      /* end if */
```

6

C11

```
            break;

case x25wsz:                    /* Window size            */
            if (!(snsap_ptr->sn_flcng))
            {
                vccb_ptr->vc_diag = d_dte_fc;
                return (-1);
            }                           /* end if */
            break;

}                               /* end switch */
    }                                   /* end loop */

/* Send Call Accepted packet. */ if (pnx_SCC__send_call_accpt(vccb_ptr,
                                 udf_buf) != 0)
    {
        vccb_ptr->vc_diag = d_scr_xx;
        return (-1);
    }                                   /* end if */
    vccb_ptr->vc_dsac = gtused;
#ifdef PNXDEBUG
    syslog(LOG_DEBUG, "exit pnx_UCP");
#endif
    return (0);
}                                       /* end pnx_UCP__process_con_resp */

/***************************
 * pnx_UDR__process_dis_req *
 ***************************/

/* This routine processes a disconnect request gater. */ int
pnx_UDR__process_dis_req(struct GATER * gater_ptr)

{                                       /* UDR__process_dis_req */ struct vccb        *vccb_ptr;
    struct snsap       *snsap_ptr;
    unsigned char      *udf_ptr;
    unsigned short     cause, diag;
    unsigned short     cflag, dflag;
    unsigned short     i;
    ulong              sce_id, dst_id;
#ifdef PNXDEBUG
    syslog(LOG_DEBUG, "pnx_UDR");
#endif
    GET4(sce_id, gater_ptr->gt_sce);
    GET4(dst_id, gater_ptr->gt_dst);

if ((vccb_ptr = pnx_GVI__get_vccb_by_id(dst_id)) == NULL &&
        (vccb_ptr = pnx_FVC__find_vccb(sce_id)) == NULL)
    {
        pnx_VCE__vc_error(NULL, st25_NVP);
        return (-1);
    } if ((snsap_ptr = vccb_ptr->vc_snsap) == NULL)
    {
        pnx_VCE__vc_error(NULL, st25_NSP);
        return (-1);
    } cause = 0;
    diag = 0;
    cflag = 0;
    dflag = 0;

if (vccb_ptr->vc_pvc)
    {
```

C12

```
        switch (vccb_ptr->vc_state)
        { case VC_D1:
        case VC_D2:
            pnx_SRS__send_reset_req(vccb_ptr, 0, d_dte_dx);
            vccb_ptr->vc_dip = 1;
            break;

case VC_D3:
            pnx_SRC__send_reset_conf(vccb_ptr);
            if (vccb_ptr->vc_wfcr)
            {
                vccb_ptr->vc_wfcr = 0;
                pnx_SRS__send_reset_req(vccb_ptr, 0, d_dte_dx);
                vccb_ptr->vc_dip = 1;
            }
            else
            if (vccb_ptr->vc_wfdr)
            {
                vccb_ptr->vc_wfdr = 0;
                vccb_ptr->vc_ucxid = NULL;
                vccb_ptr->vc_dsac = gtenbl;
            }
            else
            {
                pnx_SRS__send_reset_req(vccb_ptr, 0, d_dte_dx);
                vccb_ptr->vc_dip = 1;
            }
            break;

}                              /* endswitch */
        return (0);

}                                  /* endif */
/* Process fields in variable part of gater. */ for (i = 0; i < gater_ptr->gt_vln; i += gater_ptr->gt_var[i + 1] + 2)
    {
        switch (gater_ptr->gt_var[i])
        { case x25xcf:                   /* Clearing Cause */
            cause = gater_ptr->gt_var[i + 2];
            cflag = 1;
            break;

case x25xdf:                   /* Clearing Diagnostic */
            diag = gater_ptr->gt_var[i + 2];
            dflag = 1;
            break;

}                              /* endswitch */
    }                                  /* endloop */
    switch (vccb_ptr->vc_state)
    { case VC_D1:
    case VC_D2:
    case VC_D3:
        pnx_VHR__vc_hist_rprt(vccb_ptr);
        pnx_CLS__vc_close(vccb_ptr, VCC_NML);
        pnx_IDC__issue_dis_conf(vccb_ptr);
        break;

case VC_P1:
        vccb_ptr->vc_wfdr = 0;
        pnx_RVC__release_vccb(vccb_ptr);
        return (0);
        break;

case VC_P2:
        pnx_OPF__vc_open_fail(vccb_ptr, VCF_CAN);
        pnx_IDI__issue_dis_ind(vccb_ptr, NULL, gtdnrm);
```

C13

```
            if (cflag == 0 &&
                dflag == 0)
            {
                diag = d_scr_xx;
            }
            break;
        case VC_P3:
            vccb_ptr->vc_wfcr = 0;
            if (vccb_ptr->vc_icf.vc_fslri)
            {
                pnx_OPN__vc_open(vccb_ptr);
                pnx_VHR__vc_hist_rprt(vccb_ptr);
                pnx_CLS__vc_close(vccb_ptr, VCC_NML);
            }
            else
            {
                pnx_OPF__vc_open_fail(vccb_ptr, VCF_ICR);
                if (cflag == 0 &&
                    dflag == 0)
                {
                    diag = d_scr_xx;
                }
            }
            break;
        case VC_P5:
            if (snsap_ptr->sn_dce)
            {
                vccb_ptr->vc_wfcr = 0;
                if (vccb_ptr->vc_icf.vc_fslri)
                {
                    pnx_OPN__vc_open(vccb_ptr);
                    pnx_VHR__vc_hist_rprt(vccb_ptr);
                    pnx_CLS__vc_close(vccb_ptr, VCC_NML);
                }
                else
                {
                    pnx_OPF__vc_open_fail(vccb_ptr, VCF_ICR);
                    if (cflag == 0 &&
                        dflag == 0)
                    {
                        diag = d_scr_xx;
                    }
                }
            }
            else
            {
                pnx_OPF__vc_open_fail(vccb_ptr, VCF_CAN);
                pnx_IDC__issue_dis_conf(vccb_ptr);
            }
            break;
        case VC_P6:
        case VC_P7:
            vccb_ptr->vc_wfdr = 0;
            pnx_SDC__send_clear_conf(vccb_ptr);
            pnx_RVC__release_vccb(vccb_ptr);
            return (0);
            break;
    }                               /* endswitch */
    RISC_ADDR(udf_ptr, (unsigned char *), gater_ptr->gt_dta);
    if (udf_ptr == base)
    {
        udf_ptr = NULL;
    } pnx_SDR__send_clear_req(vccb_ptr, cause, diag, udf_ptr);
ifdef PNXDEBUG
    syslog(LOG_DEBUG, "exit pnx_UDR");
#endif
    return (0);

}                                   /* UDR__process_dis_req */
```

C14

```
/****************************
 * pnx_UDT__process_data_req *
 ****************************/

/* This routine processes a data request gater.
 *
 * Receive credit passed in the users gater will be used to update the VCCB. If
 * data is awaiting receive credit, the VCCB's X.25 counter will be added to
 * the X.25 API counter array. */
int
pnx_UDT__process_data_req(struct vccb * vccb_ptr, struct GATER * gater_ptr)
{
    unsigned int    i;
    struct PHD      *phb_ptr;
#ifdef PNXDEBUG
    syslog(LOG_DEBUG, "pnx_UDT, VC=%lX", vccb_ptr);
#endif
    RISC_ADDR(phb_ptr, (struct PHD *), gater_ptr->gt_dta);
    if (phb_ptr == (struct PHD *) base)
    {
        phb_ptr = NULL;
    }

/* Process user receive credit passed in gater. */ vccb_ptr->vc_urcvc += gater_ptr->gt_crn;
    vccb_ptr->vc_xrcvc += gater_ptr->gt_cre;
    if (vccb_ptr->vc_urcvc)
    {
        add_to_array(vccb_ptr);
    }

/* Process fields in variable part of gater. */ for (i = 0; i < gater_ptr->gt_vln; i += gater_ptr->gt_var[i + 1] + 2)
    { switch (gater_ptr->gt_var[i])
        { case x25qbt:                    /* X.29 qualifier bit     */
            phb_ptr->ph_xst |= ph_xql;
            break;

}                               /* end switch */
    }                                   /* end loop */
#ifdef PNXDEBUG
    syslog(LOG_DEBUG, "exit pnx_UDT");
#endif
}                                       /* end - pnx_UDT__process_data_req */

/*****************************
 * pnx_URS__process_reset_req *
 *****************************/

/* This routine processes a reset request gater.
 *
 * The user receive credit will be reset to the value passed in the gater. */
int
pnx_URS__process_reset_req(struct vccb * vccb_ptr, struct GATER * gater)
{
    unsigned int    cause, diag;
    unsigned int    i;
#ifdef PNXDEBUG
    syslog(LOG_DEBUG, "pnx_URS, VC=%lX", vccb_ptr);
#endif
    vccb_ptr->vc_rip = 1;           /* Reset in progress */
    cause = 0;
    diag = d_dte_rx;

/* Reset user received credit. */
```

C15

```
    vccb_ptr->vc_urcvc = gater->gt_crn;
    vccb_ptr->vc_xrcvc = gater->gt_cre;
    vccb_ptr->vc_xsndc = vccb_ptr->vc_xrcvc;

/* Process fields in variable part of gater. */ for (i = 0; i < gater->gt_vln; i += gater->gt_var[i + 1] + 2)
    { switch (gater->gt_var[i])
        { case x25xcf:                    /* Resetting Cause */
            cause = gater->gt_var[i + 2];
            break;

case x25xdf:                    /* Resetting Diagnostic */
            diag = gater->gt_var[i + 2];
            break;

}                               /* end switch */

}                                   /* end loop */

/* Send reset request packet. */
#ifdef PNXDEBUG
    syslog(LOG_DEBUG, "exit pnx_URS");
#endif
    return (pnx_SRS__send_reset_req(vccb_ptr, cause, diag));

}                                       /* pnx_URS__process_reset_req */

/************************
 * pnx_PVC__pvc_con_req *
 ************************/

/* Process PVC Connect Request
 *
 * This routine processes a connect request gater which specifies connection to
 * a permanent virtual circuit.
 *
 * The parameters passed in the connect request gater are used to locate the
 * virtual circuit control block (VCCB) for the PVC and build a reset
 * request packet.
 *
 * The user gate id, user connection id, and user receive credit are passed in
 * the fixed part of the gater and are used to update the VCCB.
 *
 * The logical channel number assigned to the virtual circuit is passed in the
 * variable part of the gater. */ int
pnx_PVC__pvc_con_req(struct snsap * snsap_ptr,
                     struct GATER * gater_ptr,
                     unsigned int lcgn,
                     unsigned int lcn,
                     ushort nad_index)
{ struct vccb    *vccb_ptr;
ifdef PNXDEBUG
    syslog(LOG_DEBUG, "pnx_PVC - NAD index is %d", nad_index);
#endif
    /* Locate VCCB for permanent virtual circuit. */ if ((vccb_ptr = pnx_GVL__get_vccb_by_lcn(lcgn, lcn)) == NULL)
    {
        pnx_NSE__ns_error(snsap_ptr, NSE_NVC);
        return (-1);
    }                                   /* end if */ if (vccb_ptr->vc_pvc == 0)          /* if it's not a PVC */
    {
        pnx_NSE__ns_error(snsap_ptr, NSE_NVC);

return (-1);
```

C16

```
    }                              /* end if */
    if (vccb_ptr->vc_ucxid != NULL)
    {
        pnx_NSE__ns_error(snsap_ptr, NSE_VCB);   /* PVC currently in use */
        return (-1);
    }                              /* end if */ vccb_ptr->vc_olv = gater_ptr->gt_slr;
    vccb_ptr->vc_oin = gater_ptr->gt_sin;
    GET4(vccb_ptr->vc_ucxid, gater_ptr->gt_sce);
    vccb_ptr->vc_urcvc = gater_ptr->gt_crn;
    vccb_ptr->vc_xrcvc = gater_ptr->gt_cre;
    vccb_ptr->vc_xsndc = vccb_ptr->vc_xrcvc;
    vccb_ptr->vc_ndxid = nad_index;

vccb_ptr->vc_in_ac = *(short *) "IN";
    vccb_ptr->vc_init = 1;

if (pnx_SRS__send_reset_req(vccb_ptr, 0, d_dte_cx) != 0)
    {
        return (-1);
    }                              /* end if */
    vccb_ptr->vc_cip = 1;          /* connect in progress */
#ifdef PNXDEBUG
    syslog(LOG_DEBUG, "exit pnx_PVC");
endif return (0);

}                                  /* pnx_PVC__pvc_con_req */

/***************************
 * pnx_ACM__admin_command *
 ***************************/

/* This routine processes an admin request gater.
 *
 * This routine extracts the object class from the admin request gater and
 * executes the command handler for the requested object class. */ int
pnx_ACM__admin_command(struct GATER * gater_ptr)

{                                  /* ACM__admin_command */ unsigned short   i;
    unsigned short   objcls;
#ifdef PNXDEBUG
    syslog(LOG_DEBUG, "pnx_ACM");
#endif
    /* Scan admin request gater for object class. Dispatch to command handler
     * for requested object class. */ for (i = 0; i < gater_ptr->gt_vln; i += gater_ptr->gt_var[i + 1] + 2)
    { switch (gater_ptr->gt_var[i])
        { case gtobjc:
            objcls = (gater_ptr->gt_var[i + 2] << 8) +
                gater_ptr->gt_var[i + 3];
            if (objcls == gtclns)
            {
                pnx_HNS__ns_admin_cmd(gater_ptr);
                return (0);
            }
            else
            if (objcls == gtclvc)
            {
                pnx_HVC__vc_admin_cmd(gater_ptr);
                return (0);
            }
            break;
```

C17

```
       }                           /* end switch */
    }                              /* end loop */
#ifdef PNXDEBUG
    syslog(LOG_DEBUG, "exit pnx_ACM");
#endif
    return (0);

}                                  /* ACM__admin_command */
```

C18

```
/*
 *  Name:       pnx_gtout.c
 *  Purpose:    PNetX to PNet interface - GATERs sent to PNet
 *  Functions in this module:
 *      (see pnx_func.h for prototype declarations)
 *
 *  int         pnx_ICI__issue_con_ind()
 *  int         pnx_ICC__issue_con_conf()
 *  int         pnx_IDT__issue_data_ind()
 *  int         pnx_IED__issue_exp_ind()
 *  int         pnx_IRC__issue_reset_conf()
 *  int         pnx_IRL__issue_rel_sdu()
 *  int         pnx_IRS__issue_reset_ind()
 *  int         pnx_RRS__issue_reset_ind()
 *  int         pnx_IDI__issue_dis_ind()
 *  int         pnx_IDX__issue_dis_ind()
 *  int         pnx_RDI__issue_dis_ind()
 *  int         pnx_IDC__issue_dis_conf()
 *  int         pnx_IOK__issue_ok_to_send()
 *  int         pnx_ISI__issue_sap_info()
 */ include "sys_head.h"
include "emu_head.h"
#include "macro.h"
#include "mqi_head.h"
#include "z3rct.h"
#include "z_rb.h"
#include "z3irb.h"

include <x25sdefs.h>
include "pnx_head.h"
include "pnx_vccb.h"
#include "hvx_phd.h"
#include "pnx_snsap.h"
#include "hvx_gater.h"
#include "x25fac.h"

extern char      *base;

extern struct pnx_global *PnetXGlobal;

/***************************
 * pnx_ICI__issue_con_ind *
 ***************************/

/* Issue Connect Indication
 *
 * This routine builds a connect indication gater and posts a PNet VC Request
 * IORB */ int
pnx_ICI__issue_con_ind(struct vccb * vccb_ptr)
{ struct IRB      *irb;
    struct RB       *iorb;
    register unsigned char *var_ptr;
    unsigned char   *aptr;
    char            bcd_cug_id[3];
    struct snsap    *snsap_ptr;
    struct cb_call_struct *cb_call_ptr;
    unsigned int    fac_size, fac_len, s_len, cug_size;
    struct cb_fac_struct *cb_fac_ptr;
    struct GATER    *gater;
    struct snsap    *rsap_ptr;
    char            *fac_ext_ptr;
    unsigned int    cdna_len, cgna_len;
#ifdef PNXDEBUG
    syslog(LOG_DEBUG, "I055: pnx_ICI, VC=%lX", vccb_ptr);
#endif
    /* Setup fields in fixed part of gater.                              */ if (pnx_get_next_vc_receive(&irb, &iorb) != 0)
```

1

C19

```
{
    return (-1);
}
RISC_ADDR(gater, (struct GATER *), iorb->rb_adr);

snsap_ptr = vccb_ptr->vc_snsap;
vccb_ptr->vc_wfcr = 1;        /* waiting for con resp gater */
vccb_ptr->vc_xsndc = 1;       /* credit fields              */
vccb_ptr->vc_xrcvc = 1;
vccb_ptr->vc_usndc = 0;
vccb_ptr->vc_ublks = 0;

gater->gt_pri = 0;
PUT4(gater->gt_nxt, ((ulong) 0));
*(ulong *) gater->gt_mkr = *(ulong *) "GT01";
gater->gt_slr = snsap_ptr->sn_mylv;   /* layer / instance */
gater->gt_sin = snsap_ptr->sn_myin;
gater->gt_dlr = snsap_ptr->sn_olv;
gater->gt_din = snsap_ptr->sn_oin;
gater->gt_fnc = gtfcin;
PUT4(gater->gt_sce, vccb_ptr->vc_gtid);   /* request source identifier */
PUT4(gater->gt_dst, ((ulong) 0));
if (!vccb_ptr->vc_udf)
{
    vccb_ptr->vc_udf = base;
}
DPS6_ADDR(gater->gt_dta, vccb_ptr->vc_udf);

gater->gt_dis = 0;
gater->gt_crn = pnx_GCR__get_credit(vccb_ptr);
gater->gt_cre = vccb_ptr->vc_xsndc;
gater->gt_flg = 0;

gater->gt_vln = 0;

vccb_ptr->vc_udf = NULL;
var_ptr = gater->gt_var;      /* variable field of gater */

/* Build ideal SDU size parameter. */

*var_ptr++ = gpipdu;
*var_ptr++ = 2;
aptr = (unsigned char *) &vccb_ptr->vc_pdux;
*var_ptr++ = *aptr++;
*var_ptr++ = *aptr++;
gater->gt_vln += 4;

/* Build connection mode parameter. */

*var_ptr++ = gpconn;
*var_ptr++ = 0;
gater->gt_vln += 2;

/* Build called (local) sap parameter. */

*var_ptr++ = gpccda;
s_len = snsap_ptr->sn_name[0];
*var_ptr++ = s_len;
memcpy(var_ptr, &snsap_ptr->sn_name[1], s_len);
var_ptr += s_len;
gater->gt_vln += s_len + 2;

/* Build lcn parameter for permanent virtual circuit. */ if (vccb_ptr->vc_pvc)
{
    *var_ptr++ = x25lcn;
    *var_ptr++ = 2;
    *var_ptr++ = vccb_ptr->vc_lcgn;
    *var_ptr++ = vccb_ptr->vc_lcn;
    gater->gt_vln += 4;
    return (pnx_post_request(irb));
}                                /* end if */

/* Build calling (remote) sap parameter. */ rsap_ptr = vccb_ptr->vc_rssap;
```

C20

```
    if (rsap_ptr != NULL)
    {
        *var_ptr++ = gpccla;
        s_len = rsap_ptr->sn_name[0];
        *var_ptr++ = s_len;
        memcpy(var_ptr, &rsap_ptr->sn_name[1], s_len);
        var_ptr += s_len;
        gater->gt_vln += s_len + 2;
    }                                   /* end if */

/* Build called and calling X.121 addresses. */ cdna_len = vccb_ptr->vc_cdna[0];
    if (cdna_len != 0)
    {
        *var_ptr++ = x25cda;        /* called address           */
        s_len = ((cdna_len + 1) / 2) + 1;
        *var_ptr++ = s_len;
        *var_ptr++ = cdna_len;
        pnx_MNA__move_net_addr(&vccb_ptr->vc_cdna[1], 0, var_ptr, 0,
                               cdna_len);
        var_ptr += (cdna_len + 1) / 2;
        gater->gt_vln += s_len + 2;
    }                                   /* end if */ cgna_len = vccb_ptr->vc_cgna[0];    /* calling address          */
    if (cgna_len != 0)
    {
        *var_ptr++ = x25cga;
        s_len = ((cgna_len + 1) / 2) + 1;
        *var_ptr++ = s_len;
        *var_ptr++ = cgna_len;
        pnx_MNA__move_net_addr(&vccb_ptr->vc_cgna[1], 0, var_ptr, 0,
                               cgna_len);
        var_ptr += (cgna_len + 1) / 2;
        gater->gt_vln += s_len + 2;
    }                                   /* end if */

/* Locate facilities section of incoming call packet. */
    cb_call_ptr = vccb_ptr->cb_msg.msg_point.cb_call;  /* get cb_msg from vccb */ if (!(cb_call_ptr->flags & X25FLG_CB_FAC))
    {
        return (pnx_post_request(irb));
    } cb_fac_ptr = cb_call_ptr->cb_fac;

/* Build variable parameters from selected facilities. */ if (cb_fac_ptr->flags & X25FLG_FACEXT)
    {
        fac_len = cb_fac_ptr->fac_ext_len;
        fac_ext_ptr = cb_fac_ptr->fac_ext;
        while (fac_len > 0)
        {
            switch (*fac_ext_ptr++)
            {
            case MKR_CLNG:          /* calling PDN facilities */
                if (fac_size = pnx_FBS__fac_block_size(fac_ext_ptr, fac_len) != 0)
                {
                    *var_ptr++ = x25cgf;        /* calling PDN facilities */
                    *var_ptr++ = fac_size;
                    memcpy(var_ptr, fac_ext_ptr, fac_size);
                    fac_ext_ptr += fac_size;
                    var_ptr += fac_size;
                    gater->gt_vln += fac_size + 2;
                }
                break;

case MKR_CLLD:
                if (fac_size = pnx_FBS__fac_block_size(fac_ext_ptr, fac_len) != 0)
                {
                    *var_ptr++ = x25cdf;        /* called PDN facilities */
                    *var_ptr++ = fac_size;
```

C21

```
                    memcpy(var_ptr, fac_ext_ptr, fac_size);
                    fac_ext_ptr += fac_size;
                    var_ptr += fac_size;
                    gater->gt_vln += fac_size + 2;
                }
                break;
            }
            fac_len -= 1;
        }
    } if (cb_fac_ptr->flags & X25FLG_FASTSEL
        ||
        cb_fac_ptr->flags & X25FLG_FASTSEL_RSP)
    { if ((cb_fac_ptr->flags & X25FLG_FASTSEL_RSP))   /* fast select
                                                         * restricted resp */
        {
            *var_ptr++ = x25fsr;   /* fast select restricted   */
            *var_ptr++ = 0;
            gater->gt_vln += 2;
        }
        else
        {
            *var_ptr++ = x25fsu;   /* fast select unrestricted */
            *var_ptr++ = 0;
            gater->gt_vln += 2;
        } if (cb_fac_ptr->flags & X25FLG_REV_CHRG)       /* reverse charging */
        {
            *var_ptr++ = x25rcr;   /* reverse charging req    */
            *var_ptr++ = 0;
            gater->gt_vln += 2;
        }                            /* end if */
    } if (cb_fac_ptr->flags & X25FLG_TCLS)
    {
        *var_ptr++ = x25thr;
        *var_ptr++ = 2;
        *var_ptr++ = cb_fac_ptr->tcls_cld;    /* xmit */
        *var_ptr++ = cb_fac_ptr->tcls_clg;    /* recv */
        gater->gt_vln += 4;
    } if (cb_fac_ptr->flags & X25FLG_CUG) /* cug selection   */
    {
        *var_ptr++ = x25cug;
        pnx_short_to_bcd(bcd_cug_id, cb_fac_ptr->cug_id, &cug_size);
        if (cug_size == 1)           /* basic    */
        {
            *var_ptr++ = 1;
            *var_ptr++ = bcd_cug_id[0];
            gater->gt_vln += 3;
        }
        else                         /* extended   */
        {
            *var_ptr++ = 2;
            *var_ptr++ = bcd_cug_id[0];
            *var_ptr++ = bcd_cug_id[1];
            gater->gt_vln += 4;
        }
    } if (cb_fac_ptr->flags & X25FLG_OA_CUG)      /* cug w out access (basic)   */
    {
        *var_ptr++ = x25cuo;
        pnx_short_to_bcd(bcd_cug_id, cb_fac_ptr->cug_id, &cug_size);
        if (cug_size == 1)           /* basic    */
        {
            *var_ptr++ = 1;
            *var_ptr++ = bcd_cug_id[0];
            gater->gt_vln += 3;
```

C22

```
        }
        else                              /* extended */
        {
            *var_ptr++ = 2;
            *var_ptr++ = bcd_cug_id[0];
            *var_ptr++ = bcd_cug_id[1];
            gater->gt_vln += 4;
        }
    }
    if (cb_fac_ptr->flags & X25FLG_BI_CUG)     /* bilateral cug selection */
    {
        *var_ptr++ = x25bcg;
        *var_ptr++ = 2;
        pnx_short_to_bcd(bcd_cug_id, cb_fac_ptr->cug_id, &cug_size);
        *var_ptr++ = bcd_cug_id[0];
        *var_ptr++ = bcd_cug_id[1];
        gater->gt_vln += 4;
    } if (cb_fac_ptr->flags & X25FLG_PSIZ)
    {
        *var_ptr++ = x25psz;
        *var_ptr++ = 2;
        *var_ptr++ = cb_fac_ptr->psiz_cld;     /* xmit */
        *var_ptr++ = cb_fac_ptr->psiz_clg;     /* recv */
        gater->gt_vln += 4;
    }
    if (cb_fac_ptr->flags & X25FLG_WSIZ)
    {
        *var_ptr++ = x25wsz;
        *var_ptr++ = 2;
        *var_ptr++ = cb_fac_ptr->wsiz_cld;     /* xmit */
        *var_ptr++ = cb_fac_ptr->wsiz_clg;     /* recv */
        gater->gt_vln += 4;
    } if (cb_fac_ptr->flags & X25FLG_TRAN_DEL)   /* transit delay */
    {
        *var_ptr++ = x25dly;
        *var_ptr++ = 2;
        *var_ptr++ = cb_fac_ptr->tran_del >> 8;
        *var_ptr++ = cb_fac_ptr->tran_del;
        gater->gt_vln += 4;
    } if (cb_fac_ptr->flags & X25FLG_EXP_DATA)   /* exped data negotiation  */
    {
        vccb_ptr->vc_ednf = 1;
        vccb_ptr->vc_xsndc = 1;
        vccb_ptr->vc_xrcvc = vccb_ptr->vc_xsndc;
        gater->gt_cre = vccb_ptr->vc_xsndc;
    } if (cb_fac_ptr->flags & X25FLG_CALLING_ADDR_EXT)   /* calling addr
                                                        * extension    */
    {
        *var_ptr++ = x25cgn;
        pnx_str_to_bin(var_ptr, cb_fac_ptr->calling_addr_ext, INCLD_SIZE);
        fac_size = var_ptr;
        var_ptr += fac_size + 1;
        gater->gt_vln += fac_size + 2;
    } if (cb_fac_ptr->flags & X25FLG_CALLED_ADDR_EXT)    /* called address
                                                        * extension */
    {
        *var_ptr++ = x25cdn;
        pnx_str_to_bin(var_ptr, cb_fac_ptr->called_addr_ext, INCLD_SIZE);
        fac_size = var_ptr;
        var_ptr += fac_size + 1;
        gater->gt_vln += fac_size + 2;
    }
ifdef PNXDEBUG
    syslog(LOG_DEBUG, "I056: exit pnx_ICI");
```

C23

```
#endif
    return (pnx_post_request(irb));
}                                       /* end pnx_ICI__issue_con_ind */

/***************************
 * pnx_ICC__issue_con_conf *
 ***************************/

/* Issue Connect Confirm
 *
 * This routine builds a connect confirm gater and issues a gate request to the
 * connection layer (posts the VC RECEIVE). */
int
pnx_ICC__issue_con_conf(struct vccb * vccb_ptr)
{ unsigned int    cdna_len, cgna_len;
    unsigned int    pkt_len, fac_len;
    unsigned int    fac_size, fac_code;
    unsigned int    marker;
    unsigned char   temp_var;
    register unsigned char *var_ptr;
    register unsigned char *pkt_ptr;
    unsigned char   *aptr;
    struct snsap    *snsap_ptr;
    struct GATER    *gater;
    struct IRB      *irb;
    struct RB       *iorb;
    char            *fac_ext_ptr;
    struct cb_fac_struct *cb_fac_ptr;
#ifdef PNXDEBUG
    syslog(LOG_DEBUG, "I057: pnx_ICC, VC=%lX", vccb_ptr);
#endif
    /* Setup fields in fixed part of gater. */ snsap_ptr = vccb_ptr->vc_snsap;
    vccb_ptr->vc_usndc = 0;
    vccb_ptr->vc_ublks = 0;

if (pnx_get_next_vc_receive(&irb, &iorb) != 0)
    {
        return (-1);
    }
    RISC_ADDR(gater, (struct GATER *), iorb->rb_adr);
    gater->gt_pri = 0;
    PUT4(gater->gt_nxt, 0);
    *(long *) gater->gt_mkr = *(long *) "GT01";
    gater->gt_slr = snsap_ptr->sn_mylv;
    gater->gt_sin = snsap_ptr->sn_myin;
    gater->gt_dlr = snsap_ptr->sn_olv;
    gater->gt_din = snsap_ptr->sn_oin;
    gater->gt_fnc = gtfccf;
    PUT4(gater->gt_sce, vccb_ptr->vc_gtid);
    PUT4(gater->gt_dst, vccb_ptr->vc_ucxid);
    if (!vccb_ptr->vc_udf)
    {
        vccb_ptr->vc_udf = base;
    }
    DPS6_ADDR(gater->gt_dta, vccb_ptr->vc_udf);
    gater->gt_dis = 0;
    gater->gt_crn = pnx_GCR__get_credit(vccb_ptr);

gater->gt_cre = vccb_ptr->vc_xsndc;
    gater->gt_flg = 0;

gater->gt_vln = 0;

vccb_ptr->vc_udf = NULL;
    var_ptr = gater->gt_var;

/* Build ideal sdu size parameter. */
```

C24

```
    *var_ptr++ = gpipdu;
    *var_ptr++ = 2;
    aptr = (unsigned char *) &vccb_ptr->vc_pdux;
    *var_ptr++ = *aptr++;
    *var_ptr++ = *aptr++;
    gater->gt_vln += 4;

/* Build connection mode parameter. */

*var_ptr++ = gpconn;
    *var_ptr++ = 0;
    gater->gt_vln += 2;

if (vccb_ptr->vc_pvc)
    {
        return (pnx_post_request(irb));
    }                               /* end if */ if (!(vccb_ptr->cb_msg.msg_point.cb_call->flags & X25FLG_CB_FAC))
    {
        vccb_ptr->active_vc = 1;
        return (pnx_post_request(irb));
    }                               /* end if */

/* Locate facilities section of call connected packet. */ cb_fac_ptr = vccb_ptr->cb_msg.msg_point.cb_call->cb_fac;

if (cb_fac_ptr->flags & X25FLG_FACEXT)
    {
        fac_len = cb_fac_ptr->fac_ext_len;
        fac_ext_ptr = cb_fac_ptr->fac_ext;

while (fac_len > 0)
        {
            switch (*fac_ext_ptr++)
            {
            case MKR_CLNG:          /* calling PDN facilities */
                fac_len -= 1;
                if ((fac_size = pnx_FBS__fac_block_size(fac_ext_ptr, fac_len))
                    != 0)
                {
                    *var_ptr++ = x25cgf;        /* calling PDN facilities */
                    *var_ptr++ = fac_size;
                    memcpy(var_ptr, fac_ext_ptr, fac_size);
                    fac_ext_ptr += fac_size;
                    var_ptr += fac_size;
                    gater->gt_vln += fac_size + 2;
                }                   /* end if */
                break;

case MKR_CLLD:          /* called PDN facilities */
                fac_len -= 1;
                if ((fac_size = pnx_FBS__fac_block_size(fac_ext_ptr, fac_len))
                    != 0)
                {
                    *var_ptr++ = x25cdf;        /* called PDN facilities */
                    *var_ptr++ = fac_size;
                    memcpy(var_ptr, fac_ext_ptr, fac_size);
                    fac_ext_ptr += fac_size;
                    var_ptr += fac_size;
                    gater->gt_vln += fac_size + 2;
                }                   /* end if */
                break;
            }
            fac_len--;
        }
    } if (cb_fac_ptr->flags & X25FLG_TCLS)        /* throughput class     */
    {
        *var_ptr++ = x25thr;
        *var_ptr++ = 2;
        *var_ptr++ = cb_fac_ptr->tcls_cld;      /* xmit */
        *var_ptr++ = cb_fac_ptr->tcls_clg;      /* recv */
        gater->gt_vln += 4;
```

7

C25

```
    } if (cb_fac_ptr->flags & X25FLG_PSIZ)        /* packet size */
    {
        *var_ptr++ = x25psz;
        *var_ptr++ = 2;
        *var_ptr++ = cb_fac_ptr->psiz_cld;      /* xmit */
        *var_ptr++ = cb_fac_ptr->psiz_clg;      /* recv */
        gater->gt_vln += 4;
    } if (cb_fac_ptr->flags & X25FLG_WSIZ)        /* window size      */
    {
        *var_ptr++ = x25wsz;
        *var_ptr++ = 2;
        *var_ptr++ = cb_fac_ptr->wsiz_cld;      /* xmit */
        *var_ptr++ = cb_fac_ptr->wsiz_clg;      /* recv */
        gater->gt_vln += 4;
    } if (cb_fac_ptr->flags & X25FLG_TRAN_DEL)    /* transit delay */
    {
        *var_ptr++ = x25dly;
        *var_ptr++ = 2;
        *var_ptr++ = cb_fac_ptr->tran_del >> 8;
        *var_ptr++ = cb_fac_ptr;
        gater->gt_vln += 4;
    } if (cb_fac_ptr->flags & X25FLG_EXP_DATA)    /* exped data negotiation */
    {
        vccb_ptr->vc_xsndc = 1;
        vccb_ptr->vc_xrcvc = 1;
        gater->gt_cre = 1;
    } if (cb_fac_ptr->flags & X25FLG_CALLED_ADDR_EXT)   /* called address
                                                       * extension */
    {
        /*********************************************************/
        /* may need to do str_to_bin on called address extension */
        /* If so, size will be different in GATER                */
        /*********************************************************/
        *var_ptr++ = x25cdn;
        fac_size = strlen(cb_fac_ptr->called_addr_ext);
        *var_ptr++ = fac_size;
        memcpy(var_ptr, cb_fac_ptr->called_addr_ext, fac_size);
        var_ptr += fac_size;
        gater->gt_vln += fac_size + 2;
    }

/* Issue gate request via PNet. */
#ifdef PNXDEBUG
    syslog(LOG_DEBUG, "I058: exit pnx_ICC");
#endif
    vccb_ptr->active_vc = 1;
    return (pnx_post_request(irb));

}                              /* pnx_ICC__issue_con_conf */

/***************************
 * pnx_IDT__issue_data_ind *
 ***************************/

/* this function builds a data indication gater and issues a gate request to
 * PNet (posts the VC RECEIVE).
 *
 * When setting up ph_rgl, ph_lr1 is always zero for our data. The only value
 * we will set up is ph_ct1.  ph_rgl may simply be assigned to the PHB data
 * length. */ int
pnx_IDT__issue_data_ind(struct vccb * vccb_ptr)
```

8

C26

```
{
    struct snsap      *snsap_ptr;
    struct IRB        *irb;          /* IRB for VC RECEIVE */
    struct RB         *iorb;         /* VC RECEIVE IORB */
    struct GATER      *gater;        /* gater from VC RECEIVE buffer */
    struct PHD        *phb;          /* PHB from our pool */
    struct PHD        *prev_phb;     /* for linking */
    struct PHD        *first_phb;    /* in case we need to rechain */
    int                phbs_gotten;
    char              *var_ptr;      /* GATER variable part */
    struct cb_data_struct *cb_data;/* x25_receive data */
    int                octets_left; /* # of octets left to move from cb_data */
    int                octets_to_move;  /* # octets to copy int PHB */
    int                phbs_needed; /* # of PHBs required for this DataInd */
    unsigned char     *to, *from;    /* for copying data */
#ifdef PNXDEBUG
    syslog(LOG_DEBUG, "I059: pnx_IDT, VC=%lX", vccb_ptr);
#endif
    snsap_ptr = vccb_ptr->vc_snsap;
    if (pnx_get_next_vc_receive(&irb, &iorb) != 0)
    {
        return (-1);
    }
    RISC_ADDR(gater, (struct GATER *), iorb->rb_adr);

/* Setup fields in fixed part of gater. */ gater->gt_pri = 0;
    PUT4(gater->gt_nxt, 0);
    *(long *) gater->gt_mkr = *(long *) "GT01";
    gater->gt_slr = snsap_ptr->sn_mylv;
    gater->gt_sin = snsap_ptr->sn_myin;
    gater->gt_dlr = vccb_ptr->vc_olv;
    gater->gt_din = vccb_ptr->vc_oin;
    gater->gt_fnc = gtfdti;
    PUT4(gater->gt_sce, vccb_ptr->vc_gtid);
    PUT4(gater->gt_dst, vccb_ptr->vc_ucxid);
    gater->gt_dis = 0;
    gater->gt_crn = 0;
    gater->gt_cre = 0;
    gater->gt_flg = 0;

var_ptr = &gater->gt_var[0];

/* Issue data indication - use multiple PHBs if necessary */
    cb_data = vccb_ptr->cb_msg.msg_point.cb_data;
    from = cb_data->data;
    octets_left = cb_data->data_len;
    prev_phb = NULL;
    first_phb = NULL;
    phbs_gotten = 0;
    while (octets_left)
    {
        /* get a PHB & link it to previous PHB */
        if ((phb = pnx_get_next_phb()) == NULL)
        {
            /* if we have a partial chain, we've got to give it all back to
             * our available phb chain */
            if (first_phb)
            {
                pnx_replenish_phbs(first_phb);
            }
ifdef PNXDEBUG
            syslog(LOG_DEBUG, "PNETX - not enough PHBs, returning %d",
                    phbs_gotten);
#endif
            return (-1);
        } phbs_gotten++;
        /* remember start of chain in case we get in trouble */
        if (!first_phb)
        {
            first_phb = phb;
        }
```

C27

```
        if (prev_phb)
        {
            DPS6_ADDR(prev_phb->ph_lnk, phb);
        }
        else
        {
            DPS6_ADDR(gater->gt_dta, (ulong) phb);
        }
        prev_phb = phb;

/* copy as much data as we can */
        to = (unsigned char *) phb->ph_tuh;
        octets_to_move = (octets_left <= PnetXGlobal->pkt_len) ?
            octets_left :
            PnetXGlobal->pkt_len;
        memcpy(to, from, octets_to_move);
        DPS6_ADDR(phb->ph_ad1, &phb->ph_tuh);
        phb->ph_rg1 = octets_to_move;

octets_left -= octets_to_move;
        from = from + octets_to_move;
    }                               /* end - while (octets_left) */

/* Setup qualified data (Q-bit) parameter. */ if (cb_data->flags & X25FLG_Q_BIT)
    {
        *var_ptr++ = x25qbt;
        *var_ptr++ = 0;
        gater->gt_vln += 2;
    }                               /* end if */

/* Decrement user receive credit (normal).  If credit goes to zero, get
     * the VCCB out of the counter array */
    if (vccb_ptr->vc_urcvc-- <= 0)
    {
#ifdef PNXDEBUG
        syslog(LOG_DEBUG, "I060: pnx: credit=zero on %lX", vccb_ptr->vc_gtid);
#endif
        remove_from_array(vccb_ptr);
    } pnx_post_request(irb);
ifdef PNXDEBUG
    syslog(LOG_DEBUG, "I061: exit pnx_IDT");
#endif
}                                   /* end - pnx_IDT__issue_data_ind */

/*************************
 * pnx_IED__issue_exp_ind *
 *************************/

/* This routine builds an expedited data indication gater and issues a gate
 * request to the user layer (posts the PNet VC RECEIVE IORB).
 *
 * When setting up ph_rg1, ph_lr1 is always zero for our data.  The only value
 * we will set up is ph_ct1.  ph_rg1 may simply be assigned to the received
 * data length. */ int
pnx_IED__issue_exp_ind(struct vccb * vccb_ptr)
{
    struct snsap     *snsap_ptr;
    struct IRB       *irb;          /* IRB for VC RECEIVE */
    struct RB        *iorb;         /* VC RECEIVE IORB */
    struct GATER     *gater;        /* gater from VC RECEIVE buffer */
    struct PHD       *phb;          /* PHB from our pool */
    char             *var_ptr;      /* GATER variable part */
    struct cb_int_struct *cb_int;   /* x25_receive data */
#ifdef PNXDEBUG
    syslog(LOG_DEBUG, "I062: pnx_IED, VC=%lX", vccb_ptr);
#endif
    snsap_ptr = vccb_ptr->vc_snsap;
    cb_int = vccb_ptr->cb_msg.msg_point.cb_int;
```

C28

```c
    if (pnx_get_next_vc_receive(&irb, &iorb) != 0)
    {
        return (-1);
    }
    RISC_ADDR(gater, (struct GATER *), iorb->rb_adr);

gater->gt_pri = 0;
    PUT4(gater->gt_nxt, 0);
    *(long *) gater->gt_mkr = *(long *) "GT01";
    gater->gt_slr = snsap_ptr->sn_mylv;
    gater->gt_sin = snsap_ptr->sn_myin;
    gater->gt_dlr = vccb_ptr->vc_olv;
    gater->gt_din = vccb_ptr->vc_oin;
    gater->gt_fnc = gtfexi;
    PUT4(gater->gt_sce, vccb_ptr->vc_gtid);
    PUT4(gater->gt_dst, vccb_ptr->vc_ucxid);
    gater->gt_dis = 0;
    gater->gt_crn = 0;
    gater->gt_cre = 0;
    gater->gt_flg = 0;

gater->gt_vln = 0;

/* Decrement user receive credit (expedited). */
    vccb_ptr->vc_xrcvc -= 1;

if ((phb = pnx_get_next_phb()) == NULL)
    {
        return (-1);
    }

/* copy data from X.25 API */
    memcpy(&phb->ph_tuh, cb_int->int_data, cb_int->int_data_len);
    DPS6_ADDR(phb->ph_ad1, &phb->ph_tuh);
    phb->ph_rg1 = cb_int->int_data_len;

pnx_post_request(irb);
ifdef PNXDEBUG
    syslog(LOG_DEBUG, "I063: exit pnx_IED");
#endif
}                                  /* end - pnx_IED__issue_exp_ind */

/****************************
 * pnx_IRC__issue_reset_conf *
 ****************************/

/* This routine builds a reset confirm gater and issues a gate request to
 * the user layer (posts the PNet VC RECEIVE IORB). */ int
pnx_IRC__issue_reset_conf(struct vccb * vccb_ptr)

{
    register struct snsap *snsap_ptr;
    struct IRB      *irb;         /* IRB for VC RECEIVE */
    struct RB       *iorb;        /* VC RECEIVE IORB */
    struct GATER    *gater;       /* gater from VC RECEIVE buffer */
    struct PHD      *phb;         /* PHB from our pool */
    char            *var_ptr;     /* GATER variable part */
    struct cb_int_struct *cb_int; /* x25_receive data */
#ifdef PNXDEBUG
    syslog(LOG_DEBUG, "I064: pnx_IRC, VC=%lX", vccb_ptr);
#endif
    snsap_ptr = vccb_ptr->vc_snsap;
    if (pnx_get_next_vc_receive(&irb, &iorb) != 0)
    {
        return (-1);
    }
    RISC_ADDR(gater, (struct GATER *), iorb->rb_adr);

gater->gt_pri = 0;
    PUT4(gater->gt_nxt, 0);
    *(long *) gater->gt_mkr = *(long *) "GT01";
    gater->gt_slr = snsap_ptr->sn_mylv;
    gater->gt_sin = snsap_ptr->sn_myin;
```

```
    gater->gt_dlr = vccb_ptr->vc_olv;
    gater->gt_din = vccb_ptr->vc_oin;
    gater->gt_fnc = gtfrcf;
    PUT4(gater->gt_sce, vccb_ptr->vc_gtid);
    PUT4(gater->gt_dst, vccb_ptr->vc_ucxid);
    PUT4(gater->gt_dta, 0);
    gater->gt_dis = 0;
    gater->gt_crn = pnx_GCR__get_credit(vccb_ptr);
    gater->gt_cre = vccb_ptr->vc_xsndc;
    gater->gt_flg = 0;

gater->gt_vln = 0;

pnx_post_request(irb);
ifdef PNXDEBUG
    syslog(LOG_DEBUG, "I065: exit pnx_IRC");
#endif

}

/* end - pnx_IRC__issue_reset_conf */

/*************************
 * pnx_IRL__issue_rel_sdu *
 *************************/

/* Issue Release SDU
 *
 * This routine builds a release sdu gater and issues a gate request to the
 * user layer.
 *
 * This routine releases a transmitted PHB back to the user layer. Incremental
 * user send credit is also passed in the release sdu gater. */ int
pnx_IRL__issue_rel_sdu(struct vccb * vccb_ptr, struct PHD * phb_ptr)
{
    register struct snsap *snsap_ptr;
    struct IRB        *irb;         /* IRB for VC RECEIVE */
    struct RB         *iorb;        /* VC RECEIVE IORB */
    struct GATER      *gater;       /* gater from VC RECEIVE buffer */
    char              *var_ptr;     /* GATER variable part */
    struct cb_int_struct *cb_int;   /* x25_receive data */
#ifdef PNXDEBUG
    syslog(LOG_DEBUG, "I066: pnx_IRL, VC=%lX", vccb_ptr);
#endif
    snsap_ptr = vccb_ptr->vc_snsap;
    if (pnx_get_next_vc_receive(&irb, &iorb) != 0)
    {
        return (-1);
    }
    RISC_ADDR(gater, (struct GATER *), iorb->rb_adr);

PUT4(phb_ptr->ph_lnk, 0);
    vccb_ptr->vc_ublks -= 1;

gater->gt_pri = 0;
    PUT4(gater->gt_nxt, 0);
    *(long *) gater->gt_mkr = *(long *) "GT01";
    gater->gt_slr = snsap_ptr->sn_mylv;
    gater->gt_sin = snsap_ptr->sn_myin;
    gater->gt_dlr = vccb_ptr->vc_olv;
    gater->gt_din = vccb_ptr->vc_oin;
    gater->gt_fnc = gtfdai;
    PUT4(gater->gt_sce, vccb_ptr->vc_gtid);
    PUT4(gater->gt_dst, vccb_ptr->vc_ucxid);
    DPS6_ADDR(gater->gt_dta, phb_ptr);
    gater->gt_dis = 0;
    gater->gt_crn = pnx_GCR__get_credit(vccb_ptr);
    gater->gt_cre = 0;
    gater->gt_flg = 0;

gater->gt_vln = 0;

pnx_post_request(irb);
```

C30

```
#ifdef PNXDEBUG
    syslog(LOG_DEBUG, "I067: exit pnx_IRL");
#endif

}                                       /* end - pnx_IRL__isue_rel_sdu */

/***************************
* pnx_IRS__issue_reset_ind *
***************************/

/* Issue Reset Indication
  *
  * This routine builds a reset indication gater and issues a gate request to
  * the user layer.                                                         */ pnx_IRS__issue_reset_ind(struct vccb * vccb_ptr)

{
    register struct snsap *snsap_ptr;
    struct IRB      *irb;       /* IRB for VC RECEIVE */
    struct RB       *iorb;      /* VC RECEIVE IORB */
    struct GATER    *gater;     /* gater from VC RECEIVE buffer */
    char            *var_ptr;   /* GATER variable part */
    struct cb_int_struct *cb_int;  /* x25_receive data */
#ifdef PNXDEBUG
    syslog(LOG_DEBUG, "I068: pnx_IRS, VC=%lX", vccb_ptr);
#endif
    snsap_ptr = vccb_ptr->vc_snsap;
    if (pnx_get_next_vc_receive(&irb, &iorb) != 0)
    {
        return (-1);
    }
    RISC_ADDR(gater, (struct GATER *), iorb->rb_adr);

vccb_ptr->vc_xsndc = 1;
    vccb_ptr->vc_xrcvc = 1;
    vccb_ptr->vc_usndc = 0;

gater->gt_pri = 0;
    PUT4(gater->gt_nxt, 0);
    *(long *) gater->gt_mkr = *(long *) "GT01";
    gater->gt_slr = snsap_ptr->sn_mylv;
    gater->gt_sin = snsap_ptr->sn_myin;
    gater->gt_dlr = vccb_ptr->vc_olv;
    gater->gt_din = vccb_ptr->vc_oin;
    gater->gt_fnc = gtfrin;
    PUT4(gater->gt_sce, vccb_ptr->vc_gtid);
    PUT4(gater->gt_dst, vccb_ptr->vc_ucxid);
    PUT4(gater->gt_dta, 0);
    gater->gt_dis = 0;
    gater->gt_crn = pnx_GCR__get_credit(vccb_ptr);
    gater->gt_cre = vccb_ptr->vc_xsndc;
    gater->gt_flg = 0;

gater->gt_vln = 0;

pnx_post_request(irb);
ifdef PNXDEBUG
    syslog(LOG_DEBUG, "I069: exit pnx_IRS");
endif }                                       /* end - pnx_IRS__issue_reset_ind */

/***************************
* pnx_RRS__issue_reset_ind *
***************************/

/* This routine builds a reset indication gater and issues a gate request to
  * the user layer.
  *
  * This routine is called when a reset indication packet is received over a
  * virtual circuit.
```

C31

```
 *
 * The reset indication gater built by this routine includes the cause and
 * diagnostic fields received in the reset indication packet. */ int
pnx_RRS__issue_reset_ind(struct vccb * vccb_ptr)
{
    struct snsap    *snsap_ptr;
    struct GATER    *gater_ptr;
    unsigned char   *var_ptr;
    struct IRB      *irb;
    struct RB       *iorb;
#ifdef PNXDEBUG
    syslog(LOG_DEBUG, "I070: pnx_RRS, VC=%lX", vccb_ptr);
#endif
    snsap_ptr = vccb_ptr->vc_snsap;

vccb_ptr->vc_xsndc = 1;
    vccb_ptr->vc_xrcvc = 1;
    vccb_ptr->vc_usndc = 0;

if (pnx_get_next_vc_receive(&irb, &iorb) != 0)
    {
        return (-1);
    }
    RISC_ADDR(gater_ptr, (struct GATER *), iorb->rb_adr);

gater_ptr->gt_pri = 0;
    PUT4(gater_ptr, 0);
    PUT4(gater_ptr->gt_mkr, (*(ulong *) "GT01"));
    gater_ptr->gt_slr = snsap_ptr->sn_mylv;
    gater_ptr->gt_sin = snsap_ptr->sn_myin;
    gater_ptr->gt_dlr = snsap_ptr->sn_olv;
    gater_ptr->gt_din = snsap_ptr->sn_oin;
    gater_ptr->gt_fnc = gtfrin;
    PUT4(gater_ptr->gt_sce, vccb_ptr->vc_gtid);
    PUT4(gater_ptr->gt_dst, vccb_ptr->vc_ucxid);
    PUT4(gater_ptr->gt_dta, 0);
    gater_ptr->gt_dis = 0;
    gater_ptr->gt_crn = pnx_GCR__get_credit(vccb_ptr);
    gater_ptr->gt_cre = vccb_ptr->vc_xsndc;
    gater_ptr->gt_flg = 0;
    gater_ptr->gt_vln = 0;

var_ptr = &gater_ptr->gt_var[0];

/* Build resetting cause and diagnostic code parameters. */

*var_ptr++ = x25xcf;            /* resetting cause         */
    *var_ptr++ = 1;
    *var_ptr++ = vccb_ptr->vc_cause;
    gater_ptr->gt_vln += 3;

*var_ptr++ = x25xdf;            /* diagnostic code         */
    *var_ptr++ = 1;
    *var_ptr++ = vccb_ptr->vc_diag;
    gater_ptr->gt_vln += 3;

pnx_post_request(irb);
ifdef PNXDEBUG
    syslog(LOG_DEBUG, "I071: exit pnx_RRS");
endif }                                   /* end - pnx_RRS__issue_reset_ind */

/*************************
 * pnx_IDI__issue_dis_ind *
 *************************/

/* Issue Disconnect_Indication
 *
 *
 * This routine builds a disconnect indication gater and issues a gate request
```

C32

```
 * to the connection layer.
 *
 * The source connection id will be null for disconnect indications issued
 * during the call establishment process. */
int
pnx_IDI__issue_dis_ind(struct vccb * vccb_ptr,
                       unsigned long sce_ptr,
                       unsigned int dis_rsn)
{
    struct snsap    *snsap_ptr;
    struct GATER    *gater_ptr;
    struct IRB      *irb;
    struct RB       *iorb;
#ifdef PNXDEBUG
    syslog(LOG_DEBUG, "I072: pnx_IDI, VC=%lX", vccb_ptr);
#endif
    snsap_ptr = vccb_ptr->vc_snsap;

if (pnx_get_next_vc_receive(&irb, &iorb) != 0)
    {
        return (-1);
    }
    RISC_ADDR(gater_ptr, (struct GATER *), iorb->rb_adr);
    iorb->rb_dvs = vccb_ptr->vc_ndxid;

gater_ptr->gt_pri = 0;
    PUT4(gater_ptr, 0);
    PUT4(gater_ptr->gt_mkr, *(ulong *) "GT01");
    gater_ptr->gt_slr = snsap_ptr->sn_mylv;
    gater_ptr->gt_sin = snsap_ptr->sn_myin;
    gater_ptr->gt_dlr = snsap_ptr->sn_olv;
    gater_ptr->gt_din = snsap_ptr->sn_oin;
    gater_ptr->gt_fnc = gtfdin;
    PUT4(gater_ptr->gt_sce, sce_ptr);
    PUT4(gater_ptr->gt_dst, vccb_ptr->vc_ucxid);
    if (vccb_ptr->vc_udf == NULL)
    {
        vccb_ptr->vc_udf = base;
    }
    DPS6_ADDR(gater_ptr->gt_dta, vccb_ptr->vc_udf);
    gater_ptr->gt_dis = dis_rsn;
    gater_ptr->gt_crn = 0;
    gater_ptr->gt_cre = 0;
    gater_ptr->gt_flg = 0;

gater_ptr->gt_vln = 0;

vccb_ptr->vc_udf = NULL;

pnx_post_request(irb);
ifdef PNXDEBUG
    syslog(LOG_DEBUG, "I073: exit pnx_IDI");
endif }                                   /* end pnx_IDI__issue_dis_ind */

/***************************
 * pnx_IDX__issue_dis_ind  *
 ***************************/

/* Issue Disconnect_Indication
 *
 * This routine builds a disconnect indication gater and issues a gate request
 * to the connection layer (posts the VC RECEIVE IORB).
 *
 * This implementation of the disconnect indication is a special implementation
 * designed to be used during processing of a connect request gater. This
 * implementation does not depend upon successful location of the SNSAP
 * table or successful allocation of memory for a virtual circuit control
 * block.
 *
```

C33

```
 * This implementation also assumes the connection layer is always the extended
 * connection manager (XCM). If the connection layer is not XCM some
 * mechanism must be devised to pass both the identity of the user layer and
 * the connection layer in the connect request gater. */ int
pnx_IDX__issue_dis_ind(unsigned long ucx_ptr,
                       unsigned int dis_rsn,
                       ushort nad_index)
{
    struct GATER   *gater_ptr;
    struct RB      *iorb;
    struct IRB     *irb;
#ifdef PNXDEBUG
    syslog(LOG_DEBUG, "I074: pnx_IDX");
#endif
    if (pnx_get_next_vc_receive(&irb, &iorb) != 0)
    {
        return (-1);
    }
    RISC_ADDR(gater_ptr, (struct GATER *), iorb->rb_adr);
    iorb->rb_dvs = nad_index;

gater_ptr->gt_pri = 0;
    PUT4(gater_ptr->gt_nxt, 0);
    PUT4(gater_ptr->gt_mkr, *(ulong *) "GT01");
    gater_ptr->gt_slr = gt_nwc;
    gater_ptr->gt_sin = gt_x25;
    gater_ptr->gt_dlr = gt_nwc;
    gater_ptr->gt_din = gt_xcm;
    gater_ptr->gt_fnc = gtfdin;
    PUT4(gater_ptr->gt_sce, 0);
    PUT4(gater_ptr->gt_dst, ucx_ptr);
    PUT4(gater_ptr->gt_dta, 0);
    gater_ptr->gt_dis = dis_rsn;
    gater_ptr->gt_crn = 0;
    gater_ptr->gt_cre = 0;
    gater_ptr->gt_flg = 0;

pnx_post_request(irb);
ifdef PNXDEBUG
    syslog(LOG_DEBUG, "I075: exit pnx_IDX");
endif }                                      /* end - pnx_IDX__issue_dis_ind */

/***************************
 * pnx_RDI__issue_dis_ind *
 ***************************/

/* This routine builds a disconnect indication gater and issues a gate
 * request to the connection layer.
 *
 * This routine is called when a reset indication packet whose cause and
 * diagnostic code fields indicate user layer disconnection is received over
 * a permanent virtual circuit.
 *
 * The disconnect indication gater built by this routine includes the cause and
 * diagnostic fields received in the reset indicatio packet.
 *
 */ pnx_RDI__issue_dis_ind(struct vccb * vccb_ptr, unsigned int dis_rsn)
{ unsigned char   *var_ptr;
    struct snsap    *snsap_ptr;
    struct GATER    *gater;
    struct IRB      *irb;
    struct RB       *iorb;
#ifdef PNXDEBUG
    syslog(LOG_DEBUG, "I076: pnx_RDI, VC=%lX", vccb_ptr);
#endif
    snsap_ptr = vccb_ptr->vc_snsap;
```

C34

```
    if (pnx_get_next_vc_receive(&irb, &iorb) != 0)
    {
        return (-1);
    }
    RISC_ADDR(gater, (struct GATER *), iorb->rb_adr);
    iorb->rb_dvs = vccb_ptr->vc_ndxid;

gater->gt_pri = 0;
    PUT4(gater->gt_nxt, 0);
    *(long *) gater->gt_mkr = *(long *) "GT01";
    gater->gt_slr = snsap_ptr->sn_mylv;
    gater->gt_sin = snsap_ptr->sn_myin;
    gater->gt_dlr = snsap_ptr->sn_olv;
    gater->gt_din = snsap_ptr->sn_oin;
    gater->gt_fnc = gtfdin;
    PUT4(gater->gt_sce, vccb_ptr->vc_gtid);
    PUT4(gater->gt_dst, vccb_ptr->vc_ucxid);
    PUT4(gater->gt_dta, 0);
    gater->gt_dis = dis_rsn;
    gater->gt_crn = 0;
    gater->gt_cre = 0;
    gater->gt_flg = 0;

gater->gt_vln = 0;

var_ptr = &gater->gt_var[0];

/* Build resetting cause and diagnostic code parameters. */

*var_ptr++ = x25xcf;           /* resetting cause         */
    *var_ptr++ = 1;
    *var_ptr++ = vccb_ptr->vc_cause;
    gater->gt_vln += 3;

*var_ptr++ = x25xdf;           /* diagnostic code         */
    *var_ptr++ = 1;
    *var_ptr++ = vccb_ptr->vc_diag;
    gater->gt_vln += 3;

/* Issue gate request via gate manager. */ pnx_post_request(irb);

ifdef PNXDEBUG
    syslog(LOG_DEBUG, "I077: exit pnx_RDI");
#endif
}                                  /* end - pnx_RDI__issue_dis_ind */

/*************************
 * pnx_IDC__issue_dis_conf *
 *************************/

/* This routine builds a disconnect confirm gater and issues a gate request
 * to the connection layer (posts the VC RECEIVE IORB). */
int
pnx_IDC__issue_dis_conf(struct vccb * vccb_ptr)
{
    struct snsap    *snsap_ptr;
    struct GATER    *gater_ptr;
    struct IRB      *irb;
    struct RB       *iorb;
#ifdef PNXDEBUG
    syslog(LOG_DEBUG, "I078: pnx_IDC, VC=%lX", vccb_ptr);
#endif
    snsap_ptr = vccb_ptr->vc_snsap;

if (pnx_get_next_vc_receive(&irb, &iorb) != 0)
    {
        return (-1);
    }
    RISC_ADDR(gater_ptr, (struct GATER *), iorb->rb_adr);
    iorb->rb_dvs = vccb_ptr->vc_ndxid;

gater_ptr->gt_pri = 0;
```

C35

```
    PUT4(gater_ptr->gt_nxt, 0);
    PUT4(gater_ptr->gt_mkr, *(ulong *) "GT01");
    gater_ptr->gt_slr = snsap_ptr->sn_mylv;
    gater_ptr->gt_sin = snsap_ptr->sn_myin;
    gater_ptr->gt_dlr = snsap_ptr->sn_olv;
    gater_ptr->gt_din = snsap_ptr->sn_oin;
    gater_ptr->gt_fnc = gtfdcf;
    PUT4(gater_ptr->gt_sce, vccb_ptr->vc_gtid);
    PUT4(gater_ptr->gt_dst, vccb_ptr->vc_ucxid);
    PUT4(gater_ptr->gt_dta, 0);
    gater_ptr->gt_dis = 0;
    gater_ptr->gt_crn = 0;
    gater_ptr->gt_cre = 0;
    gater_ptr->gt_flg = 0;

pnx_post_request(irb);
ifdef PNXDEBUG
    syslog(LOG_DEBUG, "I079: exit pnx_IDC");
endif }                                       /* end - pnx_IDC__issue_dis_conf */

/****************************
 * pnx_IOK__issue_ok_to_send *
 ****************************/

/* This routine builds an ok_to_send gater and issues a gate request to the
 * user layer (posts the VC RECEIVE IORB). */ int
pnx_IOK__issue_ok_to_send(struct vccb * vccb_ptr, unsigned int exp_cre)
{
    struct snsap    *snsap_ptr;
    struct GATER    *gater_ptr;
    struct IRB      *irb;
    struct RB       *iorb;
#ifdef PNXDEBUG
    syslog(LOG_DEBUG, "I080: pnx_IOK, VC=%lX", vccb_ptr);
#endif
    snsap_ptr = vccb_ptr->vc_snsap;

if (pnx_get_next_vc_receive(&irb, &iorb) != 0)
    {
        return (-1);
    }
    RISC_ADDR(gater_ptr, (struct GATER *), iorb->rb_adr);

gater_ptr->gt_pri = 0;
    PUT4(gater_ptr->gt_nxt, 0);
    PUT4(gater_ptr->gt_mkr, *(ulong *) "GT01");
    gater_ptr->gt_slr = snsap_ptr->sn_mylv;
    gater_ptr->gt_sin = snsap_ptr->sn_myin;
    gater_ptr->gt_dlr = snsap_ptr->sn_olv;
    gater_ptr->gt_din = snsap_ptr->sn_oin;
    gater_ptr->gt_fnc = gtfoks;
    PUT4(gater_ptr->gt_sce, vccb_ptr->vc_gtid);
    PUT4(gater_ptr->gt_dst, vccb_ptr->vc_ucxid);
    PUT4(gater_ptr->gt_dta, 0);
    gater_ptr->gt_dis = 0;
    gater_ptr->gt_crn = pnx_GCR__get_credit(vccb_ptr);
    gater_ptr->gt_cre = exp_cre;
    gater_ptr->gt_flg = 0;

gater_ptr->gt_vln = 0;

pnx_post_request(irb);
ifdef PNXDEBUG
    syslog(LOG_DEBUG, "I081: exit pnx_IOK");
#endif
}                                       /* end pnx_IOK__issue_ok_to_send */

/****************************
 * pnx_ISI__issue_sap_info *
```

C36

```
****************************/

/* This routine builds a sap information gater and issues a gate request to
 * the connection layer (posts a VC RECEIVE IORB).
 *
 * The sap information gater indicates whether specified sap is available or
 * unavailable for use by the connection layer.  A sap is said to be
 * available when the X.25 API has been initialized and notification of link
 * connecction is received. */ int
pnx_ISI__issue_sap_info(struct snsap * snsap_ptr, unsigned int sap_info)
{
    unsigned int    s_len;
    unsigned char   *var_ptr;
    struct GATER    *gater_ptr;
    struct IRB      *irb;
    struct RB       *iorb;
    char            *up_down;       /* set to either "UP" or "DOWN" */
#ifdef PNXDEBUG
    syslog(LOG_DEBUG, "I082: pnx_ISI");
endif /* If we're sending SAP DOWN, start the clock ticking */
    if (sap_info == gpcssd)
    {
        pnx_start_clock();
        up_down = "DOWN";
    }
    else
    {
        up_down = "UP";
    }
    syslog(LOG_INFO, "I083: PNetX issuing SAP_%s for %s",
            up_down, &snsap_ptr->sn_lsap[1]);

if (pnx_get_next_vc_receive(&irb, &iorb) != 0)
    {
        return (-1);
    }
    RISC_ADDR(gater_ptr, (struct GATER *), iorb->rb_adr);

/* Setup fields in fixed part of gater. */ gater_ptr->gt_pri = 0;
    PUT4(gater_ptr->gt_nxt, 0);
    PUT4(gater_ptr->gt_mkr, *(ulong *) "GT01");
    gater_ptr->gt_slr = snsap_ptr->sn_mylv;
    gater_ptr->gt_sin = snsap_ptr->sn_myin;
    gater_ptr->gt_dlr = snsap_ptr->sn_olv;
    gater_ptr->gt_din = snsap_ptr->sn_oin;
    gater_ptr->gt_fnc = gtfinf;
    PUT4(gater_ptr->gt_sce, 0);
    PUT4(gater_ptr->gt_dst, 0);
    PUT4(gater_ptr->gt_dta, 0);
    gater_ptr->gt_dis = 0;
    gater_ptr->gt_crn = 0;
    gater_ptr->gt_cre = 0;
    gater_ptr->gt_flg = 0;

gater_ptr->gt_vln = 0;

var_ptr = &gater_ptr->gt_var[0];

/* Setup sap info parameter in variable part of gater */

*var_ptr++ = sap_info;
    s_len = snsap_ptr->sn_name[0];
    *var_ptr++ = s_len;
    memcpy(var_ptr, &snsap_ptr->sn_name[1], s_len);
    var_ptr += s_len;
    gater_ptr->gt_vln += s_len + 2;

pnx_post_request(irb);
ifdef PNXDEBUG
    syslog(LOG_DEBUG, "I084: exit pnx_ISI");
#endif
```

C37

```
}                    /* end - pnx_ISI__issue_sap_info */
```

C38

```c
/*
 * Name:        pnx_inf.c
 * Purpose:     PNetX administration functions
 * Functions in this module:
 *      (see pnx_func.h for prototype declarations)
 int             pnx_INQ__info_request()
 int             pnx_SNI__sn_info_req()
 int             pnx_SNR__info_resp()
 int             pnx_VCI__vc_info_req()
 struct GATER    *pnx_IRG__info_resp_gater()

*/ include "sys_head.h"
include "emu_head.h"
#include "macro.h"
#include "mqi_head.h"
#include "z_rb.h"
#include "z3irb.h"
include <x25sdefs.h> include "pnx_head.h"
include "pnx_vccb.h"
#include "hvx_phd.h"
#include "pnx_snsap.h"
#include "hvx_gater.h"
#include "hvx_lme.h"
#include "x25vce.h"
#include "x25sta.h"

struct GATER    *pnx_IRG__info_resp_gater();

extern char     *base;

extern struct pnx_global *PnetXGlobal;

/************************
 * pnx_INQ__info_request *
 ************************/

/* This routine processes an information request gater.
 *
 * The information type is extracted from the info request gater and the
 * processing routine for the requested info type executed. */ int
pnx_INQ__info_request(struct GATER * gater_ptr)

{                                       /* INQ__info_request */ unsigned short   i;

/* Scan information request for info type. Dispatch to info processing
     * routine for requested type. */ for (i = 0; i < gater_ptr->gt_vln; i += gater_ptr->gt_var[i + 1] + 2)
    {
        switch (gater_ptr->gt_var[i])
        {
        case x25sni:
            pnx_SNI__sn_info_req(gater_ptr);
            return (0);
            break;

case x25vci:
            pnx_VCI__vc_info_req(gater_ptr);
            return (0);
            break;

}                               /* end switch */
    }                                   /* end loop */ return (0);
```

```c
}                                       /* INQ_info_request */

/************************
 * pnx_SNI__sn_info_req *
 ************************/

/* This routine processes a snsap information request gater issued by
 * vc_loop. */
int
pnx_SNI__sn_info_req(struct GATER * gater_ptr)

{                                       /* SNI__sn_info_req */ unsigned short  i;
    struct snsap    *snsap_ptr;
    unsigned char   l_sap[9];

l_sap[0] = 0;

for (i = 1; i <= 8; i++)
    {
        l_sap[i] = ' ';
    }

/* Locate SNSAP table via SAP name. */ for (i = 0; i < gater_ptr->gt_vln; i += gater_ptr->gt_var[i + 1] + 2)
    {
        switch (gater_ptr->gt_var[i])
        { case gpccla:                    /* snsap name */
            if (gater_ptr->gt_var[i + 1] > 8)
            {
                pnx_ERR__report_error(BOTH, LOG_ERR, (PNXINF + 1),
                                      NULL, st25_ISL);
                return (-1);
            }
            l_sap[0] = gater_ptr->gt_var[i + 1];
            memcpy(&l_sap[1], &gater_ptr->gt_var[i + 2], l_sap[0]);
            if (pnx_GSN__get_snsap(&l_sap[0], &snsap_ptr) != 0)
            {
                return (-1);
            }
            else
            {
                pnx_SNR__sn_info_resp(snsap_ptr, gater_ptr);
                return (0);
            }
            break;

}                               /* end switch */
    }                                   /* end loop */ return (-1);

}                                       /* SNI__sn_info_req */

/************************
 * pnx_SNR__sn_info_resp *
 ************************/

/* This routine builds the response parameters for a snsap information
 * request issued by vc_loop. */
int
pnx_SNR__sn_info_resp(struct snsap * snsap_ptr, struct GATER * inq_ptr)

{                                       /* SNR__sn_info_resp */ struct IRB      *irb_ptr;
    struct RB       *iorb_ptr;
    struct GATER    *gater_ptr;
    unsigned char   *var_ptr;
    unsigned short  s_len;
```

C40

```
    if (pnx_get_next_vc_receive(&irb_ptr, &iorb_ptr) != 0)
    {
        return (-1);
    } gater_ptr = pnx_IRG__info_resp_gater(iorb_ptr, inq_ptr);
    var_ptr = &gater_ptr->gt_var[0];

*var_ptr++ = gpccla;              /* snsap name */
    s_len = snsap_ptr->sn_name[0];
    *var_ptr++ = s_len;
    memcpy(var_ptr, &snsap_ptr->sn_name[1], s_len);
    var_ptr += s_len;
    gater_ptr->gt_vln += s_len + 2;

*var_ptr++ = x25ntw;              /* network type */
    *var_ptr++ = 1;
    *var_ptr++ = snsap_ptr->sn_ntw;
    gater_ptr->gt_vln += 3;

/* Post VC request for info response. */ pnx_post_request(irb_ptr);

return (0);

}                                     /* SNR__sn_info_resp */

/************************
 * pnx_VCI__vc_info_req *
 ************************/

/* This routine builds the response parameters for a virtual circuit
 * information request issued by vc_loop. */
int
pnx_VCI__vc_info_req(struct GATER * inq_ptr)

{                                     /* VCI__vc_info_req */ struct IRB      *irb_ptr;
    struct RB       *iorb_ptr;
    struct GATER    *gater_ptr;
    struct vccb     *vccb_ptr;
    unsigned char   *var_ptr;
    unsigned char   *aptr;
    ulong           dst_id;

GET4(dst_id, inq_ptr->gt_dst);

if ((vccb_ptr = pnx_GVI__get_vccb_by_id(dst_id)) == NULL)
    {
        return (-1);
    } if (pnx_get_next_vc_receive(&irb_ptr, &iorb_ptr) != 0)
    {
        return (-1);
    }
    gater_ptr = pnx_IRG__info_resp_gater(iorb_ptr, inq_ptr);
    var_ptr = &gater_ptr->gt_var[0];

*var_ptr++ = x25epd;              /* data-packets-sent */
    *var_ptr++ = 4;
    aptr = (unsigned char *) &vccb_ptr->vc_epd;
    *var_ptr++ = *aptr++;
    *var_ptr++ = *aptr++;
    *var_ptr++ = *aptr++;
    *var_ptr++ = *aptr++;
    gater_ptr->gt_vln += 6;

*var_ptr++ = x25ern;              /* rnr packets sent */
    *var_ptr++ = 2;
    *var_ptr++ = 0;
    *var_ptr++ = 0;
    gater_ptr->gt_vln += 4;
```

C41

```
    *var_ptr++ = x25erj;        /* rej packets sent */
    *var_ptr++ = 2;
    *var_ptr++ = 0;
    *var_ptr++ = 0;
    gater_ptr->gt_vln += 4;

*var_ptr++ = x25rpd;        /* data-packets-received */
    *var_ptr++ = 4;
    aptr = (unsigned char *) &vccb_ptr->vc_rpd;
    *var_ptr++ = *aptr++;
    *var_ptr++ = *aptr++;
    *var_ptr++ = *aptr++;
    *var_ptr++ = *aptr++;
    gater_ptr->gt_vln += 6;

*var_ptr++ = x25rrn;        /* rnr packets received */
    *var_ptr++ = 2;
    *var_ptr++ = 0;
    *var_ptr++ = 0;
    gater_ptr->gt_vln += 4;

*var_ptr++ = x25rrj;        /* rej packets received */
    *var_ptr++ = 2;
    *var_ptr++ = 0;
    *var_ptr++ = 0;
    gater_ptr->gt_vln += 4;

/* Post VC request for info response. */ pnx_post_request(irb_ptr);

return (0);

}                               /* VCI__vc_info_req */

/****************************
 * pnx__IRG__info_resp_gater *
 ****************************/

/* This routine gets and initializes an info response gater. */ struct GATER    *
pnx_IRG__info_resp_gater(struct RB * iorb_ptr, struct GATER * inq_ptr)

{                               /* IRG__info_resp_gater */ struct GATER    *gater_ptr;
    ulong           sce_id;
    ulong           dst_id;

GET4(sce_id, inq_ptr->gt_sce);
    GET4(dst_id, inq_ptr->gt_dst);

RISC_ADDR(gater_ptr, (struct GATER *), iorb_ptr->rb_adr);

/* Setup fixed part of info response gater. */ gater_ptr->gt_pri = 0;
    PUT4(gater_ptr->gt_nxt, 0);
    *(long *) gater_ptr->gt_mkr = *(long *) "GT01";
    gater_ptr->gt_slr = gt_nwc;
    gater_ptr->gt_sin = gt_x25;
    gater_ptr->gt_dlr = inq_ptr->gt_slr;
    gater_ptr->gt_din = inq_ptr->gt_sin;
    gater_ptr->gt_fnc = gtfinr;
    PUT4(gater_ptr->gt_sce, dst_id);
    PUT4(gater_ptr->gt_dst, sce_id);
    PUT4(gater_ptr->gt_dta, 0);
    gater_ptr->gt_dis = 0;
    gater_ptr->gt_crn = 0;
    gater_ptr->gt_cre = 0;
    gater_ptr->gt_flg = 0;
    gater_ptr->gt_vln = 0;

return (gater_ptr);

}                               /* IRG__info_resp_gater */
```

C42

```
/*
 * Name:        pnx_init.c
 * Purpose:     This module contains functions used to initialize
 *              and terminate PNetX and the X.25 API
 * Functions in this module:
 *      (see pnx_func.h for prototype declarations)
 *
 * int    pnx_initialize()
 * int    pnx_x25_init()
 * int    pnx_port_init()
 * int    pnx_x25_listen_on()
 * int    pnx_pvc_alloc()
 * int    pnx_getattr()
 * void   pnx_cleanup()
 */ include "sys_head.h"
include "emu_head.h"
#include "macro.h"
#include "mqi_head.h"
#include "z3rct.h"

#include <x25sdefs.h>
#include <sys/cfgodm.h>
#include "pnx_head.h"
include "pnx_vccb.h"
#include "pnx_snsap.h"
#include "pnx_hvx25.h"
#include "hvx_lme.h"
#include "pnx_trace.h"
#include "x25dia.h"
#include "x25cse.h"

#define TRACE_SHMDADDR (char *)0xc0000000
extern char       *base;

extern struct EMU_OPTS opt;

extern struct pnx_global *PnetXGlobal;
extern struct trace_buffer *trace_tab;
extern int        TraceShmid;
extern long       x25_trace_size;

int               pnx_fd;

/*****************
 * pnx_initialize *
 *****************/

/* This function performs "first-pass" initialization of PNetX.  This is
 * done when pnx_io() is called as a result of the inclusion of the 'x25'
 * directive in the CLM_HVX file.
 *
 * This function must be called before pnx_x25_init. */ int
pnx_initialize()
{
    int           route_len;   /* length of routing table entry */
    struct RCT    *our_rct;
    int           key, status, shmid, size, ctr, i;

/* Make sure we haven't already done this. */
    if (PnetXGlobal)
    {
        pnx_ERR__report_error(JUST_HVX, LOG_ERR, PNXINIT + 1,
                        NULL, PNX_UP);
        return (0);
    }
    /* Allocate & initialize global data structure */
    PnetXGlobal = (struct pnx_global *) malloc(sizeof(struct pnx_global));
    if (PnetXGlobal == NULL)
    {
        pnx_ERR__report_error(JUST_HVX, LOG_ERR, PNXINIT + 2,
```

C43

```
                          NULL, PNX_SYS_ERR);
    return (-1);
}

PnetXGlobal = memset(PnetXGlobal, 0, sizeof(struct pnx_global));

PnetXGlobal->marker[0] = 'P';
PnetXGlobal->marker[1] = 'X';
PnetXGlobal->marker[2] = 'G';
PnetXGlobal->marker[3] = 'L';

PnetXGlobal->pnx_shm_ok = 0;

PnetXGlobal->pnx_rct =
    our_rct = (struct RCT *) opt.forkx25;

PnetXGlobal->pnx_pid = getpid();
sleep(5);
syslog(LOG_INFO, "I257: PNetX PID=%d, semid=%d",
       PnetXGlobal->pnx_pid,
       our_rct->qaddr.isem.sid);

/* if PATH was included on X25 directive in clm_bosx, use that as the
 * routing table (xroute) entry.  Else default to "HVX" */
if (our_rct->qaddr.filename[0] == '\0')
{
    strcpy(our_rct->qaddr.filename, "HVX");
}
route_len = strlen(our_rct->qaddr.filename);
syslog(LOG_INFO, "I258: PNetX XROUTE entry is %s",
       our_rct->qaddr.filename, route_len);
if (mbstowcs(PnetXGlobal->pnx_route,
             our_rct->qaddr.filename,
             route_len) < 0)
{
    pnx_ERR__report_error(JUST_HVX, LOG_ERR, PNXINIT + 3,
                          NULL, PNX_SYS_ERR);
    return (-1);
}

PnetXGlobal->active_q.next = &PnetXGlobal->active_q;
PnetXGlobal->active_q.prev = &PnetXGlobal->active_q;

PnetXGlobal->wait_pnet.next = &PnetXGlobal->wait_pnet;
PnetXGlobal->wait_pnet.prev = &PnetXGlobal->wait_pnet;

PnetXGlobal->pnx_active = 1;

/* start statistics for minimums at some arbitrarily high number */
PnetXGlobal->low_vcrcv = PnetXGlobal->low_phb = 1000;

/* Setting packet length to 128 should be a temporary measure.  We should
 * be able to change based on real packet sizes being used */

PnetXGlobal->pkt_len = 128;

/* Get a shared memory segment for the PNetX trace buffer.  The number of
 * trace elements is always a power of 2, so we may use a mask as a quick
 * modulo function. */ size = x25_trace_size;
size = size - sizeof(struct trace_buffer);
size = size / sizeof(struct trace_item);

for (i = 0; i < 20; i++, size = size >> 1)
{
    if (size == 1)
        break;
} size = 1;
```

C44

```
    while (i--)
    {
        size = size << 1;
    } key = PnetXGlobal->pnx_pid;
    TraceShmid = shmget(key, x25_trace_size, IPC_CREAT | IPC_EXCL | 0660);
    if (TraceShmid < 0)
    {
        PnetXGlobal->pnx_shm_ok = 0;
        syslog(LOG_ERR, "E450: PNetX: unable to get shared memory: %m");
        return (0);
    } ifdef PNXDEBUG
    syslog(LOG_DEBUG, "after shmget.  shmid=%d", TraceShmid);
endif /* Detach shared memory at 0xc0000000 if its being inherited from the
     * parent process */
    shmdt(TRACE_SHMDADDR);
    trace_tab = (struct trace_buffer *) shmat(TraceShmid, TRACE_SHMDADDR, 0);
    if (trace_tab == (struct trace_buffer *) - 1)
    {
        PnetXGlobal->pnx_shm_ok = 0;
        syslog(LOG_ERR, "E451: PNetX: unable to attach shared memory: %m");
        return (0);
    }
    PnetXGlobal->pnx_shm_ok = 1;
#ifdef PNXDEBUG
    syslog(LOG_DEBUG, "Trace buffer attached at 0x%8.8X",
            (ulong) trace_tab);
#endif
    strcpy(trace_tab->id, "PNetX Trace");
    trace_tab->PNetX_pid = PnetXGlobal->pnx_pid;
    trace_tab->size = x25_trace_size;
    trace_tab->modulo = size - 1;
    trace_tab->index = 0;
    return (0);
}                                       /* end pnx_initialize */

/***************
 * pnx_x25_init *
 ***************/

/* This function performs "second-pass" or X.25 initialization of PNetX.  It
  * is called when we receive the BOOT IO request from PNet. */ int
pnx_x25_init(struct hvx25 * hvx25_ptr)
{
    struct snsap    *snsap_ptr, *next_snsap;
    int             status, i;
    int             max_vcs;
    char            *link_status; /* for syslog */
    int             old_mask;
    char            addr[9];
    char            sn_info[200];

#ifdef PNXDEBUG
    syslog(LOG_DEBUG, "pnx_x25_init");
endif for (i = 0; i < 200; i++)
    {
        sn_info[i] = '\0';
    }

/* set the mask for the mode of files to be opened to 0 & save the old
     * mask */ old_mask = umask(0);
```

C45

```c
/* open file for storing BOSX/ SNSAP attributes :*/
if ((pnx_fd = open("/var/hvx/crash/PNetX_Config",
                    O_CREAT | O_TRUNC : O_WRONLY, 0660)) == -1)
{
    pnx_ERR__report_error(JUST_HVX, LOG_ERR, PNXINIT + 31,
                          NULL, PNX_SYS_ERR);
}
/* set the mask back to it's original */
umask(old_mask);

PnetXGlobal->x25listen_on = 0;

/* If PNetX initialization failed, we're in real trouble. */
if ((!PnetXGlobal) || (!(PnetXGlobal->pnx_active)))
{
    pnx_ERR__report_error(JUST_HVX, LOG_ERR, PNXINIT + 4,
                          NULL, PNX_ERROR);
    return (-1);
}

/* Don't do it twice! */
if (PnetXGlobal->x25_active)
{
    pnx_ERR__report_error(JUST_HVX, LOG_ERR, PNXINIT + 5,
                          NULL, PNX_X25_UP);
    return (0);
}

PnetXGlobal->x25_initing = 1;
PnetXGlobal->max_vcs = 1;     /* max_vc initialized to 1, as we will
                               * always be having a listen id */

/* First, build SNSAP chain from HVX25 structures. In this loop, get
 * attributes of each SNSAP (X.25 port) and set values in SNSAP.  */ while ((char *) hvx25_ptr != base)
{
    if ((snsap_ptr = pnx_make_snsap(hvx25_ptr)) == NULL)
    {
        return (-1);
    } snsap_ptr->sn_nxt = PnetXGlobal->snsap_tbl;
    PnetXGlobal->snsap_tbl = snsap_ptr;

RISC_ADDR(hvx25_ptr, (struct hvx25 *), hvx25_ptr->hv_nxt);
}

/* For each local snsap initialize the port and get the congiguration
 * attributes */ snsap_ptr = PnetXGlobal->snsap_tbl;
while (snsap_ptr)
{
    if (!snsap_ptr->sn_rem)
        /* do only for local SNSAPs */
    {
        pnx_port_init(snsap_ptr);
        if (snsap_ptr->sn_x25ok == 1)
        {
            PnetXGlobal->x25link_up = 1;
            /* get X.25 config info for local SNSAPs */
            if (pnx_getattr(snsap_ptr) != 0)
            {
                pnx_ERR__report_error(JUST_HVX, LOG_ERR, PNXINIT + 1,
                                      NULL, PNX_ERROR);
                free(snsap_ptr);
            }                     /* end if */

/* Bump global max for VCs */
            PnetXGlobal->max_vcs += snsap_ptr->sn_maxvc;

/* Now that we have all the info about local sap store it
             * into /var/hvx/pnx_x25info */
            sprintf(sn_info, "\n\nLocal SNSAP: sn_name: %s\nsn_type:",
                    snsap_ptr->sn_name);
            write(pnx_fd, sn_info, strlen(sn_info));
```

C46

```
                write(pnx_fd, snsap_ptr->sn_type, 4);
                sprintf(sn_info, "\t sn_lsap: ");
                write(pnx_fd, sn_info, strlen(sn_info));
                write(pnx_fd, &snsap_ptr->sn_lsap[1], 5);

sprintf(sn_info,
                        "\t sn_dce: %d\nsn_ntw: %d\t sn_numvc %d\t sn_addr: ",
                        snsap_ptr->sn_dce, snsap_ptr->sn_ntw,
                        snsap_ptr->sn_numvc);
                write(pnx_fd, sn_info, strlen(sn_info));
                pnx_bin_to_str(addr, snsap_ptr->sn_addr, &i);
                write(pnx_fd, addr, i);
                sprintf(sn_info,
                        "\nsn_maxvc: %d\t sn_ver: %d\t sn_dsac: 0x%4.4X\t",
                        snsap_ptr->sn_maxvc, snsap_ptr->sn_ver,
                        snsap_ptr->sn_dsac);
                write(pnx_fd, sn_info, strlen(sn_info));
                sprintf(sn_info,
                        "\nsn_pszx: %d\t sn_pszr: %d\t sn_wndx: %d\t sn_wndr: %d\n",
                        snsap_ptr->sn_pszx, snsap_ptr->sn_pszr,
                        snsap_ptr->sn_wndx, snsap_ptr->sn_wndr);

write(pnx_fd, sn_info, strlen(sn_info));
                sprintf(sn_info, "\n sn_thrx: %d\t sn_thrr: %d",
                        snsap_ptr->sn_thrx, snsap_ptr->sn_thrr);
                sprintf(sn_info, "sn_pvc: %d\t sn_lcnpl: %d\t sn_lcnpn: %d\n",
                        snsap_ptr->sn_pvc, snsap_ptr->sn_lcnpl,
                        snsap_ptr->sn_lcnpn);

write(pnx_fd, sn_info, strlen(sn_info));
                sprintf(sn_info, "sn_lcnil: %d\t sn_lcnin: %d\t sn_lcnol: %d\tsn_lcnon: %d\n",
                        snsap_ptr->sn_lcnil, snsap_ptr->sn_lcnin,
                        snsap_ptr->sn_lcnol, snsap_ptr->sn_lcnon);
                write(pnx_fd, sn_info, strlen(sn_info));
                sprintf(sn_info, "sn_lcntl: %d\t sn_lcntn: %d\n",
                        snsap_ptr->sn_lcntl, snsap_ptr->sn_lcntn);

write(pnx_fd, sn_info, strlen(sn_info));
                sprintf(sn_info, "sn_mylv: %x\t sn_myin: %x\t sn_olv: %x\t sn_oin: %x\n",
                   snsap_ptr->sn_mylv, snsap_ptr->sn_myin, snsap_ptr->sn_olv,
                        snsap_ptr->sn_oin);
                write(pnx_fd, sn_info, strlen(sn_info));
                sprintf(sn_info, "sn_rca: %d\t sn_fsa: %d\t sn_flcng: %d\t sn_thrng: %d\n",
                   snsap_ptr->sn_rca, snsap_ptr->sn_fsa, snsap_ptr->sn_flcng,
                        snsap_ptr->sn_thrng);

write(pnx_fd, sn_info, strlen(sn_info));
                sprintf(sn_info, "sn_icb: %d\t sn_ocb: %d\t sn_rem: %d\t sn_nca: %d\n",
                        snsap_ptr->sn_icb, snsap_ptr->sn_ocb,
                        snsap_ptr->sn_rem, snsap_ptr->sn_nca);
                write(pnx_fd, sn_info, strlen(sn_info));

sprintf(sn_info, "sn_cug: %d\t sn_portl: %d\nsn_venu: ",
                        snsap_ptr->sn_cug, snsap_ptr->sn_portl);
                write(pnx_fd, sn_info, strlen(sn_info));
                write(pnx_fd, snsap_ptr->sn_venu, 2);
            }
        }                           /* end if - local snsap */
        else
        {
            for (i = 0; i < 200; i++)
                sn_info[i] = '\0';
            sprintf(sn_info, " \n\n\nRemote SNSAP: sn_name : %s   ",
                    snsap_ptr->sn_name);
            write(pnx_fd, sn_info, strlen(sn_info));

sprintf(sn_info, "\nsn_dsac: 0x%4.4x\t sn_type: %s \nsn_maxvc: %d sn_venu: ",
                    snsap_ptr->sn_dsac, snsap_ptr->sn_type,
                    snsap_ptr->sn_maxvc);
            write(pnx_fd, sn_info, strlen(sn_info));
            write(pnx_fd, snsap_ptr->sn_venu, 2);
            sprintf(sn_info, "\nsn_addr: ");
            write(pnx_fd, sn_info, 9);
            pnx_bin_to_str(addr, snsap_ptr->sn_addr, &i);
            write(pnx_fd, addr, i);
        }
    snsap_ptr = snsap_ptr->sn_nxt;
```

C47

```
    }                           /* end while - snsap_ptr */
if (PnetXGlobal->x25link_up == 0)
{
    syslog(LOG_ERR, "E073: pnx_init : No port initialized");
    return (-1);
}

/* close the file opened for storing BOSX X25 / SNSAP attributes */
close(pnx_fd);

/* Next, get memory for counter array based on the MAXVCS from SNSAP.
 * Also get memory for GLOBAL->ctr_vc_link and GLOBAL->vc_table */ max_vcs = PnetXGlobal->max_vcs;
PnetXGlobal->counters =
    (struct ctr_block *) malloc((sizeof(struct ctr_block)) * max_vcs);
if (PnetXGlobal->counters == NULL)
{
    pnx_ERR__report_error(JUST_HVX, LOG_ERR, PNXINIT + 14,
                          NULL, PNX_SYS_ERR);
    return (-1);
}

PnetXGlobal->counters = memset(PnetXGlobal->counters, 0,
                               (sizeof(struct ctr_block) * max_vcs));

PnetXGlobal->ctr_vc_link =
    (struct ctr_vc_lk *) malloc((sizeof(struct ctr_vc_lk)) * max_vcs);
if (PnetXGlobal->ctr_vc_link == NULL)
{
    pnx_ERR__report_error(JUST_HVX, LOG_ERR, PNXINIT + 15,
                          NULL, PNX_SYS_ERR);
    return (-1);
}

PnetXGlobal->ctr_vc_link = memset(PnetXGlobal->ctr_vc_link, 0,
                                  (sizeof(struct ctr_vc_lk) * max_vcs));

PnetXGlobal->vc_table =
    (struct vc_tab *) malloc((sizeof(struct vc_tab) * max_vcs));
if (PnetXGlobal->vc_table == NULL)
{
    pnx_ERR__report_error(JUST_HVX, LOG_ERR, PNXINIT + 16,
                          NULL, PNX_SYS_ERR);
    return (-1);
}

PnetXGlobal->vc_table = memset(PnetXGlobal->vc_table, 0,
                               (sizeof(struct vc_tab) * max_vcs));

if ((PnetXGlobal->counters == NULL) ||
    (PnetXGlobal->ctr_vc_link == NULL) ||
    (PnetXGlobal->vc_table == NULL))
{
    pnx_ERR__report_error(JUST_HVX, LOG_ERR, (PNXINIT + 6),
                          NULL, PNX_SYS_ERR);
    return (-1);
} if (!PnetXGlobal->x25listen_on)
{
    /* start listening for incoming VCs */
    if (pnx_x25_listen_on() != 0)
    {
        PnetXGlobal->x25listen_on = 0;
    }
    else
    {
        PnetXGlobal->x25listen_on = 1;    /* listen only once */
    }
};

snsap_ptr = PnetXGlobal->snsap_tbl;
```

C48

```
        while (snsap_ptr)
        {
            if (!snsap_ptr->sn_rem)
                /* do only for local SNSAPs */
            {
                if (snsap_ptr->sn_x25ok)
                {
                    /* check status of the link */
                    status = x25_link_query(&PnetXGlobal->cb_link_name);
                    switch (status)
                    {
                    case X25_LINK_DISCONNECTED:
                        link_status = "Disconnected";
                        snsap_ptr->sn_x25ok = 0;
                        PnetXGlobal->x25_active = 0;
                        break;
                    case X25_LINK_CONNECTING:
                        link_status = "Connecting";
                        snsap_ptr->sn_x25ok = 0;
                        PnetXGlobal->x25_active = 0;
                        break;
                    case X25_LINK_CONNECTED:
                        link_status = "Connected";
                        snsap_ptr->sn_x25ok = 1;
                        if (PnetXGlobal->x25listen_on)
                        {
                            PnetXGlobal->x25_active = 1;
                        }
                        break;
                    default:
                        pnx_ERR__report_error(JUST_HVX, LOG_ERR, PNXINIT + 9,
                                    snsap_ptr->sn_name, PNX_SYS_ERR);
                        return (-1);
                        break;
                    }                   /* end switch */ syslog(LOG_INFO, "I260: PNetX: Link %s is %s",
                        &snsap_ptr->sn_lsap[1], link_status);

}                       /* end if - pnx_port_init() */

/* If listen has not been turned ON, make all local snsap's as
                 * not ok */
                if (!PnetXGlobal->x25listen_on)
                {
                    snsap_ptr->sn_x25ok = 0;
                }
                /* SAP Up or Down GATER must be issued */
                /* Allocate PVCs */ if (snsap_ptr->sn_x25ok)
                {
                    if (pnx_pvc_alloc(snsap_ptr) != 0)
                    {
                        return (-1);
                    }                   /* end if */
                } snsap_ptr->sn_sndinfo = 1;
                PnetXGlobal->sapinfo_cnt++;
            }                           /* end if - local snsap */
            snsap_ptr = snsap_ptr->sn_nxt;
        }                               /* end while - snsap_ptr */
    if (PnetXGlobal->x25_active)
    {
        PnetXGlobal->x25_initing = 0;
    }
ifdef PNXDEBUG
    syslog(LOG_DEBUG, "exit pnx_x25_init");
#endif
    return (0);
}                                       /* end pnx_x25_init */
```

C49

```
/****************
* pnx_port_init *
****************/

/* this function initializes the X.25 API for a given SNSAP.  The SNSAP is
 * defined by the HVS NW_CONFIG HVX25 directive, which maps to an X.25
 * Co-Processor board. */
int
pnx_port_init(struct snsap * snsap_ptr)
{
    int             status;
#ifdef PNXDEBUG
    syslog(LOG_DEBUG, "pnx_port_init: %s", &snsap_ptr->sn_lsap[1]);
#endif
    PnetXGlobal->cb_link_name.flags = X25FLG_LINK_NAME;
    PnetXGlobal->cb_link_name.link_name = &(snsap_ptr->sn_lsap[1]);

status = x25_init(&PnetXGlobal->cb_link_name);

if (status)
    {
        pnx_ERR__report_error(JUST_HVX, LOG_ERR, PNXINIT + 7,
                              snsap_ptr->sn_name, PNX_API);
        return (-1);
    }
    syslog(LOG_INFO, "I263: X.25 port %s initialized successfully",
           &snsap_ptr->sn_lsap[1]);
    snsap_ptr->sn_x25ok = 1;
#ifdef PNXDEBUG
    syslog(LOG_DEBUG, "exit pnx_port_init");
endif return (0);
}                                   /* end pnx_port_init */

/********************
* pnx_x25_listen_on *
********************/

/* This function starts the X.25 API listening process for the HVX routing
 * table entry (from the PATH= argument of the clm_bosx X25 directive;
 * default is "HVX"). */
int
pnx_x25_listen_on(void)
{
    struct vccb     *vccb_ptr;
    int             CounterID;
    int             status;
    struct RCT      *our_rct;
#ifdef PNXDEBUG
    syslog(LOG_DEBUG, "pnx_x25_listen_on");
endif /* get a VCCB for the listening process */
    if (pnx_MVC__make_vccb(&vccb_ptr, NULL) != 0)
    {
        return (-1);
    }
    vccb_ptr->listen = 1;

our_rct = (struct RCT *) opt.forkx25;

if ((CounterID = x25_ctr_get()) < 0)
    {
        pnx_ERR__report_error(JUST_HVX, LOG_ERR, PNXINIT + 10,
                              our_rct->qaddr.filename, PNX_API);
        pnx_RVC__release_vccb(vccb_ptr);
        return (-1);
    } vccb_ptr->counter = CounterID;
    status = x25_listen(PnetXGlobal->pnx_route, CounterID);
    if (status < 0)
```

C50

```
        {
            pnx_ERR__report_error(JUST_HVX, LOG_ERR, PNXINIT + 11,
                                    our_rct->qaddr.filename, PNX_API);
            pnx_RVC__release_vccb(vccb_ptr);
            return (-1);
        } vccb_ptr->conn_id = status;

add_to_array(vccb_ptr);
#ifdef PNXDEBUG
        syslog(LOG_DEBUG, "exit pnx_x25_listen_on");
#endif
        return (0);
}                                       /* end pnx_x25_listen_on */

/****************
 * pnx_pvc_alloc *
 ****************/

/* For each logical channel number in SNSAP, this function gets memory for a
 * VCCB, initializes it and allocates a permanent virtual circuit (PVC) for
 * it. */ int
pnx_pvc_alloc(struct snsap * snsap_ptr)
{
    struct vccb         *vccb_ptr;
    struct cb_pvc_alloc_struct cb_pvc;
    int                 CounterID;
    int                 rc;
    short               lcn;

#ifdef PNXDEBUG
    syslog(LOG_DEBUG, "pnx_pvc_alloc");
endif if (!snsap_ptr->sn_pvc)
    {
#ifdef PNXDEBUG
        syslog(LOG_DEBUG, "exit pnx_pvc_alloc: NO PVCs");
#endif
        return (0);
    }                                   /* end if */ for (lcn = snsap_ptr->sn_lcnpl;
         lcn < (snsap_ptr->sn_lcnpl + snsap_ptr->sn_lcnpn); lcn++)
    {

/* get memory for VCCB */ vccb_ptr = (struct vccb *) malloc(sizeof(struct vccb));
        if (vccb_ptr == NULL)
        {
            pnx_ERR__report_error(JUST_HVX, LOG_ERR, PNXINIT + 17,
                                    NULL, PNX_SYS_ERR);
            return (-1);
        } vccb_ptr = memset(vccb_ptr, 0, sizeof(struct vccb));
        /* Queue this VCCB at the end of active VCCB queue */ pnx_QOT(&PnetXGlobal->active_q, (struct qh *) vccb_ptr);

if (pnx_allocate_vcid(vccb_ptr) != 0)
        {
            pnx_ERR__report_error(JUST_HVX, LOG_ERR, PNXINIT + 24,
                                    NULL, PNX_ERROR);
            free(vccb_ptr);
            return (-1);
        } vccb_ptr->vc_id = *(short *) VC_ID;
        vccb_ptr->vc_pvc = 1;
```

C51

```
        vccb_ptr->vc_state = VC_D1;
        vccb_ptr->vc_intx = VC_I1;
        vccb_ptr->vc_intr = VC_J1;
        vccb_ptr->vc_dsac = gtenbl;
        vccb_ptr->vc_lcn = lcn & 0x00FF;
        vccb_ptr->vc_lcgn = lcn & 0xFF00;

vccb_ptr->vc_type[0] = 'P';
        vccb_ptr->vc_type[1] = 'E';
        vccb_ptr->vc_type[2] = 'R';
        vccb_ptr->vc_type[3] = 'M';

vccb_ptr->vc_in_ac = *(short *) "IN";
        vccb_ptr->vc_init = 1;

/* Initialize VCCB from SNSAP table. */ vccb_ptr->vc_snsap = snsap_ptr;
        vccb_ptr->vc_wndx = snsap_ptr->sn_wndx;
        vccb_ptr->vc_wndr = snsap_ptr->sn_wndr;
        vccb_ptr->vc_pszx = snsap_ptr->sn_pszx;
        vccb_ptr->vc_pszr = snsap_ptr->sn_pszr;
        vccb_ptr->vc_thrx = snsap_ptr->sn_thrx;
        vccb_ptr->vc_thrr = snsap_ptr->sn_thrr;
        vccb_ptr->vc_pdux = 1 << vccb_ptr->vc_pszx;
        vccb_ptr->vc_pdur = 1 << vccb_ptr->vc_pszr;

if ((CounterID = x25_ctr_get()) < 0)
        {
            pnx_ERR__report_error(JUST_HVX, LOG_ERR, PNXINIT + 12,
                                  NULL, PNX_API);
            pnx_x25_errors(vccb_ptr);
            free(vccb_ptr);
            return (-1);

}                           /* end if */
        vccb_ptr->counter = CounterID;
        cb_pvc.flags = X25FLG_LINK_NAME | X25FLG_LCN;
        cb_pvc.link_name = &snsap_ptr->sn_lsap[1];
        cb_pvc.lcn = lcn;

vccb_ptr->conn_id = x25_pvc_alloc(&cb_pvc, CounterID);

if (vccb_ptr->conn_id < 0)
        {
            pnx_ERR__report_error(JUST_HVX, LOG_ERR, PNXINIT + 13,
                                  NULL, PNX_API);
            pnx_x25_errors(vccb_ptr);
            vccb_ptr->vc_state = VC_P1;
            pnx_RVC__release_vccb(vccb_ptr);
            continue;               /* continue for other lcn */

}                           /* end if */
        /* Increment vc count and set dsac state. */
        snsap_ptr->sn_numvc += 1;
        PnetXGlobal->num_vc++;
        add_to_array(vccb_ptr);
    }                               /* for loop */
#ifdef PNXDEBUG
    syslog(LOG_DEBUG, "exit pnx_pvc_alloc");
#endif
    return (0);
}                                   /* end pnx_pvc_alloc */

/**************
 * pnx_getattr *
 **************/

/* This function gets attributes of the X.25 board and stores them in the
 * SNSAP */ int
pnx_getattr(struct snsap * snsap_ptr)
```

C52

```
{
    short           attr;
    int             i, j, how_many;
    unsigned char   which;
    unsigned long   not_done, attr_flag = 0;
    short           power;
    char            x121addr[15];
    struct CuAt     *x25attributes;
    char            local_sap[80];
#ifdef PNXDEBUG
    syslog(LOG_DEBUG, "pnx_getattr %s", &snsap_ptr->sn_lsap[1]);
#endif
    for (i = 0; i < 15; i++)
    {
        x121addr[i] = '\0';
    }

/* Initialize odm before using it */ if (odm_initialize() == -1)
    {
        pnx_ERR__report_error(JUST_HVX, LOG_ERR, PNXINIT + 28,
                              NULL, PNX_SYS_ERR);
        return (-1);
    }                                   /* end if */

/* get list of x25 attributes in CuAt chain */ x25attributes = getattr(&snsap_ptr->sn_lsap[1], "\0", TRUE, &how_many);

if (x25attributes == NULL)
    {
        pnx_ERR__report_error(JUST_HVX, LOG_ERR, PNXINIT + 29,
                              NULL, PNX_SYS_ERR);
        return (-1);
    }                                   /* end if */
    /* Scan through the list of attributes received to get the value for the
     * required attributes */
    for (j = 0; j < how_many; j++)
    {
        sprintf(local_sap, "%-30s  %s\n", x25attributes->attribute, x25attributes->value);
        if (write(pnx_fd, local_sap, strlen(local_sap)) == -1)
        {
            pnx_ERR__report_error(JUST_HVX, LOG_ERR, PNXINIT + 32,
                                  NULL, PNX_SYS_ERR);
        } if (!strcmp(x25attributes->attribute, "pvc_channel"))
        {
            attr_flag |= PVC_CHANNEL;
            snsap_ptr->sn_lcnpi = atoi(x25attributes->value);
        }
        else
        if (!strcmp(x25attributes->attribute, "local_nua"))
        {
            attr_flag |= LOCAL_NUA;
            strcpy(x121addr, x25attributes->value);
            pnx_str_to_bin(snsap_ptr->sn_addr, x121addr, INCLD_SIZE);
        }
        else
        if (!strcmp(x25attributes->attribute, "num_of_pvcs"))
        {
            attr_flag |= NUM_OF_PVCS;
            snsap_ptr->sn_lcnpn = atoi(x25attributes->value);
        }
        else
        if (!strcmp(x25attributes->attribute, "in_svc"))
        {
            attr_flag |= IN_SVC;
            snsap_ptr->sn_lcnil = atoi(x25attributes->value);
        }
        else
        if (!strcmp(x25attributes->attribute, "num_in_svcs"))
        {
            attr_flag |= NUM_IN_SVCS;
            snsap_ptr->sn_lcnin = atoi(x25attributes->value);
```

C53

```
        }
        else
        if (!strcmp(x25attributes->attribute, "in_out_svc"))
        {
            attr_flag |= IN_OUT_SVC;
            snsap_ptr->sn_lcntl = atoi(x25attributes->value);
        }
        else
        if (!strcmp(x25attributes->attribute, "num_in_out_svc"))
        {
            attr_flag |= NUM_IN_OUT_SVC;
            snsap_ptr->sn_lcntn = atoi(x25attributes->value);
        }
        else
        if (!strcmp(x25attributes->attribute, "out_svc"))
        {
            attr_flag |= OUT_SVC;
            snsap_ptr->sn_lcnol = atoi(x25attributes->value);
        }
        else
        if (!strcmp(x25attributes->attribute, "num_out_svcs"))
        {
            attr_flag |= NUM_OUT_SVCS;
            snsap_ptr->sn_lcnon = atoi(x25attributes->value);
        }
        else
        if (!strcmp(x25attributes->attribute, "def_tx_through"))
        {
            attr_flag |= DEF_TX_THROUGH;
            snsap_ptr->sn_thrx = atoi(x25attributes->value);
        }
        else
        if (!strcmp(x25attributes->attribute, "def_rx_through"))
        {
            attr_flag |= DEF_RX_THROUGH;
            snsap_ptr->sn_thrr = atoi(x25attributes->value);
        }
        else
        if (!strcmp(x25attributes->attribute, "def_tx_pkt_size"))
        {
            attr_flag |= DEF_TX_PKT_SIZE;
            attr = atoi(x25attributes->value);
            for (i = 1, power = 0;
                i < attr;
                i = i << 1, power++)
            {                       /* INTENTIONAL EMPTY LOOP */
            }
            snsap_ptr->sn_pszx = power;
        }
        else
        if (!strcmp(x25attributes->attribute, "def_rx_pkt_size"))
        {
            attr_flag |= DEF_RX_PKT_SIZE;
            attr = atoi(x25attributes->value);
            for (i = 1, power = 0;
                i < attr;
                i = i << 1, power++)
            {                       /* INTENTIONAL EMPTY LOOP */
            }
            snsap_ptr->sn_pszr = power;
        }
        else
        if (!strcmp(x25attributes->attribute, "def_tx_pkt_win"))
        {
            attr_flag |= DEF_TX_PKT_WIN;
            snsap_ptr->sn_wndx = atoi(x25attributes->value);
        }
        else
        if (!strcmp(x25attributes->attribute, "def_rx_pkt_win"))
        {
            attr_flag |= DEF_RX_PKT_WIN;
            snsap_ptr->sn_wndr = atoi(x25attributes->value);
        }
        else
        if (!strcmp(x25attributes->attribute, "ccitt_support"))
        {
            attr_flag |= CCITT_SUPPORT;
```

C54

```
            snsap_ptr->sn_ver = atoi(x25attributes->value);
        }
        else
        if (!strcmp(x25attributes->attribute, "rev_charging"))
        {
            attr_flag |= REV_CHARGING;
            snsap_ptr->sn_rca = atoi(x25attributes->value);
        }
        else
        if (!strcmp(x25attributes->attribute, "fast_select"))
        {
            attr_flag |= FAST_SELECT;
            snsap_ptr->sn_fsa = atoi(x25attributes->value);
        }
        else
        if (!strcmp(x25attributes->attribute, "f_window"))
        {
            attr_flag |= F_WINDOW;
            snsap_ptr->sn_flcng = atoi(x25attributes->value);
        }
        else
        if (!strcmp(x25attributes->attribute, "f_throughput"))
        {
            attr_flag |= F_THROUGHPUT;
            snsap_ptr->sn_thrng = atoi(x25attributes->value);
        }
        else
        if (!strcmp(x25attributes->attribute, "calls_in"))
        {
            attr_flag |= CALLS_IN;
            snsap_ptr->sn_icb = !(atoi(x25attributes->value));
        }
        else
        if (!strcmp(x25attributes->attribute, "calls_out"))
        {
            attr_flag |= CALLS_OUT;
            snsap_ptr->sn_ocb = !(atoi(x25attributes->value));
        }
        else
        if (!strcmp(x25attributes->attribute, "zero_address"))
        {
            attr_flag |= ZERO_ADDRESS;
            snsap_ptr->sn_nca = !(atoi(x25attributes->value));
        }
        else
        if (!strcmp(x25attributes->attribute, "cug"))
        {
            attr_flag |= CUG;
            if (atoi(x25attributes->value))
            {
                snsap_ptr->sn_cug = 1;
            }
        }
        else
        if (!strcmp(x25attributes->attribute, "network_id"))
        {
            attr_flag |= NETWORK_ID;
            attr = atoi(x25attributes->value);
            if (attr == 1)
                snsap_ptr->sn_ntw = SN_DTXP;
            if (attr == 2)
                snsap_ptr->sn_ntw = SN_DATP;
            if (attr == 3)
                snsap_ptr->sn_ntw = SN_TELN;
            if (attr == 4 || attr == 5)
                snsap_ptr->sn_ntw = SN_PDNX;
            else
                snsap_ptr->sn_ntw = SN_HDSA;
        }
        x25attributes++;
    }                           /* for loop */
    not_done = TOTAL_ATTR;
    if (attr_flag != TOTAL_ATTR)
    {
        syslog(LOG_INFO, "I331: pnx_get_attr: All Attributes for sansap %s NOT found",
            &snsap_ptr->sn_lsap[1]);
```

13

C55

```
        which = 1;
        while (not_done)
        {
            if (!(attr_flag & 0x00000001))
            {
                pnx_ERR__report_error(JUST_HVX, LOG_ERR, PNXINIT + 27,
                                &which, PNX_GET_ATTR_ERR);
            }                       /* end if */
            attr_flag = attr_flag >> 1;
            not_done = not_done >> 1;
            which++;
        }                           /* while */
    }                               /* end if */ snsap_ptr->sn_pvc = snsap_ptr->sn_lcnpn ? 1 : 0;

if (odm_terminate() == -1)
    {
        pnx_ERR__report_error(JUST_HVX, LOG_ERR, PNXINIT + 30,
                        NULL, PNX_SYS_ERR);
    }                               /* end if */ ifdef PNXDEBUG
    dumphex(snsap_ptr, sizeof(struct snsap));
#endif
    return (0);
}                                   /* end - pnx_getattr */

/***************
 * pnx_cleanup *
 ***************/

/* This funtion is called when SIGUSR2 signal is received by PnetX process
 * All the resources are cleaned up and the process exits */ void
pnx_cleanup()
{
    struct vccb         *vccb_ptr;
    struct snsap        *snsap_ptr;
    struct cb_msg_struct cb_msg;
    struct cb_clear_struct cb_clear;
    struct cb_res_struct cb_res;
    int                 rc;
    struct shmid_ds     *shm_buf;

#ifdef PNXDEBUG
    syslog(LOG_DEBUG, "pnx_clean up");
#endif
    syslog(LOG_INFO, "I272: PNetX going down.");

/* Check if x25 is active */
    if (PnetXGlobal->x25_active)
    {
        /* set flags/fields for clear packets to be sent */
        cb_clear.flags = X25FLG_CAUSE | X25FLG_DIAGNOSTIC;
        cb_clear.cause = 0;
        cb_clear.diagnostic = d_dte_su; /* Remote SAP unavailable */
/* Check for all the active VCCBs and clear/deafen their connection/listen IDs */ vccb_ptr = (struct vccb *) PnetXGlobal->active_q.next;
        while (vccb_ptr != (struct vccb *) & PnetXGlobal->active_q)
        {
            /* Clean up all pending packets on X25 Board */ while (!x25_receive(&(vccb_ptr->conn_id), &cb_msg));        /* intentional NULL loo
p */ if (vccb_ptr->listen)
            {
                rc = x25_deafen(vccb_ptr->conn_id);
                if (rc < 0)
                {
                    pnx_ERR__report_error(JUST_HVX, LOG_ERR, (PNXINIT - 20),
```

C56

```
                                            NULL, PNX_API);
                    }
                    else
                    {
#ifdef PNXDEBUG
                        syslog(LOG_DEBUG, "Listen id Deafened : %d",
                            vccb_ptr->conn_id);
#endif
                    }
                }
                else
                if (vccb_ptr->vc_pvc)
                {

/* Send a reset with cause to remote end of pvc before
                     * pvc_free */ cb_res.flags = X25FLG_CAUSE | X25FLG_DIAGNOSTIC;
                    cb_res.cause = RS_DTE;
                    cb_res.diagnostic = d_dte_dx;
                    rc = x25_reset(vccb_ptr->conn_id, &cb_res);
                    if (rc < 0)
                    {
                        pnx_ERR__report_error(JUST_HVX, LOG_ERR, (PNXINIT + 26),
                                    NULL, PNX_API);
                    }
                    else
                    {
#ifdef PNXDEBUG
                        syslog(LOG_DEBUG, "Reset Sent : %d", vccb_ptr->conn_id);
#endif
                    } rc = x25_pvc_free(vccb_ptr->conn_id);
                    if (rc < 0)
                    {
                        pnx_ERR__report_error(JUST_HVX, LOG_ERR, (PNXINIT + 21),
                                    NULL, PNX_API);
                    }
                    else
                    {
#ifdef PNXDEBUG
                        syslog(LOG_DEBUG, "PVC Cleared : %d", vccb_ptr->conn_id);
#endif
                    }
                }
                else
                {
                    rc = x25_call_clear(vccb_ptr->conn_id, &cb_clear, NULL);
                    if (rc < 0)
                    {
                        pnx_ERR__report_error(JUST_HVX, LOG_ERR, (PNXINIT + 25),
                                    NULL, PNX_API);
                    }
                    else
                    {
#ifdef PNXDEBUG
                        syslog(LOG_DEBUG, "Call Cleared : %d", vccb_ptr->conn_id);
#endif
                    }                       /* endif */
                }
                rc = x25_ctr_remove(vccb_ptr->counter);
                if (rc < 0)
                {
                    pnx_ERR__report_error(JUST_HVX, LOG_ERR, (PNXINIT + 22),
                                NULL, PNX_API);
                }
                else
                {
#ifdef PNXDEBUG
                    syslog(LOG_DEBUG, "Counter Removed %d ", vccb_ptr->counter);
#endif
                }                           /* endif */
                vccb_ptr = (struct vccb *) vccb_ptr->links.next;
            }                               /* end while (vccb loop) */
```

15

C57

```
        /* now loop through SNSAPs, terminating X.25 API for each local */
        snsap_ptr = PnetXGlobal->snsap_tbl;
        while (snsap_ptr)
        {
            if (snsap_ptr->sn_rem)
            {
#ifdef PNXDEBUG
                syslog(LOG_DEBUG, "pnx_cleanup - skipping RSNSAP %s",
                        &snsap_ptr->sn_name[1]);
#endif
            }
            else
            {
                PnetXGlobal->cb_link_name.flags = X25FLG_LINK_NAME;
                PnetXGlobal->cb_link_name.link_name = &snsap_ptr->sn_lsap[1];
                rc = x25_term(&PnetXGlobal->cb_link_name);
                if (rc < 0)
                {
                    pnx_ERR__report_error(JUST_HVX, LOG_ERR, (PNXINIT + 23),
                                    NULL, PNX_API);
                }
                else
                {
                    syslog(LOG_INFO, "I279: Link Terminated : %s",
                            PnetXGlobal->cb_link_name.link_name);
                }                       /* endif */
            }
            snsap_ptr = snsap_ptr->sn_nxt;
        }                               /* end while (snsap loop) */
    }

/* get rid of the PNetX trace shared memory! */
    if (shmdt(TRACE_SHMDADDR))
    {
        syslog(LOG_ERR, "E452: PNetX: unable to detach shared memory - %m");
    }
    PnetXGlobal->pnx_shm_ok = 0;
    if (shmctl(TraceShmid, IPC_RMID, shm_buf))
    {
        syslog(LOG_ERR, "E453: PNetX: unable to remove shared memory - %m");
    } exit(0);
}
```

C58

```
/*
 * Name:       pnx_mem.c
 * Purpose:    This module contains functions that allocate and
 *             free the memory used for PNetX data structures.
 * Functions in this module:
 *     (see pnx_func.h for prototype declarations)
 *
 * void           pnx_rtrn_x25_mem()
 * void           pnx_free_cb_fac()
 * void           pnx_free_cb_call()
 * void           pnx_free_cb_clear()
 * int            pnx_RVC__release_vccb()
 * int            pnx_make_snsap()
 * int            pnx_MVC__make_vccb()
 */ include "sys_head.h"
include "emu_head.h"

#include <x25sdefs.h>
include "pnx_head.h"
include "pnx_vccb.h"
#include "pnx_snsap.h"
#include "pnx_hvx25.h"
#include "hvx_lme.h"

extern char    *base;

extern struct pnx_global *PnetXGlobal;

/********************
 * pnx_rtrn_x25_mem *
 ********************/

/* This function returns all buffers passed to PNetX by the x25_receive() or
  * x25_call_clear() function, based upon the packet type received.
  *
  * Here we simply walk through the structures returned from the X.25 API,
  * returning memory for any non-NULL pointers.  We do not check the
  * structure flag words.  This is to allow PNetX to save any buffers it
  * wishes for as long as they are needed.  When a buffer is to be retained,
  * make certain that the pointer within cb_msg is NULLed out! */ void
pnx_rtrn_x25_mem(struct vccb * vccb_ptr)
{
    struct cb_call_struct *cb_call;
    struct cb_fac_struct *cb_fac;
    struct cb_clear_struct *cb_clear;
    struct cb_msg_struct *cb_msg;
#ifdef PNXDEBUG
    syslog(LOG_DEBUG, "pnx_rtrn_x25_mem");
#endif
    cb_msg = &vccb_ptr->cb_msg;

switch (cb_msg->msg_type)
    {
    case (X25_INCOMING_CALL):
    case (X25_CALL_CONNECTED):
        if (cb_call = cb_msg->msg_point.cb_call)
        {
            pnx_free_cb_call(cb_call);
            cb_msg->msg_point.cb_call = NULL;
        }
        break;

case (X25_DATA):
        if (cb_msg->msg_point.cb_data)
        {
            if (cb_msg->msg_point.cb_data->data)
                free(cb_msg->msg_point.cb_data->data);
            free(cb_msg->msg_point.cb_data);
            cb_msg->msg_point.cb_data = NULL;
        }
```

```
            break;

case (X25_INTERRUPT):
        if (cb_msg->msg_point.cb_int)
        {
            if (cb_msg->msg_point.cb_int->int_data)
                free(cb_msg->msg_point.cb_int->int_data);
            free(cb_msg->msg_point.cb_int);
            cb_msg->msg_point.cb_int = NULL;
        }
        break;

case (X25_CLEAR_INDICATION):
    case (X25_CLEAR_CONFIRM):
        if (cb_clear = cb_msg->msg_point.cb_clear)
        {
            pnx_free_cb_clear(cb_clear);
            cb_msg->msg_point.cb_clear = NULL;
        }
        break;

case (X25_RESET_INDICATION):
        if (cb_msg->msg_point.cb_res)
        {
            free(cb_msg->msg_point.cb_res);
            cb_msg->msg_point.cb_res = NULL;
        }
        break;

/* Reset message type to -1 so we don't try to return something that
         * doesn't exist. */
        cb_msg->msg_type = -1;
    }
ifdef PNXDEBUG
    syslog(LOG_DEBUG, "exit pnx_rtrn_x25_mem");
#endif
    return;
}                                       /* end - pnx_rtrn_x25_mem */

/*******************
 * pnx_free_cb_fac *
 *******************/

/* This function returns the buffers of the X.25 API cb_fac_struct */ void
pnx_free_cb_fac(struct cb_fac_struct * cb_fac)
{
#ifdef PNXDEBUG
    syslog(LOG_DEBUG, "pnx_free_cb_fac");
endif if (cb_fac->fac_ext)
        free(cb_fac->fac_ext);
    if (cb_fac->rpoa_id)
        free(cb_fac->rpoa_id);
    if (cb_fac->nui_data)
        free(cb_fac->nui_data);
    if (cb_fac->ci_seg_cnt)
        free(cb_fac->ci_seg_cnt);
    if (cb_fac->ci_mon_unt)
        free(cb_fac->ci_mon_unt);
    if (cb_fac->ci_call_dur)
        free(cb_fac->ci_call_dur);
    free(cb_fac);
#ifdef PNXDEBUG
    syslog(LOG_DEBUG, "exit pnx_free_cd_fac");
endif return;
}                                       /* end pnx_free_cb_fac() */
/********************
 * pnx_free_cb_call *
 ********************/
```

C60

```
/* This function returns the buffers of the X.25 API cb_call_struct */ void
pnx_free_cb_call(struct cb_call_struct * cb_call)
{
#ifdef PNXDEBUG
    syslog(LOG_DEBUG, "pnx_free_cb_call");
#endif
    if (cb_call->link_name)
        free(cb_call->link_name);
    if (cb_call->called_addr)
        free(cb_call->called_addr);
    if (cb_call->calling_addr)
        free(cb_call->calling_addr);
    if (cb_call->user_data)
        free(cb_call->user_data);
    if (cb_call->cb_fac)
        pnx_free_cb_fac(cb_call->cb_fac);
    free(cb_call);
#ifdef PNXDEBUG
    syslog(LOG_DEBUG, "exit pnx_free_cb_call");
#endif
    return;
}                                       /* end pnx_free_cb_call */

/*********************
* pnx_free_cb_clear *
*******************/

/* This function returns the buffers of the X.25 API cb_clear_struct */ void
pnx_free_cb_clear(struct cb_clear_struct * cb_clear)
{
#ifdef PNXDEBUG
    syslog(LOG_DEBUG, "pnx_free_cb_clear");
#endif
    if (cb_clear->called_addr)
        free(cb_clear->called_addr);
    if (cb_clear->calling_addr)
        free(cb_clear->calling_addr);
    if (cb_clear->user_data)
        free(cb_clear->user_data);
    if (cb_clear->cb_fac)
        pnx_free_cb_fac(cb_clear->cb_fac);
    free(cb_clear);
#ifdef PNXDEBUG
    syslog(LOG_DEBUG, "exit pnx_free_cb_clear");
endif return;
}                                       /* end pnx_free_cb_clear */

/************************
* pnx_RVC__release_vccb *
***********************/

/* This routine frees the VCCB buffer if: */
/* - the associated logical channel is ready (P1). */
/* - The wait for disconnect confirm indicator is not set. */
/* - The wait for connect confirm indicator is not set. */
/* It also frees the VC ID used for Gate Manager requests */ int
pnx_RVC__release_vccb(struct vccb * vccb_ptr)
{
#ifdef PNXDEBUG
    syslog(LOG_DEBUG, "pnx_RVC");
endif if (vccb_ptr->vc_wfdr == 0 &&
        vccb_ptr->vc_wfcr == 0 &&
        vccb_ptr->vc_state == VC_P1 &&
        vccb_ptr->vc_ublks == 0)
```

C61

```
    {
        pnx_DEQ(&PnetXGlobal->active_q, (struct qh *) vccb_ptr);
        vccb_ptr->vc_snsap = NULL;

vccb_ptr->vc_rssap = NULL;
        if (vccb_ptr->vc_cgsa)
        {
            free(vccb_ptr->vc_cgsa);
        } if (vccb_ptr->vc_cdsa)
        {
            free(vccb_ptr->vc_cdsa);
        } if (vccb_ptr->vc_udf)
        {
            free(vccb_ptr->vc_udf);
        } if (vccb_ptr->cb_call != NULL)
        {
            pnx_free_cb_call(vccb_ptr->cb_call);
        } if (vccb_ptr->cb_clear != NULL)
        {
            pnx_free_cb_clear(vccb_ptr->cb_clear);
        } pnx_rtrn_x25_mem(vccb_ptr);

pnx_free_vcid(vccb_ptr);
        free(vccb_ptr);
        PnetXGlobal->num_vc--;
    }                                    /* end if   */
#ifdef PNXDEBUG
    syslog(LOG_DEBUG, "exit pnx_RVC");
#endif
}                                        /* end pnx_RVC_release_vccb */

/*****************
 * pnx_make_snsap *
 *****************/

/* This function gets memory for the SNSAP structure and initializes it from
 * the HVX25 struct and X.25 configured attributes */ struct snsap      *
pnx_make_snsap(struct hvx25 * hvx25_ptr)
{
    struct snsap      *snsap_ptr;
    int               i;
#ifdef PNXDEBUG
    syslog(LOG_DEBUG, "pnx_make_snsap");
#endif
    snsap_ptr = (struct snsap *) malloc(sizeof(struct snsap));
    if (snsap_ptr == NULL)
    {
        pnx_ERR_report_error(JUST_HVX, LOG_ERR, PNXMEM + 5,
                             NULL, PNX_SYS_ERR);
        return (NULL);
    }
    snsap_ptr = memset(snsap_ptr, 0, sizeof(struct snsap));
    snsap_ptr->sn_id = hvx25_ptr->hv_id;          /* memory marker */
    memcpy(snsap_ptr->sn_name, hvx25_ptr->hv_name, 9);
    for (i = 0; i < 9; i++)
    {
        if (isupper(hvx25_ptr->hv_lsap[i]))
        {
            snsap_ptr->sn_lsap[i] = (hvx25_ptr->hv_lsap[i] + 0x20);
        }
        else
        if (isspace(hvx25_ptr->hv_lsap[i]))
        {
```

```
                snsap_ptr->sn_lsap[i] = '\0';
                break;
            }
            else
            {
                snsap_ptr->sn_lsap[i] = hvx25_ptr->hv_lsap[i];
            }
        }
        snsap_ptr->sn_lsap[10] = '\0'; /* null terminate string */
        snsap_ptr->sn_dsac = hvx25_ptr->hv_dsac;
        memcpy(snsap_ptr->sn_type, hvx25_ptr->hv_type, 4);
        memcpy(snsap_ptr->sn_venu, hvx25_ptr->hv_venu, 2);
        memcpy(snsap_ptr->sn_addr, hvx25_ptr->hv_addr, 9);

snsap_ptr->sn_maxvc = hvx25_ptr->hv_maxvc;
        snsap_ptr->sn_portl = hvx25_ptr->hv_portl;

snsap_ptr->sn_mylv = hvx25_ptr->hv_mylv;
        snsap_ptr->sn_myin = hvx25_ptr->hv_myin;
        snsap_ptr->sn_olv = hvx25_ptr->hv_olv;
        snsap_ptr->sn_oin = hvx25_ptr->hv_oin;
        if (hvx25_ptr->hv_flag & hv_rem)
        {
            /* RSNSAP case */
            snsap_ptr->sn_rem = 1;
        }
        else
        {
            /* RSNSAP case */
            snsap_ptr->sn_rem = 0;
        }
ifdef PNXDEBUG
        syslog(LOG_DEBUG, "exit pnx_make_snsap");
#endif
        return (snsap_ptr);

}                               /* end - pnx_make_snsap */

/*********************
 * pnx_MVC__make_vccb *
 *********************/

/* This routine gets memory for a new VCCB, initializes it from SNSAP data
 * and queues it in the queue of active VCCBs. If the SNSAP passed to this
 * function is NULL, this is a VCCB associated with the x25_listen. */ int
pnx_MVC__make_vccb(struct vccb ** vccb_adr, struct snsap * snsap_ptr)
{
    unsigned int    status, s_len;
    struct vccb     *vccb_ptr;
#ifdef PNXDEBUG
    syslog(LOG_DEBUG, "pnx_MVC");
endif vccb_ptr = (struct vccb *) malloc(sizeof(struct vccb));
    if (vccb_ptr == NULL)
    {
        syslog(LOG_ERR, "E454: PNetX: Unable to get %d malloc bytes - %m.",
               sizeof(struct vccb));
        return (-1);
    }
    vccb_ptr = memset(vccb_ptr, 0, sizeof(struct vccb));
    vccb_ptr->vc_id = *(short *) VC_ID;
    vccb_ptr->vc_state = VC_P1;

/* Initialize VCCB from SNSAP table.                              */ if (snsap_ptr)
    {
        vccb_ptr->vc_snsap = snsap_ptr;
        vccb_ptr->vc_wndx = snsap_ptr->sn_wndx;
        vccb_ptr->vc_wndr = snsap_ptr->sn_wndr;
        vccb_ptr->vc_pszx = snsap_ptr->sn_pszx;
        vccb_ptr->vc_pszr = snsap_ptr->sn_pszr;
        vccb_ptr->vc_thrx = snsap_ptr->sn_thrx;
        vccb_ptr->vc_thrr = snsap_ptr->sn_thrr;
```

C63

```
        vccb_ptr->vc_pdux = 1 << vccb_ptr->vc_pszx;
        vccb_ptr->vc_pdur = 1 << vccb_ptr->vc_pszr;

if (snsap_ptr->sn_ntw == SN_HDSA)
        {
            memcpy(&vccb_ptr->vc_type[0], (unsigned char *) "SX25", 4);
        }
        else
        {
            memcpy(&vccb_ptr->vc_type[0], (unsigned char *) "SW  ", 4);
        }                              /* end if - sn_ntw */
    }                                  /* endif - snsap_ptr */
    vccb_ptr->vc_dsac = gtenbl;
    vccb_ptr->counter = -1;

/* Prime msg_type for incoming X.25 packet, so that we don't mistakenly
     * try to return something that doesn't exist */
    vccb_ptr->cb_msg.msg_type = -1;

if (pnx_allocate_vcid(vccb_ptr) != 0)
    {
        free(vccb_ptr);
        return (-1);
    }

PnetXGlobal->num_vc++;

pnx_QOT(&PnetXGlobal->active_q, (struct qh *) vccb_ptr);
#ifdef PNXDEBUG
    syslog(LOG_DEBUG, "exit pnx_MVC");
#endif
    *vccb_adr = vccb_ptr;
    return (0);

}                                      /* end - pnx_MVC__make_vccb */
```

C64

```
/*
 *  Name:       pnx_misc.c
 *  Purpose:    miscellaneous pnetx subroutines
 *  Functions in this module:
 *      (see pnx_func.h for prototype declarations)
 *
 *  int         add_to_array()
 *  int         remove_from_array()
 *  void        pnx_replenish_phbs()
 *  char        *combine_udata()
 *  int         pnx_QOT()
 *  int         pnx_DEQ()
 *  int         pnx_post_request()
 *  int         pnx_ERR__report_error()
 *  int         pnx_bcd_to_short()
 *  int         pnx_short_to_bcd()
 *  int         pnx_str_to_bin()
 *  int         pnx_bin_to_str()
 *  int         pnx_get_vc_receive()
 *  struct PHD  *pnx_get_next_phb()
 *  void        pnx_start_clock()
 *  void        pnx_clock_tick()
 *  void        pnx_x25_errors()
 *  void        pnx_check_link()
 *  void        pnx_LDI__process_dis_ind()
 *  void        pnx_find_iorb()
 *  void        pnx_check_mqi_input()
 *  void        TRACE()
 *  void        TRACE_A()
 *  void        TRACE_ERR()
 *  void        TIME_STAMP()
 */ include "sys_head.h"
include "emu_head.h"
#include "err_head.h"
#include "macro.h"
#include "mqi_head.h"
#include "z3rct.h"
#include "z_rb.h"
#include "z3irb.h"

include <x25sdefs.h>
include "pnx_head.h"
include "pnx_vccb.h"
#include "hvx_phd.h"
#include "pnx_snsap.h"
#include "hvx_gater.h"
#include "hvx_lme.h"
#include "x25vce.h"
#include "x25nse.h"
#include "pnx_trace.h"

extern char         *base;

extern struct pnx_global *PnetXGlobal;
extern int          pnx_clock_running;

static union MATH math;

char                hextab[] =
{
 '0', '1', '2', '3', '4', '5', '6', '7',
 '8', '9', 'A', 'B', 'C', 'D', 'E', 'F'
};

char                *module_name[] =
{
"emu_x25",
"pnx_admin",
"pnx_gtin",
"pnx_gtout",
"pnx_misc",
"pnx_uwkup",
"pnx_x25in",
"pnx_x25out",
```

1

C65

```
    "pnx_xwkup",
    "pnx_vc_cmd",
    "pnx_inf",
    "pnx_init",
    "pnx_mem",
    "pnx_misc1",
    "pnx_misc2",
    "pnx_ns_cmd",
    "pnx_ump"
};

/*
** The following array and strings are used for printing X.25
** API related messages to syslog.
*/ const char      m_X25AUTH[] = "No permission to control link";
const char      m_X25BADID[] = "Invalid Connection Listen ID";
const char      m_X25CALLED[] = "Invalid Called Address";
const char      m_X25CALLING[] = "Invalid Calling Address";
const char      m_X25CTRUSE[] = "The counter has a non-zero value.";
const char      m_X25INIT[] = "X.25 already initialized for port";
const char      m_X25INVFAC[] = "Invalid facility requested";
const char      m_X25INVMON[] = "Invalid monitoring mode";
const char      m_X25LINKUSE[] = "X.25 port has active VCs";
const char      m_X25LONG[] = "Calling Parameter too long";
const char      m_X25NAMEUSED[] = "Routing List name in use";
const char      m_X25NOCARD[] = "No X.25 adapter";
const char      m_X25NOCTR[] = "No counters available.";
const char      m_X25NODATA[] = "No data on connection";
const char      m_X25NODEVICE[] = "No X.25 device driver";
const char      m_X25NOLINK[] = "X.25 port not connected";
const char      m_X25NONAME[] = "x25_listen name not in routing list";
const char      m_X25NOTPVC[] = "Requested PVC not configured";
const char      m_X25PROTOCOL[] = "X.25 protocol error";
const char      m_X25PVCUSED[] = "The PVC is being used";
const char      m_X25RESETCLEAR[] = "Reset or Clear received";
const char      m_X25TABLE[] = "Unable to update routing list";
const char      m_X25TIMEOUT[] = "Timeout occurred.";
const char      m_X25TOOMANYVCS[] = "Unable to open VC - maximum reached";
const char      m_X25AUTHCTR[] = "Not authorized to remove counter";
const char      m_X25AUTHLISTEN[] = "Not authorized to listen";
const char      m_X25BADCONNID[] = "Invalid Connection ID";
const char      m_X25BADDEVICE[] = "Invalid X.25 port name";
const char      m_X25BADLISTENID[] = "Invalid Listen ID";
const char      m_X25INVCTR[] = "Invalid Counter";
const char      m_X25LINKUP[] = "X.25 port already connected.";
const char      m_X25MAXDEVICE[] = "Attempt to use unconfigured X.25 port";
const char      m_X25MONITOR[] = "X.25 port already being monitored";
const char      m_X25NOACKREQ[] = "No X25 ACK required";
const char      m_X25NOSUCHLINK[] = "X.25 port does not exist";
const char      m_X25NOTINIT[] = "X.25 communications not initialized";
const char      m_X25TRUNCTX[] = "Packet size too big for internal buffers";
const char      m_X25SYSERR[] = "System error";
const char      m_NOMSG[] = "No Text";
const char      m_INVERR[] = "Unknown X.25 API error";

char            *x25_err_text[] =
{
    m_X25AUTH,                      /* (0)  */
    m_X25BADID,                     /* (1)  */
    m_X25CALLED,                    /* (2)  */
    m_X25CALLING,                   /* (3)  */
    m_NOMSG,                        /* X25CAUSE (4) */
    m_X25CTRUSE,                    /* (5)  */
    m_X25INIT,                      /* (6)  */
    m_X25INVFAC,                    /* (7)  */
    m_X25INVMON,                    /* (8)  */
    m_X25LINKUSE,                   /* (9)  */
    m_X25LONG,                      /* (10) */
    m_X25NAMEUSED,                  /* (11) */
    m_NOMSG,                        /* X25NOACK (12) */
    m_X25NOCARD,                    /* (13) */
    m_X25NOCTR,                     /* (14) */
    m_X25NODATA,                    /* (15) */
    m_X25NODEVICE,                  /* (16) */
```

C66

```
    m_NOMSG,                /* X25NOIPC (17) */
    m_X25NOLINK,            /* (18) */
    m_X25NONAME,            /* (19) */
    m_NOMSG,                /* X25NOROUTER (20) */
    m_X25NOTPVC,            /* (21) */
    m_NOMSG,                /* X25PGRP (22) */
    m_X25PROTOCOL,          /* (23) */
    m_X25PVCUSED,           /* (24) */
    m_NOMSG,                /* X25RECEIVERINIT (25) */
    m_X25RESETCLEAR,        /* (26) */
    m_NOMSG,                /* X25ROUTERINIT (27) */
    m_X25TABLE,             /* (28) */
    m_X25TIMEOUT,           /* (29) */
    m_NOMSG,                /* X25TRUNC (30) */
    m_NOMSG,                /* X25TOOBIG (31) */
    m_X25TOOMANYVCS,        /* (32) */
    m_NOMSG,                /* (33) */
    m_NOMSG,                /* (34) */
    m_NOMSG,                /* (35) */
    m_NOMSG,                /* (36) */
    m_NOMSG,                /* (37) */
    m_NOMSG,                /* (38) */
    m_NOMSG,                /* (39) */
    m_NOMSG,                /* (40) */
    m_NOMSG,                /* (41) */
    m_NOMSG,                /* (42) */
    m_NOMSG,                /* (43) */
    m_NOMSG,                /* (44) */
    m_NOMSG,                /* (45) */
    m_NOMSG,                /* (46) */
    m_NOMSG,                /* (47) */
    m_NOMSG,                /* (48) */
    m_NOMSG,                /* (49) */
    m_NOMSG,                /* (50) */
    m_X25AUTHCTR,           /* (51) */
    m_X25AUTHLISTEN,        /* (52) */
    m_X25BADCONNID,         /* (53) */
    m_X25BADDEVICE,         /* (54) */
    m_X25BADLISTENID,       /* (55) */
    m_X25INVCTR,            /* (56) */
    m_X25LINKUP,            /* (57) */
    m_NOMSG,                /* X25LONGCUD (58) */
    m_X25MAXDEVICE,         /* (59) */
    m_X25MONITOR,           /* (60) */
    m_X25NOACKREQ,          /* (61) */
    m_X25NOSUCHLINK,        /* (62) */
    m_X25NOTINIT,           /* (63) */
    m_NOMSG,                /* X25TRUNCRX (64) */
    m_X25TRUNCTX,           /* (65) */
    m_NOMSG,                /* X25BADSTATUS (66) */
    m_X25SYSERR,            /* (67) */
    m_INVERR                /* (68) */
};

char            *pnx_attr_err[] =
{
"",
"Attr \"local_nua\" not found",
"Attr \"pvc_channel\" not found",
"Attr \"num_of_pvcs\" not found",
"Attr \"in_svc\" not found",
"Attr \"num_in_svcs\" not found",
"Attr \"in_out_svc\" not found",
"Attr \"num_in_out_svc\" not found",
"Attr \"out_svc\" not found",
"Attr \"num_out_svcs\" not found",
"Attr \"def_tx_through\" not found",
"Attr \"def_rx_through\" not found",
"Attr \"def_tx_pkt_size\" not found",
"Attr \"def_rx_pkt_size\" not found",
"Attr \"def_tx_pkt_win\" not found",
"Attr \"def_rx_pkt_win\" not found",
"Attr \"ccitt_support\" not found",
"Attr \"revl_charging\" not found",
"Attr \"fast_select\" not found",
"Attr \"f_window\" not found",
"Attr \"f_throughput\" not found",
```

C67

```
    "Attr \"calls_in\" not found",
    "Attr \"calls_out\" not found",
    "Attr \"zero_address\" not found",
    "Attr \"cug\" not found",
    "Attr \"network_id\" not found"
};

struct trace_buffer *trace_tab;

/****************
 * add_to_array *
 ****************/

/* This function updates two separate arrays.  Its primary function is to
 * add a counter to the counter array required by the X25 API.  It also
 * updates the counter-to-VCCB array, which provides us with a link between
 * a counter ID returned by the x25_ctr_wait() function and its
 * corresponding VCCB.  The index must be the same in each array for any
 * given VCCB. */ int
add_to_array(struct vccb * VCCB)
{
    struct ctr_array_struct *t1;
    int             index;
#ifdef PNXDEBUG
    syslog(LOG_INFO, "I099: add_to_array, VC=%lX, ctr=0x%X", VCCB, VCCB->counter);
#endif
    if (VCCB->active_vc &&
        (VCCB->vc_urcvc <= 0))
    {
#ifdef PNXDEBUG
        syslog(LOG_INFO, "I100: add_to_array: no credit");
#endif
        return (remove_from_array(VCCB));
    } if (VCCB->in_ctr_wt == TRUE)
    {
#ifdef PNXDEBUG
        syslog(LOG_INFO, "I101: add_to_array: already in array");
#endif
        return (0);
    } if ((PnetXGlobal->num_ctrs)
        ==
        (PnetXGlobal->max_vcs + PnetXGlobal->num_ports))
    {
        /* more counters than allowed - report an error (maybe this should be
         * done when we get the counter ? */
#ifdef PNXDEBUG
        syslog(LOG_INFO, "I102: add_to_array: too many ctrs");
#endif
        return (-1);
    } index = PnetXGlobal->num_ctrs++;

/* update counter array */
    t1 = &(PnetXGlobal->counters->x25_ctrs[index]);
    t1->ctr_id = VCCB->counter;
    t1->ctr_value = 0;
    t1->flags = X25FLG_CTR_ID | X25FLG_CTR_VALUE;

/* update ctr to VC link */
    (PnetXGlobal->ctr_vc_link->vc[index]) = VCCB;

/* . . . and update index */
    VCCB->index = index;
    VCCB->in_ctr_wt = TRUE;
#ifdef PNXDEBUG
    syslog(LOG_INFO, "I103: After Add_to_array:counter array:");
    dumphex(PnetXGlobal->counters->x25_ctrs, 256);

syslog(LOG_INFO, "I104: exit add_to_array");
#endif
```

4

C68

```
    return (0);
}                                      /* end - add_to_array */

/*********************
 * remove_from_array *
 *********************/

/* This function updates the X25 API counter array for the specified VCCB.
  * It is called when we want to stop monitoring (either temporarily or
  * permanently) the VC or Listen ID associated with a counter.  Note that
  * this function DOES NOT remove the counter from the X25 API */ int
remove_from_array(struct vccb * VCCB)
{
    int                 index;
    struct ctr_array_struct *t1, *t2, *x25_ctrs;
    struct vccb        **ctr_vc_link;
#ifdef PNXDEBUG
    syslog(LOG_INFO, "I105: remove_from_array, VC=%lX, ctr=0x%X, index=0x%x",
           VCCB, VCCB->counter, VCCB->index);
#endif
    if (VCCB->in_ctr_wt == FALSE)
    {
#ifdef PNXDEBUG
        syslog(LOG_INFO, "I106: remove_from_array, not in array");
#endif
        return (0);
    } index = VCCB->index;
    x25_ctrs = PnetXGlobal->counters->x25_ctrs;
    ctr_vc_link = PnetXGlobal->ctr_vc_link->vc;

if (PnetXGlobal->num_ctrs <= index)
    {
        /* error - index greater than array size */
#ifdef PNXDEBUG
        syslog(LOG_INFO, "I107: remove_from_array: index error");
#endif
        return (-1);
    } if (x25_ctrs[index].ctr_id != VCCB->counter)
    {
#ifdef PNXDEBUG
        syslog(LOG_INFO, "I108: remove_from_array: counter mismatch");
#endif
        return (-1);
    }

VCCB->in_ctr_wt = FALSE;

if (--PnetXGlobal->num_ctrs == index)
    {
        x25_ctrs[index].flags = 0;
        x25_ctrs[index].ctr_id = 0;
        x25_ctrs[index].ctr_value = 0;
#ifdef PNXDEBUG
        syslog(LOG_INFO, "I109: remove_from_array (end):counter array:");
        dumphex(PnetXGlobal->counters->x25_ctrs, 256);
#endif
        /* removing last element from array - just return */
        return (0);
    }

/* move last array element into the spot being vacated. */
    /* first, X.25 counter arraay */ t1 = &(x25_ctrs[index]);
    t2 = &(x25_ctrs[PnetXGlobal->num_ctrs]);
    t1->flags = t2->flags;
    t1->ctr_id = t2->ctr_id;
    t1->ctr_value = t2->ctr_value;
    t2->flags = 0;
```

5

C69

```
    t2->ctr_id = 0;
    t2->ctr_value = 0;

/* now, ctr to VC link */
    ctr_vc_link[index] = ctr_vc_link[PnetXGlobal->num_ctrs];

/* fix array index value for the VCCB we moved */
    ctr_vc_link[index]->index = index;

#ifdef PNXDEBUG
    syslog(LOG_INFO, "I110: remove_from_array(middle):counter array:");
    dumphex(PnetXGlobal->counters->x25_ctrs, 256);

syslog(LOG_INFO, "I111: exit remove_from_array");
endif return (0);
}                               /* end - remove_from_array */

/*********************
* pnx_replenish_phbs *
*********************/ pnx_replenish_phbs(struct PHD * first_phb)
{
    struct PHD      *phb, *next_phb;
    int             i;
    ulong           next;
#ifdef PNXDEBUG
    syslog(LOG_INFO, "I112: pnx_replenish_phbs");
#endif
    /* count PHBs in the PHB chain from PNet and change links into RISC_ADDRs */
    phb = first_phb;
    while (phb)
    {
        PnetXGlobal->num_phb++;
        RISC_ADDR(next_phb, (struct PHD *), phb->ph_lnk);
        if (next_phb == (struct PHD *) base)
        {
            next_phb = NULL;
        }
        PUT4(phb->ph_lnk, (ulong) next_phb);
        phb = next_phb;
    }

/* get to end of our PHB chain and add the new PHBs */
    if (phb = PnetXGlobal->avail_phb)
    {
        while (*(ulong *) phb->ph_lnk)
        {
            GET4(next, phb->ph_lnk);
            phb = (struct PHD *) next;
        }
        PUT4(phb->ph_lnk, (ulong) first_phb);
    }
    else
    {
        PnetXGlobal->avail_phb = first_phb;
    } phb = PnetXGlobal->avail_phb;
    for (i = 1;
         i <= PnetXGlobal->num_phb;
         i++)
    {
        /* dumphex(phb, 16); */
        GET4(next, phb->ph_lnk);
        phb = (struct PHD *) next;
    }
ifdef PNXDEBUG
    syslog(LOG_INFO, "I113: exit pnx_replenish_phbs");
#endif
}
```

C70

```c
/***************
 * combine_udata *
 ***************/

/* This function is called when a Packet Header Block from PNet contains
     * data in both data fields (ph_ad1 & ph_ad2).  The data from both fields
     * must be combined into a single buffer for the X.25 API. */ char            *
combine_udata(struct PHD * phb)
{
    unsigned char   *new_buffer, *to;
    int             buf_len;
    unsigned char   *from;
#ifdef PNXDEBUG
    syslog(LOG_INFO, "I114: combine_udata");
#endif
    /* get an extra char for null terminator, just in case */
    buf_len = (phb->ph_rg1 & ph_ct1) + (phb->ph_rg2 & ph_ct2) + 1;
    if ((new_buffer = (unsigned char *) malloc(buf_len)) == NULL)
    {
        pnx_ERR__report_error(JUST_HVX, LOG_ERR, PNXMISC + 1,
                              NULL, PNX_SYS_ERR);
        return (NULL);
    }
    to = new_buffer;

RISC_ADDR(from, (unsigned char *), phb->ph_ad1);
    if (phb->ph_rg1 & ph_lr1)
    {
        from++;
    }
    memcpy(to, from, phb->ph_rg1 & ph_ct1);
    to = to + (phb->ph_rg1 & ph_ct1);

RISC_ADDR(from, (unsigned char *), phb->ph_ad2);
    if (phb->ph_rg2 & ph_lr2)
    {
        from++;
    }
    memcpy(to, from, phb->ph_rg2 & ph_ct2);

#ifdef PNXDEBUG
    syslog(LOG_INFO, "I115: exit pnx_combine_udata");
#endif
    return (new_buffer);
}                                       /* end combine_udata */

/**********
 * pnx_QOT *
 **********/

/* This function queues a data structure at the end of a chain.  To use this
     * function, the first element of the structure MUST be kof type 'qh'. */ int
pnx_QOT(struct qh * queue_head, struct qh * new)
{
#ifdef PNXDEBUG
    syslog(LOG_INFO, "I116: pnx_QOT");
#endif
    queue_head->prev->next = new;   /* old EOQ points to new element as next */
    new->prev = queue_head->prev;   /* new element's prev is old EOQ */
    queue_head->prev = new;         /* EOQ is now new element */
    new->next = queue_head;         /* new element's next is lock word */

}                                       /* end pnx_QOT */

/**********
 * pnx_DEQ *
 **********/
```

C71

```
/* This function dequeues a data structure from a specific queue */ int
pnx_DEQ(struct qh * queue_head, struct qh * element)
{
    struct qh       *curr;
#ifdef PNXDEBUG
    syslog(LOG_INFO, "I117: pnx_DEQ");
#endif
    curr = queue_head->next;

while (TRUE)
    {
        if (curr == element)
        {
            element->prev->next = element->next;
            element->next->prev = element->prev;
            element->prev = element->next = NULL;
            return (0);
        }
        if (curr == queue_head)
        {
            /* element not found on queue */
            return (-1);
        }
        curr = curr->next;
    }
}                                       /* end pnx_DEQ */

/********************
* pnx_post_request *
********************/ int
pnx_post_request(struct IRB * irb)
{
    struct RCT      *rct;
    struct RB       *iorb;
    struct GATER    *gater;
#ifdef PNXDEBUG
    syslog(LOG_INFO, "I118: pnx_post_request");
endif RISC_ADDR(iorb, (struct RB *), irb->i_rb);
    iorb = (struct RB *) ((char *) iorb - OFF_RB);
    if ((iorb->rb_ct2 & 0xF) == VC_RECEIVE)
    {
        /* Passing a GATERto Pnet.  TRACE it */

RISC_ADDR(gater, (struct GATER *), iorb->rb_adr);
        TRACE(GATER_OUT | COMPLETED, gater->gt_fnc, gater->gt_dlr, gater->gt_din,
            *(ulong *) gater->gt_sce, *(ulong *) gater->gt_dst, 0);
    } rct = PnetXGlobal->pnx_rct;
    io_exit(rct, irb, SUCCESS_CODE);

if ((iorb->rb_ct2 & 0xF) == VC_RECEIVE)
    {
        TRACE_A();
    } ifdef PNXDEBUG
    syslog(LOG_INFO, "I119: exit pnx_post_request");
#endif
}

/***********************
* pnx_ERR__report_error *
***********************/ int
```

C72

```
pnx_ERR__report_error(int pri, int sevr, int location,
                      unsigned char *p1, int reason_code)
{
    int             our_x25_errno;     /* for index into x25_err_text array */

TRACE_ERR(location, reason_code);

if (reason_code == PNX_GET_ATTR_ERR)
    {
        syslog(sevr, "PNetX Attr Err: %s:%d:%s", module_name[location / 100],
               location % 100, pnx_attr_err[*p1]);
    }

/* System Error, reported directly or via X.25 API -- This is ALWAYS
     * reported as LOG_ERR */
    else
        if ((reason_code == PNX_SYS_ERR) ||
            ((reason_code == PNX_API) && (x25_errno == X25SYSERR)))
    {
        syslog(LOG_ERR, "E455: PNetX Sys Error: %s:%d %d:%m",
               module_name[location / 100],
               location % 100, errno);
    }

/* X.25 API error -- This is ALWAYS reported as LOG_ERR */
    else
    if (reason_code == PNX_API)
    {
        if ((x25_errno > X25SYSERR) ||
            (x25_errno < X25ERRBASE))
        {
            our_x25_errno = (X25SYSERR + 1) - X25ERRBASE;
        }
        else
        {
            our_x25_errno = x25_errno - X25ERRBASE;
        }
        syslog(LOG_ERR, "E456: PNetX X25 Error: %s:%d %d:%s",
               module_name[location / 100],
               location % 100, x25_errno,
               x25_err_text[our_x25_errno]);
    }

/* Other errors */
    else
    {
        switch (sevr)
        {
        case LOG_NOTICE:
            syslog(LOG_NOTICE, "N048: PNetX Error: %s:%d %d",
                   module_name[location / 100],
                   location % 100, reason_code);
            break;

case LOG_WARNING:
            syslog(LOG_WARNING, "W104: PNetX Error: %s:%d %d",
                   module_name[location / 100],
                   location % 100, reason_code);
            break;

case LOG_DEBUG:
            syslog(LOG_DEBUG, "PNetX Error: %s:%d %d",
                   module_name[location / 100],
                   location % 100, reason_code);
            break;

case LOG_INFO:
            syslog(LOG_INFO, "I344: PNetX Error: %s:%d %d",
                   module_name[location / 100],
                   location % 100, reason_code);
            break;

case LOG_ERR:
        default:
            syslog(LOG_ERR, "E457: PNetX Error: %s:%d %d",
                   module_name[location / 100],
```

C73

```
                 location % 100, reason_code);
            break;

}
    } return (0);
}

/*******************
 * pnx_short_to_bcd *
 *******************/

/* This function converts a decimal number into a semi-octet (bcd) character
 * string. It also returns the size(bytes) of the converted string. */ int
pnx_short_to_bcd(char *bcd_str, short from, short *size)
{
    int             divider;
    short           pass, odd = 0;
#ifdef PNXDEBUG
    syslog(LOG_INFO, "I120: short_to_bcd");
#endif
    pass = 1;

if (from > 9999)
    {
        pnx_ERR__report_error(JUST_HVX, LOG_ERR, PNXMISC + 2,
                              NULL, PNX_ERROR);
        return;
    }
    else
    if (from > 999)
    {
        divider = 1000;
        *size = 2;
    }
    else
    if (from > 99)
    {
        odd = 1;
        divider = 100;
        *size = 2;
    }
    else
    if (from > 9)
    {
        *size = 1;
        divider = 10;
    }
    else
    {
        odd = 1;
        *size = 1;
        divider = 1;
    }
    while (divider > 0)
    {
        *bcd_str = (from / divider);
        from = from % divider;
        divider = divider / 10;

if (odd == 1 && pass == 1)
        {
            pass++;
            bcd_str++;
            continue;
        }                           /* end if */
        else
        {
            *bcd_str = *bcd_str << 4;
        }                           /* end else */

*bcd_str++ = *bcd_str + (from / divider);
```

```
                    from = from % divider;
                    divider = divider / 10;
            }                                    /* end while loop */
#ifdef PNXDEBUG
        syslog(LOG_INFO, "I121: exit pnx_short_to_bcd");
#endif
        return;
}                                           /* end - pnx_short_to_bcd */

/********************
*  pnx_bcd_to_short *
********************/

/* This function converts a BCD format short into a short */ int
pnx_bcd_to_short(short *to, unsigned char *from, int size)
{
        short            num;
#ifdef PNXDEBUG
        syslog(LOG_INFO, "I122: bcd_to_short");
#endif
        num = *from++;
        if (size == 2)
        {
                num = (num << 8) + *from;
        }
        *to = (((0xF000 & num) >> 12) * 1000) + (((0x0F00 & num) >> 8) * 100)
            + (((0x00F0 & num) >> 4) * 10) + (0x000F & num);
#ifdef PNXDEBUG
        syslog(LOG_INFO, "I123: exit pnx_bcd_to_short");
#endif
        return;
}                                           /* end - pnx_bcd_to_short */

/*****************
* pnx_str_to_bin *
*****************/

/* This function converts a string of numeric-characters into BCD form The
   * first octet stores the length of the string if the incl_size_flag is set. */
int
pnx_str_to_bin(unsigned char *to, unsigned char *from, int incl_size_flag)
{
        short            size;
        int              i;
#ifdef PNXDEBUG
        syslog(LOG_INFO, "I124: pnx_str_to_bin");
#endif
        if (incl_size_flag)
        {
                size = strlen(from);
                *to++ = size;
        }
        for (i = 0; i < size;)
        {
                *to = *from++ - '0';
                *to = *to << 4;
                i++;
                if (i < size)            /* to take care of odd length string */
                {
                        *to++ = *to | (*from++ - '0');
                }
                i++;
        }                                        /* end for loop */
#ifdef PNXDEBUG
        syslog(LOG_INFO, "I125: exit pnx_str_to_bin");
#endif
}                                           /* end pnx_str_to_bin */

/*****************
```

C75

```
* pnx_bin_to_str *
****************/

/* This function converts a string of semi-octet (BCD) numeric characters
 * into into a character string.  The size is taken from the first character
 * of the string. */
void
pnx_bin_to_str(unsigned char *to, unsigned char *from, int *size)
{
    int             i;
#ifdef PNXDEBUG
    syslog(LOG_INFO, "I126: pnx_bin_to_str");
#endif
    i = 0;
    *size = *from++;

for (i = 0; i < *size;)
    {
        *to++ = ((*from & 0xf0) >> 4) + '0';
        i++;
        if (i < *size)
            *to++ = (*from++ & 0x0f) + '0';
        i++;
    }                           /* for loop       */
    *to = '\0';
#ifdef PNXDEBUG
    syslog(LOG_INFO, "I127: exit pnx_bin_to_str");
endif }                               /* pnx_bin_to_str  */

/**********
 * dumphex *
 **********/

/* This is used for debugging.  It will dump, in hex, a structure passed to
 * it. */
int
dumphex(ushort * buffer, int size)
{
    char            outbuf[120];
    char            *op1, *op2;
    char            hex[6];
    ushort          i, b;
    char            c1, c2;
    syslog(LOG_INFO, "I128: pnx dumping structure at %lX:", (ulong) buffer);
    op1 = outbuf;
    op2 = &outbuf[45];
    *op1++ = 'p';
    *op1++ = 'n';
    *op1++ = 'x';
    *op1++ = ':';
    *op1++ = ' ';
    *op2++ = ' ';
    *op2++ = ' ';

size = (size + 1) / 2;
    for (i = 1; i <= size; i++)
    {
        b = *buffer++;
        *op1++ = hextab[(b >> 12)];
        *op1++ = hextab[((b & 0x0f00) >> 8)];
        *op1++ = hextab[((b & 0x00f0) >> 4)];
        *op1++ = hextab[(b & 0x000f)];
        *op1++ = ' ';
        c1 = b >> 8;
        if ((c1 < ' ') || (c1 > '~'))
        {
            *op2++ = '.';
        }
        else
        {
            *op2++ = c1;
```

C76

```
        }
        c2 = b & 0xff;
        if ((c2 < ' ') || (c2 > '~'))
        {
            *op2++ = '.';
        }
        else
        {
            *op2++ = c2;
        } if (!(i % 8))
        {
            *op2++ = '\0';

syslog(LOG_INFO, outbuf);
            op1 = outbuf;
            op2 = &outbuf[45];
            *op1++ = 'p';
            *op1++ = 'n';
            *op1++ = 'x';
            *op1++ = ':';
            *op1++ = ' ';
            *op2++ = ' ';
            *op2++ = ' ';
        }
    }
    if (i % 8)
    {
        while (op1 != &outbuf[45])
        {
            *op1++ = ' ';
        }
        *op2++ = '\0';
        syslog(LOG_INFO, outbuf);
    }
}                                       /* end - dumphex */

/**************************
 * pnx_get_next_vc_receive *
 **************************/

/* This is used to get the IRB & IORB associated with the next available VC
 * RECEIVE request from PNet.  Link words and counts are updated. */
int
pnx_get_next_vc_receive(struct IRB ** new_irb, struct RB ** new_iorb)

{
    struct IRB      *irb;
    struct RB       *iorb;
    int             i;

#ifdef PNXDEBUG
    syslog(LOG_INFO, "I131: pnx_get_next_vc_receive");
#endif
    irb = PnetXGlobal->vc_recv;
    i = 0;

/* If we are out of irb we make 5 attempts to get it from mqi input */
    while ((irb == NULL) && i++ < 5)
    {
        pnx_check_mqi_input();
        irb = PnetXGlobal->vc_recv;
        if (irb)                        /* we have got an irb */
        {
            break;
        }                               /* end if */
        sleep(1);
    } if (irb == NULL)
    {
        /* No VC RECEIVE - BIG problem! */
        pnx_ERR__report_error(JUST_HVX, LOG_ERR, PNXMISC + 3,
```

C77

```
                              NULL, PNX_ERROR);
        return (-1);
    }

/* update VC RECEIVE chain */
    *(ulong *) & PnetXGlobal->vc_recv = *(ulong *) irb->rqh.fwd;
    PUT4(irb->rqh.fwd, 0);

if (PnetXGlobal->num_vcrcv-- < PnetXGlobal->low_vcrcv)
    {
        PnetXGlobal->low_vcrcv = PnetXGlobal->num_vcrcv;
    }
    RISC_ADDR(iorb, (struct RB *), irb->i_rb);
    iorb = (struct RB *) ((char *) iorb - OFF_RB);

*new_irb = irb;
    *new_iorb = iorb;
    return (0);
}                                       /* end - pnx_get_next_vc_receive */

/************************
 * pnx_check_mqi_input *
 ***********************/

/* This function is called by pnx_get_next_vc_receive encounters irb = NULL.
 * This function checks mqi input for VC_RECEIVE iorbs, queues it to
 * PnetXGlobal vc_recv queue and dequeues it from mqi queue */ int
pnx_check_mqi_input()
{
    struct RCT       *rct;
    struct RB        *iorb;
    struct IRB       *irb;
    short            func;
    struct MQI       *qh;
    struct MQI_LINKS *mqi;
#ifdef PNXDEBUG
    syslog(LOG_INFO, "I132: pnx_check_mqi_input");
#endif
    rct = PnetXGlobal->pnx_rct;
    /* make sure MQI queue is non-null */
    qh = &rct->qaddr;
    lock(qh->isem.sid);
    GET4(math.adrs, qh->rqh.fwd);
    if (math.adrs == (unsigned long) qh)
    {
        /* empty queue */
        irb = NULL;
        unlock(qh->isem.sid);
ifdef PNXDEBUG
        syslog(LOG_INFO, "I133: pnx_check_mqi_input: Empty Queue ");
#endif
        return (-1);
    }                                   /* end if */
    pnx_find_iorb(qh, &mqi, VC_RECEIVE);
    while (mqi)
    {
#ifdef PNXDEBUG
        syslog(LOG_INFO, "I134: pnx_check iorb: Got IORB: %d", mqi);
#endif
        mqi_cancel(qh, mqi);
        irb = (struct IRB *) mqi;
        RISC_ADDR(iorb, (struct RB *), irb->i_rb);
        iorb = (struct RB *) ((char *) iorb - OFF_RB);
        func = iorb->rb_ct2 & 0xF;

/* double check if it is a VC_RECEIVE IORB */
        if (func == VC_RECEIVE)
        {
#ifdef PNXDEBUG
            syslog(LOG_INFO, "I135: pnx_check_mqi_input: IORB received");
#endif
            *(ulong *) & (irb->rqh.fwd) = *(ulong *) & (PnetXGlobal->vc_recv);
            PnetXGlobal->vc_recv = irb;
            PnetXGlobal->num_vcrcv++;
```

C78

```c
            /* Special case receive posting.  If anything is waiting for a VC
             * RECEIVE, post it now.  Currently, the following may be waiting
             * for a VC RECEIVE:
             *
             * SAP INFO GATER */
            if (PnetXGlobal->sapinfo_cnt)
            {
                pnx_sap_info();
            }                           /* end if */

/* VC receive iorb can now be dequeued from mqi queue */

}                               /* end if */
        pnx_find_iorb(qh, &mqi, VC_RECEIVE);
    }                                   /* end while */ unlock(qh->isem.sid);
ifdef PNXDEBUG
    syslog(LOG_INFO, "I136: pnx_check_mqi_input: unlocked");
#endif
    return (0);

}                                       /* pnx_check_mqi_input */

/*****************
 * pnx_find_iorb *
 *****************/

/* This function scans through the mqi input queue and finds the first
   required iorb .The iorb type is specified by io_func argument . This returned in rptr. If th
ere is no iorb of type io_func, NULL is returned in rptr */ void
pnx_find_iorb(struct MQI * qh, struct MQI_LINKS ** rptr, short io_func)
{
    struct MQI_LINKS *nxt;
    struct RB        *iorb;
    struct IRB       *irb;
    short            func;

#ifdef PNXDEBUG
    syslog(LOG_INFO, "I137: pnx_find_iorb");
#endif

GET4(math.adrs, qh->rqh.fwd);
    nxt = (struct MQI_LINKS *) math.adrs;
    while (1)
    {
        if (nxt == (struct MQI_LINKS *) qh)    /* exhausted or NULL queue */
        {
            *rptr = NULL;
#ifdef PNXDEBUG
            syslog(LOG_INFO, "I138: pnx_find_iorb: empty q or no IORB found");
#endif
            return;
        }                               /* end if */ irb = (struct IRB *) nxt;
        RISC_ADDR(iorb, (struct RB *), irb->i_rb);
        iorb = (struct RB *) ((char *) iorb - OFF_RB);
        func = iorb->rb_ct2 & 0xF;
        if (func == io_func)            /* we have found a VC_RECV IORB */
        {
#ifdef PNXDEBUG
            syslog(LOG_INFO, "I139: pnx_find_iorb: GOT IORB");
#endif
            *rptr = nxt;
            return;
        }                               /* end if */

/* Advance the pointer */
        GET4(math.adrs, nxt->fwd);
        nxt = (struct MQI_LINKS *) math.adrs;
    }                                   /* end while */
}                                       /* pnx_find_iorb */
```

C79

```
/******************
 * pnx_get_next_phb *
 ******************/

/* This is used to remove the next available Packet Header Block from the
  * PNetX global chain.  Link words and counts are updated. */
struct PHD       *
pnx_get_next_phb(void)
{
    struct PHD      *phb;

phb = PnetXGlobal->avail_phb;
    if (phb == NULL)
    {
        pnx_ERR__report_error(JUST_HVX, LOG_ERR, PNXMISC + 4,
                            NULL, PNX_ERROR);
        return (NULL);
    }
    *(ulong *) & PnetXGlobal->avail_phb = *(ulong *) & phb->ph_lnk;
    PUT4(phb->ph_lnk, 0);
    if (PnetXGlobal->num_phb-- < PnetXGlobal->low_phb)
    {
        PnetXGlobal->low_phb = PnetXGlobal->num_phb;
    }
    return (phb);
}                              /* end - pnx_get_next_phb */

/*****************
 * pnx_start_clock *
 *****************/

/* This function starts the PNetX clock ticking. */
void
pnx_start_clock()
{
#ifdef PNXDEBUG
    syslog(LOG_INFO, "I140: pnx_start_clock");
#endif
    if (!pnx_clock_running)
    {
        pnx_clock_running = 1;
        alarm(5);
    }
ifdef PNXDEBUG
    syslog(LOG_INFO, "I141: exit pnx_start_clock");
#endif
    return;
}                              /* end - pnx_start_clock */

/*****************
 * pnx_clock_tick *
 *****************/

/* This function handles the PNetX clock tick.  It checks for the
  * availability of any link connection previously reported as unavailable.
  * If the link connection is back up, a SAP up GATER is sent to the
  * connection layer. */
void
pnx_clock_tick()
{
    struct snsap     *snsap_ptr;
    struct vccb      *vccb_ptr;
    struct cb_pvc_alloc_struct cb_pvc;
    int              rc, CounterID;
    short            lcn, vc_lcn, vc_lcgn;

#ifdef PNXDEBUG
    syslog(LOG_INFO, "I323: pnx_clock_tick");
#endif
```

C80

```
    /* if clock has been turned off, do nothing */
    if (!pnx_clock_running)
    {
        return;
    } pnx_clock_running = 0;

/* If listen is not on turn on listening */
    if (!PnetXGlobal->x25listen_on)
    {
        /* start listening for incoming VCs */
        if (pnx_x25_listen_on() != 0)
        {
            PnetXGlobal->x25listen_on = 0;
        }
        else
        {
            PnetXGlobal->x25listen_on = 1;        /* listen only once */
        }
    } if (!PnetXGlobal->x25listen_on)
    {
        pnx_clock_running = 1;
        return;
    } snsap_ptr = PnetXGlobal->snsap_tbl;
    while (snsap_ptr)
    {
        if (!snsap_ptr->sn_rem &&
            !snsap_ptr->sn_x25ok)
        {
            /* check current status of link */
            PnetXGlobal->cb_link_name.flags = X25FLG_LINK_NAME;
            PnetXGlobal->cb_link_name.link_name = &(snsap_ptr->sn_lsap[1]);
            rc = x25_link_query(&PnetXGlobal->cb_link_name);
#ifdef PNXDEBUG
            syslog(LOG_INFO, "I324: port %s, rc=%d", &(snsap_ptr->sn_lsap[1]), rc);
#endif
            if (rc == X25_LINK_CONNECTED)
            {
                syslog(LOG_INFO, "I142: PNetX: Link %s Connected", PnetXGlobal->cb_link_name.li
nk_name);
                snsap_ptr->sn_x25ok = 1;
                snsap_ptr->sn_dsac = gtenbl;
                pnx_ISI__issue_sap_info(snsap_ptr, gpcssu);
            }
            else
            {
                pnx_clock_running = 1;
                return;
            }
            if ((PnetXGlobal->x25listen_on) && (snsap_ptr->sn_x25ok) &&
                (PnetXGlobal->x25_initing))
            {
                if (pnx_pvc_alloc(snsap_ptr) != 0)
                {
                    return;
                }                     /* end if */
            }
            else
                if ((PnetXGlobal->x25listen_on) && (snsap_ptr->sn_x25ok) &&
                    !(PnetXGlobal->x25_initing))
                {
                    for (lcn = snsap_ptr->sn_lcnpl;
                        lcn < (snsap_ptr->sn_lcnpl + snsap_ptr->sn_lcnpn); lcn++)
                    {
                        if ((CounterID = x25_ctr_get()) < 0)
                        {
                            pnx_ERR__report_error(JUST_HVX, LOG_ERR, PNXMISC + 5,
                                                  NULL, PNX_API);
                            continue;
                        }                     /* end if */
```

C81

```
                        vc_lcn = lcn & 0x00FF;
                        vc_lcgn = lcn & 0xFF00;
                        if ((vccb_ptr = pnx_GVL__get_vccb_by_lcn(vc_lcgn, vc_lcn)) == NULL)
                        {
                            pnx_NSE__ns_error(snsap_ptr, NSE_NVC);
                            continue;
                        }                   /* end if */ vccb_ptr->counter = CounterID;
                        cb_pvc.flags = X25FLG_LINK_NAME | X25FLG_LCN;
                        cb_pvc.link_name = &snsap_ptr->sn_lsap[1];
                        cb_pvc.lcn = lcn;

vccb_ptr->conn_id = x25_pvc_alloc(&cb_pvc, CounterID);

if (vccb_ptr->conn_id < 0)
                        {
                            pnx_ERR__report_error(JUST_HVX, LOG_ERR, PNXMISC + 6,
                                            NULL, PNX_API);
                            pnx_RVC__release_vccb(vccb_ptr);
                            continue;   /* continue for other lcn */

}               /* end if */
                        else
                        {
#ifdef PNXDEBUG
                            syslog(LOG_INFO, "I325: PVC Allocated, conn_id = %d",
                                    vccb_ptr->conn_id);
#endif
                        }
                        /* Increment vc count */
                        PnetXGlobal->num_vc++;
                        snsap_ptr->sn_numvc++;
                        add_to_array(vccb_ptr);
                    }
                }
            }
            snsap_ptr = snsap_ptr->sn_nxt;
        }
        if (PnetXGlobal->x25_initing)
        {
            PnetXGlobal->x25_active = 1;
            PnetXGlobal->x25_initing = 0;
        } ifdef PNXDEBUG
        syslog(LOG_INFO, "I143: exit pnx_clock_tick");
#endif
        return;
}                                       /* end - pnx_clock_tick */

/*********************
 * pnx_x25_errors() *
 *********************/

/* This function performs tasks neccesary for handling specific X25 API
 * errors.  The errors are reported so syslog where they occur, but anything
 * else necessary (UMP GATER, SAP Down GATER) is done here.  */ void
pnx_x25_errors(struct vccb * vccb_ptr)

{
    struct snsap    *snsap_ptr;
    int             rc;
#ifdef PNXDEBUG
    syslog(LOG_INFO, "I144: pnx_check_link- x25_errno=%d", x25_errno);
endif if (pnx_clock_running)      /* SAP down is already being handled */
    {
        return;
    } snsap_ptr = vccb_ptr->vc_snsap;
```

C82

```
    switch (x25_errno)
    {
    case X25NOCARD:              /* adapter is either not installed or is
                                  * not functioning */
    case X25NODEVICE:            /* device driver is either not installed
                                  * or is not functioning */
    case X25NOLINK:              /* port not connected */
    case X25NOSUCHLINK:    /* port does not exist */
    case X25NOTINIT:             /* API not initialized */
        /* in these cases, send a SAP DOWN */
        snsap_ptr->sn_x25ok = 0;
        break;

case X25RESETCLEAR:    /* reset or clear received */
        /* try to receive the packet.  If packet cannot be received, check if
         * link is ok */
        rc = pnx_x25_fsm(vccb_ptr);
        if (rc == -1)            /* if fsm has failed ( may be x25_receive */
        {                        /* with no data)                          */
            pnx_check_link(vccb_ptr);
        }
        return;
    }                            /* end switch */ if (!snsap_ptr->sn_x25ok)
    {
        pnx_ISI__issue_sap_info(snsap_ptr, gpcssd);
        pnx_LDI__process_dis_ind(snsap_ptr);
    } ifdef PNXDEBUG
    syslog(LOG_INFO, "I145: exit pnx_x25_errors");
#endif
    return;
}                                /* end pnx_x25_errors */

/*****************
 * pnx_check_link *
 *****************/

/* This function checks if the link is ok. If link is not ok, error is
  * reported and necessary actions (SAP_DOWN gater, etc) is done. */ void
pnx_check_link(struct vccb * vccb_ptr)

{
    struct snsap   *snsap_ptr;
    int             status;
    char           *link_status;
#ifdef PNXDEBUG
    syslog(LOG_INFO, "I146: pnx_check_link - x25_errno=%d", x25_errno);
endif if (pnx_clock_running)       /* SAP down is already being handled */
    {
        return;
    } snsap_ptr = vccb_ptr->vc_snsap;

/* check status of the link */
    PnetXGlobal->cb_link_name.flags = X25FLG_LINK_NAME;
    PnetXGlobal->cb_link_name.link_name = &(snsap_ptr->sn_lsap[1]);
    status = x25_link_query(&PnetXGlobal->cb_link_name);
    switch (status)
    {
    case X25_LINK_DISCONNECTED:
        link_status = "Disconnected";
        snsap_ptr->sn_x25ok = 0;
        break;
    case X25_LINK_CONNECTING:
        link_status = "Connecting";
        snsap_ptr->sn_x25ok = 0;
        break;
```

C83

```
    case X25_LINK_CONNECTED:
        link_status = "Connected";
        snsap_ptr->sn_x25ok = 1;
        break;
    default:
        pnx_ERR__report_error(JUST_HVX, LOG_ERR, PNXMISC + 7,
                              snsap_ptr->sr_name, PNX_SYS_ERR);
        return;
        break;
    }                                  /* end switch */
    syslog(LOG_INFO, "I147: PNetX: Link %s is %s",
           &snsap_ptr->sn_lsap[1], link_status);

if (!snsap_ptr->sn_x25ok)
    {
        pnx_ISI__issue_sap_info(snsap_ptr, gpcssd);
        pnx_LDI__process_dis_ind(snsap_ptr);
    } ifdef PNXDEBUG
    syslog(LOG_INFO, "I148: exit pnx_check_link");
#endif
    return;
}                                      /* end pnx_check_link */

/*****************************
 * pnx_LDI__process_dis_ind *
 *****************************/

/* This function handles clean up of all active VCCB's (except listen/pvc)
   when x25 link is down. The SVCs are cleared and disconnect indication
   is sent to the upper layer for all VC's. */ void
pnx_LDI__process_dis_ind(struct snsap * snsap_ptr)
{
    struct vccb     *vccb_ptr;
    unsigned int    i, vstate;
    struct cb_msg_struct cb_msg;
    int             rc;
#ifdef PNXDEBUG
    syslog(LOG_INFO, "I149: enter pnx_LDI");
endif snsap_ptr->sn_state = SN_CLOSED;

if (snsap_ptr->sn_dsac != gtlock &&
        snsap_ptr->sn_dsac != gtshut)
    {
        snsap_ptr->sn_dsac = gtdsbl;
    }

/* terminate all virtual circuits in process on this link */ vccb_ptr = (struct vccb *) PnetXGlobal->active_q.next;
    while (vccb_ptr != (struct vccb *) & PnetXGlobal->active_q)
    {
        if (vccb_ptr->vc_snsap == snsap_ptr)
        {
            /* Clean up all the pending packets on x25 board */
            while (!x25_receive(&(vccb_ptr->conn_id), &cb_msg));    /* intentional NULL loop */
            if (!vccb_ptr->listen)
            {
                if (vccb_ptr->vc_pvc)
                {
                    vccb_ptr->vc_state = VC_D1;
                    vccb_ptr->vc_intx = VC_I1;
                    vccb_ptr->vc_intr = VC_J1;
                    vccb_ptr->vc_flor = VC_F1;
                    vccb_ptr->vc_flox = VC_G1;
                    rc = x25_pvc_free(vccb_ptr->conn_id);
                    if (rc < 0)
                    {
                        pnx_ERR__report_error(JUST_HVX, LOG_ERR, PNXMISC + 8,
                                              NULL, PNX_API);
                    }
```

C84

```
                    pnx_CVC__close_vc(vccb_ptr);
                    if (vccb_ptr->vc_cip)
                    {
                        pnx_RDI__issue_dis_ind(vccb_ptr, gtdure);
                        vccb_ptr->vc_ucxid = NULL;
                        vccb_ptr->vc_dsac = gtenbl;
                    }
                    else
                    if (vccb_ptr->vc_ucxid != NULL)
                    {
                        pnx_RDI__issue_dis_ind(vccb_ptr, gtdure);
                        vccb_ptr->vc_wfdr = 1;
                    }           /* end if */
                }               /* end if */
            else                /* it's SVC */
            {
                vstate = vccb_ptr->vc_state;
                vccb_ptr->vc_state = VC_P1;
                pnx_CVC__close_vc(vccb_ptr);
                switch (vstate)
                {
                case VC_P2:
                    pnx_OPF__vc_open_fail(vccb_ptr, VCF_NSC);
                    pnx_IDI__issue_dis_ind(vccb_ptr, NULL, 0);
                    break;

case VC_P3:
                    pnx_OPF__vc_open_fail(vccb_ptr, VCF_NSC);
                    pnx_IDI__issue_dis_ind(vccb_ptr, vccb_ptr->vc_gtid, 0);
                    break;

case VC_D1:
                case VC_D2:
                    pnx_VHR__vc_hist_rprt(vccb_ptr);
                    pnx_CLS__vc_close(vccb_ptr, VCC_NSC);
                    pnx_IDI__issue_dis_ind(vccb_ptr, vccb_ptr->vc_gtid, 0);
                    vccb_ptr->vc_wfdr = 1;
                    break;

case VC_P5:
                    pnx_OPF__vc_open_fail(vccb_ptr, VCF_NSC);
                    if (snsap_ptr->sn_dce)
                    {
                        pnx_IDI__issue_dis_ind(vccb_ptr, vccb_ptr->vc_gtid, 0);
                    }
                    else
                    {
                        pnx_IDI__issue_dis_ind(vccb_ptr, NULL, 0);
                    }           /* end if */
                    break;

}               /* end switch */
                pnx_RVC__release_vccb(vccb_ptr);
            }                   /* end if SVC */
        }
        vccb_ptr = (struct vccb *) vccb_ptr->links.next;
    }
ifdef PNXDEBUG
    syslog(LOG_INFO, "I150: exit pnx_LDI__process_dis_ind");
#endif
    return;
}                               /* process_dis_ind */

/**********
 * TRACE_A *
 **********/

/* This function is called after each x25 API call to indicate that the call to API has complet
ed*/
void
TRACE_A()
```

21

C85

```
{
    struct trace_item *item;
    unsigned        index;
    if (PnetXGlobal->pnx_shm_ok)
    {
        item = &trace_tab->item[trace_tab->index];
        item->type |= COMPLETED;
    }
    return;
}

/********
* TRACE *
********/

/* This function is called before each X25 API call and before sending/after receiving a GATER
from upper layer */ void
TRACE(uchar type, uchar function, uchar cse_lyr, uchar dia_ins,
      ulong ourid, ulong theirid, short vc_lcn)
{
    struct trace_item *item;
    long             n, lcn = 0;
    if (PnetXGlobal->pnx_shm_ok)
    {
        if (!(trace_tab->index % 50))
        {
            TIME_STAMP();
        }
        trace_tab->index = ++(trace_tab->index) & trace_tab->modulo;
        item = &(trace_tab->item[trace_tab->index]);
        item->type = type;
        if (vc_lcn != 0)
        {
            n = vc_lcn;
            lcn = n << 16;
            item->their_id = theirid | lcn;
        }
        else
        {
            item->their_id = theirid;
        }
        item->function = function;
        item->cse_lyr = cse_lyr;
        item->dia_ins = dia_ins;
        item->our_id = ourid;
    }
    return;
}

/**************
* TIME_STAMP *
**************/

/* This function is called after periodic interval of trace events to put a Time stamp in the T
race */ void
TIME_STAMP()
{
    struct tm        *now;
    long             time_since_70;
    struct trace_item *item;
    if (PnetXGlobal->pnx_shm_ok)
    {
        trace_tab->index = ++(trace_tab->index) & trace_tab->modulo;
        item = &(trace_tab->item[trace_tab->index]);
        time(&time_since_70);
        now = localtime(&time_since_70);

item->type = TRC_TIME | COMPLETED;
        item->function = now->tm_sec;
        item->cse_lyr = now->tm_min;
        item->dia_ins = now->tm_hour;
        item->our_id = now->tm_mday;
```

C86

```
        item->their_id = now->tm_mon;
    }
    return;
}
/************
* TRACE_ERR *
*************/

/* This function is called whenever PNetX gets an error */ void
TRACE_ERR(int location, int reason_code)
{
    struct trace_item *item;
    if (PnetXGlobal->pnx_shm_ok)
    {
        trace_tab->index = ++(trace_tab->index) & trace_tab->modulo;
        item = &(trace_tab->item[trace_tab->index]);
        item->type = PNX_ERR | COMPLETED;

if ((reason_code != PNX_SYS_ERR) && (reason_code != PNX_API))
        {
            item->our_id = 0;
            item->their_id = 0;
            item->cse_lyr = location / 100;
            item->dia_ins = location % 100;
        }
        else
            if ((reason_code == PNX_SYS_ERR) ||
                ((reason_code == PNX_API) && (x25_errno == X25SYSERR)))
        {
            item->our_id = 0;
            item->their_id = errno;
            item->cse_lyr = location / 100;
            item->dia_ins = location % 100;
        }
        else
        {
            item->our_id = x25_errno;
            item->their_id = 0;
            item->cse_lyr = location / 100;
            item->dia_ins = location % 100;
        }
    }
    return;
}
```

C87

```c
/*
 * Name:        pnx_misc1.c
 * Purpose:     miscellaneous pnetx subroutines related to the
 *              vccb structure
 * Functions in this module:
 *      (see pnx_func.h for prototype declarations)
 *
 * struct vccb  *pnx_GVI__get_vccb_by_id()
 * struct vccb  *pnx_GVC__get_vccb_by_ctr()
 * struct vccb  *pnx_GVL__get_vccb_by_lcn()
 * struct vccb  *pnx_GVP__get_vccb_by_pid()
 * struct vccb  *pnx_FVC__find_vccb()
 * int          pnx_CVC__close_vc()
 * int          pnx_allocate_vcid()
 * void         pnx_free_vcid()
 */ include "sys_head.h"
include "emu_head.h"

#include <x25sdefs.h>
include "pnx_head.h"
include "pnx_vccb.h"
#include "pnx_snsap.h"
#include "hvx_lme.h"

extern char         *base;

extern struct pnx_global *PnetXGlobal;

/***************************
 * pnx_GVI__get_vccb_by_id *
 ***************************/

/* This function locates the address of a VCCB when given a VC ID (passed in
 * GATER->gt_dst.  Find the VCCB whose vc_gtid field is equal to gt_dst. */ struct vccb     *
pnx_GVI__get_vccb_by_id(ulong vc_id)
{
#ifdef PNXDEBUG
    syslog(LOG_DEBUG, "pnx_GVI");
#endif
    if (vc_id == 0)
    {
        return (NULL);
    } vc_id -= VCID_BASE;
    if (vc_id > (PnetXGlobal->max_vcs + PnetXGlobal->num_ports))
    {
        pnx_ERR__report_error(JUST_HVX, LOG_ERR, PNXMISC1 + 1,
                              NULL, PNX_NO_VCCB);
        return (NULL);
    }
    else
    {
        return (PnetXGlobal->vc_table->vc[vc_id]);
    }                               /* end if */
}                                   /* end pnx_GVI__get_vccb_by_id */

/***************************
 * pnx_GVC__get_vccb_by_ctr *
 ***************************/

/* This function locates the address of a VCCB when given an X.25 counter
 * (upon returning from the x25_ctr_wait() call.) */ struct vccb     *
pnx_GVC__get_vccb_by_ctr(int CounterID)
{
    struct ctr_block *CtrBlock;
```

C88

```
    struct ctr_vc_lk  *ctr_vc_link;
    int               i;
    struct vccb       *vccb_ptr = NULL;
#ifdef PNXDEBUG
    syslog(LOG_DEBUG, "pnx_GVC");
#endif
    CtrBlock = PnetXGlobal->counters;
    ctr_vc_link = PnetXGlobal->ctr_vc_link;

for (i = 0; i < PnetXGlobal->num_ctrs; i++)
    {
        if (CtrBlock->x25_ctrs[i].ctr_id == CounterID)
        {
            vccb_ptr = ctr_vc_link->vc[i];
            break;
        }
    }
    if (!vccb_ptr)
    {
        pnx_ERR__report_error(JUST_HVX, LOG_ERR, PNXMISC1 + 2,
                              NULL, PNX_NO_VCCB);
    }
    else
        /* We found a vccb.  Double-check the counter ID */
    {
        if (vccb_ptr->counter != CounterID)
        {
            pnx_ERR__report_error(JUST_HVX, LOG_ERR, PNXMISC1 + 3,
                                  NULL, PNX_CTR_ERR);
            vccb_ptr = NULL;
        }
    }
ifdef PNXDEBUG
    syslog(LOG_DEBUG, "exit pnx_GVC, VC=%lX", vccb_ptr);
endif return (vccb_ptr);
}                                     /* end pnx_GVC__get_vccb_by_ctr */

/***************************
* pnx_GVL__get_vccb_by_lcn *
***************************/

/* This function finds a VCCB when given a Logical Channel Number.  It is
 * used when a Connect Request Gater is received requesting connection to a
 * Permanent Virtual Circuit. */ struct vccb     *
pnx_GVL__get_vccb_by_lcn(int lcgn, int lcn)
{
    struct vccb       *vccb_ptr;
#ifdef PNXDEBUG
    syslog(LOG_DEBUG, "pnx_GVL");
#endif
    vccb_ptr = (struct vccb *) PnetXGlobal->active_q.next;
    while (vccb_ptr != (struct vccb *) & PnetXGlobal->active_q)
    {
        if ((vccb_ptr->vc_lcgn == lcgn) &&
            (vccb_ptr->vc_lcn == lcn))
        {
            return (vccb_ptr);
        }
        vccb_ptr = (struct vccb *) vccb_ptr->links.next;
    }
    /* lcn wasn't found */
    pnx_ERR__report_error(JUST_HVX, LOG_ERR, PNXMISC1 + 4, NULL, PNX_NO_VCCB);
    return (NULL);
}

/***************************
* pnx_GVP__get_vccb_by_pid *
***************************/

/* This function finds a VCCB when given a Process ID.  It is used when the
```

2

C89

```
 * SIGCHLD handler is entered, indicating that a vc_clear process has
 * terminated.  The pid returned by the wait() function is passed to this
 * function. */
struct vccb     *
pnx_GVP__get_vccb_by_pid(pid_t child_pid)
{
    struct vccb     *vccb_ptr;
#ifdef PNXDEBUG
    syslog(LOG_DEBUG, "pnx_GVP");
#endif
    vccb_ptr = (struct vccb *) PnetXGlobal->active_q.next;

while (vccb_ptr != (struct vccb *) & PnetXGlobal->active_q)
    {
        if (vccb_ptr->clear_pid == child_pid)
        {
            return (vccb_ptr);
        }                            /* end if */
        vccb_ptr = (struct vccb *) vccb_ptr->links.next;
    }                                /* end while */
    /* no VCCB found to match pid */
    return (NULL);
}                                    /* end pnx_GVP__get_vccb_by_pid */

/*********************
 * pnx_FVC__find_vccb *
 *********************/

/* This routine locates the virtual circuit control block associated with a
 * given user connection id.  This routine is called when it is necessary to
 * cancel a previously issued connect request prior to receiving a connect
 * confirm.  In this case, the PNet GATER will havea null gt_dst, so pnx_GVI
 * may not be used. */
struct vccb     *
pnx_FVC__find_vccb(ulong ucxid)
{
    struct vccb     *vccb_ptr;
#ifdef PNXDEBUG
    syslog(LOG_DEBUG, "pnx_FVC");
#endif
    vccb_ptr = (struct vccb *) PnetXGlobal->active_q.next;

while (vccb_ptr != (struct vccb *) & PnetXGlobal->active_q)
    {
        if (vccb_ptr->vc_ucxid == ucxid)
        {
            return (vccb_ptr);
        }                            /* end if */
        vccb_ptr = (struct vccb *) vccb_ptr->links.next;
    }                                /* end while */
    return (NULL);
}                                    /* end FVC__find_vccb */

/*********************
 * pnx_CVC__close_vc *
 *********************/

/* This routine performs clean-up operations required when a virtual circuit
 * is closed.
 *
 * - deallocate user ID (GATER ID) - update DSAC states */
int
pnx_CVC__close_vc(struct vccb * vccb_ptr)
{
    struct snsap    *snsap_ptr, *rsap_ptr;
#ifdef PNXDEBUG
    syslog(LOG_DEBUG, "pnx_CVC, VC=%lX", vccb_ptr);
#endif
    snsap_ptr = vccb_ptr->vc_snsap;
    rsap_ptr = vccb_ptr->vc_rssap;
```

C90

```
    /* Update dsac state of associated network subscriptions. */
    snsap_ptr->sn_numvc -= 1;
    if (snsap_ptr->sn_numvc == 0 &&
        snsap_ptr->sn_dsac == gtused)
    {
        snsap_ptr->sn_dsac = gtenbl;
    }                               /* end if */ if (rsap_ptr != NULL)
    {
        rsap_ptr->sn_numvc -= 1;
        if (rsap_ptr->sn_numvc == 0 &&
            rsap_ptr->sn_dsac == gtused)
        {
            rsap_ptr->sn_dsac = gtenbl;
        }                           /* end if */
    }                               /* end if */

/* clear the user index */
    if (remove_from_array(vccb_ptr) == -1)
    {
        pnx_ERR__report_error(JUST_HVX, LOG_ERR, PNXMISC1 + 6,
                              snsap_ptr, PNX_ERROR);
        return (-1);
    }
    if (vccb_ptr->counter >= 0)
    {
        if (x25_ctr_remove(vccb_ptr->counter) == -1)
        {
            pnx_ERR__report_error(JUST_HVX, LOG_ERR, PNXMISC1 + 7,
                                  NULL, PNX_API);
            return (-1);
        }
    } ifdef PNXDEBUG
    syslog(LOG_DEBUG, "exit pnx_CVC");
#endif
    return (0);

}                                   /* end - pnx_CVC__close_vc */

/********************
 * pnx_allocate_vcid *
 ********************/

/* This function allocates a slot in the VC ID table for a new VCCB,
 * returning 0 if successful, -1 if not. */
int
pnx_allocate_vcid(struct vccb * vccb_ptr)
{
    long            i;
    struct vc_tab   *vc_table = PnetXGlobal->vc_table;
#ifdef PNXDEBUG
    syslog(LOG_DEBUG, "pnx_allocate_vcid");
#endif
    for (i = 0; (i < PnetXGlobal->max_vcs) && (vc_table->vc[i] != NULL); i++)
    {
        /* Intentional null loop.  Coming out of loop, we have the first NULL
         * entry in the table. */
    ;

/* If i has reached PnetXGlobal->max_vcs, we have reached max_vc limit.
     * The call cannot be handled and so we donot allocate gtid (which
     * remains 0) */
    if (i >= PnetXGlobal->max_vcs)
    {
        return (0);
    }
    else
    {
        vc_table->vc[i] = vccb_ptr;
        vccb_ptr->vc_gtid = i + VCID_BASE;
```

C91

```
#ifdef PNXDEBUG
        syslog(LOG_DEBUG, "exit pnx_allocate_vcid, VC=%lX, ID=%lX",
            vccb_ptr, vccb_ptr->vc_gtid);
#endif
        return (0);
    }
}                                       /* end pnx_allocate_vcid */

/****************
* pnx_free_vcid *
****************/

/* This function frees a slot in the VC ID table when the virtual circuit is
 * closed */ void
pnx_free_vcid(struct vccb * vccb_ptr)
{
    ulong           vcid;
#ifdef PNXDEBUG
    syslog(LOG_DEBUG, "pnx_free_vcid");
#endif
    if (vccb_ptr->vc_gtid == 0)
    {
        return;
    }
    vcid = vccb_ptr->vc_gtid;
    vccb_ptr->vc_gtid = 0;
    PnetXGlobal->vc_table->vc[vcid - VCID_BASE] = NULL;
#ifdef PNXDEBUG
    syslog(LOG_DEBUG, "exit pnx_free_vcid, VC=%lX, ID=%lX",
            vccb_ptr, vcid);
#endif
}
```

```
/*
 * Name:        pnx_misc2.c
 * Purpose:     miscellaneous pnetx subroutines
 * Functions in this module:
 *      (see pnx_func.h for prototype declarations)
 *
 * int          pnx_GCR__get_credit()
 * int          pnx_MNA__move_net_addr()
 * int          pnx_FBS__fac_block_size()
 * int          pnx_LRS__locate_rsnsap()
 * int          pnx_GSN__get_snsap()
 * int          pnx_SSN__select_snsap()
 * int          pnx_LSN__locate_snsap()
 * void         pnx_sap_info()
 */ include "sys_head.h"
include "emu_head.h"

#include <x25sdefs.h>
include "pnx_head.h"
include "pnx_vccb.h"
#include "pnx_snsap.h"
#include "hvx_gater.h"
#include "x25fac.h"

extern char     *base;

extern struct pnx_global *PnetXGlobal;

/***********************
 * pnx_GCR__get_credit *
 ***********************/

/* This routine computes the amount of send credit which should be given to
 * the user.  The send credit allocated to the user is the difference
 * between the  total available send credit and the current unused user send
 * credit. */
int
pnx_GCR__get_credit(struct vccb * vccb_ptr)

{ int             acredit, dcredit;
ifdef PNXDEBUG
    syslog(LOG_DEBUG, "pnx_GCR, VC=%lX", vccb_ptr);
#endif
    acredit = vccb_ptr->vc_wndx + 15 - vccb_ptr->vc_ublks;
    dcredit = acredit - vccb_ptr->vc_usndc;

if ((acredit < 4) || (dcredit <= 0))
    {
        return (0);
    }
    else
    {
        vccb_ptr->vc_usndc = acredit;
        return (dcredit);
    }                                   /* end if */
#ifdef PNXDEBUG
    syslog(LOG_DEBUG, "I164: exit pnx_GCR");
endif }                                       /* end pnx_GCR__get_credit */

/**************************
 * pnx_MNA__move_net_addr *
 **************************/

/* This routine performs a memory to memory move of network addresses. The
 * source and destination network addresses may start on either an even or
```

C93

```
 * odd semi-octet.The length of the network address is expressed in units of
 * semi-octets (BCD). */
int
pnx_MNA__move_net_addr(unsigned char *fr_addr,
                       int fr_ofs,
                       unsigned char *to_addr,
                       int to_ofs,
                       int lngth)
{
    register unsigned char *fa, *ta;
    unsigned char   x;
    register short  fo, to;
#ifdef PNXDEBUG
    syslog(LOG_DEBUG, "pnx_MNA");
#endif
    fa = fr_addr + fr_ofs / 2;
    fo = fr_ofs % 2;
    ta = to_addr + to_ofs / 2;
    to = to_ofs % 2;

for (; lngth != 0; lngth--)
    { if (fo == 0)
        {
            x = *fa >> 4;
            fo++;
        }
        else
        {
            x = *fa++ & 0x0f;
            fo = 0;
        }                           /* end if */
        if (to == 0)
        {
            *ta = x << 4;
            to++;
        }
        else
        {
            *ta++ = *ta | x;
            to = 0;
        }                           /* end if */
    }                               /* end loop */
#ifdef PNXDEBUG
    syslog(LOG_DEBUG, "exit pnx_MNA");
#endif
    return (0);

}                                   /* pnx_MNA__move_net_addr */

/***************************
 * pnx_FBS__fac_block_size *
 ***************************/

/* This routine computes the total size of all facilities between facility
 * markers or between a facility marker and the end of the facility field. */
int
pnx_FBS__fac_block_size(unsigned char *string_ptr, int fac_len)
{
    unsigned int    fac_code, fac_size;
    unsigned int    blk_size;
#ifdef PNXDEBUG
    syslog(LOG_DEBUG, "pnx_FBS");
#endif
    blk_size = 0;

for (; fac_len != 0;)
    {
        fac_size = (*string_ptr >> 6) + 1;    /* facility size */
```

2

C94

```
            fac_code = *string_ptr++;  /* facility code */
            fac_len -= 1;

switch (fac_code)
            { case FAC_MRKR:            /* facility marker */
                return (blk_size);
                break;

default:
                blk_size += 1;
                if (fac_size == 4)
                {
                    fac_size = *string_ptr++;
                    fac_len -= 1;
                    blk_size += 1;
                }                     /* end if */
                string_ptr += fac_size;
                fac_len -= fac_size;
                blk_size += fac_size;
                break;

}                         /* end switch */
        }                             /* end loop */
#ifdef PNXDEBUG
    syslog(LOG_DEBUG, "exit pnx_FBS");
#endif
    return (blk_size);

}                                     /* pnx_FBS__fac_block_size */

/*************************
 * pnx_LRS__locate_rsnsap *
 *************************/

/* This routine scans the chain of SNSAP tables for a match between the
 * network address in the SNSAP table and the calling network address in the
 * VCCB.                                                                  */
int
pnx_LRS__locate_rsnsap(struct vccb * vccb_ptr, struct snsap ** sn_adr)
{
    struct snsap    *sn_ptr;
    unsigned int    s_len;
#ifdef PNXDEBUG
    syslog(LOG_DEBUG, "pnx_LRS, VC=%lX", vccb_ptr);
#endif
    *sn_adr = NULL;
    sn_ptr = PnetXGlobal->snsap_tbl;
    s_len = (vccb_ptr->vc_cgna[0] + 1) / 2;

for (; sn_ptr != NULL; sn_ptr = sn_ptr->sn_nxt)
    {
        if (sn_ptr->sn_rem &&
            vccb_ptr->vc_cgna[0] == sn_ptr->sn_addr[0])
        {
            if (memcmp(&vccb_ptr->vc_cgna[1], &sn_ptr->sn_addr[1],
                    s_len) == 0)
            {
                *sn_adr = sn_ptr;
#ifdef PNXDEBUG
                syslog(LOG_DEBUG, "exit pnx_LRS");
#endif
                return (0);
            }                         /* end if */
        }                             /* end if */
    }                                 /* end loop */ return (-1);
}                                     /* pnx_LRS__locate_remote_sap */
```

C95

```
/*********************
 * pnx_GSN__get_snsap *
 *********************/

/* This routine scans the chain of SNSAP tables for a match between the
  * snsap name and the name passed in the argument list. */ int
pnx_GSN__get_snsap(unsigned char *sap_ptr, struct snsap ** sn_adr)
{
    struct snsap     *snsap_ptr;
#ifdef PNXDEBUG
    syslog(LOG_DEBUG, "pnx_GSN");
#endif
    snsap_ptr = PnetXGlobal->snsap_tbl;
    for (; snsap_ptr != NULL; snsap_ptr = snsap_ptr->sn_nxt)
    {
        if (memcmp(&sap_ptr[1], &snsap_ptr->sn_name[1], 8) == 0)
        {
            *sn_adr = snsap_ptr;
#ifdef PNXDEBUG
            syslog(LOG_DEBUG, "exit pnx_GSN");
#endif
            return (0);
        }                          /* end if */
    }                              /* end loop */ return (-1);
}                                  /* pnx_GSN__get_snsap */

/************************
 * pnx_SSN__select_snsap *
 ************************/

/* This routine scans the chain of SNSAP tables for local SNSAPs connected
  * to a PDN. Among the SNSAPs in the snasap table  the local SNSAP is
  * selected. */ int
pnx_SSN__select_snsap(struct snsap ** sn_adr)
{
    register struct snsap *sn_ptr;
#ifdef PNXDEBUG
    syslog(LOG_DEBUG, "pnx_SSN");
#endif
    *sn_adr = NULL;
    sn_ptr = PnetXGlobal->snsap_tbl;

for (; sn_ptr != NULL; sn_ptr = sn_ptr->sn_nxt)
    {
        if (sn_ptr->sn_rem == 0)
        {
            *sn_adr = sn_ptr;
#ifdef PNXDEBUG
            syslog(LOG_DEBUG, "exit pnx_SSN");
#endif
            return (0);
        }                          /* end if */
    }                              /* end for loop */
    return (-1);

}                                  /* pnx_SSN__select_snsap */

/************************
 * pnx_LSN__locate_snsap *
 ************************/

/* This routine scans the chain of SNSAP tables for a match between the
  * network address in the SNSAP table and the calling X.121 address passed
  * in the gater.  No RSNSAPs are examined. */ int
pnx_LSN__locate_snsap(struct GATER * gater_ptr,
                      unsigned int i,
```

```
                            struct snsap ** sn_adr)
{
    struct snsap    *sn_ptr;
    unsigned int    s_len;
#ifdef PNXDEBUG
    syslog(LOG_DEBUG, "pnx_LSN");
#endif
    *sn_adr = NULL;

sn_ptr = PnetXGlobal->snsap_tbl;
    s_len = (gater_ptr->gt_var[i + 2] + 1) / 2;

for (; sn_ptr != NULL; sn_ptr = sn_ptr->sn_nxt)
    {
        if (sn_ptr->sn_rem == 0 &&
            gater_ptr->gt_var[i + 2] == sn_ptr->sn_addr[0])
        {
            if (memcmp(&gater_ptr->gt_var[i + 3], &sn_ptr->sn_addr[1],
                    s_len) == 0)
            {
                *sn_adr = sn_ptr;
#ifdef PNXDEBUG
                syslog(LOG_DEBUG, "exit pnx_LSN");
#endif
                return (0);
            }                       /* end if */
        }                           /* end if */
    }                               /* end loop */ return (1);

}                                   /* pnx_LSN__locate_snsap */

/***************
* pnx_sap_info *
***************/
void
pnx_sap_info(void)
{
    struct snsap    *snsap_ptr;

#ifdef PNXDEBUG
    syslog(LOG_DEBUG, "pnx_sap_info");
endif snsap_ptr = PnetXGlobal->snsap_tbl;
    while (snsap_ptr)
    {
        if (PnetXGlobal->num_vcrcv == 0)
        {
            /* if we go down to zero VC RECEIVEs in this loop, save the rest
             * of the sap_infos for later */
            return;
        } if ((!snsap_ptr->sn_rem) && (snsap_ptr->sn_sndinfo))
        {
            if (snsap_ptr->sn_x25ok)
            {
                pnx_ISI__issue_sap_info(snsap_ptr, gpcssu);
            }
            else
            {
                pnx_ISI__issue_sap_info(snsap_ptr, gpcssd);
            }
            PnetXGlobal->sapinfo_cnt--;
            snsap_ptr->sn_sndinfo = 0;
        }
        snsap_ptr = snsap_ptr->sn_nxt;
    } ifdef PNXDEBUG
```

C97

```
    syslog(LOG_DEBUG, "exit pnx_sap_info");
#endif
}                              /* end - pnx_sap_info */
```

C98

```
/*
 *  Name:        pnx_ns_cmd.c
 *  Purpose:     Process NS admin command
 *  Functions in this module:
 *       (see pnx_func.h for prototype declarations)
    int         pnx_HNS__ns_admin_cmd()
    int         pnx_HNN__number_ns()
    int         pnx_HNL__list_ns()
    int         pnx_HNA__attr_ns()
    int         pnx_HNU__update_ns()
    int         pnx_HCS__check_state()
    int         pnx_HVT__van_type()
    int         pnx_HNM__match_ns()
*/ include "sys_head.h"
include "emu_head.h"
#include "macro.h"
#include "mqi_head.h"
#include "z_rb.h"
#include "z3irb.h"
include <x25sdefs.h> include "pnx_head.h"
include "hvx_phd.h"
#include "pnx_snsap.h"
#include "hvx_gater.h"
#include "hvx_lme.h"
#include "x25nsp.h"

extern char       *base;

extern struct pnx_global *PnetXGlobal;

/*************************
 * pnx_HNS__ns_admin_cmd *
 *************************/

/* The function code and selection parameters are extracted from the ns
 * admin request gater and the appropriate command handler executed. */ int
pnx_HNS__ns_admin_cmd(struct GATER * gater_ptr)

{                                       /* HNS__ns_admin_cmd */ unsigned short    i, funct, s_len;
    unsigned char     *aptr;
    struct x25nsp     nsspb;
    ulong             sce_id;

GET4(sce_id, gater_ptr->gt_sce);

/* zero fill selection parameter structure */ memset(&nsspb, 0, sizeof(struct x25nsp));

for (i = 1; i <= 8; i++)
    {
        nsspb.np_nam1[i] = ' ';
        nsspb.np_nam2[i] = ' ';
        nsspb.np_mp1n[i] = ' ';
        nsspb.np_mp2n[i] = ' ';
    }

/* Get function code, selection, and modification parameters. */ for (i = 0; i < gater_ptr->gt_vln; i += gater_ptr->gt_var[i + 1] + 2)
    {
        switch (gater_ptr->gt_var[i])
        {
        case gtfunc:                    /* function code */
```

C99

```
            funct = (gater_ptr->gt_var[i + 2] << 8) +
                gater_ptr->gt_var[i + 3];
            break;

case gtnam1:                /* name-1 */
            s_len = gater_ptr->gt_var[i + 1];
            nsspb.np_nam1[0] = s_len;
            memcpy(&nsspb.np_nam1[1], &gater_ptr->gt_var[i + 2], s_len);
            nsspb.np_par1 = 1;
            break;

case gtnam2:                /* name-2 */
            s_len = gater_ptr->gt_var[i + 1];
            nsspb.np_nam2[0] = s_len;
            memcpy(&nsspb.np_nam2[1], &gater_ptr->gt_var[i + 2], s_len);
            nsspb.np_par2 = 1;
            break;

case gtstat:                /* DSAC state */
            aptr = (unsigned char *) &nsspb.np_dsac;
            *aptr++ = gater_ptr->gt_var[i + 2];
            *aptr++ = gater_ptr->gt_var[i + 3];
            nsspb.np_par3 = 1;
            break;

case gtmp1c:                /* mapping-1 class */
            aptr = (unsigned char *) &nsspb.np_mp1c;
            *aptr++ = gater_ptr->gt_var[i + 2];
            *aptr++ = gater_ptr->gt_var[i + 3];
            nsspb.np_par4a = 1;
            break;

case gtmp1n:                /* mapping-1 name */
            s_len = gater_ptr->gt_var[i + 1];
            nsspb.np_mp1n[0] = s_len;
            memcpy(&nsspb.np_mp1n[1], &gater_ptr->gt_var[i + 2], s_len);
            nsspb.np_par4b = 1;
            break;

case gtmp2c:                /* mapping-2 class */
            aptr = (unsigned char *) &nsspb.np_mp2c;
            *aptr++ = gater_ptr->gt_var[i + 2];
            *aptr++ = gater_ptr->gt_var[i + 3];
            nsspb.np_par5a = 1;
            break;

case gtmp2n:                /* mapping-2 name */
            s_len = gater_ptr->gt_var[i + 1];
            nsspb.np_mp2n[0] = s_len;
            memcpy(&nsspb.np_mp2n[1], &gater_ptr->gt_var[i + 2], s_len);
            nsspb.np_par5b = 1;
            break;

case gtvenu:                /* venue */
            nsspb.np_venu[0] = gater_ptr->gt_var[i + 2];
            nsspb.np_venu[1] = gater_ptr->gt_var[i + 3];
            nsspb.np_par6 = 1;
            break;

case gttype:                /* NS type       */
            memcpy(&nsspb.np_type[0], &gater_ptr->gt_var[i + 2], 4);
            nsspb.np_par7 = 1;
            break;

case gtupdp:                /* update DSAC state */
            aptr = (unsigned char *) &nsspb.np_updp;
            *aptr++ = gater_ptr->gt_var[i + 2];
            *aptr++ = gater_ptr->gt_var[i + 3];
            nsspb.np_par8 = 1;
            break;

}                           /* end switch */
    }                               /* end loop */

/* Dispatch to appropriate command handler. */ switch (funct)
```

2

C100

```
    {
    case gtnmbr:
        pnx_HNN__number_ns(&nsspb, sce_id);
        break;

case gtlist:
        pnx_HNL__list_ns(&nsspb, sce_id);
        break;

case gtattr:
        pnx_HNA__attr_ns(&nsspb, sce_id);
        break;

case gtupdt:
        pnx_HNU__update_ns(&nsspb, sce_id);
        break;

}                               /* end switch */ return (0);

}                                   /* HNS__ns_admin_cmd */

/**********************
* pnx_HNN__number_ns *
**********************/

/* This routine finds the network subscriptions which match given selection
 * parameters and reports the number of matching network subscriptions to
 * the node administrator. */ int
pnx_HNN__number_ns(struct x25nsp * np_ptr, ulong sce_id)

{                                   /* HNN__number_ns */ struct IRB      *irb_ptr;
    struct RB       *iorb_ptr;
    struct GATER    *gater_ptr;
    unsigned char   *var_ptr;
    unsigned char   *aptr;
    unsigned short  numns;
    struct snsap    *snsap_ptr;

if (pnx_get_next_vc_receive(&irb_ptr, &iorb_ptr) != 0)
    {
        return (-1);
    }

/* Setup fields in fixed part of gater. */ gater_ptr = pnx_GRG__get_rsp_gater(iorb_ptr, sce_id);

gater_ptr->gt_fnc = gtfarf;
    var_ptr = &gater_ptr->gt_var[0];

/* Find network subscriptions which match selection parameters. */ numns = 0;
    for (snsap_ptr = PnetXGlobal->snsap_tbl; snsap_ptr != NULL;
         snsap_ptr = snsap_ptr->sn_nxt)
    {
        if (pnx_HNM__match_ns(np_ptr, snsap_ptr) == 0)
        {
            numns += 1;
        }
    }                               /* end loop */

/* Setup parameters in variable part of gater.              */

*var_ptr++ = gtrsp1;            /* number of NS */
    *var_ptr++ = 2;
    aptr = (unsigned char *) &numns;
    *var_ptr++ = *aptr++;
    *var_ptr++ = *aptr++;
    gater_ptr->gt_vln += 4;
```

C101

```
    /* Post VC Receive for administrative response. */ pnx_post_request(irb_ptr);

return (0);

}                               /* HNN__number_ns */
/*******************
* pnx_HNL__list_ns *
*******************/

/* This routine finds the network subscriptions which match given selection
 * parameters snd reports the names of the matching network subscriptions to
 * the node administrator. */
int
pnx_HNL__list_ns(struct x25nsp * np_ptr, ulong sce_id)

{                               /* HNL__list_ns */
    struct IRB      *irb_ptr;
    struct RB       *iorb_ptr;
    struct GATER    *gater_ptr;
    unsigned char   *var_ptr;
    unsigned short  s_len;
    struct snsap    *snsap_ptr;

if (pnx_get_next_vc_receive(&irb_ptr, &iorb_ptr) != 0)
    {
        return (-1);
    }

/* Setup fields in fixed part of gater. */ gater_ptr = pnx_GRG__get_rsp_gater(iorb_ptr, sce_id);

gater_ptr->gt_fnc = gtfarf;
    var_ptr = &gater_ptr->gt_var[0];

/* Find network subscriptions which match selection parameters. Setup
     * response parameters in variable part of gater. */ for (snsap_ptr = PnetXGlobal->snsap_tbl; snsap_ptr != NULL;
        snsap_ptr = snsap_ptr->sn_nxt)
    {
        if (pnx_HNM__match_ns(np_ptr, snsap_ptr) != 0)
        {
            continue;
        } s_len = snsap_ptr->sn_name[0];

if ((gater_ptr->gt_vln + s_len + 2) > gt_vmx)
        {
            gater_ptr->gt_fnc = gtfari;
            pnx_post_request(irb_ptr);
            if (pnx_get_next_vc_receive(&irb_ptr, &iorb_ptr) != 0)
            {
                return (-1);
            }
            gater_ptr = pnx_GRG__get_rsp_gater(iorb_ptr, sce_id);
            var_ptr = &gater_ptr->gt_var[0];
        }

*var_ptr++ = gtrsp1;        /* NS name */
        *var_ptr++ = s_len;
        memcpy(var_ptr, &snsap_ptr->sn_name[1], s_len);
        var_ptr += s_len;
        gater_ptr->gt_vln += s_len + 2;

}                           /* end loop */

/* Post VC Receive for final admin response. */ gater_ptr->gt_fnc = gtfarf;
    pnx_post_request(irb_ptr);
```

C102

```c
    return (0);
}                                /* HNL__list_ns */
/******************
 * pnx_HNA__attr_ns *
 ******************/

/* This routine finds the network subscriptions which match given selection
 * parameters and reports the attributes of the matching network
 * subscriptions to the node administrator. */
int
pnx_HNA__attr_ns(struct x25nsp * np_ptr, ulong sce_id)
{                                /* HNA__attr_ns */
    struct IRB      *irb_ptr;
    struct RB       *iorb_ptr;
    struct GATER    *gater_ptr;
    unsigned char   *var_ptr;
    unsigned char   *aptr;
    unsigned short   s_len, max_psz;
    struct snsap    *snsap_ptr;

/* Find network subscriptions which match selection parameters. Setup
     * response parameters in variable part of gater. Issue gate request for
     * administrative response. */ for (snsap_ptr = PnetXGlobal->snsap_tbl; snsap_ptr != NULL;
         snsap_ptr = snsap_ptr->sn_nxt)
    {
        if (pnx_HNM__match_ns(np_ptr, snsap_ptr) != 0)
        {
            continue;
        } if (pnx_get_next_vc_receive(&irb_ptr, &iorb_ptr) != 0)
        {
            return (-1);
        }
        gater_ptr = pnx_GRG__get_rsp_gater(iorb_ptr, sce_id);
        gater_ptr->gt_fnc = gtfari;
        var_ptr = &gater_ptr->gt_var[0];

*var_ptr++ = gtrsp1;       /* NS name */
        s_len = snsap_ptr->sn_name[0];
        *var_ptr++ = s_len;
        memcpy(var_ptr, &snsap_ptr->sn_name[1], s_len);
        var_ptr += s_len;
        gater_ptr->gt_vln += s_len + 2;

*var_ptr++ = gtrsp2;       /* DSAC state */
        *var_ptr++ = 2;
        aptr = (unsigned char *) &snsap_ptr->sn_dsac;
        *var_ptr++ = *aptr++;
        *var_ptr++ = *aptr++;
        gater_ptr->gt_vln += 4;

*var_ptr++ = gtrsp3;       /* NS type */
        *var_ptr++ = 4;
        memcpy(var_ptr, &snsap_ptr->sn_type[0], 4);
        var_ptr += 4;
        gater_ptr->gt_vln += 6;

if ((s_len = snsap_ptr->sn_lsap[0]) != 0)
        {
            *var_ptr++ = gtrsp4;   /* Mapping (LL) */
            *var_ptr++ = s_len;
            memcpy(var_ptr, &snsap_ptr->sn_lsap[1], s_len);
            var_ptr += s_len;
            gater_ptr->gt_vln += s_len + 2;
        }

*var_ptr++ = gtrsp5;       /* Venue */
        *var_ptr++ = 2;
```

C103

```
    *var_ptr++ = snsap_ptr->sn_venu[0];
    *var_ptr++ = snsap_ptr->sn_venu[1];
    gater_ptr->gt_vln += 4;

if (snsap_ptr->sn_addr[0] != 0)
    {
        *var_ptr++ = gtrsp6;    /* Calling number */
        s_len = ((snsap_ptr->sn_addr[0] + 1) / 2) + 2;
        *var_ptr++ = s_len;
        *var_ptr++ = 16;
        *var_ptr++ = snsap_ptr->sn_addr[0];
        pnx_MNA__move_net_addr(&snsap_ptr->sn_addr[1], 0,
                               var_ptr, 0, snsap_ptr->sn_addr[0]);
        var_ptr += ((snsap_ptr->sn_addr[0] + 1) / 2);
        gater_ptr->gt_vln += s_len + 2;
    } if (snsap_ptr->sn_rem == 0)
    {
        *var_ptr++ = gtrsp7;    /* Max VCs */
        *var_ptr++ = 2;
        aptr = (unsigned char *) &snsap_ptr->sn_maxvc;
        *var_ptr++ = *aptr++;
        *var_ptr++ = *aptr++;
        gater_ptr->gt_vln += 4;
    } if (snsap_ptr->sn_rem == 0)
    {
        *var_ptr++ = gtrsp8;    /* VAN type */
        *var_ptr++ = 8;
        pnx_HVT__van_type(var_ptr, snsap_ptr);
        var_ptr += 8;
        gater_ptr->gt_vln += 10;
    } if (snsap_ptr->sn_rem == 0)
    {
        *var_ptr++ = gtrsp9;    /* Max packet size */
        *var_ptr++ = 2;
        max_psz = 1 << snsap_ptr->sn_pszx;
        aptr = (unsigned char *) &max_psz;
        *var_ptr++ = *aptr++;
        *var_ptr++ = *aptr++;
        gater_ptr->gt_vln += 4;
    } if (snsap_ptr->sn_rem == 0)
    {
        *var_ptr++ = gtrs10;    /* Max credit window */
        *var_ptr++ = 2;
        aptr = (unsigned char *) &snsap_ptr->sn_wndx;
        *var_ptr++ = *aptr++;
        *var_ptr++ = *aptr++;
        gater_ptr->gt_vln += 4;
    } if (snsap_ptr->sn_rem == 0)
    {
        *var_ptr++ = gtrs11;    /* Reverse charge */
        *var_ptr++ = 2;
        aptr = (unsigned char *) &snsap_ptr->sn_nvrv;
        *var_ptr++ = *aptr++;
        *var_ptr++ = *aptr++;
        gater_ptr->gt_vln += 4;
    } if (snsap_ptr->sn_rem == 0 &&
        snsap_ptr->sn_thrr != 0)
    {
        *var_ptr++ = gtrs13;    /* Recv thruput class */
        *var_ptr++ = 2;
        aptr = (unsigned char *) &snsap_ptr->sn_thrr;
        *var_ptr++ = *aptr++;
        *var_ptr++ = *aptr++;
        gater_ptr->gt_vln += 4;
    }
```

C104

```
        if (snsap_ptr->sn_rem == 0 &&
            snsap_ptr->sn_thrx != 0)
        {
            *var_ptr++ = gtrs14;    /* Emit thruput class */
            *var_ptr++ = 2;
            aptr = (unsigned char *) &snsap_ptr->sn_thrx;
            *var_ptr++ = *aptr++;
            *var_ptr++ = *aptr++;
            gater_ptr->gt_vln += 4;
        } if (snsap_ptr->sn_rem == 0)
        {
            *var_ptr++ = gtrs16;    /* Flow ctl negtn */
            *var_ptr++ = 2;
            aptr = (unsigned char *) &snsap_ptr->sn_ngfx;
            *var_ptr++ = *aptr++;
            *var_ptr++ = *aptr++;
            gater_ptr->gt_vln += 4;
        } pnx_post_request(irb_ptr);

}                               /* end loop */
    /* Issue admin response for final item. */ if (pnx_get_next_vc_receive(&irb_ptr, &iorb_ptr) != 0)
    {
        return (-1);
    }
    gater_ptr = pnx_GRG__get_rsp_gater(iorb_ptr, sce_id);
    gater_ptr->gt_fnc = gtfarf;
    pnx_post_request(irb_ptr);

return (0);

}                                   /* HNA__attr_ns */

/*********************
* pnx_HNU__update_ns *
*********************/

/* This routine finds the network subscriptions which match given selection
 * parameters, updates the attributes of the matching network subscriptions,
 * and reports the old and new values of selected attributes to the node
 * administrator. */ int
pnx_HNU__update_ns(struct x25nsp * np_ptr, ulong sce_id)
{                                   /* HNU__update_ns */
    struct IRB      *irb_ptr;
    struct RB       *iorb_ptr;
    struct GATER    *gater_ptr;
    unsigned char   *var_ptr;
    unsigned char   *aptr;
    unsigned short  i, s_len, rpt_code;
    struct snsap    *snsap_ptr;

/* Find network subscriptions which match selection parameters. Update
     * selected attributes of network subscription. Issue gate request for
     * administrative response. */ for (snsap_ptr = PnetXGlobal->snsap_tbl; snsap_ptr != NULL;
         snsap_ptr = snsap_ptr->sn_nxt)
    {
        if (pnx_HNM__match_ns(np_ptr, snsap_ptr) != 0)
        {
            continue;
        } if (pnx_get_next_vc_receive(&irb_ptr, &iorb_ptr) != 0)
        {
            return (-1);
```

C105

```
        }
        gater_ptr = pnx_GRG__get_rsp_gater(iorb_ptr, sce_id);
        gater_ptr->gt_fnc = gtfari;
        var_ptr = &gater_ptr->gt_var[0];

*var_ptr++ = gtrsp1;        /* NS name */
        s_len = snsap_ptr->sn_name[0];
        *var_ptr++ = s_len;
        memcpy(var_ptr, &snsap_ptr->sn_name[1], s_len);
        var_ptr += s_len;
        gater_ptr->gt_vln += s_len + 2;

*var_ptr++ = gtrsp2;        /* Old state (DSAC) */
        *var_ptr++ = 2;
        aptr = (unsigned char *) &snsap_ptr->sn_dsac;
        *var_ptr++ = *aptr++;
        *var_ptr++ = *aptr++;
        gater_ptr->gt_vln += 4;

*var_ptr++ = gtrsp3;        /* New state (DSAC) */
        *var_ptr++ = 2;
        if ((rpt_code = pnx_HCS__check_state(snsap_ptr, np_ptr)) == 0)
        {
            snsap_ptr->sn_dsac = np_ptr->np_updp;
        }
        aptr = (unsigned char *) &snsap_ptr->sn_dsac;
        *var_ptr++ = *aptr++;
        *var_ptr++ = *aptr++;
        gater_ptr->gt_vln += 4;

*var_ptr++ = gtrsp4;        /* Report code */
        *var_ptr++ = 2;
        aptr = (unsigned char *) &rpt_code;
        *var_ptr++ = *aptr++;
        *var_ptr++ = *aptr++;
        gater_ptr->gt_vln += 4;

pnx_post_request(irb_ptr);

}                               /* end loop */

/* Issue admin response for final item. */ if (pnx_get_next_vc_receive(&irb_ptr, &iorb_ptr) != 0)
    {
        return (-1);
    }
    gater_ptr = pnx_GRG__get_rsp_gater(iorb_ptr, sce_id);
    gater_ptr->gt_fnc = gtfarf;
    pnx_post_request(irb_ptr);

return (0);

}                                   /* HNU__update_ns */

/************************
 * pnx_HCS__check_state *
 ************************/

/* This routine validates the state transition requested in an update
 * network subscription command. */ int
pnx_HCS__check_state(struct snsap * snsap_ptr, struct x25nsp * np_ptr)

{                                   /* HCS__check_state */ if (np_ptr->np_par8 == 0)
    {
        return (-1);
    } switch (snsap_ptr->sn_dsac)
    { case gtused:
        if (np_ptr->np_updp == gtlock ||
```

8

C106

```
            np_ptr->np_updp == gtshut)
        {
            return (0);
        }
        break;

case gtenbl:
        if (np_ptr->np_updp == gtlock ||
            np_ptr->np_updp == gtenbl)
        {
            return (0);
        }
        break;

case gtdsbl:
        if (np_ptr->np_updp == gtlock ||
            np_ptr->np_updp == gtdsbl)
        {
            return (0);
        }
        break;

case gtdown:
        if (np_ptr->np_updp == gtlock ||
            np_ptr->np_updp == gtdown)
        {
            return (0);
        }
        break;

case gtlock:
        if (np_ptr->np_updp == gtenbl ||
            np_ptr->np_updp == gtdsbl ||
            np_ptr->np_updp == gtdown ||
            np_ptr->np_updp == gtlock)
        {
            return (0);
        }
        break;

}                                   /* end switch */ return (-1);

}                                       /* HCS__check_state */
/********************
* pnx_HVT__van_type *
********************/

/* This routine moves the VAN type to the address supplied in the argument
 * list. */ int
pnx_HVT__van_type(unsigned char *var_ptr, struct snsap * snsap_ptr)

{                                       /* HVT__van_type */ unsigned char   *van_adr;

switch (snsap_ptr->sn_ntw)
    { case SN_HDSA:
        van_adr = (unsigned char *) "DSA     ";
        break;

case SN_TELN:
        van_adr = (unsigned char *) "TELENET ";
        break;

case SN_TYMN:
        van_adr = (unsigned char *) "TYMNET  ";
        break;

case SN_UNIN:
        van_adr = (unsigned char *) "UNINET  ";
```

C107

```
        break;
    case SN_DATP:
        van_adr = (unsigned char *) "DATAPAC ";
        break;

case SN_INFO:
        van_adr = (unsigned char *) "CNCP    ";
        break;

case SN_DTXP:
        van_adr = (unsigned char *) "DATEX-P ";
        break;

case SN_AUSP:
        van_adr = (unsigned char *) "AUSPAC  ";
        break;

case SN_ITAP:
        van_adr = (unsigned char *) "ITAPAC  ";
        break;

case SN_UKPS:
        van_adr = (unsigned char *) "PSS     ";
        break;

case SN_TRNS:
        van_adr = (unsigned char *) "TRANSPAC";
        break;

case SN_TELP:
        van_adr = (unsigned char *) "TELEPAC ";
        break;

case SN_DCSX:
        van_adr = (unsigned char *) "DCS     ";
        break;

case SN_EURO:
        van_adr = (unsigned char *) "EURONET ";
        break;

case SN_DN1X:
        van_adr = (unsigned char *) "DN1     ";
        break;

case SN_IBER:
        van_adr = (unsigned char *) "IBERPAC ";
        break;

case SN_ARPC:
        van_adr = (unsigned char *) "ARPAC   ";
        break;

case SN_DTXB:
        van_adr = (unsigned char *) "DATEX-B ";
        break;

case SN_DDXP:
        van_adr = (unsigned char *) "DDXP    ";
        break;

case SN_RTTX:
        van_adr = (unsigned char *) "RTT     ";
        break;

case SN_ACCU:
        van_adr = (unsigned char *) "ACCUNET ";
        break;

case SN_NOPS:
        van_adr = (unsigned char *) "NOPSS   ";
        break;

case SN_SCTX:
        van_adr = (unsigned char *) "SCT     ";
        break;
```

10

C108

```
    case SN_MARK:
        van_adr = (unsigned char *) "MARKNET ";
        break;

default:
        van_adr = (unsigned char *) "PDNX    ";
        break;

}                                   /* end switch */ memcpy(var_ptr, van_adr, 8);

return (0);

}                                       /* HVT__van_type */
/********************
 * pnx_HNM__match_ns *
 ********************/
/* This routine compares a given network subscription with selection
 * parameters passed in a network subscription admin request gater. */ int
pnx_HNM__match_ns(struct x25nsp * np_ptr, struct snsap * snsap_ptr)

{                                       /* HNM__match_ns */ if (np_ptr->np_par1 &&
        np_ptr->np_par2 == 0 &&
        memcmp(&np_ptr->np_nam1[1], &snsap_ptr->sn_name[1], 8) != 0)
    {
        return (-1);
    }
    else
        if (np_ptr->np_par1 &&
            np_ptr->np_par2)
    {
        if ((memcmp(&snsap_ptr->sn_name[1], &np_ptr->np_nam1[1], 8)
             < 0) ||
            (memcmp(&snsap_ptr->sn_name[1], &np_ptr->np_nam2[1], 8)
             > 0))
        {
            return (-1);
        }
    } if (np_ptr->np_par3 &&
        np_ptr->np_dsac != snsap_ptr->sn_dsac)
    {
        return (-1);
    } if (np_ptr->np_par4a &&
        np_ptr->np_par4b)
    {
        if (np_ptr->np_mp1c != gtcl11)
        {
            return (-1);
        }
        else
            if (memcmp(&np_ptr->np_mp1n[1], &snsap_ptr->sn_lsap[1], 8)
                != 0)
        {
            return (-1);
        }
    } if (np_ptr->np_par5a &&
        np_ptr->np_par5b)
    {
        if (np_ptr->np_mp2c != gtcl11)
        {
            return (-1);
        }
        else
```

C109

```
            if (memcmp(&np_ptr->np_mp2n[1], &snsap_ptr->sn_lsap[1], 8)
                != 0)
        {
            return (-1);
        }
    } if (np_ptr->np_par6 &&
        (np_ptr->np_venu[0] != snsap_ptr->sn_venu[0] ||
         np_ptr->np_venu[1] != snsap_ptr->sn_venu[1]))
    {
        return (-1);
    } if (np_ptr->np_par7 &&
        memcmp(&np_ptr->np_type[0], &snsap_ptr->sn_type[0], 4) != 0)
    {
        return (-1);
    } return (0);

}                               /* HNM__match_ns */
```

C110

```
/*
* Name:        pnx_trc.c
* Purpose:
* Functions in this module:
*/
void            pnx_trc();
void            format_gater();
void            format_packet();

#include "sys_head.h"
#include "pnx_trace.h"
#define PNXCMD1 "ipcs -m | sed -e '1,3d' -e '/D-/d' -e 's/^m */:/' -e 's/  */:/g'| cut -d: -f2,5 "
#define PNXCMD2 "cut -d: -f1"

int
pnx_getshmid(char *, int, char *);

int             parse_options();
extern char     *linkdate;

char            *module_name[] =
{
 "emu_x25",
 "pnx_admin",
 "pnx_gtin",
 "pnx_gtout",
 "pnx_misc",
 "pnx_uwkup",
 "pnx_x25in",
 "pnx_x25out",
 "pnx_xwkup",
 "pnx_vc_cmd",
 "pnx_inf",
 "pnx_init",
 "pnx_mem",
 "pnx_misc1",
 "pnx_misc2",
 "pnx_ns_cmd",
 "pnx_ump"
};

/*
** The following array and strings are used for printing X.25
** API related messages to syslog.
*/ const char      m_X25AUTH[] = "No permission to control link";
const char      m_X25BADID[] = "Invalid Connection Listen ID";
const char      m_X25CALLED[] = "Invalid Called Address";
const char      m_X25CALLING[] = "Invalid Calling Address";
const char      m_X25CTRUSE[] = "The counter has a non-zero value.";
const char      m_X25INIT[] = "X.25 already initialized for port";
const char      m_X25INVFAC[] = "Invalid facility requested";
const char      m_X25INVMON[] = "Invalid monitoring mode";
const char      m_X25LINKUSE[] = "X.25 port has active VCs";
const char      m_X25LONG[] = "Calling Parameter too long";
const char      m_X25NAMEUSED[] = "Routing List name in use";
const char      m_X25NOCARD[] = "No X.25 adapter";
const char      m_X25NOCTR[] = "No counters available.";
const char      m_X25NODATA[] = "No data on connection";
const char      m_X25NODEVICE[] = "No X.25 device driver";
const char      m_X25NOLINK[] = "X.25 port not connected";
const char      m_X25NONAME[] = "x25_listen name not in routing list";
const char      m_X25NOTPVC[] = "Requested PVC not configured";
const char      m_X25PROTOCOL[] = "X.25 protocol error";
const char      m_X25PVCUSED[] = "The PVC is being used";
const char      m_X25RESETCLEAR[] = "Reset or Clear received";
const char      m_X25TABLE[] = "Unable to update routing list";
const char      m_X25TIMEOUT[] = "Timeout occurred.";
const char      m_X25TOOMANYVCS[] = "Unable to open VC - maximum reached";
const char      m_X25AUTHCTR[] = "Not authorized to remove counter";
const char      m_X25AUTHLISTEN[] = "Not authorized to listen";
const char      m_X25BADCONNID[] = "Invalid Connection ID";
const char      m_X25BADDEVICE[] = "Invalid X.25 port name";
const char      m_X25BADLISTENID[] = "Invalid Listen ID";
const char      m_X25INVCTR[] = "Invalid Counter";
```

C111

```c
const char      m_X25LINKUP[] = "X.25 port already connected.";
const char      m_X25MAXDEVICE[] = "Attempt to use unconfigured X.25 port";
const char      m_X25MONITOR[] = "X.25 port already being monitored";
const char      m_X25NOACKREQ[] = "No X25 ACK required";
const char      m_X25NOSUCHLINK[] = "X.25 port does not exist";
const char      m_X25NOTINIT[] = "X.25 communications not initialized";
const char      m_X25TRUNCTX[] = "Packet size too big for internal buffers";
const char      m_X25SYSERR[] = "System error";
const char      m_NOMSG[] = "No Text";
const char      m_INVERR[] = "Unknown X.25 API error";

char            *x25_err_text[] =
{
    m_X25AUTH,                          /* (0)  */
    m_X25BADID,                         /* (1)  */
    m_X25CALLED,                        /* (2)  */
    m_X25CALLING,                       /* (3)  */
    m_NOMSG,                            /* X25CAUSE (4)  */
    m_X25CTRUSE,                        /* (5)  */
    m_X25INIT,                          /* (6)  */
    m_X25INVFAC,                        /* (7)  */
    m_X25INVMON,                        /* (8)  */
    m_X25LINKUSE,                       /* (9)  */
    m_X25LONG,                          /* (10) */
    m_X25NAMEUSED,                      /* (11) */
    m_NOMSG,                            /* X25NOACK (12) */
    m_X25NOCARD,                        /* (13) */
    m_X25NOCTR,                         /* (14) */
    m_X25NODATA,                        /* (15) */
    m_X25NODEVICE,                      /* (16) */
    m_NOMSG,                            /* X25NOIPC (17) */
    m_X25NOLINK,                        /* (18) */
    m_X25NONAME,                        /* (19) */
    m_NOMSG,                            /* X25NOROUTER (20) */
    m_X25NOTPVC,                        /* (21) */
    m_NOMSG,                            /* X25PGRP (22) */
    m_X25PROTOCOL,                      /* (23) */
    m_X25PVCUSED,                       /* (24) */
    m_NOMSG,                            /* X25RECEIVERINIT (25) */
    m_X25RESETCLEAR,                    /* (26) */
    m_NOMSG,                            /* X25ROUTERINIT (27) */
    m_X25TABLE,                         /* (28) */
    m_X25TIMEOUT,                       /* (29) */
    m_NOMSG,                            /* X25TRUNC (30) */
    m_NOMSG,                            /* X25TOOBIG (31) */
    m_X25TOOMANYVCS,                    /* (32) */
    m_NOMSG,                            /* (33) */
    m_NOMSG,                            /* (34) */
    m_NOMSG,                            /* (35) */
    m_NOMSG,                            /* (36) */
    m_NOMSG,                            /* (37) */
    m_NOMSG,                            /* (38) */
    m_NOMSG,                            /* (39) */
    m_NOMSG,                            /* (40) */
    m_NOMSG,                            /* (41) */
    m_NOMSG,                            /* (42) */
    m_NOMSG,                            /* (43) */
    m_NOMSG,                            /* (44) */
    m_NOMSG,                            /* (45) */
    m_NOMSG,                            /* (46) */
    m_NOMSG,                            /* (47) */
    m_NOMSG,                            /* (48) */
    m_NOMSG,                            /* (49) */
    m_NOMSG,                            /* (50) */
    m_X25AUTHCTR,                       /* (51) */
    m_X25AUTHLISTEN,                    /* (52) */
    m_X25BADCONNID,                     /* (53) */
    m_X25BADDEVICE,                     /* (54) */
    m_X25BADLISTENID,                   /* (55) */
    m_X25INVCTR,                        /* (56) */
    m_X25LINKUP,                        /* (57) */
    m_NOMSG,                            /* X25LONGCUD (58) */
    m_X25MAXDEVICE,                     /* (59) */
    m_X25MONITOR,                       /* (60) */
    m_X25NOACKREQ,                      /* (61) */
    m_X25NOSUCHLINK,                    /* (62) */
    m_X25NOTINIT,                       /* (63) */
```

C112

```c
    m_NOMSG,                    /* X25TRUNCRX (64) */
    m_X25TRUNCTX,               /* (65) */
    m_NOMSG,                    /* X25BADSTATUS (66) */
    m_X25SYSERR,                /* (67) */
    m_INVERR                    /* (68) */
};

/*******
 * main *
 *******/
void
main(argc, argv, envp)
int             argc;
char            *argv[];
char            *envp[];

{
    struct passwd   *pwent;
    char            *username;
    int             PNetX_pid, status, shmid, memsize, duration;
    int             items_traced = 0;
    int             N;
    unsigned        index, end_index;
    struct trace_buffer *pnx_trace, *trace;
    struct trace_item *item;
    int             rc, found;
    long            time_since_70;
    char            cmd_out[100];
    pwent = getpwuid(geteuid());
    if (pwent == NULL)
    {
        fprintf(stderr, "Unable to determine user name\n");
        exit(1);
    }
    username = strdup(pwent->pw_name);
    openlog(username, LOG_PID, LOG_LOCAL0);
    setlogmask(LOG_MASK(LOG_ERR)
              | LOG_MASK(LOG_WARNING)
              | LOG_MASK(LOG_DEBUG)
              | LOG_MASK(LOG_NOTICE));

parse_options(argc, argv);
    found = 0;

/* If trace is called with an argument then argv[optind], is the shmid we
     * need to look at */ if ((argc - optind == 1) && (atoi(argv[optind]) != 0))
    {
        shmid = atoi(argv[optind]);

/* attach pnx_trace to the memory and check if it PNetX shared memory */
        pnx_trace = (struct trace_buffer *) shmat(shmid, NULL, SHM_RDONLY);
        if (pnx_trace == (struct trace_buffer *) - 1)
        {
            perror("Cannot attach trace buffer");
            exit(0);
        }
        if (strcmp(pnx_trace->id, "PNetX Trace") != 0)
        {
            printf("%s: Shared Memory  - ID %d not a PNetX trace buffer!!!\n"
                    ,argv[0], shmid);

/* detach memory before exiting */
            if (shmdt((char *) pnx_trace) != 0)
            {
                printf("pnx_trace: Cannot detach trace buffer : shmid: %d: %s",
                        shmid, strerror(errno));
            }
            exit(0);
        }
    }
    else
    {
        if (argc - optind == 1)
        {
            syslog(LOG_INFO, "I347:  %s: Dumping PNetX trace", argv[0]);
```

C113

```c
    }
    /* if this function is called without any argument then we need to
     * look at each shared memory owned by user */
    N = 0;
    do
    {
        memset(cmd_out, 0, sizeof(cmd_out));
        rc = pnx_getshmid(cmd_out, sizeof(cmd_out), username);
        if (rc < 0)
        {
            if (argc - optind == 1)
            {
                syslog(LOG_ERR,
                    "E463:  %s: No PNetX shared trace buffer found: %m"
                    ,argv[0]);
                exit(0);
            }
            else
            {
                printf("%s: No PNetX shared trace buffer found", argv[0]);
                exit(0);
            }
        }
        shmid = atoi(cmd_out);
        /* attach pnx_trace to the memory and check if it PNetX shared
         * memory */
        pnx_trace = (struct trace_buffer *) shmat(shmid, NULL, SHM_RDONLY);
        if (pnx_trace == (struct trace_buffer *) - 1)
        {
            if (argc - optind == 1)
            {
                syslog(LOG_ERR,
                   "E458:  %s: Cannot attach trace buffer: %m", argv[0]);
                if (errno == EACCES)
                {
                    exit(0);
                }
            }
            else
            {
                perror("hvx_x25t: Cannot attach trace buffer");
                if (errno == EACCES)
                {
                    exit(0);
                }
            }
        } if (strcmp(pnx_trace->id, "PNetX Trace") != 0)
        {
            /* detach memory before getting next shared memory */
            if (shmdt((char *) pnx_trace) != 0)
            {
                if (argc - optind == 1)
                {
                    syslog(LOG_ERR,
                        "E459:  %s: Cannot detach buffer: %m", argv[0]);
                }
                else
                {
                    printf("%s: Cannot detach trace buffer", argv[0]);
                }
            }
            continue;
        }
        else
        {
            found = 1;
            break;
        }
    }
    while (N++ < 20);
    if (!found)
    {
        if (argc - optind == 1)
```

C114

```
                {
                    syslog(LOG_ERR,
                        "E460:  %s: No PNetX shared trace buffer found",
                        argv[0]);
                }
                else
                {
                    printf("%s: No PNetX shared trace buffer found\n", argv[0]);
                }
                exit(0);
        }
}
PNetX_pid = pnx_trace->PNetX_pid;

/* get local memory to copy the shared memory */
memsize = pnx_trace->size;
trace = memset(malloc(memsize), 0, memsize);

/* If the user who owns PNetX shared memory calls this subroutine, he can
 * send signal to PNetX to STOP/CONT PNetX process. So, in this case we
 * stop PNetX while we copy shared memory buffer. If an argument is
 * paassed we copy the shared memory without stopping the process. */
if (argc == optind)
{
    clock();
    kill(PNetX_pid, SIGSTOP);
    memcpy(trace, pnx_trace, memsize);
    kill(PNetX_pid, SIGCONT);
}
else
{
    memcpy(trace, pnx_trace, memsize);
} index = (++trace->index) & trace->modulo;
if (index == 0)
{
    end_index = trace->modulo;
}
else
{
    end_index = index - 1;
}

/* STAMP the time when the trace is taken */
time(&time_since_70);
printf("\t\tHVX :: PNetX Trace: %s \n", ctime(&time_since_70));

while (index != end_index)
{
    item = &trace->item[index];
    if (item->type != 0)
    {
        printf("%4.4d: ", index);
        format(item);
        items_traced++;
    }
    index = ++index & trace->modulo;
}

/* Print the last item */ if (item->type != 0)
{
    item = &trace->item[index];
    printf("%4.4d: ", index);
    format(item);
}
if (items_traced == 0)
{
    printf("No items in trace\n");
}
printf("PNetX Internal Trace complete\n");

if (shmdt((char *) pnx_trace) != 0)
{
    if ((argc - optind == 1) && (atoi(argv[optind]) != 0))
```

C115

```
            {
                syslog(LOG_ERR,
                    "E461:  %s: No PNetX shared trace buffer found", argv[0]);
            }
            else
            {
                printf("%s: Cannot detach trace buffer", argv[0]);
            }
            exit(0);
        }
}                                       /* main */
/****************
* format_gater  *
****************/

/* This function is called to format the trace items related to GATER */ void
format_gater(struct trace_item * item)
{
    char            *string;
    uchar           function;
    if ((item->type & 0x7f) == GATER_IN)
    {
        string = "From:";
    }
    else
    {
        string = "To:  ";
    } function = item->function & 0x7f;
    if (function > gtfinr)
    {
        function = 0;
    } printf("GATER %-13.13s %s %2.2X:%2.2X  VC_ID:0x%4.41X  UpperID:0x%8.81X\n",
            G_function[function], string, item->cse_lyr, item->dia_ins,
            item->our_id, item->their_id);
    return;
}

/****************
* format_packet *
****************/

/* This function is called to format the trace items related to X25 API calls*/ void
format_packet(struct trace_item * item)
{
    char            *in_or_out;
    char            *pkt_type;
    long            lcn, conn_id;

if ((item->type & 0x7f) == X25_INCOMING)
    {
        in_or_out = "Recvd:";
    }
    else
    {
        in_or_out = "Sent: ";
    } switch (item->function & 0x7f)
    {
    case (X25_INCOMING_CALL):
        pkt_type = "Call PKT";
        break;
    case (X25_CALL_CONNECTED):
        pkt_type = "Call Connected PKT";
        break;
    case (X25_DATA):
        pkt_type = "Data PKT";
        break;
```

C116

```
    case (X25_DATA_ACK):
        pkt_type = "Data ACK PKT";
        break;
    case (X25_INTERRUPT):
        pkt_type = "Interrupt PKT";
        break;
    case (X25_INTERRUPT_CONFIRM):
        pkt_type = "Interrupt CNF PKT";
        break;
    case (X25_CLEAR_INDICATION):
        pkt_type = "Clear PKT";
        break;
    case (X25_CLEAR_CONFIRM):
        pkt_type = "Clear CNF PKT";
        break;
    case (X25_RESET_INDICATION):
        pkt_type = "Reset PKT";
        break;
    case (X25_RESET_CONFIRM):
        pkt_type = "Reset CNF PKT";
        break;
    case (X25_INVALID_PACKET):
        pkt_type = "Invalid PKT";
        break;
    case (X25_NO_PACKET):
        pkt_type = "No PKT";
        break;
    case (X25_UNKNOWN_PACKET):
        pkt_type = "X25 Unknown PKT";
        break;
    default:
        pkt_type = "API Unknown PKT";
        printf("*****Unknown Packet Type (%2.2X):\n", item->function);
        break;
    }
    lcn = (item->their_id >> 16);
    conn_id = (item->their_id & 0x00FF);

switch (item->function)
    {
    case (X25_CLEAR_INDICATION):
    case (X25_CLEAR_CONFIRM):
    case (X25_RESET_INDICATION):
    case (X25_RESET_CONFIRM):
        printf("%-13.13s %2.2X/%2.2X %s      VC_ID:0x%4.41X  lcn:0x%2.21x conn_id:0x%4.41X\n",
               pkt_type, item->cse_lyr, item->dia_ins, in_or_out,
               item->our_id, lcn, conn_id);
        break;

default:
        printf("%-18.18s %s      VC_ID:0x%4.41X  lcn:0x%2.21x conn_id:0x%4.41X\n",
               pkt_type, in_or_out, item->our_id, lcn, conn_id);
        break;
    }
}

/**************
 * format_time *
 **************/
/* This function formats the time stamp */
void
format_time(struct trace_item * item)
{
    char            *month;
    switch (item->their_id)       /* month is stored in their_id */
    {
    case (0):
        month = "JAN";
        break;
    case (1):
        month = "FEB";
        break;
    case (2):
        month = "MAR";
        break;
    case (3):
        month = "APR";
```

C117

```
            break;
        case (4):
            month = "MAY";
            break;
        case (5):
            month = "JUNE";
            break;
        case (6):
            month = "JULY";
            break;
        case (7):
            month = "AUG";
            break;
        case (8):
            month = "SEPT";
            break;
        case (9):
            month = "OCT";
            break;
        case (10):
            month = "NOV";
            break;
        case (11):
            month = "DEC";
            break;
        }
        printf(" TIME :: %s %d  %2.2d:%2.2d:%2.2d \n", month,
                item->our_id, item->dia_ins, item->cse_lyr, item->function);
        return;
}

/*************
* format_ERR *
*************/

/* This function formats the  Errors reported from PNetX functions */ void
format_ERR(struct trace_item * item)
{
    int             our_x25_errno;
    if ((item->their_id == 0) && (item->our_id == 0))
    {
        printf("PNETX Error : %s:%d\n",
                module_name[item->cse_lyr], item->dia_ins);
    }
    else
    if (item->their_id == 0)
    {
        our_x25_errno = (item->our_id - X25ERRBASE);
        printf("PNetX X25 Error: - %s:%d %d:%s \n", module_name[item->cse_lyr],
                item->dia_ins, item->our_id, x25_err_text[our_x25_errno]);
    }
    else
    {
        printf("PNetX Sys Error %s:%d %d:%s\n", module_name[item->cse_lyr],
                item->dia_ins, item->their_id, strerror(item->their_id));
    }
    return;
}

/**********
* format  *
**********/
/* This function looks at the type of Trace item
*  and calls the corresponding format function */
void
format(struct trace_item * item)
{
    int             complete = 0;

switch (item->type & 0x7f)
    {
    case (GATER_IN):
    case (GATER_OUT):
        format_gater(item);
        break;
```

C118

```
    case (X25_INCOMING):
    case (X25_OUTGOING):
        format_packet(item);
        break;
    case (TRC_TIME):
        format_time(item);
        break;
    case (PNX_ERR):
        format_ERR(item);
        break;
    default:
        printf("Unknown trace item type 0x%2.2X\n", item->type);
    }
    if (!(item->type & COMPLETED))
    {
        printf("Previous event not completed: %d\n", (item->type & 0x7f));
    }
}

/****************
 * parse_options *
 ****************/
int
parse_options(argc, argv)
int             argc;
char            **argv;

{
    int             o;
    int             fcount = 0;
    extern char     *optarg;

while ((o = getopt(argc, argv, "vV")) != -1)
    {
        switch (o)
        {
        case 'V':
            hvx_verV("hvx_x25t");
            exit(0);
            break;

case 'v':
            setlogmask(LOG_MASK(LOG_ERR)
                    | LOG_MASK(LOG_WARNING)
                    | LOG_MASK(LOG_DEBUG)
                    | LOG_MASK(LOG_INFO)
                    | LOG_MASK(LOG_NOTICE));
            break;

default:
            break;

}                               /* switch */
    }                                   /* while */
    if (argc == 1)
        return (1);
    else
        return (0);
}                                       /* parse_options */
/****************
 * pnx_getshmid *
 ****************/

/* This function gets the shmid of all shared memory segments owned by a user
 * and passes it to the calling function */
int
pnx_getshmid(char *buff, int bufflen, char *username)
{
    char            CMD[100];
    static          cmd_exected = 0;
    static int      pipe_fd[2];
    int             child_pid;
    char            c;
    int             rc, cc;

cc = 0;
```

C119

```
    /* Create a pipe and fork a process to run the UNIX command to display
     * shared memory usage.  Output of the command goes to the pipe. */
    pipe(pipe_fd);
    if (!cmd_exected++)
    {
        if ((child_pid = fork()) > 0)
        {
            /* parent */
            close(pipe_fd[1]);      /* close write end */
            dup2(pipe_fd[0], 0);    /* read end is now stdin */
            close(pipe_fd[0]);      /* close original read end */
            waitpid(child_pid);
        }
        else
        {
            /* child process */
            close(pipe_fd[0]);      /* close read end */
            dup2(pipe_fd[1], 1);    /* duplicate write end into stdout */
            close(pipe_fd[1]);      /* close original write end */
            sprintf(CMD, "%s | grep %s | %s", PNXCMD1, username, PNXCMD2);
            system(CMD);
            exit(0);
        }
    }
/* This is the parent.  Read and parse the output from the child process. */
    while ((rc = read(0, buff, 1)) == 1)
    {
        cc++;
        if (*buff++ == '\n' || cc == bufflen)
        {
            printf("\n");
            return (cc);
        }
    }
    printf("Nothing READ\n");
    return (rc);
}
```

C120

```
/*
*   Name:       pnx_ump.c
*   Purpose:    PNetX administration functions
*   Functions in this module:
*       (see pnx_func.h for prototype declarations)
*
    int         pnx_VHR__vc_hist_rprt()
    int         pnx_CLS__vc_close()
    int         pnx_VCE__vc_error()
    int         pnx_NSE__ns_error()
    int         pnx_NSN__ns_error2()
    int         pnx_OPN__vc_open()
    int         pnx_OPF__vc_open_fail()
    void        pnx_VRP__vc_resp_param()
    void        pnx_ORP__vc_open_param()
    struct GATER    *pnx_UMG__unsol_msg_gater()
    int         pnx_INQ__info_request()
    int         pnx_LSI__process_sap_info()

*/ include "sys_head.h"
include "emu_head.h"
#include "macro.h"
#include "mqi_head.h"
#include "z_rb.h"
#include "z3irb.h"
include <x25sdefs.h> include "pnx_head.h"
include "pnx_vccb.h"
#include "hvx_phd.h"
#include "pnx_snsap.h"
#include "hvx_gater.h"
#include "hvx_lme.h"
#include "x25vce.h"

extern char     *base;

extern struct pnx_global *PnetXGlobal;

/*************************
* pnx_VHR__vc_hist_rprt *
*************************/

/* This routine is used to issue a VC History Report unsolicited message.
*
* This routine builds an unsolicited message gater and issues a gate request
* to the administration layer. */ int
pnx_VHR__vc_hist_rprt(struct vccb * vccb_ptr)

{                               /* VHR__vc_hist_rprt */ struct IRB      *irb_ptr;
    struct RB       *iorb_ptr;
    struct GATER    *gater_ptr;
    unsigned char   *var_ptr;
    unsigned char   *aptr;
    unsigned short  funct;
    unsigned short  class;

/* Setup fixed part of unsolicited message gater. */ if (pnx_get_next_vc_receive(&irb_ptr, &iorb_ptr) != 0)
    {
        return (-1);
    }
    gater_ptr = pnx_UMG__unsol_msg_gater(iorb_ptr);

/* Setup function code and object class */ var_ptr = &gater_ptr->gt_var[0];
```

C121

```
        *var_ptr++ = gtfunc;            /* function */
        *var_ptr++ = 2;
        funct = gthist;
        aptr = (unsigned char *) &funct;
        *var_ptr++ = *aptr++;
        *var_ptr++ = *aptr++;
        gater_ptr->gt_vln += 4;

*var_ptr++ = gtobjc;            /* object class */
        *var_ptr++ = 2;
        class = gtclvc;
        aptr = (unsigned char *) &class;
        *var_ptr++ = *aptr++;
        *var_ptr++ = *aptr++;
        gater_ptr->gt_vln += 4;

/* Setup common response parameters for virtual circuits. */ pnx_VRP__vc_resp_param(gater_ptr, vccb_ptr);

/* Setup history parameters for virtual circuit. */

*var_ptr++ = gtrsp8;            /* data-packets-sent */
        *var_ptr++ = 4;
        aptr = (unsigned char *) &vccb_ptr->vc_epd;
        *var_ptr++ = *aptr++;
        *var_ptr++ = *aptr++;
        *var_ptr++ = *aptr++;
        *var_ptr++ = *aptr++;
        gater_ptr->gt_vln += 6;

*var_ptr++ = gtrsp9;            /* interrupt-packets-sent */
        *var_ptr++ = 2;
        aptr = (unsigned char *) &vccb_ptr->vc_eed;
        *var_ptr++ = *aptr++;
        *var_ptr++ = *aptr++;
        gater_ptr->gt_vln += 4;

*var_ptr++ = gtrs10;            /* control-packets-sent */
        *var_ptr++ = 4;
        aptr = (unsigned char *) &vccb_ptr->vc_epc;
        *var_ptr++ = *aptr++;
        *var_ptr++ = *aptr++;
        *var_ptr++ = *aptr++;
        *var_ptr++ = *aptr++;
        gater_ptr->gt_vln += 6;

*var_ptr++ = gtrs11;            /* data-characters-sent */
        *var_ptr++ = 4;
        aptr = (unsigned char *) &vccb_ptr->vc_eda;
        *var_ptr++ = *aptr++;
        *var_ptr++ = *aptr++;
        *var_ptr++ = *aptr++;
        *var_ptr++ = *aptr++;
        gater_ptr->gt_vln += 6;

*var_ptr++ = gtrs12;            /* packet-sequences-sent */
        *var_ptr++ = 4;
        aptr = (unsigned char *) &vccb_ptr->vc_esd;
        *var_ptr++ = *aptr++;
        *var_ptr++ = *aptr++;
        *var_ptr++ = *aptr++;
        *var_ptr++ = *aptr++;
        gater_ptr->gt_vln += 6;

*var_ptr++ = gtrs17;            /* accounting-units-sent  */
        *var_ptr++ = 2;
        aptr = (unsigned char *) &vccb_ptr->vc_esg;
        *var_ptr++ = *aptr++;
        *var_ptr++ = *aptr++;
        gater_ptr->gt_vln += 4;

*var_ptr++ = gtrs18;            /* data-packets-received */
        *var_ptr++ = 4;
        aptr = (unsigned char *) &vccb_ptr->vc_rpd;
        *var_ptr++ = *aptr++;
```

C122

```
    *var_ptr++ = *aptr++;
    *var_ptr++ = *aptr++;
    *var_ptr++ = *aptr++;
    gater_ptr->gt_vln += 6;

*var_ptr++ = gtrs19;        /* control-packets-recvd */
    *var_ptr++ = 4;
    aptr = (unsigned char *) &vccb_ptr->vc_rpc;
    *var_ptr++ = *aptr++;
    *var_ptr++ = *aptr++;
    *var_ptr++ = *aptr++;
    *var_ptr++ = *aptr++;
    gater_ptr->gt_vln += 6;

*var_ptr++ = gtrs20;        /* data-characters-recvd */
    *var_ptr++ = 4;
    aptr = (unsigned char *) &vccb_ptr->vc_rda;
    *var_ptr++ = *aptr++;
    *var_ptr++ = *aptr++;
    *var_ptr++ = *aptr++;
    *var_ptr++ = *aptr++;
    gater_ptr->gt_vln += 6;

*var_ptr++ = gtrs21;        /* packet-sequences-recvd */
    *var_ptr++ = 4;
    aptr = (unsigned char *) &vccb_ptr->vc_rsd;
    *var_ptr++ = *aptr++;
    *var_ptr++ = *aptr++;
    *var_ptr++ = *aptr++;
    *var_ptr++ = *aptr++;
    gater_ptr->gt_vln += 6;

*var_ptr++ = gtrs22;        /* accounting-units-recvd */
    *var_ptr++ = 2;
    aptr = (unsigned char *) &vccb_ptr->vc_rsg;
    *var_ptr++ = *aptr++;
    *var_ptr++ = *aptr++;
    gater_ptr->gt_vln += 4;

*var_ptr++ = gtrs23;        /* resets-sent */
    *var_ptr++ = 2;
    aptr = (unsigned char *) &vccb_ptr->vc_ers;
    *var_ptr++ = *aptr++;
    *var_ptr++ = *aptr++;
    gater_ptr->gt_vln += 4;

*var_ptr++ = gtrs24;        /* resets-received */
    *var_ptr++ = 2;
    aptr = (unsigned char *) &vccb_ptr->vc_rrs;
    *var_ptr++ = *aptr++;
    *var_ptr++ = *aptr++;
    gater_ptr->gt_vln += 4;

/* Issue gate request for unsolicited message. */ pnx_post_request(irb_ptr);

return (0);

}                               /* VHR__vc_hist_rprt */

/*********************
* pnx_CLS__vc_close *
*********************/

/* This routine is used to issue a VC Close unsolicited message.
*
* This routine builds an unsolicited message gater and issues a gate request
* to the administration layer. */
int
pnx_CLS__vc_close(struct vccb * vccb_ptr, ushort rsn_code)

{                               /* CLS__vc_close */ struct IRB      *irb_ptr;
```

C123

```c
    struct RB        *iorb_ptr;
    struct GATER     *gater_ptr;
    unsigned char    *var_ptr;
    unsigned char    *aptr;
    unsigned short   funct;
    unsigned short   class;

/* Setup fixed part of unsolicited message gater. */ if (pnx_get_next_vc_receive(&irb_ptr, &iorb_ptr) != 0)
    {
        return (-1);
    }
    gater_ptr = pnx_UMG__unsol_msg_gater(iorb_ptr);

/* Setup function code and object class */ var_ptr = &gater_ptr->gt_var[0];

*var_ptr++ = gtfunc;          /* function */
    *var_ptr++ = 2;
    funct = gtclos;
    aptr = (unsigned char *) &funct;
    *var_ptr++ = *aptr++;
    *var_ptr++ = *aptr++;
    gater_ptr->gt_vln += 4;

*var_ptr++ = gtobjc;          /* object class */
    *var_ptr++ = 2;
    class = gtclvc;
    aptr = (unsigned char *) &class;
    *var_ptr++ = *aptr++;
    *var_ptr++ = *aptr++;
    gater_ptr->gt_vln += 4;

/* Setup common response parameters for virtual circuits. */ pnx_VRP__vc_resp_param(gater_ptr, vccb_ptr);

/* Setup reason code for virtual circuit close. */ var_ptr = &gater_ptr->gt_var[gater_ptr->gt_vln];

*var_ptr++ = gtrs10;          /* reason code */
    *var_ptr++ = 2;
    aptr = (unsigned char *) &rsn_code;
    *var_ptr++ = *aptr++;
    *var_ptr++ = *aptr++;
    gater_ptr->gt_vln += 4;

/* Setup VAN reason code for virtual circuit close. */ if (rsn_code == VCC_NML &&
        vccb_ptr->vc_state == VC_P7)
    {
        *var_ptr++ = gtrs11;      /* VAN reason code */
        *var_ptr++ = 4;
        *var_ptr++ = 16;          /* field type (hex) */
        *var_ptr++ = 4;           /* field size (hex digits) */
        *var_ptr++ = vccb_ptr->vc_cause;
        *var_ptr++ = vccb_ptr->vc_diag;
        gater_ptr->gt_vln += 6;
    }

/* Issue gate request for unsolicited message. */ pnx_post_request(irb_ptr);

return (0);

}                                 /* CLS__vc_close */

/*********************
* pnx_VCE__vc_error *
*********************/
```

C124

```c
/* This routine is used to issue a VC Error Message.
 *
 * This routine builds an unsolicited message gater and issues a gate request
 * to the administration layer. */
int
pnx_VCE__vc_error(struct vccb * vccb_ptr, ushort rsn_code)
{                                       /* VCE__vc_error */
    struct IRB      *irb_ptr;
    struct RB       *iorb_ptr;
    struct GATER    *gater_ptr;
    unsigned char   *var_ptr;
    unsigned char   *aptr;
    unsigned short  funct;
    unsigned short  class;

/* Setup fixed part of unsolicited message gater. */ if (pnx_get_next_vc_receive(&irb_ptr, &iorb_ptr) != 0)
    {
        return (-1);
    }
    gater_ptr = pnx_UMG__unsol_msg_gater(iorb_ptr);

/* Setup function code and object class */ var_ptr = &gater_ptr->gt_var[0];

*var_ptr++ = gtfunc;           /* function */
    *var_ptr++ = 2;
    funct = gterr;
    aptr = (unsigned char *) &funct;
    *var_ptr++ = *aptr++;
    *var_ptr++ = *aptr++;
    gater_ptr->gt_vln += 4;

*var_ptr++ = gtobjc;           /* object class */
    *var_ptr++ = 2;
    class = gtclvc;
    aptr = (unsigned char *) &class;
    *var_ptr++ = *aptr++;
    *var_ptr++ = *aptr++;
    gater_ptr->gt_vln += 4;

/* Setup common response parameters for virtual circuits. */ pnx_VRP__vc_resp_param(gater_ptr, vccb_ptr);

/* Setup reason code for virtual circuit error. */ var_ptr = &gater_ptr->gt_var[gater_ptr->gt_vln];

*var_ptr++ = gtrs10;           /* reason code */
    *var_ptr++ = 2;
    aptr = (unsigned char *) &rsn_code;
    *var_ptr++ = *aptr++;
    *var_ptr++ = *aptr++;
    gater_ptr->gt_vln += 4;

/* Setup VAN reason code for virtual circuit error. */ if (rsn_code == VCE_RES)
    {
        *var_ptr++ = gtrs11;       /* VAN reason code */
        *var_ptr++ = 4;
        *var_ptr++ = 16;           /* field type (hex) */
        *var_ptr++ = 4;            /* field size (hex digits) */
        *var_ptr++ = vccb_ptr->vc_cause;
        *var_ptr++ = vccb_ptr->vc_diag;
        gater_ptr->gt_vln += 6;
    }

/* Issue gate request for unsolicited message. */ pnx_post_request(irb_ptr);
```

C125

```
    return (0);
}                                       /* VCE__vc_error */

/*********************
 * pnx_NSE__ns_error *
 *********************/

/* This routine builds a network subscription error unsolicited message
 * gater and issues a gate request to the administration layer. */
int
pnx_NSE__ns_error(struct snsap * snsap_ptr, ushort rsn_code)
{                                       /* NSE__ns_error */
    struct IRB      *irb_ptr;
    struct RB       *iorb_ptr;
    struct GATER    *gater_ptr;
    unsigned char   *var_ptr;
    unsigned char   *aptr;
    unsigned short  s_len;
    unsigned short  funct;
    unsigned short  class;

/* Setup fixed part of unsolicited message gater. */ if (pnx_get_next_vc_receive(&irb_ptr, &iorb_ptr) != 0)
    {
        return (-1);
    }
    gater_ptr = pnx_UMG__unsol_msg_gater(iorb_ptr);

/* Setup variable part of network subscription error gater. */ var_ptr = &gater_ptr->gt_var[0];

*var_ptr++ = gtfunc;        /* function */
    *var_ptr++ = 2;
    funct = gterrr;
    aptr = (unsigned char *) &funct;
    *var_ptr++ = *aptr++;
    *var_ptr++ = *aptr++;
    gater_ptr->gt_vln += 4;

*var_ptr++ = gtobjc;        /* object class */
    *var_ptr++ = 2;
    class = gtclns;
    aptr = (unsigned char *) &class;
    *var_ptr++ = *aptr++;
    *var_ptr++ = *aptr++;
    gater_ptr->gt_vln += 4;

*var_ptr++ = gtrsp1;        /* NS name */
    s_len = snsap_ptr->sn_name[0];
    *var_ptr++ = s_len;
    memcpy(var_ptr, &snsap_ptr->sn_name[1], s_len);
    var_ptr += s_len;
    gater_ptr->gt_vln += s_len + 2;

*var_ptr++ = gtrsp2;        /* DSAC state */
    *var_ptr++ = 2;
    aptr = (unsigned char *) &snsap_ptr->sn_dsac;
    *var_ptr++ = *aptr++;
    *var_ptr++ = *aptr++;
    gater_ptr->gt_vln += 4;

*var_ptr++ = gtrsp3;        /* reason code */
    *var_ptr++ = 2;
    aptr = (unsigned char *) &rsn_code;
    *var_ptr++ = *aptr++;
    *var_ptr++ = *aptr++;
    gater_ptr->gt_vln += 4;

/* Issue gate request for unsolicited message. */
```

C126

```
    pnx_post_request(irb_ptr);

return (0);

}                                       /* NSE__ns_error */

/*********************
* pnx_NSN__ns_error2 *
*********************/

/* This routine builds a network subscription error unsolicited message
 * gater and issues a gate request to the administration layer. It is used
 * when no SNSAP structure exists. It accepts a pointer to a character
 * string containing the NS name from the GATER, or NULL. */
int
pnx_NSN__ns_error2(char *ns_name, ushort rsn_code)

{                                       /* NSE__ns_error */ struct IRB      *irb_ptr;
    struct RB       *iorb_ptr;
    struct GATER    *gater_ptr;
    unsigned char   *var_ptr;
    unsigned char   *aptr;
    unsigned short  s_len;
    unsigned short  funct;
    unsigned short  class;

/* Setup fixed part of unsolicited message gater. */ if (pnx_get_next_vc_receive(&irb_ptr, &iorb_ptr) != 0)
    {
        return (-1);
    }
    gater_ptr = pnx_UMG__unsol_msg_gater(iorb_ptr);

/* Setup variable part of network subscription error gater. */ var_ptr = &gater_ptr->gt_var[0];

*var_ptr++ = gtfunc;            /* function */
    *var_ptr++ = 2;
    funct = gterrr;
    aptr = (unsigned char *) &funct;
    *var_ptr++ = *aptr++;
    *var_ptr++ = *aptr++;
    gater_ptr->gt_vln += 4;

*var_ptr++ = gtobjc;            /* object class */
    *var_ptr++ = 2;
    class = gtclns;
    aptr = (unsigned char *) &class;
    *var_ptr++ = *aptr++;
    *var_ptr++ = *aptr++;
    gater_ptr->gt_vln += 4;

/* Allow call with no NS name */
    if (ns_name == NULL)
    {
        ns_name = "*NO NS*";
        s_len = 7;
    }
    else
    {
        s_len = *ns_name++;
    }

*var_ptr++ = gtrsp1;            /* NS name */
    *var_ptr++ = s_len;
    memcpy(var_ptr, ns_name, s_len);
    var_ptr += s_len;
    gater_ptr->gt_vln += s_len + 2;

*var_ptr++ = gtrsp3;            /* reason code */
```

C127

```
    *var_ptr++ = 2;
    aptr = (unsigned char *) &rsn_code;
    *var_ptr++ = *aptr++;
    *var_ptr++ = *aptr++;
    gater_ptr->gt_vln += 4;

/* Issue gate request for unsolicited message. */ pnx_post_request(irb_ptr);

return (0);

}                                   /* NSN__ns_error2 */

/*******************
 * pnx_OPN__vc_open *
 *******************/

/* This routine is used to issue a VC Open unsolicited message.
 *
 * This routine builds an unsolicited message gater and issues a gate request
 * to the administration layer. */
int
pnx_OPN__vc_open(struct vccb * vccb_ptr)

{                                   /* OPN__vc_open */
    struct IRB      *irb_ptr;
    struct RB       *iorb_ptr;
    struct GATER    *gater_ptr;
    unsigned char   *var_ptr;
    unsigned char   *aptr;
    unsigned short  funct;
    unsigned short  class;

/* Setup fixed part of unsolicited message gater. */ if (pnx_get_next_vc_receive(&irb_ptr, &iorb_ptr) != 0)
    {
        return (-1);
    }
    gater_ptr = pnx_UMG__unsol_msg_gater(iorb_ptr);

/* Setup function code and object class */ var_ptr = &gater_ptr->gt_var[0];

*var_ptr++ = gtfunc;            /* function */
    *var_ptr++ = 2;
    funct = gtopen;
    aptr = (unsigned char *) &funct;
    *var_ptr++ = *aptr++;
    *var_ptr++ = *aptr++;
    gater_ptr->gt_vln += 4;

*var_ptr++ = gtobjc;            /* object class */
    *var_ptr++ = 2;
    class = gtclvc;
    aptr = (unsigned char *) &class;
    *var_ptr++ = *aptr++;
    *var_ptr++ = *aptr++;
    gater_ptr->gt_vln += 4;

/* Setup common response parameters for virtual circuits. */ pnx_VRP__vc_resp_param(gater_ptr, vccb_ptr);

/* Setup specific response parameters for vc open. */ pnx_ORP__vc_open_param(gater_ptr, vccb_ptr);

/* Issue gate request for unsolicited message. */ pnx_post_request(irb_ptr);
```

C128

```
        return (0);
    }                               /* OPN__vc_open */

/************************
 * pnx_OPF__vc_open_fail *
 ************************/

/* This routine is used to issue a VC Open-Fail unsolicited message.
 *
 * This routine builds an unsolicited message gater and issues a gate request
 * to the administration layer. */
int
pnx_OPF__vc_open_fail(struct vccb * vccb_ptr, ushort rsn_code)
{                               /* OPF__vc_open_fail */
    struct IRB      *irb_ptr;
    struct RB       *iorb_ptr;
    struct GATER    *gater_ptr;
    unsigned char   *var_ptr;
    unsigned char   *aptr;
    unsigned short   funct;
    unsigned short   class;

/* Setup fixed part of unsolicited message gater. */ if (pnx_get_next_vc_receive(&irb_ptr, &iorb_ptr) != 0)
    {
        return (-1);
    }
    gater_ptr = pnx_UMG__unsol_msg_gater(iorb_ptr);

/* Setup function code and object class */ var_ptr = &gater_ptr->gt_var[0];

*var_ptr++ = gtfunc;            /* function */
    *var_ptr++ = 2;
    funct = gtopnf;
    aptr = (unsigned char *) &funct;
    *var_ptr++ = *aptr++;
    *var_ptr++ = *aptr++;
    gater_ptr->gt_vln += 4;

*var_ptr++ = gtobjc;            /* object class */
    *var_ptr++ = 2;
    class = gtclvc;
    aptr = (unsigned char *) &class;
    *var_ptr++ = *aptr++;
    *var_ptr++ = *aptr++;
    gater_ptr->gt_vln += 4;

/* Setup common response parameters for virtual circuits. */ pnx_VRP__vc_resp_param(gater_ptr, vccb_ptr);

/* Setup specific response parameters for vc open-fail. */ pnx_ORP__vc_open_param(gater_ptr, vccb_ptr);

/* Setup reason code for virtual circuit open-fail. */ var_ptr = &gater_ptr->gt_var[gater_ptr->gt_vln];

*var_ptr++ = gtrs10;            /* reason code */
    *var_ptr++ = 2;
    aptr = (unsigned char *) &rsn_code;
    *var_ptr++ = *aptr++;
    *var_ptr++ = *aptr++;
    gater_ptr->gt_vln += 4;

/* Setup VAN reason code for virtual circuit open-fail. */ if (rsn_code == VCF_REF)
```

C129

```
    {
        *var_ptr++ = gtrs11;      /* VAN reason code */
        *var_ptr++ = 4;
        *var_ptr++ = 16;          /* field type (hex) */
        *var_ptr++ = 4;           /* field size (hex digits) */
        *var_ptr++ = vccb_ptr->vc_cause;
        *var_ptr++ = vccb_ptr->vc_diag;
        gater_ptr->gt_vln += 6;
    }

/* Issue gate request for unsolicited message. */ pnx_post_request(irb_ptr);

return (0);

}                                 /* OPF__vc_open_fail */

/***************************
 *  pnx_VRP__vc_resp_param  *
 ***************************/

/* This routine builds the response parameters common to all virtual circuit
 * unsolicited messages. */
void
pnx_VRP__vc_resp_param(struct GATER * gater_ptr, struct vccb * vccb_ptr)
{                                 /* VRP__vc_resp_param */
    unsigned char   *var_ptr;
    unsigned char   *aptr;
    unsigned short  s_len, lcn;
    struct snsap    *snsap_ptr;
    struct snsap    *rsap_ptr;

var_ptr = &gater_ptr->gt_var[gater_ptr->gt_vln];
    snsap_ptr = vccb_ptr->vc_snsap;

*var_ptr++ = gtrsp1;          /* VC index */
    *var_ptr++ = 2;
    aptr = (unsigned char *) &vccb_ptr->vc_ndxid;
    *var_ptr++ = *aptr++;
    *var_ptr++ = *aptr++;
    gater_ptr->gt_vln += 4;

*var_ptr++ = gtrsp2;          /* local-endpt (NS proper) */
    s_len = snsap_ptr->sn_name[0];
    *var_ptr++ = s_len;
    memcpy(var_ptr, &snsap_ptr->sn_name[1], s_len);
    var_ptr += s_len;
    gater_ptr->gt_vln += s_len + 2;

if (vccb_ptr->vc_rssap != NULL)
    {
        *var_ptr++ = gtrsp3;      /* remote-endpt (NS image) */
        rsap_ptr = vccb_ptr->vc_rssap;
        s_len = rsap_ptr->sn_name[0];
        *var_ptr++ = s_len;
        memcpy(var_ptr, &rsap_ptr->sn_name[1], s_len);
        var_ptr += s_len;
        gater_ptr->gt_vln += s_len + 2;
    } if (vccb_ptr->vc_pvc == 0)
    {
        *var_ptr++ = gtrsp5;      /* init-or-accept          */
        *var_ptr++ = 2;
        aptr = (unsigned char *) &vccb_ptr->vc_in_ac;
        *var_ptr++ = *aptr++;
        *var_ptr++ = *aptr++;
        gater_ptr->gt_vln += 4;
    } if (vccb_ptr->vc_init &&
        vccb_ptr->vc_cdna[0] != 0)
```

C130

```
    {
        *var_ptr++ = gtrsp6;        /* remote call number */
        s_len = ((vccb_ptr->vc_cdna[0] + 1) / 2) + 2;
        *var_ptr++ = s_len;
        *var_ptr++ = 16;
        *var_ptr++ = vccb_ptr->vc_cdna[0];
        pnx_MNA__move_net_addr(&vccb_ptr->vc_cdna[1], 0,
                                var_ptr, 0, vccb_ptr->vc_cdna[0]);
        var_ptr += ((vccb_ptr->vc_cdna[0] + 1) / 2);
        gater_ptr->gt_vln += s_len + 2;
    }
    else
        if (vccb_ptr->vc_init == 0 &&
            vccb_ptr->vc_cgna[0] != 0)
    {
        *var_ptr++ = gtrsp6;        /* remote call number */
        s_len = ((vccb_ptr->vc_cgna[0] + 1) / 2) + 2;
        *var_ptr++ = s_len;
        *var_ptr++ = 16;
        *var_ptr++ = vccb_ptr->vc_cgna[0];
        pnx_MNA__move_net_addr(&vccb_ptr->vc_cgna[1], 0,
                                var_ptr, 0, vccb_ptr->vc_cgna[0]);
        var_ptr += ((vccb_ptr->vc_cgna[0] + 1) / 2);
        gater_ptr->gt_vln += s_len + 2;
    }

*var_ptr++ = gtrsp7;            /* vc_id_no (lcn) */
    *var_ptr++ = 2;
    lcn = (vccb_ptr->vc_lcgn << 8) | vccb_ptr->vc_lcn;
    aptr = (unsigned char *) &lcn;
    *var_ptr++ = *aptr++;
    *var_ptr++ = *aptr++;
    gater_ptr->gt_vln += 4;

return;

}                                   /* VRP__vc_resp_param */

/***************************
 *  pnx_ORP__vc_open_param *
 ***************************/

/* This routine builds the response parameters common to vc open, and vc
 * open-fail unsolicited messages. */
void
pnx_ORP__vc_open_param(struct GATER * gater_ptr, struct vccb * vccb_ptr)

{                                   /* ORP__vc_open_param */
    unsigned char   *var_ptr;
    unsigned char   *aptr;

var_ptr = &gater_ptr->gt_var[gater_ptr->gt_vln];

*var_ptr++ = gtrs13;            /* Emit packet size */
    *var_ptr++ = 2;
    aptr = (unsigned char *) &vccb_ptr->vc_pdux;
    *var_ptr++ = *aptr++;
    *var_ptr++ = *aptr++;
    gater_ptr->gt_vln += 4;

*var_ptr++ = gtrs14;            /* Recv packet size */
    *var_ptr++ = 2;
    aptr = (unsigned char *) &vccb_ptr->vc_pdur;
    *var_ptr++ = *aptr++;
    *var_ptr++ = *aptr++;
    gater_ptr->gt_vln += 4;

*var_ptr++ = gtrs15;            /* Emit window size */
    *var_ptr++ = 2;
    aptr = (unsigned char *) &vccb_ptr->vc_wndx;
    *var_ptr++ = *aptr++;
    *var_ptr++ = *aptr++;
    gater_ptr->gt_vln += 4;
```

C131

```
        *var_ptr++ = gtrs16;         /* Recv window size */
        *var_ptr++ = 2;
        aptr = (unsigned char *) &vccb_ptr->vc_wndr;
        *var_ptr++ = *aptr++;
        *var_ptr++ = *aptr++;
        gater_ptr->gt_vln += 4;

if (vccb_ptr->vc_thrx != 0)
        {
            *var_ptr++ = gtrs17;     /* Emit thruput class */
            *var_ptr++ = 2;
            aptr = (unsigned char *) &vccb_ptr->vc_thrx;
            *var_ptr++ = *aptr++;
            *var_ptr++ = *aptr++;
            gater_ptr->gt_vln += 4;
        } if (vccb_ptr->vc_thrr != 0)
        {
            *var_ptr++ = gtrs18;     /* Recv thruput class */
            *var_ptr++ = 2;
            aptr = (unsigned char *) &vccb_ptr->vc_thrr;
            *var_ptr++ = *aptr++;
            *var_ptr++ = *aptr++;
            gater_ptr->gt_vln += 4;
        } return;
}                                    /* ORP__vc_open_param */

/****************************
* pnx_UMG__unsol_msg_gater *
****************************/

/* This routine gets and initializes an unsolicited message gater */ struct GATER    *
pnx_UMG__unsol_msg_gater(struct RB * iorb_ptr)

{                                    /* UMG__unsol_msg_gater */ struct GATER    *gater_ptr;

RISC_ADDR(gater_ptr, (struct GATER *), iorb_ptr->rb_adr);

/* Initialize fixed part of unsolicited message gater. */ gater_ptr->gt_pri = 0;
    PUT4(gater_ptr->gt_nxt, 0);
    *(long *) gater_ptr->gt_mkr = *(long *) 'GT01';
    gater_ptr->gt_slr = gt_nwc;
    gater_ptr->gt_sin = gt_x25;
    gater_ptr->gt_dlr = gt_apl;
    gater_ptr->gt_din = gt_nad;
    gater_ptr->gt_fnc = gtfaum;
    PUT4(gater_ptr->gt_sce, 0);
    PUT4(gater_ptr->gt_dst, 0);
    PUT4(gater_ptr->gt_dta, 0);
    gater_ptr->gt_dis = 0;
    gater_ptr->gt_crn = 0;
    gater_ptr->gt_cre = 0;
    gater_ptr->gt_flg = 0;
    gater_ptr->gt_vln = 0;

return (gater_ptr);

}                                    /* UMG__unsol_msg_gater */

/****************************
* pnx_LSI__process_sap_info *
****************************/
int
```

C132

```
pnx_LSI__process_sap_info(struct GATER * gater)
{
    /* this may need to be copied to handle Link Disconnected errors from the
     * X.25 API */
}
```

C133

```
/*
 * Name:        pnx_uwkup.c
 * Purpose:     process incoming user (PNet) event
 * Functions in this module:
 *      (see pnx_func.h for prototype declarations)
 *
 *  void        mqi_input()
 *  void        pnx_user_fsm1()
 *  void        pnx_user_fsm2()
 *
 */ include "sys_head.h"
include "emu_head.h"
#include "err_head.h"
#include "macro.h"
#include "mqi_head.h"
#include "z3rct.h"
#include "z_rb.h"
#include "z3irb.h"
#include "enable.h"

#include <x25sdefs.h>
include "pnx_head.h"
include "pnx_vccb.h"
#include "pnx_snsap.h"
#include "hvx_lme.h"
#include "hvx_gater.h"
#include "hvx_phd.h"
#include "pnx_trace.h"
#include "x25dia.h"
#include "x25sta.h"
#include "x25vce.h"

extern char      *base;

extern struct EMU_OPTS opt;

extern struct pnx_global *PnetXGlobal;

extern sigset_t   pnx_sigs;

extern struct sigaction pnx_actions;

extern struct COMPONENTS allow;

static union MATH math;

/************
 * mqi_input *
 ************/

/* This function is part of the SIGUSR1 signal handler.  It is the entry
 * point to PNetX for all I/O requests from PNet.  While processing here and
 * in all subordinate functions, SIGUSR1 & SIGCHLD are blocked */
void
mqi_input()
{
    struct RCT      *rct;
    struct RB       *iorb;
    struct IRB      *irb;
    short            func;
    char            *rb_buffer;
    ushort           nad_index;   /* used for ConnReq, ConnRsp ONLY */
    struct MQI      *qh;
#ifdef PNXDEBUG
    syslog(LOG_DEBUG, "mqi_input");
#endif
    rct = PnetXGlobal->pnx_rct;
    /* make sure MQI queue is non-null */
    qh = &rct->qaddr;
    lock(qh->isem.sid);
    GET4(math.adrs, qh->rqh.fwd);
    if (math.adrs == (unsigned long) qh)
    {
```

C134

```
          /* empty queue */
#ifdef PNXDEBUG
          syslog(LOG_DEBUG, "mqi_input - empty queue");
#endif
          irb = NULL;
      }
      else
      {
          irb = (struct IRB *) mqi_dqh_nolock(qh);
      } while (irb)
      {
          unlock(qh->isem.sid);
ifdef PNXDEBUG
          syslog(LOG_DEBUG, "mqi_input - irb@%8.81X", (ulong) irb);
#endif
          /* pull out IORB, function code, and buffer */
          RISC_ADDR(iorb, (struct RB *), irb->i_rb);
          iorb = (struct RB *) ((char *) iorb - OFF_RB);
          func = iorb->rb_ct2 & 0xF;
          nad_index = iorb->rb_dvs;
          RISC_ADDR(rb_buffer, (char *), iorb->rb_adr);
/*        dumphex((ushort *) iorb, 32); */
/*        dumphex((ushort *) rb_buffer, 32); */

/* perform simple IORB validation - function code, buffer */
          /* make sure IORB has a buffer - in this case, 'base' is NULL because
           * we converted to RISC_ADDR */
          if (rb_buffer == base)
          {
              pnx_ERR_report_error(JUST_HVX, LOG_ERR, (PNXUWKUP + 1),
                                   NULL, PNX_NO_BFR);
              io_exit(rct, irb, ILLEGAL_FUNCTION_CODE);
              continue;
          }
          else
          {
              /* call processing routines */
              switch (func)
              {
                  case BOOT:
#ifdef PNXDEBUG
                      syslog(LOG_DEBUG, "pnx: BOOT IORB");
#endif
                      pnx_x25_init((struct SNSAP *) rb_buffer);
                      /* Now that BOOT is complete (and all children spawned to get
                       * X.25 adapter attributes have terminated), start handling
                       * SIGCHLD.  SIGCHLD is received when a VC Clear completes. */
                      /* After this point, we are blocking SIGUSR1 & SIGCHLD while
                       * handling any signal, but allowing SIGUSR2 to interrupt the
                       * handling of either SIGUSR1 or SIGCHLD. */
                      sigaddset(&pnx_sigs, SIGCHLD);
                      pnx_actions.sa_mask = pnx_sigs;
                      sigaction(SIGCHLD, &pnx_actions, NULL);
                      sigaction(SIGALRM, &pnx_actions, NULL);
                      sigaction(SIGUSR1, &pnx_actions, NULL);
                      sigaction(SIGUSR2, &pnx_actions, NULL);
                      io_exit(rct, irb, SUCCESS_CODE);
                      break;

case GATER_EVENT:
#ifdef PNXDEBUG
                      syslog(LOG_DEBUG, "pnx: GATER IORB");
#endif
                      pnx_user_fsm1((struct GATER *) rb_buffer, nad_index);
                      pnx_post_request(irb);
                      break;

case VC_RECEIVE:
#ifdef PNXDEBUG
                      syslog(LOG_DEBUG, "pnx: VC RECEIVE IORB");
#endif
                      *(ulong *) & (irb->rqh.fwd) = *(ulong *) & (PnetXGlobal->vc_recv);
                      PnetXGlobal->vc_recv = irb;
                      PnetXGlobal->num_vcrcv++;
                      /* Special case receive posting.  If anything is waiting for
```

C135

```
                         * a VC RECEIVE, post it now.  Currently, the following may
                         * be waiting for a VC RECEIVE:
                         *
                         * SAP INFO GATER */
                        if (PnetXGlobal->sapinfo_cnt)
                        {
                            pnx_sap_info();
                        }
                        /* vc receives are posted during processing of inbound x25
                         * events, not here */
                        break;

case PHB_ALLOC:
#ifdef PNXDEBUG
                        syslog(LOG_DEBUG, "pnx: PHB_ALLOC IORB");
#endif
                        pnx_replenish_phbs((struct PHB *) rb_buffer);
                        pnx_post_request(irb);
                        break;

default:
#ifdef PNXDEBUG
                        syslog(LOG_DEBUG, "pnx: UNKNOWN IORB (could be AVR)");
#endif
                        pnx_ERR__report_error(JUST_HVX, LOG_ERR, (PNXUWKUP + 4),
                                    NULL, PNX_NO_BFR);
                        io_exit(rct, irb, SUCCESS_CODE);
/*                      io_exit(rct, irb, ILLEGAL_FUNCTION_CODE); */
#ifdef PNXDEBUG
                        syslog(LOG_DEBUG, "after io_exit (bad)");
#endif
                        break;

}                              /* end switch */
        }                                  /* end if */
        lock(qh->isem.sid);
        GET4(math.adrs, qh->rqh.fwd);
        if (math.adrs == (unsigned long) qh)
        {
            /* empty queue */
            irb = NULL;
        }
        else
        {
            irb = (struct IRB *) mqi_dqh_nolock(qh);
        }

}                                      /* end while */ unlock(qh->isem.sid);
ifdef PNXDEBUG
    syslog(LOG_DEBUG, "exit mqi_input");
#endif
    return;
}                                          /* end mqi_input */

/*****************
 * pnx_user_fsm1 *
 *****************/

/* This function, called by mqi_input(), is the starting point for all
 * GATERs coming from PNet */
void
pnx_user_fsm1(struct GATER * gater, ushort nad_index)
{
    struct vccb     *vccb_ptr = NULL;
    struct snsap    *snsap_ptr;
    struct PHD      *phb_ptr;
    ulong           vc_index;
    ulong           ucxid;

#ifdef PNXDEBUG
    syslog(LOG_DEBUG, "pnx_user_fsm1, gt_fnc=%d", gater->gt_fnc);
#endif
```

C136

```
    TRACE(GATER_IN | COMPLETED, gater->gt_fnc, gater->gt_slr,
      gater->gt_sin, *(ulong *) gater->gt_dst, *(ulong *) gater->gt_sce, 0);

/* Disallow GATERs for protected features */
    if ((gater->gt_sin == gt_qll) && (!allow.SNA_X25))
    {
        syslog(LOG_ERR, "E562: PNetX: Illegal GATER call");
        if (gater->gt_fnc == gtfcrq)
        {
            GET4(ucxid, gater->gt_sce);
            pnx_IDX__issue_dis_ind(ucxid, 0, nad_index);
        }
        else
        if (gater->gt_fnc == gtfcrp)
        {
            pnx_OPF__vc_open_fail(vccb_ptr, VCF_ICR);
            pnx_SDR__send_clear_req(vccb_ptr, 0, vccb_ptr->vc_diag, d_nai_xx);
            pnx_IDI__issue_dis_ind(vccb_ptr, vccb_ptr->vc_ucxid, d_nai_xx);
            vccb_ptr->vc_wfdr = 1;
        } return;
    }

/* verify that VCCB & SNSAP exist for those GATERs needing them */
    switch (gater->gt_fnc)
    {
    case gtfcrp:                /* connect response */
    case gtfdtr:                /* data request */
    case gtfdrp:                /* disconnect response */
    case gtfokr:                /* ok-to-receive */
    case gtfexr:                /* expedited data (interrupt) request */
    case gtfrrq:                /* reset request */
    case gtfrrp:                /* reset response */
        GET4(vc_index, gater->gt_dst);
        vccb_ptr = pnx_GVI__get_vccb_by_id(vc_index);
        if (vccb_ptr == NULL)
        {
            pnx_NSN__ns_error2(NULL, st25_NVP);
            return;
        }                       /* end if vccb_ptr */ snsap_ptr = vccb_ptr->vc_snsap;
        if (snsap_ptr == NULL)
        {
            pnx_NSN__ns_error2(NULL, st25_NSP);
            return;
        }                       /* end if snsap_ptr */
        break;

case gtfacm:                /* Admin command         */
        pnx_ACM__admin_command(gater);
        return;
        break;

case gtfinq:                /* Info request          */
        pnx_INQ__info_request(gater);
        return;
        break;

case gtfinf:                /* Info (LSAP Up/Down)   */
        pnx_LSI__process_sap_info(gater);
        return;
        break;
    }                           /* end switch */ pnx_user_fsm2(gater, vccb_ptr, nad_index);
ifdef PNXDEBUG
    syslog(LOG_DEBUG, "exit pnx_user_fsm1");
#endif
    return;
}                               /* end pnx_user_fsm1 */

/*****************
```

C137

```
* pnx_user_fsm2 *
****************/

/* This module performs the X.25 state processing for GATERs received from
 * PNet.  Like the routines used to handle received packets, it is only
 * aware of those X.25 states that are not swallowed by the board */
void
pnx_user_fsm2(struct GATER * gater,
              struct vccb * vccb_ptr,
              ushort nad_index)
{
    int             status;
    struct snsap    *snsap_ptr;
    struct PHD      *phb_ptr;
    ulong           ucxid;

#ifdef PNXDEBUG
    syslog(LOG_DEBUG, "pnx_user_fsm2, VC=%lX", vccb_ptr);
#endif
    if (vccb_ptr != NULL)
    {
        snsap_ptr = vccb_ptr->vc_snsap;
    }
    GET4(ucxid, gater->gt_sce);

switch (gater->gt_fnc)
    {
    case gtfcrq:                        /* Connect request       */ if ((status = pnx_UCR__process_con_req(gater, nad_index)) != 0)
        {
            pnx_IDX__issue_dis_ind(ucxid, 0, nad_index);
        }                               /* end if */
        break;

case gtfcrp:                        /* Connect response      */
        vccb_ptr->vc_ndxid = nad_index;
        switch (vccb_ptr->vc_state)
        {
        case VC_P3:
        case VC_P5:
            if (pnx_UCP__process_con_resp(vccb_ptr, gater) != 0)
            {
                pnx_OPF__vc_open_fail(vccb_ptr, VCF_ICR);
                pnx_SDR__send_clear_req(vccb_ptr, 0, vccb_ptr->vc_diag, d_nai_xx);
                pnx_IDI__issue_dis_ind(vccb_ptr, vccb_ptr->vc_ucxid, d_nai_xx);
                vccb_ptr->vc_wfdr = 1;
            }                           /* end if */
            break;

case VC_P1:
            pnx_RVC__release_vccb(vccb_ptr);
            break;

case VC_D3:
            if (vccb_ptr->vc_pvc &&
                vccb_ptr->vc_wfcr)
            {
                vccb_ptr->vc_ndxid = nad_index;
                vccb_ptr->vc_wfcr = 0;
                vccb_ptr->vc_olv = gater->gt_slr;
                vccb_ptr->vc_oin = gater->gt_sin;
                GET4(vccb_ptr->vc_ucxid, gater->gt_sce);
                vccb_ptr->vc_urcvc = gater->gt_crn;
                vccb_ptr->vc_xrcvc = gater->gt_cre;
                vccb_ptr->vc_xsndc = vccb_ptr->vc_xrcvc;
                pnx_SRC__send_reset_conf(vccb_ptr);
                vccb_ptr->vc_dsac = gtused;
            }                           /* end if */
            break;

}                               /* end switch */
        break;

case gtfdtr:                        /* Data request          */
        RISC_ADDR(phb_ptr, (struct PHD *), gater->gt_dta);
```

C138

```
        if (phb_ptr == (struct PHD *) base)
        {
            pnx_VCE__vc_error(vccb_ptr, VCE_NPH);
            return;
        }                               /* end if */
        vccb_ptr->vc_ublks += 1;

switch (vccb_ptr->vc_state)
        {
        case VC_D1:
            pnx_UDT__process_data_req(vccb_ptr, gater);
            pnx_SDT__send_data(vccb_ptr, phb_ptr);
            pnx_IRL__issue_rel_sdu(vccb_ptr, phb_ptr);
            break;

case VC_P3:
            pnx_UDT__process_data_req(vccb_ptr, gater);
            break;

case VC_P5:
            if (snsap_ptr->sn_dce)
            {
                pnx_UDT__process_data_req(vccb_ptr, gater);
            }
            else
            {
                PUT4(gater->gt_dta, ((ulong) 0));
                *(int *) &(phb_ptr->ph_xst) = 0;
                PUT4(phb_ptr->ph_xq, ((ulong) 0));
                PUT4(phb_ptr->ph_xup, ((ulong) 0));
                PUT4(phb_ptr->ph_xvc, ((ulong) vccb_ptr));
                pnx_IRL__issue_rel_sdu(vccb_ptr, phb_ptr);
            }                           /* end if */
            break;

default:
            PUT4(gater->gt_dta, (ulong) 0);
            *(int *) &(phb_ptr->ph_xst) = 0;
            PUT4(phb_ptr->ph_xq, ((ulong) 0));
            PUT4(phb_ptr->ph_xup, ((ulong) 0));
            PUT4(phb_ptr->ph_xvc, ((long) vccb_ptr));
            pnx_IRL__issue_rel_sdu(vccb_ptr, phb_ptr);
            break;

}                               /* end switch */
        break;

case gtfexr:                        /* Expedited data request   */ vccb_ptr->vc_urcvc += gater->gt_crn;
        vccb_ptr->vc_xrcvc += gater->gt_cre;

RISC_ADDR(phb_ptr, (struct PHD *), gater->gt_dta);
        if (phb_ptr == (struct PHD *) base)
        {
            pnx_VCE__vc_error(vccb_ptr, VCE_NPH);
            return;
        }                               /* end if */ pnx_IDT__issue_data_ind(vccb_ptr);

vccb_ptr->vc_ublks += 1;

if (pnx_SED__send_interrupt(vccb_ptr, gater) != 0)
        {
            PUT4(gater->gt_dta, (ulong) 0);
            phb_ptr->ph_sst |= ph_nts;
        }                               /* end if */
        /* unlike HVS X.25, after SED is called, the data may be relsdu'ed */
        pnx_IRL__issue_rel_sdu(vccb_ptr, phb_ptr);
        break;

case gtfdrq:                        /* Disconnect request */ pnx_UDR__process_dis_req(gater);
        break;
```

C139

```
case gtfdrp:                    /* Disconnect response    */ switch (vccb_ptr->vc_state)
    { case VC_P6:
    case VC_P7:
        /* VC must be cleaned up at this time - HVS X.25 waits for timers
         * to expire. */
        vccb_ptr->vc_wfdr = 0;
        pnx_SDC__send_clear_conf(vccb_ptr);
        pnx_RVC__release_vccb(vccb_ptr);
        break;

case VC_P1:
        vccb_ptr->vc_wfdr = 0;
        pnx_RVC__release_vccb(vccb_ptr);
        break;

case VC_D1:
        if (vccb_ptr->vc_pvc &&
            vccb_ptr->vc_wfdr)
        {
            vccb_ptr->vc_wfdr = 0;
            vccb_ptr->vc_ucxid = NULL;
            vccb_ptr->vc_dsac = gtenbl;
        }                       /* end if */
        break;

case VC_D3:
        if (vccb_ptr->vc_pvc &&
            vccb_ptr->vc_wfdr)
        {
            pnx_SRC__send_reset_conf(vccb_ptr);
            vccb_ptr->vc_wfdr = 0;
            vccb_ptr->vc_ucxid = NULL;
            vccb_ptr->vc_dsac = gtenbl;
        }                       /* end if */
        break;

}                           /* end switch */
    break;

case gtfrrq:                    /* Reset request          */ switch (vccb_ptr->vc_state)
    { case VC_D1:
        pnx_URS__process_reset_req(vccb_ptr, gater);
        break;

case VC_D3:
        vccb_ptr->vc_urcvc = gater->gt_crn;
        vccb_ptr->vc_xrcvc = gater->gt_cre;
        vccb_ptr->vc_xsndc = vccb_ptr->vc_xrcvc;
        pnx_SRC__send_reset_conf(vccb_ptr);
        break;

}                           /* end switch */
    break;

case gtfrrp:                    /* Reset response         */ switch (vccb_ptr->vc_state)
    { case VC_D1:
    case VC_D2:
        vccb_ptr->vc_urcvc = gater->gt_crn;
        vccb_ptr->vc_xrcvc = gater->gt_cre;
        vccb_ptr->vc_xsndc = vccb_ptr->vc_xrcvc;
        break;

case VC_D3:
        vccb_ptr->vc_urcvc = gater->gt_crn;
```

C140

```
            vccb_ptr->vc_xrcvc = gater->gt_cre;
            vccb_ptr->vc_xsndc = vccb_ptr->vc_xrcvc;
            pnx_SRC__send_reset_conf(vccb_ptr);
            break;

}                           /* end switch */
        break;

case gtfokr:                    /* OK_To_Receive            */ vccb_ptr->vc_urcvc += gater->gt_crn;
        vccb_ptr->vc_xrcvc += gater->gt_cre;
        add_to_array(vccb_ptr);
        break;
    }                               /* end switch */
#ifdef PNXDEBUG
    syslog(LOG_DEBUG, "exit pnx_user_fsm2");
#endif
    return;
}                                   /* end pnx_user_fsm2 */
```

C141

```
/*
 *  Name:       pnx_vc_cmd.c
 *  Purpose:    Process VC admin command
 *  Functions in this module:
 *       (see pnx_func.h for prototype declarations)
 *
 *   int           pnx_HVC__vc_admin_cmd()
 *   int           pnx_HVN__number_vc()
 *   int           pnx_HVL__list_vc()
 *   int           pnx_HVA__attr_vc()
 *   int           pnx_HVH__history_vc()
 *   int           pnx_HVM__match_vc()
 *   struct GATER  *pnx_GRG__get_rsp_gater()
 *
 */ include "sys_head.h"
include "emu_head.h"
#include "macro.h"
#include "mqi_head.h"
#include "z_rb.h"
#include "z3irb.h"
include <x25sdefs.h> include "pnx_head.h"
include "pnx_vccb.h"
#include "hvx_phd.h"
#include "pnx_snsap.h"
#include "hvx_gater.h"
#include "hvx_lme.h"
#include "x25vcp.h"

extern char       *base;

extern struct pnx_global *PnetXGlobal;

/*************************
 * pnx_HVC__vc_admin_cmd *
 *************************/

/* This routine processes a virtual circuit admin request gater.
 *
 * The function code and selection parameters are extracted from the vc admin
 * request gater and the appropriate command handler executed. */
int
pnx_HVC__vc_admin_cmd(struct GATER * gater_ptr)

{                                   /* HVC__vc_admin_cmd */ unsigned short   i, funct, s_len;
    unsigned char    *aptr;
    struct x25vcp    vcspb;
    ulong            sce_id;

GET4(sce_id, gater_ptr->gt_sce);

/* zero fill selection parameter structure */ memset(&vcspb, 0, sizeof(struct x25vcp));

for (i = 1; i <= 8; i++)
    {
        vcspb.vp_mp1n[i] = ' ';
        vcspb.vp_mp2n[i] = ' ';
    }

/* Get function code and selection parameters. */ for (i = 0; i < gater_ptr->gt_vln; i += gater_ptr->gt_var[i + 1] + 2)
    {
        switch (gater_ptr->gt_var[i])
        {
        case gtfunc:                 /* function code */
            funct = (gater_ptr->gt_var[i + 2] << 8) +
```

C142

```
                gater_ptr->gt_var[i + 3];
            break;

case gtnam1:                /* index-1 */
            aptr = (unsigned char *) &vcspb.vp_ndx1;
            *aptr++ = gater_ptr->gt_var[i + 2];
            *aptr++ = gater_ptr->gt_var[i + 3];
            vcspb.vp_par1 = 1;
            break;

case gtnam2:                /* index-2 */
            aptr = (unsigned char *) &vcspb.vp_ndx2;
            *aptr++ = gater_ptr->gt_var[i + 2];
            *aptr++ = gater_ptr->gt_var[i + 3];
            vcspb.vp_par2 = 1;
            break;

case gtstat:                /* dsac state */
            aptr = (unsigned char *) &vcspb.vp_dsac;
            *aptr++ = gater_ptr->gt_var[i + 2];
            *aptr++ = gater_ptr->gt_var[i + 3];
            vcspb.vp_par3 = 1;
            break;

case gttype:                /* vc type */
            memcpy(&vcspb.vp_type[0], &gater_ptr->gt_var[i + 2], 4);
            vcspb.vp_par4 = 1;
            break;

case gtmp1c:                /* mapping-1 class */
            aptr = (unsigned char *) &vcspb.vp_mp1c;
            *aptr++ = gater_ptr->gt_var[i + 2];
            *aptr++ = gater_ptr->gt_var[i + 3];
            vcspb.vp_par5a = 1;
            break;

case gtmp1n:                /* mapping-1 name */
            s_len = gater_ptr->gt_var[i + 1];
            vcspb.vp_mp1n[0] = s_len;
            memcpy(&vcspb.vp_mp1n[1], &gater_ptr->gt_var[i + 2], s_len);
            vcspb.vp_par5b = 1;
            break;

case gtmp2c:                /* mapping-2 class */
            aptr = (unsigned char *) &vcspb.vp_mp2c;
            *aptr++ = gater_ptr->gt_var[i + 2];
            *aptr++ = gater_ptr->gt_var[i + 3];
            vcspb.vp_par6a = 1;
            break;

case gtmp2n:                /* mapping-2 name    */
            s_len = gater_ptr->gt_var[i + 1];
            vcspb.vp_mp2n[0] = s_len;
            memcpy(&vcspb.vp_mp2n[1], &gater_ptr->gt_var[i + 2], s_len);
            vcspb.vp_par6b = 1;
            break;

}                           /* end switch */
    }                               /* end loop */
/* Dispatch to appropriate command handler. */ switch (funct)
{
case gtnmbr:
    pnx_HVN__number_vc(&vcspb, sce_id);
    break;

case gtlist:
    pnx_HVL__list_vc(&vcspb, sce_id);
    break;

case gtattr:
    pnx_HVA__attr_vc(&vcspb, sce_id);
    break;

case gthist:
```

C143

```
            pnx_HVH__history_vc(&vcspb, sce_id);
            break;

}                               /* end switch */ return (0);

}                                     /* HVC__vc_admin_cmd */

/*********************
 * pnx_HVN__number_vc *
 *********************/

/* This routine finds the virtual circuits which match given selection
 * parameters and reports the number of matching virtual circuits to the
 * node administrator. */ int
pnx_HVN__number_vc(struct x25vcp * vp_ptr, ulong sce_id)

{                                     /* HVN__number_vc */ struct IRB        *irb_ptr;
    struct RB         *iorb_ptr;
    struct GATER      *gater_ptr;
    unsigned char     *var_ptr;
    unsigned char     *aptr;
    unsigned short    numvc;
    struct vccb       *vccb_ptr;
    struct GATER      *pnx_GRG__get_rsp_gater();

if (pnx_get_next_vc_receive(&irb_ptr, &iorb_ptr) != 0)
    {
        return (-1);
    }

/* Setup fields in fixed part of gater. */ gater_ptr = pnx_GRG__get_rsp_gater(iorb_ptr, sce_id);
    gater_ptr->gt_fnc = gtfarf;
    var_ptr = &gater_ptr->gt_var[0];

/* Find virtual circuits which match selection parameters. */ numvc = 0;
    for (vccb_ptr = (struct vccb *) (PnetXGlobal->active_q.next);
         vccb_ptr != (struct vccb *) (&PnetXGlobal->active_q.pri);
         vccb_ptr = (struct vccb *) (vccb_ptr->links.next))
    {
        if (pnx_HVM__match_vc(vp_ptr, vccb_ptr) == 0)
        {
            numvc += 1;
        }
    }                                 /* end loop */

/* Setup fields in variable part of gater. */

*var_ptr++ = gtrsp1;              /* number of vc */
    *var_ptr++ = 2;
    aptr = (unsigned char *) &numvc;
    *var_ptr++ = *aptr++;
    *var_ptr++ = *aptr++;
    gater_ptr->gt_vln += 4;

/* Post VC Receive for administrative response. */ pnx_post_request(irb_ptr);

return (0);

}                                     /* HVN__number_vc */

/*******************
 * pnx_HVL__list_vc *
 *******************/

/* This routine finds the virtual circuits which match given selection
```

C144

```
 * parameters and reports the names of of the matching virtual circuits to
 * the node administrator. */
int
pnx_HVL__list_vc(struct x25vcp * vp_ptr, ulong sce_id)
{                               /* HVL__list_vc */
    struct IRB      *irb_ptr;
    struct RB       *iorb_ptr;
    struct GATER    *gater_ptr;
    unsigned char   *var_ptr;
    unsigned char   *aptr;
    struct vccb     *vccb_ptr;
    struct GATER    *pnx_GRG__get_rsp_gater();

if (pnx_get_next_vc_receive(&irb_ptr, &iorb_ptr) != 0)
    {
        return (-1);
    }

/* Setup fields in fixed part of gater */ gater_ptr = pnx_GRG__get_rsp_gater(iorb_ptr, sce_id);
    var_ptr = &gater_ptr->gt_var[0];

/* Find virtual circuits which match selection parameters. Setup response
     * parameters in variable part of gater. */ for (vccb_ptr = (struct vccb *) (PnetXGlobal->active_q.next);
         vccb_ptr != (struct vccb *) (&PnetXGlobal->active_q.pri);
         vccb_ptr = (struct vccb *) (vccb_ptr->links.next))
    {
        if (pnx_HVM__match_vc(vp_ptr, vccb_ptr) != 0)
        {
            continue;
        } if ((gater_ptr->gt_vln + 4) > gt_vmx)
        {
            gater_ptr->gt_fnc = gtfari;
            pnx_post_request(irb_ptr);
            if (pnx_get_next_vc_receive(&irb_ptr, &iorb_ptr) != 0)
            {
                return (-1);
            }
            gater_ptr = pnx_GRG__get_rsp_gater(iorb_ptr, sce_id);
            var_ptr = &gater_ptr->gt_var[0];
        }

*var_ptr++ = gtrsp1;       /* vc index */
        *var_ptr++ = 2;
        aptr = (unsigned char *) &vccb_ptr->vc_ndxid;
        *var_ptr++ = *aptr++;
        *var_ptr++ = *aptr++;
        gater_ptr->gt_vln += 4;

}                           /* end loop */

/* Issue gate request for final admin response. */ gater_ptr->gt_fnc = gtfarf;
    pnx_post_request(irb_ptr);

return (0);

}                               /* HVL__list_vc */

/*********************
 *  pnx_HVA__attr_vc *
 *********************/

/* This routine finds the virtual circuits which match given selection
 * parameters and reports the attributes of the matching virtual circuits to
 * the node administrator. */ int
```

C145

```
pnx_HVA__attr_vc(struct x25vcp * vp_ptr, ulong sce_id)
{                                  /* HVA__attr_vc */
    struct IRB      *irb_ptr;
    struct RB       *iorb_ptr;
    struct GATER    *gater_ptr;
    unsigned char   *var_ptr;
    unsigned char   *aptr;
    unsigned short  s_len, len;
    struct snsap    *snsap_ptr;
    struct snsap    *rsap_ptr;
    struct vccb     *vccb_ptr;
    struct GATER    *pnx_GRG__get_rsp_gater();

/* Find virtual circuits which match selection parameters. Setup response
     * parameters in variable part of gater. Issue gate request for
     * administrative response. */ for (vccb_ptr = (struct vccb *) (PnetXGlobal->active_q.next);
         vccb_ptr != (struct vccb *) (&PnetXGlobal->active_q.pri);
         vccb_ptr = (struct vccb *) (vccb_ptr->links.next))
    {
        if (pnx_HVM__match_vc(vp_ptr, vccb_ptr) != 0)
        {
            continue;
        } if (pnx_get_next_vc_receive(&irb_ptr, &iorb_ptr) != 0)
        {
            return (-1);
        }
        gater_ptr = pnx_GRG__get_rsp_gater(iorb_ptr, sce_id);
        gater_ptr->gt_fnc = gtfari;
        var_ptr = &gater_ptr->gt_var[0];

*var_ptr++ = gtrsp1;         /* VC index */
        *var_ptr++ = 2;
        aptr = (unsigned char *) &vccb_ptr->vc_ndxid;
        *var_ptr++ = *aptr++;
        *var_ptr++ = *aptr++;
        gater_ptr->gt_vln += 4;

*var_ptr++ = gtrsp2;         /* DSAC state */
        *var_ptr++ = 2;
        aptr = (unsigned char *) &vccb_ptr->vc_dsac;
        *var_ptr++ = *aptr++;
        *var_ptr++ = *aptr++;
        gater_ptr->gt_vln += 4;

*var_ptr++ = gtrsp3;         /* VC type */
        *var_ptr++ = 4;
        aptr = &vccb_ptr->vc_type[0];
        *var_ptr++ = *aptr++;
        *var_ptr++ = *aptr++;
        *var_ptr++ = *aptr++;
        *var_ptr++ = *aptr++;
        gater_ptr->gt_vln += 6;

*var_ptr++ = gtrsp4;         /* Mapping-1 (NS proper) */
        snsap_ptr = vccb_ptr->vc_snsap;
        s_len = snsap_ptr->sn_name[0];
        *var_ptr++ = s_len;
        memcpy(var_ptr, &snsap_ptr->sn_name[1], s_len);
        var_ptr += s_len;
        gater_ptr->gt_vln += s_len + 2;

if (vccb_ptr->vc_rssap != NULL)
        {
            *var_ptr++ = gtrsp5;     /* Mapping-2 (NS image) */
            rsap_ptr = vccb_ptr->vc_rssap;
            s_len = rsap_ptr->sn_name[0];
            *var_ptr++ = s_len;
            memcpy(var_ptr, &rsap_ptr->sn_name[1], s_len);
            var_ptr += s_len;
            gater_ptr->gt_vln += s_len + 2;
        }
```

C146

```
        *var_ptr++ = gtrsp7;      /* vc_id_no (lcn) */
        *var_ptr++ = 2;
        lcn = (vccb_ptr->vc_lcgn << 8) | vccb_ptr->vc_lcn;
        aptr = (unsigned char *) &lcn;
        *var_ptr++ = *aptr++;
        *var_ptr++ = *aptr++;
        gater_ptr->gt_vln += 4;

if (vccb_ptr->vc_thrx != 0)
        {
            *var_ptr++ = gtrsp8;   /* xmit thruput class */
            *var_ptr++ = 2;
            aptr = (unsigned char *) &vccb_ptr->vc_thrx;
            *var_ptr++ = *aptr++;
            *var_ptr++ = *aptr++;
            gater_ptr->gt_vln += 4;
        } if (vccb_ptr->vc_thrr != 0)
        {
            *var_ptr++ = gtrsp9;   /* recv thruput class */
            *var_ptr++ = 2;
            aptr = (unsigned char *) &vccb_ptr->vc_thrr;
            *var_ptr++ = *aptr++;
            *var_ptr++ = *aptr++;
            gater_ptr->gt_vln += 4;
        }

*var_ptr++ = gtrs10;       /* xmit-packet-size */
        *var_ptr++ = 2;
        aptr = (unsigned char *) &vccb_ptr->vc_pdux;
        *var_ptr++ = *aptr++;
        *var_ptr++ = *aptr++;
        gater_ptr->gt_vln += 4;

*var_ptr++ = gtrs11;       /* recv-packet-size */
        *var_ptr++ = 2;
        aptr = (unsigned char *) &vccb_ptr->vc_pdur;
        *var_ptr++ = *aptr++;
        *var_ptr++ = *aptr++;
        gater_ptr->gt_vln += 4;

*var_ptr++ = gtrs12;       /* xmit-window-size */
        *var_ptr++ = 2;
        aptr = (unsigned char *) &vccb_ptr->vc_wndx;
        *var_ptr++ = *aptr++;
        *var_ptr++ = *aptr++;
        gater_ptr->gt_vln += 4;

*var_ptr++ = gtrs13;       /* recv-window-size */
        *var_ptr++ = 2;
        aptr = (unsigned char *) &vccb_ptr->vc_wndr;
        *var_ptr++ = *aptr++;
        *var_ptr++ = *aptr++;
        gater_ptr->gt_vln += 4;

pnx_post_request(irb_ptr);

}                              /* end loop */

/* Issue admin response for final item. */ if (pnx_get_next_vc_receive(&irb_ptr, &iorb_ptr) != 0)
    {
        return (-1);
    }
    gater_ptr = pnx_GRG__get_rsp_gater(iorb_ptr, sce_id);
    gater_ptr->gt_fnc = gtfarf;
    pnx_post_request(irb_ptr);

return (0);

}                                  /* HVA__attr_vc */
/***********************
* pnx_HVH__history_vc *
```

C147

```
***********************/
/* This routine finds the virtual circuits which match given selection
 * parameters and reports the history of the matching virtual circuits to
 * the node administrator. */
int
pnx_HVH__history_vc(struct x25vcp * vp_ptr, ulong sce_id)
{                               /* HVH__history_vc */
    struct IRB      *irb_ptr;
    struct RB       *iorb_ptr;
    struct GATER    *gater_ptr;
    unsigned char   *var_ptr;
    unsigned char   *aptr;
    unsigned short  s_len, lcn;
    struct snsap    *snsap_ptr;
    struct snsap    *rsap_ptr;
    struct vccb     *vccb_ptr;
    struct GATER    *pnx_GRG__get_rsp_gater();

/* Find virtual circuits which match selection parameters. Setup response
     * parameters in variable part of gater. Issue gate request for
     * administrative response. */ for (vccb_ptr = (struct vccb *) (PnetXGlobal->active_q.next);
         vccb_ptr != (struct vccb *) (&PnetXGlobal->active_q.pri);
         vccb_ptr = (struct vccb *) (vccb_ptr->links.next))
    {
        if (pnx_HVM__match_vc(vp_ptr, vccb_ptr) != 0)
        {
            continue;
        } if (pnx_get_next_vc_receive(&irb_ptr, &iorb_ptr) != 0)
        {
            return (-1);
        }
        gater_ptr = pnx_GRG__get_rsp_gater(iorb_ptr, sce_id);
        gater_ptr->gt_fnc = gtfari;
        var_ptr = &gater_ptr->gt_var[0];

*var_ptr++ = gtrsp1;       /* VC index */
        *var_ptr++ = 2;
        aptr = (unsigned char *) &vccb_ptr->vc_ndxid;
        *var_ptr++ = *aptr++;
        *var_ptr++ = *aptr++;
        gater_ptr->gt_vln += 4;

*var_ptr++ = gtrsp2;       /* local-endpt (NS proper) */
        s_len = snsap_ptr->sn_name[0];
        *var_ptr++ = s_len;
        memcpy(var_ptr, &snsap_ptr->sn_name[1], s_len);
        var_ptr += s_len;
        gater_ptr->gt_vln += s_len + 2;

if (vccb_ptr->vc_rssap != NULL)
        {
            *var_ptr++ = gtrsp3;   /* remote-endpt (NS image) */
            rsap_ptr = vccb_ptr->vc_rssap;
            s_len = rsap_ptr->sn_name[0];
            *var_ptr++ = s_len;
            memcpy(var_ptr, &rsap_ptr->sn_name[1], s_len);
            var_ptr += s_len;
            gater_ptr->gt_vln += s_len + 2;
        } if (vccb_ptr->vc_pvc == 0)
        {
            *var_ptr++ = gtrsp5;   /* init-or-accept */
            *var_ptr++ = 2;
            aptr = (unsigned char *) &vccb_ptr->vc_in_ac;
            *var_ptr++ = *aptr++;
            *var_ptr++ = *aptr++;
            gater_ptr->gt_vln += 4;
        }
```

C148

```
if (vccb_ptr->vc_init &&
    vccb_ptr->vc_cdna[0] != 0)
{
    *var_ptr++ = gtrsp6;   /* remote call number */
    s_len = ((vccb_ptr->vc_cdna[0] - 1) / 2) + 2;
    *var_ptr++ = s_len;
    *var_ptr++ = 16;
    *var_ptr++ = vccb_ptr->vc_cdna[0];
    pnx_MNA__move_net_addr(&vccb_ptr->vc_cdna[1], 0,
                    var_ptr, 0, vccb_ptr->vc_cdna[0]);
    var_ptr += ((vccb_ptr->vc_cdna[0] + 1) / 2);
    gater_ptr->gt_vln += s_len + 2;
}
else
    if (vccb_ptr->vc_init == 0 &&
        vccb_ptr->vc_cgna[0] != 0)
    {
        *var_ptr++ = gtrsp6;   /* remote call number */
        s_len = ((vccb_ptr->vc_cgna[0] + 1) / 2) + 2;
        *var_ptr++ = s_len;
        *var_ptr++ = 16;
        *var_ptr++ = vccb_ptr->vc_cgna[0];
        pnx_MNA__move_net_addr(&vccb_ptr->vc_cgna[1], 0,
                        var_ptr, 0, vccb_ptr->vc_cgna[0]);
        var_ptr += ((vccb_ptr->vc_cgna[0] + 1) / 2);
        gater_ptr->gt_vln += s_len + 2;
    }

*var_ptr++ = gtrsp7;       /* vc_id_no (lcn) */
*var_ptr++ = 2;
lcn = (vccb_ptr->vc_lcgn << 8) | vccb_ptr->vc_lcn;
aptr = (unsigned char *) &lcn;
*var_ptr++ = *aptr++;
*var_ptr++ = *aptr++;
gater_ptr->gt_vln += 4;

*var_ptr++ = gtrsp8;       /* data-packets-sent */
*var_ptr++ = 4;
aptr = (unsigned char *) &vccb_ptr->vc_epd;
*var_ptr++ = *aptr++;
*var_ptr++ = *aptr++;
*var_ptr++ = *aptr++;
*var_ptr++ = *aptr++;
gater_ptr->gt_vln += 6;

*var_ptr++ = gtrsp9;       /* interrupt-packets-sent */
*var_ptr++ = 2;
aptr = (unsigned char *) &vccb_ptr->vc_eed;
*var_ptr++ = *aptr++;
*var_ptr++ = *aptr++;
gater_ptr->gt_vln += 4;

*var_ptr++ = gtrs10;       /* control-packets-sent */
*var_ptr++ = 4;
aptr = (unsigned char *) &vccb_ptr->vc_epc;
*var_ptr++ = *aptr++;
*var_ptr++ = *aptr++;
*var_ptr++ = *aptr++;
*var_ptr++ = *aptr++;
gater_ptr->gt_vln += 6;

*var_ptr++ = gtrs11;       /* data-characters-sent */
*var_ptr++ = 4;
aptr = (unsigned char *) &vccb_ptr->vc_eda;
*var_ptr++ = *aptr++;
*var_ptr++ = *aptr++;
*var_ptr++ = *aptr++;
*var_ptr++ = *aptr++;
gater_ptr->gt_vln += 6;

*var_ptr++ = gtrs12;       /* packet-sequences-sent */
*var_ptr++ = 4;
aptr = (unsigned char *) &vccb_ptr->vc_esd;
*var_ptr++ = *aptr++;
*var_ptr++ = *aptr++;
*var_ptr++ = *aptr++;
```

C150

```
/*********************
 * pnx_HVM_match_vc *
 *********************/

/* This routine compares a given virtual circuit with selection parameters
 * passed in a virtual circuit administration request gater.
 *
 * Do not include any VCCBs associated with the x25_listen() call. */ int
pnx_HVM_match_vc(struct x25vcp * vp_ptr, struct vccb * vccb_ptr)
{                                        /* HVM_match_vc */
    struct snsap    *snsap_ptr;

if (vccb_ptr == NULL)
    {
        return (-1);
    } if (vccb_ptr->listen)
    {
        return (-1);
    } snsap_ptr = vccb_ptr->vc_snsap;

if (vp_ptr->vp_par1 &&
        vp_ptr->vp_par2 == 0 &&
        vp_ptr->vp_ndx1 != vccb_ptr->vc_ndxid)
    {
        return (-1);
    }
    else
        if (vp_ptr->vp_par1 &&
            vp_ptr->vp_par2 &&
            (vccb_ptr->vc_ndxid < vp_ptr->vp_ndx1 ||
             vccb_ptr->vc_ndxid > vp_ptr->vp_ndx2))
    {
        return (-1);
    } if (vp_ptr->vp_par3 &&
        vp_ptr->vp_dsac != vccb_ptr->vc_dsac)
    {
        return (-1);
    } if (vp_ptr->vp_par4 &&
        memcmp(&vp_ptr->vp_type[0], &vccb_ptr->vc_type[0], 4) != 0)
    {
        return (-1);
    } if (vp_ptr->vp_par5a &&
        vp_ptr->vp_par5b)
    {
        switch (vp_ptr->vp_mp1c)
        { case gtclns:
            if (memcmp(&vp_ptr->vp_mp1n[1], &snsap_ptr->sn_name[1], 8)
                != 0)
            {
                return (-1);
            }
            break;

case gtclll:
            if (memcmp(&vp_ptr->vp_mp1n[1], &snsap_ptr->sn_lsap[1], 8)
                != 0)
            {
                return (-1);
            }
            break;
```

C151

```
        default:
            return (-1);
            break;
        }                           /* end switch */
    }                               /* end if */ if (vp_ptr->vp_par6a &&
        vp_ptr->vp_par6b)
    { switch (vp_ptr->vp_mp2c)
        { case gtclns:
            if (memcmp(&vp_ptr->vp_mp2n[1], &snsap_ptr->sn_name[1], 8)
                != 0)
            {
                return (-1);
            }
            break;

case gtclll:
            if (memcmp(&vp_ptr->vp_mp2n[1], &snsap_ptr->sn_lsap[1], 8)
                != 0)
            {
                return (-1);
            }
            break;

default:
            return (-1);
            break;

}                           /* end switch */
    }                               /* end if */ return (0);

}                                   /* HVM__match_vc */

/*************************
 * pnx_GRG__get_rsp_gater *
 *************************/

/* This routine gets and initializes a administrative response gater. */ struct GATER      *
pnx_GRG__get_rsp_gater(struct RB * iorb_ptr, ulong sce_id)

{                                   /* GRG__get_rsp_gater */ struct GATER      *gater_ptr;

RISC_ADDR(gater_ptr, (struct GATER *), iorb_ptr->rb_adr);

/* Initialize fixed part of admin response gater. */ gater_ptr->gt_pri = 0;
    PUT4(gater_ptr->gt_nxt, 0);
    *(long *) gater_ptr->gt_mkr = *(long *) "GT01";
    gater_ptr->gt_slr = gt_nwc;
    gater_ptr->gt_sin = gt_x25;
    gater_ptr->gt_dlr = gt_apl;
    gater_ptr->gt_din = gt_nad;
    PUT4(gater_ptr->gt_sce, 0);
    PUT4(gater_ptr->gt_dst, sce_id);
    PUT4(gater_ptr->gt_dta, 0);
    gater_ptr->gt_dis = 0;
    gater_ptr->gt_crn = 0;
    gater_ptr->gt_cre = 0;
    gater_ptr->gt_flg = 0;
    gater_ptr->gt_vln = 0;

return (gater_ptr);
```

C152

```
}                    /* GRG__get_rsp_gater */
```

```
/*
 * Name:        pnx_x25in.c
 * Purpose:     This module contains those functions required
 *              to handle packets received from the X.25 API
 * Functions in this module:
 *      (see pnx_func.h for prototype declarations)
 *
 * int          pnx_PCR__process_cr()
 * int          pnx_PCC__process_cc()
 * int          pnx_PDT__process_data()
 * int          pnx_PED__process_expedited_data()
 * int          pnx_PRS__process_rs()
 * int          pnx_RS1__process_net_rs()
 * int          pnx_RS2__process_net_rs()
 * int          pnx_PDR__process_clear_ind()
 * int          pnx_vc_clear_complete()
 *
 */

/* general header files: */
#include "sys_head.h"
include "emu_head.h"
#include "macro.h"
#include "mqi_head.h"
#include "z3rct.h"
#include "z_rb.h"
#include "z3irb.h"
#include <sys/wait.h>

/* PNetX specifics: */
#include <x25sdefs.h>
include "pnx_head.h"
include "pnx_vccb.h"
#include "pnx_snsap.h"
#include "hvx_phd.h"
#include "hvx_gater.h"
#include "x25vce.h"
#include "x25cse.h"
#include "x25dia.h"
#include "hvx_lme.h"

extern char     *base;

extern struct pnx_global *PnetXGlobal;

/* called functions:
   */

/***********************
 * pnx_PCR__process_cr *
 ***********************/

/* Process Incoming Call
 *
 * This routine processes an arriving Call indication */
int
pnx_PCR__process_cr(struct vccb * vccb_ptr)
{
    struct snsap        *snsap_ptr;
    struct cb_call_struct *cb_call_ptr;
    struct cb_fac_struct *cb_fac_ptr;
    struct snsap        *rsap_ptr;
    ulong               snsap_flags;
    short               fsrv;
    struct PHD          *phb;
    unsigned char       *udf_ptr;
#ifdef PNXDEBUG
    syslog(LOG_DEBUG, "pnx_PCR, VC=%lX", vccb_ptr);
#endif
    snsap_ptr = vccb_ptr->vc_snsap;
    vccb_ptr->vc_udf = NULL;
    if (snsap_ptr->sn_icb)
        /* Incoming calls barred - it shouldn't have gotten this far!  The
         * board should have caught it. */
```

C154

```
{
    pnx_ERR__report_error(JUST_HVX, LOG_WARNING, (PNXX25IN + 1),
                snsap_ptr->sn_name, PNX_API_UNEX);
    vccb_ptr->vc_ursn = VCF_ICB;
    vccb_ptr->vc_diag = d_scr_ib;
    return (-1);
}
if ((snsap_ptr->sn_dsac != gtenbl) && (snsap_ptr->sn_dsac != gtused))
{
    vccb_ptr->vc_ursn = VCF_UNA;
    vccb_ptr->vc_diag = d_dte_su;
    return (-1);
}
if (snsap_ptr->sn_numvc > snsap_ptr->sn_maxvc)
{
    vccb_ptr->vc_ursn = VCF_MVC;
    vccb_ptr->vc_diag = d_dte_mx;
    return (-1);
}

/* set init_acceptor field to acceptor */
vccb_ptr->vc_in_ac = *(short *) "AC";

/* get cb_msg from vccb */ cb_call_ptr = vccb_ptr->cb_msg.msg_point.cb_call;

/* process the call parameters by moving data from cb_call_ptr to vccb
 * fields */ if (cb_call_ptr->flags & X25FLG_CALLED_ADDR)
{
    pnx_str_to_bin(vccb_ptr->vc_cdna, cb_call_ptr->called_addr,
                INCLD_SIZE);
    vccb_ptr->vc_cdsa = cb_call_ptr->called_addr;
    cb_call_ptr->called_addr = NULL;
} if (cb_call_ptr->flags & X25FLG_CALLING_ADDR)
{
    pnx_str_to_bin(vccb_ptr->vc_cgna, cb_call_ptr->calling_addr,
                INCLD_SIZE);
    vccb_ptr->vc_cgsa = cb_call_ptr->calling_addr;
    cb_call_ptr->calling_addr = NULL;
}

/* locate remote SNSAP via calling network address */ if (cb_call_ptr->flags & X25FLG_CALLING_ADDR)
{
    pnx_LRS__locate_rsnsap(vccb_ptr, &vccb_ptr->vc_rssap);
}

/* Increment vc count and set dsac state to be used for remote network
 * subscription */ rsap_ptr = vccb_ptr->vc_rssap;
if (rsap_ptr != NULL)
{
    rsap_ptr->sn_numvc += 1;
    rsap_ptr->sn_dsac = gtused;
}
if (cb_call_ptr->flags & X25FLG_USER_DATA)
{

/* copy Call User Data into a PHB buffer  - NOTE CUD is NOT given to
     * the user layer as a PHB, but just as a buffer */
    if ((phb = pnx_get_next_phb()) == NULL)
    {
        return (-1);
    }
    vccb_ptr->vc_udf = udf_ptr = (char *) phb;
    *udf_ptr++ = cb_call_ptr->user_data_len;
    memcpy(udf_ptr, cb_call_ptr->user_data, cb_call_ptr->user_data_len);
}
```

C155

```
        if (!(cb_call_ptr->flags & X25FLG_CB_FAC))   /* no facilities included */
        {
#ifdef PNXDEBUG
            syslog(LOG_DEBUG, "exit : pnx_PCR: NO FACILITIES");
#endif
            return (0);
        }
ifdef PNXDEBUG
    syslog(LOG_DEBUG, "pnx_PCR: Processing FACILITIES");
endif cb_fac_ptr = cb_call_ptr->cb_fac;

if (cb_fac_ptr->flags & X25FLG_FASTSEL
        ||
        cb_fac_ptr->flags & X25FLG_FASTSEL_RSP)
    {
        if (!(snsap_ptr->sn_fsa))   /* fast select acceptance */
        {
            /* X.25 board shouldn't allow this to get to us! */
            pnx_ERR__report_error(JUST_HVX, LOG_WARNING, (PNXX25IN + 2),
                            snsap_ptr->sn_name, PNX_API_UNEX);
            vccb_ptr->vc_ursn = VCF_ICR;
            vccb_ptr->vc_diag = d_dte_fs;
            return (-1);
        }
        if ((cb_fac_ptr->flags & X25FLG_FASTSEL_RSP))   /* fast select
                                                        * restricted resp */
        {
            vccb_ptr->vc_icf.vc_fslri = TRUE;
        }
        else
        {
            vccb_ptr->vc_icf.vc_fslui = TRUE;
        } if (cb_fac_ptr->flags & X25FLG_REV_CHRG)           /* reverse charging */
        {
            if (!(snsap_ptr->sn_rca))   /* reverse charging allowed by snsap */
            {
                /* X.25 board shouldn't allow this to get to us! */
                vccb_ptr->vc_ursn = VCF_ICR;
                vccb_ptr->vc_diag = d_dte_rc;
                pnx_ERR__report_error(JUST_HVX, LOG_WARNING, (PNXX25IN + 3),
                                snsap_ptr->sn_name, PNX_API_UNEX);
                return (-1);
            }
        }
    }
    if (cb_fac_ptr->flags & X25FLG_CUG   /* cug selection (basic)          */
        ||
        cb_fac_ptr->flags & X25FLG_OA_CUG       /* cug seln (basic)with out
                                                 * going access */
        ||
        cb_fac_ptr->flags & X25FLG_BI_CUG)      /* bilateral cug selection */
    {
        if (!(snsap_ptr->sn_cug))
        {
            /* X.25 board shouldn't allow this to get to us! */
            vccb_ptr->vc_ursn = VCF_CUG;
            vccb_ptr->vc_diag = d_dte_cu;
            pnx_ERR__report_error(JUST_HVX, LOG_WARNING, (PNXX25IN + 4),
                            snsap_ptr->sn_name, PNX_API_UNEX);
            return (-1);
        }
    }
    if (cb_fac_ptr->flags & X25FLG_TCLS)         /* throughput class */
    {
        if (!(snsap_ptr->sn_thrng))
        {
            /* X.25 board shouldn't allow this to get to us! */
            vccb_ptr->vc_ursn = VCF_THR;
            vccb_ptr->vc_diag = d_dte_nt;
            pnx_ERR__report_error(JUST_HVX, LOG_WARNING, (PNXX25IN + 5),
                            snsap_ptr->sn_name, PNX_API_UNEX);
```

C156

```
            return (-1);
        }
        vccb_ptr->vc_icf.vc_thrui = TRUE;
        vccb_ptr->vc_thrx = cb_fac_ptr->tcls_cld;
        vccb_ptr->vc_thrr = cb_fac_ptr->tcls_clg;
    } if (cb_fac_ptr->flags & X25FLG_PSIZ)        /* window size */
    {
        vccb_ptr->vc_icf.vc_pszic = TRUE;
        vccb_ptr->vc_pdux = 1 << cb_fac_ptr->psiz_cld;
        vccb_ptr->vc_pdur = 1 << cb_fac_ptr->psiz_clg;
        vccb_ptr->vc_pszx = cb_fac_ptr->psiz_cld;
        vccb_ptr->vc_pszr = cb_fac_ptr->psiz_clg;
    }
    if (cb_fac_ptr->flags & X25FLG_WSIZ)        /* packet size */
    {
        vccb_ptr->vc_icf.vc_wszic = TRUE;
        vccb_ptr->vc_wndx = cb_fac_ptr->wsiz_cld;
        vccb_ptr->vc_wndr = cb_fac_ptr->wsiz_clg;
    }
    if (cb_fac_ptr->flags & X25FLG_CALL_REDR)
    {
        vccb_ptr->vc_diag = cb_fac_ptr->call_redr_reason;
        pnx_str_to_bin(cb_fac_ptr->call_redr_addr, vccb_ptr->vc_cdnx,
                    INCLD_SIZE);
    }
ifdef PNXDEBUG
    syslog(LOG_DEBUG, "exit pnx_PCR");
#endif
    return (0);

}                                       /* end pnx_PCR__process_cr */

/***********************
 * pnx_PCC__process_CC *
 ***********************/

/* Process Call Connected Packet
  *
  * This routine processes an arriving Call Connected packet.
  *
  * This routine is called only in the P2 (DTE Call Request) or P5 (DTE Call
  * Collision) state. */ int
pnx_PCC__process_cc(struct vccb * vccb_ptr)
{
    unsigned int    pkt_len, fac_len, fac_size, fac_code;
    struct snsap    *snsap_ptr;
    struct cb_call_struct *cb_call_ptr;
    struct cb_fac_struct *cb_fac_ptr;
    struct PHD      *phb;
    unsigned char   *udf_ptr;
#ifdef PNXDEBUG
    syslog(LOG_DEBUG, "pnx_PCC, VC=%lX", vccb_ptr);
#endif
    snsap_ptr = vccb_ptr->vc_snsap;
    vccb_ptr->vc_udf = NULL;

vccb_ptr->vc_state = VC_D1;
    vccb_ptr->vc_intx = VC_I1;
    vccb_ptr->vc_intr = VC_J1;
    vccb_ptr->vc_flor = VC_F1;
    vccb_ptr->vc_flox = VC_G1;

cb_call_ptr = vccb_ptr->cb_msg.msg_point.cb_call;

/* Process address section of call connected packet. Move called and
     * calling addresses to VCCB. */ if (cb_call_ptr->flags & X25FLG_CALLING_ADDR)
```

C157

```
    {
        pnx_str_to_bin(vccb_ptr->vc_cgna, cb_call_ptr->calling_addr,
                        INCLD_SIZE);
    } if (cb_call_ptr->flags & X25FLG_CALLED_ADDR)
    {
        pnx_str_to_bin(vccb_ptr->vc_cdna, cb_call_ptr->called_addr,
                        INCLD_SIZE);
    }
    /* Get memory for call user data. */ if (cb_call_ptr->flags & X25FLG_USER_DATA)
    {
        udf_ptr = vccb_ptr->vc_udf;
        if ((phb = pnx_get_next_phb()) == NULL)
        {
            return (-1);
        }
        udf_ptr = (char *) phb;
        *udf_ptr++ = cb_call_ptr->user_data_len;
        memcpy(udf_ptr, cb_call_ptr->user_data, cb_call_ptr->user_data_len);
    } if (!(cb_call_ptr->flags & X25FLG_CB_FAC))
    {
#ifdef PNXDEBUG
        syslog(LOG_DEBUG, "exit: pnx_PCC : No Facilities");
#endif
        return (0);
    }                                       /* end if */

/* Process facilities section of call connected packet.
     *
     * The following international facilities may be present in the call
     * connected packet: */
    /* - packet size (negotiated) */
    /* - window size (negotiated) */
    /* - throughput class (negotiated) */
    /* - network user identification (dte-dte) */
    /* - charging information request (request service dte-dte) */
    /* - called line address modified notification */
    /* - transit delay */

/* The following CCITT specified facilities may be present in the call
     * connected packet: */
    /* - called address extension */
    /* - end-to-end transit delay (negotiated) */
    /* - expedited data support (negotiated) */

/* Non-supported facilities present in the call connected packet will
     * result in the call being cleared. (This should be managed by the X.25
     * board. */ cb_fac_ptr = cb_call_ptr->cb_fac;

if (cb_fac_ptr->flags & X25FLG_TCLS)
    {
        if (!(snsap_ptr->sn_thrng))
        {
            vccb_ptr->vc_ursn = VCF_TNS;
            vccb_ptr->vc_drsn = gtdptl;
            vccb_ptr->vc_diag = d_dte_nt;
            return (-1);
        }                                   /* end if */
        vccb_ptr->vc_thrr = cb_fac_ptr->tcls_clg;
        vccb_ptr->vc_thrx = cb_fac_ptr->tcls_cld;
    } if (cb_fac_ptr->flags & X25FLG_PSIZ)    /* packet size */
    {
        if (!(snsap_ptr->sn_flcng))
        {
            vccb_ptr->vc_ursn = VCF_FNS;
            vccb_ptr->vc_drsn = gtdptl;
```

5

C158

```
            vccb_ptr->vc_diag = d_dte_nf;
            return (-1);
        }                               /* end if */
        vccb_ptr->vc_pszr = cb_fac_ptr->psiz_clg;
        vccb_ptr->vc_pdur = 1 << cb_fac_ptr->psiz_clg;

vccb_ptr->vc_pszx = cb_fac_ptr->psiz_cld;
        vccb_ptr->vc_pdux = 1 << cb_fac_ptr->psiz_cld;
    } if (cb_fac_ptr->flags & X25FLG_WSIZ)         /* window size */
    {
        if (!(snsap_ptr->sn_flcng))
        {
            vccb_ptr->vc_ursn = VCF_FNS;
            vccb_ptr->vc_drsn = gtdptl;
            vccb_ptr->vc_diag = d_dte_nf;
            return (-1);
        }                               /* end if */
        vccb_ptr->vc_wndr = cb_fac_ptr->wsiz_clg;
        vccb_ptr->vc_wndx = cb_fac_ptr->wsiz_cld;
    } ifdef PNXDEBUG
    syslog(LOG_DEBUG, "exit pnx_PCC");
#endif
    return (0);
}                               /* pnx_PCC__process_call_connected */

/*************************
* pnx_PDT__process_data *
*************************/

/* This function processes an arrived data packet. */ int
pnx_PDT__process_data(struct vccb * vccb_ptr)

{
    int             status;
    struct snsap    *snsap_ptr;
#ifdef PNXDEBUG
    syslog(LOG_DEBUG, "pnx_PDT, VC=%lX", vccb_ptr);
#endif
    snsap_ptr = vccb_ptr->vc_snsap;

/* Update statistics: */
    /* data packets received */
    /* packet sequences rcvd */
    /* data octets rcvd */
    vccb_ptr->vc_rpd += 1;
    vccb_ptr->vc_rsd += 1;
    vccb_ptr->vc_rda +=
        vccb_ptr->cb_msg.msg_point.cb_data->data_len;

/* Pass data to user layer. */
    pnx_IDT__issue_data_ind(vccb_ptr);

#ifdef PNXDEBUG
    syslog(LOG_DEBUG, "exit pnx_PDT");
#endif
    return (0);
}                               /* end - pnx_PDT__process_data() */

/***************************
* pnx_PED__expedited_data *
***************************/

/* This routine processes an arriving interrupt packet.
 *
 * This routine is called only if the virtual circuit is in the D1 - Flow
 * Control Ready state. */
```

6

C159

```
int
pnx_PED__process_expedited_data(struct vccb * vccb_ptr)
{
#ifdef PNXDEBUG
    syslog(LOG_DEBUG, "pnx_PED, VC=%lX", vccb_ptr);
#endif
    /* Pass expedited data to user layer. */
    pnx_IED__issue_exp_ind(vccb_ptr);
#ifdef PNXDEBUG
    syslog(LOG_DEBUG, "exit pnx_PED");
#endif
    return (0);
}                                   /* end - pnx_PED__process_expedited_data */

/***********************
 * pnx_PRS__process_rs *
 ***********************/

/* This routine processes a reset indication packet.
 *
 * This routine is called only if the virtual circuit is in the D1 - Flow
 * Control Ready state. */
int
pnx_PRS__process_rs(struct vccb * vccb_ptr)
{
    struct cb_res_struct *cb_res;
#ifdef PNXDEBUG
    syslog(LOG_DEBUG, "pnx_PRS, VC=%lX", vccb_ptr);
#endif
    cb_res = vccb_ptr->cb_msg.msg_point.cb_res;

vccb_ptr->vc_cause = cb_res->cause;
    vccb_ptr->vc_diag = cb_res->diagnostic;

if (cb_res->cause == RS_OUT)
    {
        pnx_check_link(vccb_ptr);
        return (0);
    } vccb_ptr->vc_rrs += 1;
    vccb_ptr->vc_state = VC_D3;

if (!vccb_ptr->vc_pvc)
    {
        pnx_VCE__vc_error(vccb_ptr, VCE_RES);
        pnx_RRS__issue_reset_ind(vccb_ptr);
    }
    else
        if (vccb_ptr->vc_cause == RS_DTE &&
            vccb_ptr->vc_ucxid == NULL &&
            vccb_ptr->vc_diag == d_dte_cx)
        {
            pnx_ICI__issue_con_ind(vccb_ptr);
        }
    else
        if (vccb_ptr->vc_cause == RS_DTE &&
            vccb_ptr->vc_ucxid != NULL &&
            vccb_ptr->vc_diag == d_dte_dx)
        {
            pnx_RDI__issue_dis_ind(vccb_ptr, gtdnrm);
            vccb_ptr->vc_wfdr = 1;
        }
    else
        if (vccb_ptr->vc_cause == RS_DTE &&
            vccb_ptr->vc_ucxid != NULL &&
            vccb_ptr->vc_diag != d_dte_dx)
        {
            pnx_VCE__vc_error(vccb_ptr, VCE_RES);
```

C160

```
            pnx_RRS__issue_reset_ind(vccb_ptr);
        }
        else
            if (vccb_ptr->vc_cause != RS_DTE &&
                vccb_ptr->vc_ucxid == NULL)
        {
            pnx_RS1__process_net_rs(vccb_ptr);
        }
        else
            if (vccb_ptr->vc_cause != RS_DTE &&
                vccb_ptr->vc_ucxid != NULL)
        {
            pnx_RS2__process_net_rs(vccb_ptr);
        }
        else
        {
            pnx_SRC__send_reset_conf(vccb_ptr);
        }                               /* end if */
ifdef PNXDEBUG
    syslog(LOG_DEBUG, "exit pnx_PRS");
#endif
    return (0);

}                                       /* end pnx_PRS__process_rs */

/***************************
 * pnx_RS1__process_net_rs *
 ***************************/

/* Process Network Reset - Part 1
  *
  * This routine processes reset indication packets received from the network
  * over a permanent virtual circuit.
  *
  * This routine is called when the resetting cause received in the reset
  * indication indicates that the reset is not DTE originated.
  *
  * This routine is called when no upper level connection exists on the
  * permanent virtual circuit. */ int
pnx_RS1__process_net_rs(struct vccb * vccb_ptr)
{
#ifdef PNXDEBUG
    syslog(LOG_DEBUG, "pnx_RS1, VC=%lX", vccb_ptr);
endif switch (vccb_ptr->vc_cause)
    { case RS_OUT:                    /* out of order (pvc)    */
    case RS_NCNG:                   /* network congestion    */
    case RS_NOUT:                   /* network out of order  */
    case RS_GCNG:                   /* gateway congestion    */
        vccb_ptr->vc_dsac = gtdsbl;
        break;

case RS_RDOP:                   /* remote DTE operational */
    case RS_NOP:                    /* network operational    */
    case RS_GOP:                    /* gateway operational    */
        vccb_ptr->vc_dsac = gtenbl;
        break;

}                               /* end switch */ pnx_SRC__send_reset_conf(vccb_ptr);

ifdef PNXDEBUG
    syslog(LOG_DEBUG, "exit pnx_RS1");
endif return (0);
}                                   /* end - pnx_RS1__process_net_rs */
```

C161

```c
/***************************
 * pnx_RS2__process_net_rs *
 ***************************/

/* Process Network    Reset - Part 2
  *
  * This routine processes reset indication packets received from the network
  * over a permanent virtual circuit.
  *
  * This routine is called when the resetting cause received in the reset
  * indication indicates that the reset is not DTE originated.
  *
  * This routine is called only if the virtual circuit has an upper layer
  * connection. */
int
pnx_RS2__process_net_rs(struct vccb * vccb_ptr)
{
#ifdef PNXDEBUG
    syslog(LOG_DEBUG, "pnx_RS2, VC=%lX", vccb_ptr);
#endif
    switch (vccb_ptr->vc_cause)
    { case RS_OUT:                /* out of order (pvc)     */
    case RS_NCNG:               /* network congestion     */
    case RS_NOUT:               /* network out of order   */
    case RS_GCNG:               /* gateway congestion     */
        pnx_RDI__issue_dis_ind(vccb_ptr, gtdure);
        vccb_ptr->vc_wfdr = 1;
        vccb_ptr->vc_dsac = gtdsbl;
        break;

case RS_RDOP:               /* remote DTE operational */
    case RS_NOP:                /* network operational    */
    case RS_GOP:                /* gateway operational    */
        pnx_VCE__vc_error(vccb_ptr, VCE_RES);
        pnx_RRS__issue_reset_ind(vccb_ptr);
        vccb_ptr->vc_dsac = gtused;
        break;

default:
        pnx_VCE__vc_error(vccb_ptr, VCE_RES);
        pnx_RRS__issue_reset_ind(vccb_ptr);
        break;

}                           /* end switch */
#ifdef PNXDEBUG
    syslog(LOG_DEBUG, "exit pnx_RS2");
#endif
    return (0);

}                               /* end - pnx_RS2__process_net_rs */

/******************************
 * pnx_PDR__process_clear_ind *
 ******************************/

/* This routine processes a clear indication packet.
  *
  * This routine builds a disconnect indication gater from the fields received
  * in the clear indication packet and issues a gate request to the
  * connection layer.
  *
  * This routine is called in all states except the P6 DTE clear request state. */
int
pnx_PDR__process_clear_ind(struct vccb * vccb_ptr)
{
    unsigned char   *aptr;
    unsigned char   *var_ptr;
    unsigned int    pkt_len, fac_len;
    unsigned int    fac_size, fac_code;
```

C162

```
    unsigned int      cgna_len, cdna_len;
    unsigned int      i, fac_catg, s_len;
    struct snsap      *snsap_ptr;
    struct GATER      *gater;
    unsigned long     gtsce;
    struct cb_clear_struct *cb_clear;
    struct cb_fac_struct *cb_fac;
    struct IRB        *irb;
    struct RB         *iorb;
    struct PHD        *phb;
    char              *clear_udata; /* we get it from our phb chain, but do
                                     * not use it as such */
#ifdef PNXDEBUG
    syslog(LOG_DEBUG, "pnx_PDR, VC=%lX", vccb_ptr);
#endif
    cb_clear = vccb_ptr->cb_msg.msg_point.cb_clear;
    cb_fac = cb_clear->cb_fac;

if (cb_clear->cause == CL_OUT)
    {
        pnx_check_link(vccb_ptr);
        return (0);
    } snsap_ptr = vccb_ptr->vc_snsap;

if (pnx_get_next_vc_receive(&irb, &iorb) != 0)
    {
        return (-1);
    }
    RISC_ADDR(gater, (struct GATER *), iorb->rb_adr);

/* Setup fields in fixed part of gater. */ gater->gt_pri = 0;
    PUT4(gater->gt_nxt, 0);
    *(long *) gater->gt_mkr = *(long *) "GT01";
    gater->gt_slr = snsap_ptr->sn_mylv;
    gater->gt_sin = snsap_ptr->sn_myin;
    gater->gt_dlr = snsap_ptr->sn_olv;
    gater->gt_din = snsap_ptr->sn_oin;
    gater->gt_fnc = gtfdin;
    PUT4(gater->gt_dst, vccb_ptr->vc_ucxid);
    PUT4(gater->gt_dta, 0);
    gater->gt_crn = 0;
    gater->gt_cre = 0;
    gater->gt_flg = 0;

gater->gt_vln = 0;

/* Setup source connection id. */ switch (vccb_ptr->vc_state)
    { case VC_P2:
        gtsce = 0;
        break;

case VC_P5:
        if (snsap_ptr->sn_dce)
        {
            gtsce = vccb_ptr->vc_gtid;
        }
        else
        {
            gtsce = 0;
        }                           /* end if */
        break;

default:
        gtsce = vccb_ptr->vc_gtid;
        break;

}                               /* end switch */
    PUT4(gater->gt_sce, gtsce);
```

10

C163

```
    var_ptr = &gater->gt_var[0];

/* Build clearing cause parameter. */ vccb_ptr->vc_cause = cb_clear->cause;
    *var_ptr++ = x25xcf;            /* clearing cause        */
    *var_ptr++ = 1;
    *var_ptr++ = cb_clear->cause;
    gater->gt_vln += 3;

/* Setup disconnect reason. */ switch (vccb_ptr->vc_state)
    { case VC_P2:
        if (vccb_ptr->vc_cause == 0)
        {
            gater->gt_dis = gtdnrm;
        }
        else
        {
            gater->gt_dis = gtdnrf;
        }                               /* end if */
        break;
    case VC_P3:
        if (vccb_ptr->vc_cause == 0)
        {
            gater->gt_dis = gtdnrm;
        }
        else
        {
            gater->gt_dis = gtdure;
        }                               /* end if */
        break;
    case VC_P5:
        if (snsap_ptr->sn_dce)
        {
            if (vccb_ptr->vc_cause == 0)
            {
                gater->gt_dis = gtdnrm;
            }
            else
            {
                gater->gt_dis = gtdure;
            }                           /* end if */
        }
        else
        {
            if (vccb_ptr->vc_cause == 0)
            {
                gater->gt_dis = gtdnrm;
            }
            else
            {
                gater->gt_dis = gtdnrf;
            }                           /* end if */
        }                               /* end if */
        break;

default:
        if (vccb_ptr->vc_cause == 0)
        {
            gater->gt_dis = gtdnrm;
        }
        else
        {
            gater->gt_dis = gtdure;
        }                               /* end if */
        break;

}                                   /* end switch */ vccb_ptr->vc_state = VC_P7;
```

C164

```c
    /* Build diagnostic code parameter. */
    if (cb_clear->flags & X25FLG_DIAGNOSTIC)
    {
        vccb_ptr->vc_diag = cb_clear->diagnostic;
        *var_ptr++ = x25xdf;        /* diagnostic code        */
        *var_ptr++ = 1;
        *var_ptr++ = cb_clear->diagnostic;
        gater->gt_vln += 3;
    }

/* Build called and calling X.121 addresses. */
    if (cb_clear->flags & X25FLG_CALLED_ADDR)
    {
        *var_ptr++ = x25cda;
        s_len = (((strlen(cb_clear->called_addr) + 1) / 2) + 1);
        *var_ptr++ = s_len;
        pnx_str_to_bin(var_ptr, cb_clear->called_addr, 0);
        var_ptr = var_ptr + s_len;
        gater->gt_vln += s_len + 2;
    } if (cb_clear->flags & X25FLG_CALLING_ADDR)
    {
        *var_ptr++ = x25cga;
        s_len = (((strlen(cb_clear->calling_addr) + 1) / 2) + 1);
        *var_ptr++ = s_len;
        pnx_str_to_bin(var_ptr, cb_clear->calling_addr, 0);
        var_ptr = var_ptr + s_len;
        gater->gt_vln += s_len + 2;
    } if (cb_clear->flags & X25FLG_CB_FAC)
    {
        /* Process facilities section of clear indication packet.
         *
         * Build variable parameters from selected facilities.
         *
         * The following international facilities may be present in the clear
         * indication packet. - charging information indicating monetary unit
         * indicating distance indicating segment count indicating call
         * duration - called line address modified notification
         *
         * The following CCITT specified facilities may be present in the clear
         * indication packet.
         *
         * - called address extension
         *
         * Non-supported facilities present in the clear indication packet will
         * be ignored. */ if (cb_fac->flags & X25FLG_CALLED_ADDR_EXT)
        {
            *var_ptr++ = x25cdn;
            s_len = (((strlen(cb_fac->called_addr_ext) + 1) / 2) + 1);
            *var_ptr++ = s_len;
            pnx_str_to_bin(var_ptr, cb_clear->called_addr, 0);
            var_ptr = var_ptr + s_len;
            gater->gt_vln += s_len + 2;
        }
    }                               /* endif - X25_CB_FAC */
    /* Get buffer for call user data. Move user data field to allocated
     * memory. */
    if (cb_clear->flags & X25FLG_USER_DATA)
    {
        if ((phb = pnx_get_next_phb()) == NULL)
        {
            return (-1);
        }
        clear_udata = (char *) phb;
        *clear_udata++ = cb_clear->user_data_len;
        memcpy(clear_udata, cb_clear->user_data, cb_clear->user_data_len);
        DPS6_ADDR(gater->gt_dta, clear_udata);
        gater->gt_len = cb_clear->user_data_len;

}                               /* end if */
```

12

C165

```
    /* Issue gate request (post the VC RECEIVE) */ pnx_post_request(irb);

ifdef PNXDEBUG
    syslog(LOG_DEBUG, "exit pnx_PDR");
#endif
    return (0);

}                                    /* pnx_PDR__process_clear_ind */

/*************************
 * pnx_vc_clear_complete() *
 *************************/

/* This function performs processing related to receipt of SIGCHLD,
  * indicating that a VC_CLEAR process has terminated.
  *
  * Wait for all terminated VC_CLEAR processes, calling the X.25 received packet *
  * state machine.
  *
  * Note - the Disconnect Confirm (or Indication) GATER has already been sent to *
  * PNet.  We are just waiting here for the X.25 API to be cleaned up. */ int
pnx_vc_clear_complete()
{
    struct vccb    *vccb_ptr;
    pid_t          pid;      /* ID of terminated process */
    int            status;   /* child exit status */
#ifdef PNXDEBUG
    syslog(LOG_DEBUG, "pnx_vc_clear_complete");
#endif
    while ((pid = waitpid(0, &status, WNOHANG)) > 0)
    {
        if ((vccb_ptr = (pnx_GVP__get_vccb_by_pid(pid))) == NULL)
        {
            /* NOTE - this error may be reported at init time - we fork to
             * get the x25 port attributes */
#ifdef PNXDEBUG
            pnx_ERR__report_error(JUST_HVX, LOG_WARNING, (PNXX25IN + 6),
                                  NULL, PNX_NO_VCCB);
#endif                              /* PNXDEBUG */
            /* but keep going until all children processed */
        }
        else
        {
            vccb_ptr->vc_state = VC_P1;
            pnx_CVC__close_vc(vccb_ptr);
            pnx_RVC__release_vccb(vccb_ptr);
        }
    }
ifdef PNXDEBUG
    syslog(LOG_DEBUG, "exit pnx_vc_clear_complete, VC=%lX", vccb_ptr);
#endif
    return (0);
}                                    /* end pnx_vc_clear_complete */
```

C166

```
/*
 * Name:       pnx_x25out.c
 * Purpose:    This module contains those functions required
 *             to send packets using the X.25 API
 * Functions in this module:
 *     (see pnx_func.h for prototype declarations)
 *
 *   int       pnx_SCR__send_call_req()
 *   int       pnx_SCC__send_call_accpt()
 *   int       pnx_XCC__extd_call_accpt()
 *   int       pnx_SRS__send_reset_req()
 *   int       pnx_SRC__send_reset_conf()
 *   int       pnx_SED__send_interrupt()
 *   int       pnx_SDR__send_clear_req()
 *   int       pnx_XDR__extd_clear_req()
 *   int       pnx_SDT__send_data()
 *   int       pnx_SDC__send_clear_conf()
 */

/* general header files: */
#include "sys_head.h"
include "emu_head.h"
#include "macro.h"
#include "mqi_head.h"
#include "z3rct.h"
#include "z_rb.h"
#include "z3irb.h"

/* PNetX specifics: */
#include <x25sdefs.h>
include "pnx_head.h"
include "pnx_vccb.h"
#include "pnx_snsap.h"
#include "hvx_phd.h"
#include "hvx_gater.h"
#include "pnx_trace.h"
#include "x25fac.h"
#include "x25dia.h"              /* required by UCP - diagnostic codes */
#include "x25vce.h"              /* required by UCP - reason codes     */
#include "x25nse.h"
#include "x25sta.h"
#include "hvx_lme.h"

extern char      *base;

extern struct pnx_global *PnetXGlobal;

/* called functions:
 */

/***************************
 * pnx_SCR__send_call_req  *
 ***************************/

/* Send Call Request Packet
 *
 * This routine is used to initialize the X.25 API data structures.
 *
 * The calling DTE address is obtained from the local SNSAP table.  The called
 * DTE address is obtained from the VCCB.
 *
 * Optional user facilities which may be sent in the call request are passed in
 * the variable part of the gater.
 *
 * A pointer to the call user data to be sent in the call request is passed in
 * the fixed part of the gater. */ pnx_SCR__send_call_req(struct vccb * vccb_ptr,
                       struct GATER * gater_ptr)
{ unsigned int    i, j, fsr, fsu, fsrc, rc;
    unsigned int    cgna_len;
```

C167

```
    unsigned int      s_len;
    unsigned int      cgf_len, cdf_len;
    unsigned char     *cgf_ptr;
    unsigned char     *cdf_ptr;
    struct snsap      *snsap_ptr;
    struct snsap      *rsap_ptr;
    register struct PHD *phb_ptr;
    unsigned char     r_sap[9];
    struct cb_call_struct *cb_call_ptr;
    struct cb_fac_struct *cb_fac_ptr;
    char              *addr_ext;
    short             addr_sz, fac_field;
    ushort            *rpoa_id_ptr;
    char              *udf;
#ifdef PNXDEBUG
    syslog(LOG_DEBUG, "pnx_SCR");
#endif
    r_sap[0] = 0;

for (i = 1; i <= 8; i++)
    {
        r_sap[i] = ' ';
    }                           /* end loop */ fsr = 0;
    fsu = 0;
    fsrc = 0;

snsap_ptr = vccb_ptr->vc_snsap;

/* Process fields in variable part of gater */ for (i = 0; i < gater_ptr->gt_vln; i += gater_ptr->gt_var[i + 1] + 2)
    {
        switch (gater_ptr->gt_var[i])
        { case gpccda:                /* Called (remote) SAP    */ if (gater_ptr->gt_var[i + 1] > 8)
            {
                pnx_NSN__ns_error2(NULL, st25_ISL);
                return (-1);
            }                       /* end if */ r_sap[0] = gater_ptr->gt_var[i + 1];
            memcpy(&r_sap[1], &gater_ptr->gt_var[i + 2], r_sap[0]);

if (pnx_GSN__get_snsap(&r_sap[0], &rsap_ptr) != 0)
            {
                pnx_NSN__ns_error2(&gater_ptr->gt_var[i + 1], st25_RNF);
                return (-1);
            }                       /* end if */
            if (!(rsap_ptr->sn_rem))
            {
                pnx_NSN__ns_error2(&gater_ptr->gt_var[i + 1], st25_RNF);
                return (-1);
            }                       /* end if */ vccb_ptr->vc_rssap = rsap_ptr;

if (rsap_ptr->sn_dsac != gtenbl &&
                rsap_ptr->sn_dsac != gtused)
            {
                pnx_NSE__ns_error(rsap_ptr, NSE_RSU);
                return (-1);
            }                       /* end if */ rsap_ptr->sn_numvc += 1;
            rsap_ptr->sn_dsac = gtused;

/* Called X.121 address */ if (rsap_ptr->sn_addr[0] != 0)
            {
                vccb_ptr->vc_cdna[0] = rsap_ptr->sn_addr[0];
```

C168

```
            pnx_MNA__move_net_addr(&rsap_ptr->sn_addr[1], 0,
                    &vccb_ptr->vc_cdna[1], 0, rsap_ptr->sn_addr[0]);
            vccb_ptr->vc_cdnx[0] = rsap_ptr->sn_addr[0];
            pnx_MNA__move_net_addr(&rsap_ptr->sn_addr[1], 0,
                    &vccb_ptr->vc_cdnx[1], 0, rsap_ptr->sn_addr[0]);
        }                        /* end if */
        break;

case x25cge:                 /* Calling X.121 addr ext  */
        vccb_ptr->vc_cgne[0] = gater_ptr->gt_var[i + 2];
        pnx_MNA__move_net_addr(&gater_ptr->gt_var[i + 3], 0,
                    &vccb_ptr->vc_cgne[1], 0, gater_ptr->gt_var[i + 2]);
        break;

case x25cda:                 /* Called X.121 address    */
        vccb_ptr->vc_cdna[0] = gater_ptr->gt_var[i + 2];
        pnx_MNA__move_net_addr(&gater_ptr->gt_var[i + 3], 0,
                    &vccb_ptr->vc_cdna[1], 0, gater_ptr->gt_var[i + 2]);
        vccb_ptr->vc_cdnx[0] = gater_ptr->gt_var[i + 2];
        pnx_MNA__move_net_addr(&gater_ptr->gt_var[i + 3], 0,
                    &vccb_ptr->vc_cdnx[1], 0, gater_ptr->gt_var[i + 2]);
        break;

case x25cde:                 /* Called X.121 addr ext   */
        vccb_ptr->vc_cdne[0] = gater_ptr->gt_var[i + 2];
        pnx_MNA__move_net_addr(&gater_ptr->gt_var[i + 3], 0,
                    &vccb_ptr->vc_cdne[1], 0, gater_ptr->gt_var[i + 2]);
        break;

case x25thr:                 /* Throughput class        */
        if (snsap_ptr->sn_thrng)
        {
            vccb_ptr->vc_thrx = gater_ptr->gt_var[i + 2];
            vccb_ptr->vc_thrr = gater_ptr->gt_var[i + 3];
        }
        else
        {
            pnx_NSE__ns_error(snsap_ptr, NSE_NTC);
            return (-1);
        }                        /* end if */
        break;

case x25psz:                 /* Packet size             */
        if (snsap_ptr->sn_flcng)
        {
            vccb_ptr->vc_pszx = gater_ptr->gt_var[i + 2];
            vccb_ptr->vc_pszr = gater_ptr->gt_var[i + 3];
            vccb_ptr->vc_pdux = 1 << vccb_ptr->vc_pszx;
            vccb_ptr->vc_pdur = 1 << vccb_ptr->vc_pszr;
        }
        else
        {
            pnx_NSE__ns_error(snsap_ptr, NSE_NFC);
            return (-1);
        }                        /* end if */
        break;

case x25wsz:                 /* Window size             */
        if (snsap_ptr->sn_flcng)
        {
            vccb_ptr->vc_wndx = gater_ptr->gt_var[i + 2];
            vccb_ptr->vc_wndr = gater_ptr->gt_var[i + 3];
        }
        else
        {
            pnx_NSE__ns_error(snsap_ptr, NSE_NFC);
            return (-1);
        }                        /* end if */
        break;

case x25fsu:                 /* fast sel - unrestricted */
        fsu = 1;
        vccb_ptr->vc_fsux = 1;
        break;

case x25fsr:                 /* fast sel - restricted   */
        fsr = 1;
```

C169

```
            vccb_ptr->vc_fsrx = 1;
            break;

case x25rcr:                   /* reverse charging        */
            fsrc = 1;
            break;

}                              /* end switch */
    }                                  /* end loop */
    if ((snsap_ptr->sn_nca) ||
        (snsap_ptr->sn_ntw == SN_TRNS))
    {
        cgna_len = 0;
    }
    else
    {
        cgna_len = vccb_ptr->vc_cgna[0];
    }                                  /* end if */
    if (cgna_len + vccb_ptr->vc_cgne[0] > 15)
    {
        pnx_NSE__ns_error(snsap_ptr, NSE_CGA);
        return (-1);
    }                                  /* end if */
    if (vccb_ptr->vc_cdna[0] + vccb_ptr->vc_cdne[0] > 15)
    {
        pnx_NSE__ns_error(snsap_ptr, NSE_CDA);
        return (-1);
    }                                  /* end if */

/* Setup address section of cb_call struct. Move called and calling
     * addresses to respective fields.        */ cb_call_ptr = (struct cb_call_struct *)
        memset(malloc(sizeof(struct cb_call_struct)),
               0,
               sizeof(struct cb_call_struct));
    if (cb_call_ptr == NULL)
    {
        pnx_ERR__report_error(JUST_HVX, LOG_ERR, PNXX25OUT + 11,
                              NULL, PNX_SYS_ERR);
        return (-1);
    } vccb_ptr->cb_call = cb_call_ptr;
    cb_call_ptr->flags = X25FLG_LINK_NAME;
    cb_call_ptr->link_name = (char *) malloc(snsap_ptr->sn_lsap[0] + 1);
    if (cb_call_ptr->link_name == NULL)
    {
        pnx_ERR__report_error(JUST_HVX, LOG_ERR, PNXX25OUT + 12,
                              NULL, PNX_SYS_ERR);
        return (-1);
    } strcpy(cb_call_ptr->link_name, &(snsap_ptr->sn_lsap[1]));
    if (vccb_ptr->vc_cdna[0] != 0)
    {
        cb_call_ptr->flags |= X25FLG_CALLED_ADDR;
        cb_call_ptr->called_addr = (char *) malloc(vccb_ptr->vc_cdna[0] +
                                                   vccb_ptr->vc_cdne[0] + 1);
        if (cb_call_ptr->called_addr == NULL)
        {
            pnx_ERR__report_error(JUST_HVX, LOG_ERR, PNXX25OUT + 13,
                                  NULL, PNX_SYS_ERR);
            return (-1);
        } pnx_bin_to_str(cb_call_ptr->called_addr, vccb_ptr->vc_cdna, &addr_sz);
        if (vccb_ptr->vc_cdne[0] != 0)
        {
            addr_ext = (char *) malloc(vccb_ptr->vc_cdne[0] + 1);
            if (addr_ext == NULL)
            {
```

4

C170

```
            pnx_ERR__report_error(JUST_HVX, LOG_ERR, PNXX25OUT + 14,
                                  NULL, PNX_SYS_ERR);
            return (-1);
        } pnx_bin_to_str(addr_ext, vccb_ptr->vc_cdne, &addr_sz);
        strcat(cb_call_ptr->called_addr, addr_ext);
    }                           /* end if */
} if (cgna_len != 0)
{
    cb_call_ptr->flags |= X25FLG_CALLING_ADDR;
    cb_call_ptr->calling_addr = (char *) malloc(vccb_ptr->vc_cgna[0] +
                                                vccb_ptr->vc_cgne[0]);
    if (cb_call_ptr->calling_addr == NULL)
    {
        pnx_ERR__report_error(JUST_HVX, LOG_ERR, PNXX25OUT + 15,
                              NULL, PNX_SYS_ERR);
        return (-1);
    } pnx_bin_to_str(cb_call_ptr->calling_addr, vccb_ptr->vc_cgna, &addr_sz);
    if (vccb_ptr->vc_cgne[0] != 0)
    {
        addr_ext = (char *) malloc(vccb_ptr->vc_cgne[0]);
        if (addr_ext == NULL)
        {
            pnx_ERR__report_error(JUST_HVX, LOG_ERR, PNXX25OUT + 16,
                                  NULL, PNX_SYS_ERR);
            return (-1);
        } pnx_bin_to_str(addr_ext, vccb_ptr->vc_cgne, &addr_sz);
        strcat(cb_call_ptr->calling_addr, addr_ext);
    }                           /* end if */
}                               /* end if */

/* Build facilities field of cb_call struct.
 *
 * The following international facilities may be present in the
 * cb_fac_field: */
/* - packet size negotiation */
/* - window size negotiation */
/* - throughput class negotiation */
/* - closed user group, basic format */
/* - closed user group, extended format */
/* - closed user group with outgoing access, basic format */
/* - closed user group with outgoing access,  extended format */
/* - bilateral closed user group */
/* - fast select */
/* - reverse charging */
/* - charging information (request service) */
/* - Registered private operating agency, basic format */
/* - Registered private operating agency, extended format */
/* - Transit delay (selection) */

/* The following CCITT specified facilities may be present in the call
 * request packet: */
/* - Calling address extension */
/* - Called address extension */
/* - Expedited data negotiation */

/* Non-supported facilities present in the connect request gater will be
 * ignored. */ cgf_len = 0;
cdf_len = 0;

fac_field = 0;
cb_call_ptr->cb_fac = (struct cb_fac_struct *)
    memset(malloc(sizeof(struct cb_fac_struct)),
           0,
           sizeof(struct cb_fac_struct));
if (cb_call_ptr->cb_fac == NULL)
```

C171

```
{
    pnx_ERR__report_error(JUST_HVX, LOG_ERR, PNXX25OUT + 17,
                    NULL, PNX_SYS_ERR);
    return (-1);
} cb_fac_ptr = cb_call_ptr->cb_fac;

if ((snsap_ptr->sn_flcng) &&
    !(vccb_ptr->vc_fsrx))
{
    fac_field = 1;
    cb_fac_ptr->flags |= X25FLG_PSIZ;          /* packet size */
    cb_fac_ptr->psiz_cld = vccb_ptr->vc_pszr;
    cb_fac_ptr->psiz_clg = vccb_ptr->vc_pszx;

cb_fac_ptr->flags |= X25FLG_WSIZ;          /* window size */
    cb_fac_ptr->wsiz_cld = vccb_ptr->vc_wndr;
    cb_fac_ptr->wsiz_clg = vccb_ptr->vc_wndx;
}                                    /* end if */ if (snsap_ptr->sn_thrng)
{
    fac_field = 1;
    cb_fac_ptr->flags |= X25FLG_TCLS;
    cb_fac_ptr->tcls_cld = vccb_ptr->vc_thrx;
    cb_fac_ptr->tcls_clg = vccb_ptr->vc_thrr;
}                                    /* end if */ for (i = 0; i < gater_ptr->gt_vln; i += gater_ptr->gt_var[i + 1] + 2)
{
    switch (gater_ptr->gt_var[i])
    { case x25cug:                    /* Closed user group    */
        fac_field = 1;
        cb_fac_ptr->flags |= X25FLG_CUG;
        pnx_bcd_to_short(&cb_fac_ptr->cug_id, (&gater_ptr->gt_var[i + 2]),
                    gater_ptr->gt_var[i + 1]);
        break;

case x25cuo:                    /* CUG with out access  */
        fac_field = 1;
        cb_fac_ptr->flags |= X25FLG_OA_CUG;
        pnx_bcd_to_short(&cb_fac_ptr->cug_id, (&gater_ptr->gt_var[i + 2]),
                    gater_ptr->gt_var[i + 1]);
        break;

case x25bcg:                    /* BICUG selection      */
        fac_field = 1;
        cb_fac_ptr->flags |= X25FLG_BI_CUG;
        pnx_bcd_to_short(&cb_fac_ptr->cug_id, (&gater_ptr->gt_var[i + 2]), 2);
        break;

case x25cir:                    /* charging info request */
        fac_field = 1;
        cb_fac_ptr->flags |= X25FLG_CI_REQUEST;
        break;

case x25nci:                    /* no charging info request */
        break;

case x25rpa:                    /* RPOA selection       */
        fac_field = 1;
        cb_fac_ptr->flags |= X25FLG_RPOA;
        if (gater_ptr->gt_var[i + 1] <= 2)
        {
            cb_fac_ptr->rpoa_id_len = 1;
            pnx_bcd_to_short(cb_fac_ptr->rpoa_id, (gater_ptr->gt_var + 2), 2);
        }
        else
        {
            cb_fac_ptr->rpoa_id_len = (gater_ptr->gt_var[i + 1]) / 2;
            cb_fac_ptr->rpoa_id = (ushort *) malloc(cb_fac_ptr->rpoa_id_len
                        * sizeof(ushort));
            if (cb_fac_ptr->rpoa_id == NULL)
            {
```

6

C172

```
            pnx_ERR__report_error(JUST_HVX, LOG_ERR, PNXX25OUT + 18,
                                   NULL, PNX_SYS_ERR);
            return (-1);
        } rpoa_id_ptr = cb_fac_ptr->rpoa_id;
        for (j = 0; j < cb_fac_ptr->rpoa_id_len; j++)
        {
            /* we need a temporary ushort pointer to pass to
             * bcd_to_short */
            /* malloc() before loop, set up ->rpoa_id */
            pnx_bcd_to_short(rpoa_id_ptr, gater_ptr->gt_var[i + 2], 2);
            rpoa_id_ptr++;
            i = i + 2;
        }
    }                                /* end if */
    break;
    case x25cgn:                     /* calling address ext      */
        fac_field = 1;
        cb_fac_ptr->flags |= X25FLG_CALLING_ADDR_EXT;
        s_len = gater_ptr->gt_var[i + 1];
        cb_fac_ptr->calling_addr_ext_use = (0xC0 & s_len) >> 6;
        s_len = s_len & 0x3F;
        memcpy(cb_fac_ptr->calling_addr_ext, &gater_ptr->gt_var[i + 2], s_len);
        break;

case x25cdn:                     /* called address ext       */
        fac_field = 1;
        cb_fac_ptr->flags |= X25FLG_CALLED_ADDR_EXT;
        s_len = gater_ptr->gt_var[i + 1];
        cb_fac_ptr->called_addr_ext_use = (0xC0 & s_len) >> 6;
        s_len = s_len & 0x3F;
        memcpy(cb_fac_ptr->called_addr_ext, &gater_ptr->gt_var[i + 2], s_len);
        break;

case x25dly:                     /* transit delay            */
        fac_field = 1;
        cb_fac_ptr->flags |= X25FLG_TRAN_DEL;
        cb_fac_ptr->tran_del = gater_ptr->gt_var[i + 2] << 8 +
            gater_ptr->gt_var[i + 3];
        break;

case x25cgf:                     /* calling PDN facilities */
        cgf_len = gater_ptr->gt_var[i + 1];
        cgf_ptr = &gater_ptr->gt_var[i + 2];
        break;

case x25cdf:                     /* called PDN facilities */
        cdf_len = gater_ptr->gt_var[i + 1];
        cdf_ptr = &gater_ptr->gt_var[i + 2];
        break;

}                                /* end switch */
}                                    /* end loop */ if (fsu == 1)                        /* fast select unrestricted */
{
    fac_field = 1;
    cb_fac_ptr->flags |= X25FLG_FASTSEL;
}
if (fsr == 1)                        /* fast select restricted */
{
    fac_field = 1;
    cb_fac_ptr->flags |= X25FLG_FASTSEL_RSP;
}
if (fsrc == 1)                       /* reverse charging */
{
    fac_field = 1;
    cb_fac_ptr->flags |= X25FLG_REV_CHRG;
}

/* Build calling PDN facilities. */ if ((cgf_len != 0) && (cdf_len != 0))
{
    cb_fac_ptr->fac_ext = (u_char *) malloc(cgf_len + cdf_len + 4);
```

7

C173

```
            if (cb_fac_ptr->fac_ext == NULL)
            {
                pnx_ERR__report_error(JUST_HVX, LOG_ERR, PNXX25OUT + 19,
                                NULL, PNX_SYS_ERR);
                return (-1);
            }
        }
        else
        if ((cgf_len != 0) || (cdf_len != 0))
        {
            cb_fac_ptr->fac_ext = (u_char *) malloc(cgf_len + cdf_len + 2);
            if (cb_fac_ptr->fac_ext == NULL)
            {
                pnx_ERR__report_error(JUST_HVX, LOG_ERR, PNXX25OUT + 20,
                                NULL, PNX_SYS_ERR);
                return (-1);
            }
        } if (cgf_len != 0)
        {
            cb_fac_ptr->flags |= X25FLG_FACEXT;
            *cb_fac_ptr->fac_ext++ = FAC_MRKR;
            *cb_fac_ptr->fac_ext++ = MKR_CLNG;
            memcpy(cb_fac_ptr->fac_ext, cgf_ptr, cgf_len);
            cb_fac_ptr->fac_ext += cgf_len;
        }                                       /* end if */

/* Build called PDN facilities. */
        if (cdf_len != 0)
        {
            cb_fac_ptr->flags |= X25FLG_FACEXT;
            *cb_fac_ptr->fac_ext++ = FAC_MRKR;
            *cb_fac_ptr->fac_ext++ = MKR_CLLD;
            memcpy(cb_fac_ptr->fac_ext, cdf_ptr, cdf_len);
            cb_fac_ptr->fac_ext += cdf_len;
        }                                       /* end if */
    RISC_ADDR(udf, (char *), gater_ptr->gt_dta);
    if (udf == base)
    {
        udf = NULL;
    } if (udf != NULL)
    {
        cb_call_ptr->flags |= X25FLG_USER_DATA;
        cb_call_ptr->user_data_len = *udf++;
        cb_call_ptr->user_data = udf;
    }
    vccb_ptr->counter = x25_ctr_get();
    if (vccb_ptr->counter == -1)
    {
        pnx_ERR__report_error(JUST_HVX, LOG_ERR, (PNXX25OUT + 26),
                        snsap_ptr->sn_name, PNX_API);
        pnx_x25_errors(vccb_ptr);
        return (-1);
    } if (fac_field)
    {
        cb_call_ptr->flags |= X25FLG_CB_FAC;
    } ifdef PNXDEBUG
    syslog(LOG_DEBUG, "PNetX: making call");
    syslog(LOG_DEBUG, "  port:'%s', called:'%s', calling:'%s'",
            cb_call_ptr->link_name,
            cb_call_ptr->called_addr,
            cb_call_ptr->calling_addr);
    if (cb_call_ptr->flags & X25FLG_CB_FAC)
    {
        syslog(LOG_DEBUG, " FACILITIES REQUESTED:");
        if (cb_fac_ptr->flags & X25FLG_FACEXT)
```

C174

```
                syslog(LOG_DEBUG, "   X25FLG_FACEXT");
            if (cb_fac_ptr->flags & X25FLG_PSIZ)
                syslog(LOG_DEBUG, "   X25FLG_PSIZ");
            if (cb_fac_ptr->flags & X25FLG_WSIZ)
                syslog(LOG_DEBUG, "   X25FLG_WSIZ");
            if (cb_fac_ptr->flags & X25FLG_TCLS)
                syslog(LOG_DEBUG, "   X25FLG_TCLS");
            if (cb_fac_ptr->flags & X25FLG_RPOA)
                syslog(LOG_DEBUG, "   X25FLG_RPOA");
            if (cb_fac_ptr->flags & X25FLG_CUG)
                syslog(LOG_DEBUG, "   X25FLG_CUG");
            if (cb_fac_ptr->flags & X25FLG_OA_CUG)
                syslog(LOG_DEBUG, "   X25FLG_OA_CUG");
            if (cb_fac_ptr->flags & X25FLG_BI_CUG)
                syslog(LOG_DEBUG, "   X25FLG_BI_CUG");
            if (cb_fac_ptr->flags & X25FLG_NUI_DATA)
                syslog(LOG_DEBUG, "   X25FLG_NUI_DATA");
            if (cb_fac_ptr->flags & X25FLG_CI_SEG_CNT)
                syslog(LOG_DEBUG, "   X25FLG_CI_SEG_CNT");
            if (cb_fac_ptr->flags & X25FLG_CI_MON_UNT)
                syslog(LOG_DEBUG, "   X25FLG_CI_MON_UNT");
            if (cb_fac_ptr->flags & X25FLG_CI_CALL_DUR)
                syslog(LOG_DEBUG, "   X25FLG_CI_CALL_DUR");
            if (cb_fac_ptr->flags & X25FLG_CLAMN)
                syslog(LOG_DEBUG, "   X25FLG_CLAMN");
            if (cb_fac_ptr->flags & X25FLG_CALL_REDR)
                syslog(LOG_DEBUG, "   X25FLG_CALL_REDR");
            if (cb_fac_ptr->flags & X25FLG_TRAN_DEL)
                syslog(LOG_DEBUG, "   X25FLG_TRAN_DEL");
            if (cb_fac_ptr->flags & X25FLG_CALLING_ADDR_EXT)
                syslog(LOG_DEBUG, "   X25FLG_CALLING_ADDR_EXT");
            if (cb_fac_ptr->flags & X25FLG_CALLED_ADDR_EXT)
                syslog(LOG_DEBUG, "   X25FLG_CALLED_ADDR_EXT");
            if (cb_fac_ptr->flags & X25FLG_MIN_TCLS)
                syslog(LOG_DEBUG, "   X25FLG_MIN_TCLS");
            if (cb_fac_ptr->flags & X25FLG_END_TO_END_DEL)
                syslog(LOG_DEBUG, "   X25FLG_END_TO_END_DEL");
        }
#endif
    add_to_array(vccb_ptr);
    TRACE(X25_OUTGOING, X25_INCOMING_CALL,
            0, 0, vccb_ptr->vc_gtid, vccb_ptr->conn_id, vccb_ptr->vc_lcn);

rc = x25_call(cb_call_ptr, vccb_ptr->counter);
    TRACE_A();

vccb_ptr->conn_id = rc;

if (rc == -1)
    {
        pnx_ERR__report_error(JUST_HVX, LOG_ERR, (PNXX25OUT + 4),
                        snsap_ptr->sn_name, PNX_API);
        pnx_x25_errors(vccb_ptr);
#ifdef PNXDEBUG
        syslog(LOG_DEBUG, "exit pnx_SCR");
#endif
        return (-1);
    }
    else
    {
        vccb_ptr->vc_state = VC_P2;
#ifdef PNXDEBUG
        syslog(LOG_DEBUG, "exit pnx_SCR");
#endif
        return (0);
    }                                           /* end if */

}

/* pnx_SCR__send_call_req */

/*****************************
 * pnx_SCC__send_call_accpt *        Send Call Accept
 *****************************/

/* This routine is used to initialize the X.25 API data structures to send a
```

C175

```
 * call accept.
 *
 * A user data field may be present only if the incoming call packet specified
 * the fast select facility with no restriction on the response. */ int
pnx_SCC__send_call_accpt(struct vccb * vccb_ptr, unsigned char *udf_buf)
{ struct snsap      *snsap_ptr;
    struct cb_call_struct *cb_call_ptr;
#ifdef PNXDEBUG
    syslog(LOG_DEBUG, "pnx_SCC");
#endif
    snsap_ptr = vccb_ptr->vc_snsap;
    cb_call_ptr = (struct cb_call_struct *)
        memset(malloc(sizeof(struct cb_call_struct)),
               0,
               sizeof(struct cb_call_struct));
    if (cb_call_ptr == NULL)
    {
        pnx_ERR__report_error(JUST_HVX, LOG_ERR, PNXX25OUT + 21,
                              NULL, PNX_SYS_ERR);
        return (-1);
    } vccb_ptr->cb_call = cb_call_ptr;

/* X.25link name into cb_call */
    cb_call_ptr->link_name = (char *) malloc(snsap_ptr->sn_lsap[0] + 1);
    if (cb_call_ptr->link_name == NULL)
    {
        pnx_ERR__report_error(JUST_HVX, LOG_ERR, PNXX25OUT + 22,
                              NULL, PNX_SYS_ERR);
        return (-1);
    } cb_call_ptr->flags = X25FLG_LINK_NAME;
    memcpy(cb_call_ptr->link_name, &snsap_ptr->sn_lsap[1],
           snsap_ptr->sn_lsap[0]);

if ((vccb_ptr->vc_icf.vc_fslui &&
         udf_buf != NULL) ||
        vccb_ptr->vc_ednf ||
        (snsap_ptr->sn_ntw == SN_UKPS &&
         (vccb_ptr->vc_icf.vc_fslui ||
          vccb_ptr->vc_icf.vc_pszic ||
          vccb_ptr->vc_icf.vc_wszic ||
          vccb_ptr->vc_icf.vc_thrui)))
    {
        pnx_XCC__extd_call_accpt(vccb_ptr, udf_buf);
    }                          /* end if */

/* Get API counter and accept the call */
    vccb_ptr->counter = x25_ctr_get();
    if (vccb_ptr->counter == -1)
    {
        pnx_ERR__report_error(JUST_HVX, LOG_ERR, (PNXX25OUT + 27),
                              snsap_ptr->sn_name, PNX_API);
        pnx_x25_errors(vccb_ptr);
        return (-1);
    } add_to_array(vccb_ptr);
    TRACE(X25_OUTGOING, X25_CALL_CONNECTED,
          0, 0, vccb_ptr->vc_gtid, vccb_ptr->conn_id, vccb_ptr->vc_lcn);
    if (x25_call_accept(vccb_ptr->conn_id, vccb_ptr->cb_call,
                        vccb_ptr->counter) < 0)
    {
        TRACE_A();
        pnx_ERR__report_error(JUST_HVX, LOG_ERR, (PNXX25OUT + 5),
                              &vccb_ptr->vc_snsap->sn_name[1],
                              PNX_API);
        pnx_x25_errors(vccb_ptr);
        return (-1);
```

C176

```
    }
    TRACE_A();

vccb_ptr->vc_state = VC_D1;
    vccb_ptr->vc_intx  = VC_I1;
    vccb_ptr->vc_intr  = VC_J1;
    vccb_ptr->vc_flor  = VC_F1;
    vccb_ptr->vc_flox  = VC_G1;
    vccb_ptr->active_vc = 1;
    pnx_OPN__vc_open(vccb_ptr);
#ifdef PNXDEBUG
    syslog(LOG_DEBUG, "exit pnx_SCC");
#endif
    return (0);

}                                        /* end pnx_SCC__send_call_accpt */

/****************************
 * pnx_XCC__extd_call_accpt *
 ****************************/

/* Extended Call Accept
  *
  * This routine is used to build the address section, facilities section, and
  * user data section of cb_call struct.
  *
  * A user data field may be present in the call accepted packet only if the
  * incoming call packet specified the fast select facility with no
  * restriction on the response. */ int
pnx_XCC__extd_call_accpt(struct vccb * vccb_ptr, unsigned char *udf_buf)
{ unsigned char    *udf_ptr;
    struct snsap     *snsap_ptr;
    struct cb_call_struct *cb_call_ptr;
    struct cb_fac_struct *cb_fac_ptr;
    short            fac_field = 0;
#ifdef PNXDEBUG
    syslog(LOG_DEBUG, "pnx_XCC");
#endif
    snsap_ptr = vccb_ptr->vc_snsap;
    cb_call_ptr = vccb_ptr->cb_call;

/* Setup address fields of cb_call struct */ if (vccb_ptr->vc_cdna[0] != 0)
    {
        cb_call_ptr->flags |= X25FLG_CALLED_ADDR;
        cb_call_ptr->called_addr = vccb_ptr->vc_cdsa;
    }                                    /* end if */ if (vccb_ptr->vc_cgna[0] != 0)
    {
        cb_call_ptr->flags |= X25FLG_CALLING_ADDR;
        cb_call_ptr->calling_addr = vccb_ptr->vc_cgsa;
    }                                    /* end if */

/* Build facilities section of cb_call struct.   */ cb_call_ptr->cb_fac = (struct cb_fac_struct *)
        memset(malloc(sizeof(struct cb_fac_struct)),
               0,
               sizeof(struct cb_fac_struct));
    if (cb_call_ptr->cb_fac == NULL)
    {
        pnx_ERR__report_error(JUST_HVX, LOG_ERR, PNXX25OUT + 24,
                              NULL, PNX_SYS_ERR);
        return (-1);
    }
```

C177

```
    cb_fac_ptr = cb_call_ptr->cb_fac;
    cb_fac_ptr->flags = 0;
    cb_call_ptr->flags |= X25FLG_CB_FAC;

if (vccb_ptr->vc_icf.vc_thrui)
    {
        fac_field = 1;
        cb_fac_ptr->flags |= X25FLG_TCLS;       /* throughput class */
        cb_fac_ptr->tcls_cld = vccb_ptr->vc_thrr;
        cb_fac_ptr->tcls_clg = vccb_ptr->vc_thrx;
    }                                           /* end if */ if (vccb_ptr->vc_icf.vc_pszic)
    {
        fac_field = 1;
        cb_fac_ptr->flags |= X25FLG_PSIZ;       /* packet size */
        cb_fac_ptr->psiz_cld = 1 << vccb_ptr->vc_pszr;
        cb_fac_ptr->psiz_clg = 1 << vccb_ptr->vc_pszx;
    }                                           /* end if */ if (vccb_ptr->vc_icf.vc_wszic)
    {
        fac_field = 1;
        cb_fac_ptr->flags |= X25FLG_WSIZ;       /* window size */
        cb_fac_ptr->wsiz_cld = vccb_ptr->vc_wndx;
        cb_fac_ptr->wsiz_clg = vccb_ptr->vc_wndr;
    }                                           /* end if */ if (vccb_ptr->vc_ednf)          /* expedited data negotiation */
    {
        fac_field = 1;
        cb_fac_ptr->flags |= X25FLG_EXP_DATA;
    }                                           /* end if */ if (fac_field == 1)
    {
        cb_call_ptr->flags |= X25FLG_CB_FAC;
    }
    else
    {
        pnx_free_cb_fac(cb_fac_ptr);
    }

/* Setup user data section of call accepted packet. */ if (udf_buf != NULL)
    {
        cb_call_ptr->user_data_len = *udf_buf++;
        cb_call_ptr->user_data = udf_buf;
        cb_call_ptr->flags |= X25FLG_USER_DATA;
    }                                           /* end if */
#ifdef PNXDEBUG
    syslog(LOG_DEBUG, "exit pnx_XCC");
#endif
    return (0);
}                                   /* end pnx_XCC__extd_call_accpt */

/****************************
 * pnx_SRS__send_reset_req  *
 ****************************/

/* This routine is used to send a reset request packet. */ int
pnx_SRS__send_reset_req(struct vccb * vccb_ptr, int cause, int diag)
{
    struct snsap     *snsap_ptr;
    struct cb_res_struct *cb_res;
#ifdef PNXDEBUG
    syslog(LOG_DEBUG, "pnx_SRS");
#endif
    cb_res = &vccb_ptr->cb_res;

snsap_ptr = vccb_ptr->vc_snsap;
```

C178

```
    if ((snsap_ptr->sn_dce == 0) &&
        (snsap_ptr->sn_ntw != SN_HDSA))
    {
        cause = 0;
    }                                   /* end if */
    /* initial setting of flags initializes structure for call to X.25 API */
    cb_res->cause = cause;
    cb_res->diagnostic = diag;
    cb_res->flags = X25FLG_CAUSE | X25FLG_DIAGNOSTIC;

TRACE(X25_OUTGOING, X25_RESET_INDICATION,
        cause, diag, vccb_ptr->vc_gtid, vccb_ptr->conn_id, vccb_ptr->vc_lcn);
    if (x25_reset(vccb_ptr->conn_id, cb_res) != 0)
    {
        TRACE_A();
        pnx_ERR__report_error(JUST_HVX, LOG_ERR, (PNXX25OUT + 6),
                            snsap_ptr->sn_name, PNX_API);
        pnx_x25_errors(vccb_ptr);
        return (-1);
    }
    else
    {
        TRACE_A();
        vccb_ptr->vc_state = VC_D2;
        vccb_ptr->vc_ers += 1;      /* reset packets sent      */
#ifdef PNXDEBUG
        syslog(LOG_DEBUG, "exit pnx_SRS");
#endif
        return (0);
    }
}                                   /* pnx_SRS__send_reset_req */

/***************************
* pnx_SRC__send_reset_conf *
***************************/

/* This function sends a reset confirm packet over the specified connection */ int
pnx_SRC__send_reset_conf(struct vccb * vccb_ptr)
{
#ifdef PNXDEBUG
    syslog(LOG_DEBUG, "pnx_SRC");
#endif
    TRACE(X25_OUTGOING, X25_RESET_CONFIRM,
            0, 0, vccb_ptr->vc_gtid, vccb_ptr->conn_id, vccb_ptr->vc_lcn);
    if (x25_reset_confirm(vccb_ptr->conn_id) != 0)
    {
        TRACE_A();
        pnx_ERR__report_error(JUST_HVX, LOG_ERR, (PNXX25OUT + 7),
                            vccb_ptr->vc_snsap->sn_name, PNX_API);
        pnx_x25_errors(vccb_ptr);
        return (-1);
    }
    else
    {
        TRACE_A();
        vccb_ptr->vc_state = VC_D1;
        vccb_ptr->vc_intx = VC_I1;
        vccb_ptr->vc_intr = VC_J1;
        vccb_ptr->vc_flor = VC_F1;
        vccb_ptr->vc_flox = VC_G1;
#ifdef PNXDEBUG
        syslog(LOG_DEBUG, "exit pnx_SRC");
#endif
        return (0);
    }                               /* end if */
}                                   /* pnx_SRC__send_reset_conf */

/***************************
* pnx_SED__send_interrupt *
***************************/
```

C179

```c
/* This function requests that an interrupt (expedited data) be sent.  It
 * uses the packet header block provided by PNetX. */
int
pnx_SED__send_interrupt(struct vccb * vccb_ptr, struct GATER * gater)
{
    struct PHD      *phb_ptr;
    struct snsap    *snsap_ptr;
    struct cb_int_struct *cb_int;
#ifdef PNXDEBUG
    syslog(LOG_DEBUG, "pnx_SED");
#endif
    snsap_ptr = vccb_ptr->vc_snsap;

RISC_ADDR(phb_ptr, (struct PHD *), gater->gt_dta);

/* Validate data transfer and interrupt states. */ if (vccb_ptr->vc_state != VC_D1 ||
        (vccb_ptr->vc_state == VC_D1 &&
         vccb_ptr->vc_intx != VC_I1))
    {
        pnx_VCE__vc_error(vccb_ptr, VCE_XIS);
        return (-1);
    }                               /* end if */

/* Validate expedited data send credit. */ if (vccb_ptr->vc_xsndc == 0)
    {
        pnx_VCE__vc_error(vccb_ptr, VCE_XSC);
        return (-1);
    }                               /* end if */

/* Validate expedited data sdu size. */ if ((snsap_ptr->sn_ver == SN_V80 &&
         phb_ptr->ph_rg1 & ph_ct1 > 1) ||
        (snsap_ptr->sn_ver == SN_V84 &&
         phb_ptr->ph_rg1 & ph_ct1 > 32))
    {
        pnx_VCE__vc_error(vccb_ptr, VCE_XDS);
        pnx_IOK__issue_ok_to_send(vccb_ptr, 1);
        return (-1);
    }                               /* end if */

/* set up for X.25 call
     *
     * initial setting of flags initializes structure for call to X.25 API */ cb_int = &vccb_ptr->cb_int;
    cb_int->flags = X25FLG_INT_DATA;
    RISC_ADDR(cb_int->int_data, (char *), phb_ptr->ph_ad1);
    /* adjust char pointer for left or right byte */
    if (phb_ptr->ph_rg1 & ph_lr1)
    {
        cb_int->int_data++;
    }
    cb_int->int_data_len = (phb_ptr->ph_rg1 & ph_ct1);

vccb_ptr->vc_usndc--;

TRACE(X25_OUTGOING, X25_INTERRUPT,
          0, 0, vccb_ptr->vc_gtid, vccb_ptr->conn_id, vccb_ptr->vc_lcn);
    if (x25_interrupt(vccb_ptr->conn_id, cb_int) != 0)
    {
        TRACE_A();
        pnx_ERR__report_error(JUST_HVX, LOG_ERR, (PNXX25OUT + 8),
                              snsap_ptr->sn_name, PNX_API);
        pnx_x25_errors(vccb_ptr);
        return (-1);
    }
    else
    {
        TRACE_A();
        vccb_ptr->vc_intx = VC_I2;
```

C180

```
          vccb_ptr->vc_xsndc -= 1;
          vccb_ptr->vc_eed += 1;
#ifdef PNXDEBUG
          syslog(LOG_DEBUG, "exit pnx_SED");
#endif
          return (0);
      }                                 /* end if */
  }                                     /* pnx_SED__send_interrupt */

/*************************
 * pnx_SDR__send_clear_req *
 *************************/

/* This routine is used to send a clear request packet.  Within this
   * function, a process is forked to do the x25_call_clear(), which is a
   * blocking function.  */ int
pnx_SDR__send_clear_req(struct vccb * vccb_ptr, int cause, int diag, unsigned char *udf_buf)

{
      struct cb_clear_struct *cb_clear;
      struct cb_fac_struct cb_fac;
      int               conn_id;
      struct PHD        *phb_ptr;
      struct snsap      *snsap_ptr;
      int               clear_pid;
      int               fd;
      /* Following signal variables are for the child process to handle SIGALRM
       * generated in the child process */
      sigset_t          clear_sigs;
      struct sigaction  clear_actions;

#ifdef PNXDEBUG
      syslog(LOG_DEBUG, "pnx_SDR");
#endif
      snsap_ptr = vccb_ptr->vc_snsap;

/* initialize cb_clear
       *
       * initial setting of flags initializes structure for call to X.25 API */
      cb_clear = (struct cb_clear_struct *)
          memset(malloc(sizeof(struct cb_clear_struct)),
                 0, sizeof(struct cb_clear_struct));
      if (cb_clear == NULL)
      {
          pnx_ERR__report_error(JUST_HVX, LOG_ERR, PNXX25OUT + 23,
                                NULL, PNX_SYS_ERR);
          return (-1);
      } vccb_ptr->cb_clear = cb_clear;

cb_clear->flags = X25FLG_CAUSE | X25FLG_DIAGNOSTIC;
      cb_clear->cause = cause;
      cb_clear->diagnostic = diag;
      conn_id = vccb_ptr->conn_id;

if ((udf_buf != NULL) && (udf_buf != base))
      {
          pnx_XDR__extd_clear_req(vccb_ptr, udf_buf, cb_clear);
      }                                 /* end if */

/* now that all is set up, fork to do the clear */
      if ((clear_pid = fork()) < 0)
      {
          /* error on the fork */
          pnx_ERR__report_error(JUST_HVX, LOG_ERR, (PNXX25OUT + 9),
                                NULL, PNX_SYS_ERR);
          return (-1);
      }
      else
      if (clear_pid > 0)
      {
```

C181

```
        /* normal return to PNetX parent process */ fd = x25_get_file_descriptor(conn_id);
        if (fd < 0)
        {
            pnx_ERR__report_error(JUST_HVX, LOG_ERR, (PNXX25OUT + 28),
                                snsap_ptr->sn_name, PNX_API);
        }
        else
        {
            close(fd);
        }
        vccb_ptr->clear_pid = clear_pid;
        vccb_ptr->vc_state = VC_P6;
#ifdef PNXDEBUG
        syslog(LOG_DEBUG, "exit pnx_SDR");
#endif
        return (0);
    }
    else
/****************************************************************/
/*                                                              */
/*       THIS IS THE ENTIRE VC_CLEAR PROCESS                    */
/*                                                              */
    {
        /* start of the vc_clear process */

/* Set SIGALRM to Default */
        sigemptyset(&clear_sigs);
        sigaddset(&clear_sigs, SIGALRM);
        clear_actions.sa_handler = pnx_clear_handler;
        clear_actions.sa_mask = clear_sigs;
        clear_actions.sa_flags = 0;
        sigprocmask(SIG_UNBLOCK, &clear_sigs, NULL);

sigaction(SIGALRM, &clear_actions, NULL);

/* NOTE - no clear confirm information required */ alarm(5);                  /* Generate an alarm to kill this child
                                    * process, in case we hang in clear
                                    * process */
        TRACE(X25_OUTGOING | COMPLETED, X25_CLEAR_INDICATION,
        cause, diag, vccb_ptr->vc_gtid, vccb_ptr->conn_id, vccb_ptr->vc_lcn);
        if ((x25_call_clear(conn_id, cb_clear, NULL)) != 0)
        {
            pnx_ERR__report_error(JUST_HVX, LOG_ERR, (PNXX25OUT + 10),
                                snsap_ptr->sn_name, PNX_API);
            exit(1);
        }
        else
        {
            TRACE(X25_INCOMING | COMPLETED, X25_CLEAR_CONFIRM,
                cause, diag, vccb_ptr->vc_gtid, vccb_ptr->conn_id, vccb_ptr->vc_lcn);
            exit(0);
        }                          /* end if */
    }
/*                                                              */
/*       END OF VC_CLEAR PROCESS                                */
/*                                                              */
/****************************************************************/

}                                  /* send_clear_req */

/*********************
 * pnx_clear_handler *
 *********************/

/* An alarm (5 Sec) is generated within pnx_SDR child process before we
   call x25_call_clear. If the child process hangs on this API call,
   it will exit through handler */
void
pnx_clear_handler(int i)
{
    syslog(LOG_ERR, "E479: PNX_CLEAR_HANDLER: X25_call_clear killed by SIGALRM");
```

C182

```
    exit(0);
}

/***************************
 * pnx_XDR__extd_clear_req *
 ***************************/

/* Extended Clear Request
  *
  * This routine is used to build the address section, facilities section, and
  * user data section of a clear request packet.
  *
  * A user data field may be present in the clear request packet only if the
  * incoming call packet specified the fast select facility with no
  * restriction on the response. */ int
pnx_XDR__extd_clear_req(struct vccb * vccb_ptr,
                        unsigned char *udf_buf,
                        struct cb_clear_struct * cb_clear)
{
#ifdef PNXDEBUG
    syslog(LOG_DEBUG, "pnx_XDR");
#endif
    if (vccb_ptr->vc_cdsa)
    {
        cb_clear->flags |= X25FLG_CALLED_ADDR;
        cb_clear->called_addr = vccb_ptr->vc_cdsa;
    }
    if (vccb_ptr->vc_cgsa)
    {
        cb_clear->flags |= X25FLG_CALLING_ADDR;
        cb_clear->calling_addr = vccb_ptr->vc_cgsa;
    }
    /* build facilities section
     *
     * The following international facilities may be present in the clear
     * request packet:
     *
     * - called line address modified notification
     *
     * The following CCITT specified facilities may be present in the clear
     * request packet:
     *
     * - called address extension
     *
     * (HVS X25 sets no facilities, so we don't either) */

/* user data field
     *
     * first chartacter in user data field passed to us is its size */
    if ((udf_buf != NULL) && (udf_buf != base))
    {
        cb_clear->flags |= X25FLG_USER_DATA;
        cb_clear->user_data_len = *udf_buf++;
        cb_clear->user_data = udf_buf;
    }
ifdef PNXDEBUG
    syslog(LOG_DEBUG, "exit pnx_XDR");
#endif
    return (0);
}                                       /* end pnx_XDR__extd_clear_req */

/**************************
 * pnx_SEC__send_int_conf *
 **************************/

/* Send Interrupt Confirm Packet
  *
  * This routine is not needed.  The X.25 API automatically confirms all
  * interrupts received */

/**********************
 * pnx_SDT__send_data *
```

C183

```c
********************/
/* This function sends data over an X.25 connection.
 *
 * If the Packet Header Block passed to PNetX by PNet contains data in both
 * ph_ad1 and ph_ad2, a new buffer is acquired and both ph_ad1 & ph_ad2
 * copied into it.  If only ph_ad1 is used, no buffer is copied. */
int
pnx_SDT__send_data(struct vccb * vccb_ptr, struct PHD * phb_ptr)
{
    struct snsap    *snsap_ptr;
    unsigned char   *data;
    unsigned int    data_size = 0;
    struct cb_data_struct *cb_data;
    int             status;
#ifdef PNXDEBUG
    syslog(LOG_DEBUG, "pnx_SDT");
#endif
    snsap_ptr = vccb_ptr->vc_snsap;

data_size = phb_ptr->ph_rg1 & ph_ct1;

/* any data in ph_ad2? */
    if (phb_ptr->ph_rg2 & ph_ct2)
    {
        data = combine_udata(phb_ptr);
        data_size += phb_ptr->ph_rg2 & ph_ct2;
    }
    else
    {
        RISC_ADDR(data, (unsigned char *), phb_ptr->ph_ad1);
        if (phb_ptr->ph_rg1 & ph_lr1)
        {
            data++;
        }
    } cb_data = &vccb_ptr->cb_data;
    cb_data->flags = X25FLG_DATA;
    if (phb_ptr->ph_xst & ph_xq1)
    {
        cb_data->flags |= X25FLG_Q_BIT;
    }
    cb_data->data_len = data_size;
    cb_data->data = data;

vccb_ptr->vc_usndc--;

TRACE(X25_OUTGOING, X25_DATA,
        0, 0, vccb_ptr->vc_gtid, vccb_ptr->conn_id, vccb_ptr->vc_lcn);
    status = x25_send(vccb_ptr->conn_id, cb_data);
    if (status < 0)
    {
        TRACE_A();
        pnx_ERR__report_error(BOTH, LOG_ERR, (PNXX25OUT + 25),
                        snsap_ptr->sn_name, PNX_API);
        pnx_x25_errors(vccb_ptr);
    }
    TRACE_A();

/* if we had to get a new data buffer for send, free it */
    if (phb_ptr->ph_rg2 & ph_ct2)
    {
        free(data);
    }
ifdef PNXDEBUG
    syslog(LOG_DEBUG, "exit pnx_SDT");
#endif
    return (status);
}                                   /* end - pnx_SDT__send_data */

/****************************
 * pnx_SDC__send_clear_conf *
```

C184

```
***************************/

/* Send Clear Confirm Packet
 *
 * In the HVS X.25 implementation, this function is used to build and send a
 * clear confirm packet.  We don't need to do that, since the X.25 API
 * automatically confirms any received clear packet.  All we do here is
 * perform some cleanup and set the VC state to P1. */ int
pnx_SDC__send_clear_conf(struct vccb * vccb_ptr)
{
    TRACE(X25_OUTGOING | COMPLETED, X25_CLEAR_CONFIRM,
        0, 0, vccb_ptr->vc_gtid, vccb_ptr->conn_id, vccb_ptr->vc_lcn);
    pnx_CVC__close_vc(vccb_ptr);
    vccb_ptr->vc_state = VC_P1;
    return (0);
}                               /* end - pnx_SDC__send_clear_conf */
```

C185

```
/*
 * Name:        pnx_xwkup.c
 * Purpose:     process incoming X.25 event
 * Functions in this module:
 *     (see pnx_func.h for prototype declarations)
     int          pnx_x25_wakeup()
     int          pnx_x25_fsm()
     int          pnx_PP1__process_p1()
     int          pnx_PP2__process_p2()
     int          pnx_PP3__process_p3()
     int          pnx_PP5__process_p5()
     int          pnx_XP5__process_p5()
     int          pnx_PP6__process_p6()
     int          pnx_PD1__process_d1()
     int          pnx_PD2__process_d2()
     int          pnx_PD3__process_d3()

*/ include "sys_head.h"
include "emu_head.h"
#include "mqi_head.h"
#include "z3rct.h"
#include "z_rb.h"
#include "z3irb.h"

include <x25sdefs.h>
include "pnx_head.h"
include "pnx_vccb.h"
#include "pnx_snsap.h"
#include "hvx_lme.h"
#include "hvx_gater.h"
#include "pnx_trace.h"
#include "x25nse.h"
#include "x25sta.h"
#include "x25vce.h"
#include "x25vcp.h"
#include "x25cse.h"
#include "x25dia.h"

extern char     *base;

extern struct pnx_global *PnetXGlobal;

/*****************
 * pnx_x25_wakeup *
 *****************/

/* This function locates the VCCB for an incoming X.25 event and processes
 * the event. */ int
pnx_x25_wakeup(int CounterID)

{
    int             status;
    struct vccb     *VCCB;
#ifdef PNXDEBUG
    syslog(LOG_DEBUG, "pnx_x25_wakeup");
#endif
    if ((VCCB = pnx_GVC__get_vccb_by_ctr(CounterID)) == NULL)
    {
        pnx_ERR__report_error(BOTH, LOG_ERR, (PNXXWKUP + 1),
                          NULL, PNX_NO_VCCB);
        return (-1);
    }
    else
    {
        return (pnx_x25_fsm(VCCB));
    }

}                               /* end pnx_x25_wakeup */
```

C186

```c
/**************
 * pnx_x25_fsm *
 **************/

/* This function receives an incoming X.25 event and performs X.25 state
 * processing for those states that PNetX is able to mimic.  Connect,
 * disconnect, and reset states are handled. */
int
pnx_x25_fsm(struct vccb * vccb_ptr)

{
    int             status;
    struct cb_msg_struct *cb_msg;
    struct snsap    *snsap_ptr;
    struct vccb     *new_vc;
    struct cb_circuit_info_struct *cb_circuit;

#ifdef PNXDEBUG
    syslog(LOG_DEBUG, "pnx_x25_fsm");
#endif

/* If awakened on a listening VCCB, we need a new VCCB to receive the
     * incoming call.  The listen ID from the VCCB on which we were awakened
     * must be moved to the newly created VCCB.  From this point on, use the
     * new VCCB. */
    if (vccb_ptr->listen)
    {
        if (pnx_MVC__make_vccb(&new_vc, NULL) != 0)
        {
            return (-1);
        }
        new_vc->conn_id = vccb_ptr->conn_id;
        vccb_ptr = new_vc;
    }

/**************************/
    /* receive the packet     */ cb_msg = &vccb_ptr->cb_msg;
    status = x25_receive(&(vccb_ptr->conn_id), cb_msg);
    if (status != 0)
    {
        pnx_ERR__report_error(JUST_HVX, LOG_ERR, (PNXXWKUP + 3),
                        NULL, PNX_API);
        pnx_x25_errors(vccb_ptr);
        return (-1);
    } if (((cb_msg->msg_type) == X25_INCOMING_CALL) || ((cb_msg->msg_type) == X25_CALL_CONNECTED)
)
    {
        cb_circuit = x25_circuit_query(vccb_ptr->conn_id);
        if (cb_circuit == NULL)
        {
            pnx_ERR__report_error(JUST_HVX, LOG_ERR, (PNXXWKUP + 26),
                            snsap_ptr->sn_name, PNX_API);
            pnx_x25_errors(vccb_ptr);
        }
        else
        {
            vccb_ptr->vc_lcn = cb_circuit->lcn;
#ifdef PNXDEBUG
            syslog(LOG_INFO, "I346: PNetX: X25 lcn is %d\n", vccb_ptr->vc_lcn);
#endif
        }
    } ifdef PNXDEBUG
    syslog(LOG_DEBUG, "pnx: PktType = %d", cb_msg->msg_type);
    syslog(LOG_DEBUG, "pnx: VC gtid: %lX state: %d",
        vccb_ptr->vc_gtid, vccb_ptr->vc_state);
endif if (cb_msg->msg_type == X25_CLEAR_INDICATION)
    {
        TRACE(X25_INCOMING | COMPLETED, cb_msg->msg_type,
```

C187

```
                cb_msg->msg_point.cb_clear->cause, cb_msg->msg_point.cb_clear->diagnostic,
                vccb_ptr->vc_gtid, vccb_ptr->conn_id, vccb_ptr->vc_lcn);
    }
    else
    if (cb_msg->msg_type == X25_RESET_INDICATION)
    {
        TRACE(X25_INCOMING | COMPLETED, cb_msg->msg_type,
                cb_msg->msg_point.cb_res->cause, cb_msg->msg_point.cb_res->diagnostic,
                vccb_ptr->vc_gtid, vccb_ptr->conn_id, vccb_ptr->vc_lcn);
    }
    else
    {
        TRACE(X25_INCOMING | COMPLETED, cb_msg->msg_type,
                0, 0, vccb_ptr->vc_gtid, vccb_ptr->conn_id, vccb_ptr->vc_lcn);
    }

/* end of x25 API receive */
    /**************************/

/* If we just received an incoming call, we must find the local SNSAP
     * before going any further! */
    if (cb_msg->msg_type == X25_INCOMING_CALL)
    {
        snsap_ptr = PnetXGlobal->snsap_tbl;
        while (snsap_ptr)
        {
            if ((!snsap_ptr->sn_rem)     /* ignore RSNSAPs */
                &&
                (strcmp(&snsap_ptr->sn_lsap[1],
                        cb_msg->msg_point.cb_call->link_name) == 0))
            {
                /* We've got a match!  copy SNSAP values to the new VCCB */
#ifdef PNXDEBUG
                syslog(LOG_DEBUG, "PNetX: call received on %s-%s",
                        &snsap_ptr->sn_name[1], &snsap_ptr->sn_lsap[1]);
#endif
                vccb_ptr->vc_snsap = snsap_ptr;
                vccb_ptr->vc_wndx = snsap_ptr->sn_wndx;
                vccb_ptr->vc_wndr = snsap_ptr->sn_wndr;
                vccb_ptr->vc_pszx = snsap_ptr->sn_pszx;
                vccb_ptr->vc_pszr = snsap_ptr->sn_pszr;
                vccb_ptr->vc_thrx = snsap_ptr->sn_thrx;
                vccb_ptr->vc_thrr = snsap_ptr->sn_thrr;
                vccb_ptr->vc_pdux = 1 << vccb_ptr->vc_pszx;
                vccb_ptr->vc_pdur = 1 << vccb_ptr->vc_pszr;
                if (snsap_ptr->sn_ntw == SN_HDSA)
                {
                    memcpy(vccb_ptr->vc_type,
                            (unsigned char *) "SX25",
                            4);
                }
                else
                {
                    memcpy(vccb_ptr->vc_type,
                            (unsigned char *) "SW  ",
                            4);
                }                   /* endif */ snsap_ptr->sn_numvc++;
                snsap_ptr->sn_dsac == gtused;
                break;
            }
            snsap_ptr = snsap_ptr->sn_nxt;
        }
    } if ((snsap_ptr = vccb_ptr->vc_snsap) == NULL)
    {
        pnx_ERR__report_error(BOTH, LOG_ERR, (PNXXWKUP + 2),
                        NULL, PNX_NO_SAP);
        remove_from_array(vccb_ptr);
        return (-1);
    } switch (vccb_ptr->vc_state)
    {
    case VC_P1:
```

C188

```
            pnx_PP1__process_p1(vccb_ptr);
            break;

case VC_P2:
            pnx_PP2__process_p2(vccb_ptr);
            break;

case VC_P3:
            pnx_PP3__process_p3(vccb_ptr);
            break;

case VC_P5:
            if (!(snsap_ptr->sn_dce))
            {                               /* DTE case */
                pnx_PP5__process_p5(vccb_ptr);
            }
            else
            {                               /* DCE case */
                pnx_XP5__process_p5(vccb_ptr);
            }                               /* end if (DTE or DCE) */
            break;

case VC_D1:
            pnx_PD1__process_d1(vccb_ptr);
            break;

case VC_D2:
            pnx_PD2__process_d2(vccb_ptr);
            break;

case VC_D3:
            pnx_PD3__process_d3(vccb_ptr);
            break;

case VC_P6:
            pnx_PP6__process_p6(vccb_ptr);
            break;

default:
            pnx_NSN__ns_error2(NULL, st25_UUF);
            break;

}                               /* end switch (vccb_ptr->vc_state) */ pnx_rtrn_x25_mem(vccb_ptr);
ifdef PNXDEBUG
    syslog(LOG_DEBUG, "exit pnx_x25_fsm");
endif return (0);
}                                       /* end (pnx_x25_fsm) */

/***********************
 * pnx_PP1__process_p1 *
 ***********************/

/* This routine processes packets received while in the P1 ready state. The
 * P1 ready state is the state in which a given logical channel is currently
 * inactive and ready for the establishment of a call. */
int
pnx_PP1__process_p1(struct vccb * vccb_ptr)

{
    int                 PacketType;
#ifdef PNXDEBUG
    syslog(LOG_DEBUG, "pnx_PP1");
#endif
    PacketType = vccb_ptr->cb_msg.msg_type;

switch (PacketType)
    {
    case (X25_DATA):
    case (X25_CALL_CONNECTED):
    case (X25_INTERRUPT):
```

C189

```
    case (X25_INTERRUPT_CONFIRM):
    case (X25_CLEAR_CONFIRM):
    case (X25_RESET_INDICATION):
    case (X25_RESET_CONFIRM):
        /* NOTE: these cases should ALL be handled by the X.25 board */
        pnx_SDR__send_clear_req(vccb_ptr, 0, d_pti_p1, NULL);
        break;
    case (X25_INCOMING_CALL):
        vccb_ptr->vc_state = VC_P3;
        if (pnx_PCR__process_cr(vccb_ptr) != 0)
        {
            pnx_OPF__vc_open_fail(vccb_ptr, vccb_ptr->vc_ursn);
            pnx_SDR__send_clear_req(vccb_ptr, 0, vccb_ptr->vc_diag, NULL);
            return (-1);
        }
        else
        {
            pnx_ICI__issue_con_ind(vccb_ptr);
        }                        /* endif (pnx_PCR OK) */
        break;

case (X25_CLEAR_INDICATION):
        /* Clear Confirm is automatically sent by board upon receipt of Clear
         * Indication. */
        vccb_ptr->vc_state = VC_P7;
        pnx_RVC__release_vccb(vccb_ptr);
        break;

default:
        /* OUGHT to be handled by X.25 board */
        pnx_ERR__report_error(JUST_HVX, LOG_WARNING, (PNXXWKUP + 5),
                              NULL, PNX_API_UNEX);
        pnx_SDR__send_clear_req(vccb_ptr, 0, d_pna_up, NULL);
        break;
    }                            /* end switch (PacketType) */
#ifdef PNXDEBUG
    syslog(LOG_DEBUG, "exit pnx_PP1");
#endif
    return (0);
}                                /* end (pnx_PP1__process_p1) */

/*********************
 * pnx_PP2__process_p2 *
 *********************/

/* This routine processes packets received while in the P2 DTE call request
 * state. The P2 DTE call request state is the state in which the DTE has
 * sent a call request packet and is waiting for either a call connect or
 * clear request packet. */
int
pnx_PP2__process_p2(struct vccb * vccb_ptr)

{
    int             PacketType;
    struct snsap    *snsap_ptr;
#ifdef PNXDEBUG
    syslog(LOG_DEBUG, "pnx_PP2");
#endif
    snsap_ptr = vccb_ptr->vc_snsap;
    PacketType = vccb_ptr->cb_msg.msg_type;

switch (PacketType)
    {
    case (X25_DATA):
    case (X25_INTERRUPT):
    case (X25_INTERRUPT_CONFIRM):
    case (X25_CLEAR_CONFIRM):
    case (X25_RESET_INDICATION):
    case (X25_RESET_CONFIRM):
        /* X.25 Board SHOULD handle these cases */
        pnx_OPF__vc_open_fail(vccb_ptr, VCF_P2I);
        pnx_SDR__send_clear_req(vccb_ptr, 0, d_pti_p2, NULL);
        pnx_IDI__issue_dis_ind(vccb_ptr, NULL, gtdptl);
```

C190

```
        break;
    case (X25_CALL_CONNECTED):
        if (pnx_PCC__process_cc(vccb_ptr) != 0)
        {
            pnx_OPF__vc_open_fail(vccb_ptr, vccb_ptr->vc_ursn);
            pnx_SDR__send_clear_req(vccb_ptr, 0, vccb_ptr->vc_diag, NULL);
            pnx_IDI__issue_dis_ind(vccb_ptr, NULL, vccb_ptr->vc_drsn);
            return (-1);
        }
        else
        {
            pnx_OPN__vc_open(vccb_ptr);
            pnx_ICC__issue_con_conf(vccb_ptr);
            vccb_ptr->vc_dsac = gtused;
        }                           /* endif */
        break;

case (X25_INCOMING_CALL):
        /* The board should be handling this case! */
        pnx_ERR__report_error(JUST_HVX, LOG_WARNING, (PNXXWKUP + 6),
                        NULL, PNX_API_UNEX);
        vccb_ptr->vc_state = VC_P5;
        if (snsap_ptr->sn_dce)
        {
            /* DCE Case */
            pnx_IDI__issue_dis_ind(vccb_ptr, NULL, gtddup);
            if (pnx_PCR__process_cr(vccb_ptr) != 0)
            {
                pnx_OPF__vc_open_fail(vccb_ptr, vccb_ptr->vc_ursn);
                pnx_SDR__send_clear_req(vccb_ptr, 0, vccb_ptr->vc_diag, NULL);
                return (-1);
            }
            else
            {
                pnx_ICI__issue_con_ind(vccb_ptr);
            }                       /* endif */
        }                           /* endif (DCE) */
        break;

case (X25_CLEAR_INDICATION):
        /* No need to confirm, the board sends Clear Confirm upon receipt of
         * clear indication */
        /* NOTE - for some reason, HVS X.25 doesn't call CVC here.  We need
         * to in order to get rid of the x25 counter */
        /* Eliminate error report here - this is a case we must be able to
         * handle */
        /* pnx_ERR__report_error(JUST_HVX, LOG_WARNING, (PNXXWKUP + 25),
         * NULL, PNX_API_UNEX); */
        pnx_PDR__process_clear_ind(vccb_ptr);
        if (vccb_ptr->vc_snsap->sn_x25ok)
        {
            pnx_OPF__vc_open_fail(vccb_ptr, VCF_REF);
            pnx_SDC__send_clear_conf(vccb_ptr);
            pnx_RVC__release_vccb(vccb_ptr);
        }
        break;

default:
        /* SHOULD be handled by board */
        pnx_ERR__report_error(JUST_HVX, LOG_WARNING, (PNXXWKUP + 7),
                        NULL, PNX_API_UNEX);
        pnx_OPF__vc_open_fail(vccb_ptr, VCF_UPK);
        pnx_SDR__send_clear_req(vccb_ptr, 0, d_pna_up, NULL);
        pnx_IDI__issue_dis_ind(vccb_ptr, 0, gtdptl);
        break;
    }                               /* end switch (PacketType) */
#ifdef PNXDEBUG
    syslog(LOG_DEBUG, "exit pnx_PP2");
#endif
    return (0);
}                                   /* end pnx_PP2__process_p2 */

/***********************
 * pnx_PP3__process_p3 *
```

C191

```
**********************/
    /* This routine processes packets received while in the P3 DTE incoming call
     * (DCE waiting) state. The P3 DTE incoming call state is the state in which
     * an incoming call packet has been received but a call accepted or clear
     * request packet has not as yet been sent.
     *
     * A disconnect indication gater will not be sent in this state. The disconnect
     * indication will be deferred until receipt of either the connect response
     * or a disconnect request from the connection layer. This procedure will
     * avoid a collision of the disconnect indication and the connect response
     * or disconnect request in the gate manager. */
int
pnx_PP3__process_p3(struct vccb * vccb_ptr)
{
    int             PacketType;
    struct snsap    *snsap_ptr;

snsap_ptr = vccb_ptr->vc_snsap;
    PacketType = vccb_ptr->cb_msg.msg_type;
#ifdef PNXDEBUG
    syslog(LOG_DEBUG, "pnx_PP3");
#endif
    switch (PacketType)
    {
    case (X25_DATA):
    case (X25_INCOMING_CALL):
    case (X25_CALL_CONNECTED):
    case (X25_INTERRUPT):
    case (X25_INTERRUPT_CONFIRM):
    case (X25_CLEAR_CONFIRM):
    case (X25_RESET_INDICATION):
    case (X25_RESET_CONFIRM):
        /* Board should handle these events */
        pnx_ERR__report_error(JUST_HVX, LOG_WARNING, (PNXXWKUP + 8),
                        NULL, PNX_API_UNEX);
        pnx_OPF__vc_open_fail(vccb_ptr, VCF_P3I);
        pnx_SDR__send_clear_req(vccb_ptr, 0, d_pti_p3, NULL);
        break;

case (X25_CLEAR_INDICATION):
        /* Clear Confirm has already been sent by board */
        pnx_PDR__process_clear_ind(vccb_ptr);
        break;

default:
        /* Board should handle this case */
        pnx_ERR__report_error(JUST_HVX, LOG_WARNING, (PNXXWKUP + 9),
                        NULL, PNX_API_UNEX);
        pnx_OPF__vc_open_fail(vccb_ptr, VCF_UPK);
        pnx_SDR__send_clear_req(vccb_ptr, 0, d_pna_up, NULL);
        break;

}                                   /* end switch (packet type) */
#ifdef PNXDEBUG
    syslog(LOG_DEBUG, "exit pnx_PP3");
#endif
    return (0);

}                                       /* end pnx_PP3__process_p3 */

/**********************
 * pnx_PP5__process_p5 *
 **********************/

/* This routine processes packets received while in the P5 DTE call
     * collision state. The P5 call collision state is the state in which the
     * DTE receives an incoming call packet after sending a call request packet.
     * The DTE will ignore the incoming call and wait for the DCE (or DTE acting
     * as a DCE) to resolve the collision. */ int
pnx_PP5__process_p5(struct vccb * vccb_ptr)
{
```

C192

```
    int             PacketType;
    struct snsap    *snsap_ptr;
#ifdef PNXDEBUG
    syslog(LOG_DEBUG, "pnx_PP5");
#endif
    snsap_ptr = vccb_ptr->vc_snsap;
    PacketType = vccb_ptr->cb_msg.msg_type;

switch (PacketType)
    {
    case (X25_DATA):
    case (X25_INCOMING_CALL):
    case (X25_INTERRUPT):
    case (X25_INTERRUPT_CONFIRM):
    case (X25_CLEAR_CONFIRM):
    case (X25_RESET_INDICATION):
    case (X25_RESET_CONFIRM):
        /* SHOULD be handled by board */
        pnx_ERR__report_error(JUST_HVX, LOG_WARNING, (PNXXWKUP + 10),
                        NULL, PNX_API_UNEX);
        pnx_OPF__vc_open_fail(vccb_ptr, VCF_P5I);
        pnx_SDR__send_clear_req(vccb_ptr, 0, d_pti_p5, NULL);
        pnx_IDI__issue_dis_ind(vccb_ptr, 0, gtdptl);
        break;

case (X25_CALL_CONNECTED):
        if (pnx_PCC__process_cc(vccb_ptr) != 0)
        {
            pnx_OPF__vc_open_fail(vccb_ptr, vccb_ptr->vc_ursn);
            pnx_SDR__send_clear_req(vccb_ptr, 0, vccb_ptr->vc_diag, NULL);
            pnx_IDI__issue_dis_ind(vccb_ptr, 0, vccb_ptr->vc_drsn);
            return (-1);
        }
        else
        {
            pnx_OPN__vc_open(vccb_ptr);
            pnx_ICC__issue_con_conf(vccb_ptr);
            vccb_ptr->vc_dsac = gtused;
        }                       /* endif - pnx_PCC OK */
        break;

case (X25_CLEAR_INDICATION):
        /* Clear Confirm has been sent by board */
        pnx_PDR__process_clear_ind(vccb_ptr);
        if (vccb_ptr->vc_snsap->sn_x25ok)
        {
            pnx_OPF__vc_open_fail(vccb_ptr, VCF_REF);
            pnx_SDC__send_clear_conf(vccb_ptr);
            pnx_RVC__release_vccb(vccb_ptr);
        }
        break;

default:
        /* SHOULD be handled by board */
        pnx_ERR__report_error(JUST_HVX, LOG_WARNING, (PNXXWKUP + 11),
                        NULL, PNX_API_UNEX);
        pnx_OPF__vc_open_fail(vccb_ptr, VCF_UPK);
        pnx_SDR__send_clear_req(vccb_ptr, 0, d_pna_up, NULL);
        pnx_IDI__issue_dis_ind(vccb_ptr, 0, gtdptl);
        break;

}                           /* end switch */
#ifdef PNXDEBUG
    syslog(LOG_DEBUG, "exit pnx_PP5");
#endif
    return (0);

}                               /* end pnx_PP5__process_p5 */

/***********************
 * pnx_XP5__process_p5 *
 ***********************/

/* This routine processes packets received while in the P5 DCE call
 * collision state. The P5 call collision state is the state in which the
 * DCE receives an incoming call packet after sending a call request packet.
 * The DTE acting as a DCE has issued a disconnect indication gater
```

C193

```
 *  (cancellation of call request) followed by a connect indication (for the
 *  incoming call) prior to entering the P5 DCE call collision state. */
int
pnx_XP5__process_p5(struct vccb * vccb_ptr)
{
    int             PacketType;
    struct snsap    *snsap_ptr;
#ifdef PNXDEBUG
    syslog(LOG_DEBUG, "pnx_XP5");
#endif
    snsap_ptr = vccb_ptr->vc_snsap;
    PacketType = vccb_ptr->cb_msg.msg_type;

switch (PacketType)
    {
    case (X25_DATA):
    case (X25_INCOMING_CALL):
    case (X25_CALL_CONNECTED):
    case (X25_INTERRUPT):
    case (X25_INTERRUPT_CONFIRM):
    case (X25_CLEAR_CONFIRM):
    case (X25_RESET_INDICATION):
    case (X25_RESET_CONFIRM):
        /* SHOULD be handled by X.25 board */
        pnx_ERR__report_error(JUST_HVX, LOG_WARNING, (PNXXWKUP + 12),
                              NULL, PNX_API_UNEX);
        pnx_OPF__vc_open_fail(vccb_ptr, VCF_P5I);
        pnx_SDR__send_clear_req(vccb_ptr, 0, d_pti_p5, NULL);
        break;

case (X25_CLEAR_INDICATION):
        /* Clear Confirm packet has been sent by board */
        pnx_PDR__process_clear_ind(vccb_ptr);
        break;

default:
        /* SHOULD be handled by X.25 board */
        pnx_ERR__report_error(JUST_HVX, LOG_WARNING, (PNXXWKUP + 13),
                              NULL, PNX_API_UNEX);
        pnx_OPF__vc_open_fail(vccb_ptr, VCF_UPK);
        pnx_SDR__send_clear_req(vccb_ptr, 0, d_pna_up, NULL);
        break;

}                                   /* end switch */
#ifdef PNXDEBUG
    syslog(LOG_DEBUG, "exit pnx_XP5");
#endif
    return (0);

}                                       /* pnx_XP5__process_p5 */

/***********************
 * pnx_PP6__process_p6 *
 ***********************/

/* This routine processes packets received while in the P6 DTE clear request
 * state. The P6 DTE clear request state is the state in which the DTE has
 * sent a clear request packet and is waiting for a clear confirm or clear
 * indication (clear collision) packet. */
int
pnx_PP6__process_p6(struct vccb * vccb_ptr)

{
    int             PacketType;
    struct snsap    *snsap_ptr;
#ifdef PNXDEBUG
    syslog(LOG_DEBUG, "pnx_PP6");
#endif
    snsap_ptr = vccb_ptr->vc_snsap;
    PacketType = vccb_ptr->cb_msg.msg_type;

switch (PacketType)
    {
    case (X25_CLEAR_CONFIRM):
```

C194

```
        vccb_ptr->vc_state = VC_P1;
        pnx_CVC__close_vc(vccb_ptr);
        pnx_RVC__release_vccb(vccb_ptr);
        break;
    case (X25_CLEAR_INDICATION):
        pnx_SDC__send_clear_conf(vccb_ptr);
        pnx_RVC__release_vccb(vccb_ptr);
        break;

default:
        pnx_ERR__report_error(JUST_HVX, LOG_WARNING, (PNXXWKUP + 14),
                              NULL, PNX_API_UNEX);
        break;
    }                                    /* end switch */
#ifdef PNXDEBUG
    syslog(LOG_DEBUG, "exit pnx_PP6");
#endif
    return (0);

}                                        /* process_p6 */

/*********************
 * pnx_PD1__process_d1 *
 *********************/

/* This routine processes packets received while in the D1 flow control
 * ready state. The D1 flow control ready state is the state in which data
 * packets may be exchanged over a virtual circuit. */ int
pnx_PD1__process_d1(struct vccb * vccb_ptr)
{
    int             PacketType;
    struct snsap    *snsap_ptr;
    static int      l;
#ifdef PNXDEBUG
    syslog(LOG_DEBUG, "pnx_PD1");
#endif
    snsap_ptr = vccb_ptr->vc_snsap;
    PacketType = vccb_ptr->cb_msg.msg_type;

switch (PacketType)
    {
    case (X25_DATA):

/* Reset Confirm is sent by the board and there are chances that
         * immediately after the network comes up we may get data packets
         * (transport connect request) on pvc. The reset confirm to
         * reset-connect may have been responded by the board and the upper
         * layers/PNetX remain unaware of it. In such case we send reset
         * disconnect to the remote end so that the session is
         * terminated/retried from start.
         *
         * If DTE gets a reset-disconnect packet against transport connect
         * request it retransmits network connection reset packet and the
         * session is successfully established.
         *
         * However, if DCE gets a reset-disconnect packet against transport
         * connect request it aborts the session with a message "Acceptor
         * Node cannot be accessed". There is a time gap of NW_CON_TIMER (
         * RNODE Directive, with default = 10 sec ) between the message
         * "ACCEPTOR MODE CANNOT BE ACCESSED" and the disconnect request sent
         * by Transport Layer. If a connect request is again made by the
         * remote end within this time, the remote transport layer assumes
         * network connection as already existing and starts with transport
         * connect request (data packets for Network Layer). These are
         * responded with reset-dx. This will continue till the remote end
         * sends reset with disconnect and then make a connect request. */ if (!(vccb_ptr->vc_pvc && (vccb_ptr->vc_dsac == gtenbl)))
        {
            pnx_PDT__process_data(vccb_ptr);
        }
        else
        {
            pnx_SRS__send_reset_req(vccb_ptr, 0, d_dte_dx);
```

C195

```
        }
        break;

case (X25_CLEAR_INDICATION):
        if (vccb_ptr->vc_pvc)
        {
            /* Another case for the X.25 baord! */
            pnx_ERR__report_error(JUST_HVX, LOG_WARNING, (PNXXWKUP + 15),
                            NULL, PNX_API_UNEX);
            pnx_VCE__vc_error(vccb_ptr, VCE_PVC);
            pnx_SRS__send_reset_req(vccb_ptr, 0, d_pna_pv);
            pnx_IRS__issue_reset_ind(vccb_ptr);
        }
        else
        {
            /* Clear Confirm packet has been sent by board */
            pnx_PDR__process_clear_ind(vccb_ptr);
            if (vccb_ptr->vc_snsap->sn_x25ok)
            {
                pnx_VHR__vc_hist_rprt(vccb_ptr);
                pnx_CLS__vc_close(vccb_ptr, VCC_NML);
                vccb_ptr->vc_wfdr = 1;
            }                       /* end if */
        }                           /* end if */
        break;

case (X25_RESET_INDICATION):
        pnx_PRS__process_rs(vccb_ptr);
        break;

case (X25_INTERRUPT):
        if (vccb_ptr->vc_intr == VC_J1)
        {
            vccb_ptr->vc_intr = VC_J2;
            pnx_PED__process_expedited_data(vccb_ptr);
        }
        else
        {
            /* Another case that ought to be handled by the board */
            pnx_ERR__report_error(JUST_HVX, LOG_WARNING, (PNXXWKUP + 16),
                            NULL, PNX_API_UNEX);
            pnx_VCE__vc_error(vccb_ptr, VCE_UIN);
            pnx_SRS__send_reset_req(vccb_ptr, 0, d_pna_in);
            pnx_IRS__issue_reset_ind(vccb_ptr);
        }                           /* end if */
        break;

case (X25_INTERRUPT_CONFIRM):
        if (vccb_ptr->vc_intx == VC_I2)
        {
            vccb_ptr->vc_intx = VC_I1;
            vccb_ptr->vc_xsndc += 1;
            pnx_IOK__issue_ok_to_send(vccb_ptr, 1);
        }
        else
        {
            /* No interrupt outstanding - should be handled by the board */
            pnx_ERR__report_error(JUST_HVX, LOG_WARNING, (PNXXWKUP + 17),
                            NULL, PNX_API_UNEX);
            pnx_VCE__vc_error(vccb_ptr, VCE_UIC);
            pnx_SRS__send_reset_req(vccb_ptr, 0, d_pna_ic);
            pnx_IRS__issue_reset_ind(vccb_ptr);
        }                           /* end if */
        break;

case (X25_RESET_CONFIRM):
        /* another board-handled case */
        pnx_VCE__vc_error(vccb_ptr, VCE_DIT);
        pnx_SRS__send_reset_req(vccb_ptr, 0, d_pti_p1);
        pnx_IRS__issue_reset_ind(vccb_ptr);
        break;

case (X25_CLEAR_CONFIRM):
    case (X25_INCOMING_CALL):
    case (X25_CALL_CONNECTED):
```

C196

```
        if (vccb_ptr->vc_pvc)
        {
            /* Board shouldn't give this to us! */
            pnx_ERR__report_error(JUST_HVX, LOG_WARNING, (PNXXWKUP + 18),
                            NULL, PNX_API_UNEX);
            pnx_VCE__vc_error(vccb_ptr, VCE_PVC);
            pnx_SRS__send_reset_req(vccb_ptr, 0, d_pna_pv);
            pnx_IRS__issue_reset_ind(vccb_ptr);
        }
        else
        {
            pnx_VHR__vc_hist_rprt(vccb_ptr);
            pnx_CLS__vc_close(vccb_ptr, VCC_D1I);
            pnx_SDR__send_clear_req(vccb_ptr, 0, d_pti_p4, NULL);
            pnx_IDI__issue_dis_ind(vccb_ptr, vccb_ptr->vc_gtid, gtdptl);
            vccb_ptr->vc_wfdr = 1;
        }                                /* end if */
        break;

default:
        /* another one the board shouldn't give us! */
        pnx_ERR__report_error(JUST_HVX, LOG_WARNING, (PNXXWKUP + 19),
                        NULL, PNX_API_UNEX);
        pnx_VCE__vc_error(vccb_ptr, VCE_UPK);
        pnx_SRS__send_reset_req(vccb_ptr, 0, d_pna_up);
        pnx_IRS__issue_reset_ind(vccb_ptr);
        break;
    }                                    /* end switch */
#ifdef PNXDEBUG
    syslog(LOG_DEBUG, "exit pnx_PD1");
#endif
}                                        /* end pnx_PD1__process_d1 */

/***********************
* pnx_PD2__process_d2 *
***********************/

/* This routine processes packets received while in the D2 DTE reset request
 * state. The D2 DTE reset request state is the state in which the DTE has
 * sent a reset request packet and is waiting for a reset confirm or reset
 * indication (reset collision) packet. */
int
pnx_PD2__process_d2(struct vccb * vccb_ptr)
{
    int             PacketType;
    struct snsap    *snsap_ptr;
#ifdef PNXDEBUG
    syslog(LOG_DEBUG, "pnx_PD2");
#endif
    snsap_ptr = vccb_ptr->vc_snsap;
    PacketType = vccb_ptr->cb_msg.msg_type;

switch (PacketType)
    {
    case (X25_RESET_CONFIRM):
        vccb_ptr->vc_state = VC_D1;
        vccb_ptr->vc_intx = VC_I1;
        vccb_ptr->vc_intr = VC_J1;
        vccb_ptr->vc_flor = VC_F1;
        vccb_ptr->vc_flox = VC_G1;
        if (vccb_ptr->vc_rip)
        {
            pnx_IRC__issue_reset_conf(vccb_ptr);
            vccb_ptr->vc_rip = 0;
        }
        else
            if (vccb_ptr->vc_pvc &&
                vccb_ptr->vc_cip)
            {
                vccb_ptr->vc_cip = 0;
                pnx_ICC__issue_con_conf(vccb_ptr);
                vccb_ptr->vc_dsac = gtused;
            }
```

C197

```
            else
                if (vccb_ptr->vc_pvc &&
                    vccb_ptr->vc_dip)
                {
                    pnx_IDC__issue_dis_conf(vccb_ptr);
                    vccb_ptr->vc_dip = 0;
                    vccb_ptr->vc_ucxid = NULL;
                    vccb_ptr->vc_dsac = gtenbl;
                }                           /* end if */
            break;

case (X25_RESET_INDICATION):
        vccb_ptr->vc_state = VC_D1;
        vccb_ptr->vc_intx = VC_I1;
        vccb_ptr->vc_intr = VC_J1;
        vccb_ptr->vc_flor = VC_F1;
        vccb_ptr->vc_flox = VC_G1;
        if (vccb_ptr->vc_rip)
        {
            pnx_IRC__issue_reset_conf(vccb_ptr);
            vccb_ptr->vc_rip = 0;
        }
        else
            if (vccb_ptr->vc_pvc &&
                vccb_ptr->vc_cip)
            {
                vccb_ptr->vc_cip = 0;
                pnx_ICC__issue_con_conf(vccb_ptr);
                vccb_ptr->vc_dsac = gtused;
            }
            else
                if (vccb_ptr->vc_pvc &&
                    vccb_ptr->vc_dip)
                {
                    pnx_IDC__issue_dis_conf(vccb_ptr);
                    vccb_ptr->vc_dip = 0;
                    vccb_ptr->vc_ucxid = NULL;
                    vccb_ptr->vc_dsac = gtenbl;
                }                           /* end if */
        break;

case (X25_CLEAR_INDICATION):
        if (vccb_ptr->vc_pvc)
        {
            /* error case - SHOULD be handled by board */
            pnx_ERR__report_error(JUST_HVX, LOG_WARNING, (PNXXWKUP + 20),
                            NULL, PNX_API_UNEX);
            pnx_VCE__vc_error(vccb_ptr, VCE_PVC);
        }
        else
        {
            /* Board has already sent Clear Confirm packet */
            pnx_PDR__process_clear_ind(vccb_ptr);
            if (vccb_ptr->vc_snsap->sn_x25ok)
            {
                pnx_VHR__vc_hist_rprt(vccb_ptr);
                pnx_CLS__vc_close(vccb_ptr, VCC_NML);
                vccb_ptr->vc_wfdr = 1;
            }
        }                           /* end if */
    case (X25_CLEAR_CONFIRM):
    case (X25_INCOMING_CALL):
    case (X25_CALL_CONNECTED):
        if (vccb_ptr->vc_pvc)
        {
            /* SHOULD be handled by board */
            pnx_ERR__report_error(JUST_HVX, LOG_WARNING, (PNXXWKUP + 21),
                            NULL, PNX_API_UNEX);
            pnx_VCE__vc_error(vccb_ptr, VCE_PVC);
        }
        else
        {
            pnx_VHR__vc_hist_rprt(vccb_ptr);
            pnx_CLS__vc_close(vccb_ptr, VCC_D2I);
            pnx_SDR__send_clear_req(vccb_ptr, 0, d_pti_p4, NULL);
            pnx_IDI__issue_dis_ind(vccb_ptr, vccb_ptr->vc_gtid, gtdptl);
```

C198

```
            vccb_ptr->vc_wfdr = 1;
        }
        break;                      /* end if */

}                               /* end switch */
#ifdef PNXDEBUG
    syslog(LOG_DEBUG, "exit pnx_PD2");
#endif
    return (0);

}                                   /* end pnx_PD2__process_d2 */

/*********************
 * pnx_PD3__process_d3 *
 *********************/

/* This routine processes packets received while in the D3 DTE reset
 * indication state. The D3 reset indication state is the state in which a
 * reset indication packet has been received but a reset confirm has not as
 * yet been sent. */ int
pnx_PD3__process_d3(struct vccb * vccb_ptr)
{ struct snsap     *snsap_ptr;
    struct x25lnk    *x25lnk_ptr;
    unsigned int     diag;
    unsigned char    *pkt_ptr;
    int              PacketType;
#ifdef PNXDEBUG
    syslog(LOG_DEBUG, "pnx_PD3");
endif PacketType = vccb_ptr->cb_msg.msg_type;

switch (PacketType)
    {
    case X25_DATA:
    case X25_INTERRUPT:
    case X25_INTERRUPT_CONFIRM:
    case X25_RESET_CONFIRM:
        /* These cases should be handled by the board */
        pnx_ERR__report_error(JUST_HVX, LOG_WARNING, (PNXXWKUP + 22),
                              NULL, PNX_API_UNEX);
        pnx_VCE__vc_error(vccb_ptr, VCE_D3I);
        pnx_SRS__send_reset_req(vccb_ptr, 0, d_pti_d3);
        break;

case X25_RESET_INDICATION:
        return (0);
        break;

case X25_CLEAR_INDICATION:
        if (vccb_ptr->vc_pvc)
        {
            /* PVC Case */
            pnx_VCE__vc_error(vccb_ptr, VCE_PVC);
            pnx_SRS__send_reset_req(vccb_ptr, 0, d_pna_pv);
        }
        else
        {
            /* SVC Case - NOTE:  the board has already sent the clear confirm
             * for us. */
            pnx_PDR__process_clear_ind(vccb_ptr);
            if (vccb_ptr->vc_snsap->sn_x25ok)
            {
                pnx_VHR__vc_hist_rprt(vccb_ptr);
                pnx_CLS__vc_close(vccb_ptr, VCC_NML);
                vccb_ptr->vc_wfdr = 1;
            }
        }                           /* end if */
        break;

case X25_CLEAR_CONFIRM:
```

C199

```
    case X25_INCOMING_CALL:
    case X25_CALL_CONNECTED:
        if (vccb_ptr->vc_pvc)
        {
            /* PVC Case:  these should be handled by the board. */
            pnx_ERR__report_error(JUST_HVX, LOG_WARNING, (PNXXWKUP + 23),
                            NULL, PNX_API_UNEX);
            pnx_VCE__vc_error(vccb_ptr, VCE_PVC);
            pnx_SRS__send_reset_req(vccb_ptr, 0, d_pna_pv);
        }
        else
        {
            pnx_VHR__vc_hist_rprt(vccb_ptr);
            pnx_CLS__vc_close(vccb_ptr, VCC_D3I);
            pnx_SDR__send_clear_req(vccb_ptr, 0, d_pti_p4, NULL);
            pnx_IDI__issue_dis_ind(vccb_ptr, vccb_ptr->vc_gtid, gtdptl);
            vccb_ptr->vc_wfdr = 1;
        }
        break;                          /* end if */ default:
        /* Should be handled by board */
        pnx_ERR__report_error(JUST_HVX, LOG_WARNING, (PNXXWKUP + 24),
                        NULL, PNX_API_UNEX);
        pnx_VCE__vc_error(vccb_ptr, VCE_UPK);
        pnx_SRS__send_reset_req(vccb_ptr, 0, d_pna_up);
        break;
    }                                   /* end switch */
#ifdef PNXDEBUG
    syslog(LOG_DEBUG, "exit pnx_PD3");
#endif
    return (0);
}
                                        /* process_d3 */
```

15

C200

```
/*
 *  Name:       pnx_head.h
 *  Purpose:    pnetx data structures
 *  Input:
 *  Output:
 */

/*
** PNetX function prototypes:
*/
#include "pnx_func.h"

/*
** generic queue header
*/
struct qh
{
    int             pri;        /* priority/lock word */
    struct qh       *next;      /* next (or first) in queue */
    struct qh       *prev;      /* prev (or last) in queue */
};

/*
** PNetX global data structure
*/ struct pnx_global
{
    char            marker[4];  /* structure marker - PXGL */
    struct RCT      *pnx_rct;   /* RISCized address of our RCT */
    pid_t           pnx_pid;    /* ID of PNETX PROCESS */
    wchar_t         pnx_route[14];  /* PNetX name in X.25 routing table -
                                     *  "HVX" */ short           num_ctrs;   /* sum of num_listen_ctr & num_vc_ctr */
    struct ctr_block *counters; /* counter array */
    struct ctr_vc_lk *ctr_vc_link; /* counter to vc link array */
    short           num_vc;     /* number of Virtual Circuits */
    short           num_ports;  /* number of X.25 used - equal to number
                                 * of HVX25 (SNSAP structures */

/* snsap table - built from HVX25 structures passed with BOOT */
    struct snsap    *snsap_tbl; /* snsap table */

/* VC index table */
    short           max_vcs;    /* maximum number of VCs allowed */
    struct vc_tab   *vc_table;  /* VC index table */

/* VC Receives from PNet */
    short           num_vcrcv;  /* number of outstanding VC Receive IORBs */
    short           low_vcrcv;  /* lowest number of VC Receives */
    struct IRB      *vc_recv;   /* first VC Receive IRB */

/* VC chains */
    struct qh       active_q;   /* active VCCBs */
    struct qh       wait_pnet;  /* VCCBs needing VC_RECEIVE or PHBs from
                                 * PNet */

/* flags */
    unsigned int    pnx_active:1;/* PNetX initialized successfully */
    unsigned int    x25_initing:1;    /* X.25 API is initializing */
    unsigned int    x25_active:1;/* X.25 API initialized successfully */
    unsigned int    hvs_active:1;/* we received HVS BOOT */
    unsigned int    x25link_up:1;/* Any of the x25 links is init'ed */
    unsigned int    x25listen_on:1;/* Any of the x25 links is init'ed */
    unsigned int    pnx_shm_ok:1;/* Can we write to shared memory*/ struct PHD      *avail_phb; /* chain of available Packet Header Blocks */
    short           num_phb;    /* current length of PHB chain */
    short           low_phb;    /* lowest number of PHBs */
    short           pkt_len;    /* size of phb data area */

/* stats */
```

C201

```c
    short           sapinfo_cnt; /* number of SAP UP/DOWN GATERs yet to be
                                  * sent */

/* signal handling */
    sigset_t        pnx_sigs;    /* signals we care about */
    struct sigaction pnx_actions; /* what to do when one of our signals
                                   * comes */

/* X.25 API structures - we may wish to move these to SNSAP or VCCB */
    struct cb_circuit_info_struct cb_circuit_info;
    struct cb_dev_info_struct cb_dev_info;
    struct cb_link_name_struct cb_link_name;
    struct cb_pvc_alloc_struct cb_pvc_alloc;
};

struct ctr_block
{
    struct ctr_array_struct x25_ctrs[1];    /* VARYING LENGTH ARRAY! -
                                             * actual size is
                                             * (PNetGlobal->max_vcs +
                                             * PNetXGlobal->num_ports) */
};

struct ctr_vc_lk
{
    struct vccb     *vc[1];      /* same size as x25_ctrs[] - helps us find
                                  * a VCCB when we just have a counter -
                                  * VCCB at a given index corresponds to
                                  * counter at same index */
};

/* the VC index table allows PNetX to find a VCCB when passed an index in
  * gt_sce. The value in gt_sce must map to a valid MOD400 address.
  * VCID_BASE is used to give each VCCB a value to be used in GATERs.  PNetX
  * uses a table of indeces similar to the LRT of X.25 on HVS to map gt_dst
  * to a VCCB */
define VCID_BASE 0x10000 struct vc_tab
{
    struct vccb     *vc[1];
};

/* PNetX IO function codes - from rb_ct2 (z_rb.h) */
#define BOOT 1                  /* Write - HVS Network has been started */
#define GATER_EVENT 2           /* Write - GATER from upper layer */
#define VC_RECEIVE 4            /* Read - waiting for X.25 event */
define PHB_ALLOC 5             /* Write - PHB buffer chain */ define INCLD_SIZE 1
define DONOT_INCLD_SIZE 0

/*
** generic syslog error reporting codes
*/
#define PNX_API 1               /* Error Returned by X.25 API */
#define PNX_NO_BFR 2            /* No buffer passed in IORB */
#define PNX_NO_FORK 3           /* Unable to fork() VC-Clear */
#define PNX_NO_VCCB 4           /* No VCCB found */
#define PNX_NO_SAP 5            /* No SNSAP or RSNSAP found */
#define PNX_CTR_ERR 6           /* VCCB counter doesn't match X25 counter */
#define PNX_UP 7                /* PNetX is already up */
#define PNX_X25_UP 8            /* X25 init already done */
#define PNX_NO_MEM 9            /* malloc failed */
#define PNX_NO_LINK 10          /* X.25 link not connected */
#define PNX_SYS_ERR 11          /* system error */
#define PNX_OTHER_SIG 12        /* other signal received */
#define PNX_ERROR 13            /* generic PNetX error */
#define PNX_API_UNEX 14         /* unexpected X.25 API event */
#define PNX_GET_ATTR_ERR 15
```

C202

```
/*
**   Source module identifiers (for pnx_ERR__report_error)
*/
#define EMUX25 000
#define PNXADMIN 100
#define PNXGTIN 200
#define PNXGTOUT 300
#define PNXMISC 400
#define PNXUWKUP 500
#define PNXX25IN 600
#define PNXX25OUT 700
#define PNXXWKUP 800
#define PNXVCCMD 900
#define PNXINF 1000
#define PNXINIT 1100
#define PNXMEM 1200
#define PNXMISC1 1300
#define PNXMISC2 1400
#define PNXNSCMD 1500
#define PNXUMP 1600

/*
** Error report type (for pnx_ERR__report_error)
*/
#define JUST_HVX 1              /* syslog only */
#define JUST_HVS 2              /* HVS UMP only */
#define BOTH 3                  /* syslog & UMP */
```

3

C203

```
/*
 * Name:         pnx_func.h
 * Purpose:      Prototypes for PNetX functions
 * Input:
 * Output:
 *
 */ void
pnx_clear_handler(int );

void
pnx_cleanup(void);

int
add_to_array(struct vccb *);

char             *
combine_udata(struct PHD *);

int
dumphex(ushort *, int);

void
mqi_input(void);

int
pnx_allocate_vcid(struct vccb *);

int
pnx_bcd_to_short(short *, unsigned char *, int);

void
pnx_bin_to_str(unsigned char *, unsigned char *, int *);

int
pnx_check_mqi_input();

void
pnx_find_iorb(struct MQI *, struct MQI_LINKS **, short);

void
pnx_clock_tick(void);

void
pnx_LDI__process_dis_ind(struct snsap *);

void
pnx_x25_errors(struct vccb *);

void
pnx_check_link(struct vccb *);

void
pnx_free_cb_call(struct cb_call_struct *);

void
pnx_free_cb_clear(struct cb_clear_struct *);

void
pnx_free_cb_fac(struct cb_fac_struct *);

void
pnx_free_vcid(struct vccb *);

int
pnx_get_next_vc_receive(struct IRB **, struct RB **);

struct PHD *
pnx_get_next_phb(void);

int
pnx_getattr(struct snsap *);

void
```

1

C204

```
pnx_handler(int);

int
pnx_initialize(void);

void
pnx_io();

struct snsap *
pnx_make_snsap(struct hvx25 *);

int
pnx_port_init(struct snsap *);

int
pnx_post_request(struct IRB *);

int
pnx_pvc_alloc(struct snsap *);

int
pnx_replenish_phbs(struct PHD *);

void
pnx_rtrn_x25_mem(struct vccb *);

void
pnx_sap_info(void);

int
pnx_short_to_bcd(char *, short, short *);

void
pnx_start_clock(void);

int
pnx_str_to_bin(unsigned char *, unsigned char *, int);

void
pnx_user_fsm1(struct GATER *, ushort);

void
pnx_user_fsm2(struct GATER *, struct vccb *, ushort);

int
pnx_vc_clear_complete(void);

int
pnx_x25_fsm(struct vccb *);

int
pnx_x25_init(struct hvx25 *);

int
pnx_x25_listen_on(void);

int
pnx_x25_wakeup(int);

int
pnx_ACM__admin_command(struct GATER *);

int
pnx_CLS__vc_close(struct vccb *, ushort);

int
pnx_CRQ__process_con_req(struct snsap *, struct GATER *, ushort);

int
pnx_CVC__close_vc(struct vccb *);

int
pnx_DEQ(struct qh *, struct qh *);

int
pnx_ERR__report_error(int, int, int, unsigned char *, int);
```

C205

```
int
pnx_FBS__fac_block_size(unsigned char *, int);

struct vccb        *
pnx_FVC__find_vccb(ulong);

int
pnx_GCR__get_credit(struct vccb *);

struct GATER       *
pnx_GRG__get_rsp_gater(struct RB *, ulong);

int
pnx_GSN__get_snsap(uchar *, struct snsap **);

struct vccb        *
pnx_GVC__get_vccb_by_ctr(int);

struct vccb        *
pnx_GVI__get_vccb_by_id(ulong);

struct vccb        *
pnx_GVL__get_vccb_by_lcn(int, int);

struct vccb        *
pnx_GVP__get_vccb_by_pid(pid_t);

int
pnx_HCS__check_state(struct snsap *, struct x25nsp *);

int
pnx_HNA__attr_ns(struct x25nsp *, ulong);

int
pnx_HNL__list_ns(struct x25nsp *, ulong);

int
pnx_HNM__match_ns(struct x25nsp *, struct snsap *);

int
pnx_HNN__number_ns(struct x25nsp *, ulong);

int
pnx_HNS__ns_admin_cmd(struct GATER *);

int
pnx_HNU__update_ns(struct x25nsp *, ulong);

int
pnx_HVA__attr_vc(struct x25vcp *, ulong);

int
pnx_HVC__vc_admin_cmd(struct GATER *);

int
pnx_HVH__history_vc(struct x25vcp *, ulong);

int
pnx_HVL__list_vc(struct x25vcp *, ulong);

int
pnx_HVM__match_vc(struct x25vcp *, struct vccb *);

int
pnx_HVN__number_vc(struct x25vcp *, ulong);

int
pnx_HVT__van_type(unsigned char *, struct snsap *);

int
pnx_ICC__issue_con_conf(struct vccb *);

int
pnx_ICI__issue_con_ind(struct vccb *);

int
pnx_IDC__issue_dis_conf(struct vccb *);
```

C206

```
int
pnx_IDI__issue_dis_ind(struct vccb *, unsigned long, unsigned int);

int
pnx_IDT__issue_data_ind(struct vccb *);

int
pnx_IDX__issue_dis_ind(unsigned long, unsigned int, ushort);

int
pnx_IED__issue_exp_ind(struct vccb *);

int
pnx_INQ__info_request(struct GATER *);

int
pnx_IOK__issue_ok_to_send(struct vccb *, unsigned int);

int
pnx_IRC__issue_reset_conf(struct vccb *);

struct GATER *
pnx_IRG__info_resp_gater(struct RB *, struct GATER *);

int
pnx_IRL__issue_rel_sdu(struct vccb *, struct PHD *);

int
pnx_IRS__issue_reset_ind(struct vccb *);

int
pnx_ISI__issue_sap_info(struct snsap *, unsigned int);

int
pnx_LRS__locate_rsnsap(struct vccb *, struct snsap **);

int
pnx_LSI__process_sap_info(struct GATER *);

int
pnx_LSN__locate_snsap(struct GATER *, unsigned int, struct snsap **);

int
pnx_MNA__move_net_addr(unsigned char *, int,
                       unsigned char *, int,
                       int);

int
pnx_MVC__make_vccb(struct vccb **, struct snsap *);

int
pnx_NSE__ns_error(struct snsap *, ushort);

int
pnx_NSN__ns_error2(char *, ushort);

int
pnx_OPF__vc_open_fail(struct vccb *, ushort);

int
pnx_OPN__vc_open(struct vccb *);

void
pnx_ORP__vc_open_param(struct GATER *, struct vccb *);

int
pnx_PCC__process_cc(struct vccb *);

int
pnx_PCR__process_cr(struct vccb *);

int
pnx_PD1__process_d1(struct vccb *);

int
pnx_PD2__process_d2(struct vccb *);
```

4

C207

```
int
pnx_PD3__process_d3(struct vccb *);

int
pnx_PDR__process_clear_ind(struct vccb *);

int
pnx_PDT__process_data(struct vccb *);

int
pnx_PED__process_expedited_data(struct vccb *);

int
pnx_PP1__process_p1(struct vccb *);

int
pnx_PP2__process_p2(struct vccb *);

int
pnx_PP3__process_p3(struct vccb *);

int
pnx_PP5__process_p5(struct vccb *);

int
pnx_PP6__process_p6(struct vccb *);

int
pnx_PVC__pvc_con_req(struct snsap *, struct GATER *,
                    unsigned int, unsigned int, ushort);

int
pnx_QOT(struct qh *, struct qh *);

int
pnx_PRS__process_rs(struct vccb *);

int
pnx_RDI__issue_dis_ind(struct vccb *, unsigned int);

int
pnx_RS1__process_net_rs(struct vccb *);

int
pnx_RS2__process_net_rs(struct vccb *);

int
pnx_RVC__release_vccb(struct vccb *);

int
pnx_SCR__send_call_req(struct vccb *, struct GATER *);

int
pnx_SCC__send_call_accpt(struct vccb *, unsigned char *);

int
pnx_SDC__send_clear_conf(struct vccb *);

int pnx_SDR__send_clear_req(struct vccb *,
                            int, int,
                            unsigned char *);

int
pnx_SDT__send_data(struct vccb *, struct PHD *);

int
pnx_SED__send_interrupt(struct vccb *, struct GATER *);

int
pnx_SNI__sn_info_req(struct GATER *);

int
pnx_SNR__sn_info_resp(struct snsap *, struct GATER *);

int
pnx_SRS__send_reset_req(struct vccb *, int, int);
```

5

C208

```
int
pnx_SRC__send_reset_conf(struct vccb *);

int
pnx_SSN__select_snsap(struct snsap **);

int
pnx_SVC__svc_con_req(struct snsap *, struct GATER *, unsigned char *,
                    ushort);

int
pnx_UCP__process_con_resp(struct vccb *, struct GATER *);

int
pnx_UCR__process_con_req(struct GATER *, ushort);

int
pnx_UDR__process_dis_req(struct GATER *);

int
pnx_UDT__process_data_req(struct vccb *, struct GATER *);

struct GATER   *
pnx_UMG__unsol_msg_gater(struct RB *);

int
pnx_URS__process_reset_req(struct vccb *, struct GATER *);

int
pnx_VCE__vc_error(struct vccb *, ushort);

int
pnx_VCI__vc_info_req(struct GATER *);

int
pnx_VHR__vc_hist_rprt(struct vccb *);

void
pnx_VRP__vc_resp_param(struct GATER *, struct vccb *);

int
pnx_XCC__extd_call_accpt(struct vccb *, unsigned char *);

int
pnx_XDR__extd_clear_req(struct vccb *, unsigned char *,
                       struct cb_clear_struct *);

int
pnx_XP5__process_p5(struct vccb *);

int
remove_from_array(struct vccb *);

void
TIME_STAMP();

void
TRACE_ERR(int, int);

void
TRACE_A(void);

void
TRACE(uchar, uchar, uchar, uchar, ulong, ulong, short);
```

C209

```c
/*
 * Name:      pnx_hvx25.h
 * Purpose:   This is the HVX copy of the HVS Pnet hvx_snsap.h file.
 *            The PNetX SNSAP structure is created from this structure
 *            when the BOOT IORB is received from Pnet.
 *
 * Input:
 * Output:
 *
 */

/* HVX       HVX Subnetwork Service Access Point Table
  *
  * The SNSAP table describes the endpoint of a connection at the X25 sublayer.
  * This table represents the packet mode aspects of a network subscription
  * to a public data network. */
/****************************************************************************/
struct hvx25
{
    WORD            hv_id;          /* memory marker */
    ADDR            hv_nxt[2];      /* ptr to next snsap */
    unsigned char   hv_name[9];     /* snsap name */
    unsigned char   hv_lsap[9];     /* Sublayer SAP (local) */
    WORD            hv_dsac;        /* DSAC state */
    unsigned char   hv_type[4];     /* NS type */
    unsigned char   hv_venu[2];     /* Venue */
    unsigned char   hv_addr[9];     /* Calling Address (X.121) */
    WORD            hv_maxvc;       /* Max # of virtual circuits */
    WORD            hv_portl;       /* address extension (port length) */ unsigned char   hv_mylv;        /* snsap layer */
    unsigned char   hv_myin;        /* snsap instance */
    unsigned char   hv_olv;         /* connection layer */
    unsigned char   hv_oin;         /* connection instance */

WORD            hv_flag;
#define hv_rem 0x8000               /* remote flag */
#define hv_rfu 0x7fff               /* rfu */
};                                  /* struct hvx25 */
```

C210

```
/*
*  Name:       pnx_snsap.h
*  Purpose:    SNSAP Table    Subnetwork Service Access Point Table
*
*              The SNSAP table describes the endpoint of a
*              connection at the X25 sublayer. This table
*              represents the packet mode aspects of a network
*              subscription to a public data network. The SNSAP
*              table also represents the proper or image
*              addressing object at the X25 sublayer for
*              administrative purposes.
*
*              This structure is created by PNetX when the BOOT
*              IORB is received from PNet. It is based on the
*              HVS HVX25 (hvx25.h) structure, built at HVS network
*              startup.
*
*  Input:
*  Output:
*
*/

/***********************************************************************/ define SN_ID      "SN"         /* structure id */ define SN_CLOSED     0         /* Packet level not ready */
define SN_R1         1         /* R1 - Packet level ready */
#define SN_R2         2         /* R2 - DTE restart request */
define SN_R3         3         /* R3 - DCE restart indication */ define SN_HDSA   1             /* No PDN */
define SN_TELN   2             /* Telenet (USA) */
#define SN_TYMN   3             /* Tymnet (USA) */
#define SN_UNIN   4             /* Uninet (USA) */
#define SN_DATP   5             /* Datapac (Canada) */
#define SN_INFO   6             /* Infoswitch (Canada) */
#define SN_DTXP   7             /* Datex-P (Germany, Austria) */
#define SN_AUSP   8             /* Auspac (Australia) */
#define SN_ITAP   9             /* Itapac (Italy) */
#define SN_UKPS  10             /* PSS (UK) */
#define SN_PDNX  11             /* Generic PDN */
#define SN_TRNS  12             /* Transpac (France) */
#define SN_TELP  13             /* Telepac (Switzerland) */
#define SN_DCSX  14             /* DCS (Belgium) */
#define SN_EURO  15             /* Euronet (EEC) */
#define SN_DN1X  16             /* DN1 (Holland) */
#define SN_IBER  17             /* Iberpac (Spain) */
#define SN_ARPC  18             /* Arpac (Argentina) */
#define SN_DTXB  19             /* Datex-B (Austria) */
#define SN_DDXP  20             /* DDX-P (Japan) */
#define SN_RTTX  21             /* RTT (Belgium) */
#define SN_ACCU  22             /* Accunet (USA) */
#define SN_NOPS  23             /* NOPSS (Norway) */
#define SN_SCTX  24             /* SCT (Mexico) */
define SN_MARK  25             /* Marknet (USA) */ define SN_V80   0              /* CCITT X.25 - 1980 */
define SN_V84   1              /* CCITT X.25 - 1984 */ struct snsap { short           sn_id;    /* memory marker */
        struct snsap    *sn_nxt;  /* ptr to next snsap */
        unsigned char   sn_name[9];  /* snsap name */
        unsigned short  sn_dsac;  /* DSAC state */
        unsigned char   sn_type[4];  /* NS type */
        unsigned char   sn_lsap[10]; /* Sublayer SAP (local) */
        unsigned char   sn_rsap[9];  /* Sublayer SAP (remote) */
        unsigned char   sn_venu[2];  /* Venue */
        unsigned char   sn_addr[9];  /* Calling Address (X.121) */
        short           sn_maxvc;    /* Max # of virtual circuits */
        unsigned short  sn_ntw;   /* VAN type */
        short           sn_pszx;  /* default xmit pkt size (power of 2) */
        short           sn_pszr;  /* default recv pkt size (power of 2) */
```

C211

```
        short           sn_wndx;/* default xmit window size */
        short           sn_wndr;/* default recv window size */
        unsigned short  sn_nvrv;/* reverse charge (NV/RV) */ unsigned short  sn_state;       /* protocol (CCITT) state */ unsigned char   sn_mylv;/* snsap layer */
        unsigned char   sn_myin;/* snsap instance */ unsigned char   sn_olv; /* connection layer */
        unsigned char   sn_oin; /* connection instance */ unsigned short  sn_numvc;       /* # of virtual circuits */
        unsigned short  sn_maxlc;       /* max # of entries in lct */ short           sn_lcnp1;       /* low lcn - PVC */
        short           sn_lcnpn;       /* number of PVC */
        short           sn_lcnil;       /* low lcn - incoming only SVC */
        short           sn_lcnin;       /* number of incoming only SVCs */
        short           sn_lcntl;       /* low lcn - two way only SVC */
        short           sn_lcntn;       /* number of two way only SVCs */
        short           sn_lcnol;       /* low lcn - outgoing only SVC */
        short           sn_lcnon;       /* number of outgoing only SVCs */ short           sn_thrx;/* default xmit throughput class */
        short           sn_thrr;/* default recv throughput class */ unsigned short  sn_ver; /* X25 protocol version */

/* indicator flags */
        unsigned        sn_dce:1;       /* DTE acting as DCE */
        unsigned        sn_rca:1;       /* reverse charging acceptance */
        unsigned        sn_fsa:1;       /* fast select acceptance */
        unsigned        sn_flcng:1;     /* flow control negotiation */ unsigned        sn_thrng:1;     /* throughput negotiation */
        unsigned        sn_icb:1;       /* incoming calls barred */
        unsigned        sn_ocb:1;       /* outgoing calls barred */
        unsigned        sn_rem:1;       /* remote sap */ unsigned        sn_nca:1;       /* no calling addr in call/clear */
        unsigned        sn_lcnz:1;      /* lcn 0 assignment allowed */
        unsigned        sn_pvc:1;       /* this SNSAP has PVCs */
        unsigned        sn_cug:1;       /* cug membership allowed */ unsigned        sn_x25ok:1;     /* X.25 port active */
        unsigned        sn_sndinfo:1;   /* SAP info (up/down) must be sent */
        unsigned        sn_rfu:2;       /* rfu (alignment) */ unsigned short  sn_ngfx;/* flow control negotiation (NG/FX) */
        unsigned short  sn_portl;       /* address extension (port) length */
};                              /* struct snsap */

/* defines to test the x25 attributes obtained during initialization */ define         TOTAL_ATTR              0x01ffffff
define         LOCAL_NUA               0x00000001
#define         PVC_CHANNEL             0x00000002
#define         NUM_OF_PVCS             0x00000004
#define         IN_SVC                  0x00000008
#define         NUM_IN_SVCS             0x00000010
#define         IN_OUT_SVC              0x00000020
#define         NUM_IN_OUT_SVC          0x00000040
#define         OUT_SVC                 0x00000080
#define         NUM_OUT_SVCS            0x00000100
#define         DEF_TX_THROUGH          0x00000200
#define         DEF_RX_THROUGH          0x00000400
#define         DEF_TX_PKT_SIZE         0x00000800
#define         DEF_RX_PKT_SIZE         0x00001000
#define         DEF_TX_PKT_WIN          0x00002000
#define         DEF_RX_PKT_WIN          0x00004000
#define         CCITT_SUPPORT           0X00008000
#define         REV_CHARGING            0x00010000
#define         FAST_SELECT             0x00020000
#define         F_WINDOW                0x00040000
```

2

C212

```
#define        F_THROUGHPUT         0x00080000
#define        CALLS_IN             0x00100000
#define        CALLS_OUT            0x00200000
#define        ZERO_ADDRESS         0x00400000
#define        CUG                  0x00800000
#define        NETWORK_ID           0x01000000
```

C213

```
/*
 *  Name:        pnx_trace.h
 *  Purpose:
 *  Input:
 *  Output:
 *
 */ include <sys/types.h>
include <sys/ipc.h>
#include <sys/shm.h>
#include <unistd.h>
#include <fcntl.h>
#include <syslog.h>
#include <signal.h>
include <x25sdefs.h> define gtfinr   34
define TRACE_SHMDADDR (char *)0xc0000000

/* declaration of function prototypes in pnx_trc.c */
void format_gater(struct trace_item *);
void format_packet(struct trace_item *);
void format(struct trace_item *);
static char     *G_function[] =
{
 "(Undefined)",
 "(ConnReq)",
 "(ConnRsp)",
 "(DiscReq)",
 "(DataReq)",
 "(DataACKReq)",
 "(ThrottleRcv)",
 "(OKrecv)",
 "(ExpReq)",
 "(ResetReq)",
 "(ResetRsp)",
 "(ConnCnf)",
 "(ConnInd)",
 "(DiscInd)",
 "(DataInd)",
 "(RelSDU)",
 "(ThrottleSnd)",
 "(OKsend)",
 "(ExpInd)",
 "(ResetCnf)",
 "(ResetInd)",
 "(DiscRsp)",
 "(DiscCnf)",
 "(TimerWkup)",
 "(AdmUMP)",
 "(AdmCmd)",
 "(AdmRspMor)",
 "(AdmRspItm)",
 "(AdmRspFnl)",
 "(Info)",
 "(AdmErrRsp)",
 "(LMEUpdReq)",
 "(LMEUpdCnf)",
 "(InfoReq)",
 "(InfoRsp)",
};

struct trace_item
{
    uchar           type;
#define GATER_IN      1
#define GATER_OUT     2
#define X25_INCOMING  3
#define X25_OUTGOING  4
#define PNX_ERR       5
#define TRC_TIME      6
define COMPLETED     0x80 uchar           function;   /* value of function field is either
                                 * gt_fnc  (see hvx_gater.h) or msg_type
```

C214

```
                             * (see x25sdefs.h) or sec field in case of time*/
uchar           cse_lyr;
/* GATER_IN    - gt_slr
   GATER_OUT   - gt_dlr
   CLEAR/ RESET - cause
   PNX_ERR     - function location
   TRC_TIME    -minute */ uchar           dia_ins;
/* GATER_IN    - gt_sin
   GATER_OUT   - gt_din
   CLEAR/ RESET - diagnostic
   PNX_ERR     - location within function
   TRC_TIME    - hour*/ unsigned long   our_id;
/* GATER_IN    - gt_dst
   GATER_OUT   - gt_src
   X25         - VCCB->vc_gtid
   PNX_ERR     - X25 ERR_CODE
   TRC_TIME    - day*/ unsigned long   their_id;
/* GATER_IN    - gt_src
   GATER_OUT   - gt_dst
   X25         - VCCB->conn_id
   PNX_ERR     -SYSTEM ERR_CODE
   TRC_TIME    -month */
};

struct trace_buffer
{
    char            id[12];     /* "PNetX Trace" */
    int             PNetX_pid;      /* PNetX pid - needed to send SIGSTOP & SIGCONT */
    int size;  /* size of shared memory segment */
    int modulo; /* mask for wrapping */
    unsigned        index;      /* next available slot, i.e. oldest trace
                                 * element */
    struct trace_item item[1];  /* variable size array */
};
```

```
/*
 * Name:        pnx_vccb.h
 * Purpose:     This file defines the PNetX Virtual Circuit Control
 *              Block (VCCB).  There is one VCCB for each active
 *              virtual circuit, and one for the listening process on
 *              each X.25 Co-Processor port.
 *
 *              The VCCB is created dynamically for switched virtual
 *              circuits and is created at network initialization
 *              (BOOT) time for permanent virtual circuits.
 * Input:
 * Output:
 *
 */ define VC_ID "VC"

define VC_P1 0                 /* Ready */
#define VC_P2 1                 /* DTE Call Request */
#define VC_P3 2                 /* DCE Incomming Call */
#define VC_D1 3                 /* Flow Control Ready */
#define VC_D2 4                 /* DTE Reset Request */
#define VC_D3 5                 /* DCE Reset Indication */
#define VC_P5 6                 /* Call Collision */
#define VC_P6 7                 /* DTE Clear Request */
define VC_P7 8                 /* DCE Clear Request */ define VC_I1 0                 /* Interrupt Ready (xmit) */
define VC_I2 1                 /* Interrupt Sent */ define VC_J1 0                 /* Interrupt Ready (recv) */
define VC_J2 1                 /* Interrupt Received */ define VC_G1 0                 /* Receive Ready (xmit) */
define VC_G2 1                 /* RNR Sent */ define VC_F1 0                 /* Receive Ready (recv) */
define VC_F2 1                 /* RNR Received */ struct vccb
{                                       /* Virtual Circuit Control Block */
    struct qh       links;              /* forward & backward links */
    unsigned short  vc_id;              /* Memory marker */
    struct snsap    *vc_snsap;          /* Pointer to SNSAP table */
    struct snsap    *vc_rssap;          /* Pointer to RSNSAP table */ unsigned char   vc_olv;             /* User layer id */
    unsigned char   vc_oin;             /* User instance id */
    unsigned long   vc_ucxid;           /* User connection ID */
    unsigned short  vc_urcvc;           /* User receive credit - normal (# of data
                                         * indications we can give) */
    unsigned short  vc_xrcvc;           /* User receive credit - expedited */
    unsigned short  vc_usndc;           /* User send credit - normal */
    unsigned short  vc_xsndc;           /* User send credit - expedited */
    unsigned short  vc_ublks;           /* User blocks sent not yet released */ unsigned short  vc_lcgn;            /* Logical Channel Group number */
    unsigned short  vc_lcn;             /* Logical Channel Number */

/* Indicators: */
    unsigned        vc_wfcr:1;          /* Waiting for con resp gater */
    unsigned        vc_wfdr:1;          /* Waiting for disc resp gater */
    unsigned        vc_init:1;          /* VC initiator */
    unsigned        vc_pvc:1;           /* Permanent virtual circuit */ unsigned        vc_rip:1;           /* Reset in progress */
    unsigned        vc_cip:1;           /* Connect in progress (PVC) */
    unsigned        vc_dip:1;           /* Disconnect in progress (PVC) */
    unsigned        vc_ednf:1;          /* send exp neg fac in call accept */ unsigned        vc_fsux:1;          /* Fast select sent - unrestricted */
    unsigned        vc_fsrx:1;          /* Fast select sent - restricted */
    unsigned        active_vc:1;        /* VCCB is active */
    unsigned        listen:1;           /* VCCB is in listen state */ unsigned        ctr_wt_ok:1;        /* x25_ctr_wait() is ok for this VCCB */
    unsigned        in_ctr_wt:1;        /* counter is in ctr_wait_array */
```

C216

```
    unsigned            pkt_waiting:1;      /* a packet is waiting on the board -
                                             * we nedd a VC RECEIVE */
    unsigned            vc_rfux:1;          /* rfu */
    /* end of indicators */ unsigned char       vc_type[4];         /* VC type (DSAC) */
    unsigned char       vc_cgna[9];         /* BCD Calling network address (X.121) */
    unsigned char       vc_cgne[9];         /* BCD Calling network addr ext (X.121) */
    unsigned char       vc_cdna[9];         /* BCD Called network address (X.121) */
    unsigned char       vc_cdne[9];         /* BCD Called network addr ext (X.121) */
    unsigned char       vc_cdnx[9];         /* Called network address (original) */
    char                *vc_cdsa;           /* ASCII called network address */
    char                *vc_cgsa;           /* ASCII calling network address */ unsigned short      vc_cause;           /* Cause (clear, reset) */
    unsigned short      vc_diag;            /* Diagnostic code (clear, reset) */
    unsigned short      vc_ursn;            /* Reason code (opn-fail, close, err) */ unsigned short      vc_pdux;            /* negotiated xmit packet size */
    unsigned short      vc_pdur;            /* negotiated recv packet size */
    unsigned short      vc_wndx;            /* negotiated xmit window size */
    unsigned short      vc_wndr;            /* negotiated recv window size */
    unsigned short      vc_thrx;            /* negotiated xmit thruput class */
    unsigned short      vc_thrr;            /* negotiated recv thruput class */
    unsigned short      vc_drsn;            /* disconnect reason (gater) */ unsigned short      vc_rng1;            /* # unsent octets - 1st data area */
    unsigned short      vc_ofs1;            /* offset to data - 1st data area */
    unsigned short      vc_rng2;            /* # unsent octets - 2nd data area */
    unsigned short      vc_ofs2;            /* offset to data - 2nd data area */

/* virtual circuit statistics: */
    long                vc_epd;             /* Data packets sent */
    unsigned short      vc_eed;             /* Expeditd (interrupt) packets sent */
    long                vc_epc;             /* Control Packets sent */
    long                vc_eda;             /* Data octets sent in data packets */
    long                vc_esd;             /* Packet sequences sent */
    unsigned short      vc_esg;             /* accounting units sent (if suprt) */
    unsigned short      vc_ers;             /* number resets sent */ long                vc_rpd;             /* Data packets rcvd */
    long                vc_rpc;             /* Control Packets rcvd */
    long                vc_rda;             /* Data octets rcvd in data packets */
    long                vc_rsd;             /* Packet sequences rcvd */
    unsigned short      vc_rsg;             /* accounting units rcvd (if suprt) */
    unsigned short      vc_rrs;             /* number resets received */
    /* end of statistics */ unsigned short      vc_state;           /* protocol (CCITT) state */
    unsigned short      vc_intx;            /* Interrupt substate (xmit) */
    unsigned short      vc_intr;            /* Interrupt substate (recv) */
    unsigned short      vc_flox;            /* Flow control substate (xmit) */
    unsigned short      vc_flor;            /* Flow control substate (recv) */
    unsigned short      vc_in_ac;           /* init_or_accept (DSAC) */
    unsigned short      vc_ndxid;           /* VC index id (DSAC) */
    unsigned short      vc_dsac;            /* DSAC state */ char                *vc_udf;            /* udf ptr (work location) */ struct vc_icf
    {                                       /* Facilities - Incoming Call */
        unsigned        vc_pszic:1;         /* packet size */
        unsigned        vc_wszic:1;         /* window size */
        unsigned        vc_thrui:1;         /* throughput class */
        unsigned        vc_cugbi:1;         /* closed user group (basic) */
        unsigned        vc_cugei:1;         /* closed user group (extended) */
        unsigned        vc_cgobi:1;         /* cug with outgoing access (basic) */
        unsigned        vc_cgoei:1;         /* cug with outgoing access
                                             * (extended) */
        unsigned        vc_bcugi:1;         /* bilateral closed user group */ unsigned        vc_fslri:1;         /* fast select - restricted response */
        unsigned        vc_fslui:1;         /* fast select - unrestricted
                                             * response */
        unsigned        vc_rvchi:1;         /* reverse charging */
        unsigned        vc_crdni:1;         /* call redirection notification */
        unsigned        vc_tdeli:1;         /* transit delay indication */
```

C217

```
          unsigned        vc_cgaei:1;    /* calling address extension */
          unsigned        vc_cdaei:1;    /* called address extension */
          unsigned        vc_edngi:1;    /* expedited data negotiation */
     }                    vc_icf;

unsigned short  vc_pszx;      /* xmit packet size (power of 2) */
     unsigned short  vc_pszr;      /* recv packet size (power of 2) */ pid_t           clear_pid;    /* child pid for VC clear */
     ulong           vc_gtid;      /* VC Gater ID (for GATER->gt_sce) */

/* fields related to the X.25 API: */
     int             counter;      /* X.25 counter assigned to this
                                    * connection */
     int             conn_id;      /* X.25 connection ID */
     int             index;        /* index in ctr_array for this connection */

/* cb_call & cb_clear structs are malloc'ed as needed.  &cb_msg is
      * passed to x25_receive(), and memory from substructs is free'd after
      * message has been processed. */
     struct cb_call_struct *cb_call;/* for call & call accept */
     struct cb_clear_struct *cb_clear;  /* for clear */
     struct cb_data_struct cb_data; /* for data */
     struct cb_int_struct cb_int;   /* for interrupt (expedited data) */
     struct cb_res_struct cb_res;   /* for reset & reset confirm */
     struct cb_msg_struct cb_msg;   /* for incoming packets */

};                                  /* struct vccb */
```

C218

```c
/*
 *
 *
 *
 *
 *
 *
 *
 *
 * Name:       hvx_gater.h
 * Purpose:    Gate Manager Request Template.
 *             This is the HVX version of the HVX GATER template.
 * Input:
 * Output:
 *
 */

/*      Gate Manager Request Template   */ struct GATER
{

WORD              gt_pri;         /* Priority of request */
#define gt_rdy 0x8000                 /* defer=0..0x7FFF, ready=0x8000..0xFFFF */
ADDR                  gt_nxt[2];      /* Link to next frame */
unsigned char         gt_mkr[4];      /* 'GT01' memory marker */

/*      Source / Destination Gate Identifiers   */ unsigned char         gt_slr;         /* source layer or 0 */
unsigned char         gt_sin;         /* source instance or gate number */ unsigned char         gt_dlr;         /* destination layer or 0 */
unsigned char         gt_din;         /* destination instance or gate number */

/*      Layers   */ define gt_gtr  0                     /* Gate Trace */
define gt_phy  1                     /* Physical */
#define gt_lnc  2                     /* Link */
#define gt_nwc  3                     /* Network */
#define gt_trc  4                     /* Transport */
#define gt_sc   5                     /* Session */
#define gt_pc   6                     /* Presentation */
#define gt_apl  7                     /* Application */
#define gt_smg  9                     /* System Management */
#define gt_mhs  40                    /* Message Handling System X.400 */

/*      Layer Instances */ define gt_dfl  0                     /* Default */
define gt_iso  1                     /* ISO */
#define gt_dsa  2                     /* DSA */
#define gt_lac  3                     /* LACS */
#define gt_hdi  4                     /* HDLI to CDS TIM (token bus) */
#define gt_x25  5                     /* X.25 */
#define gt_cs1  6                     /* CS/1 CSMA/CD */
#define gt_dts  7                     /* DTS */
#define gt_tst  8                     /* Test tools (echo, TSI) */
#define gt_lmg  9                     /* Layer Management */
#define gt_nad  10                    /* Node Administration */
#define gt_bul  11                    /* Bull (TPI, SNM) */
#define gt_ntd  12                    /* Network Terminal Driver */
#define gt_tim  13                    /* Terminal Interface Manager */
#define gt_xcm  14                    /* Extended Connection Manager */
#define gt_xcc  15                    /* X.25 Cascader */
#define gt_eft  16                    /* EFTPOS */
#define gt_ash  17                    /* EFTPOS - Asynch HDLC Agent */
#define gt_tpa  18                    /* X.29 async T-PAD (HSO) */
#define gt_dsp  19                    /* 3270 display system protocol host PAD */
#define gt_bas  20                    /* Basic physical line handler */
#define gt_nrm  21                    /* Normal Response Mode (NRM) */
#define gt_x21  22                    /* X.21 physical line handler */
#define gt_xio  23                    /* X.25 IO */
#define gt_snm  24                    /* Secondary Network Manager */
#define gt_vcl  25                    /* Virtual Circuit Loop */
```

C219

```
#define gt_elc   26              /* ELANC (Bull LAN) */
#define gt_swt   27              /* DSA/ISO Session Switcher X.29 (Bull) */
#define gt_plm   28              /* Physical Layer LME (HDLC) */
#define gt_pll   29              /* Physical Line Loop Test (PL_LOOP) */
#define gt_nth   30              /* NTD X.25 provider HPAD */
#define gt_nty   31              /* NTD Y.13 HPAD */
#define gt_nts   32              /* NTD spare */
#define gt_ap6   33              /* AP6 - DSA on PC/6PAK */
#define gt_dds   34              /* DDS - Distributed Directory Services */
#define gt_qll   35              /* QLLC - (SNA) Qualified Logical Link
                                  * Control */
#define gt_lam   36              /* LAN LME */
#define gt_eam   37              /* EFTPOS Administration */
#define gt_ecf   38              /* EFTPOS Configuration */
#define gt_slp   39              /* ISOS Loopback */

/*      Message Handling System (MHS) Instances */ define gt4rts   1               /* Reliable Transfer service */
define gt4mta   2               /* Message Transfer Agent */
#define gt4ua    3               /* User Agent */
#define gt4gw    4               /* ONEmail Gateway */
#define gt4dua   10              /* Directory User Agent */
#define gt4dsa   11              /* Directory Service Agent */

/*      Function Code    */

WORD            gt_fnc;          /* function code (L) = local interface */ define gtfnul   0               /* Undefined request */
define gtfcrq   1               /* Connect request */
#define gtfcrp   2               /* Connect response */
#define gtfdrq   3               /* Disconnect request */
#define gtfdtr   4               /* Data request */
#define gtfdar   5               /* Data acknowledge request */
#define gtfthr   6               /* Throttle receive */
#define gtfokr   7               /* OK to receive  (L) */
#define gtfexr   8               /* Expedited data request */
#define gtfrrq   9               /* Reset request */
#define gtfrrp   10              /* Reset response */
#define gtfccf   11              /* Connect confirm */
#define gtfcin   12              /* Connect indication */
#define gtfdin   13              /* Disconnect indication */
#define gtfdti   14              /* Data indication */
#define gtfdai   15              /* Data ACK ind, release SDU(L) */
#define gtfths   16              /* Throttle send */
#define gtfoks   17              /* OK to send(L) */
#define gtfexi   18              /* Expedited data indication */
#define gtfrcf   19              /* Reset confirm */
#define gtfrin   20              /* Reset indication */
#define gtfdrp   21              /* Disconnect response (L) */
#define gtfdcf   22              /* Disconnect Confirm  (L) */
#define gtfwkp   23              /* Timer wake up (L) */
#define gtfaum   24              /* Admin unsolicited message */
#define gtfacm   25              /* Admin command */
#define gtfarm   26              /* Admin response, more to follow */
#define gtfari   27              /* Admin response, item */
#define gtfarf   28              /* Admin response, final item */
#define gtfinf   29              /* Information */
#define gtfaer   30              /* Admin error response */
#define gtflur   31              /* LME update request */
#define gtfluc   32              /* LME update confirm */
#define gtfinq   33              /* Information request */
#define gtfinr   34              /* Information response */

/*      LACS function codes      */ define gtfrtd   112             /* Release TSDU request (should use
                                  * gtfdai) */
#define gtfdrc   113             /* Deactivate remote SAP confirm */
#define gtfdlc   114             /* Deactivate local SAP confirm */
#define gtfarc   115             /* Activate remote SAP confirm */
#define gtfalc   116             /* Activate local SAP confirm */
#define gtfdrr   117             /* Deactivate remote SAP request */
#define gtfdlr   118             /* Deactivate local SAP request */
#define gtfarr   119             /* Activate remote SAP request */
#define gtfalr   120             /* Activate local SAP request */
```

C220

```
#define gtfoka   124              /* OK to re-activate local SAP indication */
#define gtfprs   139              /* Path response (Switcher interface) */
#define gtfprq   142              /* Path request */
#define gtfprn   143              /* Path response (NTD interface) */

WORD            gt_len;           /* Nbr octets in (gt_dta) */

ADDR            gt_sce[2];        /* Identifier of the request source */
ADDR            gt_dst[2];        /* Identifier of the request destination */

ADDR            gt_dta[2];        /* Pointer to data */

/*      Disconnect Indication Reason Codes / Byte Displacement in (gt_dta) */

WORD            gt_dis;           /* Disconnect reason code */ define gtdnrm   0                /* Normal remotely requested disconnect */
define gtdcng   1                /* Congestion */
#define gtdngt   2                /* Connection negotiation failed */
#define gtdadr   3                /* Invalid TSAP/NSAP address */
#define gtdmmr   4                /* Mismatched references */
#define gtdptl   5                /* Protocol error */
#define gtdrof   7                /* Reference (Plug table) overflow */
#define gtdnrf   8                /* Connection refused by network */
#define gtdure   11               /* Unrecoverable network error */
#define gtdsze   12               /* Size error */
#define gtdmsu   13               /* Misuse, invalid param or function
                                   * sequence */
#define gtddup   14               /* Duplicate connection requested */
#define gtdtim   15               /* Connection time-out occurred */
#define gtdppe   16               /* Point-to-point already established */
#define gtduic   17               /* Unsupported request value */
#define gtdobj   18               /* Unsupported object class */
#define gtdupa   19               /* Unsupported parameters */
#define gtdunk   20               /* Unknown address */
#define gtduna   21               /* Unable to get the requested node */
#define gtdlok   22               /* Connection object administratively
                                   * locked */ unsigned char   gt_crn;           /* Credit for normal data */
unsigned char   gt_cre;           /* Credit for expedited data */

WORD            gt_flg;           /* Gate manager flags word */ define gt_dfr 0x8000             /* Deferred request */
define gt_cnc 0x4000             /* Cancelled deferred request */
#define gt_cyc 0x2000             /* Cyclic request */
#define gt_rls 0x1000             /* Release this gater (CL or DF) */
#define gt_rfu 0x0ff0             /* RFU */
#define gt_chk 0x0008             /* Checksumming in use */
#define gt_ext 0x0004             /* Extended formats */
#define gt_exp 0x0002             /* Expedited allowed */
#define gt_qdx 0x0001             /* Non-abortive DNX */

WORD            gt_vln;           /* Variable part length (0..120 octets) */

/*      Variable Portion of Gate Request        */

/* Zero or more parameters follow, each has the format: */

/* bin(8) - parameter code */
/* bin(8) - parameter length = 0..       */
/* char[length] - parameter value        */ unsigned char   gt_var[140];      /* variable length string, max=120, 20
                                   * spare */
#define gt_vmx  128               /* Variable part maximum byte count */

};                                /* struct    gater */ define gt_fln  38                /* Fixed part byte count, total=fln+(vln) */

/*Parameter codes and <lengths> for the variable part of the gater */ define gpconn  0x01              /* <0> Connection-mode OK */
define gpxcon  0x02              /* <0> Connectionless mode OK */
```

C221

```
#define gpipdu    0x03         /* <2>  Ideal PDU size (in octets) */
#define gpcptp    0x04         /* <0>  This is a point-to-point
                                *       connection */
#define gpcdcd    0x05         /* <1>  DR/ER reason code from TPDU */
#define gpcthp    0x06         /* <3>  Throughput (octets/sec) */
#define gpcdly    0x07         /* <2>  Transit Delay (milliseconds) */
#define gpccst    0x08         /* <1>  Relative Cost of NC */
#define gpctyp    0x09         /* <1>  Network type (A, B, C) */
#define gpcbkp    0x0A         /* <0>  Backup path indicator */
#define gpcori    0x0B         /* <1>  Originator code */
#define gpcndx    0x0C         /* <2>  Connection index id */
#define gpcpos    0x0D         /* <*>  Positive Confirm */
define gpxneg    0x0E         /* <*>  Negative Confirm */ define gpcpri    0x87         /* <2>  QOS priority */ define gpcacm    0xA0         /* <?>  Access Method */
define gpccta    0xA1         /* <?>  Controller Address */
#define gpcgun    0xA2         /* <?>  Group User Name */
#define gpclnb    0xA3         /* <?>  Layer Number */
#define gpclid    0xA4         /* <?>  LAN Id */
#define gpclpa    0xA5         /* <?>  Local Physical Address */
#define gpcmxc    0xA6         /* <?>  Maximum # Of Connections */
define gpcrms    0xA7         /* <?>  Remote System Name */ define gpmsdu    0xC0         /* <2>  Maximum SDU size (in octets) */ define gpccla    0xC1         /* <*>  Calling SAP */
define gpcrpa    0xC1         /* <*>  Responding address */
define gpccda    0xC2         /* <*>  Called SAP */ define gpcsec    0xC5         /* <*>  Security */ define gpcmcr    0xC8         /* <2>  Minimum credit */
define gpcnwc    0xC9         /* <2>  NWC number */
define gpcrts    0xCA         /* <8>  RTS name */ define gpchbi    0xD0         /* <?>  Interval before NAU issues
                                *       heartbeat */
#define gpcrto    0xD1         /* <?>  Time-out value if no receive from
                                *       CSU */
#define gpcscr    0xD2         /* <?>  Send Credit for CSU Agent */
#define gpcccr    0xD3         /* <?>  Credit for CSU Controller */
#define gpcssu    0xD4         /* <*>  SAP up */
#define gpcssd    0xD5         /* <*>  SAP down */
#define gpceca    0xD6         /* <*>  Bad PHB from CSU Agent */
#define gpc3cs    0xD7         /* <0>  Gater from Relay to CSU */
#define gpc3sg    0xD8         /* <2>  EFTPOS pass-thru I/P segment */
#define gpc3nz    0xD9         /* <0>  EFTPOS New Zealand protocol
                                *       indicator */ define gpcrsn    0xE0         /* <*>  Clearing reason parameter from PDU */
define gpcobs    0xE1         /* <*>  DSAC object state */
#define gpcobn    0xE2         /* <*>  DSAC object name */
#define gpcdss    0xE3         /* <*>  Data set status (PL_LOOP) */
#define gpclaa    0xE4         /* <0>  Loop at adapter (PL_LOOP) */
#define gpctcn    0xE5         /* <*>  Terminate upper layer connection */
#define gpcidl    0xE6         /* <*>  Connection idle */
#define gpccas    0xE7         /* <0>  Cascader - XCM indicator */
#define gpcacu    0xE8         /* <0>  Autocall connection */
#define gpcpsn    0xE9         /* <*>  DSA Address - PSN */
#define gpcare    0xEA         /* <*>  DSA Address - AREA */
#define gpctsn    0xEB         /* <*>  DSA Address - TSN */
#define gpclam    0xEC         /* <0>  Loop at local modem (PL_LOOP) */
#define gpclar    0xED         /* <0>  Loop at remote modem (PL_LOOP) */

/* LACS Parameter Codes */ define gpllla    0xF0         /* <2>  Logical local SAP */
define gplrad    0xF1         /* <2>  Responding address */
#define gplrdr    0xF2         /* <1>  Request dynamic remotes */
#define gplrss    0xF3         /* <8>  Remote SAP symbol name */
#define gpllra    0xF4         /* <2>  Logical remote SAP */
#define gplrsi    0xF5         /* <1>  Remote SAP indicators */
#define gplmxs    0xF6         /* <2>  Maximum SDU size */
#define gplpig    0xF8         /* <1>  Piggyback ACK option */
#define gpllsn    0xF9         /* <*>  Local SAP name */
```

C222

```c
#define gplrsa   0xFA              /* <*> Remote SAP address */

/* X.25 Facilities and Options */ define x25rcr   0x10              /* Reverse charging request */
define x25fsu   0x11              /* Fast select - unrestricted response */
#define x25fsr   0x12              /* Fast select - restricted response */
#define x25thr   0x13              /* Throughput class */
#define x25dly   0x14              /* Transit delay */
#define x25rpa   0x15              /* RPOA selection */
#define x25psz   0x16              /* Packet size */
#define x25wsz   0x17              /* Window size */
#define x25cug   0x18              /* Closed user group selection */
#define x25cuo   0x19              /* CUG with outgoing access selection */
#define x25bcg   0x1A              /* Bilateral closed user group selection */
#define x25cir   0x1B              /* Charging information request */
#define x25nci   0x1C              /* No charging information request */
#define x25cge   0x1D              /* Calling address extension (X.121) */
#define x25cde   0x1E              /* Called address extension (X.121) */
#define x25exd   0x1F              /* Expedited data allowed */
#define x25nxd   0x20              /* No expedited data allowed */
#define x25qbt   0x21              /* X.29 qualified data */
#define x25cga   0x22              /* Calling X.121 address */
#define x25cda   0x23              /* Called X.121 address */
#define x25lcn   0x24              /* Logical channel number (PVC) */
#define x25xcf   0x25              /* Cause (clear, reset) */
#define x25xdf   0x26              /* Diagnostic code (clear, reset) */
#define x25sni   0x27              /* SNSAP information request */
#define x25vci   0x28              /* VC information request */
#define x25ntw   0x29              /* Network type */
#define x25epd   0x2A              /* # of data packets sent */
#define x25ern   0x2B              /* # of RNR packets sent */
#define x25erj   0x2C              /* # of REJ packets sent */
#define x25rpd   0x2D              /* # of data packets received */
#define x25rrn   0x2E              /* # of RNR packets received */
#define x25rrj   0x2F              /* # of REJ packets received */
#define x25cgn   0x30              /* Calling address extension (NSAP) */
#define x25cdn   0x31              /* Called address extension (NSAP) */
#define x25cgf   0x32              /* Calling PDN facilities */
#define x25cdf   0x33              /* Called PDN facilities */

/*       X25IO options        */

/*       40 - 48 Reserved for X25IO        */

/*       Request Type Priorities */ define gprabt   0x0               /* Abort DNX */
define gprexp   0x4               /* Expedited Data Request */
#define gprnrm   0x8               /* Normal */

/*       Gate Manager Function Return Status Codes         */

/*              BDxx series in system message library       */ define  gs_err  0xBD00            /* Add to status when using message
                                    * library */ define gs_ok    0                 /* Gate Manager, DSA4.1, 88-08-24 */
define gs_sgt   1                 /* Source gate not found */
#define gs_dgt   2                 /* Destination gate not found */
#define gs_gti   3                 /* Get buffer failed */
#define gs_nla   4                 /* Gate descriptor is null */
#define gs_nul   5                 /* Gate directory address is null */
#define gs_mem   6                 /* Get buffer for gate failed */
#define gs_dup   7                 /* Gate descriptor layer,instance
                                    * duplicate */
#define gs_ful   8                 /* Gate directory is full */
#define gs_nbr   9                 /* Gate number is invalid */
#define gs_trb   10                /* Normal wake up TRB not preceded by gate */
#define gs_dqa   11                /* Gater for deferred TRB/CRB not on queue */
#define gs_unk   12                /* Unknown TRB woke up gate manager */
#define gs_rbn   13                /* Gater block not valid */
#define gs_rbf   14                /* Gater buffer return failed */
#define gs_clk   15                /* Clock request failed */
#define gs_rti   16                /* Return buffer failed */
#define gs_mkr   17                /* Data structure marker not recognized */
```

C223

```
#define gs_mtq  18          /* Empty gater queue */
#define gs_bsy  19          /* Busy gate: non-empty gater queue */
#define gs_gnf  20          /* Gate not found */
#define gs_vln  21          /* Invalid gt_vln */
#define gs_wkv  22          /* Invalid ga_wkv (unknown LRN) */
```

C224

```
/*
 *  Name:       hvx_lme.h
 *  Purpose:    CONSTANTS AND PARAMETERS FOR OSI LAYER MANAGEMENT
 *              ENTITIES
 *              This is taken from the HVS file
 *  Input:
 *  Output:
 *
 */

/* ADMINISTRATIVE REQUEST FUNCTION CODES */ define gtfunc  100             /* Command Code(Administrative Request) or
                                 * Event Code(administrative Unsolicted
                                 * Message */ define gtnmbr  01              /* Number of objects command */
define gtlist  02              /* List objects command */
#define gtdatt  03              /* Display attributes of object command */
#define gthist  04              /* Get history of object command */
#define gtupdt  05              /* Update object command */
#define gtcret  7               /* Create or Open object command */
#define gtdelt  8               /* Delete or Close object command */
#define gtattr  12              /* Get attributes of object command */

/* Class Specific Codes */ define gttext  50              /* Text command */
define gtrlod  51              /* Reload (system) command */
#define gtswap  51              /* Swap object command */
#define gtload  52              /* Load object command */
#define gtdump  53              /* Dump object command */
#define gttsto  55              /* Test object command */
#define gttrce  56              /* Trace object command */

/* INFORMATION REQUEST FUNCTION CODES --CLASS SPECIFIC */

/* PL Codes */ define gpllrn  01              /* get LRN */

/* UNSOLICITED EVENT CODES */

/* gthist was already defined above
#define gthist 04 History event report */
#define gtopen  07              /* Open event report */
#define gtclos  8               /* Close event report */
#define gterrr  14              /* Error event report */
#define gtopnf  17              /* Open failure */

/* Class Specific Codes */
#define gtgump  70              /* General ump for EFTPOS */
#define gtbidm  71              /* Binary_dump (controller) */
#define gtasdm  72              /* Ascii_dump (controller) */
#define gttrdm  73              /* Trace_dump (channel) */

/* OBJECT CLASS CODES */ define gtobjc  101             /* Object Class */
define gtclpl  04              /* Physical Line class */
#define gtclll  05              /* Logical Line class */
#define gtclns  06              /* Network Subscription class */
#define gtclnr  07              /* Network Route class */
#define gtclvc  8               /* Virtual Circuit class */
#define gtclts  9               /* Transport Station class */
#define gtclmb  10              /* Mailbox class */
#define gtclss  11              /* Session class */
#define gtcllc  12              /* Logical Connection class */
#define gtclct  13              /* Communications Controller class */
#define gtcltc  21              /* Transport Connection class */
#define gtclmo  22              /* Mailbox Owner class */
#define gtclnc  23              /* Network Connection class */
#define gtcllk  28              /* Link Connection class */
#define gtclpc  29              /* Physical Connection class */
#define gtclsc  30              /* Session Control class */
#define gtclmu  38              /* Mailbox User class */
/* Eftpos Classes */
#define gtclxx  210             /* LRX relay application */
```

1

C225

```
#define gtclxa 211              /* CSU */
#define gtclxc 212              /* CSU controller */
#define gtclxl 213              /* CSU channel */
#define gtclxb 214              /* CSU port */
#define gtclxg 215              /* Control Module */
#define gtclxz 216              /* CSU Station */
#define gtclxt 217              /* CSU terminal */
#define gtclxm 218              /* CSU merchant */
#define gtclxf 219              /* CSU F.I. */
#define gtclxr 220              /* CSU F.I.route */
#define gtclxu 221              /* CIU */
#define gtclxp 222              /* CSU POS-FME */
#define gtclxq 223              /* Merchant range table */
#define gtclxh 224              /* Asynchronous Application */
#define gtclxn 225              /* Merchant group */
#define gtclxk 226              /* LRX backup channel */

/* SELECTION PARAMETER CODES */ define gtosia 86               /* OSI Address */
/* Values 0 and 1 reserved for use of BU znanso */
#define gtnam1 02               /* Name1 parameter code */
#define gtnam2 03               /* Name2 parameter code */
#define gtstat 04               /* State parameter code */
#define gttype 05               /* Type parameter code */
#define gtmp1c 06               /* Mapping 1 class parameter code */
#define gtmp1n 07               /* Mapping 1 name parameter code */
#define gtmp2c 8                /* Mapping 2 class parameter code */
#define gtmp2n 9                /* Mapping 2 name parameter code */
#define gtvenu 10               /* Venue parameter code */

/* Added for Eftpos (start) */
#define gtmp3c 12               /* mapping 3 class parameter code */
#define gtmp3n 13               /* mapping 3 name parameter code */
#define gtmp4c 14               /* mapping 4 class parameter code */
#define gtmp4n 15               /* mapping 4 name parameter code */
#define gtmp5c 16               /* mapping 5 class parameter code */
#define gtmp5n 17               /* mapping 5 name parameter code */
#define gtmp6c 18               /* mapping 6 class parameter code */
#define gtmp6n 19               /* mapping 6 name parameter code */
#define gttstn 31               /* test name parameter code */
#define gtdvid 32               /* device id parameter code */
#define gtblct 33               /* block count parameter code */
#define gtbisz 34               /* block size parameter code */
#define gtsp09 35               /* selection parameter 9 */
/* Added for Eftpos (end) */

/* MODIFICATION PARAMETER CODES */ define gtupdp 11               /* Update state (DSAC) */
/* Values 20 and 21 reserved for use of BU Znanso */

/* Eftpos Codes (start) */
#define gtmod1 22               /* Modification param 1 */
#define gtmod2 23               /* Modification param 2 */
#define gtmod3 24               /* Modification param 3 */
#define gtmod4 25               /* Modification param 4 */
#define gtmod5 26               /* Modification param 5 */
#define gtmod6 27               /* Modification param 6 */
#define gtmod7 28               /* Modification param 7 */
#define gtmod8 29               /* Modification param 8 */
#define gtmod9 30               /* Modification param 9 */
/* Eftpos Codes (end) */

/* STATE CODES (DSAC) */ define gtdown 0x0200           /* DOWN */
define gtlock 0x0300           /* LOCKED */
#define gtdsbl 0x0400           /* DISABLED */
#define gtenbl 0x0600           /* ENABLED */
#define gtused 0x0700           /* USED */
#define gttest 0x0800           /* TEST */
#define gtshut 0x0900           /* SHUTDOWN */

/* RESPONSE PARAMETER CODES */ define gtrsp1 0                /* First response parameter */
```

C226

```
#define gtrsp2  1        /* Second response parameter */
#define gtrsp3  2        /* Third response parameter */
#define gtrsp4  3        /* Fourth response parameter */
#define gtrsp5  4        /* Fifth response parameter */
#define gtrsp6  5        /* Sixth response parameter */
#define gtrsp7  6        /* Seventh response parameter */
#define gtrsp8  7        /* Eighth response parameter */
#define gtrsp9  8        /* Ninth response parameter */
#define gtrs10  9        /* Tenth response parameter */
#define gtrs11  10       /* Eleventh response parameter */
#define gtrs12  11       /* Twelvth response parmaeter */
#define gtrs13  12       /* Thirteenth response parameter */
#define gtrs14  13       /* Fourteenth response parameter */
#define gtrs15  14       /* Fifteenth response parameter */
#define gtrs16  15       /* Sixteenth response parameter */
#define gtrs17  16       /* 17th response parameter */
#define gtrs18  17       /* 18th response parameter */
#define gtrs19  18       /* 19th response parameter */
#define gtrs20  19       /* 20th response parameter */
#define gtrs21  20       /* 21st response parameter */
#define gtrs22  21       /* 22nd response parameter */
#define gtrs23  22       /* 23rd response parameter */
#define gtrs24  23       /* 24th response parameter */
#define gtrs25  24       /* 25th response parameter */
#define gtrs26  25       /* 26th response parameter */
#define gtrs27  26       /* 27th response parameter */
#define gtrs28  27       /* 28th response parameter */
#define gtrs29  28       /* 29th response parameter */
#define gtrs30  29       /* 30th response parameter */
#define gtrs31  30       /* 31th response parameter */
#define gtrs32  31       /* 32th response parameter */
#define gtrs33  32       /* 33th response parameter */
#define gtrs34  33       /* 34th response parameter */
#define gtrs35  34       /* 35th response parameter */
#define gtrs36  35       /* 36th response parameter */
#define gtrs37  36       /* 37th response parameter */
#define gtrs38  37       /* 38th response parameter */
#define gtrs39  38       /* 39th response parameter */
#define gtrs40  39       /* 40th response parameter */
#define gtrs41  40       /* 41th response parameter */
#define gtrs42  41       /* 42th response parameter */
#define gtrs43  42       /* 43th response parameter */
#define gtrs44  43       /* 44th response parameter */
#define gtrs45  44       /* 45th response parameter */
#define gtrs46  45       /* 46th response parameter */
#define gtrs47  46       /* 47th response parameter */
#define gtrs48  47       /* 48th response parameter */
#define gtrs49  48       /* 49th response parameter */
#define gtrs50  49       /* 50th response parameter */
#define gtrs51  50       /* 51th response parameter */
#define gtrs52  51       /* 52th response parameter */
#define gtrs53  52       /* 53th response parameter */
#define gtrs54  53       /* 54th response parameter */
#define gtrs55  54       /* 55th response parameter */
#define gtrs56  55       /* 56th response parameter */
#define gtrs57  56       /* 57th response parameter */
#define gtrs58  57       /* 58th response parameter */
#define gtrs59  58       /* 59th response parameter */
#define gtrs60  59       /* 60th response parameter */
#define gtrs61  60       /* 61th response parameter */
#define gtrs62  61       /* 62th response parameter */
#define gtrs63  62       /* 63th response parameter */
#define gtrs64  63       /* 64th response parameter */
#define gtrs65  64       /* 65th response parameter */
#define gtrs66  65       /* 66th response parameter */
#define gtrs67  66       /* 67th response parameter */
#define gtrs68  67       /* 68th response parameter */
#define gtrs69  68       /* 69th response parameter */
#define gtrs70  69       /* 70th response parameter */
#define gtrs71  70       /* 71th response parameter */
#define gtrs72  71       /* 72th response parameter */
#define gtrs73  72       /* 73th response parameter */
#define gtrs74  73       /* 74th response parameter */
#define gtrs75  74       /* 75th response parameter */
#define gtrs76  75       /* 76th response parameter */
#define gtrs77  76       /* 77th response parameter */
#define gtrs78  77       /* 78th response parameter */
```

C227

```
#define gtrs79 78              /* 79th response parameter */
#define gtrs80 79              /* 80th response parameter */
/* FOR EFTPOS -- MULTI ITEM GATERS */
#define gtritm 102             /* parameter is complete item */
```

C228

```
/*
 *  Name:      hvx_phd.h
 *  Purpose:   Packet Header Block for ISO/DSA
 *             Taken from HVS file
 *
 *             The packet header block is passed between
 *             ISO/DSA layers.
 *
 *             When sending, each layer prefixes the existing
 *             header with its info. When receiving, each layer
 *             consumes its protocol info and advances the current
 *             character position and decrements the character count.
 *
 *             Packet headers are queued on the first field and have
 *             two data area pointers: one for the header info being
 *             built/consumed in this buffer and one for the text
 *             stored in another buffer (inbound only).
 *
 *             Packet headers also hold layer specific fields which
 *             are preserved when ownership of the buffer is passed
 *             to other layers.
 *
 *             PNetX has a pool of PHB buffers maintained by PNet.
 *             One or more PHBs are built from this pool when data
 *             is received on an X.25 connection.
 *
 *  Input:
 *  Output:
 *
 */

/* Common Structure Prefix */ struct PHD
{
    WORD            ph_pri;         /* Priority when queued */
    ADDR            ph_lnk[2];      /* Next phd in chain */

WORD            ph_mkr[2];      /* PHD structure ident - "PH04" */

WORD            ph_sst;         /* Common structure status word (OFFSET?) */
#define ph_fil 0x8000               /* Filler (over sign bit) */
#define ph_act 0x4000               /* Data structure active */
#define ph_hld 0x2000               /* Save structure on error cache */
#define ph_nts 0x1000               /* Packet could not be sent */
#define ph_ssf 0x0fff               /* RFU for word alignment */

DWORD           ph_tob[2];      /* Time-of-birth/death from YNATIM */
    WORD            ph_erp;         /* Saved ph_pri (when on error cache) */
    ADDR            ph_erq[2];      /* Saved ph_lnk (when on error cache) */
    WORD            ph_err;         /* Reason code (why on error cache) */

WORD            ph_stw;         /* Status word */
#define ph_rtm 0x8000               /* Returns PHD to buffer manager when done */
#define ph_sol 0x4000               /* Start-of-SDU */
#define ph_eol 0x2000               /* End-of-SDU */
#define ph_rap 0x1000               /* Remote areas present */
#define ph_str 0x0fff               /* RFU for word alignment */

ADDR            ph_bqc[2];      /* Buffer Queue Array Control Block */
    WORD            ph_rf0[2];      /* RFU */

/* Dynamic Area Allocation Fields */

ADDR            ph_ap2[2];      /* Link area pointer */
    ADDR            ph_ap3[2];      /* Network area pointer */
    ADDR            ph_ap4[2];      /* Transport area pointer */
    ADDR            ph_ap5[2];      /* Session area pointer */
    ADDR            ph_apt[2];      /* NTD area pointer */
    ADDR            ph_apx[2];      /* X.25 area pointer */
    ADDR            ph_ape[2];      /* ELANC Converter area pointer */
    ADDR            ph_ap1[2];      /* X.21 area pointer */
    ADDR            ph_apc[2];      /* ELC area pointer */
    ADDR            ph_apu[2];      /* PDU area pointer */
    ADDR            ph_apy[2];      /* RFU area pointer */
    ADDR            ph_apz[2];      /* RFU area pointer */
```

1

C229

```c
    ADDR            ph_apr[2];      /* RFU area pointer */
    ADDR            ph_apf[2];      /* RFU area pointer */

/* Dynamic Area Allocation Control */

ADDR            ph_naw[2];      /* Next available word */
    WORD            ph_avc;         /* Available words count */

/* Common Expansion Area */

ADDR            ph_rf1[2];      /* RFU */
    ADDR            ph_rf2[2];      /* RFU */
    WORD            ph_rf3;         /* RFU */

WORD            phtype;         /* DOES NOT EXIST IN HVS */
#define ph_fll 0xfc00               /* Filler not used in this view */
#define ph_typ 0x0300               /* Packet type */
#define ph_inf 0x00                 /* Information packet */
#define ph_tst 0x01                 /* Test command packet */
#define ph_xcm 0x02                 /* XID command packet */
#define ph_xrs 0x03                 /* XID response packet */
#define ph_phr 0x00ff               /* RFU for word alignment */

/* Data Pointers */

ADDR            ph_cp1[2];      /* Char ptr, first data area */
    WORD            ph_cx1;         /* Char ptr index */
    WORD            ph_cn1;         /* Char count */

ADDR            ph_cp2[2];      /* Char ptr, second data area */
    WORD            ph_cx2;         /* Char ptr index */
    WORD            ph_cn2;         /* Char count */

/* Obsolete Data Pointers (remove when no longer referenced) */

ADDR            ph_ad1[2];      /* Start of first data area */
    WORD            ph_rg1;         /* Range of first data area */
#define ph_lr1 0x8000               /* Left (0) or Right (1) byte start */
#define ph_ct1 0x7fff               /* Nbr chars in data area */

ADDR            ph_ad2[2];      /* Start of second data area */
    WORD            ph_rg2;         /* Range of second data area */
#define ph_lr2 0x8000               /* Left (0) or Right (1) byte start */
#define ph_ct2 0x7fff               /* Nbr chars in data area */

/* Areas Used EXCLUSIVELY by Individual Layers */

/* SESSION */ unsigned char   ph_5mk[4];      /* "P501" */
    ADDR            ph_fpk[2];      /* First packet header in an SPDU */
    ADDR            ph_5pd[2];      /* Chain of packets making an SPDU */
    ADDR            ph_5rf[2];      /* RFU */

/* TRANSPORT */ unsigned char   ph_4mk[4];      /* "P401" */
    WORD            ph_4sn;         /* DT PDU sequence number */
    ADDR            ph_4qu[2];      /* Transport private queue link */
    ADDR            ph_4su[2];      /* Owning TSDU for this NSDU */
    ADDR            ph_4rf[2];      /* LCCB (layer 5 'ref' value) */
    DWORD           ph_4nb[2];      /* Number of TPDUs in TSDU */
    WORD            ph4flg;         /* DOES NOT EXIST IN HVS VERSION */ define ph_4nw 0x8000               /* Network owns PHD */
define ph_4sl 0x4000               /* Copy of ph_sol */
#define ph_4el 0x2000               /* Copy of ph_eol */
#define ph_4rs 0x1000               /* Release-SDU has been detected for PHD */
#define ph_4ak 0x0800               /* Peer AK for DT TPDU has been detected */
#define ph_4tx 0x0400               /* Retransmit upon release-SDU indication */
#define ph_4rl 0x0200               /* Release-SDU when all criteria met */
#define ph_4ck 0x0100               /* Checksum has already been calculated */
#define ph_4ru 0x00ff               /* RFU for word alignment */
    ADDR            ph_4sp[2];      /* RFU */

/* NTD - Network Terminal Driver */
```

C230

```
WORD            ph_qmk[2];          /* "PQ01" */
ADDR            ph_dcb[2];          /* Device Descriptor Control Block */

/* X.25 */

WORD            ph_xmk[2];          /* "PX01" */
ADDR            ph_xvc[2];          /* Virtual Circuit Control Block */
ADDR            ph_xq[2];           /* Next phd in send queue */
ADDR            ph_xup[2];          /* User's original phd */

WORD            ph_xst;             /* Status and flags word */
#define ph_xll 0x8000               /* Lower layer has phd */
#define ph_xmy 0x4000               /* phd created by X.25 */
#define ph_xrl 0x2000               /* Release PHD flag */
#define ph_xmr 0x1000               /* M-bit: More data */
#define ph_xql 0x0800               /* Q-bit: Qualifier bit for X.29 */
#define ph_rfx 0x0700               /* RFU */
#define ph_xcn 0x00ff               /* Nbr header octets added */

ADDR            ph_xrf[2];          /* RFU */

/* INTERNET */

WORD            ph_3mk[2];          /* "P301" */
ADDR            ph_3pt[2];          /* Layer 3 pointer */
WORD            ph_3ct;             /* Layer 3 counter */
WORD            ph_3id;             /* Data Unit id */
WORD            ph_3os;             /* Segment offset */
WORD            ph_3dl;             /* Segment data length */
#define ph_3ag ph_3dl                /* Packet's age increase */
WORD            ph_3tl;             /* Total length */
WORD            ph3flg;             /* DOES NOT EXIST IN HVS VERSION */ define ph_3l3 0x8000               /* Layer 3 owns phb */
define ph_3ih 0x4000               /* IP header in input phb */
#define ph_3sb 0x2000               /* Subordinate phb */
#define ph_3uc 0x1000               /* Update checksum */
#define ph_3er 0x0800               /* Error PDU sent */
#define ph_3mb 0x0400               /* M-Bit=0 has arrived */
#define ph_3db 0x0200               /* Doublet */
#define ph_3bf 0x0100               /* Buffer in 2nd pointer */
#define ph_3sg 0x0080               /* Segmented PDU for EFTPOS */
#define ph_3nz 0x0040               /* EFTPOS New Zaeland indicator */
#define ph_3ru 0x003f               /* RFU for word alignment */
ADDR            ph_3ph[2];          /* PHD chain */
ADDR            ph_3sn[2];          /* SNC over which data arrived */

/* DSA Transport/Nucleus */

WORD            ph_tmk[2];          /* "PT01" */
ADDR            ph_dlc[2];          /* Transport control block pointer */
ADDR            ph_qla[2];          /* Send TPDU queue chain */
ADDR            ph_lta[2];          /* Letter pointer */
WORD            ph_tmw;             /* T1 timer */
WORD            ph_d4s;             /* DSA transport status word */
#define ph_d4d 0x8000               /* DSA 'done' bit (packet gone) */
#define ph_d4l 0x7000               /* Filler */
#define ph_d4p 0x0f00               /* DSA network priority */
#define ph_d4h 0x0000               /* High priority value */
#define ph_d4l 0x0F00               /* Low priority value */
#define ph_d42 0x0080               /* Filler */
#define ph_d4n 0x007f               /* DSA fragment number */

/* ELANC - Ethernet Local Area Network Controller */

WORD            ph_emk[2];          /* "HE01" */
ADDR            pe_2ex[2];          /* ELC remote physical line context
                                     * address */
ADDR            pe_2en[2];          /* Next packet */
ADDR            pe_2ep[2];          /* Previous packet */

/* Link layer */

WORD            ph_2mk[2];          /* "H201" */
WORD            ph_sta;             /* Link status word */
ADDR            ph_2rf[2];          /* RFU */
```

C231

```
/* Dynamic Allocation Area */

/*
**struct ph_daa
**{
**
*/

/* Dynamic allocation area */
WORD            ph_dch[32];      /* Size for testing */
/*
**
**} ph_daa;
*/

/* DATA AREA - may contain data described by the first area ptr/rng pair. */
/* For sending, ph_ad1 is set to ph_tuh. */
/* For receiving, ph_ad1 is set to ph_pdr. */
/* Subsequent references are via ph_ad1. */
/* PDU headers totalling 70 bytes can be added on sends. */
/* For routing, a net increase of 42 bytes can be added. */

WORD            ph_umk[2];       /* "PU01" */
WORD            ph_pdu[21];      /* PDU headers: HDLC=4, HDLI=18, X25=4,
                                  * IP=34, TP=10 */
WORD            ph_pdr[14];      /* PDU receive area after routing
                                  * expansion space */

WORD            ph_tuh[64];      /* PDU starts here */
#define ph_dus 128               /* PDU size */
#define ph_hos 211               /* Word offset to ph_tuh (buffer size for
                                  * header) */

};                               /* struct phd */
```

C232

```c
/*
*   Name:       x25cse.h
*   Purpose:    This file defines the values of the cause field
*               which may be present in the following packet types.
*                - Restart request
*                - Restart indication
*                - Clear request
*                - Clear indication
*                - Reset request
*                - Reset indication
*                - Diagnostic
*                - Registration confirm
*
*               These diagnostic codes are defined in both the CCITT
*               Recommendation X.25 and ISO 8208 international standards.
*
*   Input:
*   Output:
*
*/

/*************************************************************************/

/* The following cause values are defined for reset request and reset
 * indication packets. */ define RS_DTE  0x00            /* DTE originated */
define RS_OUT  0x01            /* Out of order (pvc only) */
#define RS_RPE  0x03            /* Remote procedure error */
#define RS_LPE  0x05            /* Local procedure error */
#define RS_NCNG 0x07            /* Network congestion */
#define RS_RDOP 0x09            /* Remote DTE operational (pvc only) */
#define RS_NOP  0x0f            /* Network operational (pvc only) */
#define RS_INCD 0x11            /* Incompatible destination */
#define RS_NOUT 0x1D            /* Network out of order */
#define RS_GPE  0xC1            /* Gateway detected procedure error */
#define RS_GCNG 0xC3            /* Gateway congestion */
#define RS_GOP  0xC7            /* Gateway operational (pvc only) */

/* The following cause values are defined for clear request and clear
 * indication packets. */
#define CL_OUT  0x09            /* Out of order */
```

C233

```
/*
 * Name:       x25dia.h
 * Purpose:    This file defines the diagnostic codes which may be
 *             present in the diagnostic code field of the following
 *             packet types:
 *              - Restart request
 *              - Restart indication
 *              - Clear request
 *              - Clear indication
 *              - Reset request
 *              - Reset indication
 *              - Diagnostic
 *              - Registration confirm
 *
 *             These diagnostic codes are defined in both the CCITT
 *             Recommendation X.25 and ISO 8208 international standards.
 *
 * Input:
 * Output:
 *
 */

/***********************************************************************/

/* The following diagnostic codes are general. The no additional information
 * diagnostic code may be used in situations for which no specific
 * diagnostic code is defined. */ define d_nai_xx 0              /* No additional information */
define d_nai_is 1              /* Invalid P(S) */
#define d_nai_ir 2              /* Invalid P(R) */

/* The following diagnostic codes are used for invalid packet types. */ define d_pti_xx 16             /* Packet type invalid */
define d_pti_r1 17             /* Packet type invalid - state r1 */
#define d_pti_r2 18             /* Packet type invalid - state r2 */
#define d_pti_r3 19             /* Packet type invalid - state r3 */
#define d_pti_p1 20             /* Packet type invalid - state p1 */
#define d_pti_p2 21             /* Packet type invalid - state p2 */
#define d_pti_p3 22             /* Packet type invalid - state p3 */
#define d_pti_p4 23             /* Packet type invalid - state p4 */
#define d_pti_p5 24             /* Packet type invalid - state p5 */
#define d_pti_p6 25             /* Packet type invalid - state p6 */
#define d_pti_p7 26             /* Packet type invalid - state p7 */
#define d_pti_d1 27             /* Packet type invalid - state d1 */
#define d_pti_d2 28             /* Packet type invalid - state d2 */
#define d_pti_d3 29             /* Packet type invalid - state d3 */

/* The following diagnostic codes are used for packet not allowed
 * situations. */ define d_pna_xx 32             /* Packet not allowed */
define d_pna_up 33             /* Unidentifiable packet */
#define d_pna_lw 34             /* Incoming call on outgoing only channel */
#define d_pna_pv 35             /* Invalid packet type on perm vc */
#define d_pna_ua 36             /* Packet on unassigned logical channel */
#define d_pna_rj 37             /* Reject not subscribed to */
#define d_pna_sp 38             /* Packet too short */
#define d_pna_lp 39             /* Packet too long */
#define d_pna_gf 40             /* Invalid gfi */
#define d_pna_nz 41             /* Non-zero lcn in restart or regist pkt */
#define d_pna_fc 42             /* Packet type not compatible with
                                 * facility */
#define d_pna_ic 43             /* Unauthorized interrupt confirm */
#define d_pna_in 44             /* Unauthorized interrupt */
#define d_pna_rt 45             /* Unauthorized reject */

/* The following diagnostic codes are used for timer expirations. */ define d_tim_xx 48             /* Timer expired */
define d_tim_cr 49             /* Timer expired - call request */
#define d_tim_dr 50             /* Timer expired - clear request */
#define d_tim_rs 51             /* Timer expired - reset request */
```

1

C234

```
#define d_tim_rr 52              /* Timer expired - restart request */

/* The following diagnostic codes are used to report call setup, call
     * clearing, or registration problems. */ define d_scr_xx 64              /* Setup, clearing, or registration
                                  * problem */
#define d_scr_fc 65              /* Facility or registration code not
                                  * allowed */
#define d_scr_fp 66              /* Facility parameter not allowed */
#define d_scr_cd 67              /* Invalid called address */
#define d_scr_cg 68              /* Invalid calling address */
#define d_scr_fl 69              /* Invalid facility or registration length */
#define d_scr_ib 70              /* Incoming calls barred */
#define d_scr_nc 71              /* No logical channel available */
#define d_scr_cc 72              /* Call collision */
#define d_scr_df 73              /* Duplicate facility requested */
#define d_scr_na 74              /* Non-zero address length */
#define d_scr_nf 75              /* Non-zero facility length */
#define d_scr_fn 76              /* Facility not provided when expected */
#define d_scr_if 77              /* Invalid CCITT-specified DTE facility */

/* The following diagnostic codes are used for OSI/DSA6 defined information */ define d_dte_su 100             /* Remote SAP unavailable (DSAC state) */
define d_dte_mx 101             /* Max number of virtual circuits reached */
#define d_dte_mu 102             /* Required memory unavailable */
#define d_dte_tc 103             /* Remote user error - thruput class */
#define d_dte_fc 104             /* Remote user error - flow control */
#define d_dte_rx 106             /* Reset initiated by supported layer */
#define d_dte_fs 107             /* Fast select not subscribed */
#define d_dte_rc 108             /* Reverse charging not subscribed */
#define d_dte_cu 109             /* CUG membership not subscribed */
#define d_dte_nt 110             /* Throughput class negotiation not
                                  * subscribed */
#define d_dte_nf 111             /* Flow control negotiation not subscribed */
#define d_dte_ri 112             /* Reset initiated by supporting layer */
#define d_dte_cx 136             /* Connect to PVC */
#define d_dte_dx 137             /* Disconnect from PVC */
```

C235

```
/*
 * Name:       x25fac.h
 * Purpose:    This file defines the facility codes for those
 *             facilities which may be present in the following
 *             packet types:
 *
 *             - Call request
 *             - Incoming call
 *             - Call accepted
 *             - Call connected
 *             - Clear request
 *             - Clear indication
 *             - Clear confirm
 *
 *             In addition, this file defines the values of the
 *             facility parameter field for facility markers.
 *
 *
 * Input:
 * Output:
 *
 */

/******************************************************************************/ define FAC_MRKR 0x00          /* Facility marker */
define FAC_FSRV 0x01          /* Fast select - Reverse charging */
#define FAC_THRU 0x02          /* Throughput class */
#define FAC_CUGB 0x03          /* CUG selection (basic format) */
#define FAC_CHRG 0x04          /* Charging information request */
#define FAC_TELW 0x05          /* Window size (Telenet) */
#define FAC_TELP 0x06          /* Packet size (Telenet) */
#define FAC_CLAM 0x08          /* Called line addr modified notific */
#define FAC_CUOB 0x09          /* CUG with out access (basic format) */
#define FAC_MTHP 0x0A          /* Minimum throughput class */
#define FAC_EXPD 0x0B          /* Expedited data negotiation */
#define FAC_BCUG 0x41          /* BICUG selection */
#define FAC_PSZ  0x42          /* Packet size */
#define FAC_WSZ  0x43          /* Window size */
#define FAC_RPAB 0x44          /* RPOA selection (basic format) */
#define FAC_CUGE 0x47          /* CUG selection (extended format) */
#define FAC_CUOE 0x48          /* CUG with out access (extended fmt) */
#define FAC_TRNS 0x49          /* Transit delay */
#define FAC_CICD 0xC1          /* Charging info - call duration */
#define FAC_CISC 0xC2          /* Charging info - segment count */
#define FAC_CRDN 0xC3          /* Call redirection notification */
#define FAC_RPAE 0xC4          /* RPOA selection (extended format) */
#define FAC_CIMU 0xC5          /* Charging info - monetary unit */
#define FAC_NUI  0xC6          /* Network user information */
#define FAC_CDAE 0xC9          /* Called aaddress extension */
#define FAC_ENTD 0xCA          /* End to end transit delay */
#define FAC_CGAE 0xCB          /* Calling address extension */

/* Facility Parameter Field for facility markers. */ define MKR_NONE 0xFE          /* No Marker (dummy) */
define MKR_CLNG 0x00          /* Calling PDN facilities */
#define MKR_TELN 0x21          /* Telenet facilities */
#define MKR_CLLD 0xFF          /* Called PDN facilities */
#define MKR_CITT 0x0F          /* CCITT specified DTE facilities */
```

C236

```
/*
 *  Name:       x25nse.h
 *  Purpose:    Network Subscription Error Reason Codes
 *
 *              This file defines the reason codes for network
 *              subscription error messages.
 *
 *
 *  Input:
 *  Output:
 *
 */

/****************************************************************************/ define NSE_MEM 1           /* Requested memory unavailable */
define NSE_NLC 2           /* No unassigned logical channel available */
#define NSE_LKD 3           /* Supporting connection not operational */
#define NSE_BLC 4           /* Received packet contains unassigned lcn */
#define NSE_GFI 5           /* Received packet contains invalid gfi */
#define NSE_SHP 6           /* Received packet too short */
#define NSE_MVC 7           /* Max VCs allocated on specified NS */
#define NSE_T20 8           /* Restart request timeout */
#define NSE_NPH 9           /* No PHB pointer in gater requiring PHB */
#define NSE_OCB 10          /* Outgoing calls barred */
#define NSE_NTC 11          /* Thruput class negotiation not
                             * subscribed */
#define NSE_NFC 12          /* Flow control negotiation not subscribed */
#define NSE_LSU 13          /* Local NS unavailable (DSAC) */
#define NSE_RSU 14          /* Remote NS unavailable (DSAC) */
#define NSE_NXP 15          /* No x25lnk ptr in snsap table */
#define NSE_NVC 16          /* PVC does not exist for requested lcn */
#define NSE_VCB 17          /* Requested PVC currently in use */
#define NSE_CGA 18          /* Calling X.121 addr (plus ext) too long */
#define NSE_CDA 19          /* Called X.121 addr (plus ext) too long */
#define NSE_EXT 20          /* Addr ext facility not allowed on 1980
                             * NS */
#define NSE_LGP 21          /* Received packet too long */
```

C237

```
/*
 *  Name:       x25nsp.h
 *  Purpose:    X25NSP Network Subscription Selection Parameter Block
 *
 *              The network subscription selection parameter block
 *              is built from the selection parameters passed in a
 *              network subscription admin request gater and is used
 *              by the individual NS command handlers to select those
 *              network subscriptions which are to be part of the
 *              administrative response.
 *
 *
 *  Input:
 *  Output:
 *
 */

/*****************************************************************************/
struct x25nsp
{
    /* indicators */
    unsigned    np_par1:1;      /* name-1 present */
    unsigned    np_par2:1;      /* name-2 present */
    unsigned    np_par3:1;      /* dsac state present */
    unsigned    np_par4a:1;     /* mapping-1 class present */ unsigned    np_par4b:1;     /* mapping-1 name present */
    unsigned    np_par5a:1;     /* mapping-2 class present */
    unsigned    np_par5b:1;     /* mapping-2 name present */
    unsigned    np_par6:1;      /* venue present */ unsigned    np_par7:1;      /* ns type present */
    unsigned    np_par8:1;      /* update dsac state present */
    unsigned    np_rfu:6;       /* unused */
    /* end indicators */ unsigned char   np_nam1[9]; /* name-1 */
    unsigned char   np_nam2[9]; /* name-2 */
    unsigned short  np_dsac;    /* dsac state */
    unsigned short  np_mp1c;    /* mapping-1 class */
    unsigned char   np_mp1n[9]; /* mapping-1 name */
    unsigned short  np_mp2c;    /* mapping-2 class */
    unsigned char   np_mp2n[9]; /* mapping-2 name */
    unsigned char   np_venu[2]; /* venue */
    unsigned char   np_type[4]; /* ns type */
    unsigned short  np_updp;    /* update dsac state */

};                              /* struct x25nsp */
```

1

C238

```
/*
 *  Name:       x25sta.h
 *  Purpose:    This file defines error codes which do not apply
 *              to any specific network subscription or virtual
 *              circuit.
 *
 *
 *  Input:
 *  Output:
 *
 */

/***********************************************************************/ define st25_MEM 101        /* Requested memory unavailable */
define st25_UUF 102        /* Undefined function code in gater */
#define st25_SNF 103        /* Unable to locate SNSAP via sublayer
                             * SAPS */
#define st25_RNF 104        /* Remote SNSAP not found */
#define st25_NVP 105        /* No VCCB pointer in gater requiring VCCB */
#define st25_NLP 106        /* No x25lnk pointer in gater requiring
                             * x25lnk */
#define st25_NLS 107        /* No called SAP name in connect ind gater */
#define st25_NSN 108        /* No local SNSAP in connect request to
                             * PVC */
#define st25_NSA 109        /* Unable to select available default
                             * SNSAP */
#define st25_ANF 110        /* Unable to locate SNSAP via X.121
                             * address */
#define st25_NSP 111        /* SNSAP pointer null in VCCB */
#define st25_NSX 112        /* SNSAP pointer null in x25lnk table */
#define st25_LNF 113        /* Unable to locate sublayer sap table */
#define st25_ISL 114        /* Invalid SAP name length passed in gater */
#define st25_NSS 115        /* No SAP name in actv local sap conf
                             * gater */
#define st25_ALC 116        /* Unexpected actv local sap conf gater
                             * rcvd */
#define st25_PAR 117        /* Inconsistent parameters in lsap info
                             * gater */
#define st25_NSI 118        /* No SAP name in lsap info gater */
#define st25_INF 119        /* Info gater not issued from supporting
                             * layer */
```

```
/*
 *  Name:       x25vce.h
 *  Purpose:    Virtual Circuit Unsolicited Message Reason Codes
 *
 *              This file defines the reason codes used in virtual
 *              circuit unsolicited messages.
 *
 *  Input:
 *  Output:
 *
 */

/******************************************************************************/

/* Virtual Circuit Error Reason Codes */ define VCE_IPS 1           /* Invalid P(S) */
define VCE_IPR 2           /* Invalid P(R) */
#define VCE_SHP 3           /* Received packet too short */
#define VCE_LGP 4           /* Received packet too long */
#define VCE_T23 5           /* Clear request timeout */
#define VCE_T22 6           /* Reset request timeout */
#define VCE_MEM 7           /* Requested memory unavailable */
#define VCE_NPH 8           /* No PHB ptr in gater requiring PHB */
#define VCE_UIN 9           /* Unauthorized interrupt received */
#define VCE_UIC 10          /* Unauthorized interrupt confirm rcv'd */
#define VCE_URJ 11          /* Unauthorized reject received */
#define VCE_D1I 12          /* Rcv'd packet type invalid - state D1 */
#define VCE_NZL 13          /* Non-zero LCN rcv'd in restart packet */
#define VCE_UPK 14          /* Unidentifiable packet received */
#define VCE_XIS 15          /* Exp data request - Invalid state */
#define VCE_XSC 16          /* Exp data request - No send credit */
#define VCE_XDS 17          /* Exp data request - Invalid data size */
#define VCE_RES 18          /* Reset indication received */
#define VCE_PHB 19          /* Data request - PHB in use */
#define VCE_PVC 20          /* Invalid packet received on PVC */
#define VCE_D3I 21          /* Rcv'd packet type invalid - state D3 */

/* Virtual Circuit Close Reason Codes */ define VCC_NML 0           /* Normal close */
define VCC_NSC 1           /* Supporting connection down */
#define VCC_RST 2           /* Packet level restart */
#define VCC_D1I 3           /* Rcv'd packet type invalid - state D1 */
#define VCC_D2I 4           /* Rcv'd packet type invalid - state D2 */
#define VCC_T22 5           /* Max consec reset req timeouts */
#define VCC_D3I 6           /* Rcv'd packet type invalid - state D3 */

/* Virtual Circuit Open-Fail Reason Codes */ define VCF_NSC 1           /* Supporting connection down */
define VCF_RST 2           /* Packet level restart */
#define VCF_REF 3           /* Call request refused */
#define VCF_T21 4           /* Call request timeout */
#define VCF_CAN 5           /* Call request cancelled */
#define VCF_ICR 6           /* Incoming call refused */
#define VCF_SHP 7           /* Rcv'd packet too short */
#define VCF_P2I 8           /* Rcv'd packet type invalid - state p2 */
#define VCF_P3I 9           /* Rcv'd packet type invalid - state p3 */
#define VCF_P5I 10          /* Rcv'd packet type invalid - state p5 */
#define VCF_NZL 11          /* Non-zero lcn rcv'd in restart packet */
#define VCF_UPK 12          /* Unidentifiable packet rcv'd */
#define VCF_MEM 13          /* Requested memory unavailable */
#define VCF_PSZ 14          /* Packet size incompatible with frame
                             * size */
#define VCF_CGA 15          /* Recvd pkt contains invalid calling addr */
#define VCF_ICB 16          /* Incoming calls barred */
#define VCF_UNA 17          /* NS unavailable (DSAC state) */
#define VCF_MVC 18          /* Max # of virtual circuits reached on NS */
#define VCF_1WY 19          /* Incoming call on outgoing only channel */
#define VCF_LGF 20          /* Facility field too long */
#define VCF_LGU 21          /* User data field too long */
#define VCF_THR 22          /* Throughput class negotiation error */
```

C240

```
#define VCF_FLO 23          /* Flow control negotiation error */
#define VCF_CUG 24          /* CUG membership not subscribed */
#define VCF_FAC 25          /* Facility not provided when expected */
#define VCF_FPN 26          /* Rcv'd facility parameter not allowed */
#define VCF_TNS 27          /* Throughput class negotiation not
                             * subscribed */
#define VCF_FNS 28          /* Flow control negotiation not subscribed */
#define VCF_CDA 29          /* Recvd pkt contains invalid called addr */
```

C241

```
/*
 * Name:        x25vcp.h
 * Purpose:     X25VCP Virtual Circuit Selection Parameter Block
 *
 *              The virtual circuit selection parameter block is
 *              built from the selection parameters passed in a
 *              virtual circuit administrative request gater and
 *              is used by the individual VC command handlers to
 *              select those virtual circuits which are to be part
 *              of the administrative response.
 *
 * Input:
 * Output:
 *
 */

/******************************************************************************/ struct x25vcp
{
    unsigned        vp_par1:1;     /* index-1 present */
    unsigned        vp_par2:1;     /* index-2 present */
    unsigned        vp_par3:1;     /* dsac state present */
    unsigned        vp_par4:1;     /* vc type present */
    unsigned        vp_par5a:1;    /* mapping-1 class present */
    unsigned        vp_par5b:1;    /* mapping-1 name present */
    unsigned        vp_par6a:1;    /* mapping-2 class present */
    unsigned        vp_par6b:1;    /* mapping-2 name present */
    unsigned        vp_rfu:8;      /* rfu */ unsigned short  vp_ndx1;       /* index-1 */
    unsigned short  vp_ndx2;       /* index-2 */
    unsigned short  vp_dsac;       /* dsac state */
    unsigned char   vp_type[4];    /* vc type */
    unsigned short  vp_mp1c;       /* mapping-1 class */
    unsigned char   vp_mp1n[9];    /* mapping-1 name */
    unsigned short  vp_mp2c;       /* mapping-2 class */
    unsigned char   vp_mp2n[9];    /* mapping-2 name */

};                                 /* struct x25vcp */
```

APPENDIX D - IPOOL MACROS AND ASSOCIATED ROUTINES

D1

```
/*
*       I-Pool MACROS (from emu_head.h)
*/

/*
*   PUT4 moves a ulong "value"
*   to an array "target" of 2 shorts (dps6 double word)
*/
#define PUT4(target,value) \
        *((short *)target+0) = value >> 16; \
        *((short *)target+1) = value & 0x0000ffff;
/*
*   GET4 moves an array "value" of 2 shorts (dps6 double word)
*   to a ulong "target"
*/
#define GET4(target,value) \
        target = (value[0] << 16) + value[1];
/*
*   RISC_ADDR moves an array "value" of 2 shorts (dps6 address)
*   to a pointer "target" of type "cast"
*/
#define RISC_ADDR(target,cast,value) \
        target = (cast(base+(((value[0] << 16) + (value[1]&0x0000ffff))*2)));
/*
*   BASED_RISC_ADDR is like RISC_ADDR but allows for the 'local base' definition
*   this macro is for the convenience of the SRVR_RISC_ADDR macro
*/
#define BASED_RISC_ADDR(target,cast,value,lbase) \
target = (cast(lbase+(((value[0] << 16)+(value[1]&0x0000ffff))*2)));
/*
*   SRVR_RISC_ADDR is to be used by Servers whenever pointers that are
*   potentially in user address space are translated.
*   virt_view is a global variable initialized to SINGLE_VIEW if only one I-pool
*   and MULTIPLE_VIEW if there are moreI-pools.
*   dps6_uvah is an integer containing high order part of a minimal dps6 user va
*   srvr_base is a function that returns virtual address in Server's address
*   space of the region of the I-pool to which the task specified in IRB belongs
*/
#define SRVR_RISC_ADDR(target,cast,value,irbp) \
    if ((virt_view==SINGLE_VIEW)||(value[0]<dps6_uvah)) \
        RISC_ADDR(target,cast,value) \
        else BASED_RISC_ADDR(target,cast,value,srvr_base(irbp))
/*
*   VAR_RISC_ADDR is to be used for code that is executed both by Servers and
*   the Interpreter when translating pointers that can be in user address space.
*   process is a global variable initialized to SERVER for servers.
*/
#define VAR_RISC_ADDR(target,cast,value,irbp)\
    if (process==SERVER) SRVR_RISC_ADDR(target,cast,value,irbp) \
    else RISC_ADDR(target,cast,value)

/*
*   DPS6_ADDR moves a ulong "value"
*   to an array "target" of 2 shorts (dps6 address)
*/
#define DPS6_ADDR(target,value) \
        PUT4(target,((char *)value-base)/2);
```

D2

```
/*
*
* Name:        emu_vm.c
* Purpose:
* Functions in this module:
*/
char            .*srvr_base();
void             srvr_detach();
int              intrp_vm();
void             srvr_vm();
void             init_vm();
void             task_addr();
int              pclm_vm();
int              pdmp_vm();

#include "sys_head.h"
include "emu_head.h"
#include "mgi_head.h"
#include "z3hdm.h"
#include "z3scb.h"
#include "z3irb.h"
#include "z3tcb.h"
#include "z3mpa.h"
#include "z3mpx.h"
#include "svpd.h"
#include "sdt.h"

extern char      *base;
extern struct RISC_REGS rr;
char             *sys_r0;        /* base of system region when in DPS6 ring
                                  * 0 */
char             *sys_r3;        /* base of system region when in DPS6 ring
                                  * 3 */
char             *usr_r0;        /* base of user pool region when in DPS6
                                  * ring 0 */
char             *usr_r3;        /* base of user pool region when in DPS6
                                  * ring 3 */
char             *curr_asv;      /* current asv, ie content of t_asv */
char             *system_asv;    /* asv of system tasks */
int              dps6_uvah = 0;
int              virt_view = SINGLE_VIEW;
int              process = INTERPRETER;
int              pool_no = 0;    /* no of user pools */

/*
* static data of each Server
*/
static struct SVPD svpd_table[ATT_POOL_LIMIT];
static struct SVPDH svpdh = {NULL, NULL, 0, 0};
static ulong       srvr_delta;
/**********
* srvr_base *
************/
char            *
srvr_base(irb)
struct IRB      *irb;
{
    struct TCB      *tcb;
    char            *asv;
    struct SVPD     *target_ptr;
    struct SVPD     *curr_ptr;
    int              shmid;
    int              n;
    struct MPA      *mpaptr;
    struct SDT      *sdtptr;
    /* If first time through initialize svpd_table */
    if (svpdh.first == (struct SVPD *) 0)
    {
/*      syslog(LOG_DEBUG, "First call to srvr_base %d", getpid());       */
        curr_ptr = svpd_table;
        svpdh.first = curr_ptr;
        curr_ptr->prev = NULL;
        for (n = 0; n < ATT_POOL_LIMIT - 1; n++)
        {
            srvr_delta = (ulong) (usr_r0 - base);
            curr_ptr->next = curr_ptr + 1;
            curr_ptr->sdt = NULL;
```

D3

```
                    curr_ptr->attadr = NULL;
                    if (n != 0)
                        curr_ptr->prev = curr_ptr - 1;
                    curr_ptr++;
                }
                svpdh.last = curr_ptr;
                curr_ptr->next = NULL;
                curr_ptr->sdt = NULL;
                curr_ptr->attadr = NULL;
                curr_ptr->prev = curr_ptr - 1;
            }
            /* From IRB and TCB derive ptr to positive part of SDT */
            RISC_ADDR(tcb, (void *), irb->i_tcb);
            tcb = (struct TCB *) ((char *) tcb - OFF_TCB);
            RISC_ADDR(asv, (void *), tcb->t_asv);
            /* Check if pool associated with SDT currently attached */
            target_ptr = (struct SVPD *) 0;
            svpdh.req++;                    /* number of calls */
            for (curr_ptr = svpdh.first; (curr_ptr != NULL) && (target_ptr == NULL);
                 curr_ptr = curr_ptr->next)
                if (asv == curr_ptr->sdt)
                    target_ptr = curr_ptr;
            if (target_ptr == NULL)
            {                               /* if pool not attached */
                sdtptr = (struct SDT *) ((char *) asv - OFF_SDT);
                RISC_ADDR(mpaptr, (struct MPA *), sdtptr->sdt_neg.mpa_ptr);
                GET4(shmid, mpaptr->p_shmid);
                target_ptr = svpdh.last;
                if (target_ptr->sdt != NULL)
                {                           /* if all in use */
                    if ((n = shmdt(target_ptr->attadr)) != 0)   /* detach LRU region */
                    {
                        syslog(LOG_ERR, "E130: shmdt: %m");
                        exit(1);
                    }
                    if ((target_ptr->attadr = shmat(shmid, NULL, 0)) == (char *) -1)
                    {
                        syslog(LOG_ERR, "E131: shmat: %m");
                        exit(1);
                    }
                    svpdh.repl++;           /* no. of times region replaced */
                }
                else
                {                           /* first attachment */
                    target_ptr = svpdh.first;
                    while ((target_ptr->sdt != NULL))
                        target_ptr = target_ptr->next;  /* find first unused */
                    if ((target_ptr->attadr = shmat(shmid, NULL, 0)) == (char *) -1)
                    {
                        syslog(LOG_ERR, "E132: shmat: %m");
                        exit(1);
                    }
                }
/*              syslog(LOG_DEBUG, "Attached at %p %d", target_ptr->attadr, getpid()); */
                target_ptr->sdt = asv;
            }                               /* end pool not attached */
            if (svpdh.repl != 0)
            {                               /* if regions repl. then relink */
                if (target_ptr != svpdh.first)
                {                           /* make it first if not first */
                    (target_ptr->prev)->next = target_ptr->next;
                    if (target_ptr->next != NULL)       /* if not last */
                        (target_ptr->next)->prev = target_ptr->prev;
                    else
                        svpdh.last = target_ptr->prev;
                    target_ptr->next = svpdh.first;
                    (target_ptr->next)->prev = target_ptr;
                    svpdh.first = target_ptr;
                    target_ptr->prev = (struct SVPD *) 0;
                }
            }
/*          syslog(LOG_DEBUG, "Returning %p %d ", target_ptr->attadr - srvr_delta, getpid()); */
            return ((char *) (target_ptr->attadr - srvr_delta));
        }

/************
 * srvr_detach *
```

D4

```
**************/
/* Detach all shared memory regions attached by server */
void
srvr_detach()
{
    struct SVPD      *ptrx;
    int              n;

ptrx = svpd_table;
    for (ptrx = svpdh.first; ptrx != NULL; ptrx = ptrx->next)
    {
        if (ptrx->attadr != NULL)
        {
            if ((n = shmdt(ptrx->attadr)) != 0)
                printf("Detach failed\n");
            ptrx->attadr = NULL;
            ptrx->sdt = NULL;
        }
    }
}

/***********
 * intrp_vm *
 ***********/
/* Initialize Address Space of the Interpreter Process */
/* Attach System space as read only at 4, and first user pool at 5 and 6 */
int
intrp_vm()
{
    int              shmid;
    char             *temp;
    struct SCB       *scb;
    struct MPA       *mpa;
    struct MPX       *mpd;
    struct HDM       *hdm_base;

hdm_base = (struct HDM *) base;
    RISC_ADDR(scb, (struct SCB *), hdm_base->h_scb);      /* SCB pointer */
    RISC_ADDR(mpa, (struct MPA *), scb->s_mpd);  /* pointer to MPA of $$ Pool */
    GET4(shmid, mpa->p_shmid);         /* shmid of System Region */
/* if attach unsuccessful */
    if ((temp = shmat(shmid, sys_r3, SHM_RDONLY)) == (char *) -1)
    {
        syslog(LOG_ERR, "E133: interpreter shmat: %m ");
        return (1);
    }
/* else
        syslog(LOG_DEBUG, "Intrp: sys_r3 attached at %p", temp);
*/
    RISC_ADDR(mpd, (struct MPX *), mpa->p_mpd);  /* $$ MPD */
    RISC_ADDR(curr_asv, (char *), mpd->p_sda);   /* curr_asv if no I-pools
                                                  * configured */
    shmid = 0;
/* search for first I-pool */
    while ((mpa != (struct MPA *) base) && (shmid == 0))
    {
        RISC_ADDR(mpd, (struct MPX *), mpa->p_mpd);
        if ((mpd->p_ind & mp_sys) == 0)  /* if not system pool */
            GET4(shmid, mpa->p_shmid);   /* then remember shmid */
        RISC_ADDR(mpa, (struct MPA *), mpa->p_npa);
    }
    if (shmid != 0)                      /* if at least one I-pool */
    {
        if ((temp = shmat(shmid, usr_r0, 0)) == (char *) -1)
        {
            syslog(LOG_ERR, "E134: interpreter's shmat: %m ");
            shmdt(sys_r3);               /* detach read only copy of system */
            return (1);
        }
/*      else
            syslog(LOG_DEBUG, "Intrp: usr_r0 attached at %p", temp);
*/
        if ((temp = shmat(shmid, usr_r3, 0)) == (char *) -1)
        {
            syslog(LOG_ERR, "E135: interpreter's shmat: %m ");
            shmdt(sys_r3);
```

D5

```
            shmdt(usr_r0);
            return (1);
        }
/*      else
*/          syslog(LOG_DEBUG, "Intrp: usr_r3 attached at %p", temp);
        RISC_ADDR(curr_asv, (char *), mpd->p_sda);    /* set curr_asv to
                                                       * attached I-pool */
    }                                   /* shmid != 0 */
    return (0);
}                                       /* intrp_vm */
/**********
 * srvr_vm *
 **********/
/* Initialize address space of a Server process */
void
srvr_vm()
{
    int             n;

if ((n = shmdt(sys_r3)) != 0)   /* Detach read only system */
    {
/*      syslog(LOG_ERR, "Srvr detach 1 failed %m %p", sys_r3); */
    }
    if ((n = shmdt(usr_r3)) != 0)   /* Detach second copy of user */
    {
/*      syslog(LOG_ERR, "Srvr detach 2 failed %m %p", usr_r3); */
    }
    if (virt_view != SINGLE_VIEW)
    {
        n = shmdt(usr_r0);          /* if multiple view detach first copy of
                                     * user */
        if ((n != 0) & (process != SERVER))    /* if forked by INTERPRETER */
        {
            syslog(LOG_ERR, "E138: Srvr detach 3 failed %m %p", usr_r0);
        }
    }
/*  else
*/      syslog(LOG_DEBUG, "Single view,usr_r0 at %p", usr_r0);
    process = SERVER;
}                                       /* srvr_vm */
/**********
 * init_vm * Initialize VM pointers
 **********/
void
init_vm()
{
    sys_r0 = base;
    sys_r3 = sys_r0 + SEG_DELTA;
    usr_r0 = sys_r3 + SEG_DELTA;
    usr_r3 = usr_r0 + SEG_DELTA;
    dps6_uvah = ((usr_r0 - base) / 2) >> 16;
}                                       /* init_vm */
/**********
 * pdmp_vm *
 **********/
/* post dump VM */
int
pdmp_vm(scb)
struct SCB      *scb;
{
    int             shmid;
    struct MPA      *mpa;
    struct sdt_prefix *sdt;
    char            *temp;
    if (scb->s_ind2 & ms_mvv)    /* for multiple view system */
    {
        shmdt(usr_r0);
        shmdt(usr_r3);
        sdt = (struct sdt_prefix *) (curr_asv - OFF_SDT);
/* MPA of active address space */
        RISC_ADDR(mpa, (struct MPA *), sdt->mpa_ptr);
        GET4(shmid, mpa->p_shmid);
```

D6

```c
    /* if attach unsuccesfull */
            if ((temp = shmat(shmid, usr_r0, 0)) == (char *) -1)
            {
                syslog(LOG_ERR, "E139: No addressability after dump (usr_r0) : %m");
                return (1);
            }
            if ((temp = shmat(shmid, usr_r3, 0)) == (char *) -1)
            {
                syslog(LOG_ERR, "E140: No addressability after dump (usr_r3) : %m");
                return (1);
            }
        }
        return (0);
}

/************
 * task_addr * Establish task addressability
 ************/
void
task_addr(tcb)
struct TCB      *tcb;
{
    struct sdt_prefix *sdt;
    struct MPA        *mpa;
    int                shmid;
    char              *next_asv;
    char              *temp;
    next_asv = curr_asv;
    if (tcb->t_ind3 & mt_sys)       /* for system tasks */
    {
        if (tcb->pos.t_ism2 & 0x8000)    /* if valid address space */
        {
            RISC_ADDR(next_asv, (char *), tcb->t_asv);
        }
    }
    else
        RISC_ADDR(next_asv, (char *), tcb->t_asv);        /* for user tasks */
    if ((next_asv != curr_asv)
        && (next_asv != system_asv)
        && (next_asv != base))       /* if address space must be changed */
    {
        sdt = (struct sdt_prefix *) (next_asv - OFF_SDT);    /* sdt prefix */
        RISC_ADDR(mpa, (struct MPA *), sdt->mpa_ptr);
        GET4(shmid, mpa->p_shmid);
        shmdt(usr_r0);
        shmdt(usr_r3);
        if ((temp = shmat(shmid, usr_r0, 0)) == (char *) -1)
        {
            syslog(LOG_ERR, "E141: task_addr shmat: %m ");
            hvx_clnp(0);
            exit(1);
        }
        if ((temp = shmat(shmid, usr_r3, 0)) == (char *) -1)
        {
            syslog(LOG_ERR, "E142: task_addr shmat: %m ");
            hvx_clnp(0);
            exit(1);
        }
        curr_asv = next_asv;
        rr.vld_ptr = curr_asv;
    }
}                                        /* task_addr */
/* The following 'defines' support interface with the '3706' MCL
 * This MCL returns R2=0 if no action during initialization
 * R2 >= 10 indicates that IORB copying should be enabled
 * odd R2 indicates that the VLD instruction should be enabled
 */
#define COPY_IORB    10
#define ENABLE_VLD   1
int
pclm_vm()
{
    struct HDM        *hdm_base;
    struct SCB        *scb;
    struct MPA        *mpa;
    struct MPX        *mpd;
```

D7

```
    struct SD        *sda;
    int              n;
    ulong            sys_rings, i_rings;
    ulong            sys_sd1, sys_sd2;
    ulong            i_sd1, i_sd2;
    ulong            ip_offset, ip_size;
    ulong            sys_end;
    n = 0;
    hdm_base = (struct HDM *) base;
    RISC_ADDR(scb, (struct SCB *), hdm_base->h_scb);
    GET4(sys_end, scb->s_spnd);      /* end of system space */
    sys_end = sys_end << 1;          /* in bytes */
    ip_offset = sys_end;             /* beginning of first i-pool */
    sys_rings = 0x30000000;          /* RR=3, WR=0, ER=3 */
    i_rings = 0;                     /* all rings 3 */
    sys_sd1 = 0x80000000;
    sys_sd2 = ((sys_end >> 12) - 1) | sys_rings;
    RISC_ADDR(mpa, (struct MPA *), scb->s_mpd);
/* For every configured pool initialize Segment Descriptor Table */
    while (mpa != (struct MPA *) base)
    {
        RISC_ADDR(mpd, (struct MPX *), mpa->p_mpd);
        RISC_ADDR(sda, (struct SD *), mpd->p_sda);
        if (sda->sd2[1] == 0)        /* if not initialized yet */
        {
            PUT4(sda->sd1, sys_sd1);
            PUT4(sda->sd2, sys_sd2);
            if ((mpd->p_ind & mp_sys) == 0)    /* if user pool */
            {
                PUT4(mpd->p_pb, ip_offset >> 1);
                i_sd1 = (ip_offset >> 12) | 0x80000000;
                GET4(ip_size, mpa->p_size);
                i_sd2 = ((ip_size >> 12) - 1) | i_rings;
                ++sda;
                PUT4(sda->sd1, i_sd1);
                PUT4(sda->sd2, i_sd2);
                ip_offset += ip_size;
            }
        }
        RISC_ADDR(mpa, (struct MPA *), mpa->p_npa);
    }
    PUT4(scb->s_szma, ip_offset >> 1);
    if (virt_view == MULTIPLE_VIEW)
    {
        scb->s_ind2 |= ms_mvv;
        scb->s_ism2 |= ss_mmu;
        n += COPY_IORB;
    }
    else                             /* for single view, single SDT */
    {
        RISC_ADDR(mpd, (struct MPX *), scb->s_smpd);   /* $$ MPD */
        DPS6_ADDR(mpd->p_sda, curr_asv);
    }
    n += ENABLE_VLD;
    DPS6_ADDR(scb->s_luvs, usr_r0);/* lowest user VA */
    scb->s_lusn = dps6_uvah;
    return (n);
}
```

We claim:

1. A layered communications mechanism for executing the layered communications operations of a first system on a second system, the first system including a user level, an executive level, an input/output level and a hardware platform, the user level including at least one user program and at least one executive program for managing operations of the first data processing system and the hardware platform including a layered communications device, the executive level including at least one user task performing user level program operations and at least one executive task performing executive program operations, the user and executive tasks generating requests for first system layered communications operations and a first layered communications mechanism for responsive to the requests for layered communications operations for executing the layered communications operations of the first system, the first layered communications mechanism including a plurality of hierarchically organized layers for performing communications layer operations, the input/output level including an input/output task responsive to the first layered communications mechanism for controlling the first system input/output device in performing layered communications operations, the layered communications mechanism executing on the second system and comprising:

a second system user level process executing in a user level of the second data processing system, the second system user level process including
the first system user level program,
the first system executive program,
the first system user and executive tasks, and
at least one upper communications layer of the first communications layer mechanism, a kernel level, including
a layered communication kernel process executing layered communications layers of the second system corresponding to all layers of the layered communications mechanism below the at least one upper communications layer of the first communications layer mechanism executing in the user level process, and a layered communications bridge mechanism connected between the at least one upper communications layer of the first communications layer mechanism executing in the user level process and the layered communication kernel process,
the layered communications bridge mechanism including
an upper communications layer bridge mechanism connected from the at least one upper communications layer of the first communications layer mechanism executing in the user level process and operating to appear to the lowest layer of the at least one upper communications layer of the first communications layer mechanism to be the next lower layer of the first layered communications mechanism, and
a lower communications layer bridge mechanism connected between the upper communications layer bridge mechanism and the layered communication kernel process and operating to appear to the upper layer of the layered communications layers of the second system executing in the communications kernel process to be the next higher layer of the layered communications layers of the second system,
the upper communications layer bridge mechanism and the lower communications layer bridge mechanism operating to map between the operations of the lowest layer of the at least one upper communications layer of the first communications layer mechanism and the upper layer of the layered communications layers of the second system executing in the communications kernel process, and a second system hardware platform including,
a second system layered communications input/output device responsive to the layered communication kernel process for executing the layered communications operations.

2. The layered communications mechanism of claim 1, wherein the second system further comprises:

an emulator level interposed between the second system user level process and the kernel level, wherein the upper communications layer bridge mechanism executes in the second system user process, and the lower communications layer bridge mechanism executes in the emulator level.

3. The layered communications mechanism of claim 2, further comprising:

a pseudo device driver executing in the emulation level between the upper communications layer bridge mechanism and the lower communications layer bridge mechanism for communicating layered communications operation requests between the upper communications layer bridge mechanism and the lower communications layer bridge mechanism.

4. The layered communications mechanism of claim 3 wherein the pseudo device driver is included as part of the lower communications layer bridge mechanism.

5. The layered communications layer mechanism of claim 4, wherein the pseudo device driver further comprises:

a pseudo device queue including a device queue frame for each layered communications operation request received from the upper communications layer bridge mechanism, each device queue frame containing a layered communication request, wherein
the lower layered communications bridge mechanism is responsive to a request stored in a device queue frame of the pseudo device queue for reading the request from the device queue frame and passing the request to the layered communication kernel process, a return queue including a return queue frame for each request executed by the layered communication kernel process, wherein the layered communication kernel process is responsive to the completion of the execution of a request for writing a request result into a return queue frame of the return queue, and a pseudo device queue manager responsive to
each request received from the upper layered communications bridge mechanism for writing the input/output request into the pseudo device queue, and
to each return queue frame in the return queue for providing the request result to the upper layered communications bridge mechanism.

6. A method for executing the layered communications operations of a first system on a second system, the first system including a user level, an executive level, an input/output level and a hardware platform, the user level including at least one user program and at least one executive program for managing operations of the first data processing system and the hardware platform including a layered communications device, the executive level including at least one user task performing user level program operations and at least one executive task performing executive program operations, the user and executive tasks generating requests for first system layered communications operations and a first layered communications mechanism for responsive to the requests for layered communications operations for executing the layered communications operations of the first system, the first layered communications mechanism including a plurality of hierarchically organized layers for performing communications layer operations, the input/output level including an input/output task responsive to the first layered communications mechanism for controlling the first system input/output device in performing layered communications operations, the method executing on the second system and comprising the steps of:

creating a second system user level process executing in a user level of the second data processing system, the second system user level process including
        the first system user level program,
        the first system executive program,
        the first system user and executive tasks, and
        at least one upper communications layer of the first communications layer mechanism, a layered communication kernel process in a kernel level and executing layered communications layers of the second system corresponding to all layers of the layered communications mechanism below the at least one upper communications layer of the first communications layer mechanism executing in the user level process, and constructing a layered communications bridge mechanism connected between the at least one upper communications layer of the first communications layer mechanism executing in the user level process and the layered communication kernel process,
        the layered communications bridge mechanism including
            an upper communications layer bridge mechanism connected from the at least one upper communications layer of the first communications layer mechanism executing in the user level process and operating to appear to the lowest layer of the at least one upper communications layer of the first communications layer mechanism to be the next lower layer of the first layered communications mechanism, and a lower communications layer bridge mechanism connected between the upper communications layer emulation mechanism and the layered communication kernel process and operating to appear to the upper layer of the layered communications layers of the second system executing in the communications kernel process to be the next higher layer of the layered communications layers of the second system, the upper communications layer bridge mechanism and the lower communications layer bridge mechanism operating to map between the operations of the lowest layer of the at least one upper communications layer of the first communications layer mechanism and the upper layer of the layered communications layers of the second system executing in the communications kernel process, and executing the layered communications operations in a second system layered communications input/output device responsive to the layered communication kernel process.

7. The method of claim 6, further comprising the steps of:

interposing an emulator level between the second system user level process and the kernel level, executing the upper communications layer bridge mechanism in the second system user process, and executing the lower communications layer bridge mechanism in the emulator level.

\* \* \* \* \*